US012099586B2

(12) United States Patent
Paul et al.

(10) Patent No.: US 12,099,586 B2
(45) Date of Patent: Sep. 24, 2024

(54) IMPLEMENTATION OF BIOMETRIC AUTHENTICATION

(71) Applicant: Apple inc., Cupertino, CA (US)

(72) Inventors: Grant R. Paul, San Francisco, CA (US); Benjamin Biron, Saratoga, CA (US); Kyle C. Brogle, San Francisco, CA (US); Naresh Kumar Chinnathanbi Kailasam, San Jose, CA (US); Brent M. Ledvina, San Francisco, CA (US); Robert W. Mayor, Half Moon Bay, CA (US); Nicole M. Wells, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 17/587,558

(22) Filed: Jan. 28, 2022

(65) Prior Publication Data

US 2022/0237274 A1 Jul. 28, 2022

Related U.S. Application Data

(63) Continuation of application No. PCT/US2022/013730, filed on Jan. 25, 2022.

(60) Provisional application No. 63/179,503, filed on Apr. 25, 2021, provisional application No. 63/141,354, filed on Jan. 25, 2021.

(51) Int. Cl.
*G06F 21/32* (2013.01)
*G06F 21/34* (2013.01)

(52) U.S. Cl.
CPC .............. *G06F 21/32* (2013.01); *G06F 21/34* (2013.01)

(58) Field of Classification Search
CPC .......... G06F 21/32; G06F 21/34; G06F 21/35; G06F 2221/2139
See application file for complete search history.

(56) References Cited

U.S. PATENT DOCUMENTS

| | | | |
|---|---|---|---|
| 5,229,764 | A | 7/1993 | Matchett et al. |
| 5,237,159 | A | 8/1993 | Stephens et al. |
| 5,265,007 | A | 11/1993 | Barnhard, Jr. et al. |
| 5,484,988 | A | 1/1996 | Hills et al. |
| 5,615,384 | A | 3/1997 | Allard et al. |
| 5,691,524 | A | 11/1997 | Josephson |
| 5,717,868 | A | 2/1998 | James |
| 5,767,457 | A | 6/1998 | Gerpheide et al. |

(Continued)

FOREIGN PATENT DOCUMENTS

| | | | |
|---|---|---|---|
| AR | 060465 | A1 | 6/2008 |
| AU | 2016100090 | A4 | 3/2016 |

(Continued)

OTHER PUBLICATIONS

Brief Communication Regarding Oral Proceedings received for European Patent Application No. 17799904.2, mailed on Sep. 13, 2022, 1 page.

(Continued)

*Primary Examiner* — Eric W Shepperd
(74) *Attorney, Agent, or Firm* — DLA Piper LLP (US)

(57) ABSTRACT

The present disclosure generally relates to methods and user interfaces for authentication, including providing and controlling authentication at a computer system using an external device in accordance with some embodiments.

81 Claims, 121 Drawing Sheets

(56) References Cited

U.S. PATENT DOCUMENTS

| | | | |
|---|---|---|---|
| 5,783,808 | A | 7/1998 | Josephson |
| 5,801,763 | A | 9/1998 | Suzuki |
| 5,828,773 | A | 10/1998 | Setlak et al. |
| 5,838,306 | A | 11/1998 | O'Connor et al. |
| 5,852,670 | A | 12/1998 | Setlak et al. |
| 5,910,989 | A | 6/1999 | Naccache |
| 5,933,134 | A | 8/1999 | Shieh |
| 5,960,411 | A | 9/1999 | Hartman et al. |
| 5,974,150 | A | 10/1999 | Kaish et al. |
| 5,983,197 | A | 11/1999 | Enta |
| 6,016,484 | A | 1/2000 | Williams et al. |
| 6,064,429 | A | 5/2000 | Belk et al. |
| 6,104,922 | A | 8/2000 | Baumann |
| 6,111,517 | A | 8/2000 | Atick et al. |
| 6,141,436 | A | 10/2000 | Srey et al. |
| 6,151,208 | A | 11/2000 | Bartlett |
| 6,151,593 | A | 11/2000 | Cho et al. |
| 6,164,528 | A | 12/2000 | Hills et al. |
| 6,173,402 | B1 | 1/2001 | Chapman |
| 6,189,785 | B1 | 2/2001 | Lowery |
| 6,192,380 | B1 | 2/2001 | Light et al. |
| 6,193,152 | B1 | 2/2001 | Fernando et al. |
| 6,219,793 | B1 | 4/2001 | Li et al. |
| 6,230,148 | B1 | 5/2001 | Pare, Jr. et al. |
| 6,260,027 | B1 | 7/2001 | Takahashi et al. |
| 6,282,655 | B1 | 8/2001 | Given |
| 6,289,114 | B1 | 9/2001 | Mainguet |
| 6,317,835 | B1 | 11/2001 | Bilger et al. |
| 6,323,846 | B1 | 11/2001 | Westerman et al. |
| 6,328,207 | B1 | 12/2001 | Gregoire et al. |
| 6,337,919 | B1 | 1/2002 | Dunton |
| 6,374,145 | B1 | 4/2002 | Lignoul |
| 6,398,646 | B1 | 6/2002 | Wei et al. |
| 6,408,087 | B1 | 6/2002 | Kramer |
| 6,421,453 | B1 | 7/2002 | Kanevsky et al. |
| 6,560,711 | B1 | 5/2003 | Given et al. |
| 6,570,557 | B1 | 5/2003 | Westerman et al. |
| 6,573,883 | B1 | 6/2003 | Bartlett |
| 6,581,042 | B2 | 6/2003 | Pare, Jr. et al. |
| 6,618,806 | B1 | 9/2003 | Brown et al. |
| 6,639,584 | B1 | 10/2003 | Li |
| 6,644,546 | B2 | 11/2003 | George et al. |
| 6,662,166 | B2 | 12/2003 | Pare, Jr. et al. |
| 6,709,333 | B1 | 3/2004 | Bradford et al. |
| 6,720,860 | B1 | 4/2004 | Narayanaswami |
| 6,795,569 | B1 | 9/2004 | Setlak |
| 6,922,147 | B1 | 7/2005 | Viksnins et al. |
| 6,941,001 | B1 | 9/2005 | Bolle et al. |
| 6,950,810 | B2 | 9/2005 | Lapsley et al. |
| 6,970,855 | B2 | 11/2005 | Das et al. |
| 6,980,081 | B2 | 12/2005 | Anderson |
| 7,027,619 | B2 | 4/2006 | Pavlidis et al. |
| 7,030,860 | B1 | 4/2006 | Hsu et al. |
| 7,039,221 | B1 | 5/2006 | Tumey et al. |
| 7,046,838 | B1 | 5/2006 | Sakagawa et al. |
| 7,057,607 | B2 | 6/2006 | Mayoraz et al. |
| 7,079,652 | B1 | 7/2006 | Harris |
| 7,081,905 | B1 | 7/2006 | Raghunath |
| 7,086,085 | B1 | 8/2006 | Brown et al. |
| 7,099,845 | B2 | 8/2006 | Higgins et al. |
| 7,099,850 | B1 | 8/2006 | Mann, II et al. |
| 7,124,300 | B1 | 10/2006 | Lemke |
| 7,130,454 | B1 | 10/2006 | Berube et al. |
| 7,190,816 | B2 | 3/2007 | Mitsuyu et al. |
| 7,239,728 | B1 | 7/2007 | Choi et al. |
| 7,346,778 | B1 | 3/2008 | Guiter et al. |
| 7,356,516 | B2 | 4/2008 | Richey et al. |
| 7,359,880 | B2 | 4/2008 | Abel et al. |
| 7,414,613 | B2 | 8/2008 | Simelius |
| 7,415,720 | B2 | 8/2008 | Jung |
| 7,420,546 | B2 | 9/2008 | Abdallah et al. |
| 7,430,537 | B2 | 9/2008 | Templeton et al. |
| 7,535,344 | B2 | 5/2009 | Obradovich |
| 7,542,592 | B2 | 6/2009 | Singh et al. |
| 7,546,470 | B2 | 6/2009 | Schultz |
| 7,630,522 | B2 | 12/2009 | Popp et al. |
| 7,633,076 | B2 | 12/2009 | Huppi et al. |
| 7,644,019 | B2 | 1/2010 | Woda et al. |
| 7,657,441 | B2 | 2/2010 | Richey et al. |
| 7,657,849 | B2 | 2/2010 | Chaudhri et al. |
| 7,676,748 | B1 | 3/2010 | Barrus et al. |
| 7,689,508 | B2 | 3/2010 | Davis et al. |
| 7,697,729 | B2 | 4/2010 | Howell et al. |
| 7,705,737 | B2 | 4/2010 | Senga |
| 7,730,401 | B2 | 6/2010 | Gillespie et al. |
| 7,734,930 | B2 | 6/2010 | Kirovski et al. |
| 7,738,916 | B2 | 6/2010 | Fukuda |
| 7,860,536 | B2 | 12/2010 | Jobs et al. |
| 7,860,936 | B1 | 12/2010 | Newstadt et al. |
| 7,921,297 | B2 | 4/2011 | Ortiz et al. |
| 8,006,299 | B2 | 8/2011 | Suominen |
| 8,018,440 | B2 | 9/2011 | Townsend et al. |
| 8,042,157 | B2 | 10/2011 | Bennett et al. |
| 8,050,997 | B1 | 11/2011 | Nosek et al. |
| 8,060,571 | B2 | 11/2011 | Rao |
| 8,095,634 | B2 | 1/2012 | Rao et al. |
| 8,131,848 | B1 | 3/2012 | Denise |
| 8,145,912 | B2 | 3/2012 | Mclean |
| 8,157,164 | B1 | 4/2012 | Billman |
| 8,195,507 | B2 | 6/2012 | Postrel |
| 8,254,642 | B2 | 8/2012 | Kobayashi et al. |
| 8,254,647 | B1 | 8/2012 | Nechyba et al. |
| 8,311,514 | B2 | 11/2012 | Bandyopadhyay et al. |
| 8,336,086 | B2 | 12/2012 | Seo |
| 8,341,557 | B2 | 12/2012 | Pisula et al. |
| 8,392,259 | B2 | 3/2013 | Macgillivray et al. |
| 8,395,658 | B2 | 3/2013 | Corson |
| 8,396,265 | B1 | 3/2013 | Ross et al. |
| 8,438,400 | B2 | 5/2013 | Hoghaug et al. |
| 8,452,654 | B1 | 5/2013 | Wooters et al. |
| 8,452,978 | B2 | 5/2013 | Alward et al. |
| 8,488,040 | B2 | 7/2013 | Chen et al. |
| 8,526,915 | B2 | 9/2013 | Kakiuchi et al. |
| 8,538,158 | B1 | 9/2013 | Denise |
| 8,543,834 | B1 | 9/2013 | Barra |
| 8,560,004 | B1 | 10/2013 | Tsvetkov et al. |
| 8,581,877 | B2 | 11/2013 | Yoo |
| 8,583,549 | B1 | 11/2013 | Mohsenzadeh |
| 8,606,512 | B1 | 12/2013 | Bogovich et al. |
| 8,606,640 | B2 | 12/2013 | Brody et al. |
| 8,619,050 | B2 | 12/2013 | Herz et al. |
| 8,638,385 | B2 | 1/2014 | Bhogal |
| 8,639,621 | B1 | 1/2014 | Kennedy et al. |
| 8,646,060 | B1 | 2/2014 | Ben Ayed |
| 8,679,012 | B1 | 3/2014 | Kayyali |
| 8,762,272 | B1 | 6/2014 | Cozens et al. |
| 8,763,896 | B2 | 7/2014 | Kushevsky et al. |
| 8,769,624 | B2 | 7/2014 | Cotterill |
| 8,782,775 | B2 | 7/2014 | Fadell et al. |
| 8,788,838 | B1 | 7/2014 | Fadell et al. |
| 8,826,415 | B2 | 9/2014 | Last |
| 8,831,677 | B2 | 9/2014 | Villa-real |
| 8,892,474 | B1 | 11/2014 | Inskeep et al. |
| 8,904,479 | B1 | 12/2014 | Johansson et al. |
| 8,943,580 | B2 | 1/2015 | Fadell et al. |
| 8,949,618 | B1 | 2/2015 | Lee et al. |
| 8,949,902 | B1 | 2/2015 | Fabian-Isaacs et al. |
| 8,963,806 | B1 | 2/2015 | Starner et al. |
| 8,983,846 | B2 | 3/2015 | Di Profio et al. |
| 8,988,490 | B2 | 3/2015 | Fujii |
| 8,994,499 | B2 | 3/2015 | Zhao et al. |
| 9,002,322 | B2 | 4/2015 | Cotterill |
| 9,031,847 | B2 | 5/2015 | Sarin et al. |
| 9,038,167 | B2 | 5/2015 | Fadell et al. |
| 9,053,293 | B2 | 6/2015 | Latzina |
| 9,098,931 | B2 * | 8/2015 | Shpunt ................. H04N 13/398 |
| 9,128,601 | B2 | 9/2015 | Fadell et al. |
| 9,134,896 | B2 | 9/2015 | Fadell et al. |
| 9,170,645 | B2 | 10/2015 | Park et al. |
| 9,177,130 | B2 | 11/2015 | Nechyba et al. |
| 9,179,298 | B2 | 11/2015 | Jung et al. |
| 9,250,795 | B2 | 2/2016 | Fadell et al. |
| 9,253,375 | B2 | 2/2016 | Milanfar et al. |
| 9,269,083 | B1 | 2/2016 | Jarajapu et al. |

(56) References Cited

U.S. PATENT DOCUMENTS 9,269,196 B1 2/2016 Fan et al.
9,274,647 B2 3/2016 Fadell et al.
9,294,476 B1 3/2016 Lurey et al.
9,304,624 B2 4/2016 Fadell et al.
9,305,155 B1 4/2016 Vo et al.
9,324,067 B2 4/2016 Van Os et al.
9,329,771 B2 5/2016 Fadell et al.
9,349,035 B1 5/2016 Gerber et al.
9,355,234 B1 5/2016 Magi Shaashua et al.
9,411,460 B2 8/2016 Dumont et al.
9,451,210 B1 9/2016 Smus
9,477,872 B2 10/2016 Sarve et al.
9,483,763 B2 11/2016 Van Os et al.
9,495,531 B2 11/2016 Fadell et al.
9,519,771 B2 12/2016 Fadell et al.
9,519,901 B1 12/2016 Dorogusker
9,526,127 B1 12/2016 Taubman et al.
9,549,323 B2 1/2017 Lee et al.
9,558,636 B1 1/2017 Burdick
9,569,605 B1 2/2017 Schneider et al.
9,569,655 B2 2/2017 Harper
9,600,709 B2 3/2017 Russo
9,613,245 B1 4/2017 Eltoft et al.
9,678,571 B1 6/2017 Robert et al.
9,716,825 B1 7/2017 Manzari et al.
9,753,541 B1 9/2017 Robert et al.
9,817,549 B2 11/2017 Chandrasekaran
9,847,999 B2 12/2017 Van Os et al.
9,851,214 B1 12/2017 Chintakindi
9,881,198 B2 1/2018 Lee et al.
9,898,642 B2 2/2018 Han et al.
9,913,246 B1 3/2018 Carey et al.
9,922,317 B2 3/2018 Bak et al.
9,953,149 B2 4/2018 Tussy
9,984,270 B2 5/2018 Yousefpor et al.
10,003,738 B2 6/2018 Lautenbach et al.
10,019,904 B1 7/2018 Chan et al.
10,073,541 B1 9/2018 Baldwin
10,089,607 B2 10/2018 Ziat et al.
10,096,015 B2 10/2018 Bak et al.
10,102,359 B2 10/2018 Cheyer
10,127,926 B2 11/2018 James
10,163,105 B1 12/2018 Ziraknejad et al.
10,185,542 B2 1/2019 Carson et al.
10,199,051 B2 2/2019 Binder et al.
10,334,054 B2 6/2019 Van Os et al.
10,410,035 B2 9/2019 Han et al.
10,440,574 B2 * 10/2019 Ledvina ................ H04W 12/06
10,482,461 B2 11/2019 Van Os et al.
10,496,705 B1 12/2019 Irani et al.
10,701,067 B1 6/2020 Ziraknejad et al.
10,749,967 B2 8/2020 Van Os et al.
10,803,281 B2 10/2020 Han et al.
10,805,758 B2 10/2020 Norris et al.
10,877,637 B1 12/2020 Antos et al.
10,931,813 B1 2/2021 Kim et al.
10,943,382 B2 3/2021 Shapiro et al.
10,971,171 B2 4/2021 Davis et al.
11,026,085 B2 6/2021 Grange et al.
11,100,349 B2 8/2021 Cohen et al.
11,751,053 B2 9/2023 Lee et al.
2001/0031072 A1 10/2001 Dobashi et al.
2001/0039497 A1 11/2001 Hubbard
2001/0044906 A1 11/2001 Kanevsky et al.
2001/0047365 A1 11/2001 Yonaitis
2001/0047488 A1 11/2001 Verplaetse et al.
2002/0002682 A1 1/2002 Tsuchiyama et al.
2002/0004760 A1 1/2002 Yoshida et al.
2002/0015024 A1 2/2002 Westerman et al.
2002/0046064 A1 4/2002 Maury et al.
2002/0059295 A1 5/2002 Ludtke et al.
2002/0061130 A1 5/2002 Kirk et al.
2002/0065774 A1 5/2002 Young et al.
2002/0095588 A1 7/2002 Shigematsu et al.
2002/0097145 A1 7/2002 Tumey et al.
2002/0109668 A1 8/2002 Rosenberg et al.
2002/0120867 A1 8/2002 Mitchell et al.
2002/0136435 A1 9/2002 Prokoski
2002/0141586 A1 10/2002 Margalit et al.
2002/0190960 A1 12/2002 Kuo et al.
2002/0191029 A1 12/2002 Gillespie et al.
2002/0191817 A1 12/2002 Sato et al.
2003/0006280 A1 1/2003 Seita et al.
2003/0028639 A1 2/2003 Yamamoto et al.
2003/0038754 A1 2/2003 Goldstein et al.
2003/0046557 A1 3/2003 Miller et al.
2003/0048173 A1 3/2003 Shigematsu et al.
2003/0059092 A1 3/2003 Okubo et al.
2003/0076298 A1 4/2003 Rosenberg
2003/0097413 A1 5/2003 Vishik et al.
2003/0103652 A1 6/2003 Lee et al.
2003/0115490 A1 6/2003 Russo et al.
2003/0118217 A1 6/2003 Kondo et al.
2003/0120934 A1 6/2003 Ortiz
2003/0132974 A1 7/2003 Bodin
2003/0138136 A1 7/2003 Umezaki et al.
2003/0141959 A1 7/2003 Keogh et al.
2003/0160815 A1 8/2003 Muschetto
2003/0163710 A1 8/2003 Ortiz et al.
2003/0188183 A1 10/2003 Lee et al.
2003/0200184 A1 10/2003 Dominguez et al.
2003/0210127 A1 11/2003 Anderson
2003/0236746 A1 12/2003 Turner et al.
2004/0010722 A1 1/2004 Ha
2004/0030934 A1 2/2004 Mizoguchi et al.
2004/0046638 A1 3/2004 Kawasaki
2004/0059590 A1 3/2004 Mercredi et al.
2004/0073432 A1 4/2004 Stone
2004/0076310 A1 4/2004 Hersch et al.
2004/0085300 A1 5/2004 Matusis et al.
2004/0085351 A1 5/2004 Tokkonen
2004/0088564 A1 5/2004 Norman
2004/0091136 A1 5/2004 Dombrowski
2004/0113819 A1 6/2004 Gauthey et al.
2004/0122685 A1 6/2004 Bunce
2004/0131237 A1 7/2004 Machida
2004/0135801 A1 7/2004 Thompson et al.
2004/0137890 A1 7/2004 Kalke
2004/0143553 A1 7/2004 Torget et al.
2004/0151347 A1 8/2004 Wisniewski
2004/0172562 A1 9/2004 Berger et al.
2004/0181695 A1 9/2004 Walker et al.
2004/0196400 A1 10/2004 Stavely et al.
2004/0210771 A1 10/2004 Wood et al.
2004/0215572 A1 10/2004 Uehara et al.
2004/0229560 A1 11/2004 Maloney
2004/0230843 A1 11/2004 Jansen
2004/0239648 A1 12/2004 Abdallah et al.
2004/0239732 A1 12/2004 Silverbrook
2004/0242200 A1 12/2004 Maeoka et al.
2004/0250138 A1 12/2004 Schneider
2004/0252867 A1 12/2004 Lan et al.
2004/0254891 A1 12/2004 Blinn et al.
2004/0257196 A1 12/2004 Kotzin
2004/0260955 A1 12/2004 Mantyla
2005/0024341 A1 2/2005 Gillespie et al.
2005/0028082 A1 2/2005 Topalov et al.
2005/0040962 A1 2/2005 Funkhouser et al.
2005/0041841 A1 2/2005 Yoo et al.
2005/0060554 A1 3/2005 O'donoghue
2005/0071188 A1 3/2005 Thuerk
2005/0071635 A1 3/2005 Furuyama
2005/0071647 A1 3/2005 Fujinuma et al.
2005/0074147 A1 4/2005 Smith et al.
2005/0078855 A1 4/2005 Chandler et al.
2005/0079896 A1 4/2005 Kokko et al.
2005/0091213 A1 4/2005 Schutz et al.
2005/0093834 A1 5/2005 Abdallah et al.
2005/0093868 A1 5/2005 Hinckley
2005/0096009 A1 5/2005 Ackley
2005/0097171 A1 5/2005 Hikichi
2005/0097608 A1 5/2005 Penke et al.
2005/0100198 A1 5/2005 Nakano et al.
2005/0105778 A1 5/2005 Sung et al.

(56) References Cited

U.S. PATENT DOCUMENTS

2005/0110801 A1 5/2005 Lin
2005/0111708 A1 5/2005 Chou
2005/0113071 A1 5/2005 Nagata
2005/0114686 A1 5/2005 Ball et al.
2005/0116840 A1 6/2005 Simelius
2005/0117752 A1 6/2005 Iima et al.
2005/0144452 A1 6/2005 Lynch et al.
2005/0169503 A1 8/2005 Howell et al.
2005/0174325 A1 8/2005 Setlak et al.
2005/0177867 A1 8/2005 Toutonghi
2005/0187873 A1 8/2005 Labrou et al.
2005/0190059 A1 9/2005 Wehrenberg
2005/0204173 A1 9/2005 Chang
2005/0206501 A1 9/2005 Farhat
2005/0220304 A1 10/2005 Lenoir et al.
2005/0221798 A1 10/2005 Sengupta et al.
2005/0226472 A1 10/2005 Komura et al.
2005/0231625 A1 10/2005 Parulski et al.
2005/0250538 A1 11/2005 Narasimhan et al.
2005/0253817 A1 11/2005 Rytivaara et al.
2005/0254086 A1 11/2005 Shouno
2006/0017692 A1 1/2006 Wehrenberg et al.
2006/0021003 A1 1/2006 Fisher et al.
2006/0029262 A1 2/2006 Fujimatsu et al.
2006/0032908 A1 2/2006 Sines
2006/0036553 A1 2/2006 Gupta et al.
2006/0039686 A1 2/2006 Soh et al.
2006/0056664 A1 3/2006 Iwasaki
2006/0075228 A1 4/2006 Black et al.
2006/0075250 A1 4/2006 Liao
2006/0078176 A1 4/2006 Abiko et al.
2006/0080525 A1 4/2006 Ritter et al.
2006/0093183 A1 5/2006 Hosoi et al.
2006/0093192 A1 5/2006 Bechtel
2006/0097172 A1 5/2006 Park
2006/0102843 A1 5/2006 Bazakos et al.
2006/0104488 A1 5/2006 Bazakos et al.
2006/0107067 A1 5/2006 Safal et al.
2006/0115130 A1 6/2006 Kozlay
2006/0116555 A1 6/2006 Pavlidis et al.
2006/0120707 A1 6/2006 Kusakari et al.
2006/0136087 A1 6/2006 Higashiura
2006/0136734 A1 6/2006 Telek et al.
2006/0156028 A1 7/2006 Aoyama et al.
2006/0161870 A1* 7/2006 Hotelling .............. G06F 3/0412 715/863
2006/0161871 A1* 7/2006 Hotelling .............. G06F 3/0485 715/862
2006/0165060 A1 7/2006 Dua et al.
2006/0192775 A1 8/2006 Nicholson et al.
2006/0192868 A1 8/2006 Wakamori
2006/0206709 A1 9/2006 Labrou et al.
2006/0208065 A1 9/2006 Mendelovich et al.
2006/0214910 A1 9/2006 Mizuno et al.
2006/0215886 A1 9/2006 Black
2006/0219776 A1 10/2006 Finn
2006/0224645 A1 10/2006 Kadi
2006/0224882 A1 10/2006 Chin
2006/0234764 A1 10/2006 Gamo et al.
2006/0239517 A1 10/2006 Creasey et al.
2006/0250578 A1 11/2006 Pohl et al.
2006/0274920 A1 12/2006 Tochikubo et al.
2006/0280340 A1 12/2006 Derakhshani et al.
2006/0282671 A1 12/2006 Burton
2006/0282682 A1 12/2006 Masaki et al.
2006/0285663 A1 12/2006 Rathus et al.
2006/0288226 A1 12/2006 Kowal
2006/0288234 A1 12/2006 Azar et al.
2006/0294007 A1 12/2006 Barthelemy
2006/0294025 A1 12/2006 Mengerink
2007/0008066 A1 1/2007 Fukuda
2007/0009139 A1 1/2007 Landschaft et al.
2007/0014439 A1 1/2007 Ando et al.
2007/0016958 A1 1/2007 Bodepudi et al.
2007/0021194 A1 1/2007 Aida
2007/0024579 A1 2/2007 Rosenberg
2007/0025723 A1 2/2007 Baudisch et al.
2007/0061126 A1 3/2007 Russo et al.
2007/0061889 A1 3/2007 Sainaney et al.
2007/0067642 A1 3/2007 Singhal
2007/0073649 A1 3/2007 Kikkoji et al.
2007/0075965 A1* 4/2007 Huppi ............... H04M 1/72454 345/156
2007/0079137 A1 4/2007 Tu
2007/0081081 A1 4/2007 Cheng
2007/0089164 A1 4/2007 Gao et al.
2007/0106942 A1 5/2007 Sanaka et al.
2007/0109274 A1 5/2007 Reynolds
2007/0110287 A1 5/2007 Kim et al.
2007/0126859 A1 6/2007 Choi et al.
2007/0143628 A1 6/2007 Genda
2007/0150842 A1 6/2007 Chaudhri et al.
2007/0156521 A1 7/2007 Yates
2007/0162963 A1 7/2007 Penet et al.
2007/0180492 A1 8/2007 Hassan et al.
2007/0186106 A1 8/2007 Ting et al.
2007/0189583 A1 8/2007 Shimada et al.
2007/0192168 A1 8/2007 Van Luchene
2007/0194113 A1 8/2007 Esplin et al.
2007/0200916 A1 8/2007 Han
2007/0201730 A1 8/2007 Masaki et al.
2007/0204037 A1 8/2007 Kunz et al.
2007/0208743 A1 9/2007 Sainaney et al.
2007/0219901 A1 9/2007 Garbow et al.
2007/0220273 A1 9/2007 Campisi
2007/0226778 A1 9/2007 Pietruszka
2007/0229221 A1 10/2007 Saotome
2007/0230773 A1 10/2007 Nagao et al.
2007/0236330 A1 10/2007 Cho et al.
2007/0236475 A1 10/2007 Wherry
2007/0239921 A1 10/2007 Toorians et al.
2007/0244811 A1 10/2007 Tumminaro
2007/0250573 A1 10/2007 Rothschild et al.
2007/0253604 A1 11/2007 Inoue et al.
2007/0255564 A1 11/2007 Yee et al.
2007/0259716 A1 11/2007 Mattice et al.
2007/0260547 A1 11/2007 Little
2007/0277224 A1 11/2007 Osborn et al.
2007/0280515 A1 12/2007 Goto
2007/0287423 A1 12/2007 Kakiuchi et al.
2007/0294182 A1 12/2007 Hammad
2008/0001703 A1 1/2008 Goto
2008/0017721 A1 1/2008 Zehnacker
2008/0027947 A1 1/2008 Pritchett et al.
2008/0032801 A1 2/2008 Brunet De Courssou
2008/0040786 A1 2/2008 Chang et al.
2008/0041936 A1 2/2008 Vawter
2008/0042866 A1 2/2008 Morse et al.
2008/0042983 A1 2/2008 Kim et al.
2008/0048878 A1 2/2008 Boillot
2008/0049984 A1 2/2008 Poo et al.
2008/0054081 A1 3/2008 Mullen
2008/0059351 A1 3/2008 Richey et al.
2008/0069412 A1 3/2008 Champagne et al.
2008/0072045 A1 3/2008 Mizrah
2008/0084539 A1 4/2008 Daniel
2008/0092245 A1 4/2008 Alward et al.
2008/0114678 A1 5/2008 Bennett et al.
2008/0114980 A1 5/2008 Sridhar
2008/0133931 A1 6/2008 Kosaka
2008/0140868 A1* 6/2008 Kalayjian ............... H04L 67/34 709/217
2008/0165255 A1 7/2008 Christie et al.
2008/0167834 A1* 7/2008 Herz .................... G06F 1/3231 250/221
2008/0172598 A1 7/2008 Jacobsen et al.
2008/0178283 A1 7/2008 Pratt et al.
2008/0201454 A1 8/2008 Soffer
2008/0208762 A1 8/2008 Arthur et al.
2008/0212849 A1 9/2008 Gao
2008/0218641 A1 9/2008 Kjeldsen et al.
2008/0229409 A1 9/2008 Miller et al.
2008/0231729 A1 9/2008 Sato et al.
2008/0246917 A1 10/2008 Phinney et al.

(56) References Cited

U.S. PATENT DOCUMENTS

2008/0250481 A1 10/2008 Beck et al.
2008/0275779 A1 11/2008 Lakshminarayanan
2008/0292144 A1 11/2008 Kim et al.
2008/0309632 A1 12/2008 Westerman et al.
2008/0314971 A1 12/2008 Faith et al.
2008/0317292 A1 12/2008 Baker et al.
2008/0319875 A1 12/2008 Levchin et al.
2008/0320391 A1* 12/2008 Lemay ............... G06F 3/04886 715/702
2009/0005165 A1 1/2009 Arezina et al.
2009/0006292 A1 1/2009 Block
2009/0006846 A1 1/2009 Rosenblatt
2009/0006991 A1 1/2009 Lindberg et al.
2009/0016574 A1 1/2009 Tsukahara
2009/0031375 A1 1/2009 Sullivan et al.
2009/0036165 A1 2/2009 Brede
2009/0037742 A1 2/2009 Narayanaswami
2009/0054044 A1 2/2009 Ikemori et al.
2009/0055484 A1 2/2009 Vuong et al.
2009/0061837 A1 3/2009 Chaudhri et al.
2009/0063851 A1 3/2009 Nijdam
2009/0064055 A1 3/2009 Chaudhri et al.
2009/0067685 A1 3/2009 Boshra et al.
2009/0074255 A1 3/2009 Holm
2009/0082066 A1 3/2009 Katz
2009/0083847 A1 3/2009 Fadell et al.
2009/0083850 A1 3/2009 Fadell et al.
2009/0094681 A1 4/2009 Sadler et al.
2009/0106558 A1 4/2009 Delgrosso et al.
2009/0119754 A1 5/2009 Schubert
2009/0122149 A1 5/2009 Ishii
2009/0144074 A1 6/2009 Choi
2009/0146779 A1 6/2009 Kumar et al.
2009/0158390 A1 6/2009 Guan
2009/0159696 A1 6/2009 Mullen
2009/0160609 A1 6/2009 Lin et al.
2009/0164878 A1 6/2009 Cottrille
2009/0165107 A1 6/2009 Tojo et al.
2009/0168756 A1 7/2009 Kurapati et al.
2009/0175509 A1 7/2009 Gonion et al.
2009/0176565 A1 7/2009 Kelly et al.
2009/0187423 A1 7/2009 Kim
2009/0193514 A1 7/2009 Adams et al.
2009/0199188 A1 8/2009 Fujimaki
2009/0201257 A1 8/2009 Saitoh et al.
2009/0210308 A1 8/2009 Toomer et al.
2009/0215533 A1 8/2009 Zalewski et al.
2009/0224874 A1 9/2009 Dewar et al.
2009/0228938 A1 9/2009 White et al.
2009/0241169 A1 9/2009 Dhand et al.
2009/0258667 A1 10/2009 Suzuki et al.
2009/0262947 A1 10/2009 Karlsson et al.
2009/0312049 A1 12/2009 Isomursu
2009/0327744 A1 12/2009 Hatano et al.
2009/0328162 A1 12/2009 Kokumai et al.
2010/0008545 A1 1/2010 Ueki et al.
2010/0026640 A1 2/2010 Kim et al.
2010/0027854 A1 2/2010 Chatterjee et al.
2010/0034432 A1 2/2010 Ono et al.
2010/0042835 A1 2/2010 Lee et al.
2010/0075656 A1 3/2010 Howarter et al.
2010/0082462 A1 4/2010 Yuan et al.
2010/0082481 A1 4/2010 Lin et al.
2010/0088148 A1 4/2010 Presswala et al.
2010/0107229 A1 4/2010 Najafi et al.
2010/0114731 A1 5/2010 Kingston et al.
2010/0122327 A1 5/2010 Linecker et al.
2010/0124363 A1 5/2010 Ek et al.
2010/0131303 A1 5/2010 Collopy et al.
2010/0146384 A1 6/2010 Peev et al.
2010/0153265 A1 6/2010 Hershfield et al.
2010/0158327 A1 6/2010 Kangas et al.
2010/0159995 A1 6/2010 Stallings et al.
2010/0164684 A1 7/2010 Sasa et al.
2010/0178873 A1 7/2010 Lee et al.
2010/0185871 A1 7/2010 Scherrer et al.
2010/0191570 A1 7/2010 Michaud et al.
2010/0205091 A1 8/2010 Graziano et al.
2010/0207721 A1 8/2010 Nakajima et al.
2010/0216425 A1 8/2010 Smith
2010/0223145 A1 9/2010 Dragt
2010/0225607 A1 9/2010 Kim
2010/0231356 A1 9/2010 Kim
2010/0240415 A1 9/2010 Kim et al.
2010/0243741 A1 9/2010 Eng
2010/0251243 A1 9/2010 Gill et al.
2010/0265204 A1 10/2010 Tsuda
2010/0267362 A1 10/2010 Smith et al.
2010/0269156 A1 10/2010 Hohlfeld et al.
2010/0273461 A1 10/2010 Choi
2010/0302016 A1 12/2010 Zaborowski
2010/0311397 A1 12/2010 Li
2010/0313263 A1 12/2010 Uchida et al.
2011/0010470 A1 1/2011 Hulbert et al.
2011/0013813 A1 1/2011 Yamamoto et al.
2011/0035799 A1 2/2011 Handler
2011/0050976 A1 3/2011 Kwon
2011/0052013 A1 3/2011 Sasahara et al.
2011/0054268 A1 3/2011 Fidacaro et al.
2011/0055763 A1 3/2011 Utsuki et al.
2011/0065479 A1 3/2011 Nader
2011/0067098 A1 3/2011 Ruggiero et al.
2011/0081889 A1 4/2011 Gao et al.
2011/0088086 A1 4/2011 Swink et al.
2011/0099079 A1 4/2011 White et al.
2011/0119610 A1 5/2011 Hackborn et al.
2011/0122294 A1 5/2011 Suh et al.
2011/0138166 A1 6/2011 Peszek et al.
2011/0142234 A1 6/2011 Rogers
2011/0145049 A1 6/2011 Hertel et al.
2011/0145051 A1 6/2011 Paradise et al.
2011/0149874 A1 6/2011 Reif
2011/0161116 A1 6/2011 Peak et al.
2011/0163969 A1 7/2011 Freddy et al.
2011/0164269 A1 7/2011 Kamishiro
2011/0175703 A1 7/2011 Benkley
2011/0187497 A1 8/2011 Chin
2011/0201306 A1 8/2011 Ali Al-Harbi
2011/0215921 A1 9/2011 Ben et al.
2011/0225057 A1 9/2011 Webb et al.
2011/0225069 A1 9/2011 Cramer et al.
2011/0225426 A1 9/2011 Agarwal et al.
2011/0230769 A1 9/2011 Yamazaki
2011/0231914 A1 9/2011 Hung
2011/0238514 A1 9/2011 Ramalingam et al.
2011/0251892 A1 10/2011 Laracey
2011/0254683 A1 10/2011 Soldan et al.
2011/0286640 A1 11/2011 Kwon et al.
2011/0288970 A1 11/2011 Kidron et al.
2011/0296324 A1 12/2011 Goossens et al.
2011/0300829 A1 12/2011 Nurmi et al.
2011/0314539 A1 12/2011 Horton
2012/0009896 A1 1/2012 Bandyopadhyay et al.
2012/0015629 A1 1/2012 Olsen et al.
2012/0023185 A1 1/2012 Holden et al.
2012/0023573 A1 1/2012 Shi
2012/0028659 A1 2/2012 Whitney et al.
2012/0028695 A1 2/2012 Walker et al.
2012/0032891 A1 2/2012 Parivar et al.
2012/0036556 A1 2/2012 Lebeau et al.
2012/0069231 A1 3/2012 Chao
2012/0072546 A1 3/2012 Etchegoyen
2012/0078751 A1 3/2012 Macphail et al.
2012/0081282 A1 4/2012 Chin
2012/0089507 A1 4/2012 Zhang et al.
2012/0089835 A1 4/2012 Peckover
2012/0095853 A1 4/2012 Von et al.
2012/0095865 A1 4/2012 Doherty et al.
2012/0123806 A1 5/2012 Schumann et al.
2012/0123937 A1 5/2012 Spodak et al.
2012/0139698 A1 6/2012 Tsui et al.
2012/0197743 A1 8/2012 Grigg et al.
2012/0200489 A1 8/2012 Miyashita et al.
2012/0215553 A1 8/2012 Leston

(56) References Cited

U.S. PATENT DOCUMENTS

2012/0218125 A1 8/2012 Demirdjian et al.
2012/0221427 A1 8/2012 Woo
2012/0221464 A1 8/2012 Pasquero et al.
2012/0235790 A1 9/2012 Zhao et al.
2012/0245985 A1 9/2012 Cho et al.
2012/0267432 A1 10/2012 Kuttuva
2012/0271712 A1 10/2012 Katzin et al.
2012/0280917 A1 11/2012 Toksvig et al.
2012/0283871 A1 11/2012 Chai et al.
2012/0284297 A1 11/2012 Aguera-Arcas et al.
2012/0290449 A1 11/2012 Mullen et al.
2012/0291121 A1 11/2012 Huang et al.
2012/0293438 A1 11/2012 Chaudhri et al.
2012/0295708 A1 11/2012 Hernandez-Abrego et al.
2012/0310760 A1 12/2012 Phillips et al.
2012/0311438 A1 12/2012 Cranfill et al.
2012/0311499 A1 12/2012 Dellinger et al.
2012/0316933 A1 12/2012 Pentland et al.
2012/0322370 A1 12/2012 Lee
2012/0322371 A1 12/2012 Lee
2012/0327183 A1 12/2012 Fujii
2013/0013499 A1 1/2013 Kalgi
2013/0015946 A1 1/2013 Lau et al.
2013/0024932 A1 1/2013 Toebes et al.
2013/0030934 A1 1/2013 Bakshi et al.
2013/0031217 A1 1/2013 Rajapakse
2013/0047233 A1 2/2013 Fisk et al.
2013/0047236 A1 2/2013 Singh
2013/0050263 A1 2/2013 Khoe et al.
2013/0054336 A1 2/2013 Graylin
2013/0060678 A1 3/2013 Oskolkov et al.
2013/0060687 A1 3/2013 Bak et al.
2013/0067545 A1 3/2013 Hanes
2013/0073321 A1 3/2013 Hofmann et al.
2013/0074194 A1 3/2013 White et al.
2013/0080272 A1 3/2013 Ronca et al.
2013/0080275 A1 3/2013 Ronca et al.
2013/0082819 A1 4/2013 Cotterill
2013/0082974 A1 4/2013 Kerr et al.
2013/0085931 A1 4/2013 Runyan
2013/0085936 A1 4/2013 Law et al.
2013/0086637 A1 4/2013 Cotterill et al.
2013/0102281 A1 4/2013 Kanda et al.
2013/0103519 A1 4/2013 Kountotsis et al.
2013/0110719 A1 5/2013 Carter et al.
2013/0122866 A1 5/2013 Huang
2013/0124423 A1 5/2013 Fisher
2013/0124855 A1 5/2013 Varadarajan et al.
2013/0127854 A1* 5/2013 Shpunt ................. H04N 13/365
345/420
2013/0129162 A1 5/2013 Cheng et al.
2013/0136341 A1 5/2013 Yamamoto
2013/0145448 A1 6/2013 Newell
2013/0148867 A1 6/2013 Wang
2013/0151414 A1 6/2013 Zhu et al.
2013/0160110 A1 6/2013 Schechter et al.
2013/0166325 A1 6/2013 Ganapathy et al.
2013/0169549 A1 7/2013 Seymour et al.
2013/0176208 A1 7/2013 Tanaka et al.
2013/0191911 A1 7/2013 Dellinger et al.
2013/0200146 A1 8/2013 Moghadam et al.
2013/0212655 A1 8/2013 Hoyos et al.
2013/0216108 A1 8/2013 Hwang et al.
2013/0218721 A1 8/2013 Borhan et al.
2013/0222323 A1 8/2013 Mckenzie
2013/0223696 A1 8/2013 Azar et al.
2013/0226792 A1 8/2013 Kushevsky et al.
2013/0231127 A1 9/2013 Kildal et al.
2013/0239202 A1 9/2013 Adams et al.
2013/0243264 A1 9/2013 Aoki
2013/0244615 A1 9/2013 Miller
2013/0247175 A1 9/2013 Nechyba et al.
2013/0254574 A1 9/2013 Zacchio et al.
2013/0254858 A1 9/2013 Giardina et al.
2013/0262857 A1 10/2013 Neuman et al.
2013/0279768 A1 10/2013 Boshra
2013/0282577 A1 10/2013 Milne
2013/0286161 A1 10/2013 Lv et al.
2013/0290187 A1 10/2013 Itwaru
2013/0301832 A1 11/2013 Harper
2013/0304514 A1 11/2013 Hyde et al.
2013/0304651 A1 11/2013 Smith et al.
2013/0307771 A1 11/2013 Parker et al.
2013/0312087 A1 11/2013 Latzina
2013/0332172 A1 12/2013 Prakash et al.
2013/0332358 A1 12/2013 Zhao
2013/0332364 A1 12/2013 Templeton et al.
2013/0333006 A1 12/2013 Tapling et al.
2013/0336527 A1 12/2013 Nechyba et al.
2013/0336545 A1 12/2013 Pritikin et al.
2013/0342672 A1 12/2013 Gray et al.
2013/0346273 A1 12/2013 Stockton et al.
2013/0346302 A1 12/2013 Purves et al.
2014/0003677 A1 1/2014 Han et al.
2014/0006155 A1 1/2014 Ramirez et al.
2014/0006285 A1 1/2014 Chi et al.
2014/0013422 A1 1/2014 Janus et al.
2014/0019352 A1 1/2014 Shrivastava
2014/0025513 A1 1/2014 Cooke et al.
2014/0026188 A1 1/2014 Gubler
2014/0040120 A1 2/2014 Cho et al.
2014/0047560 A1 2/2014 Meyer et al.
2014/0056491 A1 2/2014 Knight
2014/0058860 A1 2/2014 Roh et al.
2014/0058935 A1 2/2014 Mijares
2014/0058939 A1 2/2014 Savla
2014/0058941 A1 2/2014 Moon et al.
2014/0062853 A1 3/2014 Chaudhri et al.
2014/0068740 A1 3/2014 Lecun et al.
2014/0068751 A1 3/2014 Last
2014/0070957 A1 3/2014 Longinotti-buitoni et al.
2014/0074635 A1 3/2014 Reese et al.
2014/0074716 A1 3/2014 Ni
2014/0085191 A1 3/2014 Gonion et al.
2014/0085460 A1 3/2014 Park et al.
2014/0094143 A1 4/2014 Ayotte
2014/0100952 A1 4/2014 Bart et al.
2014/0101056 A1 4/2014 Wendling
2014/0104178 A1 4/2014 Jo
2014/0109018 A1 4/2014 Casey et al.
2014/0111420 A1 4/2014 Ahn et al.
2014/0112555 A1 4/2014 Fadell et al.
2014/0114856 A1 4/2014 Jung et al.
2014/0115695 A1 4/2014 Fadell et al.
2014/0118519 A1 5/2014 Sahin
2014/0119620 A1 5/2014 Jung et al.
2014/0122331 A1 5/2014 Vaish et al.
2014/0123275 A1 5/2014 Azar et al.
2014/0128035 A1 5/2014 Sweeney
2014/0129435 A1 5/2014 Pardo et al.
2014/0129441 A1 5/2014 Blanco et al.
2014/0135631 A1 5/2014 Brumback et al.
2014/0143145 A1 5/2014 Kortina et al.
2014/0143693 A1 5/2014 Goossens et al.
2014/0155031 A1 6/2014 Lee et al.
2014/0157153 A1 6/2014 Yuen et al.
2014/0164082 A1 6/2014 Sun et al.
2014/0165000 A1 6/2014 Fleizach et al.
2014/0173450 A1 6/2014 Akula
2014/0187163 A1 7/2014 Fujita
2014/0188673 A1 7/2014 Graham et al.
2014/0189829 A1 7/2014 Mclachlan et al.
2014/0193783 A1 7/2014 Jeong et al.
2014/0205161 A1 7/2014 Salatino et al.
2014/0222436 A1 8/2014 Binder et al.
2014/0222664 A1 8/2014 Milne
2014/0226131 A1 8/2014 Lopez et al.
2014/0244365 A1 8/2014 Price et al.
2014/0244493 A1 8/2014 Kenyon et al.
2014/0247229 A1 9/2014 Cho et al.
2014/0254891 A1 9/2014 Lee et al.
2014/0257871 A1 9/2014 Christensen et al.
2014/0258292 A1 9/2014 Thramann et al.
2014/0258828 A1 9/2014 Lymer et al.

(56) References Cited

U.S. PATENT DOCUMENTS

2014/0270374 A1 9/2014 Unzueta
2014/0279442 A1 9/2014 Luoma et al.
2014/0279497 A1 9/2014 Qaim-Maqami et al.
2014/0279556 A1 9/2014 Priebatsch et al.
2014/0283018 A1 9/2014 Dadu et al.
2014/0283128 A1 9/2014 Shepherd et al.
2014/0292641 A1 10/2014 Cho et al.
2014/0293079 A1 10/2014 Milanfar et al.
2014/0298432 A1 10/2014 Brown
2014/0304809 A1 10/2014 Fadell et al.
2014/0311447 A1 10/2014 Surnilla et al.
2014/0313307 A1 10/2014 Oh et al.
2014/0330560 A1 11/2014 Venkatesha et al.
2014/0337175 A1 11/2014 Katzin et al.
2014/0337221 A1 11/2014 Hoyos
2014/0337621 A1 11/2014 Nakhimov
2014/0337634 A1 11/2014 Johnson et al.
2014/0337931 A1 11/2014 Cotterill
2014/0344896 A1 11/2014 Pak et al.
2014/0344904 A1 11/2014 Venkataramani et al.
2014/0350924 A1 11/2014 Zurek et al.
2014/0354401 A1 12/2014 Soni et al.
2014/0354538 A1 12/2014 Lee et al.
2014/0359140 A1 12/2014 Shankarraman
2014/0359454 A1 12/2014 Lee et al.
2014/0365904 A1 12/2014 Kim et al.
2014/0366159 A1 12/2014 Cohen
2014/0375835 A1 12/2014 Bos
2014/0380465 A1 12/2014 Fadell et al.
2015/0002696 A1 1/2015 He et al.
2015/0006207 A1 1/2015 Jarvis et al.
2015/0020081 A1 1/2015 Cho et al.
2015/0033364 A1 1/2015 Wong
2015/0043790 A1 2/2015 Ono et al.
2015/0044965 A1 2/2015 Kurimoto et al.
2015/0049014 A1 2/2015 Saito
2015/0051846 A1 2/2015 Masuya
2015/0051913 A1 2/2015 Choi
2015/0054764 A1 2/2015 Kim et al.
2015/0058146 A1 2/2015 Aissi et al.
2015/0074418 A1 3/2015 Lee et al.
2015/0074615 A1 3/2015 Han et al.
2015/0095175 A1 4/2015 Dua
2015/0109191 A1 4/2015 Johnson et al.
2015/0111559 A1 4/2015 Leaver et al.
2015/0121251 A1 4/2015 Siddhartha et al.
2015/0124053 A1 5/2015 Tamura et al.
2015/0127539 A1 5/2015 Ye et al.
2015/0130716 A1 5/2015 Sridharan et al.
2015/0135282 A1 5/2015 Kong et al.
2015/0146945 A1 5/2015 Han
2015/0154001 A1 6/2015 Knox et al.
2015/0154589 A1 6/2015 Li
2015/0179008 A1 6/2015 Sung et al.
2015/0186152 A1 7/2015 Jothiswaran et al.
2015/0186860 A1 7/2015 Rangarajan
2015/0187019 A1 7/2015 Fernandes et al.
2015/0195277 A1 7/2015 Faaborg et al.
2015/0205353 A1 7/2015 Feng et al.
2015/0208244 A1 7/2015 Nakao
2015/0212681 A1 7/2015 Shinozaki et al.
2015/0213244 A1 7/2015 Lymberopoulos et al.
2015/0215128 A1 7/2015 Pal
2015/0220924 A1 8/2015 Bakker
2015/0235018 A1 8/2015 Gupta et al.
2015/0235055 A1 8/2015 An et al.
2015/0235098 A1 8/2015 Lee et al.
2015/0242611 A1 8/2015 Cotterill
2015/0245159 A1 8/2015 Osman
2015/0249540 A1 9/2015 Khalil et al.
2015/0254661 A1 9/2015 Lanc
2015/0257004 A1 9/2015 Shanmugam et al.
2015/0261292 A1 9/2015 Conzola et al.
2015/0261387 A1 9/2015 Petersen et al.
2015/0271175 A1 9/2015 Je et al.
2015/0295921 A1 10/2015 Cao
2015/0304330 A1 10/2015 Soamboonsrup et al.
2015/0310259 A1 10/2015 Lau et al.
2015/0324113 A1 11/2015 Kapp et al.
2015/0334567 A1 11/2015 Chen et al.
2015/0339652 A1 11/2015 Park et al.
2015/0341717 A1* 11/2015 Song ........................ G10L 17/22 381/110
2015/0346845 A1 12/2015 Di Censo et al.
2015/0347738 A1 12/2015 Ulrich et al.
2015/0348001 A1 12/2015 Van Os et al.
2015/0348002 A1 12/2015 Van et al.
2015/0348014 A1 12/2015 Van Os et al.
2015/0348018 A1 12/2015 Campos et al.
2015/0348029 A1 12/2015 Van Os et al.
2015/0349959 A1 12/2015 Marciniak
2015/0362977 A1* 12/2015 Doniwa .............. H04L 63/0861 713/324
2015/0363587 A1 12/2015 Ahn et al.
2015/0363632 A1 12/2015 Ahn et al.
2015/0365400 A1 12/2015 Cox
2015/0370323 A1 12/2015 Cieplinski et al.
2015/0379252 A1 12/2015 Tang et al.
2016/0005024 A1 1/2016 Harrell
2016/0006745 A1 1/2016 Furuichi et al.
2016/0019536 A1 1/2016 Ortiz et al.
2016/0025993 A1* 1/2016 Mor ................... G02B 27/1093 438/27
2016/0026779 A1 1/2016 Grigg et al.
2016/0036965 A1 2/2016 Kim
2016/0037345 A1 2/2016 Margadoudakis
2016/0042166 A1 2/2016 Kang et al.
2016/0047666 A1 2/2016 Fuchs
2016/0048666 A1 2/2016 Dey et al.
2016/0048705 A1 2/2016 Yang
2016/0050199 A1 2/2016 Ganesan
2016/0055324 A1 2/2016 Agarwal
2016/0063235 A1 3/2016 Tussy
2016/0063298 A1 3/2016 Tuneld et al.
2016/0063828 A1 3/2016 Verweij et al.
2016/0063850 A1 3/2016 Yang et al.
2016/0078281 A1 3/2016 Gongaware et al.
2016/0092665 A1 3/2016 Cowan et al.
2016/0094705 A1 3/2016 Vendrow
2016/0100156 A1 4/2016 Zhou et al.
2016/0104034 A1 4/2016 Wilder et al.
2016/0117681 A1 4/2016 Jiao et al.
2016/0127641 A1 5/2016 Gove
2016/0132840 A1 5/2016 Bowles et al.
2016/0134488 A1 5/2016 Straub et al.
2016/0147987 A1 5/2016 Jang et al.
2016/0148042 A1 5/2016 Gonion et al.
2016/0148384 A1 5/2016 Bud et al.
2016/0154956 A1 6/2016 Fadell et al.
2016/0165205 A1 6/2016 Liu et al.
2016/0171192 A1 6/2016 Holz et al.
2016/0188860 A1 6/2016 Lee et al.
2016/0189451 A1 6/2016 Yoo et al.
2016/0191506 A1 6/2016 Wang
2016/0192324 A1 6/2016 Zhang et al.
2016/0217310 A1 7/2016 Shah et al.
2016/0224966 A1 8/2016 Van Os et al.
2016/0224973 A1 8/2016 Van Os et al.
2016/0226713 A1 8/2016 Pitschel et al.
2016/0232513 A1 8/2016 Purves et al.
2016/0234023 A1 8/2016 Mozer et al.
2016/0239701 A1 8/2016 Lee et al.
2016/0241543 A1 8/2016 Jung et al.
2016/0253665 A1 9/2016 Van Os et al.
2016/0259936 A1 9/2016 Mukherjee et al.
2016/0261581 A1 9/2016 Wang et al.
2016/0267779 A1 9/2016 Kuang
2016/0275281 A1 9/2016 Ranjit et al.
2016/0277396 A1 9/2016 Gardiner et al.
2016/0284123 A1 9/2016 Hare et al.
2016/0292525 A1 10/2016 Aoki
2016/0294557 A1 10/2016 Baldwin et al.
2016/0294837 A1* 10/2016 Turgeman ............. G06F 21/316
2016/0300100 A1 10/2016 Shen et al.

(56) References Cited

U.S. PATENT DOCUMENTS

2016/0308859 A1 10/2016 Barry et al.
2016/0314290 A1 10/2016 Baca et al.
2016/0320838 A1 11/2016 Teller et al.
2016/0332025 A1 11/2016 Repka
2016/0335495 A1 11/2016 Kim et al.
2016/0342832 A1 11/2016 Newell et al.
2016/0345172 A1 11/2016 Cotterill
2016/0358180 A1 12/2016 Van Os et al.
2016/0364561 A1 12/2016 Lee et al.
2016/0364591 A1 12/2016 El-Khoury et al.
2016/0364600 A1 12/2016 Shah et al.
2016/0371438 A1 12/2016 Annulis
2016/0378961 A1 12/2016 Park
2016/0378966 A1 12/2016 Alten
2017/0004828 A1 1/2017 Lee et al.
2017/0017834 A1 1/2017 Sabitov et al.
2017/0032168 A1* 2/2017 Kim .................... H04L 63/0861
2017/0032375 A1 2/2017 Van Os et al.
2017/0039358 A1* 2/2017 Yuen ........................ A61B 5/11
2017/0039567 A1 2/2017 Stern et al.
2017/0046507 A1 2/2017 Archer et al.
2017/0046508 A1 2/2017 Shin et al.
2017/0054731 A1 2/2017 Cotterill
2017/0063851 A1 3/2017 Kim et al.
2017/0063852 A1 3/2017 Azar et al.
2017/0070680 A1 3/2017 Kobayashi
2017/0076132 A1 3/2017 Sezan et al.
2017/0102916 A1 4/2017 Noble et al.
2017/0124328 A1 5/2017 Krishnapura
2017/0140644 A1 5/2017 Hwang et al.
2017/0142584 A1 5/2017 Oh et al.
2017/0147681 A1 5/2017 Tankersley et al.
2017/0147802 A1 5/2017 Li
2017/0148010 A1 5/2017 Bak et al.
2017/0161750 A1 6/2017 Yao et al.
2017/0163588 A1 6/2017 Devasthali et al.
2017/0169202 A1 6/2017 Duggan et al.
2017/0169204 A1 6/2017 Fadell et al.
2017/0169287 A1 6/2017 Tokunaga et al.
2017/0180637 A1 6/2017 Lautenbach et al.
2017/0185760 A1 6/2017 Wilder
2017/0193214 A1 7/2017 Shim et al.
2017/0193314 A1 7/2017 Kim et al.
2017/0199997 A1 7/2017 Fadell et al.
2017/0213211 A1 7/2017 Sibert et al.
2017/0235361 A1 8/2017 Rigazio et al.
2017/0235926 A1 8/2017 Fyke et al.
2017/0244703 A1 8/2017 Lee et al.
2017/0264608 A1 9/2017 Moore et al.
2017/0269792 A1 9/2017 Xu et al.
2017/0286656 A1 10/2017 Kohli
2017/0300897 A1 10/2017 Ferenczi et al.
2017/0318019 A1 11/2017 Gordon et al.
2017/0323141 A1 11/2017 Lee et al.
2017/0329949 A1 11/2017 Civelli
2017/0332035 A1 11/2017 Shah et al.
2017/0339151 A1 11/2017 Van Os et al.
2017/0344251 A1 11/2017 Hajimusa et al.
2017/0357320 A1 12/2017 Chaudhri et al.
2017/0357788 A1* 12/2017 Ledvina .................. G06F 21/88
2018/0004924 A1 1/2018 Tieu
2018/0018514 A1 1/2018 Azam et al.
2018/0021954 A1 1/2018 Fischer et al.
2018/0063249 A1 3/2018 Nguyen
2018/0075439 A1 3/2018 Bak et al.
2018/0088787 A1 3/2018 Bereza et al.
2018/0096690 A1 4/2018 Mixter et al.
2018/0109629 A1 4/2018 Van Os et al.
2018/0117944 A1 5/2018 Lee
2018/0131721 A1 5/2018 Jones et al.
2018/0144178 A1 5/2018 Han et al.
2018/0150627 A1 5/2018 Rodefer
2018/0158066 A1 6/2018 Van Os et al.
2018/0173928 A1 6/2018 Han et al.
2018/0173929 A1 6/2018 Han et al.
2018/0173930 A1 6/2018 Han et al.
2018/0181201 A1 6/2018 Grant et al.
2018/0181737 A1 6/2018 Tussy
2018/0211093 A1 7/2018 Bae et al.
2018/0233139 A1 8/2018 Finkelstein et al.
2018/0247065 A1 8/2018 Rhee et al.
2018/0262834 A1 9/2018 Cho et al.
2018/0268747 A1 9/2018 Braun
2018/0276673 A1 9/2018 Van Os et al.
2018/0302790 A1 10/2018 Cotterill
2018/0321826 A1 11/2018 Bereza et al.
2018/0357631 A1 12/2018 Bak et al.
2018/0365898 A1 12/2018 Costa
2019/0020483 A1 1/2019 Meng
2019/0050867 A1 2/2019 Van Os et al.
2019/0053739 A1* 2/2019 Inoue ..................... G06Q 40/02
2019/0080066 A1 3/2019 Van Os et al.
2019/0080070 A1 3/2019 Van Os et al.
2019/0080071 A1 3/2019 Van Os et al.
2019/0080072 A1 3/2019 Van Os et al.
2019/0080189 A1 3/2019 Van Os et al.
2019/0124510 A1 4/2019 Cotterill
2019/0156607 A1 5/2019 Tao et al.
2019/0164134 A1 5/2019 Morrow et al.
2019/0180088 A1 6/2019 Norimatsu
2019/0220647 A1 7/2019 Han et al.
2019/0228140 A1 7/2019 Arroyo et al.
2019/0243957 A1 8/2019 Fadell et al.
2019/0276051 A1 9/2019 Marti et al.
2019/0278900 A1 9/2019 Yang et al.
2019/0289079 A1 9/2019 Van Os et al.
2019/0333508 A1 10/2019 Rao et al.
2019/0347389 A1 11/2019 Kawakita et al.
2019/0347391 A1 11/2019 Kim et al.
2019/0364020 A1 11/2019 Wardell et al.
2019/0370448 A1 12/2019 Devine et al.
2019/0370583 A1 12/2019 Van Os et al.
2019/0392129 A1 12/2019 Tsai et al.
2019/0394649 A1* 12/2019 Ledvina ................ H04W 12/06
2020/0042685 A1 2/2020 Tussy et al.
2020/0065821 A1 2/2020 Van Os et al.
2020/0103963 A1 4/2020 Kelly et al.
2020/0104620 A1 4/2020 Cohen et al.
2020/0120503 A1 4/2020 Cotterill
2020/0142484 A1 5/2020 Maalouf et al.
2020/0159609 A1 5/2020 Korotaev et al.
2020/0234027 A1 7/2020 Han et al.
2020/0280446 A1 9/2020 Matsumoto
2020/0286472 A1 9/2020 Newendorp et al.
2020/0311509 A1 10/2020 Benkley et al.
2020/0356761 A1 11/2020 Gonion et al.
2020/0366742 A1 11/2020 Van Os et al.
2020/0367827 A1* 11/2020 Min .......................... G06F 3/01
2020/0372514 A1 11/2020 Van Os et al.
2020/0401686 A1 12/2020 Duchastel
2021/0012776 A1 1/2021 Peterson et al.
2021/0014070 A1 1/2021 Gopalakrishnan et al.
2021/0042549 A1 2/2021 Van Os et al.
2021/0048883 A1 2/2021 Kelly et al.
2021/0073823 A1 3/2021 Van Os
2021/0092128 A1 3/2021 Leblang et al.
2021/0105277 A1 4/2021 Epstein et al.
2021/0192530 A1 6/2021 Van Os et al.
2021/0203506 A1 7/2021 Edwards et al.
2021/0210100 A1 7/2021 Wang et al.
2022/0012323 A1 1/2022 Moriwaki et al.
2022/0027446 A1 1/2022 Van Os et al.
2022/0058257 A1 2/2022 Cotterill
2022/0067133 A1 3/2022 Fadell et al.
2022/0100841 A1 3/2022 Yang et al.
2022/0124254 A1 4/2022 Dellinger et al.
2022/0180667 A1 6/2022 Cohen et al.
2022/0229895 A1 7/2022 Ranjan et al.
2022/0244838 A1 8/2022 Bereza et al.
2022/0277063 A1 9/2022 Arroyo et al.
2022/0284084 A1 9/2022 Deng
2022/0342972 A1 10/2022 Van Os et al.
2022/0351549 A1 11/2022 Van Os et al.
2022/0375553 A1 11/2022 Lasko et al.

(56) References Cited

U.S. PATENT DOCUMENTS

| | | | |
|---|---|---|---|
| 2022/0382839 | A1 | 12/2022 | Vargas et al. |
| 2022/0392446 | A1 | 12/2022 | Webber et al. |
| 2023/0019250 | A1 | 1/2023 | Lee et al. |
| 2023/0021247 | A1 | 1/2023 | Han et al. |
| 2023/0089689 | A1 | 3/2023 | Pons Bordes et al. |
| 2023/0185373 | A1 | 6/2023 | Kelly et al. |
| 2023/0214466 | A1 | 7/2023 | Fadell et al. |
| 2023/0252779 | A1 | 8/2023 | Gonion et al. |
| 2023/0259598 | A1 | 8/2023 | Arroyo et al. |
| 2023/0364936 | A1 | 11/2023 | Antonakis |
| 2023/0401032 | A1 | 12/2023 | Cohen et al. |
| 2023/0409160 | A1 | 12/2023 | Han et al. |
| 2024/0184869 | A1 | 6/2024 | Van Os et al. |
| 2024/0221746 | A1 | 7/2024 | Webber et al. |

FOREIGN PATENT DOCUMENTS

| | | | |
|---|---|---|---|
| AU | 2017100556 | A4 | 6/2017 |
| CA | 2949642 | A1 | 6/2017 |
| CN | 1163669 | A | 10/1997 |
| CN | 1183475 | A | 6/1998 |
| CN | 1220433 | A | 6/1999 |
| CN | 1335557 | A | 2/2002 |
| CN | 1452739 | A | 10/2003 |
| CN | 1484425 | A | 3/2004 |
| CN | 1183475 | C | 1/2005 |
| CN | 1592914 | A | 3/2005 |
| CN | 1663174 | A | 8/2005 |
| CN | 1685357 | A | 10/2005 |
| CN | 1695163 | A | 11/2005 |
| CN | 1741104 | A | 3/2006 |
| CN | 1742252 | A | 3/2006 |
| CN | 1801708 | A | 7/2006 |
| CN | 1836397 | A | 9/2006 |
| CN | 1846221 | A | 10/2006 |
| CN | 1908981 | A | 2/2007 |
| CN | 1960546 | A | 5/2007 |
| CN | 101005681 | A | 7/2007 |
| CN | 101035335 | A | 9/2007 |
| CN | 101039184 | A | 9/2007 |
| CN | 101080737 | A | 11/2007 |
| CN | 101171604 | A | 4/2008 |
| CN | 101226616 | A | 7/2008 |
| CN | 101227359 | A | 7/2008 |
| CN | 101268470 | A | 9/2008 |
| CN | 101299694 | A | 11/2008 |
| CN | 101341718 | A | 1/2009 |
| CN | 101341727 | A | 1/2009 |
| CN | 101352042 | A | 1/2009 |
| CN | 101454795 | A | 6/2009 |
| CN | 101485128 | A | 7/2009 |
| CN | 101567071 | A | 10/2009 |
| CN | 101610155 | A | 12/2009 |
| CN | 101656548 | A | 2/2010 |
| CN | 101719955 | A | 6/2010 |
| CN | 101730907 | A | 6/2010 |
| CN | 101788880 | A | 7/2010 |
| CN | 101816165 | A | 8/2010 |
| CN | 101833651 | A | 9/2010 |
| CN | 101847139 | A | 9/2010 |
| CN | 101960896 | A | 1/2011 |
| CN | 102004908 | A | 4/2011 |
| CN | 102016877 | A | 4/2011 |
| CN | 102065148 | A | 5/2011 |
| CN | 102096546 | A | 6/2011 |
| CN | 102164213 | A | 8/2011 |
| CN | 102202192 | A | 9/2011 |
| CN | 102209321 | A | 10/2011 |
| CN | 102244530 | A | 11/2011 |
| CN | 102265586 | A | 11/2011 |
| CN | 102282578 | A | 12/2011 |
| CN | 102376049 | A | 3/2012 |
| CN | 102394919 | A | 3/2012 |
| CN | 102396205 | A | 3/2012 |
| CN | 102542444 | A | 7/2012 |
| CN | 102591889 | A | 7/2012 |
| CN | 102737313 | A | 10/2012 |
| CN | 102741874 | A | 10/2012 |
| CN | 102750631 | A | 10/2012 |
| CN | 102799983 | A | 11/2012 |
| CN | 102804182 | A | 11/2012 |
| CN | 102822855 | A | 12/2012 |
| CN | 102833423 | A | 12/2012 |
| CN | 102841683 | A | 12/2012 |
| CN | 102859544 | A | 1/2013 |
| CN | 102880959 | A | 1/2013 |
| CN | 202735894 | U | 2/2013 |
| CN | 102984195 | A | 3/2013 |
| CN | 103020807 | A | 4/2013 |
| CN | 103077463 | A | 5/2013 |
| CN | 103092503 | A | 5/2013 |
| CN | 103106576 | A | 5/2013 |
| CN | 103188280 | A | 7/2013 |
| CN | 103209642 | A | 7/2013 |
| CN | 103229206 | A | 7/2013 |
| CN | 103257826 | A | 8/2013 |
| CN | 103262108 | A | 8/2013 |
| CN | 103294171 | A | 9/2013 |
| CN | 103324909 | A | 9/2013 |
| CN | 203179000 | U | 9/2013 |
| CN | 103346957 | A | 10/2013 |
| CN | 103413218 | A | 11/2013 |
| CN | 203299885 | U | 11/2013 |
| CN | 103455913 | A | 12/2013 |
| CN | 103489095 | A | 1/2014 |
| CN | 103501304 | A | 1/2014 |
| CN | 103577982 | A | 2/2014 |
| CN | 103635920 | A | 3/2014 |
| CN | 103701605 | A | 4/2014 |
| CN | 103763327 | A | 4/2014 |
| CN | 103765861 | A | 4/2014 |
| CN | 103778533 | A | 5/2014 |
| CN | 103853328 | A | 6/2014 |
| CN | 104252675 | A | 12/2014 |
| CN | 104321778 | A | 1/2015 |
| CN | 104361302 | A | 2/2015 |
| CN | 104539924 | A | 4/2015 |
| CN | 104732396 | A | 6/2015 |
| CN | 104753766 | A | 7/2015 |
| CN | 104935497 | A | 9/2015 |
| CN | 105051651 | A | 11/2015 |
| CN | 105093526 | A | 11/2015 |
| CN | 105099861 | A | 11/2015 |
| CN | 105100123 | A | 11/2015 |
| CN | 105389491 | A | 3/2016 |
| CN | 105391843 | A | 3/2016 |
| CN | 105703909 | A | 6/2016 |
| CN | 105827624 | A | 8/2016 |
| CN | 105844101 | A | 8/2016 |
| CN | 105844462 | A | 8/2016 |
| CN | 105868613 | A | 8/2016 |
| CN | 105874405 | A | 8/2016 |
| CN | 105893814 | A | 8/2016 |
| CN | 106020436 | A | 10/2016 |
| CN | 106095247 | A | 11/2016 |
| CN | 106156566 | A | 11/2016 |
| CN | 106164934 | A | 11/2016 |
| CN | 106355058 | A | 1/2017 |
| CN | 106462383 | A | 2/2017 |
| CN | 106485123 | A | 3/2017 |
| CN | 106487754 | A | 3/2017 |
| CN | 106503514 | A | 3/2017 |
| CN | 106533918 | A | 3/2017 |
| CN | 106575332 | A | 4/2017 |
| CN | 106778222 | A | 5/2017 |
| CN | 106895554 | A | 6/2017 |
| CN | 106961415 | A | 7/2017 |
| CN | 107797657 | A | 3/2018 |
| CN | 107870690 | A | 4/2018 |
| CN | 108574773 | A | 9/2018 |
| CN | 109769397 | A | 5/2019 |
| DE | 10153591 | A1 | 5/2003 |
| EP | 0593386 | A2 | 4/1994 |
| EP | 0923018 | A2 | 6/1999 |

(56) References Cited

FOREIGN PATENT DOCUMENTS

| | | | |
|---|---|---|---|
| EP | 1229496 | A2 | 8/2002 |
| EP | 1422589 | A1 | 5/2004 |
| EP | 1599862 | A2 | 11/2005 |
| EP | 1626330 | A1 | 2/2006 |
| EP | 1645989 | A2 | 4/2006 |
| EP | 1736908 | A2 | 12/2006 |
| EP | 1835697 | A2 | 9/2007 |
| EP | 2173298 | A1 | 4/2010 |
| EP | 2180665 | A1 | 4/2010 |
| EP | 1835697 | A3 | 6/2010 |
| EP | 2224348 | A1 | 9/2010 |
| EP | 2309410 | A1 | 4/2011 |
| EP | 1626330 | A4 | 1/2012 |
| EP | 2568693 | A2 | 3/2013 |
| EP | 2632193 | A2 | 8/2013 |
| EP | 2674889 | A2 | 12/2013 |
| EP | 2713298 | A1 | 4/2014 |
| EP | 2725521 | A2 | 4/2014 |
| EP | 2725537 | A1 | 4/2014 |
| EP | 2741175 | A2 | 6/2014 |
| EP | 2762997 | A2 | 8/2014 |
| EP | 2960822 | A1 | 12/2015 |
| EP | 2981115 | A2 | 2/2016 |
| EP | 2993619 | A1 | 3/2016 |
| EP | 2568693 | A3 | 7/2016 |
| EP | 3057024 | A1 | 8/2016 |
| EP | 3076334 | A1 | 10/2016 |
| EP | 3118761 | A1 | 1/2017 |
| EP | 3190563 | A1 | 7/2017 |
| EP | 2801972 | B1 | 1/2018 |
| EP | 1835697 | B1 | 8/2018 |
| EP | 3373132 | A2 | 9/2018 |
| EP | 2632193 | B1 | 10/2018 |
| EP | 2568693 | B1 | 12/2019 |
| EP | 3633963 | A1 | 4/2020 |
| GB | 2184576 | A | 6/1987 |
| GB | 2312040 | A | 10/1997 |
| GB | 2313460 | A | 11/1997 |
| GB | 2360618 | A | 9/2001 |
| GB | 2466038 | A | 6/2010 |
| GB | 2500321 | A | 9/2013 |
| IN | 201917024374 | A | 9/2020 |
| JP | 4-158434 | A | 6/1992 |
| JP | 6-284182 | A | 10/1994 |
| JP | 7-146942 | A | 6/1995 |
| JP | 7-220008 | A | 8/1995 |
| JP | 9-81309 | A | 3/1997 |
| JP | 9-128208 | A | 5/1997 |
| JP | 9-221950 | A | 8/1997 |
| JP | 9-269930 | A | 10/1997 |
| JP | 10-69346 | A | 3/1998 |
| JP | 10-232934 | A | 9/1998 |
| JP | 10-247936 | A | 9/1998 |
| JP | 10-269358 | A | 10/1998 |
| JP | 11-39385 | A | 2/1999 |
| JP | 11-73530 | A | 3/1999 |
| JP | 11-185016 | A | 7/1999 |
| JP | 11-242745 | A | 9/1999 |
| JP | 2000-259477 | A | 9/2000 |
| JP | 2000-283720 | A | 10/2000 |
| JP | 2000-315118 | A | 11/2000 |
| JP | 2001-92554 | A | 4/2001 |
| JP | 2001-92783 | A | 4/2001 |
| JP | 2001-103046 | A | 4/2001 |
| JP | 2001-155137 | A | 6/2001 |
| JP | 2001-331758 | A | 11/2001 |
| JP | 2002-49570 | A | 2/2002 |
| JP | 2002-99854 | A | 4/2002 |
| JP | 2002-149171 | A | 5/2002 |
| JP | 2002-159052 | A | 5/2002 |
| JP | 2002-515145 | A | 5/2002 |
| JP | 2002-183093 | A | 6/2002 |
| JP | 2002-207525 | A | 7/2002 |
| JP | 2002-222412 | A | 8/2002 |
| JP | 2002-288137 | A | 10/2002 |

| | | | |
|---|---|---|---|
| JP | 2003-16398 | A | 1/2003 |
| JP | 2003-36401 | A | 2/2003 |
| JP | 2003-67343 | A | 3/2003 |
| JP | 2003-141541 | A | 5/2003 |
| JP | 2003-143290 | A | 5/2003 |
| JP | 2003-150550 | A | 5/2003 |
| JP | 2003-178244 | A | 6/2003 |
| JP | 2003-298689 | A | 10/2003 |
| JP | 2003-346059 | A | 12/2003 |
| JP | 2004-86866 | A | 3/2004 |
| JP | 2004-104813 | A | 4/2004 |
| JP | 2004-194069 | A | 7/2004 |
| JP | 2004-252736 | A | 9/2004 |
| JP | 2004-265353 | A | 9/2004 |
| JP | 2004-532477 | A | 10/2004 |
| JP | 2004-310443 | A | 11/2004 |
| JP | 2004-313459 | A | 11/2004 |
| JP | 2004-334788 | A | 11/2004 |
| JP | 2004-348600 | A | 12/2004 |
| JP | 2004-348601 | A | 12/2004 |
| JP | 2004-355088 | A | 12/2004 |
| JP | 2004-356816 | A | 12/2004 |
| JP | 2005-4490 | A | 1/2005 |
| JP | 2005-71225 | A | 3/2005 |
| JP | 2005-84991 | A | 3/2005 |
| JP | 2005-115480 | A | 4/2005 |
| JP | 2005-122700 | A | 5/2005 |
| JP | 2005-143890 | A | 6/2005 |
| JP | 2005-202578 | A | 7/2005 |
| JP | 2005-521961 | A | 7/2005 |
| JP | 2005-523505 | A | 8/2005 |
| JP | 2005-293280 | A | 10/2005 |
| JP | 2005-317049 | A | 11/2005 |
| JP | 2005-327076 | A | 11/2005 |
| JP | 2005-339425 | A | 12/2005 |
| JP | 2006-12080 | A | 1/2006 |
| JP | 2006-18613 | A | 1/2006 |
| JP | 2006-31182 | A | 3/2006 |
| JP | 2006-85559 | A | 3/2006 |
| JP | 2006-93912 | A | 4/2006 |
| JP | 2006-107288 | A | 4/2006 |
| JP | 2006-114018 | A | 4/2006 |
| JP | 2006-115043 | A | 4/2006 |
| JP | 2006-127502 | A | 5/2006 |
| JP | 2006-163960 | A | 6/2006 |
| JP | 2006-172180 | A | 6/2006 |
| JP | 2006-189999 | A | 7/2006 |
| JP | 2006-191245 | A | 7/2006 |
| JP | 2006-197071 | A | 7/2006 |
| JP | 2006-202278 | A | 8/2006 |
| JP | 2006-203858 | A | 8/2006 |
| JP | 2006-212185 | A | 8/2006 |
| JP | 2006-215705 | A | 8/2006 |
| JP | 2006-520053 | A | 8/2006 |
| JP | 2006-259930 | A | 9/2006 |
| JP | 2006-259931 | A | 9/2006 |
| JP | 2006-277670 | A | 10/2006 |
| JP | 2006-303701 | A | 11/2006 |
| JP | 2006-308375 | A | 11/2006 |
| JP | 2007-11667 | A | 1/2007 |
| JP | 2007-34637 | A | 2/2007 |
| JP | 2007-52574 | A | 3/2007 |
| JP | 2007-52770 | A | 3/2007 |
| JP | 2007-58397 | A | 3/2007 |
| JP | 2007-71008 | A | 3/2007 |
| JP | 2007-507011 | A | 3/2007 |
| JP | 2007-102278 | A | 4/2007 |
| JP | 2007-116318 | A | 5/2007 |
| JP | 2007-116602 | A | 5/2007 |
| JP | 2007-128201 | A | 5/2007 |
| JP | 2007-135149 | A | 5/2007 |
| JP | 2007-140696 | A | 6/2007 |
| JP | 2007-141002 | A | 6/2007 |
| JP | 2007-148801 | A | 6/2007 |
| JP | 2007-199984 | A | 8/2007 |
| JP | 2007-226293 | A | 9/2007 |
| JP | 2007-226794 | A | 9/2007 |
| JP | 2007-304854 | A | 11/2007 |
| JP | 2007-334637 | A | 12/2007 |

(56) References Cited

FOREIGN PATENT DOCUMENTS

| | | | |
|---|---|---|---|
| JP | 2008-5180 | A | 1/2008 |
| JP | 2008-15800 | A | 1/2008 |
| JP | 2008-33681 | A | 2/2008 |
| JP | 2008-46692 | A | 2/2008 |
| JP | 2008-70926 | A | 3/2008 |
| JP | 2008-71158 | A | 3/2008 |
| JP | 2008-75424 | A | 4/2008 |
| JP | 2008-250601 | A | 10/2008 |
| JP | 2009-9434 | A | 1/2009 |
| JP | 2009-15543 | A | 1/2009 |
| JP | 2009-42802 | A | 2/2009 |
| JP | 2009-49878 | A | 3/2009 |
| JP | 2009-87156 | A | 4/2009 |
| JP | 2009-99076 | A | 5/2009 |
| JP | 2009-135770 | A | 6/2009 |
| JP | 2009-211166 | A | 9/2009 |
| JP | 2009-240523 | A | 10/2009 |
| JP | 2009-258991 | A | 11/2009 |
| JP | 2010-9513 | A | 1/2010 |
| JP | 2010-15417 | A | 1/2010 |
| JP | 2010-503082 | A | 1/2010 |
| JP | 2010-28404 | A | 2/2010 |
| JP | 2010-102718 | A | 5/2010 |
| JP | 2010-517390 | A | 5/2010 |
| JP | 2010-152506 | A | 7/2010 |
| JP | 2010-165012 | A | 7/2010 |
| JP | 2010-524051 | A | 7/2010 |
| JP | 2010-198341 | A | 9/2010 |
| JP | 2010-211577 | A | 9/2010 |
| JP | 2010-211579 | A | 9/2010 |
| JP | 2010-250386 | A | 11/2010 |
| JP | 2010-271779 | A | 12/2010 |
| JP | 2010-541046 | A | 12/2010 |
| JP | 2011-22687 | A | 2/2011 |
| JP | 2011-53849 | A | 3/2011 |
| JP | 2011-54120 | A | 3/2011 |
| JP | 2011-65590 | A | 3/2011 |
| JP | 2011-97287 | A | 5/2011 |
| JP | 2011-519439 | A | 7/2011 |
| JP | 2011-192228 | A | 9/2011 |
| JP | 2011-209787 | A | 10/2011 |
| JP | 2011-217146 | A | 10/2011 |
| JP | 2011-237857 | A | 11/2011 |
| JP | 2011-242924 | A | 12/2011 |
| JP | 2012-8951 | A | 1/2012 |
| JP | 2012-8985 | A | 1/2012 |
| JP | 2012-504273 | A | 2/2012 |
| JP | 2012-73724 | A | 4/2012 |
| JP | 2012-508930 | A | 4/2012 |
| JP | 2012-99025 | A | 5/2012 |
| JP | 2012-164070 | A | 8/2012 |
| JP | 2012-168802 | A | 9/2012 |
| JP | 2012-194661 | A | 10/2012 |
| JP | 2012-208719 | A | 10/2012 |
| JP | 2012-215981 | A | 11/2012 |
| JP | 2012-529699 | A | 11/2012 |
| JP | 2013-9073 | A | 1/2013 |
| JP | 2013-20496 | A | 1/2013 |
| JP | 2013-30052 | A | 2/2013 |
| JP | 2013-34322 | A | 2/2013 |
| JP | 2013-58828 | A | 3/2013 |
| JP | 2013-88906 | A | 5/2013 |
| JP | 2013-114317 | A | 6/2013 |
| JP | 2013-114498 | A | 6/2013 |
| JP | 2013-140540 | A | 7/2013 |
| JP | 2013-530445 | A | 7/2013 |
| JP | 2013-149206 | A | 8/2013 |
| JP | 2013-533532 | A | 8/2013 |
| JP | 2013-534008 | A | 8/2013 |
| JP | 5267966 | B2 | 8/2013 |
| JP | 2013-178723 | A | 9/2013 |
| JP | 2013-534662 | A | 9/2013 |
| JP | 2013-232197 | A | 11/2013 |
| JP | 2014-44719 | A | 3/2014 |
| JP | 2014-44724 | A | 3/2014 |
| JP | 2014-75155 | A | 4/2014 |
| JP | 2014-102845 | A | 6/2014 |
| JP | 2014-110009 | A | 6/2014 |
| JP | 2014-110638 | A | 6/2014 |
| JP | 2014-131359 | A | 7/2014 |
| JP | 2014-517366 | A | 7/2014 |
| JP | 2014-230061 | A | 12/2014 |
| JP | 2014-239478 | A | 12/2014 |
| JP | 2015-14923 | A | 1/2015 |
| JP | 2015-36925 | A | 2/2015 |
| JP | 2015-56142 | A | 3/2015 |
| JP | 2015-75877 | A | 4/2015 |
| JP | 2015-144026 | A | 8/2015 |
| JP | 2015-187783 | A | 10/2015 |
| JP | 2015-207051 | A | 11/2015 |
| JP | 2016-76799 | A | 5/2016 |
| JP | 2016-508007 | A | 6/2016 |
| JP | 2016-521403 | A | 7/2016 |
| JP | 2016-162000 | A | 9/2016 |
| JP | 2016-534435 | A | 11/2016 |
| JP | 6023162 | B2 | 11/2016 |
| JP | 2016-224960 | A | 12/2016 |
| JP | 2017-16170 | A | 1/2017 |
| JP | 2017-500656 | A | 1/2017 |
| JP | 2017-91129 | A | 5/2017 |
| JP | 2017-102952 | A | 6/2017 |
| JP | 2017-117159 | A | 6/2017 |
| JP | 2017-138846 | A | 8/2017 |
| JP | 2018-36965 | A | 3/2018 |
| JP | 2018-136886 | A | 8/2018 |
| KR | 10-2000-0030544 | A | 6/2000 |
| KR | 10-2001-0019345 | A | 3/2001 |
| KR | 2001-0074059 | A | 8/2001 |
| KR | 2002-0002484 | A | 1/2002 |
| KR | 10-2002-0019031 | A | 3/2002 |
| KR | 10-2002-0022295 | A | 3/2002 |
| KR | 10-2002-0038162 | A | 5/2002 |
| KR | 10-2002-0087665 | A | 11/2002 |
| KR | 10-2004-0005505 | A | 1/2004 |
| KR | 10-2004-0049502 | A | 6/2004 |
| KR | 10-2004-0084994 | A | 10/2004 |
| KR | 10-2005-0061975 | A | 6/2005 |
| KR | 10-2006-0018063 | A | 2/2006 |
| KR | 10-0652624 | B1 | 12/2006 |
| KR | 10-2007-0026808 | A | 3/2007 |
| KR | 10-2007-0044055 | A | 4/2007 |
| KR | 10-2007-0081773 | A | 8/2007 |
| KR | 10-2007-0120125 | A | 12/2007 |
| KR | 10-0805341 | B1 | 2/2008 |
| KR | 10-2008-0064395 | A | 7/2008 |
| KR | 10-2009-0011323 | A | 2/2009 |
| KR | 10-2009-0089472 | A | 8/2009 |
| KR | 10-2010-0074218 | A | 7/2010 |
| KR | 10-2011-0056561 | A | 5/2011 |
| KR | 10-2011-0098435 | | 9/2011 |
| KR | 10-2011-0101683 | A | 9/2011 |
| KR | 10-2011-0114732 | A | 10/2011 |
| KR | 10-2012-0040693 | A | 4/2012 |
| KR | 10-2012-0052150 | | 5/2012 |
| KR | 10-2012-0076675 | | 7/2012 |
| KR | 10-2012-0087333 | A | 8/2012 |
| KR | 10-2012-0127842 | A | 11/2012 |
| KR | 10-2013-0011423 | | 1/2013 |
| KR | 10-2013-0027326 | A | 3/2013 |
| KR | 10-1253392 | B1 | 4/2013 |
| KR | 10-2013-0044292 | A | 5/2013 |
| KR | 10-1312097 | B1 | 9/2013 |
| KR | 10-2013-0116905 | A | 10/2013 |
| KR | 10-1330962 | B1 | 11/2013 |
| KR | 10-1342208 | B1 | 12/2013 |
| KR | 10-2014-0015171 | | 2/2014 |
| KR | 10-2014-0018019 | A | 2/2014 |
| KR | 10-2014-0026263 | A | 3/2014 |
| KR | 10-2014-0055429 | A | 5/2014 |
| KR | 10-2014-0137400 | A | 12/2014 |
| KR | 10-2015-0013264 | A | 2/2015 |
| KR | 10-2015-0029495 | A | 3/2015 |
| KR | 10-2015-0068013 | A | 6/2015 |
| KR | 10-2016-0012636 | A | 2/2016 |

(56) References Cited

FOREIGN PATENT DOCUMENTS

| | | | |
|---|---|---|---|
| KR | 10-2016-0014623 | A | 2/2016 |
| KR | 10-2016-0026337 | A | 3/2016 |
| KR | 10-2016-0026791 | A | 3/2016 |
| KR | 10-2016-0045633 | A | 4/2016 |
| KR | 10-2016-0048215 | A | 5/2016 |
| KR | 10-2016-0054573 | A | 5/2016 |
| KR | 10-2016-0099432 | A | 8/2016 |
| KR | 10-2017-0006592 | A | 1/2017 |
| KR | 10-2017-0023063 | A | 3/2017 |
| KR | 10-2017-0065563 | A | 6/2017 |
| KR | 10-1820573 | B1 | 1/2018 |
| TW | 200529636 | A | 9/2005 |
| TW | 200601176 | A | 1/2006 |
| TW | 200642408 | A | 12/2006 |
| TW | 200919255 | A | 5/2009 |
| TW | 201137722 | A | 11/2011 |
| TW | 201316247 | A | 4/2013 |
| TW | 201324310 | A | 6/2013 |
| TW | 201409345 | A | 3/2014 |
| WO | 1997/41528 | A1 | 11/1997 |
| WO | 1998/58346 | A1 | 12/1998 |
| WO | 1999/28701 | A1 | 6/1999 |
| WO | 1999/44114 | A1 | 9/1999 |
| WO | 00/55812 | A1 | 9/2000 |
| WO | 01/57757 | A1 | 8/2001 |
| WO | 2001/80017 | A1 | 10/2001 |
| WO | 2002/01864 | A1 | 1/2002 |
| WO | 2003/038698 | A1 | 5/2003 |
| WO | 2003/083793 | A2 | 10/2003 |
| WO | 2004/029862 | A1 | 4/2004 |
| WO | 2004/079530 | A2 | 9/2004 |
| WO | 2004/104813 | A1 | 12/2004 |
| WO | 2005/008568 | A1 | 1/2005 |
| WO | 2005/020036 | A2 | 3/2005 |
| WO | 2005/048832 | A1 | 6/2005 |
| WO | 2005/106774 | A2 | 11/2005 |
| WO | 2006/004155 | A1 | 1/2006 |
| WO | 2006/051462 | A1 | 5/2006 |
| WO | 2006/113834 | A2 | 10/2006 |
| WO | 2007/029710 | A1 | 3/2007 |
| WO | 2007/060102 | A1 | 5/2007 |
| WO | 2007/070014 | A1 | 6/2007 |
| WO | 2007/072447 | A2 | 6/2007 |
| WO | 2007/073422 | A1 | 6/2007 |
| WO | 2007/076210 | A1 | 7/2007 |
| WO | 2007/116521 | A1 | 10/2007 |
| WO | 2008/008101 | A2 | 1/2008 |
| WO | 2008/024454 | A1 | 2/2008 |
| WO | 2008/147457 | A1 | 12/2008 |
| WO | 2008/151229 | A1 | 12/2008 |
| WO | 2009/042392 | A2 | 4/2009 |
| WO | 2009/045335 | A2 | 4/2009 |
| WO | 2009/108645 | A1 | 9/2009 |
| WO | 2010/039337 | A2 | 4/2010 |
| WO | 2010/056484 | A2 | 5/2010 |
| WO | 2010/059306 | A2 | 5/2010 |
| WO | 2010/086993 | A1 | 8/2010 |
| WO | 2010/120972 | A1 | 10/2010 |
| WO | 2010/128442 | A2 | 11/2010 |
| WO | 2011/119407 | A1 | 9/2011 |
| WO | 2011/130422 | A2 | 10/2011 |
| WO | 2012/068193 | A2 | 5/2012 |
| WO | 2012/083113 | A2 | 6/2012 |
| WO | 2012/128750 | A1 | 9/2012 |
| WO | 2012/129231 | A1 | 9/2012 |
| WO | 2013/000150 | A1 | 1/2013 |
| WO | 2013/003372 | A1 | 1/2013 |
| WO | 2013/023224 | A2 | 2/2013 |
| WO | 2013/052081 | A2 | 4/2013 |
| WO | 2013/066659 | A1 | 5/2013 |
| WO | 2013/096943 | A1 | 6/2013 |
| WO | 2013/096949 | A1 | 6/2013 |
| WO | 2013/097882 | A1 | 7/2013 |
| WO | 2013/125222 | A1 | 8/2013 |
| WO | 2013/137503 | A1 | 9/2013 |
| WO | 2013/169849 | A2 | 11/2013 |
| WO | 2013/169877 | A2 | 11/2013 |
| WO | 2013/173838 | A2 | 11/2013 |
| WO | 2013/177500 | A1 | 11/2013 |
| WO | 2013/177548 | A1 | 11/2013 |
| WO | 2013/181102 | A1 | 12/2013 |
| WO | 2014/004556 | A1 | 1/2014 |
| WO | 2014/012456 | A1 | 1/2014 |
| WO | 2014/057795 | A1 | 4/2014 |
| WO | 2014/078965 | A1 | 5/2014 |
| WO | 2014/105274 | A1 | 7/2014 |
| WO | 2014/115605 | A1 | 7/2014 |
| WO | 2014105276 | A1 | 7/2014 |
| WO | 2014/124332 | A2 | 8/2014 |
| WO | 2014/147297 | A1 | 9/2014 |
| WO | 2014/193465 | A1 | 12/2014 |
| WO | 2015/057320 | A1 | 4/2015 |
| WO | 2015/062382 | A1 | 5/2015 |
| WO | 2015/069153 | A1 | 5/2015 |
| WO | 2015/088141 | A1 | 6/2015 |
| WO | 2015/119605 | A1 | 8/2015 |
| WO | 2015/120019 | A1 | 8/2015 |
| WO | 2015/195216 | A1 | 12/2015 |
| WO | 2015/196448 | A1 | 12/2015 |
| WO | 2016/025036 | A1 | 2/2016 |
| WO | 2016/029853 | A1 | 3/2016 |
| WO | 2016/036218 | A1 | 3/2016 |
| WO | 2016/049439 | A1 | 3/2016 |
| WO | 2016/111808 | A1 | 7/2016 |
| WO | 2016/123309 | A1 | 8/2016 |
| WO | 2016/126374 | A1 | 8/2016 |
| WO | 2016/189390 | A2 | 12/2016 |
| WO | 2016/196054 | A1 | 12/2016 |
| WO | 2016/201037 | A1 | 12/2016 |
| WO | 2017/012302 | A1 | 1/2017 |
| WO | 2017/030223 | A1 | 2/2017 |
| WO | 2017/043314 | A1 | 3/2017 |
| WO | 2017/094052 | A1 | 6/2017 |
| WO | 2017/218094 | A1 | 12/2017 |
| WO | 2018/048632 | A1 | 3/2018 |
| WO | 2018/212801 | A1 | 11/2018 |
| WO | 2018/226265 | A1 | 12/2018 |
| WO | 2019/033129 | A2 | 2/2019 |
| WO | 2021/216044 | A1 | 10/2021 |

OTHER PUBLICATIONS

Corrected Notice of Allowance received for U.S. Appl. No. 16/369,473, mailed on Sep. 9, 2022, 2 pages.

Decision to Refuse received for European Patent Application No. 17799904.2, mailed on Sep. 19, 2022, 4 pages.

Decision to Refuse received for European Patent Application No. 19150528.8, mailed on Sep. 9, 2022, 4 pages.

Intention to Grant received for European Patent Application No. 20186286.9, mailed on Sep. 15, 2022, 9 pages.

Non-Final Office Action received for U.S. Appl. No. 16/938,362, mailed on Sep. 14, 2022, 14 pages.

Non-Final Office Action received for U.S. Appl. No. 17/409,570, mailed on Sep. 21, 2022, 35 pages.

Notice of Allowance received for Japanese Patent Application No. 2021-001028, mailed on Sep. 9, 2022, 4 pages (1 page of English Translation and 3 pages of Official Copy).

Office Action received for Australian Patent Application No. 2021250944, mailed on Sep. 16, 2022, 3 pages.

Office Action received for Japanese Patent Application No. 2021-131310, mailed on Sep. 2, 2022, 9 pages (5 pages of English Translation and 4 pages of Official Copy).

Summons to Attend Oral Proceedings received for European Patent Application No. 15727291.5, mailed on Sep. 12, 2022, 13 pages.

Summons to Attend Oral Proceedings received for European Patent Application No. 16201195.1, mailed on Sep. 12, 2022, 14 pages.

Extended European Search Report received for European Patent Application No. 22197755.6, mailed on Feb. 20, 2023, 8 pages.

Extended European Search Report received for European Patent Application No. 22212086.7, mailed on Feb. 21, 2023, 10 pages.

(56) References Cited

OTHER PUBLICATIONS

Intention to Grant received for European Patent Application No. 21166287.9, mailed on Feb. 23, 2023, 9 pages.
Non-Final Office Action received for U.S. Appl. No. 17/955,311, mailed on Mar. 15, 2023, 6 pages.
Notice of Acceptance received for Australian Patent Application No. 2019268070, mailed on Feb. 27, 2023, 3 pages.
Notice of Allowance received for U.S. Appl. No. 17/519,025, mailed on Mar. 2, 2023, 8 pages.
Office Action received for European Patent Application No. 21166718.3, mailed on Feb. 20, 2023, 7 pages.
Office Action received for Korean Patent Application No. 10-2021-7010306, mailed on Feb. 15, 2023, 10 pages (5 pages of English Translation and 5 pages of Official Copy).
Pre-Appeal Review Report received for Japanese Patent Application No. 2020-566978, mailed on Feb. 21, 2023, 4 pages (2 pages of English Translation and 2 pages of Official Copy).
Decision to Refuse received for Japanese Patent Application No. 2022-151495, mailed on Jan. 12, 2024, 14 pages (7 pages of English Translation and 7 pages of Official Copy).
Final Office Action received for U.S. Appl. No. 17/479,974, mailed on Jan. 19, 2024, 16 pages.
Final Office Action received for U.S. Appl. No. 17/900,734, mailed on Jan. 19, 2024, 11 pages.
Notice of Allowance received for Japanese Patent Application No. 2022-100394, mailed on Jan. 12, 2024, 4 pages (1 page of English Translation and 3 pages of Official Copy).
Office Action received for Australian Patent Application No. 2023200797, mailed on Jan. 23, 2024, 5 pages.
Supplemental Notice of Allowance received for U.S. Appl. No. 17/486,670, mailed on Jan. 18, 2024, 9 pages.
Supplemental Notice of Allowance received for U.S. Appl. No. 17/496,716, mailed on Feb. 1, 2024, 2 pages.
amazon.com, "Visual ID on Echo Show", Online Available at: <https://www.amazon.com/b?ie=UTF8&node=23615589011>, retrieved on Aug. 16, 2023, 3 pages.
Decision to Grant received for European Patent Application No. 20198076.0, mailed on Feb. 1, 2024, 4 pages.
Notice of Allowance received for U.S. Appl. No. 17/725,311, mailed on Feb. 14, 2024, 8 pages.
Applicant-Initiated Interview Summary received for U.S. Appl. No. 17/479,974, mailed on Jul. 21, 2023, 2 pages.
Applicant-Initiated Interview Summary received for U.S. Appl. No. 17/962,369, mailed on Jul. 24, 2023, 4 pages.
Non-Final Office Action received for U.S. Appl. No. 17/496,716, mailed on Jul. 18, 2023, 15 pages.
Notice of Allowance received for U.S. Appl. No. 17/193,991, mailed on Jul. 17, 2023, 10 pages.
Notice of Allowance received for U.S. Appl. No. 17/409,570, mailed on Jul. 20, 2023, 7 pages.
Notice of Allowance received for U.S. Appl. No. 17/863,974, mailed on Jul. 21, 2023, 2 pages.
Office Action received for Australian Patent Application No. 2022200900, mailed on Jul. 13, 2023, 3 pages.
Office Action received for Danish Patent Application No. 202270438, mailed on Jul. 10, 2023, 4 pages.
Decision on Appeal received for Korean Patent Application No. 10-2019-7033799, mailed on Jul. 19, 2022, 23 pages (3 pages of English Translation and 20 pages of Official Copy).
Non-Final Office Action received for U.S. Appl. No. 17/087,855, mailed on Jul. 21, 2022, 23 pages.
Advisory Action received for U.S. Appl. No. 17/962,369, mailed on Nov. 13, 2023, 4 pages.
Applicant-Initiated Interview Summary received for U.S. Appl. No. 17/900,734, mailed on Nov. 20, 2023, 4 pages.
Decision on Appeal received for Korean Patent Application No. 10-2022-7004578, mailed on Oct. 31, 2023, 26 pages (5 pages of English Translation and 21 pages of Official Copy).
Office Action received for Australian Patent Application No. 2022231779, mailed on Nov. 6, 2023, 3 pages.
Supplemental Notice of Allowance received for U.S. Appl. No. 17/496,716, mailed on Nov. 17, 2023, 2 pages.
Advisory Action received for U.S. Appl. No. 17/863,974, mailed on Feb. 15, 2023, 2 pages.
Corrected Notice of Allowance received for U.S. Appl. No. 17/498,557, mailed on Feb. 15, 2023, 4 pages.
Extended European Search Report received for European Patent Application No. 22197752.3, mailed on Feb. 15, 2023, 7 pages.
Intention to Grant received for European Patent Application No. 20186286.9, mailed on Feb. 17, 2023, 9 pages.
Non-Final Office Action received for U.S. Appl. No. 17/479,974, mailed on Feb. 22, 2023, 30 pages.
Office Action received for Japanese Patent Application No. 2021-168243, mailed on Feb. 6, 2023, 8 pages (4 pages of English Translation and 4 pages of Official Copy).
Office Action received for Korean Patent Application No. 10-2022-7004578, mailed on Jan. 27, 2023, 8 pages (4 pages of English Translation and 4 pages of Official Copy).
Office Action received for Korean Patent Application No. 10-2022-7015289, mailed on Jan. 28, 2023, 12 pages (5 pages of English translation and 7 pages of Official copy).
Summons to Attend Oral Proceedings received for European Patent Application No. 20198076.0, mailed on Feb. 16, 2023, 8 pages.
Corrected Notice of Allowance received for U.S. Appl. No. 17/498,557, mailed on Mar. 15, 2023, 2 pages.
International Search Report and Written Opinion received for PCT Patent Application No. PCT/US2022/042978, mailed on Nov. 29, 2022, 15 pages.
Notice of Allowance received for U.S. Appl. No. 17/193,991, mailed on Mar. 29, 2023, 9 pages.
Search Report received for Danish Patent Application No. 202270438, mailed on Dec. 5, 2022, 9 pages.
9-269930, JP, A, Cited by Chinese Patent Office in an Office Action for related Patent Application No. 2017101981906, on Sep. 23, 2022.
Applicant-Initiated Interview Summary received for U.S. Appl. No. 18/136,819, mailed on Dec. 20, 2023, 2 pages.
International Preliminary Report on Patentability received for PCT Patent Application No. PCT/US2022/029062, mailed on Dec. 14, 2023, 9 pages.
Non-Final Office Action received for U.S. Appl. No. 18/137,985, mailed on Dec. 21, 2023, 8 pages.
Office Action received for Australian Patent Application No. 2023203469, mailed on Dec. 18, 2023, 4 pages.
Office Action received for Japanese Patent Application No. 2022-163568, mailed on Dec. 22, 2023, 8 pages (4 pages of English Translation and 4 pages of Official Copy).
Summons to Attend Oral Proceedings received for European Patent Application No. 19160348.9, mailed on Dec. 19, 2023, 7 pages.
Applicant-Initiated Interview Summary received for U.S. Appl. No. 17/409,570, mailed on Nov. 29, 2022, 4 pages.
Brief Communication Regarding Oral Proceedings received for European Patent Application No. 19160348.9, mailed on Nov. 8, 2022, 3 pages.
Extended European Search Report received for European Patent Application No. 22173658.0, mailed on Oct. 31, 2022, 6 pages.
International Search Report and Written Opinion received for PCT Patent Application No. PCT/US2022/029062, mailed on Aug. 16, 2022, 12 pages.
Notice of Acceptance received for Australian Patent Application No. 2021250944, mailed on Nov. 14, 2022, 3 pages.
Notice of Allowance received for U.S. Appl. No. 17/087,855, mailed on Nov. 25, 2022, 8 pages.
Office Action received for Australian Patent Application No. 2019281965, mailed on Nov. 18, 2022, 7 pages.
The YouTube Tech Guy, "How to Setup Face Unlock on Your Android", Available online at: https://www.youtube.com/watch?v=iJYFLYKYvTk, Apr. 12, 2012, 1 page.
Applicant-Initiated Interview Summary received for U.S. Appl. No. 17/962,369, mailed on Oct. 16, 2023, 4 pages.
Decision to Grant received for European Patent Application No. 19716254.8, mailed on Oct. 6, 2023, 2 pages.

(56) References Cited

OTHER PUBLICATIONS

Final Office Action received for U.S. Appl. No. 17/725,311, mailed on Oct. 13, 2023, 66 pages.
Kormann et al., “Risks of the Passport Single Signon Protocol”, IEEE Computer Networks, Jul. 2000, 12 pages.
Non-Final Office Action received for U.S. Appl. No. 17/479,974, mailed on Oct. 10, 2023, 20 pages.
Non-Final Office Action received for U.S. Appl. No. 17/900,734, mailed on Oct. 24, 2023, 12 pages.
Non-Final Office Action received for U.S. Patent Application No. 18/105, 191, mailed on Oct. 13, 2023, 23 pages.
Notice of Allowance received for Japanese Patent Application No. 2020-184605, mailed on Oct. 10, 2023, 4 pages (1 page of English Translation and 3 pages of Official Copy).
Notice of Allowance received for Japanese Patent Application No. 2021-149549, mailed on Oct. 16, 2023, 4 pages (1 page of English Translation and 3 pages of Official Copy).
Notice of Acceptance received for Australian Patent Application No. 2021202352, mailed on Jun. 6, 2022, 3 pages.
Notice of Allowance received for Chinese Patent Application No. 201510284896.5, mailed on Jun. 6, 2022, 2 pages (1 page of English Translation and 1 page of Official Copy).
Notice of Allowance received for Japanese Patent Application No. 2021-035572, mailed on Jun. 3, 2022, 4 pages (1 page of English Translation and 3 pages of Official Copy).
Notice of Allowance received for U.S. Appl. No. 17/208,957, mailed on Jun. 15, 2022, 12 pages.
Applicant-Initiated Interview Summary received for U.S. Appl. No. 17/863,974, mailed on May 25, 2023, 2 pages.
Office Action received for Korean Patent Application No. 10-2022-7004578, mailed on May 11, 2023, 8 pages (4 pages of English Translation and 4 pages of Official Copy).
Supplemental Notice of Allowance received for U.S. Appl. No. 17/955,311, mailed on May 26, 2023, 2 pages.
Corrected Notice of Allowance received for U.S. Appl. No. 17/087,855, mailed on Jan. 12, 2023, 6 pages.
Corrected Notice of Allowance received for U.S. Appl. No. 17/498,557, mailed on Jan. 11, 2023, 2 pages.
Notice of Allowance received for U.S. Appl. No. 16/938,362, mailed on Jan. 19, 2023, 8 pages.
Office Action received for German Patent Application No. 112014004134.3, mailed on Dec. 21, 2022, 22 pages (8 pages of English Translation and 14 pages of Official Copy).
Yee-Yin Choong, et al. “Fingerprint Self-Captures: Usability of a Fingerprint System with Real-Time Feedback”, IEEE Fifth International Conference on Biometrics: Theory, Applications and Systems (BTAS). IEEE, Online Available at: <https://ieeexplore.ieee.orgistamp/stamp.jsp?tp.Szar-munber=6374553>, 2012, pp. 16-22.
Applicant-Initiated Interview Summary received for U.S. Appl. No. 17/087,855, mailed on Jul. 5, 2022, 2 pages.
Board Decision received for Chinese Patent Application No. 201810338826.7, mailed on May 30, 2022, 20 pages (2 pages of English Translation and 18 pages of Official Copy).
Board Opinion received for Chinese Patent Application No. 201510284715.9, mailed on Jun. 6, 2022, 14 pages (3 pages of English Translation and 11 pages of Official Copy).
Corrected Notice of Allowance received for U.S. Appl. No. 17/208,957, mailed on Jun. 30, 2022, 2 pages.
Minutes of the Oral Proceedings received for European Patent Application No. 19194828.0, mailed on Jun. 28, 2022, 6 pages.
Non-Final Office Action received for U.S. Appl. No. 17/516,495, mailed on Jul. 6, 2022, 10 pages.
Notice of Allowance received for Korean Patent Application No. 10-2020-7034405, mailed on Jun. 20, 2022, 6 pages (2 pages of English Translation and 4 pages of Official Copy).
Office Action received for Japanese Patent Application No. 2021-084065, mailed on Jun. 24, 2022, 12 pages (6 pages of English Translation and 6 pages of Official Copy).
Summons to Attend Oral Proceedings received for European Patent Application No. 18208881.5, mailed on Jun. 29, 2022, 9 pages.
Brief Communication Regarding Oral Proceedings received for European Patent Application No. 20198076.0, mailed on Aug. 28, 2023, 1 page.
Notice of Acceptance received for Australian Patent Application No. 2022206826, mailed on Aug. 24, 2023, 3 pages.
Office Action received for Australian Patent Application No. 2022209019, mailed on Aug. 18, 2023, 4 pages.
Applicant-Initiated Interview Summary received for U.S. Appl. No. 17/062,941, mailed on Dec. 14, 2023, 2 pages.
Corrected Notice of Allowance received for U.S. Appl. No. 17/486,670, mailed on Dec. 7, 2023, 2 pages.
Corrected Notice of Allowance received for U.S. Appl. No. 17/496,716, mailed on Dec. 6, 2023, 2 pages.
Extended European Search Report received for European Patent Application No. 23199594.5, mailed on Nov. 28, 2023, 11 pages.
FSS, “Mobile Banking”, Available online at: https://mobile.fssnet.co.in/mpayweb/, Dec. 5, 2023, 2 pages.
Notice of Allowance received for Korean Patent Application No. 10-2022-7033655, mailed on Nov. 29, 2023, 6 pages (2 pages of English Translation and 4 pages of Official Copy).
Notice of Allowance received for U.S. Appl. No. 17/486,670, mailed on Nov. 8, 2023, 11 pages.
Notice of Hearing received for Indian Patent Application No. 201618024020, mailed on Nov. 21, 2023, 2 pages.
Notice of Hearing received for Indian Patent Application No. 202018014786, mailed on Nov. 29, 2023, 3 pages.
Numnonda Thanachart, “Mobile payment”, Software Park Thailand, Available online at: https://www.slideshare.net/softwarepark/mobile-payment, Nov. 23, 2010, 6 pages.
Office Action received for Australian Patent Application No. 2022200900, mailed on Nov. 30, 2023, 3 pages.
Office Action received for Chinese Patent Application No. 201910246439.5, mailed on Nov. 22, 2023, 20 pages (3 pages of English Translation and 17 pages of Official Copy).
Office Action received for Chinese Patent Application No. 202211283788.2, mailed on Nov. 1, 2023, 10 pages (5 pages of English Translation and 5 pages of Official Copy).
Office Action received for Chinese Patent Application No. 202211285112.7, mailed on Nov. 11, 2023, 6 pages (3 pages of English Translation and 3 pages of Official Copy).
Pouralinazar Behzad, “The System for Secure Mobile Payment Transactions”, Available online at: https://www.diva-portal.org/smash/get/diva2:616934/FULLTEXT01.pdf, 2013, 78 pages.
Appeal Decision received for Australian Patent Application No. 2019268070, mailed on Dec. 22, 2022, 26 pages.
Applicant-Initiated Interview Summary received for U.S. Appl. No. 17/409,570, mailed on Dec. 27, 2022, 2 pages.
Decision to Refuse received for European Patent Application No. 182088815, mailed on Dec. 23, 2022, 12 pages.
Final Office Action received for U.S. Appl. No. 17/193,991, mailed on Dec. 22, 2022, 6 pages.
Final Office Action received for U.S. Appl. No. 17/863,974, mailed on Dec. 16, 2022, 23 pages.
Minutes of Oral Proceedings received for European Patent Application No. 182088815, mailed on Dec. 22, 2022, 4 pages.
Notice of Acceptance received for Australian Patent Application No. 2021254574, mailed on Dec. 14, 2022, 3 pages.
Notice of Allowance received for Japanese Patent Application No. 2021-131310, mailed on Dec. 9, 2022, 4 pages (1 pages of English Translation and 3 pages of Official Copy).
Notice of Allowance received for Korean Patent Application No. 10-2022-7012864, mailed on Dec. 15, 2022, 7 pages (2 pages of English Translation and 5 pages of Official Copy).
Office Action received for Chinese Patent Application No. 2019800096698, mailed on Nov. 22, 2022, 16 pages (10 pages of English Translation and 6 pages of Official Copy)-
Office Action received for Japanese Patent Application No. 2020-184605, mailed on Dec. 12, 2022, 9 pages (4 pages of English Translation and 5 pages of Official Copy).
Advisory Action received for U.S. Appl. No. 16/369,473, mailed on May 12, 2022, 4 pages.
Intention to Grant received for European Patent Application No. 19160344.8, mailed on May 13, 2022, 10 pages.

(56) References Cited

OTHER PUBLICATIONS

International Search Report and Written Opinion received for PCT Patent Application No. PCT/US2022/013730, mailed on Apr. 8, 2022, 19 pages.
Notice of Acceptance received for Australian Patent Application No. 2021200415, mailed on May 9, 2022, 3 pages.
Notice of Acceptance received for Australian Patent Application No. 2022200617, mailed on May 12, 2022, 3 pages.
Office Action received for Australian Patent Application No. 2019281965, mailed on May 11, 2022, 5 pages.
Office Action received for Chinese Patent Application No. 201910246400.3, mailed on Apr. 19, 2022, 24 pages (13 pages of English Translation and 11 pages of Official Copy).
Office Action received for Chinese Patent Application No. 201980041865.3, mailed on Apr. 13, 2022, 12 pages (6 pages of English Translation and 6 pages of Official Copy).
Office Action received for European Patent Application No. 20191533.7, mailed on May 12, 2022, 5 pages.
Examiner's Answer to Appeal Brief received for U.S. Appl. No. 17/516,495, mailed on Jul. 28, 2023, 13 pages.
International Preliminary Report on Patentability received for PCT Patent Application No. PCT/US2022/013730, mailed on Aug. 3, 2023, 15 pages.
Notice of Allowance received for Korean Patent Application No. 10-2022-7014519, mailed on Jul. 28, 2023, 7 pages (2 pages of English Translation and 5 pages of Official Copy).
Notice of Allowance received for Korean Patent Application No. 10-2022-7015289, mailed on Jul. 31, 2023, 8 pages (2 pages of English Translation and 6 pages of Official Copy).
Notice of Allowance received for U.S. Appl. No. 17/863,974, mailed on Aug. 9, 2023, 2 pages.
Office Action received for Australian Patent Application No. 2022218517, mailed on Jul. 24, 2023, 6 pages.
Office Action received for Chinese Patent Application No. 201910901500.5, mailed on Jun. 30, 2023, 27 pages (9 pages of English Translation and 18 pages of Official Copy).
Office Action received for Korean Patent Application No. 10-2022-7033655, mailed on Jul. 27, 2023, 5 pages (2 pages of English Translation and 3 pages of Official Copy).
2009-211166, JP, A, Cited by Japanese Patent Office in an Office Action for related Patent Application No. 2019-563560, on Jul. 4, 2022.
2012-168802, JP, A, Cited by Japanese Patent Office in an Office Action for related Patent Application No. 2019-563560, on Jul. 4, 2022.
Applicant-Initiated Interview Summary received for U.S. Appl. No. 17/479,974, mailed on Apr. 4, 2023, 2 pages.
Non-Final Office Action received for U.S. Appl. No. 17/062,941, mailed on Mar. 30, 2023, 6 pages.
Non-Final Office Action received for U.S. Appl. No. 17/863,974, mailed on Apr. 13, 2023, 30 pages.
Notice of Allowance received for U.S. Appl. No. 16/938,362, mailed on Apr. 10, 2023, 7 pages.
Notice of Allowance received for U.S. Appl. No. 17/409,570, mailed on Apr. 11, 2023, 7 pages.
Office Action received for Australian Patent Application No. 2022200900, mailed on Mar. 28, 2023, 3 pages.
Office Action received for Chinese Patent Application No. 201980009669.8, mailed on Mar. 1, 2023, 19 pages (11 pages of English Translation and 8 pages of Official Copy).
Applicant-Initiated Interview Summary received for U.S. Appl. No. 17/087,855, mailed on Feb. 28, 2022, 2 pages.
Board Decision received for Chinese Patent Application No. 201710094150.7, mailed on Dec. 22, 2021, 20 pages (1 page of English Translation and 19 pages of Official Copy).
Das et al., "A Security Framework for Mobile-to-Mobile Payment Network", International Conference on Personal Wireless Communications, Jan. 25, 2005, pp. 420-423.
Notice of Allowance received for Chinese Patent Application No. 201710094150.7, mailed on Feb. 23, 2022, 4 pages (1 page of English Translation and 3 pages of Official Copy).
Notice of Allowance received for Korean Patent Application No. 10-2020-7034180, mailed on Feb. 22, 2022, 8 pages (2 pages of English Translation and 6 pages of Official Copy).
Notice of Allowance received for Korean Patent Application No. 10-2021-7015473, mailed on Feb. 24, 2022, 5 pages (1 page of English Translation and 4 pages of Official Copy).
Notice of Allowance received for U.S. Appl. No. 16/125,267, mailed on Mar. 3, 2022, 10 pages.
Notice of Allowance received for U.S. Appl. No. 17/015,429, mailed on Mar. 4, 2022, 2 pages.
Office Action received for Chinese Patent Application No. 201710198190.6, mailed on Jan. 24, 2022, 16 pages (6 pages of English Translation and 10 pages of Official Copy).
Office Action received for Chinese Patent Application No. 201980009669.8, mailed on Dec. 3, 2021, 26 pages (12 pages of English Translation and 14 pages of Official Copy).
Office Action received for Indian Patent Application No. 202018038351, mailed on Feb. 25, 2022, 6 pages.
Office Action received for Indian Patent Application No. 202118009403, mailed on Feb. 21, 2022, 6 pages.
Office Action received for Indian Patent Application No. 202118018461, mailed on Feb. 23, 2022, 6 pages.
Office Action received for Korean Patent Application No. 10-2021-7032984, mailed on Feb. 22, 2022, 8 pages (4 pages of English Translation and 4 pages of Official Copy).
060465, AR, A1, Cited by Chinese Patent Office in an Office Action for retated Patent Application No. 201810338040.5 on Mar. 30, 2022.
202735894, CN, U, Cited by Chinese Patent Office in an Office Action for reiated Patent Application No. 201610459968.X on Mar. 3, 2022.
103092503, CN, A, Cited by Chinese Patent Office in an Office Action for related Patent Application No. 201610459968.X on Mar. 3, 2022.
2006-2013858, JP, A, Cited by Japanese Patent Office in an Office Action for refated Patent Application No. 2021-208395 on Mar. 25, 2022.
2010-165012, JP, A, Cited by Japanese Patent Office in an Office Action for reiated Patent Application No. 2021-208395 on Mar. 25, 2022.
10-2009-0011323, KR, A, Cited by Japanese Patent Office in an Office Action for related Patent Application No. 2021-208395 on Mar. 25, 2022
Qiye, Wang, "Design and Implementation of SAN Device Access Control in Unified Storage Platform", Master's Theses, Huazhong University of Science & Technology, Wuhan, Jun. 2008, 63 pages, Cited by Chinese Patent Office in an Office Action for related Patent Application No. 201810338040.5 on Mar. 30, 2022.
Final Office Action received for U.S. Appl. No. 17/516,495, mailed on Nov. 15, 2022, 12 pages.
Brief Communication regarding Oral Proceedings received for European Patent Application No. 20198076.0, mailed on May 2, 2023, 1 page.
Notice of Allowance received for Korean Patent Application No. 10-2022-7012869, mailed on Apr. 18, 2023, 7 pages (2 pages of English Translation and 5 pages of Official Copy).
Office Action received for Australian Patent Application No. 2022218517, mailed on Apr. 27, 2023, 7 pages.
Corrected Notice of Allowance received for U.S. Appl. No. 17/409,570, mailed on May 10, 2023, 2 pages.
Decision to Grant received for European Patent Application No. 20186286.9, mailed on May 11, 2023, 4 pages.
Intention to Grant received for European Patent Application No. 19716254.8, mailed on May 16, 2023, 9 pages.
Non-Final Office Action received for U.S. Appl. No. 17/725,311, mailed on May 10, 2023, 54 pages.
Notice of Allowance received for Japanese Patent Application No. 2021-084065, mailed on May 15, 2023, 4 pages (1 page of English Translation and 3 pages of Official Copy).

(56) References Cited

OTHER PUBLICATIONS

Notice of Allowance received for U.S. Appl. No. 17/955,311, mailed on May 22, 2023, 7 pages.
Office Action received for Australian Patent Application No. 2022235545, mailed on May 11, 2023, 3 pages.
Office Action received for Chinese Patent Application No. 201910109868.8, mailed on Apr. 23, 2023, 29 pages (3 pages of English Translation and 26 pages of Official Copy).
Office Action received for Korean Patent Application No. 10-2022-7029609, mailed on Apr. 28, 2023, 9 pages (4 pages of English Translation and 5 pages of Official Copy).
Adractas et al., "The road to mobile payments services", McKinsey on Payments, Online available at: https://www.mckinsey.com.br/~/media/mckinsey/dotcom/client_service/financial%20services/latest%20thinking/reports/the_road_to_mobile_payments_services.pdf, Sep. 2011, pp. 45-52.
Adrianisen, "Samsung Galaxy S8 Face Recognition—Register Your Face Review!"Retrieved from: https://www.youtube.com/watch?v=04KVPaCJq94>, Apr. 27, 2017, 1 page.
Advisory Action received for U.S. Appl. No. 12/207,374, mailed on Feb. 25, 2013, 3 pages.
Advisory Action received for U.S. Appl. No. 12/207,374, mailed on May 15, 2014, 3 pages.
Advisory Action received for U.S. Appl. No. 14/311,214, mailed on Feb. 10, 2015, 4 pages.
Advisory Action received for U.S. Appl. No. 14/503,296, mailed on Oct. 2, 2015, 3 pages.
Advisory Action received for U.S. Appl. No. 14/980,344, mailed on Feb. 10, 2020, 5 pages.
Advisory Action received for U.S. Appl. No. 16/422,736, mailed on Mar. 27, 2019, 5 pages.
Advisory Action received for U.S. Appl. No. 16/422,736, mailed on May 11, 2017, 6 pages.
Advisory Action received for U.S. Appl. No. 16/422,736, mailed on Nov. 14, 2019, 2 pages.
Advisory Action received for U.S. Appl. No. 16/422,736, mailed on Mar. 12, 2021, 3 pages.
Advisory Action received for U.S. Appl. No. 15/250,152, mailed on Mar. 25, 2019, 5 pages.
Applicant Initiated Interview Summary received for U.S. Appl. No. 13/243,045, mailed on Oct. 22, 2019, 3 pages.
Applicant Initiated Interview Summary received for U.S. Appl. No. 15/714,887, mailed on Aug. 19, 2020, 4 pages.
Applicant Initiated Interview Summary received for U.S. Appl. No. 15/714,887, mailed on Mar. 17, 2020, 5 pages.
Applicant Initiated Interview Summary received for U.S. Appl. No. 16/147,023, mailed on Oct. 29, 2019, 3 pages.
Applicant Initiated Interview Summary received for U.S. Appl. No. 16/553,622, mailed on Aug. 3, 2020, 3 pages.
Applicant-Initiated Interview Summary received for U.S. Appl. No. 14/612,214, mailed on Feb. 18, 2020, 3 pages.
Applicant-Initiated Interview Summary received for U.S. Appl. No. 16/125,267, mailed on Feb. 8, 2021, 3 pages.
Applicant-Initiated Interview Summary received for U.S. Appl. No. 16/125,267, mailed on Jan. 25, 2022, 5 pages.
Applicant-Initiated Interview Summary received for U.S. Appl. No. 16/125,267, mailed on Jun. 25, 2021, 5 pages.
Applicant-Initiated Interview Summary received for U.S. Appl. No. 16/125,267, mailed on Jan. 25, 2021, 4 pages.
Applicant-Initiated Interview Summary received for U.S. Appl. No. 16/125,267, mailed on Sep. 14, 2020, 5 pages.
Applicant-Initiated Interview Summary received for U.S. Appl. No. 16/369,355, mailed on Jul. 28, 2021, 2 pages.
Applicant-Initiated Interview Summary received for U.S. Appl. No. 16/369,473, mailed on Apr. 16, 2021, 2 pages.
Applicant-Initiated Interview Summary received for U.S. Appl. No. 16/369,473, mailed on Oct. 13, 2020, 5 pages.
Applicant-Initiated Interview Summary received for U.S. Appl. No. 16/369,473, mailed on Oct. 18, 2021, 2 pages.
Applicant-Initiated Interview Summary received for U.S. Appl. No. 16/369,473, mailed on Sep. 21, 2020, 5 pages.
Applicant-Initiated Interview Summary received for U.S. Appl. No. 16/422,736, mailed on Feb. 24, 2021, 3 pages.
Applicant-Initiated Interview Summary received for U.S. Appl. No. 16/422,736, mailed on Sep. 28, 2020, 3 pages.
Applicant-Initiated Interview Summary received for U.S. Appl. No. 16/667,271, mailed on Apr. 8, 2020, 3 pages.
Applicant-Initiated Interview Summary received for U.S. Appl. No. 16/670,949, mailed on Apr. 6, 2021, 2 pages.
Applicant-Initiated Interview Summary received for U.S. Appl. No. 17/087,855, mailed on Nov. 5, 2021, 2 pages.
Bao et al., "Location-based and Preference-Aware Recommendation Using Sparse Geo-Social Networking Data", ACM SIGSPATIAL GIS '12, Redondo Beach, CA, USA, Online available at: https://www.microsoft.com/en-us/research/wp-content/uploads/2016/02/LocationRecommendation.pdf, Nov. 6-9, 2012, 10 pages.
Board Decision received for Chinese Patent Application No. 201410407626.4, mailed on Jun. 8, 2020, 17 pages (1 page of English Translation and 16 pages of Official Copy).
Board Decision received for Chinese Patent Application No. 201510284896.5, mailed on Nov. 19, 2021, 14 pages (1 page of English Translation and 13 pages of Official Copy).
Board Decision received for Chinese Patent Application No. 201580043701.6, mailed on Aug. 19, 2021, 2 pages (1 page of English Translation and 1 page of Official Copy).
Board Decision received for Chinese Patent Application No. 201810094316.X, mailed on Dec. 3, 2021, 18 pages (1 page of English Translation and 17 pages of Official Copy).
Board Opinion received for Chinese Patent Application No. 201810094316.X, mailed on Sep. 30, 2021, 11 pages (3 pages of English Translation and 8 pages of Official Copy).
Board Opinion received for Chinese Patent Application No. 201810338826.7, mailed on Jan. 19, 2022, 18 pages (6 pages of English Translation and 12 pages of Official Copy).
Brief Communication Regarding Oral Proceedings received for European Patent Application No. 15727291.5, mailed on Jun. 9, 2020, 12 pages.
Brief Communication Regarding Oral Proceedings received for European Patent Application No. 16201159.7, mailed on Jun. 29, 2021, 13 pages.
Brief Communication regarding Oral Proceedings received for European Patent Application No. 16201205.8, mailed on May 29, 2020, 29 pages.
Brief Communication Regarding Oral Proceedings received for European Patent Application No. 187134085, mailed on Sep. 28, 2021, 2 pages.
Brief Communication Regarding Oral Proceedings received for European Patent Application No. 18830326.7, mailed on Jun. 30, 2021, 2 pages.
Brumberg et al., "The Unlock Project: A Python-based framework for practical brain-computer interface communication "app" development", Conf Proc IEEE Eng Med Biol Soc. 2012, doi:10.1109/EMBC.2012.6346473, Institute of Electrical and Electronics Engineers, 2012, 11 pages.
Certificate of Examination received for Australian Patent Application No. 2017100553, mailed on Jan. 17, 2018, 2 pages.
Corrected Notice of Allowance received for U.S. Appl. No. 12/074,985, mailed on Oct. 10, 2013, 4 pages.
Corrected Notice of Allowance received for U.S. Appl. No. 14/612,214, mailed on May 1, 2020, 2 pages.
Corrected Notice of Allowance received for U.S. Appl. No. 14/719,217, mailed on Apr. 22, 2019, 2 pages.
Corrected Notice of Allowance received for U.S. Appl. No. 14/719,217, mailed on Mar. 20, 2019, 2 pages.
Corrected Notice of Allowance received for U.S. Appl. No. 15/017,436, mailed on Sep. 2, 2016, 5 pages.
Corrected Notice of Allowance received for U.S. Appl. No. 15/137,944, mailed on Jan. 11, 2018, 2 pages.
Corrected Notice of Allowance received for U.S. Appl. No. 15/137,944, mailed on Jan. 19, 2018, 2 pages.
Corrected Notice of Allowance received for U.S. Appl. No. 15/269,801, mailed on Oct. 3, 2017, 4 pages.

(56) References Cited

OTHER PUBLICATIONS

Corrected Notice of Allowance received for U.S. Appl. No. 15/294,439, mailed on Mar. 13, 2019, 4 pages.
Corrected Notice of Allowance received for U.S. Appl. No. 15/357,873, mailed on Jan. 19, 2018, 2 pages.
Corrected Notice of Allowance received for U.S. Appl. No. 15/357,873, mailed on Mar. 16, 2018, 2 pages.
Corrected Notice of Allowance received for U.S. Appl. No. 15/845,794, mailed on Feb. 25, 2019, 2 pages.
Corrected Notice of Allowance received for U.S. Appl. No. 15/866,341, mailed on Aug. 21, 2019, 3 pages.
Corrected Notice of Allowance received for U.S. Appl. No. 15/866,341, mailed on Aug. 26, 2019, 3 pages.
Corrected Notice of Allowance received for U.S. Appl. No. 16/241,199, mailed on Sep. 13, 2021, 5 pages.
Corrected Notice of Allowance received for U.S. Appl. No. 16/386,707, mailed on Feb. 19, 2021, 2 pages.
Corrected Notice of Allowance received for U.S. Appl. No. 16/386,707, mailed on Jan. 25, 2021, 2 pages.
Corrected Notice of Allowance received for U.S. Appl. No. 16/422,736, mailed on Jul. 9, 2021, 2 pages.
Corrected Notice of Allowance received for U.S. Appl. No. 16/434,865, mailed on Apr. 28, 2020, 2 pages.
Corrected Notice of Allowance received for U.S. Appl. No. 16/434,865, mailed on Jun. 4, 2020, 2 pages.
Corrected Notice of Allowance received for U.S. Appl. No. 16/456,839, mailed on Apr. 29, 2021, 2 pages.
Corrected Notice of Allowance received for U.S. Appl. No. 16/456,839, mailed on Jul. 20, 2021, 3 pages.
Corrected Notice of Allowance received for U.S. Appl. No. 16/553,622, mailed on Sep. 23, 2020, 5 pages.
Corrected Notice of Allowance received for U.S. Appl. No. 16/670,949, mailed on Sep. 8, 2021, 2 pages.
Corrected Notice of Allowance received for U.S. Appl. No. 16/843,638, mailed on Dec. 22, 2021, 2 pages.
Corrected Notice of Allowance received for U.S. Appl. No. 16/843,638, mailed on Feb. 16, 2022, 2 pages.
Corrected Notice of Allowance received for U.S. Appl. No. 16/987,003, mailed on Sep. 1, 2021, 3 pages.
Cv Meerkat, "Extracting Face Orientation in Real-time", Available online at: https://www.youtube.com/watch?v=Ugwfnjx6UYw, Jul. 22, 2016, 3 pages.
Decision from Intellectual Property Tribunal received for Korean Patent Application No. 10-2011-7023152, mailed on Feb. 17, 2015, 22 pages (7 pages of English Translation and 15 pages of Official Copy).
Decision on Appeal received for Korean Patent Application No. 10-2015-7010262, mailed on Dec. 21, 2018, 16 pages (3 pages of English Translation and 13 pages of Official Copy).
Decision on Appeal received for Korean Patent Application No. 10-2016-0152210, mailed on Jun. 23, 2020, 20 pages (2 pages of English Translation and 18 pages of Official Copy).
Decision on Appeal received for Korean Patent Application No. 10-2020-7020782, mailed on Jan. 24, 2022, 22 pages (2 pages of English Translation and 20 pages of Official Copy).
Decision on Appeal received for U.S. Appl. No. 13/243,045, mailed on Mar. 18, 2019, 10 pages.
Decision on Appeal received for U.S. Appl. No. 13/243,045, mailed on May 10, 2021, 11 pages.
Decision on Appeal received for U.S. Appl. No. 14/612,214, mailed on Sep. 3, 2019, 10 pages.
Decision on Appeal received for U.S. Appl. No. 15/714,887, mailed on Feb. 18, 2022, 14 pages.
Decision to Grant received for Danish Patent Application No. PA201670628, mailed on Nov. 20, 2017, 2 pages.
Decision to Grant received for Danish Patent Application No. PA201770418, mailed on Oct. 25, 2019, 3 pages.
Decision to Grant received for Danish Patent Application No. PA201770419, mailed on Oct. 25, 2018, 2 pages.
Decision to Grant received for Danish Patent Application No. PA201770715, mailed on Feb. 15, 2019, 2 pages.
Decision to Grant received for Danish Patent Application No. PA201770782, mailed on Oct. 25, 2019, 2 pages.
Decision to Grant received for Danish Patent Application No. PA201870370, mailed on Mar. 29, 2019, 2 pages.
Decision to Grant received for Danish Patent Application No. PA201870371, mailed on Mar. 29, 2019, 2 pages.
Decision to Grant received for Danish Patent Application No. PA201870855, mailed on Oct. 20, 2020, 2 pages.
Decision to Grant received for Danish Patent Application No. PA201970127, mailed on Aug. 20, 2020, 2 pages.
Decision to Grant received for European Patent Application No. 12773460.6, mailed on Jun. 27, 2019, 2 pages.
Decision to Grant received for European Patent Application No. 13171145.9, mailed on Jul. 11, 2019, 2 pages.
Decision to Grant received for European Patent Application No. 14853215.3, mailed on Sep. 27, 2018, 2 pages.
Decision to Grant received for European Patent Application No. 15168475.0, mailed on Sep. 30, 2021, 2 pages.
Decision to Grant received for European Patent Application No. 15719347.5, mailed on Jun. 24, 2021, 2 pages.
Decision to Grant received for European Patent Application No. 17853654.6, mailed on Apr. 15, 2021, 2 pages.
Decision to Grant received for European Patent Application No. 18190250.3, mailed on Oct. 1, 2020, 2 pages.
Decision to Grant received for European Patent Application No. 18704335.1, mailed on Sep. 24, 2020, 2 pages.
Decision to Grant received for European Patent Application No. 18830326.7, mailed on Nov. 11, 2021, 3 pages.
Decision to Grant received for European Patent Application No. 20196476.4, mailed on Jan. 13, 2022, 2 pages.
Decision to Grant received for Japanese Patent Application No. 2017-075031, mailed on Jul. 1, 2019, 3 pages (1 page of English Translation and 2 pages of Official Copy).
Decision to Grant received for the European Patent Application No. 12181538.5, mailed on Jul. 2, 2015, 1 page.
Decision to Refuse received for European Patent Application No. 08834386.8, mailed on Apr. 8, 2013, 8 pages.
Decision to Refuse received for European Patent Application No. 12770400.5, mailed on Nov. 8, 2018, 12 pages.
Decision to Refuse received for European Patent Application No. 15727291.5, mailed on Jun. 30, 2020, 21 pages.
Decision to Refuse received for European Patent Application No. 15728352.4, mailed on May 28, 2020, 25 pages.
Decision to Refuse received for European Patent Application No. 16201159.7, mailed on Sep. 27, 2021, 22 pages.
Decision to Refuse received for European Patent Application No. 16201195.1, mailed on Mar. 4, 2019, 23 pages.
Decision to Refuse received for European Patent Application No. 16201205.8, mailed on Jun. 30, 2020, 29 pages.
Drareni Jamil, "Face Tracking and Head Pose Estimation with Open CV", Available online at: <https://www.youtube.com/watch?v=Etj_aktbnwM>, Jun. 9, 2013, 3 pages.
Examination Report received for Australian Patent Application No. 2015202397, mailed on Feb. 29, 2016, 4 pages.
Examiner's Answer to Appeal Brief received for U.S. Appl. No. 13/243,045, mailed on Oct. 26, 2020, 17 pages.
Examiner's Answer to Appeal Brief received for U.S. Appl. No. 15/714,887, mailed on Aug. 27, 2021, 23 pages.
Examiner's Pre-Review Report received for Japanese Patent Application No. 2013-098406, mailed on Oct. 8, 2015, 7 pages (4 pages of English Translation and 3 pages of Official Copy).
Examiner's Pre-Review Report received for Japanese Patent Application No. 2018-113081, mailed on Apr. 28, 2021, 4 pages (2 pages of English Translation and 2 pages of Official Copy).
Examiner's Pre-Review Report received for Japanese Patent Application No. 2019-563560, mailed on Dec. 27, 2021, 4 pages (2 pages of English Translation and 2 pages of Official Copy).
Extended European Search Report (includes Partial European Search Report and European Search Opinion) received for European Patent Application No. 13171145.9, mailed on Feb. 5, 2014, 6 pages.

(56) References Cited

OTHER PUBLICATIONS

Extended European Search Report (includes Partial European Search Report and European Search Opinion) received for European Patent Application No. 15168475.0, mailed on Oct. 21, 2015, 6 pages.
Extended European Search Report received for European Patent Application No. 12181538.5, mailed on Oct. 23, 2012, 6 pages.
Extended European Search Report received for European Patent Application No. 14853215.3, mailed on Sep. 13, 2016, 9 pages.
Extended European Search Report received for European Patent Application No. 16177139.9, mailed on Nov. 4, 2016, 7 pages.
Extended European Search Report received for European Patent Application No. 16201159.7, mailed on Mar. 27, 2017, 12 pages.
Extended European Search Report Received for European Patent Application No. 16201195.1, mailed on Feb. 7, 2017, 13 pages.
Extended European Search Report received for European Patent Application No. 16201205.8, mailed on Jan. 5, 2017, 12 pages.
Extended European Search Report received for European Patent Application No. 17799904.2, mailed on Jul. 30, 2018, 7 pages.
Extended European Search Report received for European Patent Application No. 17853654.6, mailed on Jul. 8, 2019, 9 pages.
Extended European Search Report received for European Patent Application No. 18190250.3, mailed on Nov. 9, 2018, 6 pages.
Extended European Search Report received for European Patent Application No. 18208881.5, mailed on Jan. 8, 2019, 7 pages.
Extended European Search Report received for European Patent Application No. 19150528.8, mailed on May 15, 2019, 9 pages.
Extended European Search Report received for European Patent Application No. 19160344.8, mailed on Jun. 14, 2019, 7 pages.
Extended European Search Report received for European Patent Application No. 19160348.9, mailed on Jul. 19, 2019, 6 pages.
Extended European Search Report received for European Patent Application No. 19186538.5, mailed on Oct. 9, 2019, 10 pages.
Extended European Search Report received for European Patent Application No. 19194828.0, mailed on Dec. 19, 2019, 7 pages.
Extended European Search Report received for European Patent Application No. 20186286.9, mailed on Nov. 2, 2020, 9 pages.
Extended European Search Report received for European Patent Application No. 20191533.7, mailed on Nov. 13, 2020, 8 pages.
Extended European Search Report received for European Patent Application No. 20196476.4, mailed on Nov. 5, 2020, 5 pages.
Extended European Search Report received for European Patent Application No. 20198076.0, mailed on Jan. 13, 2021, 8 pages.
Extended European Search Report received for European Patent Application No. 21166287.9, mailed on Nov. 5, 2021, 10 pages.
Extended European Search Report received for European Patent Application No. 21166718.3, mailed on Jul. 6, 2021, 11 pages.
Extended European Search Report received for European Patent Application No. 21173988.3, mailed on Aug. 23, 2021, 6 pages.
Final Office Action received for U.S. Appl. No. 12/074,985, mailed on Dec. 2, 2011, 19 pages.
Final Office Action received for U.S. Appl. No. 12/207,370, mailed on Dec. 13, 2011, 15 pages.
Final Office Action received for U.S. Appl. No. 12/207,370, mailed on Feb. 15, 2013, 17 pages.
Final Office Action received for U.S. Appl. No. 12/207,374, mailed on Jan. 31, 2014, 12 pages.
Final Office Action received for U.S. Appl. No. 12/207,374, mailed on Nov. 6, 2012, 25 pages.
Final Office Action received for U.S. Appl. No. 12/207,374, mailed on Oct. 21, 2011, 16 pages.
Final Office Action received for U.S. Appl. No. 13/243,045, mailed on Aug. 5, 2015, 10 pages.
Final Office Action received for U.S. Appl. No. 13/243,045, mailed on Jan. 15, 2020, 12 pages.
Final Office Action received for U.S. Appl. No. 13/248,882, mailed on Dec. 4, 2013, 22 pages.
Final Office Action received for U.S. Appl. No. 14/142,669, mailed on Jun. 12, 2015, 14 pages.
Final Office Action received for U.S. Appl. No. 14/285,378, mailed on Jul. 23, 2015, 19 pages.
Final Office Action received for U.S. Appl. No. 14/311,214, mailed on Jan. 8, 2015, 12 pages.
Final Office Action received for U.S. Appl. No. 14/311,214, mailed on Sep. 24, 2015, 15 pages.
Final Office Action received for U.S. Appl. No. 14/479,088, mailed on Mar. 11, 2015, 10 pages.
Final Office Action received for U.S. Appl. No. 14/480,183, mailed on Jun. 28, 2017, 14 pages.
Final Office Action received for U.S. Appl. No. 14/503,072, mailed on Mar. 2, 2017, 9 pages.
Final Office Action received for U.S. Appl. No. 14/503,072, mailed on Sep. 1, 2015, 16 pages.
Final Office Action received for U.S. Appl. No. 14/503,296, mailed on Apr. 24, 2019, 5 pages.
Final Office Action received for U.S. Appl. No. 14/503,296, mailed on Jul. 2, 2015, 7 pages.
Final Office Action received for U.S. Appl. No. 14/503,296, mailed on Jun. 4, 2018, 8 pages.
Final Office Action received for U.S. Appl. No. 14/612,214, mailed on Dec. 7, 2015, 13 pages.
Final Office Action received for U.S. Appl. No. 14/719,217, mailed on Feb. 23, 2017, 37 pages.
Final Office Action received for U.S. Appl. No. 14/980,344, mailed on Dec. 5, 2018, 17 pages.
Final Office Action received for U.S. Appl. No. 14/980,344, mailed on Nov. 25, 2019, 13 pages.
Final Office Action received for U.S. Appl. No. 15/137,944, mailed on Feb. 27, 2017, 10 pages.
Final Office Action received for U.S. Appl. No. 15/470,752, mailed on Mar. 13, 2018, 14 pages.
Final Office Action received for U.S. Appl. No. 15/714,887, mailed on Nov. 13, 2020, 60 pages.
Final Office Action received for U.S. Appl. No. 15/714,887, mailed on Nov. 15, 2019, 55 pages.
Final Office Action received for U.S. Appl. No. 15/866,341, mailed on May 14, 2019, 10 pages.
Final Office Action received for U.S. Appl. No. 15/872,685, mailed on Oct. 26, 2018, 10 pages.
Final Office Action received for U.S. Appl. No. 15/899,966, mailed on Nov. 5, 2018, 10 pages.
Final Office Action received for U.S. Appl. No. 16/125,267, mailed on Aug. 26, 2021, 22 pages.
Final Office Action received for U.S. Appl. No. 16/125,267, mailed on Dec. 10, 2020, 20 pages.
Final Office Action received for U.S. Appl. No. 16/147,023, mailed on Jul. 23, 2019, 18 pages.
Final Office Action received for U.S. Appl. No. 16/147,115, mailed on Jun. 19, 2019, 14 pages.
Final Office Action received for U.S. Appl. No. 16/164,561, mailed on Sep. 5, 2019, 12 pages.
Final Office Action received for U.S. Appl. No. 16/369,473, mailed on Dec. 14, 2020, 17 pages.
Final Office Action received for U.S. Appl. No. 16/369,473, mailed on Jan. 25, 2022, 19 pages.
Final Office Action received for U.S. Appl. No. 16/422,736, mailed on Jan. 11, 2021, 39 pages.
Final Office Action received for U.S. Appl. No. 15/250,152, mailed on Aug. 23, 2017, 24 pages.
Final Office Action received for U.S. Appl. No. 15/250,152, mailed on Nov. 16, 2018, 30 pages.
Han Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages (Official Copy only) See Communication under 37 CFR § 1.98(a) (3).
How to Smartphone, "Samsung Galaxy S7—screen rotation on / off", Available Online at <https://www.youtube.com/watch?v=np54sEEI11E >, see video from 1:10 to 1:30., Dec. 12, 2016, 3 pages.
IDEX,"IDEX Fingerprint Sensor Mobile Glass Display", Youtube, available at: https://www.youtube.com/watch?v=XIdAIP5sFzw, Apr. 11, 2013, 2 pages.

(56) References Cited

OTHER PUBLICATIONS

Intention to Grant received for Danish Patent Application No. PA201670628, mailed on Aug. 28, 2017, 2 pages.
Intention to Grant received for Danish Patent Application No. PA201770418, mailed on Aug. 22, 2019, 2 pages.
Intention to Grant received for Danish Patent Application No. PA201770418, mailed on Nov. 16, 2018, 3 pages.
Intention to Grant received for Danish Patent Application No. PA201770419, mailed on Mar. 28, 2018, 2 pages.
Intention to Grant received for Danish Patent Application No. PA201770714, mailed on Feb. 15, 2019, 2 pages.
Intention to Grant received for Danish Patent Application No. PA201770714, mailed on Nov. 2, 2018, 2 pages.
Intention to Grant received for Danish Patent Application No. PA201770715, mailed on Nov. 13, 2018, 2 pages.
Intention to Grant received for Danish Patent Application No. PA201770782, mailed on Aug. 8, 2019, 2 pages.
Intention to Grant received for Danish Patent Application No. PA201870370, mailed on Jan. 2, 2019, 2 pages.
Intention to Grant received for Danish Patent Application No. PA201870371, mailed on Jan. 2, 2019, 2 pages.
Intention to Grant received for Danish Patent Application No. PA201870855, mailed on Jul. 13, 2020, 2 pages.
Intention to Grant received for Danish Patent Application No. PA201970127, mailed on Apr. 21, 2020, 2 pages.
Intention to Grant received for European Patent Application No. 121815385, mailed on Feb. 20, 2015, 8 pages.
Intention to Grant received for European Patent Application No. 127734606, mailed on Feb. 4, 2019, 8 pages.
Intention to Grant received for European Patent Application No. 127734606, mailed on Jun. 17, 2019, 4 pages.
Intention to Grant received for European Patent Application No. 131711459, mailed on Feb. 21, 2019, 8 pages.
Intention to Grant received for European Patent Application No. 148532153, mailed on Jun. 27, 2018, 9 pages.
Intention to Grant received for European Patent Application No. 151684750, mailed on Feb. 4, 2020, 9 pages.
Intention to Grant received for European Patent Application No. 151684750, mailed on Jan. 22, 2021, 8 pages.
Intention to Grant received for European Patent Application No. 151684750, mailed on Jul. 7, 2021, 8 pages.
Intention to Grant received for European Patent Application No. 157193475, mailed on Dec. 8, 2020, 7 pages.
Intention to Grant received for European Patent Application No. 157193475, mailed on Jun. 8, 2021, 7 pages.
Intention to Grant received for European Patent Application No. 157193475, mailed on May 11, 2021, 8 pages.
Intention to Grant received for European Patent Application No. 178536546, mailed on Nov. 23, 2020, 8 pages.
Intention to Grant received for European Patent Application No. 181902503, mailed on May 15, 2020, 9 pages.
Intention to grant received for European Patent Application No. 187043351, mailed on Apr. 17, 2020, 6 pages.
Intention to Grant received for European Patent Application No. 187134085, mailed on Oct. 28, 2021, 10 pages.
Intention to Grant received for European Patent Application No. 18830326.7, mailed on Sep. 15, 2021, 11 pages.
Intention to Grant received for European Patent Application No. 201964764, mailed on Aug. 25, 2021, 9 pages.
International Preliminary Report on Patentability received for PCT Patent Application No. PCT/US2018/014658, mailed on Nov. 28, 2019, 14 pages.
International Preliminary Report on Patentability received for PCT Patent Application No. PCT/US2018/049289, mailed on Mar. 19, 2020, 9 pages.
International Preliminary Report on Patentability received for PCT Patent Application No. PCT/US2008/075738, completed on Jan. 28, 2010, 15 pages.
International Preliminary Report on Patentability received for PCT Patent Application No. PCT/US2012/057319, mailed on Apr. 10, 2014, 6 pages.
International Preliminary Report on Patentability received for PCT Patent Application No. PCT/US2012/057656, mailed on Apr. 10, 2014, 6 pages.
International Preliminary Report on Patentability received for PCT Patent Application No. PCT/US2014/054800, mailed on Mar. 31, 2016, 27 pages.
International Preliminary Report on Patentability received for PCT Patent Application No. PCT/US2015/025188, mailed on Mar. 2, 2017, 8 pages.
International Preliminary Report on Patentability received for PCT Patent Application No. PCT/US2015/033326, mailed on Dec. 8, 2016, 11 pages.
International Preliminary Report on Patentability received for PCT Patent Application No. PCT/US2015/033380, mailed on Dec. 8, 2016, 10 pages.
International Preliminary Report on Patentability received for PCT Patent Application No. PCT/US2017/032240, mailed on Nov. 29, 2018, 29 pages.
International Preliminary Report on Patentability received for PCT Patent Application No. PCT/US2017/049760, mailed on Apr. 4, 2019, 9 pages.
International Preliminary Report on Patentability received for PCT Patent Application No. PCT/US2018/015603, mailed on Mar. 19, 2020, 8 pages.
International Preliminary Report on Patentability received for PCT Patent Application No. PCT/US2019/012571, mailed on Aug. 6, 2020, 10 pages.
International Preliminary Report on Patentability received for PCT Patent Application No. PCT/US2019/035092, mailed on Dec. 17, 2020, 10 pages.
International Preliminary Report on Patentability received for PCT Patent Application No. PCT/US2019/049227, mailed on Apr. 8, 2021, 11 pages.
International Preliminary Report on Patentability received for PCT Patent Application No. PCT/US2019/049239, mailed on Apr. 8, 2021, 12 pages.
International Search Report and Written Opinion received for PCT Application No. PCT/US2015/033326, mailed on Aug. 10, 2015, 13 pages.
International Search Report and Written Opinion received for PCT Patent Application No. PCT/US17/49760, mailed on Jan. 19, 2018, 12 pages.
International Search Report and Written Opinion received for PCT Patent Application No. PCT/US2008/075738, mailed on Jul. 2, 2009, 14 pages.
International Search Report and Written Opinion received for PCT Patent Application No. PCT/US2012/057319, mailed on Feb. 25, 2013, 7 pages.
International Search Report and Written Opinion received for PCT Patent Application No. PCT/US2012/057656, mailed on Feb. 25, 2013, 7 pages.
International Search Report and Written Opinion received for PCT Patent Application No. PCT/US2014/054800, mailed on Jan. 29, 2015, 33 pages.
International Search Report and Written Opinion received for PCT Patent Application No. PCT/US2015/025188, mailed on Jun. 23, 2015, 11 pages.
International Search Report and Written Opinion received for PCT Patent Application No. PCT/US2015/033380, mailed on Aug. 10, 2015, 13 pages.
International Search Report and Written Opinion received for PCT Patent Application No. PCT/US2017/032240, mailed on Sep. 21, 2017, 33 pages.
International Search Report and Written Opinion received for PCT Patent Application No. PCT/US2018/014658, mailed on Jun. 6, 2018, 20 pages.
International Search Report and Written Opinion received for PCT Patent Application No. PCT/US2018/015603, mailed on Jun. 22, 2018, 13 pages.

(56) References Cited

OTHER PUBLICATIONS

International Search Report and Written Opinion received for PCT Patent Application No. PCT/US2018/049289, mailed on Feb. 19, 2019, 12 pages.
International Search Report and Written Opinion received for PCT Patent Application No. PCT/US2019/012571, mailed on May 6, 2019, 15 pages.
International Search Report and Written Opinion received for PCT Patent Application No. PCT/US2019/035092, mailed on Jan. 16, 2020, 16 pages.
International Search Report and Written Opinion received for PCT Patent Application No. PCT/US2019/049227, mailed on Dec. 12, 2019, 14 pages.
International Search Report and Written Opinion received for PCT Patent Application No. PCT/US2019/049239, mailed on Jan. 22, 2020, 18 pages.
Invitation to Pay Addition Fees received for PCT Patent Application No. PCT/US2018/014658, mailed on Apr. 11, 2018, 14 pages.
Invitation to Pay Additional Fee received for PCT Patent Application No. PCT/US17/32240, mailed on Jul. 12, 2017, 2 pages.
Invitation to Pay Additional Fee received for PCT Patent Application No. PCT/US2019/035092, mailed on Nov. 20, 2019, 6 pages.
Invitation to pay Additional fees received for PCT Patent Application No. PCT/US17/49760, mailed on Nov. 21, 2017, 2 pages.
Invitation to Pay Additional Fees received for PCT Patent Application No. PCT/US2014/054800, mailed on Oct. 31, 2014, 2 pages.
Invitation to Pay Additional Fees received for PCT Patent Application No. PCT/US2019/049239, mailed on Dec. 4, 2019, 10 pages.
Invitation to Pay Search Fees received for European Patent Application No. 19731554.2, mailed on Dec. 16, 2021, 3 pages.
IPhone 4S Tips 'N' Tricks: Access the Camera from the Lock Screen—Phones 4u, Youtube, available at: https://www.youtube.com/watch?v=C8eDN4Vu2mg, Dec. 9, 2011, 2 pages.
Iphoneblog, "iOS 5.0.1 Security Flaw—Bypass the Passcode—Access Camera Roll", Youtube, available at: https://www.youtube.com/watch?v=qd0Fwgaymb0, Feb. 24, 2012, 2 pages.
Kawai Yasuhiro, "Resolving anxieties regarding card payment abuse by authentication—overcoming cumbersomeness by cooperation with mobile phones", Nikkei Internet Solutions No. 78, Japan, Nikkei BP, No. 78, Dec. 22, 2003, pp. 28-31(Official Copy only) See Communication under 37 CFR § 1.98(a) (3).
Komachi Aneem, "Time Attendance—Face Recognition—Biometrics", Available at: https://www.youtube.com/watch?v=asclTiiiSbc, Feb. 9, 2010, 1 page.
Kurihara Ryo, "Torisetsu of Os X that we want to know", Mac Fan, Japan, Mai Navi Co., Ltd., vol. 21, No. 6, Jun. 1, 2013, 8 pages (Official Copy only) See Communication under 37 CFR § 1.98(a) (3).
Lu Haiyun, "Recommendations Based on Purchase Patterns", International Journal of Machine Learning and Computing, vol. 4, No. 6, Online available at: http://www.ijmlc.org/papers/462-C015.pdf, Dec. 2014, pp. 501-504.
Managing Windows User Accounts on Your Home Computer, Available online at: https://www.informit.com/articles/article.aspx?p=478948&seqNum=8, Jun. 23, 2006, 2 pages.
Minutes of the Oral Proceedings received for European Application No. 12770400.5, mailed on Nov. 6, 2018, 7 pages.
Minutes of the Oral Proceedings received for European Patent Application No. 15727291.5, mailed on Jun. 29, 2020, 8 pages.
Minutes of the Oral Proceedings received for European Patent Application No. 15728352.4, mailed on May 27, 2020, 3 pages.
Minutes of the Oral Proceedings received for European Patent Application No. 16201159.7, mailed on Sep. 23, 2021, 6 pages.
Minutes of the Oral Proceedings received for European Patent Application No. 16201205.8, mailed on Jun. 29, 2020, 6 pages.
Naver Blog, "How to Use Smart Wallet and Registered Card", Online Available at: http://feena74.blog.me/140185758401, Mar. 29, 2013, 20 pages.
Nhdanh-Protocol Corp, "How to Enroll Face Enbioaccess T9 Nitgen Korea—Đăng Ký Khuôn Mặt Enbioaccess T9 Nitgen", Available online at: https://www.youtube.com/watch?v=mFn03PD4NIE, Mar. 30, 2017, 1 page.
Non-Final Office Action received for U.S. Appl. No. 12/207,374, mailed on Apr. 15, 2011, 13 pages.
Non-Final Office Action received for U.S. Appl. No. 12/207,374, mailed on Jun. 7, 2013, 26 pages.
Non-Final Office Action received for U.S. Appl. No. 12/207,374, mailed on May 24, 2012, 20 pages.
Non-Final Office Action received for U.S. Appl. No. 14/311,214, mailed on Apr. 10, 2015, 12 pages.
Non-Final Office Action received for U.S. Appl. No. 14/503,072, mailed on Jan. 26, 2015, 12 pages.
Non-Final Office Action received for U.S. Appl. No. 14/503,296, mailed on Jan. 30, 2015, 16 pages.
Non-Final Office Action received for U.S. Appl. No. 15/899,966, mailed on May 4, 2018, 10 pages.
Non-Final Office Action received for U.S. Appl. No. 15/900,047, mailed on May 8, 2018, 7 pages.
Non-Final Office Action received for U.S. Appl. No. 14/503,364, mailed on Feb. 3, 2016, 16 pages.
Non-Final Office Action received for U.S. Appl. No. 12/074,985, mailed on Apr. 19, 2011, 24 pages.
Non-Final Office Action received for U.S. Appl. No. 12/074,985, mailed on Mar. 18, 2013, 19 pages.
Non-Final Office Action received for U.S. Appl. No. 12/207,370, mailed on Aug. 2, 2012, 16 pages.
Non-Final Office Action received for U.S. Appl. No. 12/207,370, mailed on May 6, 2011, 15 pages.
Non-Final Office Action received for U.S. Appl. No. 12/207,370, mailed on Oct. 17, 2013, 17 pages.
Non-Final Office Action received for U.S. Appl. No. 13/243,045, mailed on Jun. 12, 2019, 11 pages.
Office Action received for U.S. Appl. No. 13/243,326, mailed on Feb. 14, 2013, 13 pages.
Non-Final Office Action received for U.S. Appl. No. 13/248,872, mailed on May 19, 2014, 6 pages.
Non-Final Office Action received for U.S. Appl. No. 13/248,882, mailed on Jul. 10, 2013, 14 pages.
Non-Final Office Action received for U.S. Appl. No. 14/090,344, mailed on Jan. 15, 2015, 13 pages.
Non-Final Office Action received for U.S. Appl. No. 14/142,669, mailed on Oct. 28, 2015, 14 pages.
Non-Final Office Action received for U.S. Appl. No. 14/142,669, mailed on Sep. 12, 2014, 11 pages.
Non-Final Office Action received for U.S. Appl. No. 14/285,378, mailed on Dec. 21, 2015, 18 pages.
Non-Final Office Action received for U.S. Appl. No. 14/285,378, mailed on Jan. 21, 2015, 19 pages.
Non-Final Office Action received for U.S. Appl. No. 14/311,214, mailed on Sep. 18, 2014, 10 pages.
Non-Final Office Action received for U.S. Appl. No. 14/479,088, mailed on Jul. 6, 2015, 10 pages.
Office Action received for U.S. Appl. No. 14/479,088, mailed on Nov. 18, 2014, 8 pages.
Office Action received for U.S. Appl. No. 14/480,183, mailed on Oct. 18, 2016, 12 pages.
Office Action received for U.S. Appl. No. 14/503,072, mailed on Jun. 17, 2016, 19 pages.
Office Action received for U.S. Appl. No. 14/503,296, mailed on Aug. 28, 2017, 14 pages.
Office Action received for U.S. Appl. No. 14/503,296, mailed on Oct. 5, 2016, 11 pages.
Office Action received for U.S. Appl. No. 14/503,296, mailed on Sep. 18, 2018, 20 pages.
Office Action received for U.S. Appl. No. 14/503,381, mailed on May 13, 2015, 13 pages.
Office Action received for U.S. Appl. No. 14/612,214, mailed on Jul. 29, 2015, 12 pages.
Office Action received for U.S. Appl. No. 14/612,214, mailed on Nov. 20, 2019, 11 pages.

(56) References Cited

OTHER PUBLICATIONS

Office Action received for U.S. Appl. No. 14/642,366, mailed on Aug. 24, 2015, 7 pages.
Non-Final Office Action received for U.S. Appl. No. 14/719,217, mailed on Jul. 26, 2018, 40 pages.
Non-Final Office Action received for U.S. Appl. No. 14/719,217, mailed on Jul. 28, 2016, 28 pages.
Non-Final Office Action received for U.S. Appl. No. 14/980,344, mailed on Mar. 14, 2018, 13 pages.
Non-Final Office Action received for U.S. Appl. No. 14/980,344, mailed on May 14, 2019, 11 pages.
Office Action received for U.S. Appl. No. 15/134,638, mailed on Sep. 20, 2016, 6 pages.
Office Action received for U.S. Appl. No. 15/137,944, mailed on Jul. 27, 2017, 13 pages.
Office Action received for U.S. Appl. No. 15/137,944, mailed on Oct. 18, 2016, 10 pages.
Office Action received for U.S. Appl. No. 15/269,801, mailed on Dec. 30, 2016, 17 pages.
Office Action received for U.S. Appl. No. 15/294,439, mailed on Jan. 26, 2018, 18 pages.
Office Action received for U.S. Appl. No. 15/470,752, mailed on Aug. 28, 2018, 12 pages.
Office Action received for U.S. Appl. No. 15/470,752, mailed on Jul. 28, 2017, 11 pages.
Office Action received for U.S. Appl. No. 15/714,887, mailed on May 27, 2020, 48 pages.
Office Action received for U.S. Appl. No. 15/714,887, mailed on May 30, 2019, 47 pages.
Office Action received for U.S. Appl. No. 15/845,794, mailed on Oct. 15, 2018, 8 pages.
Office Action received for U.S. Appl. No. 15/866,341, mailed on Nov. 13, 2018, 11 pages.
Office Action received for U.S. Appl. No. 15/872,685, mailed on Mar. 27, 2018, 9 pages.
Office Action received for U.S. Appl. No. 15/894,221, mailed on Jul. 25, 2018, 21 pages.
Office Action received for U.S. Appl. No. 15/903,456, mailed on Sep. 6, 2018, 20 pages.
Non-Final Office Action received for U.S. Appl. No. 15/992,722, mailed on Aug. 6, 2020, 7 pages.
Non-Final Office Action received for U.S. Appl. No. 16/035,419, mailed on Jan. 30, 2019, 24 pages.
Non-Final Office Action received for U.S. Appl. No. 16/125,267, mailed on Jul. 2, 2020, 20 pages.
Non-Final Office Action received for U.S. Appl. No. 16/125,267, mailed on Mar. 26, 2021, 20 pages.
Non-Final Office Action received for U.S. Appl. No. 16/125,267, mailed on Nov. 23, 2021, 21 pages.
Non-Final Office Action received for U.S. Appl. No. 16/147,023, mailed on Dec. 26, 2018, 17 pages.
Non-Final Office Action received for U.S. Appl. No. 16/147,115, mailed on Dec. 13, 2018, 12 pages.
Non-Final Office Action received for U.S. Appl. No. 16/164,561, mailed on Jan. 4, 2019, 14 pages.
Non-Final Office Action received for U.S. Appl. No. 16/241, 199, mailed on Aug. 20, 2020, 11 pages.
Office Action received for U.S. Appl. No. 16/369,355, mailed on Apr. 29, 2021, 16 pages.
Non-Final Office Action received for U.S. Appl. No. 16/369,473, mailed on Apr. 27, 2020, 12 pages.
Non-Final Office Action received for U.S. Appl. No. 16/369,473, mailed on Jun. 11, 2021, 19 pages.
Office Action received for U.S. Appl. No. 16/422,736, mailed on Jun. 23, 2020, 24 pages.
Non-Final Office Action received for U.S. Appl. No. 16/434,865, mailed on Jan. 16, 2020, 9 pages.
Office Action received for U.S. Appl. No. 16/542,084, mailed on Jan. 24, 2020, 21 pages.
Non-Final Office Action received for U.S. Appl. No. 16/553,622, mailed on May 29, 2020, 11 pages.
Non-Final Office Action received for U.S. Appl. No. 16/667,271, mailed on Dec. 13, 2019, 8 pages.
Office Action received for U.S. Appl. No. 16/670,949, mailed on Dec. 9, 2020, 11 pages.
Non-Final Office Action received for U.S. Appl. No. 16/987,003, mailed on May 10, 2021, 20 pages.
Non-Final Office Action received for U.S. Appl. No. 16/990,974, mailed on Oct. 15, 2020, 6 pages.
Non-Final Office Action received for U.S. Appl. No. 17/087,855, mailed on Dec. 24, 2021, 21 pages.
Non-Final Office Action received for U.S. Appl. No. 17/087,855, mailed on Jul. 12, 2021, 17 pages.
Non-Final Office Action received for U.S. Appl. No. 15/250,152, mailed on Apr. 6, 2018, 31 pages.
Non-Final Office Action received for U.S. Appl. No. 15/250,152, mailed on Mar. 2, 2017, 26 pages.
Non-Final Office Action received for U.S. Appl. No. 15/945,610, mailed on Sep. 20, 2018, 9 pages.
Non-Final Office Action received for U.S. Appl. No. 13/243,045, mailed on Mar. 17, 2015, 9 pages.
Notice of Acceptance received for Australian Patent Application No. 2008305338, mailed on Oct. 27, 2011, 1 page.
Notice of Acceptance received for Australian Patent Application No. 2014334869, mailed on Jan. 3, 2018, 3 pages.
Notice of Acceptance received for Australian Patent Application No. 2015266650, mailed on Jan. 18, 2018, 3 pages.
Notice of Acceptance received for Australian Patent Application No. 2015266693, mailed on Jan. 19, 2018, 3 pages.
Notice of Acceptance received for Australian Patent Application No. 2016201310, mailed on Feb. 21, 2018, 3 pages.
Notice of Acceptance received for Australian Patent Application No. 2016203896, mailed on Mar. 2, 2018, 3 pages.
Notice of Acceptance received for Australian Patent Application No. 2016203898 mailed on Feb. 21, 2018, 3 pages.
Notice of Acceptance received for Australian Patent Application No. 2017201064, mailed on Feb. 20, 2018, 3 pages.
Notice of Acceptance received for Australian Patent Application No. 2017266867, mailed on Mar. 6, 2019, 3 pages.
Notice of Acceptance received for Australian Patent Application No. 2017330208, mailed on Nov. 28, 2019, 3 pages.
Notice of Acceptance received for Australian Patent Application No. 2018202559, mailed on Oct. 21,2019, 3 pages.
Notice of Acceptance received for Australian Patent Application No. 2020201306, mailed on Mar. 12, 2020, 3 pages.
Notice of Acceptance received for Australian Patent Application No. 2020201721, mailed on Jul. 6, 2021, 3 pages.
Notice of Acceptance received for Australian Patent Application No. 2020204256, mailed on Oct. 9, 2021, 3 pages.
Notice of Acceptance received for Australian Patent Application No. 2020239783, mailed on Mar. 2, 2021, 3 pages.
Notice of Acceptance received for Australian Patent Application No. 2020289822, mailed on Dec. 22, 2021, 3 pages.
Notice of Allowance received for Australian Patent Application No. 2015202397, mailed on Feb. 15, 2017, 3 pages.
Notice of Acceptance received for Australian Patent Application No. 2018229544, mailed on May 4, 2020, 3 pages.
Notice of Acceptance received for Australian Patent Application No. 2018270420, mailed on Jul. 21, 2021, 3 pages.
Notice of Acceptance received for Australian Patent Application No. 2018279788, mailed on Nov. 6, 2019, 3 pages.
Notice of Acceptance received for Australian Patent Application No. 2018312629, mailed on Nov. 7, 2019, 4 pages.
Notice of Acceptance received for Australian Patent Application No. 2019200360, mailed on Mar. 15, 2019, 3 pages.
Notice of Acceptance received for Australian Patent Application No. 2019201101, mailed on May 6,2019, 3 pages.
Notice of Acceptance received for Australian Patent Application No. 2019203473, mailed on Nov. 7, 2019, 3 pages.
Notice of Acceptance received for Australian Patent Application No. 2019204387, mailed on Dec. 4, 2020, 3 pages.

(56) References Cited

OTHER PUBLICATIONS

Notice of Acceptance received for Australian Patent Application No. 2019346842, mailed on Jan. 21, 2021, 3 pages.
Notice of Acceptance received for Australian Patent Application No. 2020200685, mailed on Oct. 29,2020, 3 pages.
Notice of Acceptance received for Australian Patent Application No. 2020200795, mailed on Feb. 28, 2020, 3 pages.
Notice of Allowance received for Chinese Patent Application No. 200880108306.1, mailed on Oct. 28, 2014, 2 pages (Official Copy only) See Communication under 37 CFR § 1.98(a) (3).
Notice of Allowance received for Chinese Patent Application No. 201280047459.6, mailed on Jan. 31, 2018, 2 pages (1 page of English Translation and 1 page of Official Copy).
Notice of Allowance received for Chinese Patent Application No. 201410407626.4, mailed on Aug. 27, 2020, 2 pages (1 pages of English Translation and 1 pages of Official Copy).
Notice of Allowance received for Chinese Patent Application No. 201480058054.1, mailed on Jul. 8, 2019, 2 pages (1 page of English Translation and 1 page of Official Copy).
Notice of Allowance received for Chinese Patent Application No. 201520357381.9, mailed on Jul. 29, 2015, 4 pages (2 pages of English Translation and 2 pages of Official Copy).
Notice of Allowance received for Chinese Patent Application No. 201520358683.8, issued on Mar. 10, 2016, 5 pages (3 pages of English Translation and 2 pages of Official Copy).
Notice of Allowance received for Chinese Patent Application No. 201580043701.6, mailed on Jan. 26, 2022, 2 pages (1 page of English Translation and 1 page of Official Copy).
Notice of Allowance received for Chinese Patent Application No. 201620480708.6, mailed on Apr. 20, 2017, 3 pages (2 pages of English translation and 1 page of Official Copy).
Notice of Allowance received for Chinese Patent Application No. 201620480846.4, mailed on Apr. 20, 2017, 3 pages (2 pages of English Translation and 1 page of Official Copy).
Notice of Allowance received for Chinese Patent Application No. 201710093861.2, mailed on Sep. 24, 2019, 4 pages (1 page of English Translation and 3 pages of Official Copy).
Notice of Allowance received for Chinese Patent Application No. 201780002398.4, mailed on Jun. 17, 2019, 2 pages (1 page of English Translation and 1 page of Official Copy).
Notice of Allowance received for Chinese Patent Application No. 201810338038.8, mailed on Jun. 30, 2020, 2 pages (1 page of English Translation and 1 page of Official Copy).
Notice of Allowance received for Chinese Patent Application No. 201810954931.3, mailed on Jun. 23, 2021, 4 pages (1 page of English Translation and 3 pages of Official Copy).
Notice of Allowance received for Chinese Patent Application No. 201810955077.2, mailed on Jul. 14, 2021, 2 pages (1 page of English Translation and 1 page of Official Copy).
Notice of Allowance received for Chinese Patent Application No. 201811460172.1, mailed on Jan. 11, 2021, 2 pages (1 page of English Translation and 1 page of Official Copy).
Notice of Allowance received for Chinese Patent Application No. 201910278273.5, mailed on Nov. 19, 2020, 2 pages (1 page of English Translation and 1 page of Official Copy).
Notice of Allowance received for Chinese Patent Application No. 201910744886.3, mailed on Jun. 3, 2021, 2 pages (1 page of English Translation and 1 page of Official Copy).
Notice of Allowance received for Chinese Patent Application No. 201910899698.8, mailed on Oct. 23, 2020, 4 pages (1 page of English Translation and 3 pages of Official Copy).
Notice of Allowance received for Japanese Patent Application No. 2013-098406, mailed on Jan. 23, 2017, 18 pages (Official Copy only) See Communication under 37 CFR § 1.98(a) (3).
Notice of Allowance received for Japanese Patent Application No. 2015-083696, mailed on Jan. 6, 2017, 3 pages (Official Copy Only) See Communication under 37 CFR § 1.98(a) (3).
Notice of Allowance received for Japanese Patent Application No. 2016-131998, mailed on Nov. 30, 2018, 4 pages (1 page of English Translation and 3 pages of Official Copy).
Notice of Allowance received for Japanese Patent Application No. 2016-224506, mailed on Jan. 24, 2020, 4 pages (1 page of English Translation and 3 pages of Official Copy).
Notice of Allowance received for Japanese Patent Application No. 2016-224507, mailed on Mar. 26, 2019, 3 pages (1 page of English Translation and 2 pages of Official Copy).
Notice of Allowance received for Japanese Patent Application No. 2016-224508, mailed on Jun. 20, 2017, 3 pages (Official Copy only) See Communication under 37 CFR § 1.98(a) (3).
Notice of Allowance received for Japanese Patent Application No. 2016-540927, mailed on May 14, 2018, 4 pages (1 page of English Translation and 3 pages of Official Copy).
Notice of Allowance received for Japanese Patent Application No. 2016-558332, mailed on Jan. 11, 2019, 4 pages (1 page of English Translation and 3 pages of Official Copy).
Notice of Allowance received for Japanese Patent Application No. 2016-569665, mailed on Feb. 22, 2019, 4 pages (1 page of English Translation and 3 Pages of Official Copy).
Notice of Allowance received for Japanese Patent Application No. 2017-013383, mailed on Mar. 31, 2017, 3 pages (Official Copy Only) See Communication under 37 CFR § 1.98(a) (3).
Notice of Allowance received for Japanese Patent Application No. 2017-085582, mailed on Nov. 30, 2018, 4 pages (1 page of English Translation and 3 pages of Official Copy).
Notice of Allowance received for Japanese Patent Application No. 2017-507413, mailed on Jul. 22, 2019, 4 pages (1 page of English Translation and 3 pages of Official Copy).
Notice of Allowance received for Japanese Patent Application No. 2018-113081, mailed on Nov. 8, 2021, 15 pages (1 page of English Translation and 14 pages of Official Copy).
Notice of Allowance received for Japanese Patent Application No. 2018-241505, mailed on Oct. 4, 2019, 4 pages (1 page of English Translation and 3 pages of Official Copy).
Notice of Allowance received for Japanese Patent Application No. 2018-551159, mailed on Jun. 15, 2020, 4 pages (1 page of English Translation and 3 pages of Official Copy).
Notice of Allowance received for Japanese Patent Application No. 2018-560107, mailed on Dec. 6, 2019, 4 pages (1 page of English Translation and 3 pages of Official Copy).
Notice of Allowance received for Japanese Patent Application No. 2019-053379, mailed on Nov. 16, 2020, 4 pages (1 page of English Translation and 3 pages of Official Copy).
Notice of Allowance received for Japanese Patent Application No. 2019-107235, mailed on May 15, 2020, 4 pages (1 page of English Translation and 3 pages of Official Copy).
Notice of Allowance received for Japanese Patent Application No. 2019-116580, mailed on Oct. 2, 2020, 4 pages (1 page of English Translation and 3 pages of Official Copy).
Notice of Allowance received for Japanese Patent Application No. 2019-194603, mailed on Apr. 19, 2021, 4 pages (1 page of English Translation and 3 pages of Official Copy).
Notice of Allowance received for Japanese Patent Application No. 2019-238894, mailed on Oct. 5, 2020, 4 pages (1 page of English Translation and 3 pages of Official Copy).
Notice of Allowance received for Japanese Patent Application No. 2019-510416, mailed on Oct. 12, 2020, 4 pages (1 page of English Translation and 3 pages of Official Copy).
Notice of Allowance received for Japanese Patent Application No. 2019-511975, mailed on Dec. 14, 2020, 4 pages (1 page of English Translation and 3 pages of Official Copy).
Notice of Allowance received for Japanese Patent Application No. 2020-103213, mailed on Oct. 25, 2021, 4 pages (1 page of English Translation and 3 pages of Official Copy).
Notice of Allowance received for Japanese Patent Application No. 2020-126751, mailed on Aug. 16, 2021, 4 pages (1 page of English Translation and 3 pages of Official Copy).
Notice of allowance received for Japanese Patent Application No. 2020-159979, mailed on Nov. 8, 2021, 4 pages (1 page of English Translation and 3 pages of Official Copy).
Notice of Allowance received for Japanese Patent Application No. 2020-183773, mailed on Dec. 23, 2021, 4 pages (1 page of English Translation and 3 pages of Official Copy).

(56) References Cited

OTHER PUBLICATIONS

Notice of Allowance received for Japanese Patent Application No. 2020-569806, mailed on Jul. 12, 2021, 4 pages (1 page of English Translation and 3 pages of Official Copy).
Notice of Allowance received for Japanese Patent Application No. 2021-015128, mailed on Sep. 3, 2021, 4 pages (1 page of English Translation and 3 pages of Official Copy).
Notice of Allowance received for Japanese Patent Application No. 2021-163037, mailed on Dec. 6, 2021, 4 pages (1 page of English Translation and 3 pages of Official Copy).
Notice of Allowance received for Korean Patent Application No. 10-2010-7008899, mailed on Feb. 12, 2016, 3 pages (1 page of English Translation and 2 pages of official Copy).
Notice of Allowance received for Korean Patent Application No. 10-2014-7004771, mailed on Oct. 29, 2015, 3 pages (1 page of English Translation and 2 pages of Official Copy).
Notice of Allowance received for Korean Patent Application No. 10-2014-7004772, mailed on Feb. 12, 2016, 4 pages (1 page of English Translation and 3 pages of Official Copy).
Notice of Allowance received for Korean Patent Application No. 10-2014-7004773, mailed on Jan. 7, 2016, 3 pages (1 page of English Translation and 2 pages of Official Copy).
Notice of Allowance received for Korean Patent Application No. 10-2014-7025441, issued on Feb. 26, 2016, 3 pages ( 1 page of English Translation and 2 pages of Official Copy).
Notice of Allowance received for Korean Patent Application No. 10-2015-7004548, issued on Feb. 26, 2016, 3 pages ( 1 page of English Translation and 2 pages of Official Copy).
Notice of Allowance received for Korean Patent Application No. 10-2016-7009347, mailed on May 10, 2018, 4 pages (1 page of English Translation and 3 pages of Official Copy).
Notice of Allowance received for Korean Patent Application No. 10-2016-7009632, mailed on Aug. 17, 2018, 4 pages (1 page of English Translation and 3 pages of Official Copy).
Notice of Allowance received for Korean Patent Application No. 10-2016-7035555, mailed on Sep. 23, 2019, 3 pages (1 page of English Translation and 2 pages of Official Copy).
Notice of Allowance received for Korean Patent Application No. 10-2017-0022365, mailed on Mar. 27, 2018, 4 pages (1 page of English Translation and 3 pages of Official Copy).
Notice of Allowance received for Korean Patent Application No. 10-2017-0022546, mailed on Feb. 27, 2018, 4 pages (1 page of English Translation and 3 pages of Official Copy).
Notice of Allowance received for Korean Patent Application No. 10-2017-0022582, mailed on Feb. 27, 2020, 5 pages (2 pages of English Translation and 3 pages of Official Copy).
Notice of Allowance received for Korean Patent Application No. 10-2017-7012145, mailed on Oct. 30, 2019, 3 pages (1 page of English Translation and 2 pages of Official Copy).
Notice of Allowance received for Korean Patent Application No. 10-2017-7015582, mailed on Dec. 27, 2018, 5 pages (2 pages of English Translation and 3 pages of Official Copy).
Notice of Allowance received for Korean Patent Application No. 10-2018-7022895, mailed on Feb. 22, 2019, 4 pages (1 page of English Translation and 3 pages of Official Copy).
Notice of Allowance received for Korean Patent Application No. 10-2018-7028845, mailed on Apr. 16, 2020, 5 pages (2 pages of English Translation and 3 pages of Official Copy).
Notice of Allowance received for Korean Patent Application No. 10-2018-7032467, mailed on Jan. 28, 2019, 4 pages (1 page of English Translation and 3 pages of Official Copy).
Notice of Allowance received for Korean Patent Application No. 10-2018-7033301, mailed on Feb. 20, 2019, 5 pages (2 pages of English Translation and 3 pages of Official Copy).
Notice of Allowance received for Korean Patent Application No. 10-2019-7003374, mailed on Oct. 4, 2019, 9 pages (2 pages of English Translation and 7 pages of Official Copy).
Notice of Allowance received for Korean Patent Application No. 10-2019-7003836, mailed on Oct. 4, 2019, 4 pages (1 page of English Translation and 3 pages of Official Copy).
Notice of Allowance received for Korean Patent Application No. 10-2019-7004734, mailed on Oct. 24, 2019, 6 pages (2 pages of English Translation and 4 pages of Official Copy).
Notice of Allowance received for Korean Patent Application No. 10-2019-7005136, mailed on Feb. 19, 2021, 5 pages (2 pages of English Translation and 3 pages of Official Copy).
Notice of Allowance received for Korean Patent Application No. 10-2019-7005925, mailed on Jan. 21, 2020, 6 pages (2 pages of English Translation and 4 pages of Official Copy).
Notice of Allowance received for Korean Patent Application No. 10-2019-7014494, mailed on Mar. 19, 2020, 4 pages (1 page of English Translation and 3 pages of Official Copy).
Notice of Allowance received for Korean Patent Application No. 10-2019-7014988, mailed on Jan. 19, 2020, 4 pages (1 page of English Translation and 3 pages of Official Copy).
Notice of Allowance received for Korean Patent Application No. 10-2019-7038021, mailed on May 2, 2020, 5 pages (1 page of English Translation and 4 pages of Official Copy).
Notice of Allowance received for Korean Patent Application No. 10-2020-0048600, mailed on Apr. 30, 2020, 5 pages (2 pages of English Translation and 3 pages of Official Copy).
Notice of Allowance received for Korean Patent Application No. 10-2020-0097418, mailed on Apr. 27, 2021, 5 pages (2 pages of English Translation and 3 pages of Official Copy).
Notice of Allowance received for Korean Patent Application No. 10-2020-7002929, mailed on Nov. 26, 2020, 3 pages (1 page of English Translation and 2 pages of Official Copy).
Notice of Allowance received for Korean Patent Application No. 10-2020-7011172, mailed on Aug. 25, 2020, 7 pages (2 pages of English Translation and 5 pages of Official Copy).
Notice of Allowance received for Korean Patent Application No. 10-2020-7011424, mailed on Jan. 21, 2021, 4 pages (1 page of English Translation and 3 pages of Official Copy).
Notice of Allowance received for Korean Patent Application No. 10-2020-7017803, mailed on Nov. 5, 2020, 6 pages (2 pages of English Translation and 4 pages of Official Copy).
Notice of Allowance received for Korean Patent Application No. 10-2020-7022596, mailed on Jan. 27, 2022, 7 pages (2 pages of English Translation and 5 pages of Official Copy).
Notice of Allowance received for Korean Patent Application No. 10-2020-7027862, mailed on Jun. 29, 2021, 5 pages (1 page of English Translation and 4 pages of Official Copy).
Notice of Allowance received for Korean Patent Application No. 10-2020-7036748, mailed on Jan. 25, 2021, 3 pages (1 page of English Translation and 2 pages of Official Copy).
Notice of Allowance received for Korean Patent Application No. 10-2021-0099243, mailed on Oct. 30, 2021, 4 pages (1 page of English Translation and 3 pages of Official Copy).
Notice of Allowance received for Korean Patent Application No. 10-2021-7005691, mailed on Mar. 29, 2021, 3 pages (1 page of English Translation and 2 pages of Official Copy).
Notice of Allowance received for Korean Patent Application No. 10-2021-7011888, mailed on Jan. 27, 2022, 5 pages (1 page of English Translation and 4 pages of Official Copy).
Notice of Allowance received for Korean Patent Application No. 10-2021-7020549, mailed on Jul. 13, 2021, 3 pages (1 page of English Translation and 2 pages of Official Copy).
Notice of Allowance received for Korean Patent Application No. 10-2021-7024020, mailed on Jan. 14, 2022, 4 pages (1 page of English Translation and 3 pages of Official Copy).
Notice of Allowance received for Korean Patent Application No. 10-2014-7008348, mailed on Feb. 21, 2019, 5 pages (2 pages of English Translation and 3 pages of Official Copy).
Notice of Allowance received for Taiwan Patent Application No. 097134592, mailed on Aug. 12, 2014, 3 pages (Official Copy only) See Communication under 37 CFR § 1.98(a) (3).
Notice of Allowance received for Taiwan Patent Application No. 101107082, mailed on Oct. 22, 2014, 2 pages (Official Copy only) See Communication under 37 CFR § 1.98(a) (3).
Notice of Allowance received for Taiwanese Patent Application No. 103131074, mailed on Nov. 17, 2015, 3 pages (Official Copy only) See Communication under 37 CFR § 1.98(a) (3).

(56) References Cited

OTHER PUBLICATIONS

Notice of Allowance received for Taiwanese Patent Application No. 103136545, mailed on Nov. 27, 2017, 4 pages (1 page of English Translation of Search Report and 3 pages of Official Copy).
Notice of Allowance received for Taiwanese Patent Application No. 104114953, mailed on Oct. 17, 2017, 3 pages (Official Copy only) See Communication under 37 CFR § 1.98(a) (3).
Notice of Allowance received for Taiwanese Patent Application No. 104117508, mailed on Sep. 18, 2019, 5 pages (2 pages of English Translation and 3 pages of Official Copy).
Notice of Allowance received for Taiwanese Patent Application No. 104140890, mailed on Oct. 25, 2017, 5 pages (Official Copy Only) See Communication under 37 CFR § 1.98(a) (3).
Notice of Allowance received for Taiwanese Patent Application No. 106141250, mailed on May 24, 2018, 7 pages (3 pages of English Translation and 4 pages of Official Copy).
Notice of Allowance received for Taiwanese Patent Application No. 107121719, mailed on Sep. 27, 2018, 7 pages (3 pages of English Translation and 4 pages of Official Copy).
Notice of Allowance received for Taiwanese Patent Application No. 107138003, mailed on Aug. 30, 2019, 4 pages (1 page of English Translation and 3 pages of Official Copy).
Notice of Allowance received for the U.S. Appl. No. 14/503,381, mailed on Dec. 16, 2015, 8 pages.
Notice of Allowance received for U.S. Appl. No. 14/142,661, mailed on Aug. 3, 2015, 10 pages.
Notice of Allowance received for U.S. Appl. No. 14/479,088, mailed on Nov. 12, 2015, 7 pages.
Notice of Allowance received for U.S. Appl. No. 12/074,985, mailed on Jul. 30, 2013, 8 pages.
Notice of Allowance received for U.S. Appl. No. 12/207,370, mailed on Jun. 7, 2013, 9 pages.
Notice of Allowance received for U.S. Appl. No. 12/207,370, mailed on Mar. 6, 2014, 5 pages.
Notice of Allowance received for U.S. Appl. No. 12/207,374, mailed on Aug. 29, 2014, 8 pages.
Notice of Allowance received for U.S. Appl. No. 12/207,374, mailed on Dec. 4, 2014, 8 pages.
Notice of Allowance received for U.S. Appl. No. 13/243,045, mailed on Aug. 4, 2021, 8 pages.
Notice of Allowance received for U.S. Appl. No. 13/243,326, mailed on Sep. 23, 2013, 11 pages.
Notice of Allowance received for U.S. Appl. No. 13/248,872, mailed on Dec. 4, 2014, 7 pages.
Notice of Allowance received for U.S. Appl. No. 13/248,882, mailed on Mar. 13, 2014, 16 pages.
Notice of Allowance received for U.S. Appl. No. 14/090,344, mailed on Aug. 26, 2015, 7 pages.
Notice of Allowance received for U.S. Appl. No. 14/142,657, mailed on Jan. 8, 2015, 5 pages.
Notice of Allowance received for U.S. Appl. No. 14/142,657, mailed on Jul. 23, 2015, 2 pages.
Notice of Allowance received for U.S. Appl. No. 14/142,657, mailed on June 29, 2015, 7 pages.
Notice of Allowance received for U.S. Appl. No. 14/142,657, mailed on Sep. 10, 2014, 9 pages.
Notice of Allowance received for U.S. Appl. No. 14/142,661, mailed on Sep. 28, 2015, 9 pages.
Notice of Allowance received for U.S. Appl. No. 14/142,669, mailed on Aug. 25, 2016, 2 pages.
Notice of Allowance received for U.S. Appl. No. 14/142,669, mailed on Jun. 14, 2016, 5 pages.
Notice of Allowance received for U.S. Appl. No. 14/142,669, mailed on Sep. 21, 2016, 2 pages.
Notice of Allowance received for U.S. Appl. No. 14/142,674, mailed on Feb. 18, 2015, 7 pages.
Notice of Allowance received for U.S. Appl. No. 14/142,674, mailed on Jan. 23, 2015, 7 pages.
Notice of Allowance received for U.S. Appl. No. 14/142,674, mailed on Sep. 26, 2014, 18 pages.
Notice of Allowance received for U.S. Appl. No. 14/255,765, mailed on Jun. 12, 2014, 10 pages.
Notice of Allowance received for U.S. Appl. No. 14/285,378, mailed May 19, 2016, 10 pages.
Notice of Allowance received for U.S. Appl. No. 14/479,088, mailed on Mar. 9, 2016, 2 pages.
Notice of Allowance received for U.S. Appl. No. 14/480,183, mailed on Nov. 29, 2017, 7 pages.
Notice of Allowance received for U.S. Appl. No. 14/503,072, mailed on Jun. 4, 2018, 6 pages.
Notice of Allowance received for U.S. Appl. No. 14/503,072, mailed on Mar. 26, 2018, 6 pages.
Notice of Allowance received for U.S. Appl. No. 14/503,296, mailed on Aug. 28, 2019, 12 pages.
Notice of Allowance received for U.S. Appl. No. 14/503,364, mailed on Jun. 16, 2016, 11 pages
Notice of Allowance received for U.S. Appl. No. 14/612,214, mailed on Apr. 15, 2020, 8 pages.
Notice of Allowance received for U.S. Appl. No. 14/642,366, mailed on Jan. 14, 2016, 8 pages.
Notice of Allowance received for U.S. Appl. No. 14/661,796, mailed on July 7, 2015, 10 pages.
Notice of Allowance received for U.S. Appl. No. 14/661,796, mailed on July 23, 2015, 2 pages.
Notice of Allowance received for U.S. Appl. No. 14/719,217, mailed on Feb. 13,2019, 13 pages.
Notice of Allowance received for U.S. Appl. No. 14/980,344, mailed on Mar. 23, 2020, 9 pages.
Notice of allowance received for U.S. Appl. No. 15/017,436, mailed on May 27, 2016, 17 pages.
Notice of Allowance received for U.S. Appl. No. 15/134,638, mailed on Apr. 10, 2018, 7 pages.
Notice of Allowance received for U.S. Appl. No. 15/134,638, mailed on Jul. 27, 2018, 7 pages.
Notice of Allowance received for U.S. Appl. No. 15/137,944, mailed on Dec. 21, 2017, 8 pages.
Notice of Allowance received for U.S. Appl. No. 15/250,152, mailed on May 1, 2019,12 pages.
Notice of Allowance received for U.S. Appl. No. 15/269,801, mailed on May 3, 2017, 6 pages.
Notice of Allowance received for U.S. Appl. No. 15/269,801, mailed on Sep. 7, 2017, 5 pages.
Notice of Allowance received for U.S. Appl. No. 15/294,439, mailed on Jan. 8, 2019, 8 pages.
Notice of Allowance received for U.S. Appl. No. 15/294,439, mailed on Sep. 10, 2018, 9 pages.
Notice of Allowance received for U.S. Appl. No. 15/357,873, mailed on Aug. 23, 2017, 10 pages.
Notice of Allowance received for U.S. Appl. No. 15/357,873, mailed on Jan. 8, 2018, 9 pages.
Notice of Allowance received for U.S. Appl. No. 15/470,752, mailed on Feb. 7, 2019, 11 pages.
Notice of Allowance received for U.S. Appl. No. 15/845,794, mailed on Feb. 14, 2019, 6 pages.
Notice of Allowance received for U.S. Appl. No. 15/866,341, mailed on Jul. 26, 2019, 8 pages.
Notice of Allowance received for U.S. Appl. No. 15/872,685, mailed on Mar. 8, 2019, 10 pages.
Notice of Allowance received for U.S. Appl. No. 15/894,221, mailed on Apr. 11 , 2019, 5 pages.
Notice of Allowance received for U.S. Appl. No. 15/894,221, mailed on Aug. 13, 2019, 2 pages.
Notice of Allowance received for U.S. Appl. No. 15/894,221, mailed on Feb. 1, 2019, 5 pages.
Notice of Allowance received for U.S. Appl. No. 15/894,221, mailed on Mar. 4, 2019, 2 pages.
Notice of Allowance received for U.S. Appl. No. 15/899,966, mailed on Mar. 21, 2019, 7 pages.
Notice of Allowance received for U.S. Appl. No. 15/899,996, mailed on Apr. 24, 2018, 9 pages.
Notice of Allowance received for U.S. Appl. No. 15/900,047, mailed on Dec. 5, 2018, 10 pages.

(56) References Cited

OTHER PUBLICATIONS

Notice of Allowance received for U.S. Appl. No. 15/903,456, mailed on May 1, 2019, 6 pages.
Notice of Allowance received for U.S. Appl. No. 15/945,610, mailed on May 20, 2019, 7 pages.
Notice of Allowance received for U.S. Appl. No. 15/992,722, mailed on Oct. 19, 2020, 5 pages.
Notice of Allowance received for U.S. Appl. No. 16/035,419, mailed on May 24, 2019, 14 pages.
Notice of Allowance received for U.S. Appl. No. 16/131,767, mailed on Sep. 6, 2019, 7 pages.
Notice of Allowance received for U.S. Appl. No. 16/147,023, mailed on Apr. 3, 2020, 2 pages.
Notice of Allowance received for U.S. Appl. No. 16/147,023, mailed on Aug. 13, 2020, 2 pages.
Notice of Allowance received for U.S. Appl. No. 16/147,023, mailed on Feb. 27, 2020, 2 pages.
Notice of Allowance received for U.S. Appl. No. 16/147,023, mailed on Jan. 31, 2020, 7 pages.
Notice of Allowance received for U.S. Appl. No. 16/147,023, mailed on Jul. 2, 2020, 2 pages.
Notice of Allowance received for U.S. Appl. No. 16/147,023, mailed on Jul. 21, 2020, 2 pages.
Notice of Allowance received for U.S. Appl. No. 16/147,023, mailed on Jun. 1, 2020, 2 pages.
Notice of Allowance received for U.S. Appl. No. 16/147,023, mailed on Jun. 18, 2020, 2 pages.
Notice of Allowance received for U.S. Appl. No. 16/147,023, mailed on Mar. 27, 2020, 2 pages.
Notice of Allowance received for U.S. Appl. No. 16/147,023, mailed on May 5, 2020, 2 pages.
Notice of Allowance received for U.S. Appl. No. 16/ 147,023, mailed on May 20, 2020, 7 pages.
Notice of Allowance received for U.S. Appl. No. 16/147,115, mailed on Oct. 30, 2019, 10 pages.
Notice of Allowance received for U.S. Appl. No. 16/164,561, mailed on April 8, 2020, 5 pages.
Notice of Allowance received for U.S. Appl. No. 16/241,199, mailed on May 13, 2021, 9 pages.
Notice of Allowance received for U.S. Appl. No. 16/369,355, mailed on Sep. 1, 2021, 10 pages.
Notice of Allowance received for U.S. Appl. No. 16/386,707, mailed on Dec. 31, 2020, 18 pages.
Notice of Allowance received for U.S. Appl. No. 16/422,736, mailed on Apr. 20, 2021, 12 pages.
Notice of Allowance received for U.S. Appl. No. 16/422,736, mailed on Jun. 15, 2021, 13 pages.
Notice of Allowance received for U.S. Appl. No. 16/434,865, mailed on Apr. 7, 2020, 5 pages.
Notice of Allowance received for U.S. Appl. No. 16/456,839, mailed on Apr. 15, 2021, 8 pages.
Notice of Allowance received for U.S. Appl. No. 16/456,839, mailed on Dec. 11, 2020, 10 pages.
Notice of Allowance received for U.S. Appl. No. 16/542,084, mailed on May 20, 2020, 7 pages.
Notice of Allowance received for U.S. Appl. No. 16/553,622, mailed on Sep. 11, 2020, 8 pages.
Notice of Allowance received for U.S. Appl. No. 16/667,271, mailed on May 12, 2020, 11 pages.
Notice of Allowance received for U.S. Appl. No. 16/670,949, mailed on May 27, 2021, 7 pages.
Notice of Allowance received for U.S. Appl. No. 16/670,949, mailed on Sep. 14, 2021, 7 pages.
Notice of Allowance received for U.S. Appl. No. 16/843,638, mailed on Feb. 4, 2022, 7 pages.
Notice of Allowance received for U.S. Appl. No. 16/843,638, mailed on Oct. 29, 2021, 28 pages.
Notice of Allowance received for U.S. Appl. No. 16/987,003, mailed on Aug. 18, 2021, 9 pages.
Notice of Allowance received for U.S. Appl. No. 16/990,974, mailed on Apr. 28, 2021, 5 pages.
Notice of Allowance received for U.S. Appl. No. 16/990,974, mailed on Jan. 22, 2021, 7 pages.
Notice of Allowance received for U.S. Appl. No. 17/015,429, mailed on Dec. 13, 2021, 2 pages.
Notice of Allowance received for U.S. Appl. No. 17/015,429, mailed on Dec. 24, 2021, 2 pages.
Notice of Allowance received for U.S. Appl. No. 17/015,429, mailed on Feb. 16, 2022, 5 pages.
Notice of Allowance received for U.S. Appl. No. 17/015,429, mailed on Jun. 17, 2021, 10 pages.
Notice of Allowance received for U.S. Appl. No. 17/015,429, mailed on Nov. 24, 2021, 2 pages.
Notice of Allowance received for U.S. Appl. No. 17/015,429, mailed on Oct. 8, 2021, 5 pages.
Notice of Allowance received for U.S. Appl. No. 17/015,429, mailed on Oct. 22, 2021, 2 pages.
Notice of Allowance received for U.S. Appl. No. 17/015,429, mailed on Sep. 22, 2021, 6 pages.
Notice of Allowance received for U.S. Appl. No. 14/311,214, mailed on Jan. 21, 2016, 7 pages.
Notice of Allowance received for U.S. Appl. No. 14/142,661, mailed on Dec. 3, 2015, 2 pages.
Notice of Allowance received for U.S. Appl. No. 14/479,088, mailed on Dec. 23, 2015, 5 pages.
Notice of Allowance received for U.S. Appl. No. 14/479,088, mailed on Jan. 11, 2016, 2 pages.
Notice of Allowance received for U.S. Appl. No. 14/873,023, mailed on Dec. 23, 2015, 10 pages.
Notice of Allowance received for U.S. Appl. No. 14/873,023, mailed on Jan. 14, 2016, 2 pages.
Notice of Preliminary Rejection received for Korean Patent Application No. 10-2014-7025441, mailed on Jun. 12, 2015, 9 pages (4 pages of English Translation and 5 pages of Official Copy).
Notice of Preliminary Rejection received for Korean Patent Application No. 10-2015-7004548, mailed on Jun. 12, 2015, 8 pages (4 pages of English Translation and 4 pages of Official Copy).
Notice of Preliminary Rejection received from Korean Patent Application No. 10-2015-7010262, mailed on Jun. 12, 2015, 5 pages (2 pages of English Translation and 3 pages of Official Copy).
Office Action received for European Patent Application No. 151684750, mailed on Oct. 5, 2018, 4 pages.
Office Action received for European Patent Application No. 157283524, mailed on Jan. 25, 2018, 10 pages.
Office Action received for Japanese Patent Application No. 2016-224507, mailed on Dec. 1, 2017, 14 pages (7 pages of English Translation and 7 pages of Official Copy).
Office Action received for Australian Patent Application No. 2008305338, mailed on Mar. 21, 2011, 3 pages.
Office Action received for Australian Patent Application No. 2008305338, mailed on Oct. 19, 2010, 3 pages.
Office Action received for Australian Patent Application No. 2012200716, issued on Jul. 16, 2014, 4 pages.
Office Action received for Australian Patent Application No. 2012200716, mailed on Nov. 15, 2013, 3 pages.
Office Action received for Australian Patent Application No. 2014204462, issued on May 8, 2015, 4 pages.
Office Action received for Australian Patent Application No. 2014204462, mailed on Apr. 29, 2016, 3 pages.
Office Action received for Australian Patent Application No. 2014334869, mailed on Jan. 11, 2017, 4 pages.
Office Action received for Australian Patent Application No. 2015100708, issued on Sep. 8, 2015, 4 pages.
Office Action received for Australian Patent Application No. 2015100709, issued on Sep. 9, 2015 (Examination Report 1), 4 pages.
Office Action received for Australian Patent Application No. 2015100709, issued on Sep. 9, 2015 (Examination Report 2), 4 pages.
Office Action received for Australian Patent Application No. 2015266650, mailed on Apr. 10, 2017, 4 pages.

(56) References Cited

OTHER PUBLICATIONS

Office Action received for Australian Patent Application No. 2015266693, mailed on Apr. 10, 2017, 4 pages.
Office Action received for Australian Patent Application No. 2015302298, mailed on Apr. 4, 2018, 3 pages.
Office Action received for Australian Patent Application No. 2015302298, mailed on Jul. 20, 2018, 3 pages.
Office Action received for Australian Patent Application No. 2015302298, mailed on Sep. 14, 2017, 3 pages.
Office Action received for Australian Patent Application No. 2015302298, mailed on Sep. 4, 2018, 5 pages.
Office Action received for Australian Patent Application No. 2016100367, issued on May 25, 2016, 3 pages.
Office Action received for Australian Patent Application No. 2016100367, mailed on Oct. 26, 2016, 3 pages.
Office Action received for Australian Patent Application No. 2016100383, issued on Jun. 9, 2016, 2 pages.
Office Action received for Australian Patent Application No. 2016100383, issued on Nov. 11, 2016, 3 pages.
Office Action received for Australian Patent Application No. 2016201310, mailed on Feb. 28, 2017, 3 pages.
Office Action received for Australian Patent Application No. 2016203896, mailed on Jan. 19, 2018, 4 pages.
Office Action received for Australian Patent Application No. 2016203896, mailed on Mar. 6, 2017, 3 pages.
Office Action received for Australian Patent Application No. 2016203898, mailed on Dec. 19, 2017, 4 pages.
Office Action received for Australian Patent Application No. 2016203898, mailed on Feb. 17, 2017, 3 pages.
Office Action received for Australian Patent Application No. 2017100070, mailed on Mar. 16, 2017, 6 pages.
Office Action received for Australian Patent Application No. 2017100553, mailed on Aug. 4, 2017, 5 pages.
Office Action received for Australian Patent Application No. 2017201064, mailed on Mar. 9, 2017, 2 pages.
Office Action received for Australian Patent Application No. 2017201068, mailed on Jan. 17, 2018, 5 pages.
Office Action received for Australian Patent Application No. 2017201068, mailed on Mar. 10, 2017, 2 pages.
Office Action received for Australian Patent Application No. 2017266867, mailed on Dec. 6, 2018, 3 pages.
Office Action received for Australian Patent Application No. 2017330208, mailed on Jul. 25, 2019, 5 pages.
Office Action received for Australian Patent Application No. 2018202559, mailed on Apr. 8, 2019, 4 pages.
Office Action Received for Australian Patent Application No. 2018202559, mailed on Jan. 16, 2019, 6 pages.
Office Action received for Australian Patent Application No. 2018202559, mailed on Jul. 19, 2019, 5 pages.
Office Action received for Australian Patent Application No. 2018202712, mailed on Mar. 22, 2019, 5 pages.
Office Action received for Australian Patent Application No. 2018202712, mailed on Nov. 15, 2019, 5 pages.
Office Action received for Australian Patent Application No. 2018202712, mailed on Nov. 20, 2018, 12 pages.
Office Action received for Australian Patent Application No. 2018202712, mailed on Sep. 2, 2019, 4 pages.
Office Action received for Australian Patent Application No. 2018203732, mailed on Feb. 26, 2019, 5 pages.
Office Action received for Australian Patent Application No. 2018203732, mailed on Jun. 6, 2019, 4 pages.
Office Action received for Australian Patent Application No. 2018203732, mailed on Jun. 21, 2018, 3 pages.
Office Action Received for Australian Patent Application No. 2018203732, mailed on Nov. 30, 2018, 3 pages.
Office Action received for Australian Patent Application No. 2018229544, mailed on Nov. 15, 2019, 4 pages.
Office Action received for Australian Patent Application No. 2018270420, mailed on Apr. 19, 2021, 4 pages.
Office Action received for Australian Patent Application No. 2018270420, mailed on Jan. 7, 2021, 5 pages.
Office Action received for Australian Patent Application No. 2018270420, mailed on Jul. 21, 2020, 5 pages.
Office Action received for Australian Patent Application No. 2018279788, mailed on Feb. 8, 2019, 4 pages.
Office Action received for Australian Patent Application No. 2018312629, mailed on Feb. 25, 2019, 4 pages.
Office Action received for Australian Patent Application No. 2019201101, mailed on Feb. 28, 2019, 3 pages.
Office Action received for Australian Patent Application No. 2019203473, mailed on Oct. 25, 2019, 2 pages.
Office Action received for Australian Patent Application No. 2019204387, mailed on Jun. 17, 2020, 7 pages.
Office Action received for Australian Patent Application No. 2019268070, mailed on Jan. 27, 2022, 3 pages.
Office Action received for Australian Patent Application No. 2019268070, mailed on Jan. 29, 2021, 6 pages.
Office Action received for Australian Patent Application No. 2019268070, mailed on Sep. 21, 2021 , 4 pages.
Office Action received for Australian Patent Application No. 2019281965, mailed on Nov. 30, 2021, 3 pages.
Office Action received for Australian Patent Application No. 2020200685, mailed on Apr. 20, 2020, 3 pages.
Office Action received for Australian Patent Application No. 2020200685, mailed on Aug. 12, 2020, 3 pages.
Office Action received for Australian Patent Application No. 2020200685, mailed on Feb. 10, 2020, 4 pages.
Office Action received for Australian Patent Application No. 2020201721, mailed on Feb. 26, 2021, 7 pages.
Office Action received for Australian Patent Application No. 2020203899, mailed on May 5, 2021, 10 pages.
Office Action received for Australian Patent Application No. 2020203899, mailed on Nov. 26, 2021, 4 pages.
Office Action received for Australian Patent Application No. 2020204256, mailed on Jun. 21, 2021, 2 pages.
Office Action received for Australian Patent Application No. 2020207785, mailed on Dec. 14, 2021, 5 pages.
Office Action received for Australian Patent Application No. 2020207785, mailed on Jul. 13, 2021, 3 pages.
Office Action received for Australian Patent Application No. 2020239783, mailed on Oct. 13, 2020, 4 pages.
Office Action received for Australian Patent Application No. 2020289822, mailed on Aug. 24, 2021, 7 pages.
Office Action received for Australian Patent Application No. 2021200415, mailed on Jan. 18, 2022, 3 pages.
Office Action received for Chinese Patent Application No. 200880108306.1, mailed on Aug. 24, 2011, 10 pages (English Translation only).
Office Action received for Chinese Patent Application No. 200880108306.1, mailed on Mar. 20, 2012, 8 pages (English Translation only).
Office Action received for Chinese Patent Application No. 200880108306.1, mailed on Mar. 27, 2014, 6 pages (3 pages of English Translation and 3 pages of Office Copy).
Office Action received for Chinese Patent Application No. 201410407626.4, mailed on May 21, 2018, 13 pages (4 pages of English Translation and 9 pages of Official Copy).
Office Action received for Chinese Patent Application No. 201410407626.4, mailed on Oct. 31, 2016, 10 pages (4 pages of English Translation and 6 pages of Official Copy).
Office Action received for Chinese Patent Application No. 201410407626.4, mailed on Sep. 11, 2017, 11 pages (3 pages of English Translation and 8 pages of Official Copy).
Office Action received for Chinese Patent Application No. 201480058054.1, mailed on Jan. 22, 2019, 6 pages (2 pages of English Translation and 4 pages of Official Copy).
Office Action received for Chinese Patent Application No. 201480058054.1, mailed on May 3, 2018, 18 pages (4 pages of English Translation and 14 pages of Official Copy).
Office Action received for Chinese Patent Application No. 201510284715.9, mailed on Apr. 14, 2020, 19 pages (7 pages of English Translation and 12 pages of Official Copy).

(56) References Cited

OTHER PUBLICATIONS

Office Action received for Chinese Patent Application No. 201510284715.9, mailed on Dec. 18, 2019, 24 pages (7 pages of English Translation and 17 pages of Official Copy).
Office Action received for Chinese Patent Application No. 201510284715.9, mailed on Dec. 21, 2018, 22 pages (5 pages of English Translation and 17 pages of Official Copy).
Office Action received for Chinese Patent Application No. 201510284715.9, mailed on Jun. 19, 2019, 26 pages (8 pages of English Translation and 18 pages of Official Copy).
Office Action received for Chinese Patent Application No. 201510284896.5, mailed on Jun. 28, 2018, 15 pages (4 pages of English Translation and 11 pages of Official Copy).
Office Action received for Chinese Patent Application No. 201510284896.5, mailed on Mar. 6, 2019, 13 pages (4 pages of English Translation and 9 pages of Official Copy).
Office Action received for Chinese Patent Application No. 201510284896.5, mailed on Sep. 3, 2019, 9 pages (2 pages of English Translation and 7 pages of Official Copy).
Office Action received for Chinese Patent Application No. 201520358683.8, mailed on Sep. 2, 2015, 4 pages (2 pages of English Translation and 2 pages of Official Copy).
Office Action received for Chinese Patent Application No. 201580043701.6, mailed on Dec. 24, 2018, 20 pages (5 pages of English Translation and 15 pages of Official Copy).
Office Action received for Chinese Patent Application No. 201580043701.6, mailed on May 8, 2021, 10 pages (1 page of English Translation and 9 pages of Official Copy).
Office Action received for Chinese Patent Application No. 201580043701.6, mailed on Nov. 4, 2019, 20 pages (6 pages of English Translation and 14 pages of Official Copy).
Office Action received for Chinese Patent Application No. 201580043701.6, mailed on Oct. 12, 2020, 22 pages (5 pages of English Translation and 17 pages of Official Copy).
Office Action received for Chinese Patent Application No. 201580043701.6, mailed on Sep. 10, 2021, 10 pages (5 pages of English Translation and 5 pages of Official Copy).
Office Action received for Chinese Patent Application No. 201610459968.X, mailed on Aug. 23, 2018, 14 pages (6 pages of English Translation and 8 pages of Official Copy).
Office Action received for Chinese Patent Application No. 201610459968.X, mailed on Aug. 23, 2019, 12 pages (5 pages of English Translation and 7 pages of Official Copy).
Office Action received for Chinese Patent Application No. 201610459968.X, mailed on Feb. 18, 2020, 8 pages (3 pages of English Translation and 5 pages of Official Copy).
Office Action received for Chinese Patent Application No. 201610459968.X, mailed on Feb. 22, 2019, 11 pages (5 Pages of English Translation and 6 pages of Official Copy).
Office Action received for Chinese Patent Application No. 201620480708.6, mailed on Jan. 9, 2017, 3 pages (1 page of English Translation and 2 pages of Official Copy).
Office Action received for Chinese Patent Application No. 201620480708.6, mailed on Sep. 14, 2016, 3 pages (1 page of English Translation and 2 pages of Official Copy).
Office Action received for Chinese Patent Application No. 201620480846.4, mailed on Jan. 9, 2017, 3 pages (1 page of English Translation and 2 pages of Official Copy).
Office Action received for Chinese Patent Application No. 201620480846.4, mailed on Sep. 14, 2016, 3 pages (1 page of English Translation and 2 pages of Official Copy).
Office Action received for Chinese Patent Application No. 201710093861.2, mailed on Mar. 5, 2019, 6 pages (3 pages of English Translation and 3 pages of Official Copy).
Office Action received for Chinese Patent Application No. 201710093861.2, mailed on Sep. 14, 2018, 15 pages (6 pages of English Translation and 9 pages of Official Copy).
Office Action received for Chinese Patent Application No. 201710094150.7, mailed on Dec. 19, 2018, 12 pages (5 pages of English translation and 7 pages of Official Copy).
Office Action received for Chinese Patent Application No. 201710094150.7, mailed on Jan. 10, 2022, 6 pages (3 pages of English Translation and 3 pages of Official Copy).
Office Action received for Chinese Patent Application No. 201710094150.7, mailed on Jul. 31, 2019, 6 pages (2 pages of English Translation and 4 pages of Official Copy).
Office Action received for Chinese Patent Application No. 201710198190.6, mailed on May 8, 2021, 22 pages (8 pages of English Translation and 14 pages of Official Copy).
Office Action received for Chinese Patent Application No. 201710198190.6, mailed on Oct. 12, 2020, 18 pages (6 pages of English Translation and 12 pages of Official Copy).
Office Action received for Chinese Patent Application No. 201710198190.6, mailed on Sep. 25, 2019, 27 pages (12 pages of English Translation and 15 pages of Official Copy).
Office Action received for Chinese Patent Application No. 201711292804.3, mailed on Aug. 5, 2020, 26 pages (16 pages of English Translation and 10 pages of Official Copy).
Office Action received for Chinese Patent Application No. 201711292804.3, mailed on Feb. 23, 2021, 17 pages (8 pages of English Translation and 9 pages of Official Copy).
Office Action received for Chinese Patent Application No. 201711292804.3, mailed on Sep. 10, 2021, 19 pages (8 pages of English Translation and 11 pages of Official Copy).
Office Action received for Chinese Patent Application No. 201780002398.4, mailed on Feb. 27, 2019, 6 pages (3 pages of English Translation and 3 pages of Official Copy).
Office Action received for Chinese Patent Application No. 201780002398.4, mailed on Sep. 12, 2018, 17 pages (5 pages of English Translation and 12 pages of Official Copy).
Office Action received for Chinese Patent Application No. 201780053143.0, mailed on Dec. 16, 2021, 19 pages (10 pages of English Translation and 9 pages of Official Copy).
Office Action received for Chinese Patent Application No. 201780053143.0, mailed on Dec. 24, 2020, 21 pages (11 pages of English Translation and 10 pages of Official Copy).
Office Action received for Chinese Patent Application No. 201780053143.0, mailed on May 22, 2020, 21 pages (11 pages of English Translation and 10 pages of Official Copy).
Office Action received for Chinese Patent Application No. 201780053143.0, mailed on Sep. 3, 2021, 24 pages (15 pages of English Translation and 9 pages of Official Copy).
Office Action received for Chinese Patent Application No. 201810094316.X, mailed on Apr. 28, 2019, 9 pages (3 pages of English Translation and 6 pages of Official Copy).
Office Action received for Chinese Patent Application No. 201810094316.X, mailed on Aug. 5, 2019, 9 pages (3 pages of English Translation and 6 pages of Official Copy).
Office Action received for Chinese Patent Application No. 201810094316.X, mailed on Oct. 29, 2018, 12 pages (5 pages of English Translation and 7 pages of Official Copy).
Office Action received for Chinese Patent Application No. 201810338038.8, mailed on Jan. 21, 2020, 26 pages (13 pages of English Translation and 13 pages of Official Copy).
Office Action received for Chinese Patent Application No. 201810338038.8, mailed on May 14, 2019, 26 pages (13 pages of English Translation and 13 pages of Official Copy).
Office Action received for Chinese Patent Application No. 201810338040.5, mailed on Jun. 3, 2021, 25 pages (15 pages of English Translation and 10 pages of Official Copy).
Office Action received for Chinese Patent Application No. 201810338040.5, mailed on Oct. 25, 2021, 22 pages (13 pages of English Translation and 9 pages of Official Copy).
Office Action received for Chinese Patent Application No. 201810338826.7, mailed on Apr. 3, 2019, 21 pages (13 pages of English Translation and 8 pages of Official Copy).
Office Action received for Chinese Patent Application No. 201810338826.7, mailed on Jan. 16, 2020, 16 pages (10 pages of English Translation and 6 pages of Official Copy).
Office Action received for Chinese Patent Application No. 201810338826.7, mailed on Oct. 21, 2019, 19 pages (12 pages of English Translation and 7 pages of Official Copy).

(56) References Cited

OTHER PUBLICATIONS

Office Action received for Chinese Patent Application No. 201810339290.0, mailed on Jun. 4, 2021, 20 pages (11 pages of English Translation and 9 pages of Official Copy).
Office Action received for Chinese Patent Application No. 201810339290.0, mailed on Oct. 18, 2021, 20 pages (11 pages of English Translation and 9 pages of Official Copy).
Office Action received for Chinese Patent Application No. 201810954931.3, mailed on Jan. 15, 2021, 11 pages (5 pages of English Translation and 6 pages of Official Copy).
Office Action received for Chinese Patent Application No. 201810955077.2, mailed on Feb. 20, 2021, 19 pages (8 pages of English Translation and 11 pages of Official Copy).
Office Action received for Chinese Patent Application No. 201811460172.1, mailed on Jan. 21, 2020, 17 pages (8 pages of English Translation and 9 pages of Official Copy).
Office Action received for Chinese Patent Application No. 201811460172.1, mailed on Oct. 14, 2020, 7 pages (4 pages of English Translation and 3 pages of Official Copy).
Office Action received for Chinese Patent Application No. 201880000798.6, mailed on Aug. 5, 2020, 18 pages (9 pages of English Translation and 9 pages of Official Copy).
Office Action received for Chinese Patent Application No. 201880000798.6, mailed on Dec. 30, 2021, 10 pages (5 pages of English Translation and 5 pages of Official Copy).
Office Action received for Chinese Patent Application No. 201880000798.6, mailed on Jul. 2, 2021, 15 pages (8 pages of English Translation and 7 pages of Official Copy).
Office Action received for Chinese Patent Application No. 201910070375.8, mailed on Dec. 4, 2019, 23 pages (12 pages of English Translation and 11 pages of Official Copy).
Office Action received for Chinese Patent Application No. 201910070375.8, mailed on Sep. 3, 2020, 8 pages (4 pages of English Translation and 4 pages of Official Copy).
Office Action received for Chinese Patent Application No. 201910109868.8, mailed on Jun. 30, 2020, 15 pages (7 pages of English Translation and 8 pages of Official Copy).
Office Action received for Chinese Patent Application No. 201910109868.8, mailed on Mar. 16, 2020, 19 pages (10 pages of English Translation and 9 pages of Official Copy).
Office Action received for Chinese Patent Application No. 201910109868.8, mailed on Sep. 19, 2019, 23 pages (11 pages of English Translation and 12 pages of Official Copy).
Office Action received for Chinese Patent Application No. 201910246439.5, mailed on Apr. 23, 2020, 14 pages (7 pages of English Translation and 7 pages of Official Copy).
Office Action received for Chinese Patent Application No. 201910246439.5, mailed on Oct. 15, 2019, 17 pages (9 pages of English Translation and 8 pages of Official Copy).
Office Action received for Chinese Patent Application No. 201910246439.5, mailed on Sep. 2, 2020, 15 pages (8 pages of English Translation and 7 pages of Official Copy).
Office Action received for Chinese Patent Application No. 201910278273.5, mailed on Jan. 3, 2020, 17 pages (10 pages of English Translation and 7 pages of Official Copy).
Office Action received for Chinese Patent Application No. 201910278273.5, mailed on Jun. 9, 2020, 8 pages (5 pages of English Translation and 3 pages of Official Copy).
Office Action received for Chinese Patent Application No. 201910744886.3, mailed on Jan. 18, 2021, 7 pages (1 page of English Translation and 6 pages of Official Copy).
Office Action received for Chinese Patent Application No. 201910899698.8, mailed on Mar. 23, 2020, 15 pages (9 pages of English Translation and 6 pages of Official Copy).
Office Action received for Chinese Patent Application No. 201910899698.8, mailed on May 27, 2020, 10 pages (6 pages of English Translation and 4 pages of Official Copy).
Office Action received for Chinese Patent Application No. 201911199010.1, mailed on Mar. 29, 2021, 14 pages (8 pages of English Translation and 6 pages of Official Copy).
Office Action received for Chinese Patent Application No. 201911199010.1, mailed on Nov. 4, 2020, 20 pages (10 pages of English Translation and 10 pages of Official Copy).
Office Action received for Chinese Patent Application No. 201911199010.1, mailed on Sep. 3, 2021, 12 pages (7 pages of English Translation and 5 pages of Official Copy).
Office Action received for Chinese Patent Application No. 201980041865.3, mailed on May 24, 2021, 14 pages (8 pages of English Translation and 6 pages of Official Copy).
Office Action received for Chinese Patent Application No. 201410407626.4, mailed on Feb. 12, 2019, 13 pages (3 pages of English Translation and 10 pages of Official Copy).
Office Action received for Danish Patent Application No. PA201670628, mailed on Jun. 6, 2017, 3 pages.
Office Action received for Danish Patent Application No. PA201670628, mailed on Oct. 26, 2016, 7 pages.
Office Action received for Danish Patent Application No. PA201770418, mailed on May 8, 2018, 3 pages.
Office Action received for Danish Patent Application No. PA201770419, mailed on Jan. 10, 2018, 4 pages.
Office Action received for Danish Patent Application No. PA201770712, mailed on Jul. 20, 2018, 4 pages.
Office Action received for Danish Patent Application No. PA201770712, mailed on Mar. 1, 2019, 3 pages.
Office Action received for Danish Patent Application No. PA201770713, mailed on Apr. 18, 2018, 4 pages.
Office Action received for Danish Patent Application No. PA201770713, mailed on Jun. 7, 2019, 4 pages.
Office Action received for Danish Patent Application No. PA201770713, mailed on Nov. 13, 2018, 3 pages.
Office Action received for Danish Patent Application No. PA201770714, mailed on Aug. 17, 2018, 6 pages.
Office Action received for Danish Patent Application No. PA201770714, mailed on Feb. 21, 2018, 3 pages.
Office Action received for Danish Patent Application No. PA201770714, mailed on Oct. 13, 2017, 9 pages.
Office Action received for Danish Patent Application No. PA201770715, mailed on Mar. 8, 2018, 4 pages.
Office Action received for Danish Patent Application No. PA201770715, mailed on Oct. 29, 2018, 4 pages.
Office Action received for Danish Patent Application No. PA201770782, mailed on Jan. 26, 2018, 8 pages.
Office Action received for Danish Patent Application No. PA201770782, mailed on Nov. 22, 2018, 3 pages.
Office Action received for Danish Patent Application No. PA201870370, mailed on Nov. 9, 2018, 4 pages.
Office Action received for Danish Patent Application No. PA201870371, mailed on Nov. 20, 2018, 3 pages.
Office Action received for Danish Patent Application No. PA201870855, mailed on May 14, 2020, 4 pages.
Office Action received for Danish Patent Application No. PA201870855, mailed on Nov. 7, 2019, 4 pages.
Office Action received for Danish Patent Application No. PA201970127, mailed on Dec. 20, 2019, 3 pages.
Office Action received for Danish Patent Application No. PA201970127, mailed on Feb. 24, 2020, 2 pages.
Office Action received for European Patent Application No. 08834386.8, mailed on Aug. 23, 2010, 4 pages.
Office Action received for European Patent Application No. 12181538.5, mailed on Dec. 16, 2013, 4 pages.
Office Action received for European Patent Application No. 12770400.5, mailed on Mar. 10, 2015, 5 pages.
Office Action received for European Patent Application No. 12773460.6, mailed on Feb. 19, 2018, 6 pages.
Office Action received for European Patent Application No. 13171145.9, mailed on Apr. 28, 2016, 5 pages.
Office Action received for European Patent Application No. 13171145.9, mailed on May 3, 2018, 4 pages.
Office Action received for European Patent Application No. 15168475.0, mailed on Dec. 19, 2016, 5 pages.
Office Action received for European Patent Application No. 15168475.0, mailed on May 6, 2020, 5 pages.

(56) References Cited

OTHER PUBLICATIONS

Office Action received for European Patent Application No. 15719347.5, mailed on Apr. 9, 2020, 4 pages.
Office Action received for European Patent Application No. 15719347.5, mailed on Jun. 17, 2019, 4 pages.
Office Action received for European Patent Application No. 15727291.5, mailed on Jan. 15, 2018, 8 pages.
Office Action received for European Patent Application No. 16201159.7, mailed on Jun. 12, 2019, 10 pages.
Office Action received for European Patent Application No. 16201195.1, mailed on Feb. 14, 2018, 12 pages.
Office Action received for European Patent Application No. 16201205.8, mailed on Feb. 16, 2018, 12 pages.
Office Action received for European Patent Application No. 17799904.2, mailed on Oct. 21, 2020, 6 pages.
Office Action received for European Patent Application No. 17853654.6, mailed on Mar. 23, 2020, 4 pages.
Office Action received for European Patent Application No. 18208881.5, mailed on Jun. 11, 2019, 5 pages.
Office Action received for European Patent Application No. 18208881.5, mailed on May 7, 2021, 6 pages.
Office Action received for European Patent Application No. 18704335.1, mailed on Sep. 23, 2019, 7 pages.
Office Action received for European Patent Application No. 18713408.5, mailed on May 20, 2019, 5 pages.
Office Action received for European Patent Application No. 18713408.5, mailed on May 26, 2020, 5 pages.
Office Action received for European Patent Application No. 18713408.5, mailed on Nov. 4, 2020, 6 pages.
Office Action received for European Patent Application No. 18713408.5, mailed on Nov. 20, 2019, 4 pages.
Office Action received for European Patent Application No. 18830326.7, mailed on Apr. 30, 2020, 5 pages.
Office Action received for European Patent Application No. 18830326.7, mailed on Aug. 13, 2020, 6 pages.
Office Action received for European Patent Application No. 18830326.7, mailed on Aug. 27, 2019, 6 pages.
Office Action received for European Patent Application No. 18830326.7, mailed on Nov. 22, 2019, 8 pages.
Office Action received for European Patent Application No. 18830326.7, mailed on Sep. 16, 2019, 6 pages.
Office Action received for European Patent Application No. 19150528.8, mailed on Jul. 1, 2020, 6 pages.
Office Action received for European Patent Application No. 19160344.8, mailed on Mar. 26, 2021, 7 pages.
Office Action received for European Patent Application No. 19160344.8, mailed on Oct. 7, 2021, 8 pages.
Office Action received for European Patent Application No. 19160348.9, mailed on May 14, 2020, 4 pages.
Office Action received for European Patent Application No. 19160348.9, mailed on Nov. 17, 2020, 6 pages.
Office Action received for European Patent Application No. 19186538.5, mailed on Oct. 12, 2020, 7 pages.
Office Action received for European Patent Application No. 19186538.5, mailed on Oct. 22, 2021, 7 pages.
Office Action received for European Patent Application No. 19194828.0, mailed on May 10, 2021, 6 pages.
Office Action received for European Patent Application No. 19194828.0, mailed on Oct. 15, 2020, 7 pages.
Office Action received for European Patent Application No. 19716254.8, mailed on Aug. 9, 2021, 8 pages.
Office Action received for European Patent Application No. 19769336.9, mailed on Nov. 4, 2021, 6 pages.
Office Action received for European Patent Application No. 20186286.9, mailed on Jan. 25, 2022, 8 pages.
Office Action received for European Patent Application No. 20186286.9, mailed on Jul. 29, 2021, 8 pages.
Office Action received for European Patent Application No. 20198076.0, mailed on Sep. 22, 2021, 6 pages.
Office Action received for German Patent Application No. 202015004267.8, mailed on Nov. 4, 2015, 4 pages (3 pages of English Translation and 1 page of Official Copy).
Office Action received for Indian Patent Application No. 201617006865, mailed on Dec. 11, 2019, 7 pages.
Office Action received for Indian Patent Application No. 201617039493, mailed on Oct. 21, 2019, 6 pages.
Office Action received for Indian Patent Application No. 201618024020, mailed on Sep. 14, 2020, 7 pages.
Office Action received for Indian Patent Application No. 201817036875, mailed on Oct. 29, 2021, 8 pages.
Office Action received for Indian Patent Application No. 201917024374, mailed on Dec. 30, 2021, 10 pages.
Office Action received for Indian Patent Application No. 201918003782, mailed on Nov. 18, 2021, 8 pages.
Office Action received for Indian Patent Application No. 201918027146, mailed on Jan. 4, 2022, 7 pages.
Office Action received for Indian Patent Application No. 202018009834, mailed on Nov. 12, 2021, 6 pages.
Office Action received for Indian Patent Application No. 202018014786, mailed on Nov. 9, 2021, 7 pages.
Office Action received for Indian Patent Application No. 202018041558, mailed on Dec. 3, 2021, 7 pages.
Office Action received for Indian Patent Application No. 202018044420, mailed on Jan. 31, 2022, 6 pages.
Office Action received for Japanese Patent Application No. 2010-525891, mailed on Jun. 12, 2012, 11 pages (5 pages of English Translation and 6 pages of Official Copy).
Office Action received for Japanese Patent Application No. 2013-098406, mailed on Dec. 9, 2013, Dec. 9, 2013, 12 pages (6 pages of English Translation and 6 pages of Official Copy).
Office Action received for Japanese Patent Application No. 2013-098406, mailed on Dec. 15, 2014, 12 pages (7 pages of English Translation and 5 pages of Official Copy).
Office Action received for Japanese Patent Application No. 2013-098406, mailed on Jul. 19, 2016, 10 pages (5 pages of English Translation and 5 pages of Official Copy).
Office Action received for Japanese Patent Application No. 2015-083696, mailed on Jun. 17, 2016, 12 pages (7 pages of English Translation and 5 pages of Official Copy).
Office Action received for Japanese Patent Application No. 2016-131998, mailed on Aug. 10, 2018, 9 pages (5 pages of English Translation and 4 pages of Official Copy).
Office Action received for Japanese Patent Application No. 2016-131998, mailed on Sep. 25, 2017, 10 pages (5 pages of English Translation and 5 pages of Official Copy).
Office Action received for Japanese Patent Application No. 2016-224506, mailed on May 14, 2019, 22 pages (11 pages of English Translation and 11 pages of Official Copy).
Office Action received for Japanese Patent Application No. 2016-224507, mailed on Jun. 16, 2017, 16 pages (8 pages of English Translation and 8 pages of Official Copy).
Office Action received for Japanese Patent Application No. 2016-540927, mailed on Jun. 20, 2017, 12 pages (7 pages of English Translation and 5 pages of Official Copy).
Office Action received for Japanese Patent Application No. 2016-558332, mailed on Dec. 8, 2017, 12 pages (6 pages of English Translation and 6 pages of Official Copy).
Office Action received for Japanese Patent Application No. 2016-558332, mailed on Jul. 27, 2018, 9 pages (4 pages of English Translation and 5 pages of Official Copy).
Office Action received for Japanese Patent Application No. 2016-569665, mailed on Aug. 20, 2018, 9 pages (4 pages of English Translation and 5 pages of Official Copy).
Office Action received for Japanese Patent Application No. 2016-569665, mailed on Jan. 19, 2018, 10 pages (5 pages of English Translation and 5 pages of Official Copy).
Office Action received for Japanese Patent Application No. 2017-075031, mailed on Jul. 30, 2018, 16 pages (8 pages of English Translation and 8 pages of Official Copy).
Office Action received for Japanese Patent Application No. 2017-085582, mailed on Jul. 2, 2018, 11 pages (6 pages of English Translation and 5 pages of Official Copy).

(56) References Cited

OTHER PUBLICATIONS

Office Action received for Japanese Patent Application No. 2017-507413, mailed on Feb. 22, 2019, 11 pages (5 pages of English Translation and 6 pages of Official Copy).
Office Action received for Japanese Patent Application No. 2017-507413, mailed on May 25, 2018, 14 pages (7 pages of English Translation and 7 pages of Official Copy).
Office Action received for Japanese Patent Application No. 2018-113081, mailed on Apr. 9, 2019, 6 pages (3 pages of English Translation and 3 pages of Official Copy).
Office Action received for Japanese Patent Application No. 2018-113081, mailed on Jan. 10, 2020, 8 pages (4 pages of English Translation and 4 pages of Official Copy).
Office Action received for Japanese Patent Application No. 2018-113081, mailed on Oct. 2, 2020, 7 pages (4 pages of English Translation and 3 pages of Official Copy).
Office Action received for Japanese Patent Application No. 2018-551159, mailed on Jan. 27, 2020, 8 pages (4 pages of English Translation and 4 pages of Official Copy).
Office Action received for Japanese Patent Application No. 2018-551159, mailed on Sep. 30, 2019, 6 pages (3 pages of English Translation and 3 pages of Official Copy).
Office Action received for Japanese Patent Application No. 2018-560107, mailed on Jun. 14, 2019, 26 pages (13 pages of English Translation and 13 pages of Official Copy).
Office Action received for Japanese Patent Application No. 2019-053379, mailed on May 29, 2020, 11 pages (6 pages of English Translation and 5 pages of Official Copy).
Office Action received for Japanese Patent Application No. 2019-053379, mailed on Oct. 18, 2019, 11 pages (6 pages of English Translation and 5 pages of Official Copy).
Office Action received for Japanese Patent Application No. 2019-107235, mailed on Oct. 18, 2019, 8 pages (4 pages of English Translation and 4 pages of Official Copy).
Office Action received for Japanese Patent Application No. 2019-194603, mailed on Jan. 4, 2021, 8 pages (4 pages of English Translation and 4 pages of Official Copy).
Office Action received for Japanese Patent Application No. 2019-238894, mailed on Mar. 6, 2020, 7 pages (3 pages of English Translation and 4 pages of Official Copy).
Office Action received for Japanese Patent Application No. 2019-510416, mailed on May 15, 2020, 4 pages (2 pages of English Translation and 2 pages of Official Copy).
Office Action received for Japanese Patent Application No. 2019-510416, mailed on Oct. 18, 2019, 4 pages (2 pages of English Translation and 2 pages of Official Copy).
Office Action received for Japanese Patent Application No. 2019-511975, mailed on Apr. 10, 2020, 6 pages (3 pages of English Translation and 3 pages of Official Copy).
Office Action received for Japanese Patent Application No. 2019-563560, mailed on Jun. 14, 2021, 6 pages (3 pages of English Translation and 3 pages of Official Copy).
Office Action received for Japanese Patent Application No. 2019-563560, mailed on Nov. 30, 2020, 7 pages (3 pages of English Translation and 4 pages of Official Copy).
Office Action received for Japanese Patent Application No. 2020-028315, mailed on Feb. 7, 2022, 6 pages (3 pages of English Translation and 3 pages of Official Copy).
Office Action received for Japanese Patent Application No. 2020-028315, mailed on Jul. 6, 2020, 18 pages (10 pages of English Translation and 8 pages of Official Copy).
Office Action received for Japanese Patent Application No. 2020-028315, mailed on Nov. 9, 2020, 11 pages (6 pages of English Translation and 5 pages of Official Copy).
Office Action received for Japanese Patent Application No. 2020-126751, mailed on Jan. 5, 2021, 8 pages (4 pages of English Translation and 4 pages of Official Copy).
Office Action received for Japanese Patent Application No. 2020-159979, mailed on May 10, 2021, 9 pages (5 pages of English Translation and 4 pages of Official Copy).
Office Action received for Japanese Patent Application No. 2020-184605, mailed on Feb. 14, 2022, 24 pages (11 pages of English Translation and 13 pages of Official Copy).
Office Action received for Japanese Patent Application No. 2020-566978, mailed on Feb. 4, 2022, 12 pages (6 pages of English Translation and 6 pages of Official Copy).
Office Action received for Japanese Patent Application No. 2021-001028, mailed on Jan. 31, 2022, 10 pages (5 pages of English Translation and 5 pages of Official Copy).
Office Action received for Japanese Patent Application No. 2021-015128, mailed on Jun. 14, 2021, 4 pages (2 pages of English Translation and 2 pages of Official Copy).
Office Action received for Korean Patent Application No. 10-2010-7008899, mailed on Aug. 17, 2014, 7 pages (3 pages of English Translation and 4 pages of Official Copy).
Office Action received for Korean Patent Application No. 10-2010-7008899, mailed on Feb. 3, 2015, 7 pages (3 pages of English Translation and 4 pages of Official Copy).
Office Action received for Korean Patent Application No. 10-2010-7008899, mailed on Jan. 28, 2013, 5 pages (2 pages of English Translation and 3 pages of Official Copy).
Office Action received for Korean Patent Application No. 10-2010-7008899, mailed on Jun. 12, 2015, 4 pages (2 pages of English Translation and 2 pages of Official Copy).
Office Action received for Korean Patent Application No. 10-2010-7008899, mailed on Mar. 29, 2012, 6 pages (2 pages of English Translation and 4 pages of Official Copy).
Office Action received for Korean Patent Application No. 10-2010-7008899, mailed on May 30, 2011, 4 pages (2 pages of English Translation and 2 pages of Official Copy).
Office Action received for Korean Patent Application No. 10-2011-7023152, mailed on Apr. 22, 2014, 6 pages (3 pages of English Translation and 3 pages of Official Copy).
Office Action received for Korean Patent Application No. 10-2014-7004771, mailed on Jun. 12, 2015, 6 pages (3 pages English Translation and 3 pages of Official Copy).
Office Action received for Korean Patent Application No. 10-2014-7004771, mailed on Apr. 22, 2014, 5 pages (2 pages of English Translation and 3 pages of Official Copy).
Office Action received for Korean Patent Application No. 10-2014-7004771, mailed on Oct. 21, 2014, 7 pages (3 pages of English Translation and 4 pages of Official Copy).
Office Action received for Korean Patent Application No. 10-2014-7004772, mailed on Apr. 22, 2014, 8 pages (3 pages of English translation and 5 pages of Official Copy).
Office Action received for Korean Patent Application No. 10-2014-7004772, mailed on Oct. 21, 2014, 5 pages (2 pages of English Translation and 3 pages of official Copy).
Office Action received for Korean Patent Application No. 10-2014-7004773, mailed on Apr. 22, 2014, 9 pages (4 pages of English Translation and 5 pages of Office Action).
Office Action received for Korean Patent Application No. 10-2014-7004773, mailed on Jun. 12, 2015, 6 pages (3 pages English Translation and 3 pages of Official Copy).
Office Action received for Korean Patent Application No. 10-2014-7004773, mailed on Oct. 21, 2014, 9 pages (4 pages of English Translation and 5 pages of Official Copy).
Office Action received for Korean Patent Application No. 10-2014-7008348, mailed on Jan. 22, 2019, 16 pages (1 page of English Translation and 15 pages of Official Copy).
Office Action received for Korean Patent Application No. 10-2014-7025441, mailed on Oct. 21, 2014, 5 pages (2 pages of English Translation and 3 pages of official Copy).
Office Action received for Korean Patent Application No. 10-2015-7010262, mailed on Mar. 8, 2017, 6 pages (3 pages of English Translation and 3 pages of Official Copy).
Office Action received for Korean Patent Application No. 10-2015-7010262, mailed on May 24, 2016, 10 pages (3 pages of English Translation and 7 pages of Official Copy).
Office Action received for Korean Patent Application No. 10-2016-0152210, mailed on Jan. 29, 2019, 7 pages (3 pages of English Translation and 4 pages of Official Copy).

(56) References Cited

OTHER PUBLICATIONS

Office Action received for Korean Patent Application No. 10-2016-0152210, mailed on May 14, 2018, 13 pages (6 pages of English Translation and 7 pages of Official Copy).
Office Action received for Korean Patent Application No. 10-2016-0152210, mailed on May 30, 2019, 8 pages (4 pages of English Translation and 4 pages of Official Copy).
Office Action received for Korean Patent Application No. 10-2016-7009347, mailed on Feb. 18, 2018, 9 pages (4 pages of English Translation and 5 pages of Official Copy).
Office Action received for Korean Patent Application No. 10-2016-7009632, mailed on Feb. 2, 2018, 11 pages (5 pages of English Translation and 6 pages of Official Copy).
Office Action received for Korean Patent Application No. 10-2016-7035555, mailed on Dec. 26, 2017, 5 pages (2 pages of English Translation and 3 pages of Official Copy).
Office Action received for Korean Patent Application No. 10-2016-7035555, mailed on Jul. 18, 2019, 9 pages (4 pages of English Translation and 5 pages of Official Copy).
Office Action received for Korean Patent Application No. 10-2016-7035555, mailed on Sep. 18, 2018, 9 pages (4 pages of English Translation and 5 pages of Official Copy).
Office Action received for Korean Patent Application No. 10-2017-0022365, mailed on Jun. 26, 2017, 10 pages (4 pages of English Translation and 6 pages of Official Copy).
Office Action received for Korean Patent Application No. 10-2017-0022546, mailed on Jun. 21, 2017, 12 pages (5 pages of English Translation and 7 pages of Official Copy).
Office Action received for Korean Patent Application No. 10-2017-0022582, mailed on Jul. 31, 2019, 5 pages (2 pages of English Translation and 3 pages of Official Copy).
Office Action received for Korean Patent Application No. 10-2017-0022582, mailed on Sep. 19, 2018, 6 pages (2 pages of English Translation and 4 pages of Official Copy).
Office Action received for Korean Patent Application No. 10-2017-7012145, mailed on Jul. 18, 2019, 5 pages (2 pages of English Translation and 3 Pages of Official Copy).
Office Action received for Korean Patent Application No. 10-2017-7012145, mailed on Sep. 13, 2018, 6 pages (3 pages of English Translation and 3 pages of Official Copy).
Office Action received for Korean Patent Application No. 10-2017-7015582, mailed on Apr. 5, 2018, 8 pages (4 pages of English Translation and 4 pages of Official Copy).
Office Action received for Korean Patent Application No. 10-2017-7015582, mailed on Jun. 12, 2017, 9 pages ( 4 pages of English Translation and 5 pages of Official Copy).
Office Action received for Korean Patent Application No. 10-2018-7022895, mailed on Aug. 17, 2018, 8 pages (3 pages of English Translation and 5 pages of Official Copy).
Office Action received for Korean Patent Application No. 10-2018-7028845, mailed on Jun. 19, 2019, 7 pages (3 pages of English Translation and 4 pages of Official Copy).
Office Action received for Korean Patent Application No. 10-2018-7033301, mailed on Dec. 14, 2018, 6 pages (2 pages of English Translation and 4 pages of Official Copy).
Office Action received for Korean Patent Application No. 10-2019-7003374, mailed on Jun. 10, 2019, 7 pages (2 pages of English Translation and 5 pages of official Copy).
Office Action received for Korean Patent Application No. 10-2019-7003836, mailed on Jun. 14, 2019, 7 pages (2 pages of English Translation and 5 pages of Official Copy).
Office Action received for Korean Patent Application No. 10-2019-7004734, mailed on Jul. 4, 2019, 7 pages (2 pages of English Translation and 5 pages of Official Copy).
Office Action received for Korean Patent Application No. 10-2019-7005136, mailed on Jan. 28, 2020, 5 pages (2 pages of English Translation and 3 pages of Official Copy).
Office Action received for Korean Patent Application No. 10-2019-7005925, mailed on Jul. 4, 2019, 24 pages (11 pages of English Translation and 13 pages of Official Copy).
Office Action received for Korean Patent Application No. 10-2019-7014494, mailed on Jun. 14, 2019, 11 pages (5 pages of English Translation and 6 pages of Official Copy).
Office Action received for Korean Patent Application No. 10-2019-7014988, mailed on Jul. 19, 2019, 9 pages (4 pages of English Translation and 5 pages of Official Copy).
Office Action received for Korean Patent Application No. 10-2019-7033799, mailed on Apr. 27, 2021, 9 pages (4 pages of English Translation and 5 pages of Official Copy).
Office Action received for Korean Patent Application No. 10-2019-7033799, mailed on Nov. 23, 2021, 6 pages (3 pages of English Translation and 3 pages of Official Copy).
Office Action received for Korean Patent Application No. 10-2020-0097418, mailed on Aug. 28, 2020, 6 pages (2 pages of English Translation and 4 pages of Official Copy).
Office Action received for Korean Patent Application No. 10-2020-7002929, mailed on Mar. 22, 2020, 5 pages (2 pages of English Translation and 3 pages of Official Copy).
Office Action received for Korean Patent Application No. 10-2020-7011424, mailed on Jul. 7, 2020, 6 pages (2 pages of English Translation and 4 pages of Official Copy).
Office Action received for Korean Patent Application No. 10-2020-7020782, mailed on Aug. 19, 2020, 8 pages (4 pages of English Translation and 4 pages of Official Copy).
Office Action received for Korean Patent Application No. 10-2020-7020782, mailed on Mar. 29, 2021, 7 pages (3 pages of English Translation and 4 pages of Official Copy).
Office Action received for Korean Patent Application No. 10-2020-7022596, mailed on Jul. 28, 2021, 26 pages (13 pages of English Translation and 13 pages of Official Copy).
Office Action received for Korean Patent Application No. 10-2020-7027862, mailed on Jan. 29, 2021, 8 pages (3 pages of English Translation and 5 pages of Official Copy).
Office Action received for Korean Patent Application No. 10-2020-7034180, mailed on Aug. 17, 2021, 15 pages (6 pages of English Translation and 9 pages of Official Copy).
Office Action received for Korean Patent Application No. 10-2020-7034405, mailed on Dec. 4, 2021, 15 pages (7 pages of English Translation and 8 pages of Official Copy).
Office Action received for Korean Patent Application No. 10-2021-7011888, mailed on Jul. 27, 2021, 11 pages (5 pages of English Translation and 6 pages of Official Copy).
Office Action received for Korean Patent Application No. 10-2021-7015473, mailed on Aug. 25, 2021, 5 pages (2 page of English Translation and 3 pages of Official Copy).
Office Action received for Korean Patent Application No. 10-2016-7009347, mailed on Mar. 9, 2017, 15 pages (7 pages of English Translation and 8 pages of Official Copy).
Office Action received for Korean Patent Application No. 10-2018-7028845, mailed on Dec. 10, 2018, 8 pages (4 pages of English Translation and 4 pages of Official Copy).
Office Action received for Taiwan Patent Application No. 103136545, mailed on May 25, 2016, 7 pages (3 pages of English Translation and 4 pages of Official Copy).
Office Action received for Taiwan Patent Application No. 103136545, mailed on Nov. 2, 2015, 39 pages (15 pages of English Translation and 24 pages of Official Copy).
Office Action received for Taiwan Patent Application No. 101107082, mailed on Jul. 7, 2014, 21 pages (7 pages of English Translation and 14 pages of Official Copy).
Office Action received for Taiwan Patent Application No. 103131074, mailed on Jul. 21, 2015, 16 pages (7 pages of English Translation and 9 pages of Official Copy).
Office Action received for Taiwanese Patent Application No. 104114953, issued on Feb. 18, 2017, 9 pages (4 pages of English Translation and 5 pages of Official Copy).
Office Action received for Taiwanese Patent Application No. 104114953, mailed on Jun. 8, 2016, 11 pages (5 pages of English Translation and 6 pages of Official Copy).
Office Action received for Taiwanese Patent Application No. 104117508, issued on Jul. 14, 2017, 9 pages (4 pages of English Translation and 5 pages of Official Copy).

(56) References Cited

OTHER PUBLICATIONS

Office Action received for Taiwanese Patent Application No. 104117508, issued on Jul. 20, 2016, 19 pages (8 pages of English Translation and 11 pages of Official Copy).
Office Action received for Taiwanese Patent Application No. 104117508, issued on Mar. 20, 2017, 22 pages (9 pages of English Translation and 13 pages of Official Copy).
Office Action received for Taiwanese Patent Application No. 104117508, mailed on Jan. 25, 2019, 24 pages (5 pages of English Translation and 19 pages of Official Copy).
Office Action received for Taiwanese Patent Application No. 104117508, mailed on May 22, 2019, 7 pages (3 pages of English Translation and 4 pages of Official Copy).
Office Action received for Taiwanese Patent Application No. 107138003, issued on Mar. 20, 2019, 6 pages (3 pages of English Translation and 3 pages of Official Copy).
Office Action received from Japanese Patent Application No. 2013-098406, mailed on May 8, 2015, 14 pages (9 pages of English Translation and 5 pages of Official Copy).
Okazolab, "Kinect Based 3D Head Tracking in Behavioral Research", Available online at: https://www.youtube.com/watch?v=nigRvT9beQw, Aug. 8, 2012, 3 pages.
Onefacein, "[How It Works] Securing Your Smartphone With OneFaceIn", Biometric Password Manager, Available at: https://www.youtube.com/watch?v=h-JG5SPxBQ0, Dec. 2, 2016, 1 page.
Page Sebastien, "Leaked iOS 11 GM details how you will set up Face ID on your iPhone 8", Online available at: https://www.idownloadblog.com/2017/09/08/leaked-ios-11-gm-details-how-you-will-set-up-face-id-on-your-iphone-8/, Sep. 8, 2017, 9 pages.
Phonebuff, "How To Use Face Unlock On Android 4.0 ICS", Retrieved from: https://www.youtube.com/watch?v=0ASf6jkpFKE, Dec. 15, 2011, 1 page.
Plaisant et al., "Touchscreen Toggle Switches: Push or slide? Design Issues and Usability Study", Technical Report CAR-TR-521, CS-TR-2557, Nov. 1990, pp. 1-10.
PSP Security Ltd, "AccuFACE features", Available online at: https://www.youtube.com/watch?v=p3jvGoEbioY, Oct. 14, 2009, 1 page.
PSP Security Ltd, "PSP Security—AccuFACE Step By Step Enrollment Process", Available online at: https://www.youtube.com/watch?v=0IIF5OOdya0, Oct. 14, 2009, 1 page.
Pu Fang, "Research on Location-aware Service in Pervasive Computing", Issue No. 7, Information Technology Series, China Doctoral Dissertations, Jul. 15, 2008, 140 pages (Official Copy only) See Communication under 37 CFR § 1.98(a) (3).
Real Solution of two-step-authentication Password Management for Authentication Enhancement, Fukuda Takao, Nikkei PC, JPN, Nikkei Business Publications, Inc., No. 694, Mar. 24, 2014, 11 pages (3 pages of English translation and 8 pages of Official Copy).
Record of Oral Hearing received for U.S. Appl. No. 13/243,045, mailed on Apr. 1, 2019, 18 pages.
Record of Oral Hearing received for U.S. Appl. No. 13/243,045, mailed on May 7, 2021, 18 pages.
Record of Oral Hearing received for U.S. Appl. No. 15/714,887, mailed on Feb. 15, 2022, 16 pages.
Result of Consultation received for European Patent Application No. 18713408.5, mailed on Aug. 30, 2021, 5 pages.
Result of Consultation received for European Patent Application No. 18830326.7, mailed on Jun. 21, 2021, 5 pages.
Result of Consultation received for European Patent Application No. 19160344.8, mailed on Feb. 4, 2022, 3 pages.
Riley et al., "Instruction, Feedback and Biometrics: The User Interface for Fingerprint Authentication System", Interact 2009, Part II, LNCS 5727, IFPI International Federation for Information Processing, 2009, pp. 293-305.
Sawamura Toru, "Emergency Proposal; personal information should be immediately unitarily managed", PC fan, Japan, Mainichi Communications Inc., 11th Edition, vol. 11, No. 240, Jun. 15, 2004, pp. 20-21 (Official Copy only) See Communication under 37 CFR § 1.98(a) (3).
Schofield Tim, "Face Unlock Demonstration on the HTC EVO 4G LTE", Retrieved from <https://www.youtube.com/watch?v=TNL9Or_9SWg>, May 31, 2012, 1 page.
Search Report and Opinion received for Danish Patent Application No. PA201770418, mailed on Jun. 23, 2017, 8 pages.
Search Report and Opinion received for Danish Patent Application No. PA201770419, mailed on Jun. 19, 2017, 6 pages.
Search Report and Opinion received for Danish Patent Application No. PA201770712, mailed on Oct. 25, 2017, 10 pages.
Search Report and Opinion received for Danish Patent Application No. PA201770713, mailed on Oct. 31, 2017, 9 pages.
Search Report and Opinion received for Danish Patent Application No. PA201770715, issued on Nov. 9, 2017, 10 pages.
Search Report and Opinion received for Danish Patent Application No. PA201870370, mailed on Sep. 7, 2018, 11 pages.
Search Report and Opinion received for Danish Patent Application No. PA201870371, mailed on Sep. 14, 2018, 14 pages.
Search Report and Opinion received for Danish Patent Application No. PA201870855, mailed on Apr. 3, 2019, 12 pages.
Search Report and Opinion received for Danish Patent Application No. PA201970127, mailed on Oct. 4, 2019, 9 pages.
Sensory Trulysecure, "AppLock Face/Voice Recognition", Available at <https://www.youtube.com/watch?v=odax5O51aT0>, May 27, 2015, 1 page.
Stateoftech, "iPhone 6 Tips—How to Access the Camera from the Lock Screen", Screen captures with generated transcript from YouTube video clip, Online Available at: https://www.youtube.com/watch?v=frB151RYB7U, Jul. 2, 2015, 23 pages.
Summons to Attend Oral Proceedings received for European Patent Application No. 08834386.8, mailed on Aug. 24, 2012, 4 pages.
Summons to Attend Oral Proceedings received for European Patent Application No. 12770400.5, mailed on Mar. 19, 2018, 10 pages.
Summons to Attend Oral Proceedings received for European Patent Application No. 15727291.5, mailed on Jan. 28, 2020, 13 pages.
Summons to Attend Oral Proceedings received for European Patent Application No. 15728352.4, mailed on May 12, 2020, 25 pages.
Summons to Attend Oral Proceedings received for European Patent Application No. 15728352.4, mailed on Nov. 18, 2019, 15 pages.
Summons to Attend Oral Proceedings received for European Patent Application No. 16201159.7, mailed on Feb. 4, 2021, 12 pages.
Summons to Attend Oral Proceedings received for European Patent Application No. 16201195.1, mailed on Sep. 4, 2018, 21 pages.
Summons to Attend Oral Proceedings received for European Patent Application No. 16201205.8, mailed on Jan. 28, 2020, 18 pages.
Summons to Attend Oral Proceedings received for European Patent Application No. 17799904.2, mailed on Dec. 20, 2021, 8 pages.
Summons to Attend Oral Proceedings received for European Patent Application No. 18713408.5, mailed on Apr. 30, 2021, 5 pages.
Summons to Attend Oral Proceedings received for European Patent Application No. 18830326.7, mailed on Feb. 25, 2021, 6 pages.
Summons to Attend Oral Proceedings received for European Patent Application No. 19194828.0, mailed on Feb. 3, 2022, 10 pages.
Summons to Attend Oral Proceedings received for European Patent Application No. 19194828.0, mailed on Feb. 10, 2022, 2 pages.
Supplemental Notice of Allowance received for U.S. Appl. No. 12/207,370, mailed on Aug. 8, 2013, 2 pages.
Supplemental Notice of Allowance received for U.S. Appl. No. 15/899,996, mailed on Jul. 25, 2018, 2 pages.
Tanaka et al., "Innovative Mobile Device of Apple Finally Appeared, Mobile Phone + iPod + Internet Terminal, iPhone", Mac Fan, vol. 15, No. 9, Japan, Mainichi Communications Inc., Sep. 1, 2007, 16 pages (Official Copy only) See Communication under 37 CFR § 1.98(a) (3).
Thanakulmas Thanit, "MasterCard Identity Check Facial Recognition Biometrics", Available at: https://www.youtube.com/watch?v=g4sMbrkt1gl, Oct. 10, 2016, 1 page.
Third Party Observations received for European Patent Application No. 15168475.0, mailed on Jul. 19, 2016, 4 pages.
Videoreborn, "Motorola Atrix 4g: Wet Fingerprint Scanner Better Than iPhone 5S Fingerprint Scanner!", Youtube, available at: https://www.youtube.com/watch?v=MSJIIG93MPg, Mar. 16, 2011, 2 pages.

(56) References Cited

OTHER PUBLICATIONS

Wang Na, "Research of Face Detection System Based on Mobile Phone Platform", Video Engineering, vol. 36, No. 11, Nov. 2012, 5 pages (Official Copy Only) See Communication under 37 CFR § 1.98(a) (3).
Wikipedia, "QR code", Available online at: https://en.wikipedia.org/w/index.php?title=OR_code&oldid=452939488, Sep. 28, 2011, pp. 1-9.
2004-194069, JP, A, Cited by Japanese Patent Office in an Office Action for related Patent Application No. 2022-163568 on Dec. 22, 2023.
2005-293280, JP, A, Cited by Japanese Patent Office in an Office Action for related Patent Application No. 2022-163568 on Dec. 22, 2023.
2013-178723, JP, A, Cited by Japanese Patent Office in an Office Action for related Patent Application No. 2022-163568 on Dec. 22, 2023.
Applicant-Initiated Interview Summary received for U.S. Appl. No. 16/938,362, mailed on Nov. 2, 2022, 2 pages.
Applicant-Initiated Interview Summary received for U.S. Appl. No. 17/409,570, mailed on Nov. 3, 2022, 5 pages.
Decision to Grant received for European Patent Application No. 19194828.0, mailed on Oct. 27, 2022, 3 pages.
Extended European Search Report received for European Patent Application No. 22188377.0, mailed on Oct. 27, 2022, 8 pages.
Final Office Action received for U.S. Appl. No. 17/409,570, mailed on Nov. 9, 2022, 37 pages.
Non-Final Office Action received for U.S. Appl. No. 17/863,974, mailed on Oct. 24, 2022, 23 pages.
Office Action received for Japanese Patent Application No. 2021-149549, mailed on Oct. 21, 2022, 4 pages (2 pages of English Translation and 2 pages of Official Copy).
Office Action received for Japanese Patent Application No. 2022-100394, mailed on Sep. 29, 2023, 6 pages (3 pages of English Translation and 3 pages of Official Copy).
Office Action received for Japanese Patent Application No. 2022-151495, mailed on Sep. 29, 2023, 11 pages (5 pages of English Translation and 6 pages of Official Copy).
Office Action received for Korean Patent Application No. 10-2022-0150750, mailed on Sep. 20, 2023, 15 pages (7 pages of English Translation and 8 pages of Official Copy).
Office Action received for Korean Patent Application No. 10-2023-7024803, mailed on Sep. 19, 2023, 7 pages (3 pages of English Translation and 4 pages of Official Copy).
2007-141002, JP, A, Cited by Japanese Patent Office in an Office Action for related Patent Application No. 2022-151495 on Jan. 12, 2024.
Applicant-Initiated Interview Summary received for U.S. Appl. No. 17/900,734, mailed on Feb. 22, 2024, 3 pages.
Final Office Action received for U.S. Appl. No. 18/105,191, mailed on Feb. 20, 2024, 20 pages.
Krumm et al., "Multi-camera multi-person tracking for easyliving", Third IEEE International Workshop on Visual Surveillance, Available online at: http://mesh.brown.edu/en193s05-2004/pdfs/KrummEtAl-iwvs00.pdf, Jul. 1, 2000, 8 pages.
Notice of Acceptance received for Australian Patent Application No. 2022231779, mailed on Feb. 5, 2024, 3 pages.
Office Action received for Chinese Patent Application No. 201880003211.7, mailed on Jan. 23, 2024, 20 pages (10 pages of English Translation and 10 pages of Official Copy).
Summons to Attend Oral Proceedings received for European Patent Application No. 20191533.7, mailed on Feb. 13, 2024, 7 pages.
Decision to Grant received for European Patent Application No. 19769336.9, mailed on Oct. 7, 2022, 2 pages.
Non-Final Office Action received for U.S. Appl. No. 17/193,991, mailed on Oct. 6, 2022, 7 pages.
Notice of Allowance received for Chinese Patent Application No. 201710198190.6, mailed on Sep. 23, 2022, 7 pages (3 pages of English Translation and 4 pages of Official Copy).
Office Action received for Australian Patent Application No. 2021254574, mailed on Oct. 15, 2022, 3 pages.
Feng et al., "A Prototype Three-Dimensional Position Sensitive CdZnTe Detector Array", IEEE Transactions on Nuclear Science, vol. 54, No. 4., Aug. 2007, 6 pages.
Jianxin et al., "Fingerprint-based Authentication in Networking Environment", Artificial Intelligence Institute of Zhejiang University, Hangzhou Zhejiang 310027, China, Dec. 28, 2001, 4 pages.
Applicant-Initiated Interview Summary received for U.S. Appl. No. 17/409,570, mailed on Dec. 7, 2022, 4 pages.
Applicant-Initiated Interview Summary received for U.S. Appl. No. 17/863,974, mailed on Dec. 9, 2022, 2 pages.
Notice of Allowance received for U.S. Appl. No. 17/498,557, mailed on Dec. 2, 2022, 9 pages.
Office Action received for Australian Patent Application No. 2022200900, mailed on Nov. 30, 2022, 6 pages.
Office Action received for Chinese Patent Application No. 201910109868.8, mailed on Nov. 18, 2022, 32 pages (17 pages of English Translation and 15 pages of Official Copy).
Office Action received for Japanese Patent Application No. 2021-084065, mailed on Nov. 14, 2022, 10 pages (5 pages of English Translation and 5 pages of Official Copy).
Result of Consultation received for European Patent Application No. 18208881.5, mailed on Dec. 6, 2022, 10 pages.
Final Office Action received for U.S. Appl. No. 17/479,974, mailed on Jun. 28, 2023, 32 pages.
Non-Final Office Action received for U.S. Appl. No. 17/962,369, mailed on Jun. 9, 2023, 17 pages.
Notice of Allowance received for U.S. Appl. No. 17/519,025, mailed on Jun. 22, 2023, 7 pages.
Office Action received for Chinese Patent Application No. 202211285112.7, mailed on May 18, 2023, 16 pages (6 pages of English Translation and 10 pages of Official Copy).
Brief Communication Regarding Oral Proceedings received for European Patent Application No. 19194828.0, mailed on May 6, 2022, 1 page.
Corrected Notice of Allowance received for U.S. Appl. No. 16/125,267, mailed on May 4, 2022, 3 pages.
Extended European Search Report received for European Patent Application No. 22150595.1, mailed on Apr. 8, 2022, 6 pages.
"How to Use Ok Google Assistant Even Phone is Locked", Available online at: https://www.youtube.com/watch?v=9B_gP4j_SP8, Mar. 12, 2018, 1 page.
Notice of Acceptance received for Australian Patent Application No. 2020207785, mailed on May 4, 2022, 3 pages.
Notice of Allowance received for U.S. Appl. No. 17/015,429, mailed on May 10, 2022, 2 pages.
Office Action received for Australian Patent Application No. 2020203899, mailed on May 5, 2022, 4 pages.
Office Action received for Chinese Patent Application No. 201780053143.0, mailed on Mar. 30, 2022, 12 pages (5 pages of English Translation and 7 pages of Official Copy).
Office Action received for Indian Patent Application No. 202018009906, mailed on Apr. 29, 2022, 9 pages.
Office Action received for Korean Patent Application No. 10-2022-0010942, mailed on Apr. 27, 2022, 5 pages (2 pages of English Translation and 3 pages of Official Copy).
Requirement for Restriction/Election received for U.S. Appl. No. 16/938,362, mailed on May 4, 2022, 6 pages.
Result of Consultation received for European Patent Application No. 19194828.0, mailed on May 9, 2022, 4 pages.
Decision to Refuse received for Japanese Patent Application No. 2021-168243, mailed on Aug. 14, 2023, 7 pages (3 pages of English Translation and 4 pages of Official Copy).
Final Office Action received for U.S. Appl. No. 17/962,369, mailed on Aug. 15, 2023, 20 pages.
Notice of Allowance received for Korean Patent Application No. 10-2021-7010306, mailed on Aug. 14, 2023, 7 pages (2 pages of English Translation and 5 pages of Official Copy).
Notice of Allowance received for U.S. Appl. No. 17/062,941, mailed on Aug. 11, 2023, 11 pages.
Office Action received for Australian Patent Application No. 2022231779, mailed on Aug. 7, 2023, 5 pages.

(56) References Cited

OTHER PUBLICATIONS

Office Action received for Chinese Patent Application No. 202211283788.2, mailed on Jul. 7, 2023, 11 pages (8 pages of English Translation and 3 pages of Official Copy).
Board Decision received for Chinese Patent Application No. 201510284715.9, mailed on Jul. 21, 2022, 22 pages (2 pages of English Translation and 20 pages of Official Copy).
Notice of Allowance received for Chinese Patent Application No. 201980041865.3, mailed on Aug. 16, 2022, 6 pages (3 pages of English Translation and 3 pages of Official Copy).
Notice of Allowance received for Korean Patent Application No. 10-2022-0010942, mailed on Aug. 10, 2022, 6 pages (2 pages of English Translation and 4 pages of Official Copy).
Final Office Action received for U.S. Appl. No. 18/136,819, mailed on Mar. 4, 2024, 10 pages.
Mahfouz et al., "Android users in the wild: Their authentication and usage behavior", Pervasive and Mobile Computing, vol. 32, Jul. 11, 2016, pp. 50-61.
Notice of Allowance received for U.S. Appl. No. 17/732,222, mailed on Mar. 5, 2024, 14 pages.
Notice of Hearing received for Indian Patent Application No. 202018044420, mailed on Feb. 28, 2024, 2 pages.
Office Action received for Chinese Patent Application No. 201911022883.5, mailed on Jan. 6, 2024, 9 pages (4 pages of English Translation and 5 pages of Official Copy).
Office Action received for Chinese Patent Application No. 202110011700.0, mailed on Jan. 24, 2024, 11 pages (5 pages of English Translation and 6 pages of Official Copy).
Office Action received for Korean Patent Application No. 10-2022-0150750, mailed on Feb. 20, 2024, 7 pages (3 pages of English Translation and 4 pages of Official Copy).
Board Opinion received for Chinese Patent Application No. 201610459968.X, mailed on Mar. 3, 2022, 11 pages (3 pages of English Translation and 8 pages of Official Copy).
Corrected Notice of Allowance received for U.S. Appl. No. 16/125,267, mailed on Apr. 4, 2022, 2 pages.
Final Office Action received for U.S. Appl. No. 17/087,855, mailed on Mar. 31, 2022, 23 pages.
Notice of Allowance received for Chinese Patent Application No. 201810338040.5, mailed on Mar. 30, 2022, 6 pages (2 pages of English Translation and 4 pages of Official Copy).
Notice of Allowance received for Japanese Patent Application No. 2021-208395, mailed on Mar. 25, 2022, 4 pages (1 page of English Translation and 3 pages of Official Copy).
Notice of Allowance received for U.S. Appl. No. 17/015,429, mailed on Apr. 4, 2022, 2 pages.
Office Action received for European Patent Application No. 20198076.0, mailed on Mar. 25, 2022, 5 pages.
Office Action received for Korean Patent Application No. 10-2022-7004578, mailed on Mar. 22, 2022, 11 pages (5 pages of English Translation and 6 pages of Official Copy).
Qiye Wang, "Design and Implementation of SAN Device Access Control in Unified Storage Platform", Master's Theses, Huazhong University of Science & Technology, Wuhan, Jun. 2008, 63 pages (Official Copy only) See Communication Under 37 CFR § 1.98(a) (3).
Schürmann et al., "Bandana—Body Area Network Device-to-Device Authentication Using Natural gAit", Ambient Intelligence, Comnet, Aalto University, DOI: 10.1109/PERCOM.2017.7917865, Dec. 11, 2016, 11 pages.
Weiss et al., "Smartphone and Smartwatch-Based Biometrics using Activities of Daily Living", IEEE Access, DOI: 10.1109/ACCESS.2019.2940729, vol. XX, 2017, 13 pages.
Zhang et al., "WristUnlock: Secure and Usable Smartphone Unlocking with Wrist Wearables", IEEE Conference on Communications and Network Security (CNS), 2019, 9 pages.
9-81309, JP, A, Cited by Japanese Patent Office in an Office Action for related Patent Application No. 2021-131310 on Sep. 2, 2022.
2014-230061, JP, A, Cited by Japanese Patent Office in an Office Action for related Patent Application No. 2021-131310 on Sep. 2, 2022.
2016-76799, JP, A, Cited by Japanese Patent Office in an Office Action for related Patent Application No. 2021-131310 on Sep. 2, 2022.
Board Decision received for Chinese Patent Application No. 201710198190.6, mailed on May 23, 2022, 2 pages (1 page of English Translation and 1 page of Official Copy).
Intention to Grant received for European Patent Application No. 18713408.5, mailed on May 23, 2022, 10 pages.
Intention to Grant received for European Patent Application No. 19769336.9, mailed on May 31, 2022, 13 pages.
Notice of Allowance received for Japanese Patent Application No. 2020-028315, mailed on May 27, 2022, 3 pages (1 page of English Translation and 2 pages of Official Copy).
Notice of Allowance received for U.S. Appl. No. 16/369,473, mailed on Jun. 8, 2022, 7 pages.
Notice of Allowance received for U.S. Appl. No. 17/015,429, mailed on Jun. 1, 2022, 5 pages.
Notice of Allowance received for U.S. Appl. No. 17/015,429, mailed on Apr. 15, 2022, 2 pages.
Office Action received for Chinese Patent Application No. 201510284896.5, mailed on Mar. 14, 2022, 10 pages (5 pages of English Translation and 5 pages of Official Copy).
Office Action received for European Patent Application No. 19731554.2, mailed on Apr. 19, 2022, 8 pages.
Hwang et al., "Toward Event-Based Haptics: Rendering Contact Using Open-Loop Force Pulses", 12th International Symposium on Haptic Interfaces for Virtual Environment and Teleoperator Systems, 2004, 8 pages.
Liu et al., "PKI Authentication System Combining with Fingerprint", Computer Engineering, vol. 39, No. 9, May 2005, 3 pages (Official Copy Only) (See Communication under 37 CFR § 1.98(a) (3)).
Notice of Allowance received for Japanese Patent Application No. 2022-070240, mailed on Aug. 5, 2022, 4 pages (1 page of English Translation and 3 pages of Official Copy).
Notice of Allowance received for U.S. Appl. No. 17/208,957, mailed on Aug. 17, 2022, 11 pages.
Notice of Hearing received for Indian Patent Application No. 201617039493, mailed on Aug. 10, 2022, 3 pages.
Office Action received for Chinese Patent Application No. 201710198190.6, mailed on Jul. 5, 2022, 7 pages (3 pages of English Translation and 4 pages of Official Copy).
Office Action received for European Patent Application No. 19160348.9, mailed on Aug. 4, 2022, 6 pages.
Office Action received for European Patent Application No. 20198076.0, mailed on Sep. 22, 2022, 7 pages.
Office Action received for Japanese Patent Application No. 2020-566978, mailed on Sep. 26, 2022, 4 pages (2 pages of English Translation and 2 pages of Official Copy).
Intention to Grant received for European Patent Application No. 19194828.0, mailed on Jun. 30, 2022, 9 pages.
Notice of Allowance received for Korean Patent Application No. 10-2021-7032984, mailed on Jun. 29, 2022, 5 pages (2 pages of English Translation and 3 pages of Official Copy).
Office Action received for Japanese Patent Application No. 2019-563560, mailed on Jul. 4, 2022, 34 pages (15 pages of English Translation and 19 pages of Official Copy).
Office Action received for Korean Patent Application No. 10-2022-7012864, mailed on Jun. 27, 2022, 9 pages (4 pages of English Translation and 5 pages of Official Copy).
Office Action received for Korean Patent Application No. 10-2022-7012869, mailed on Jun. 27, 2022, 11 pages (5 pages of English Translation and 6 pages of Official Copy).
Applicant Initiated Interview Summary received for U.S. Appl. No. 17/725,311, mailed on Jun. 30, 2023, 5 pages.
Decision to Refuse received for Japanese Patent Application No. 2021-149549, mailed on Jun. 26, 2023, 4 pages (2 pages of English Translation and 2 pages of Official Copy).
Notice of Acceptance received for Australian Patent Application No. 2022235545, mailed on Jun. 27, 2023, 3 pages.

(56) References Cited

OTHER PUBLICATIONS

Notice of Allowance received for U.S. Appl. No. 17/863,974, mailed on Jul. 11, 2023, 5 pages.
Office Action received for Australian Patent Application No. 2022206826, mailed on Jul. 4, 2023, 3 pages.
Office Action received for Japanese Patent Application No. 2020-184605, mailed on Jul. 3, 2023, 6 pages (3 pages of English Translation and 3 pages of Official Copy).
Applicant-Initiated Interview Summary received for U.S. Appl. No. 17/725,311, mailed on Jan. 16, 2024, 6 pages.
Applicant-Initiated Interview Summary received for U.S. Appl. No. 18/105,191, mailed on Jan. 17, 2024, 2 pages.
Notice of Acceptance received for Australian Patent Application No. 2022279466, mailed on Jan. 10, 2024, 3 pages.
Notice of Hearing received for Indian Patent Application No. 201817036875, mailed on Jan. 11, 2024, 3 pages.
Office Action received for Australian Patent Application No. 2022218517, mailed on Dec. 21, 2023, 5 pages.
Office Action received for Chinese Patent Application No. 201910901500.5, mailed on Dec. 22, 2023, 19 pages (6 pages of English Translation and 13 pages of Official Copy).
Non-Final Office Action received for U.S. Appl. No. 17/062,941, mailed on Nov. 24, 2023, 8 pages.
Notice of Acceptance received for Australian Patent Application No. 2022209019, mailed on Nov. 15, 2023, 3 pages.
Notice of Allowance received for Korean Patent Application No. 10-2022-7014519, mailed on Nov. 16, 2023, 7 pages (2 pages of English Translation and 5 pages of Official Copy).
Notice of Hearing received for Indian Patent Application No. 201617039493, mailed on Nov. 21, 2023, 3 pages.
Advisory Action received for U.S. Appl. No. 17/193,991, mailed on Jan. 31, 2023, 3 pages.
Corrected Notice of Allowance received for U.S. Appl. No. 16/938,362, mailed on Feb. 7, 2023, 4 pages.
Corrected Notice of Allowance received for U.S. Appl. No. 17/087,855, mailed on Jan. 25, 2023, 4 pages.
Extended European Search Report received for European Patent Application No. 22198902.3, mailed on Jan. 20, 2023, 9 pages.
Notice of Allowance received for Chinese Patent Application No. 201910246400.3, mailed on Jan. 28, 2023, 5 pages (1 page of English Translation and 4 pages of Official Copy).
Notice of Allowance received for U.S. Appl. No. 17/409,570, mailed on Jan. 25, 2023, 7 pages.
Office Action received for Chinese Patent Application No. 201780053143.0, mailed on Nov. 30, 2022, 13 pages (6 pages of English Translation and 7 pages of Official Copy).
Office Action received for European Patent Application No. 21173988.3, mailed on Jan. 19, 2023, 5 pages.
Office Action received for Japanese Patent Application No. 2019-563560, mailed on Jan. 20, 2023, 56 pages (25 pages of English Translation and 31 pages of Official Copy).
Office Action received for Korean Patent Application No. 10-2022-7014519, mailed on Jan. 26, 2023, 9 pages (4 pages of English Translation and 5 pages of Official Copy).
Applicant-Initiated Interview Summary received for U.S. Appl. No. 17/062,941, mailed on Apr. 19, 2023, 2 pages.
Extended European Search Report received for European Patent Application No. 23157906.1, mailed on Apr. 6, 2023, 10 pages.
Notice of Allowance received for Japanese Patent Application No. 2022-007217, mailed on Apr. 10, 2023, 4 pages (1 page of English Translation and 3 pages of Official Copy).
Office Action received for Chinese Patent Application No. 201910246439.5, mailed on Apr. 6, 2023, 14 pages (7 pages of English Translation and 7 pages of Official Copy).
Office Action received for Chinese Patent Application No. 202211283788.2, mailed on Mar. 22, 2023, 15 pages (7 pages of English Translation and 8 pages of Official Copy).
Office Action received for European Patent Application No. 19769669.3, mailed on Apr. 18, 2023, 20 pages.
Office Action received for Japanese Patent Application No. 2021-084065, mailed on Apr. 10, 2023, 6 pages (3 pages of English Translation and 3 pages of Official Copy).
Applicant-Initiated Interview Summary received for U.S. Appl. No. 17/496,716, mailed on Sep. 14, 2023, 2 pages.
Office Action received for Australian Patent Application No. 2022200900, mailed on Sep. 8, 2023, 4 pages.
Office Action received for Australian Patent Application No. 2023203469, mailed on Aug. 31, 2023, 5 pages.
Office Action received for German Patent Application No. 112014004134.3, mailed on Jul. 31, 2023, 11 pages (1 page of English Translation and 10 pages of Official Copy).
2009-135770, JP, A, Cited by Japanese Patent Office in an Office Action for related Patent Application No. 2021-168243 on Feb. 6, 2023.
2013-140540, JP, A, Cited by Japanese Patent Office in an Office Action for related Patent Application No. 2021-168243 on Feb. 6, 2023.
2014-110009, JP, A, Cited by Japanese Patent Office in an Office Action for related Patent Application No. 2021-168243 on Feb. 6, 2023.
2015-207051, JP, A, Cited by Japanese Patent Office in an Office Action for related Patent Application No. 2021-168243 on Feb. 6, 2023.
10-2016-0026337, KR, A, Cited by Japanese Patent Office in an Office Action for related Patent Application No. 2021-168243 on Feb. 6, 2023.
2007402278, JP, A, Cited by the Japanese Patent Office in an Office Action for related Patent Application No. 2021-149549 on Oct. 21, 2022.
2014-239478, JP, A, Cited by the Japanese Patent Office in an Office Action for related Patent Application No. 2021-149549 on Oct. 21, 2022.
2017-117159, JP, A, Cited by the Japanese Patent Office in an Office Action for related Patent Application No. 2021-149549 on Oct. 21, 2022.
Corrected Notice of Allowance received for U.S. Appl. No. 16/125,267, mailed on Mar. 16, 2022, 2 pages.
Intention to Grant received for European Patent Application No. 18713408.5, mailed on Mar. 17, 2022, 10 pages.
Notice of Allowance received for Chinese Patent Application No. 201810339290.0, mailed on Mar. 9, 2022, 2 pages (1 page of English Translation and 1 page of Official Copy).
Office Action received for Australian Patent Application No. 2021202352, mailed on Mar. 15, 2022, 3 pages.
Summons to Attend Oral Proceedings received for European Patent Application No. 19150528.8, mailed on Mar. 15, 2022, 7 pages.
Yongxi et al., "Application of RFID Technology in Mobile Payment", China Academic Journal Electronic Publishing House, 1994-2022, Nov. 25, 2012, pp. 97-99 (Official Copy Only). {See Communication under 37 CFR § 1.98(a) (3)}.
2007-116318, JP, A, Cited by Japanese Patent Office in an Office Action for related Patent Application No. 2022-151495, on Sep. 29, 2023.
2007-116602, JP, A, Cited by Japanese Patent Office in an Office Action for related Patent Application No. 2022-151495, on Sep. 29, 2023.
2009-087156, JP, A, Cited by Japanese Patent Office in an Office Action for related Patent Application No. 2022-100394, on Sep. 29, 2023.
2011-053849, JP, A, Cited by Japanese Patent Office in an Office Action for related Patent Application No. 2022-100394, on Sep. 29, 2023.
2011-242924, JP, A, Cited by Japanese Patent Office in an Office Action for related Patent Application No. 2022-100394, on Sep. 29, 2023.
10-2002-0038162, KR, A, Cited by Korean Patent Office in an Office Action for related Patent Application No. 10-2023-7024803, on Sep. 19, 2023.
10-2011-0098435, KR, A, Cited by Korean Patent Office in an Office Action for related Patent Application No. 10-2022-0150750, mailed on Sep. 20. 2023.

(56) References Cited

OTHER PUBLICATIONS 10-2012-0052150, KR, A, Cited by Korean Patent Office in an Office Action for related Patent Application No. 10-2022-0150750, mailed on Sep. 20, 2023.
10-2012-0076675, KR, A, Cited by Korean Patent Office in an Office Action for related Patent Application No. 10-2022-0150750, mailed on Sep. 20, 2023.
10-2013-0011423, KR, A, Cited by Korean Patent Office in an Office Action for related Patent Application No. 10-2022-0150750, mailed on Sep. 20, 2023.
10-2014-0015171, KR, A, Cited by Korean Patent Office in an Office Action for related Patent Application No. 10-2022-0150750, mailed on Sep. 20, 2023.
Applicant-Initiated Interview Summary received for U.S. Appl. No. 17/479,974, mailed on Nov. 1, 2023, 2 pages.
Intention to Grant received for European Patent Application No. 20198076.0, mailed on Oct. 25, 2023, 11 pages.
Non-Final Office Action received for U.S. Appl. No. 18/136,819, mailed on Nov. 7, 2023, 8 pages.
Notice of Allowance received for Korean Patent Application No. 10-2022-7029609, mailed on Oct. 23, 2023, 8 pages (2 pages of English Translation and 6 pages of Official Copy).
Notice of Allowance received for U.S. Appl. No. 17/496,716, mailed on Nov. 8, 2023, 24 pages.
Office Action received for Australian Patent Application No. 2022203027, mailed on Oct. 25, 2023, 5 pages.
Office Action received for Australian Patent Application No. 2022279466, mailed on Oct. 25, 2023, 3 pages.
Office Action received for Chinese Patent Application No. 201910901500.5, mailed on Sep. 29, 2023, 15 pages (5 pages of English Translation and 10 pages of Official Copy).
Office Action received for Japanese Patent Application No. 2022-140146, mailed on Oct. 20, 2023, 8 pages (4 pages of English Translation and 4 pages of Official Copy).
Brief Communication Regarding Oral Proceedings received for European Patent Application No. 19150528.8, mailed on Sep. 5, 2022, 2 pages.
Decision to Grant received for European Patent Application No. 18713408.5, mailed on Sep. 1, 2022, 3 pages.
Decision to Grant received for European Patent Application No. 19160344.8, mailed on Sep. 1, 2022, 3 pages.
Office Action received for Australian Patent Application No. 2019281965, mailed on Aug. 31, 2022, 5 pages.
Office Action received for Chinese Patent Application No. 201980009669.8, mailed on Aug. 3, 2022, 19 pages (12 pages of English Translation and 7 pages of Official Copy).
Office Action received for Chinese Patent Application No. 201910901500.5, mailed on Nov. 24, 2022, 22 pages (7 pages of English Translation and 15 pages of Official Copy).
Applicant-Initiated Interview Summary received for U.S. Appl. No. 17/479,974, mailed on Mar. 14, 2024, 2 pages.
Applicant-Initiated Interview Summary received for U.S. Appl. No. 18/136,819, mailed on Mar. 19, 2024, 2 pages.
Office Action received for Australian Patent Application No. 2022203027, mailed on Mar. 14, 2024, 3 pages.
Office Action received for Chinese Patent Application No. 201911023090.5, mailed on Jan. 29, 2024, 27 pages (7 pages of English Translation and 20 pages of Official Copy).
Office Action received for European Patent Application No. 22188377.0, mailed on Mar. 7, 2024, 7 pages.
Office Action received for Japanese Patent Application No. 2021-168243, mailed on Mar. 8, 2024, 4 pages (2 pages of English Translation and 2 pages of Official Copy).
Office Action received for Japanese Patent Application No. 2022-140146, mailed on Mar. 1, 2024, 8 pages (4 pages of English Translation and 4 pages of Official Copy).
Office Action received for Japanese Patent Application No. 2023-001790, mailed on Mar. 4, 2024, 10 pages (5 pages of English Translation and 5 pages of Official Copy).
Record of Oral Hearing received for U.S. Appl. No. 17/516,495, mailed on Mar. 5, 2024, 15 pages.
Weiyi, Liu, "Financial Revolution in the Era of Internet Finance and Big Data", China Electric Power Press, Apr. 30, 2014, 7 pages (Official Copy only). See Communication Under Rule 37 CFR § 1.98(a)(3).
Weiyi, Liu, "Financial Revolution in the Era of Internet Finance and Big Data", China Electric Power Press, Apr. 30, 2014, 7 pages.
Decision on Hearing received for Australian Patent Application No. 2019281965, mailed on Jun. 25, 2024, 25 pages.
Office Action received for Chinese Patent Application No. 201911022883.5, mailed on Jun. 20, 2024, 13 pages (6 pages of English Translation and 7 pages of Official Copy).
Office Action received for European Patent Application No. 19160348.9, mailed on Jul. 24, 2024, 9 pages.
Office Action received for Korean Patent Application No. 10-2023-7024803, mailed on Jul. 19, 2024, 11 pages (5 pages of English Translation and 6 pages of Official Copy).
Stone et al., "Excerpt from User Interface Design and Evaluation", Jan. 1, 2005, 1 page.
Summons to Attend Oral Proceedings received for European Patent Application No. 20191533.7, mailed on Jul. 25, 2024, 12 pages.
Applicant-Initiated Interview Summary received for U.S. Appl. No. 18/237,849, mailed on Jul. 19, 2024, 4 pages.
Brief Communication Regarding Oral Proceedings received for European Patent Application No. 20191533.7, mailed on Jul. 17, 2024, 1 page.
Corrected Notice of Allowance received for U.S. Appl. No. 17/516,495, mailed on Jul. 17, 2024, 3 pages.
Office Action received for Chinese Patent Application No. 202211285799.4, mailed on Jun. 19, 2024, 19 pages (9 pages of English Translation and 10 pages of Official Copy).
Office Action received for Japanese Patent Application No. 2023-077990, mailed on Jul. 12, 2024, 8 pages (4 pages of English Translation and 4 pages of Official Copy).
Office Action received for Japanese Patent Application No. 2023-110191, mailed on Jul. 16, 2024, 4 pages (2 pages of English Translation and 2 pages of Official Copy).
Result of Consultation received for European Patent Application No. 20191533.7, mailed on Jul. 18, 2024, 4 pages.
Advisory Action received for U.S. Appl. No. 17/479,974, mailed on Apr. 25, 2024, 4 pages.
Advisory Action received for U.S. Appl. No. 17/479,974, mailed on May 6, 2024, 4 pages.
Advisory Action received for U.S. Appl. No. 17/900,734, mailed on Mar. 21, 2024, 5 pages.
Alexandridis et al., "Forthroid on Android: A QR-code based Information Access System for Smart Phones", 18th IEEE Workshop on Local & Metropolitan Area Networks (LANMAN), 2011, 6 pages.
Applicant-Initiated Interview Summary received for U.S. Appl. No. 17/685,039, mailed on May 16, 2024, 4 pages.
Applicant-Initiated Interview Summary received for U.S. Appl. No. 18/105,191, mailed on Apr. 30, 2024, 2 pages.
Board Decision received for Chinese Patent Application No. 201910901500.5, mailed on Apr. 19, 2024, 2 pages (1 page of English Translation and 1 page of Official Copy).
Brief Communication Regarding Oral Proceedings received for European Patent Application No. 19160348.9, mailed on Jun. 12, 2024, 1 page.
Brief Communication Regarding Oral Proceedings received for European Patent Application No. 19160348.9, mailed on May 2, 2024, 4 pages.
Corrected Notice of Allowance received for U.S. Appl. No. 17/725,311, mailed on Mar. 28, 2024, 2 pages.
Examiner's Answer to Appeal Brief received for U.S. Appl. No. 17/962,369, mailed on Apr. 10, 2024, 18 pages.
Final Office Action received for U.S. Appl. No. 17/062,941, mailed on Jun. 3, 2024, 12 pages.
Intention to Grant received for European Patent Application No. 21166718.3, mailed on Mar. 25, 2024, 8 pages.
Intention to Grant received for European Patent Application No. 22150595.1, mailed on Jun. 7, 2024, 9 pages.

(56) References Cited

OTHER PUBLICATIONS

International Preliminary Report on Patentability received for PCT Patent Application No. PCT/US2022/042978, mailed on Apr. 4, 2024, 12 pages.
Non-Final Office Action received for U.S. Appl. No. 17/685,039, mailed on Mar. 26, 2024, 40 pages.
Non-Final Office Action received for U.S. Appl. No. 18/136,819, mailed on Apr. 10, 2024, 9 pages.
Non-Final Office Action received for U.S. Appl. No. 18/137,985, mailed on Jun. 5, 2024, 9 pages.
Non-Final Office Action received for U.S. Appl. No. 18/237,849, mailed on Mar. 26, 2024, 47 pages.
Non-Final Office Action received for U.S. Appl. No. 18/239,701, mailed on Jun. 7, 2024, 10 pages.
Notice of Acceptance received for Australian Patent Application No. 2023200797, mailed on May 21, 2024, 3 pages.
Notice of Allowance received for Chinese Patent Application No. 201910901500.5, mailed on May 6, 2024, 4 pages (1 page of English Translation and 3 pages of Official Copy).
Notice of Allowance received for Chinese Patent Application No. 202211285112.7, mailed on Mar. 21, 2024, 2 pages (1 page of English Translation and 1 page of Official Copy).
Notice of Allowance received for Japanese Patent Application No. 2021-168243, mailed on Apr. 30, 2024, 4 pages (1 page of English Translation and 3 pages of Official Copy).
Notice of Allowance received for U.S. Appl. No. 17/725,311, mailed on May 1, 2024, 5 pages.
Notice of Allowance received for U.S. Appl. No. 18/105, 191, mailed on May 22, 2024, 8 pages.
Notice of Hearing received for Indian Patent Application No. 201918003782, mailed on May 8, 2024, 2 pages.
Notice of Hearing received for Indian Patent Application No. 202018041558, mailed on May 20, 2024, 2 pages.
Notice of Hearing received for Indian Patent Application No. 202118009403, mailed on Mar. 15, 2024, 2 pages.
Office Action received for Australian Patent Application No. 2022218517, mailed on Apr. 24, 2024, 4 pages.
Office Action received for Australian Patent Application No. 2023203469, mailed on Apr. 24, 2024, 4 pages.
Office Action received for Chinese Patent Application No. 201880001546.5, mailed on Feb. 24, 2024, 21 pages (11 pages of English Translation and 10 pages of Official Copy).
Office Action received for Chinese Patent Application No. 201980064012.1, mailed on Mar. 19, 2024, 18 pages (10 pages of English Translation and 8 pages of Official Copy).
Office Action received for Chinese Patent Application No. 202011020666.5, mailed on Apr. 27, 2024, 21 pages (10 pages of English Translation and 11 pages of Official Copy).
Office Action received for European Patent Application No. 19731554. 2, mailed on May 8, 2024, 5 pages.
Office Action received for Japanese Patent Application No. 2022-163568, mailed on Jun. 3, 2024, 8 pages (4 pages of English Translation and 4 pages of Official Copy).
Office Action received for Japanese Patent Application No. 2023-009554, mailed on Apr. 1, 2024, 4 pages (2 pages of English Translation and 2 pages of Official Copy).
Office Action received for Korean Patent Application No. 10-2023-7025821, mailed on Mar. 12, 2024, 11 pages (5 pages of English Translation and 6 pages of Official Copy).
Ohbuchi et al., "Barcode Readers using the Camera Device in Mobile Phones", International Conference on Cyberworlds IEEE, 2004, 6 pages.
Result of Consultation received for European Patent Application No. 19160348.9, mailed on May 8, 2024, 4 pages.
Examiner's Pre-Review Report received for Japanese Patent Application No. 2022-151495, mailed on Jun. 6, 2024, 8 pages (4 pages of English Translation and 4 pages of Official Copy).
Notice of Allowance received for Japanese Patent Application No. 2023-001790, mailed on Jul. 5, 2024, 4 pages (1 page of English Translation and 3 pages of Official Copy).
Notice of Allowance received for U.S. Appl. No. 17/516,495, mailed on Jul. 3, 2024, 8 pages.
Notice of Allowance received for U.S. Appl. No. 17/732,222, mailed on Jul. 3, 2024, 14 pages.
Office Action received for Chinese Patent Application No. 202211284989.4, mailed on Jun. 12, 2024, 24 pages (11 pages of English Translation and 13 pages of Official Copy).
Office Action received for Indian Patent Application No. 202218027489, mailed on Jul. 9, 2024, 8 pages.
Result of Consultation received for European Patent Application No. 20191533.7, mailed on Jul. 9, 2024, 4 pages.

* cited by examiner

Figure 10B:
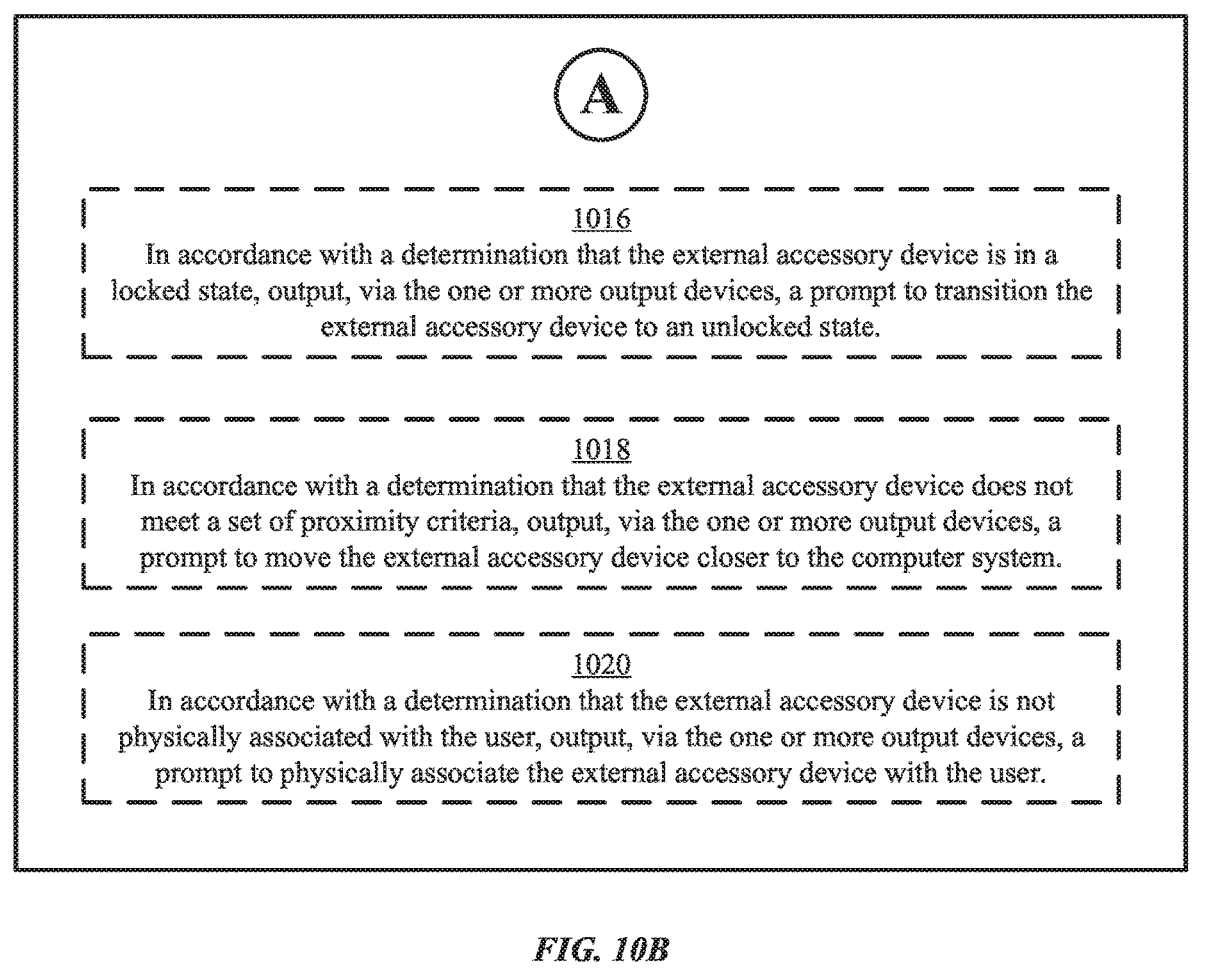

A

1016
In accordance with a determination that the external accessory device is in a locked state, output, via the one or more output devices, a prompt to transition the external accessory device to an unlocked state.

1018
In accordance with a determination that the external accessory device does not meet a set of proximity criteria, output, via the one or more output devices, a prompt to move the external accessory device closer to the computer system.

1020
In accordance with a determination that the external accessory device is not physically associated with the user, output, via the one or more output devices, a prompt to physically associate the external accessory device with the user.

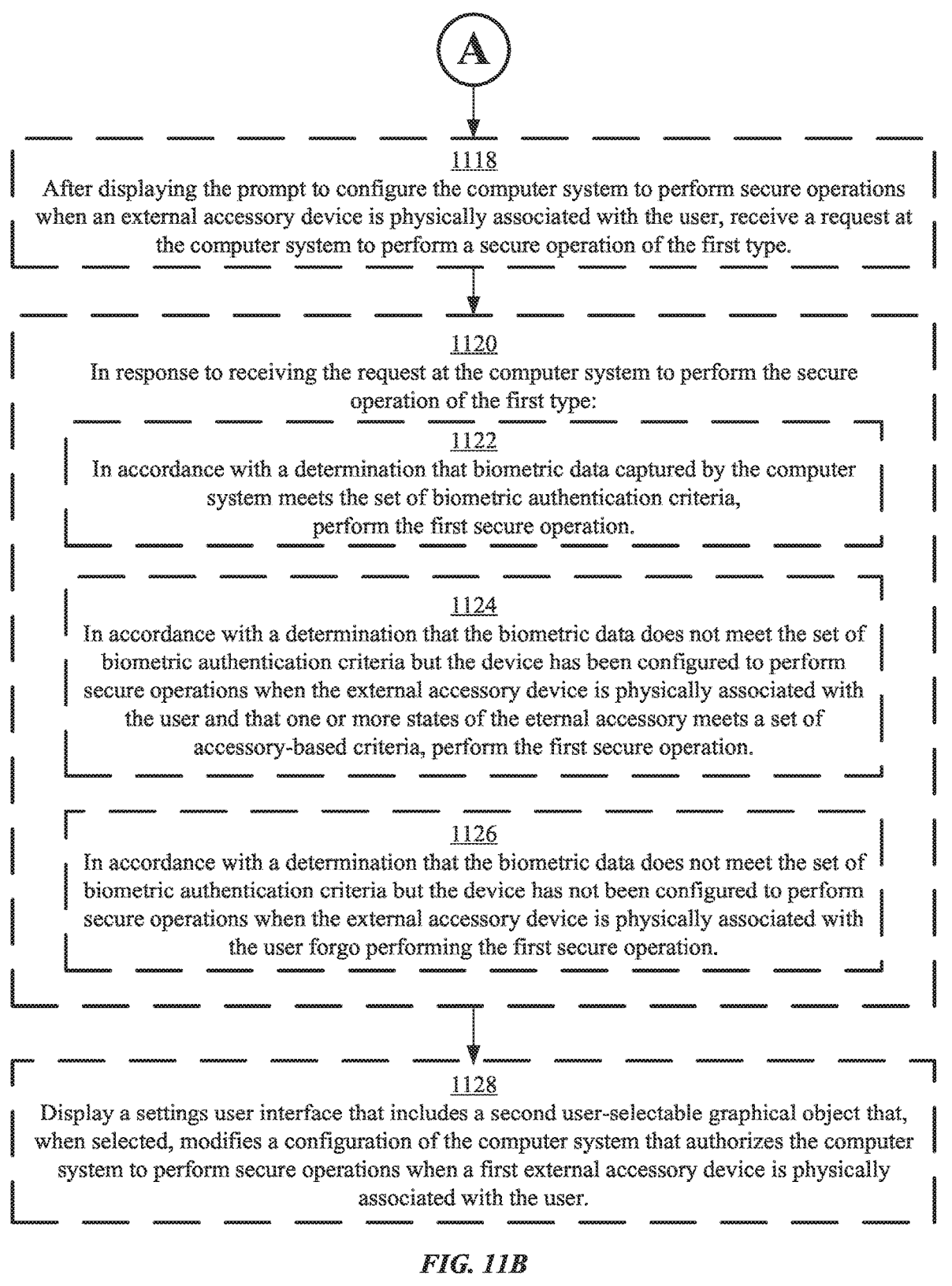

1118
After displaying the prompt to configure the computer system to perform secure operations when an external accessory device is physically associated with the user, receive a request at the computer system to perform a secure operation of the first type.

1120
In response to receiving the request at the computer system to perform the secure operation of the first type:

1122
In accordance with a determination that biometric data captured by the computer system meets the set of biometric authentication criteria, perform the first secure operation.

1124
In accordance with a determination that the biometric data does not meet the set of biometric authentication criteria but the device has been configured to perform secure operations when the external accessory device is physically associated with the user and that one or more states of the eternal accessory meets a set of accessory-based criteria, perform the first secure operation.

1126
In accordance with a determination that the biometric data does not meet the set of biometric authentication criteria but the device has not been configured to perform secure operations when the external accessory device is physically associated with the user forgo performing the first secure operation.

1128
Display a settings user interface that includes a second user-selectable graphical object that, when selected, modifies a configuration of the computer system that authorizes the computer system to perform secure operations when a first external accessory device is physically associated with the user.

*FIG. 11B*

| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY | YES | YES | NO | NO |
| ALTERNATE | NO | NO | NO | NO |

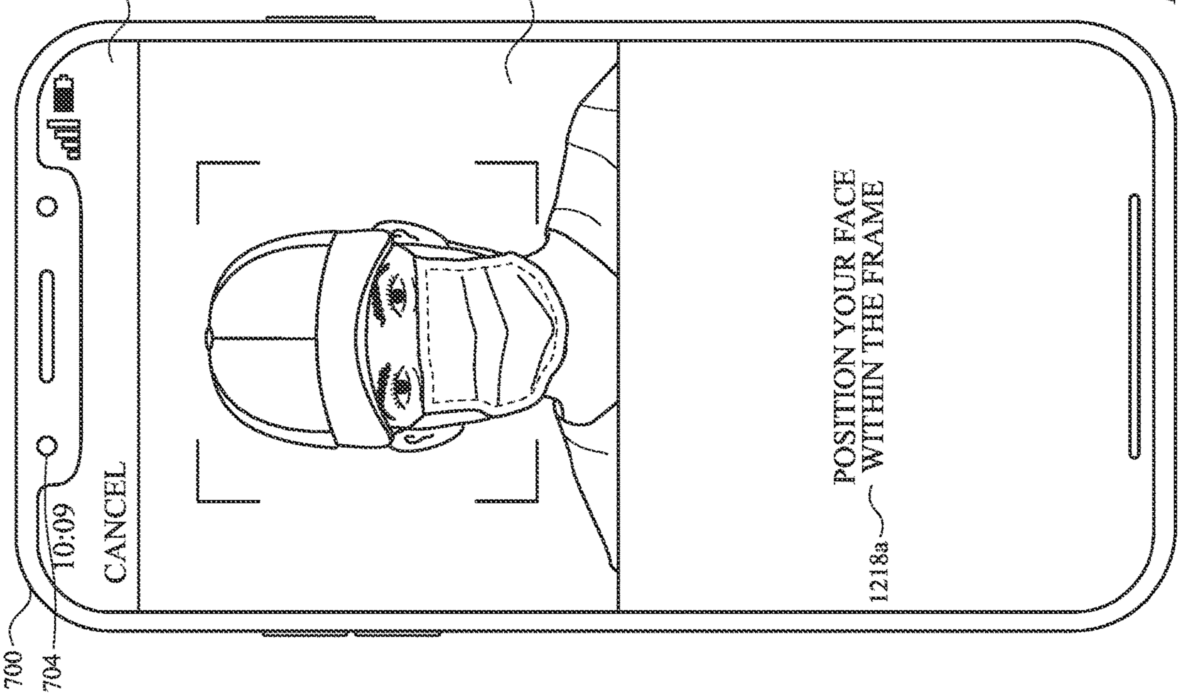
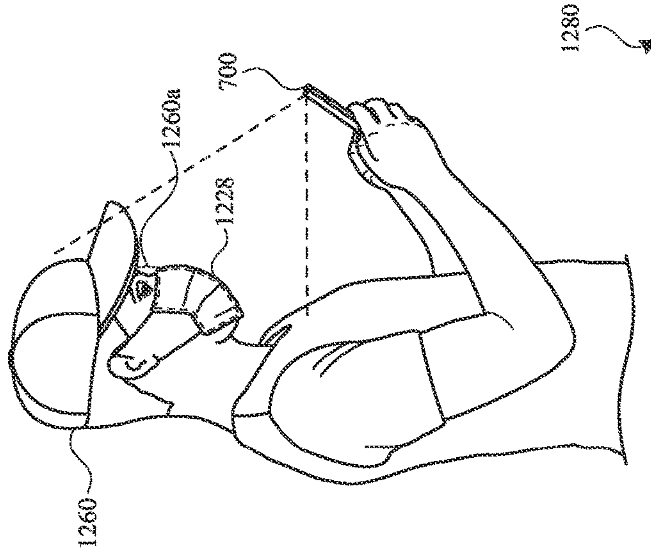
1280
| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY | YES | YES | NO | NO |
| ALTERNATE | NO | NO | NO | NO |
*FIG. 12C*

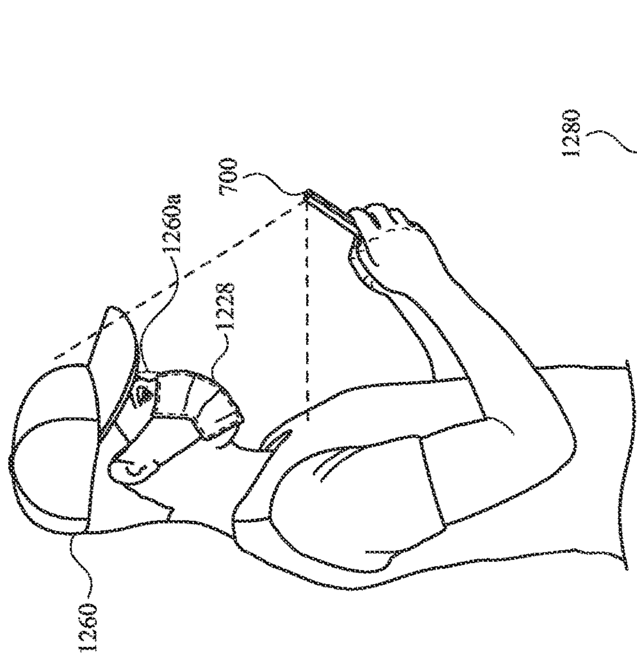
1280
| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY | YES | YES | NO | NO |
| ALTERNATE | NO | NO | NO | NO |
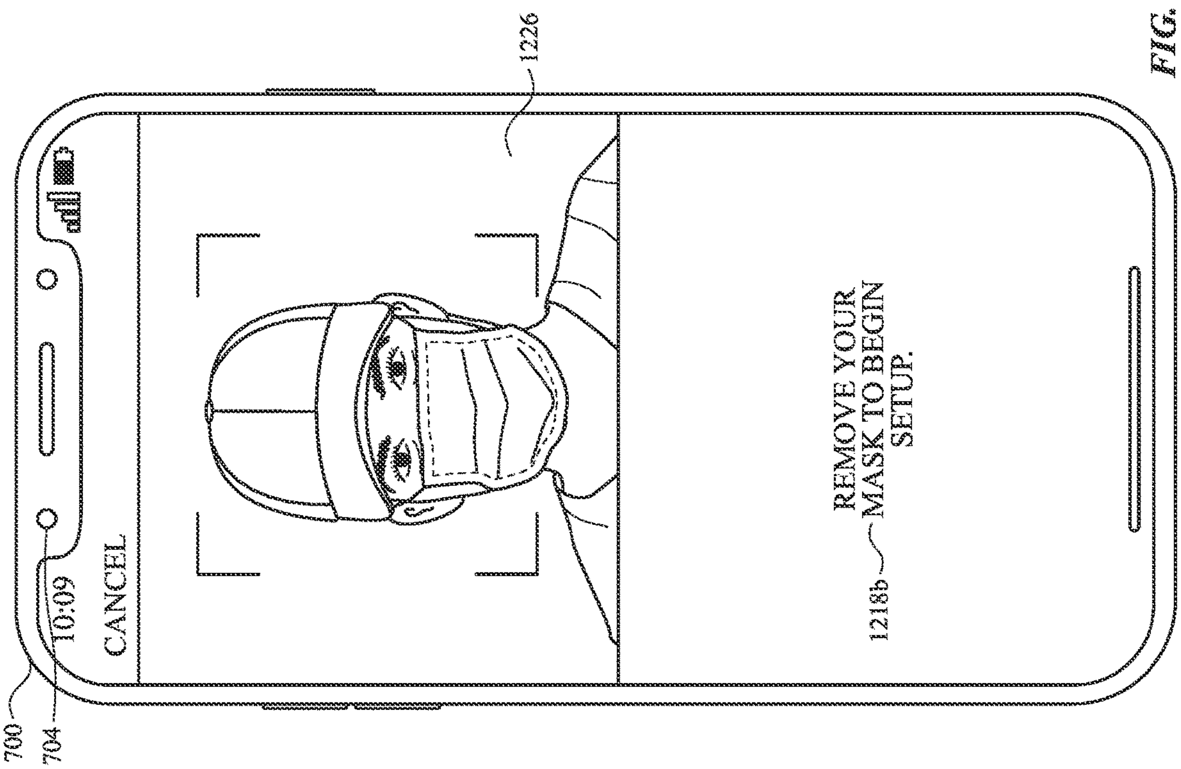
*FIG. 12D*

| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY | YES | YES | NO | NO |
| ALTERNATE | NO | NO | NO | NO |

| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY | YES | YES | NO | NO |
| ALTERNATE | NO | NO | NO | NO |

| | FEATURE: ENROLLED? | FEATURE: AUTHENTICATION ENABLED? | PORTION OF FEATURE: ENROLLED? | PORTION OF FEATURE: AUTHENTICATION ENABLED? |
|---|---|---|---|---|
| PRIMARY | YES | YES | NO | NO |
| ALTERNATE | YES | NO | YES | NO |

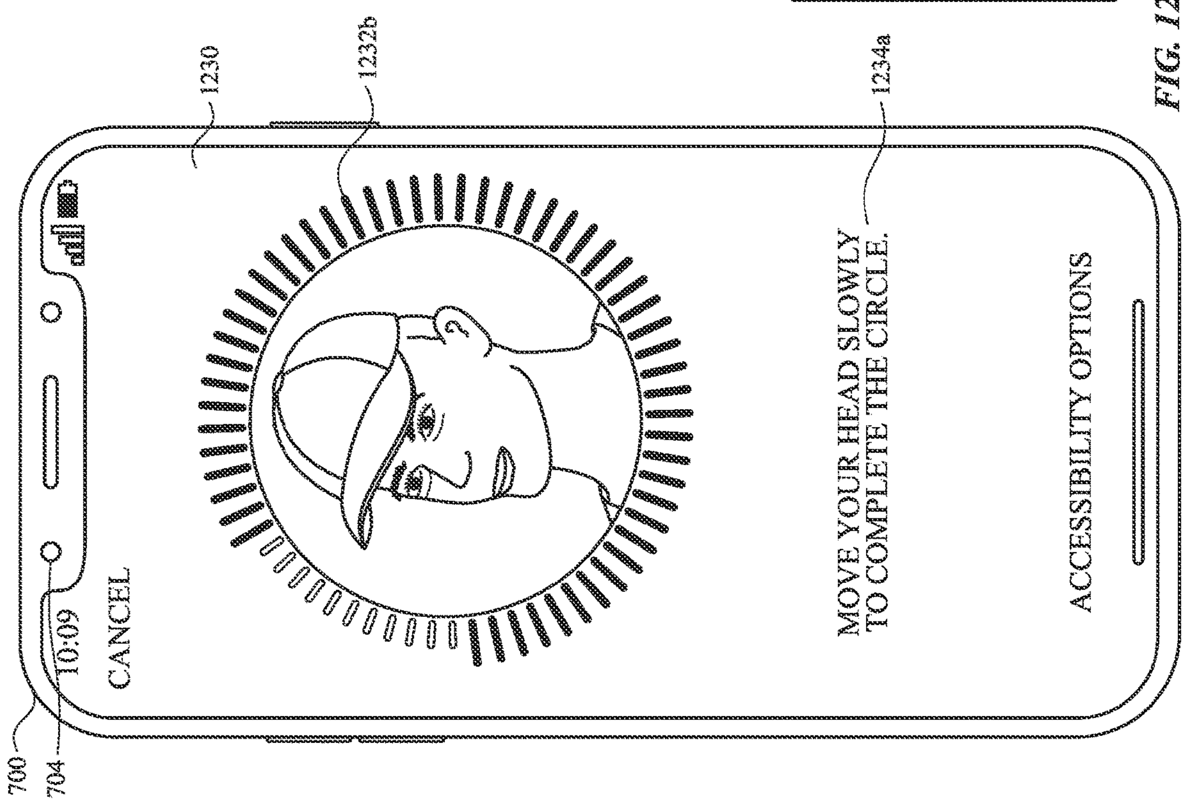
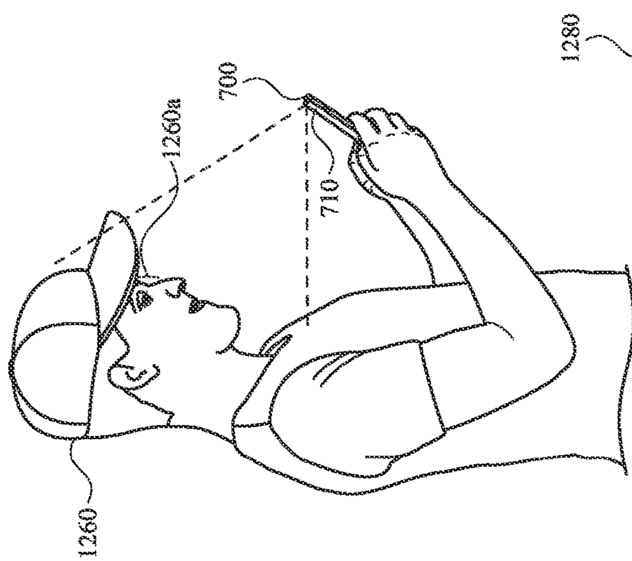
1280
| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY | YES | YES | NO | NO |
| ALTERNATE | YES | NO | YES | NO |
FIG. 12H

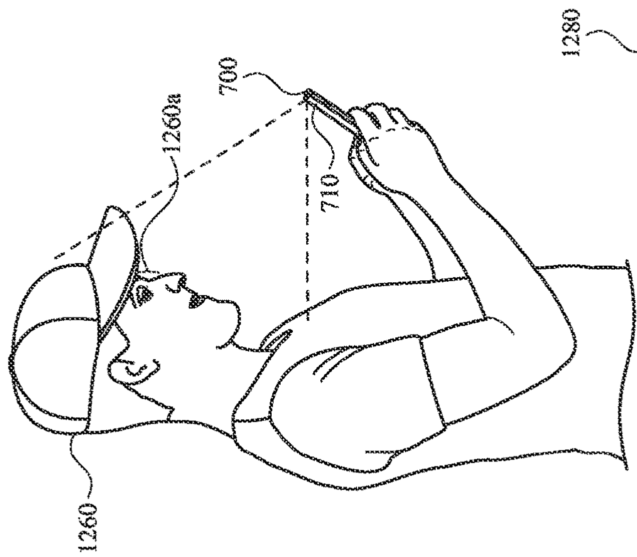
1280
| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY 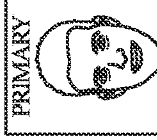 | YES | YES | NO | NO |
| ALTERNATE 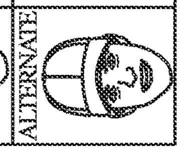 | YES | NO | YES | NO |
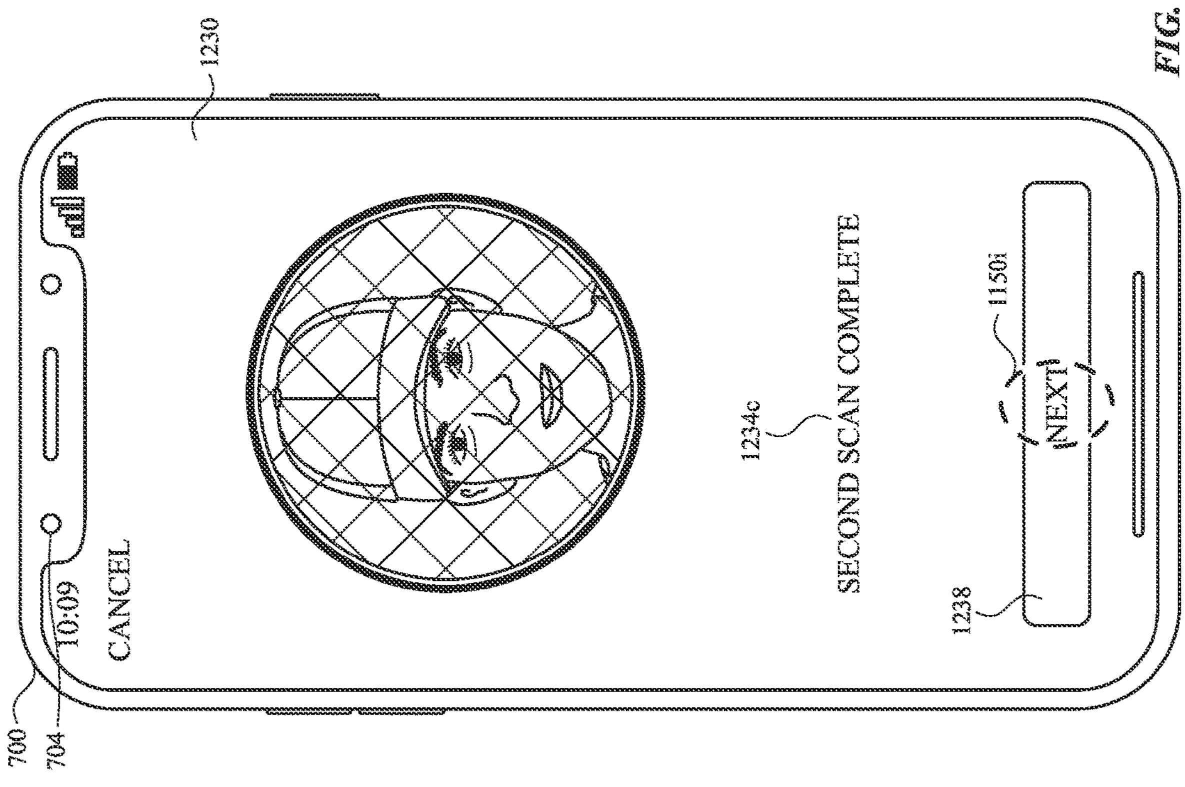
FIG. 12I

| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY | YES | YES | NO | NO |
| ALTERNATE | YES | NO | YES | NO |

| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY | YES | YES | NO | NO |
| ALTERNATE | YES | YES | YES | NO |

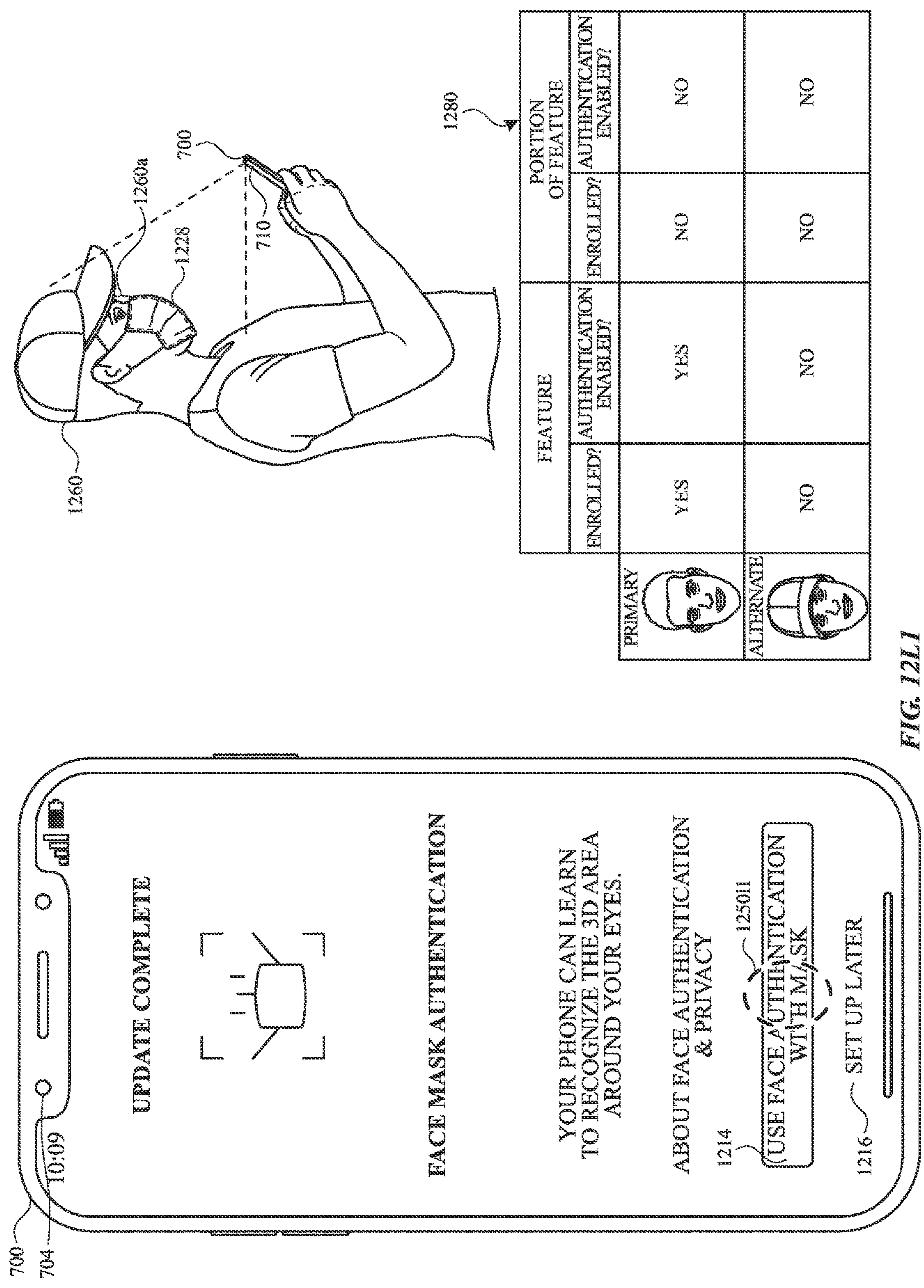
| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY | YES | YES | NO | NO |
| ALTERNATE | NO | NO | NO | NO |
*FIG. 12L1*

| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY | YES | YES | NO | NO |
| ALTERNATE | YES | YES | YES | NO |

| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY | YES | YES | NO | NO |
| ALTERNATE | YES | YES | YES | NO |

| | FEATURE | | PORTION OF FEATURE | |
|---|---|---|---|---|
| | ENROLLED? | AUTHENTICATION ENABLED? | ENROLLED? | AUTHENTICATION ENABLED? |
| PRIMARY | YES | YES | NO | NO |
| ALTERNATE | YES | YES | YES | NO |

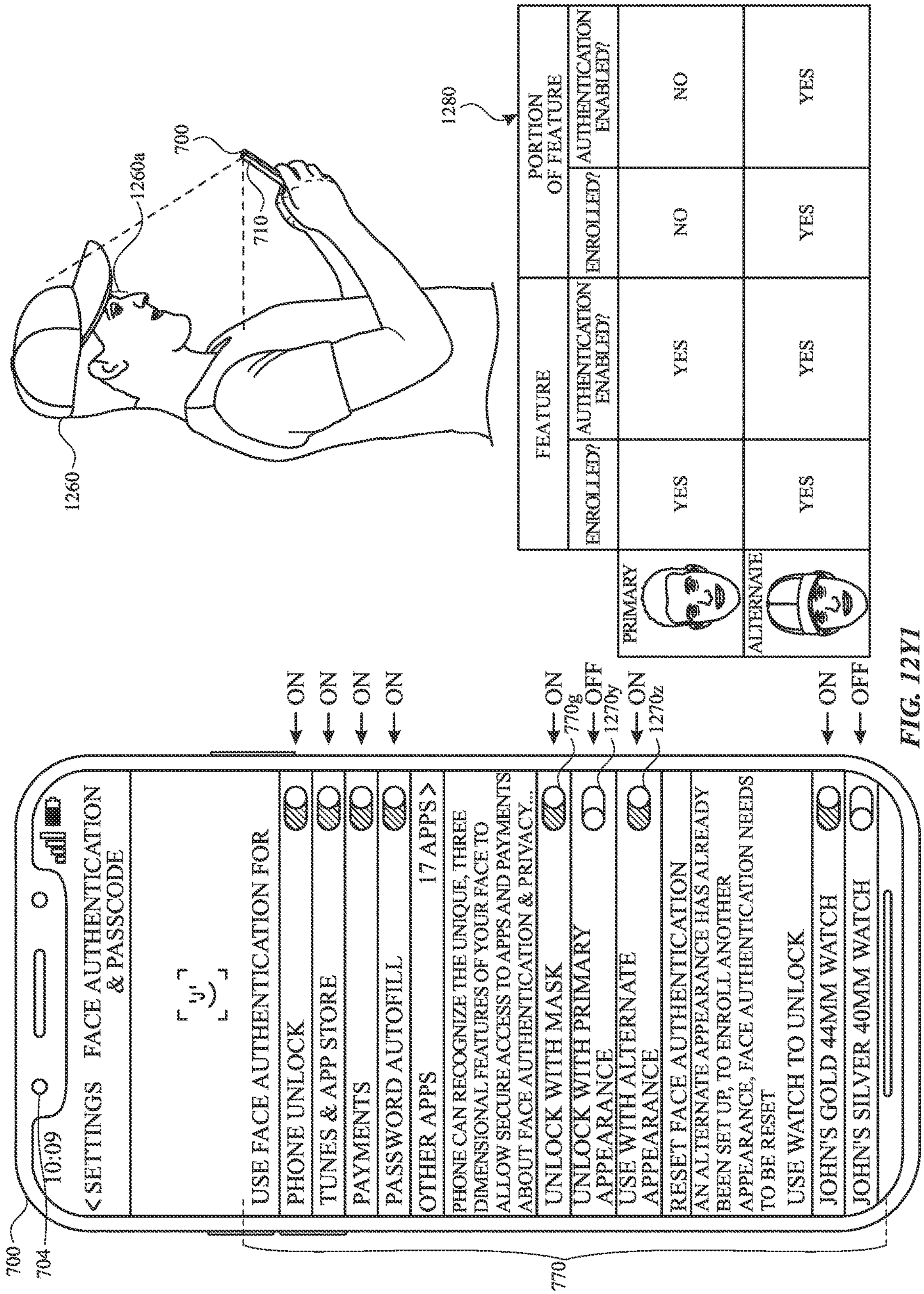
FIG. 12Y1

Figure 13B:
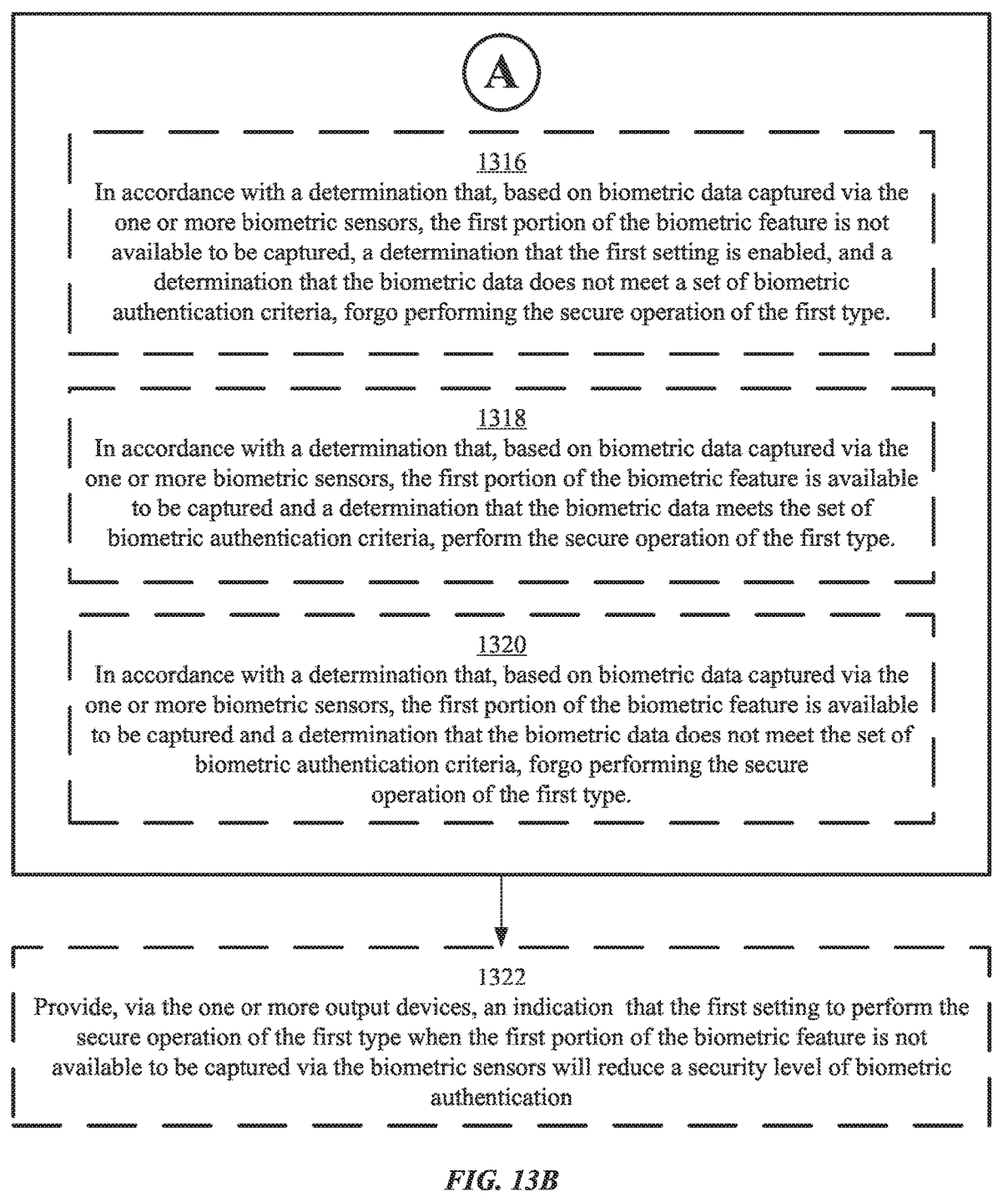

A

1316
In accordance with a determination that, based on biometric data captured via the one or more biometric sensors, the first portion of the biometric feature is not available to be captured, a determination that the first setting is enabled, and a determination that the biometric data does not meet a set of biometric authentication criteria, forgo performing the secure operation of the first type.

1318
In accordance with a determination that, based on biometric data captured via the one or more biometric sensors, the first portion of the biometric feature is available to be captured and a determination that the biometric data meets the set of biometric authentication criteria, perform the secure operation of the first type.

1320
In accordance with a determination that, based on biometric data captured via the one or more biometric sensors, the first portion of the biometric feature is available to be captured and a determination that the biometric data does not meet the set of biometric authentication criteria, forgo performing the secure operation of the first type.

1322
Provide, via the one or more output devices, an indication that the first setting to perform the secure operation of the first type when the first portion of the biometric feature is not available to be captured via the biometric sensors will reduce a security level of biometric authentication

Figure 14A:
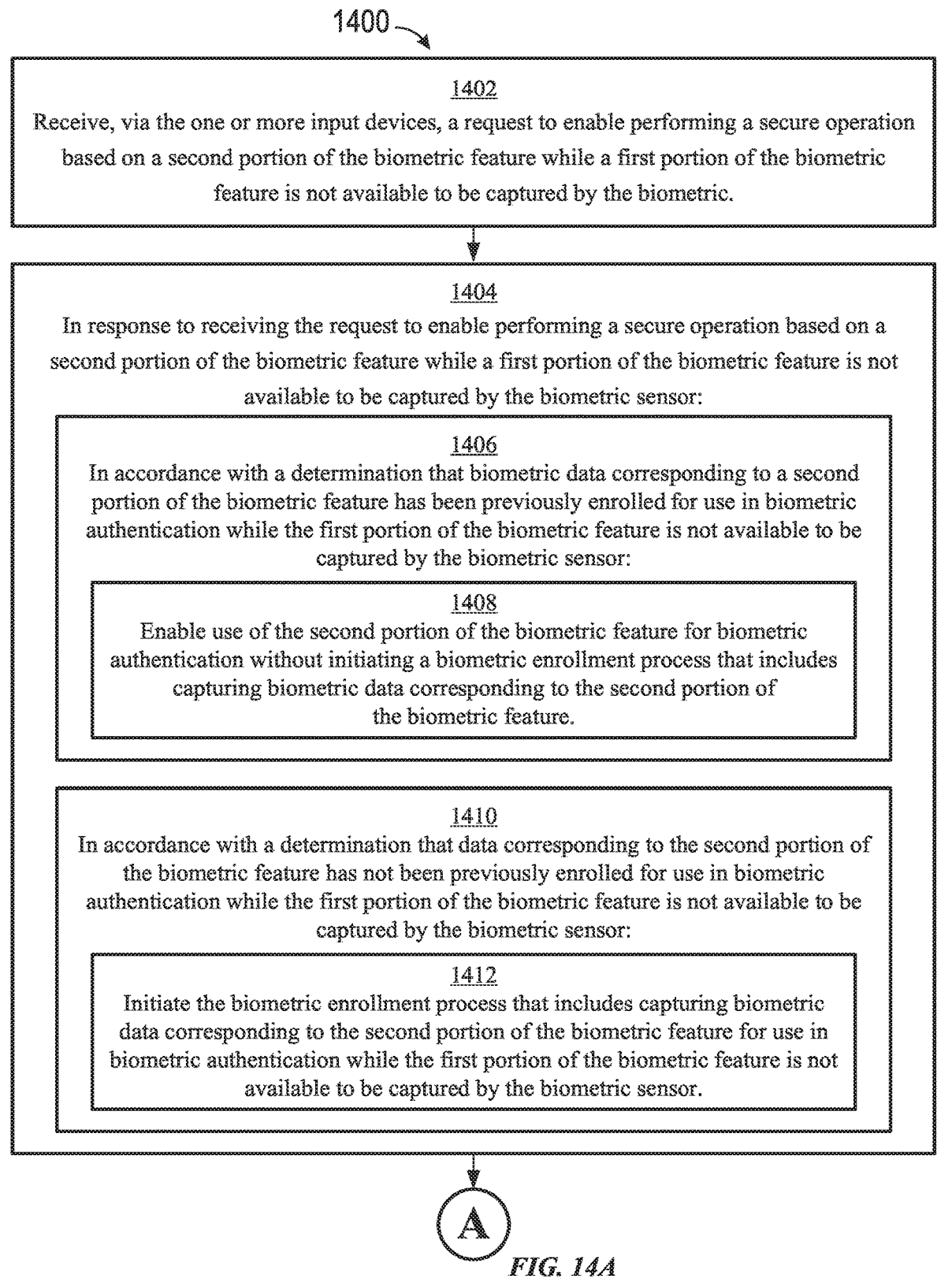

1402
Receive, via the one or more input devices, a request to enable performing a secure operation based on a second portion of the biometric feature while a first portion of the biometric feature is not available to be captured by the biometric.

1404
In response to receiving the request to enable performing a secure operation based on a second portion of the biometric feature while a first portion of the biometric feature is not available to be captured by the biometric sensor:

1406
In accordance with a determination that biometric data corresponding to a second portion of the biometric feature has been previously enrolled for use in biometric authentication while the first portion of the biometric feature is not available to be captured by the biometric sensor:

1408
Enable use of the second portion of the biometric feature for biometric authentication without initiating a biometric enrollment process that includes capturing biometric data corresponding to the second portion of the biometric feature.

1410
In accordance with a determination that data corresponding to the second portion of the biometric feature has not been previously enrolled for use in biometric authentication while the first portion of the biometric feature is not available to be captured by the biometric sensor:

1412
Initiate the biometric enrollment process that includes capturing biometric data corresponding to the second portion of the biometric feature for use in biometric authentication while the first portion of the biometric feature is not available to be captured by the biometric sensor.

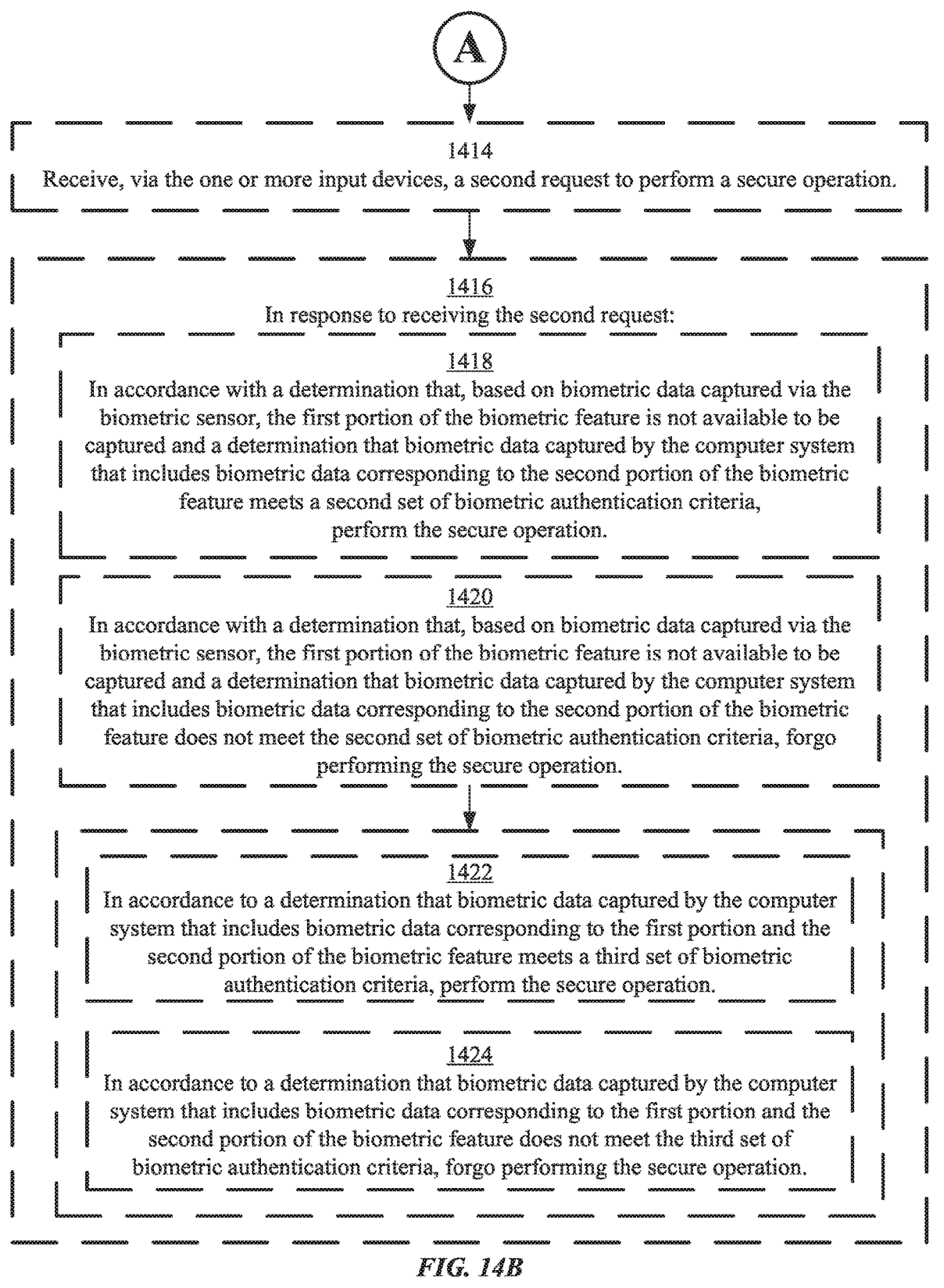

1414
Receive, via the one or more input devices, a second request to perform a secure operation.

1416
In response to receiving the second request:

1418
In accordance with a determination that, based on biometric data captured via the biometric sensor, the first portion of the biometric feature is not available to be captured and a determination that biometric data captured by the computer system that includes biometric data corresponding to the second portion of the biometric feature meets a second set of biometric authentication criteria, perform the secure operation.

1420
In accordance with a determination that, based on biometric data captured via the biometric sensor, the first portion of the biometric feature is not available to be captured and a determination that biometric data captured by the computer system that includes biometric data corresponding to the second portion of the biometric feature does not meet the second set of biometric authentication criteria, forgo performing the secure operation.

1422
In accordance to a determination that biometric data captured by the computer system that includes biometric data corresponding to the first portion and the second portion of the biometric feature meets a third set of biometric authentication criteria, perform the secure operation.

1424
In accordance to a determination that biometric data captured by the computer system that includes biometric data corresponding to the first portion and the second portion of the biometric feature does not meet the third set of biometric authentication criteria, forgo performing the secure operation.

*FIG. 14B*

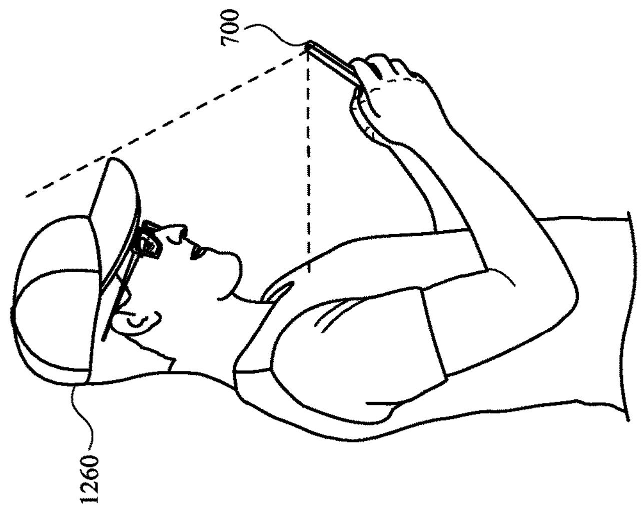
*FIG. 15B*
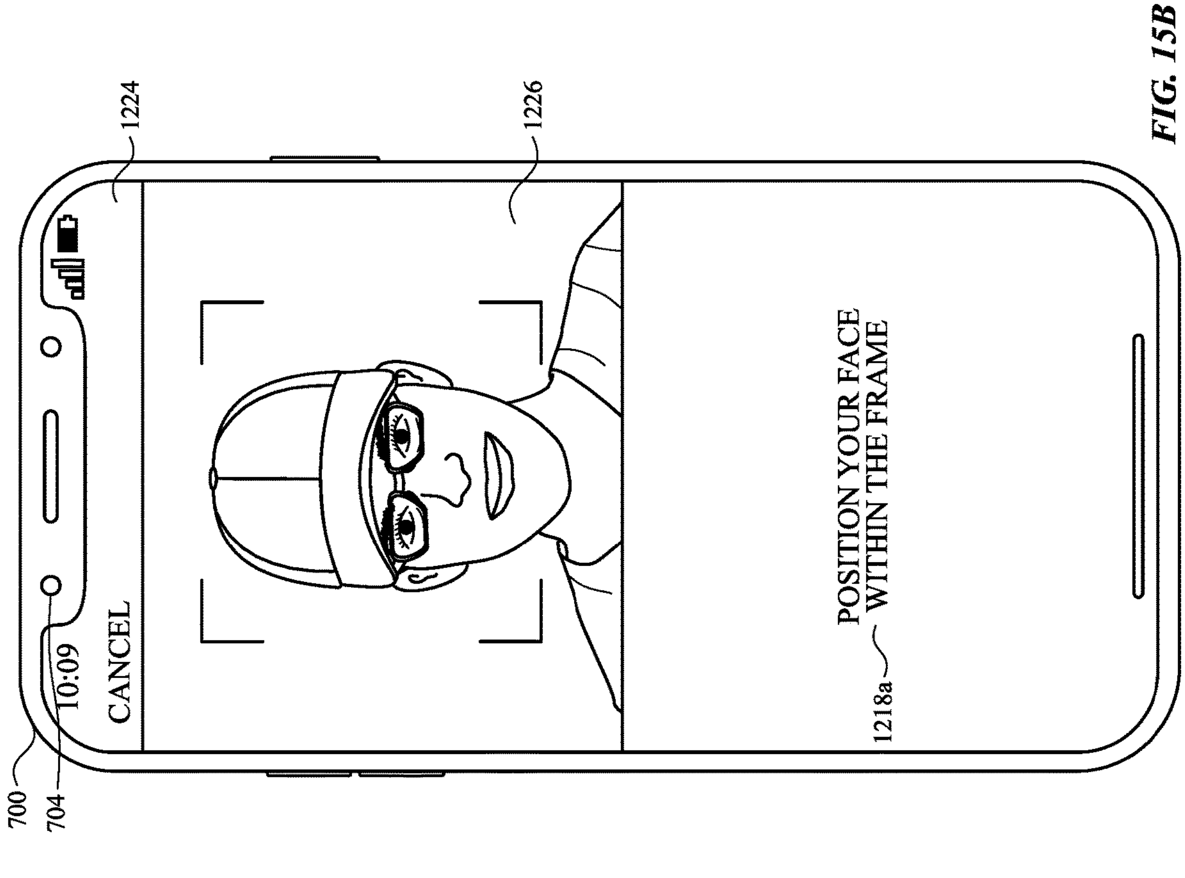

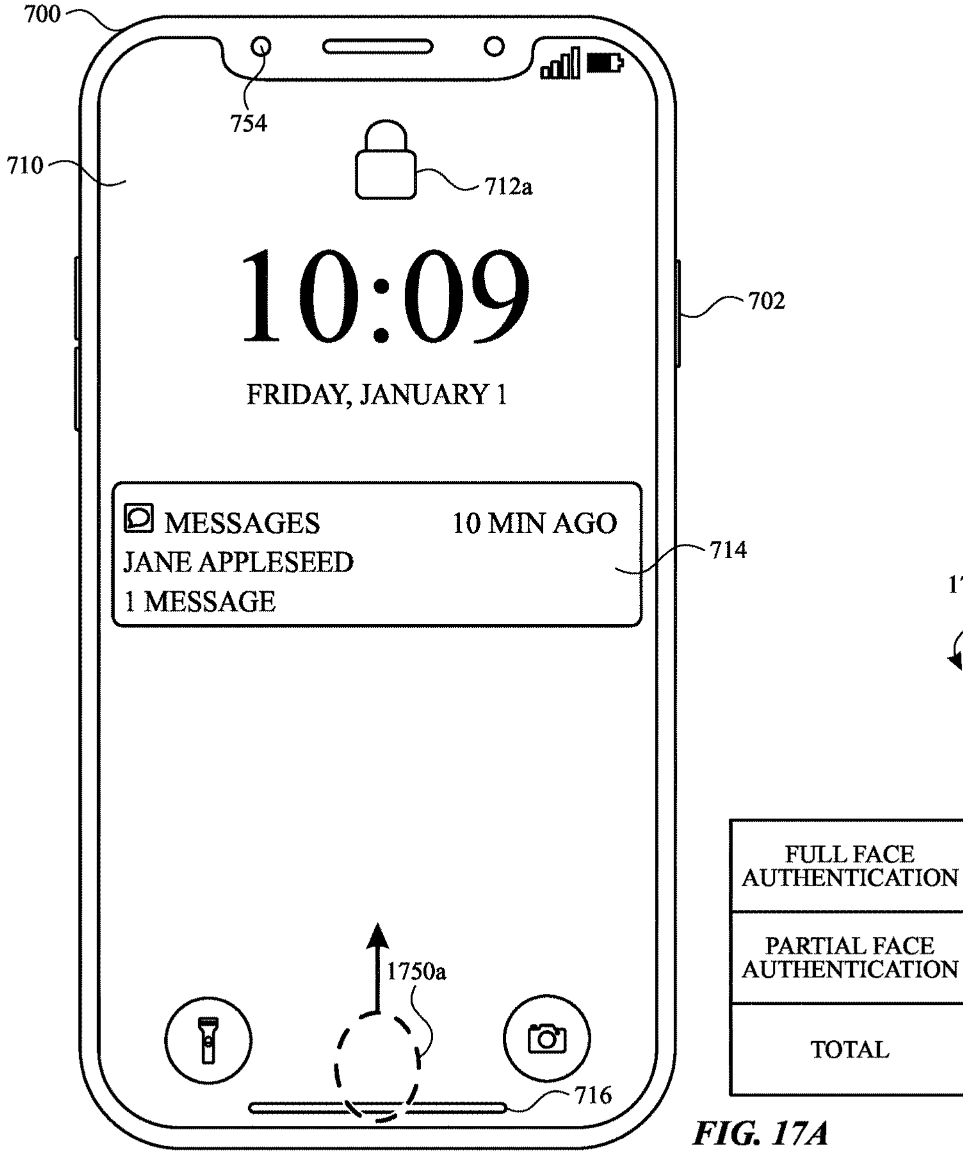
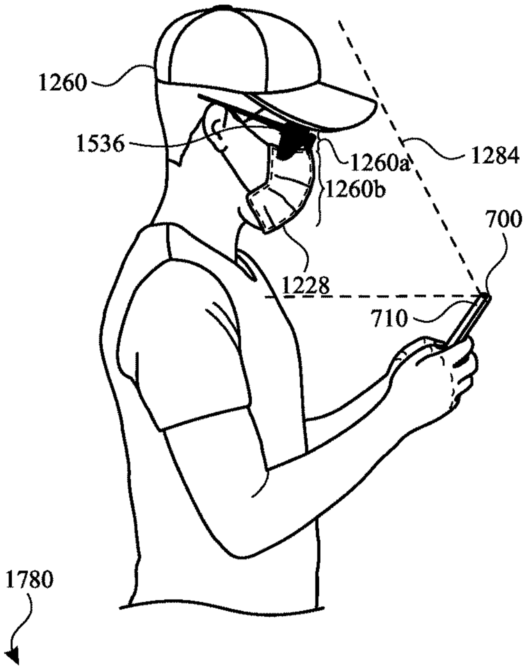
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 1 | YES |
| PARTIAL FACE AUTHENTICATION | 0 | YES |
| TOTAL | 1 | |
FIG. 17A

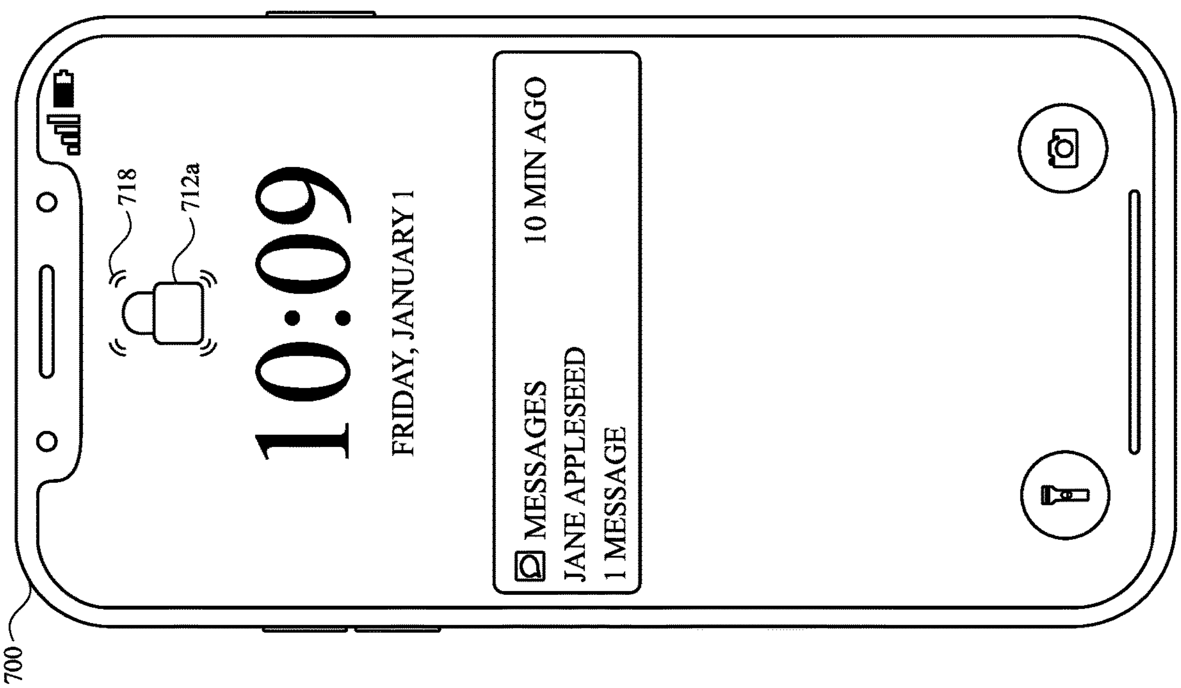
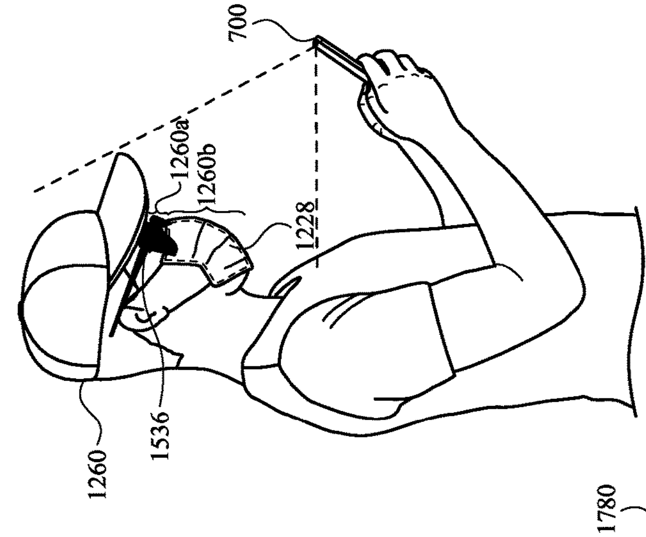
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 1 | YES |
| PARTIAL FACE AUTHENTICATION | 1 | YES |
| TOTAL | 2 | |
*FIG. 17B*

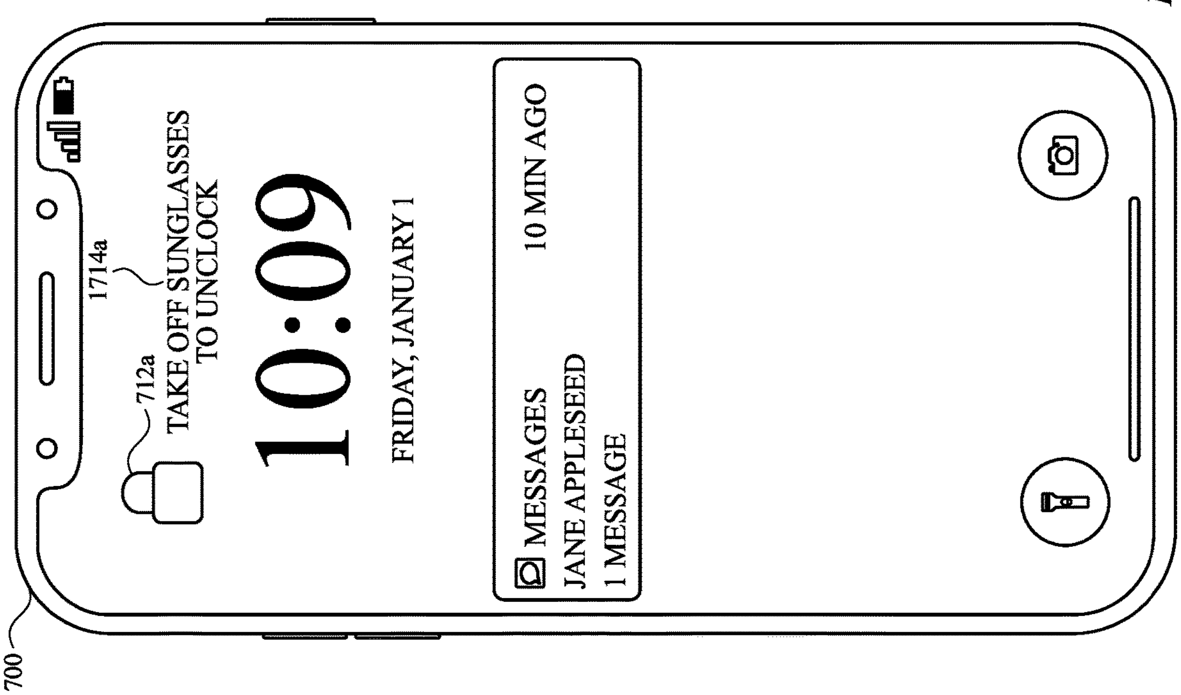
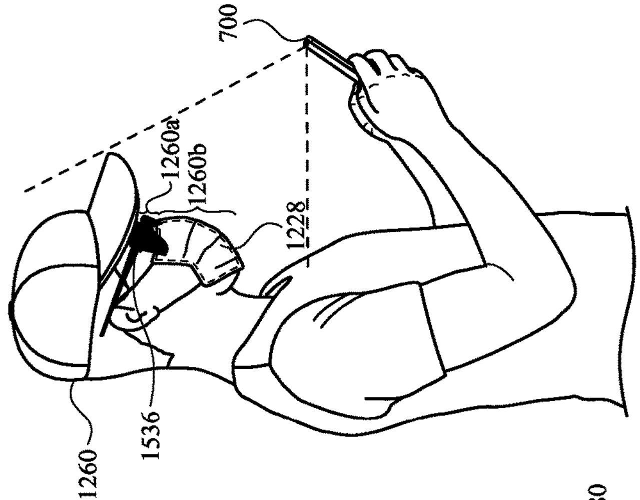
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 1 | YES |
| PARTIAL FACE AUTHENTICATION | 1 | YES |
| TOTAL | 2 | |
*FIG. 17C*

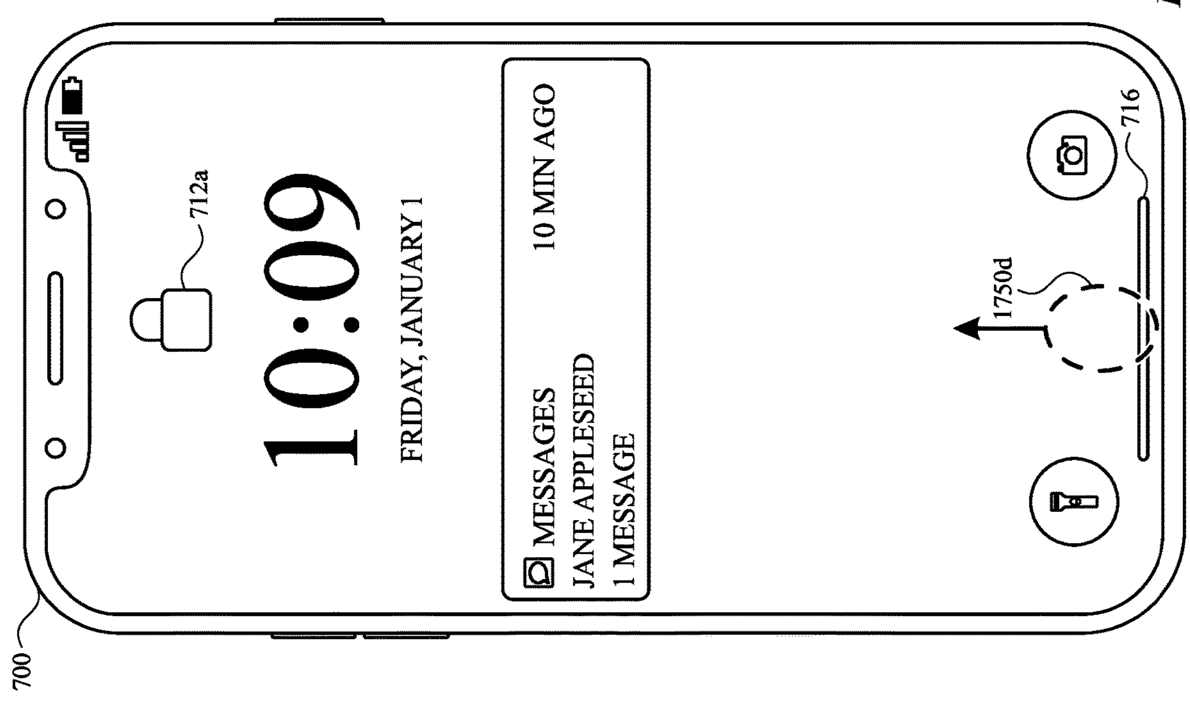
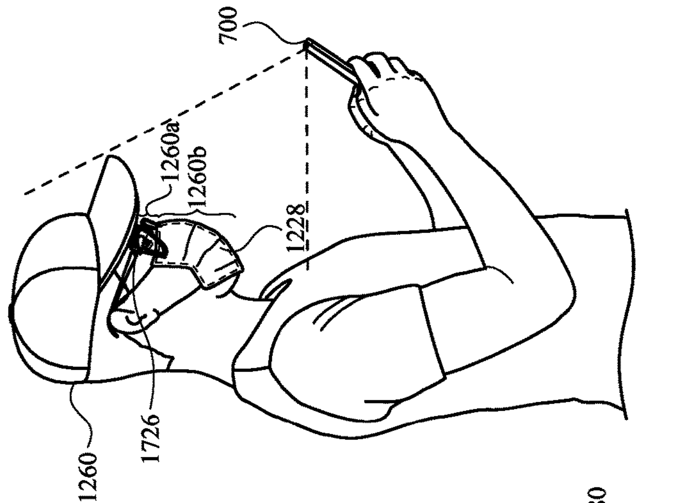
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 1 | YES |
| PARTIAL FACE AUTHENTICATION | 1 | YES |
| TOTAL | 2 | |
*FIG. 17D*

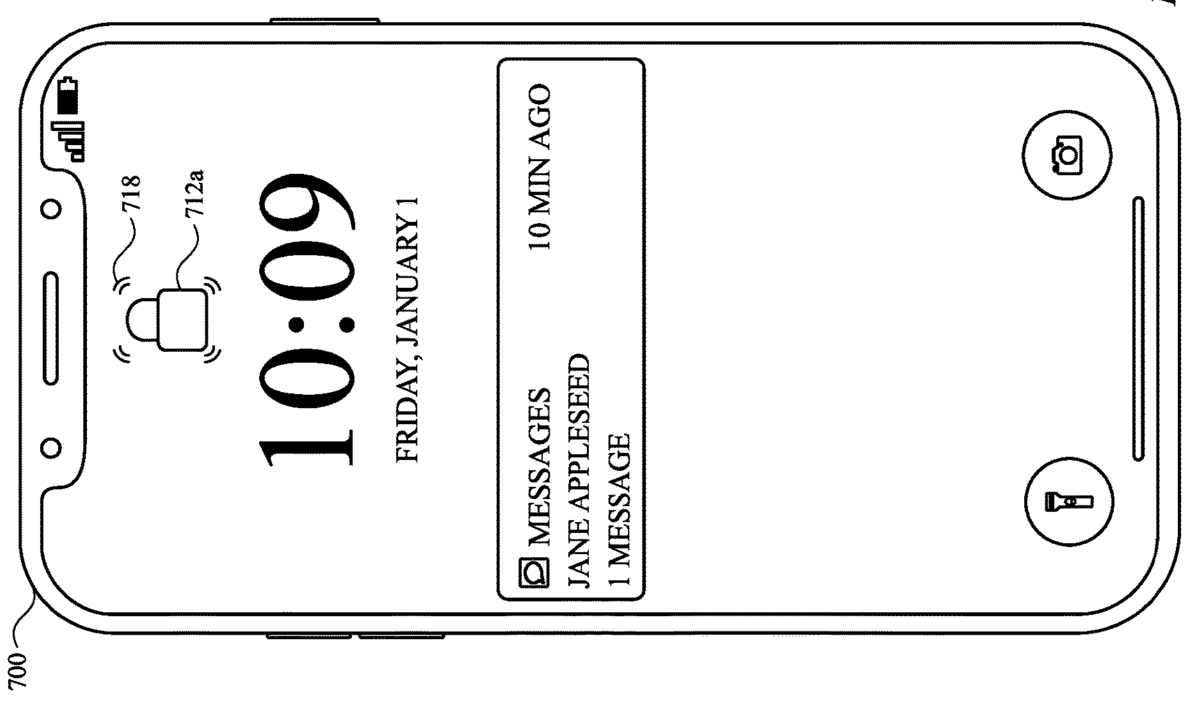
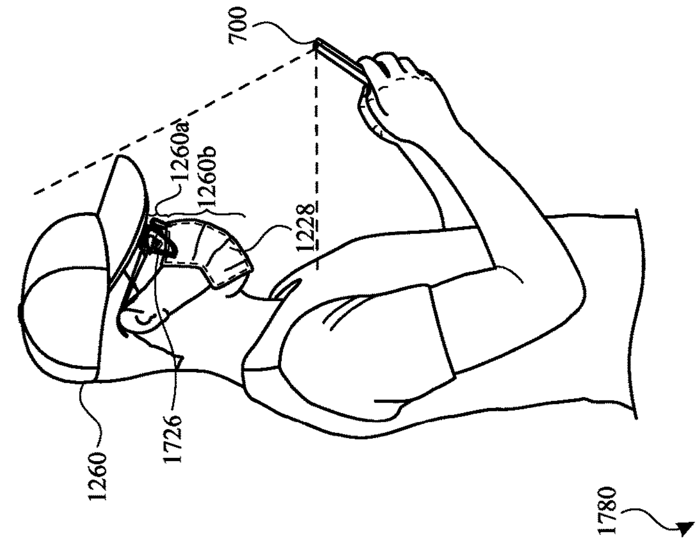
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 1 | YES |
| PARTIAL FACE AUTHENTICATION | 2 | YES |
| TOTAL | 3 | |
*FIG. 17E*

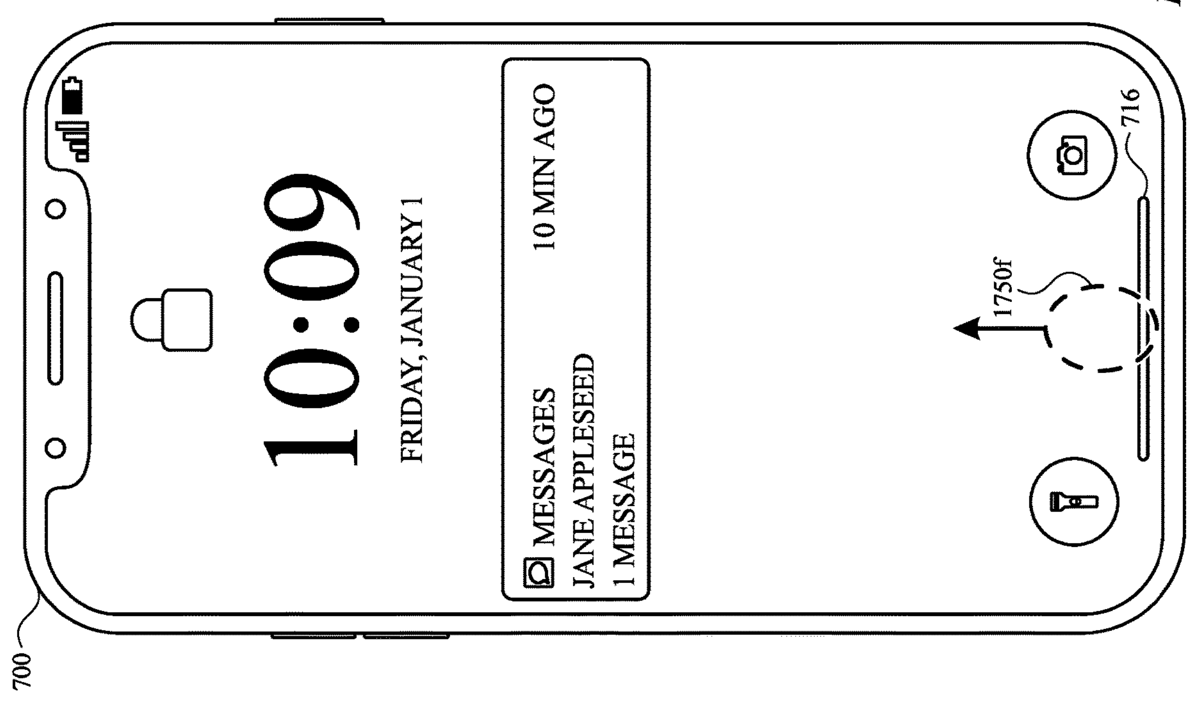
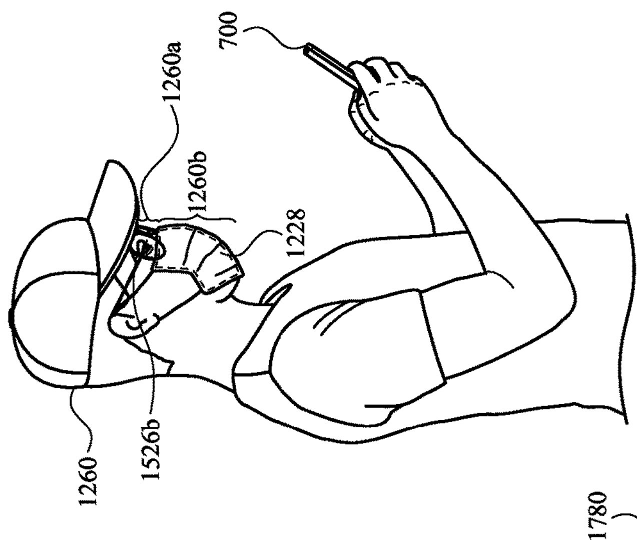
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 1 | YES |
| PARTIAL FACE AUTHENTICATION | 2 | YES |
| TOTAL | 3 | |
*FIG. 17F*

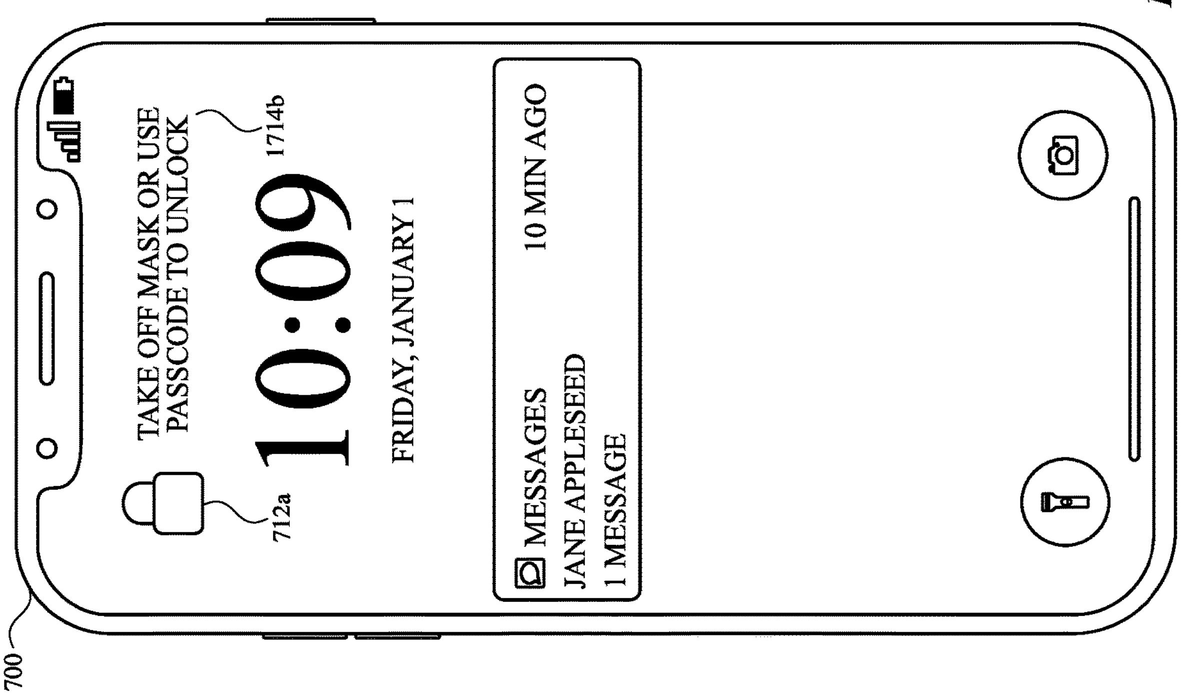
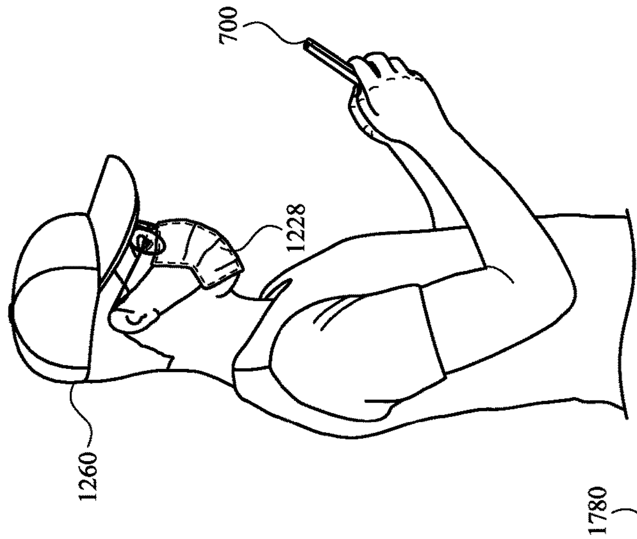
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 1 | YES |
| PARTIAL FACE AUTHENTICATION | 3 | NO |
| TOTAL | 4 | |
*FIG. 17G*

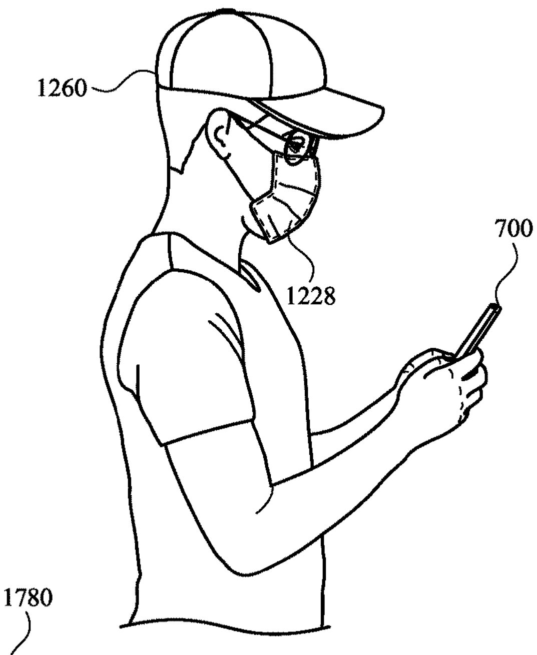
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 1 | YES |
| PARTIAL FACE AUTHENTICATION | 3 | NO |
| TOTAL | 4 | |
*FIG. 17H*

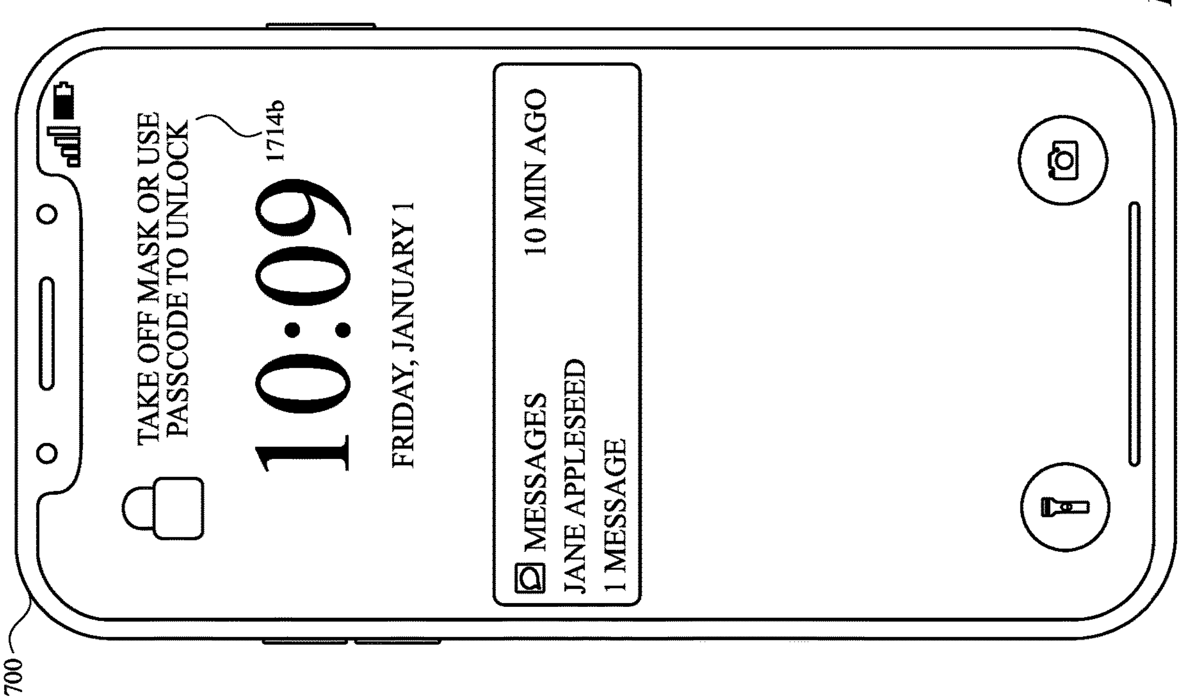
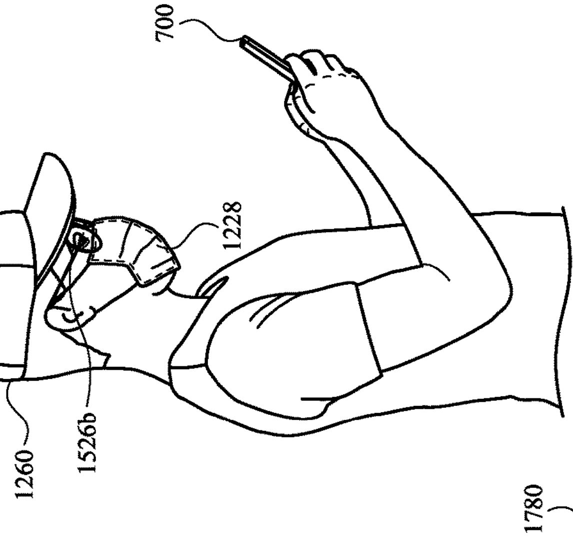
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 1 | YES |
| PARTIAL FACE AUTHENTICATION | 3 | NO |
| TOTAL | 4 | |
*FIG. 17I*

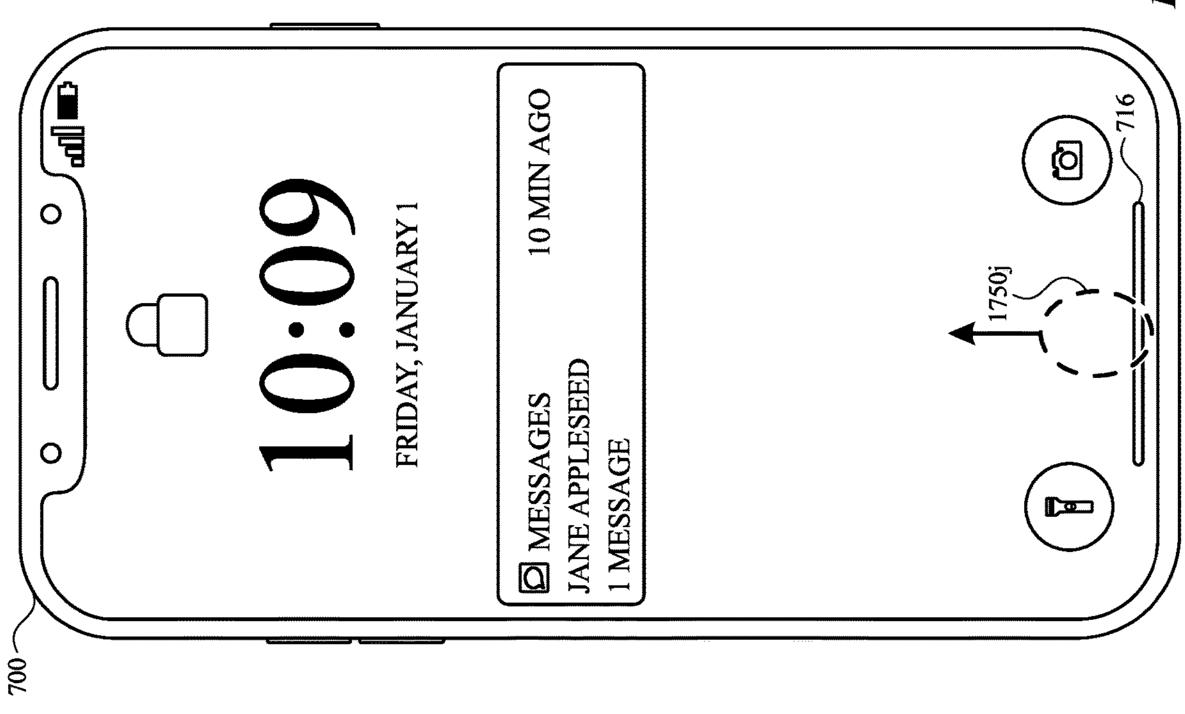
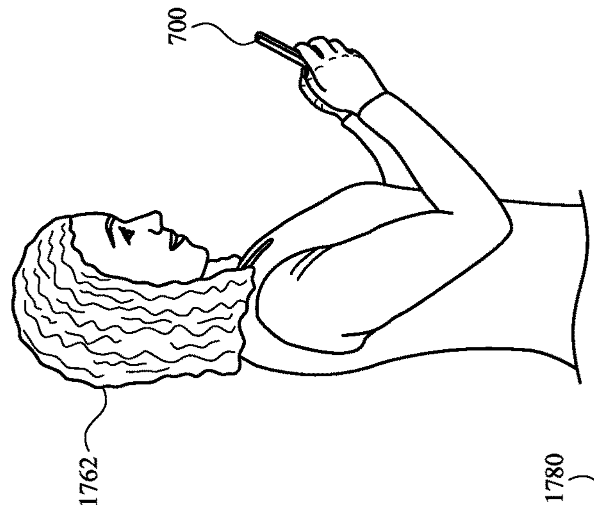
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 1 | YES |
| PARTIAL FACE AUTHENTICATION | 3 | NO |
| TOTAL | 4 | |
*FIG. 17J*

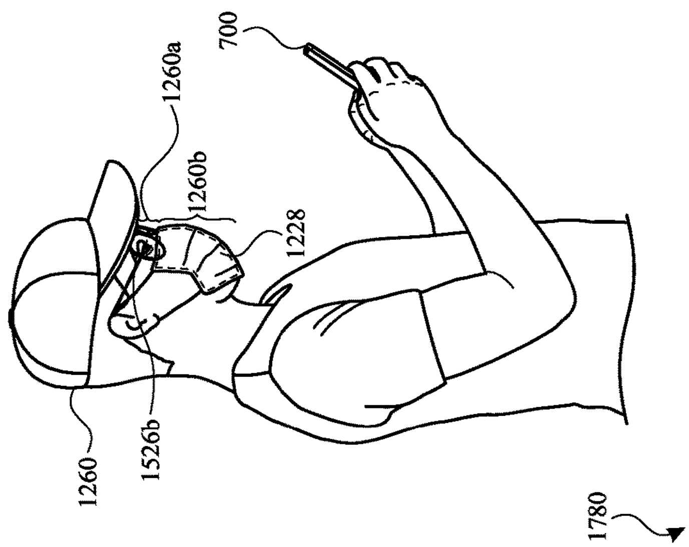
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 2 | NO |
| PARTIAL FACE AUTHENTICATION | 3 | NO |
| TOTAL | 5 | |
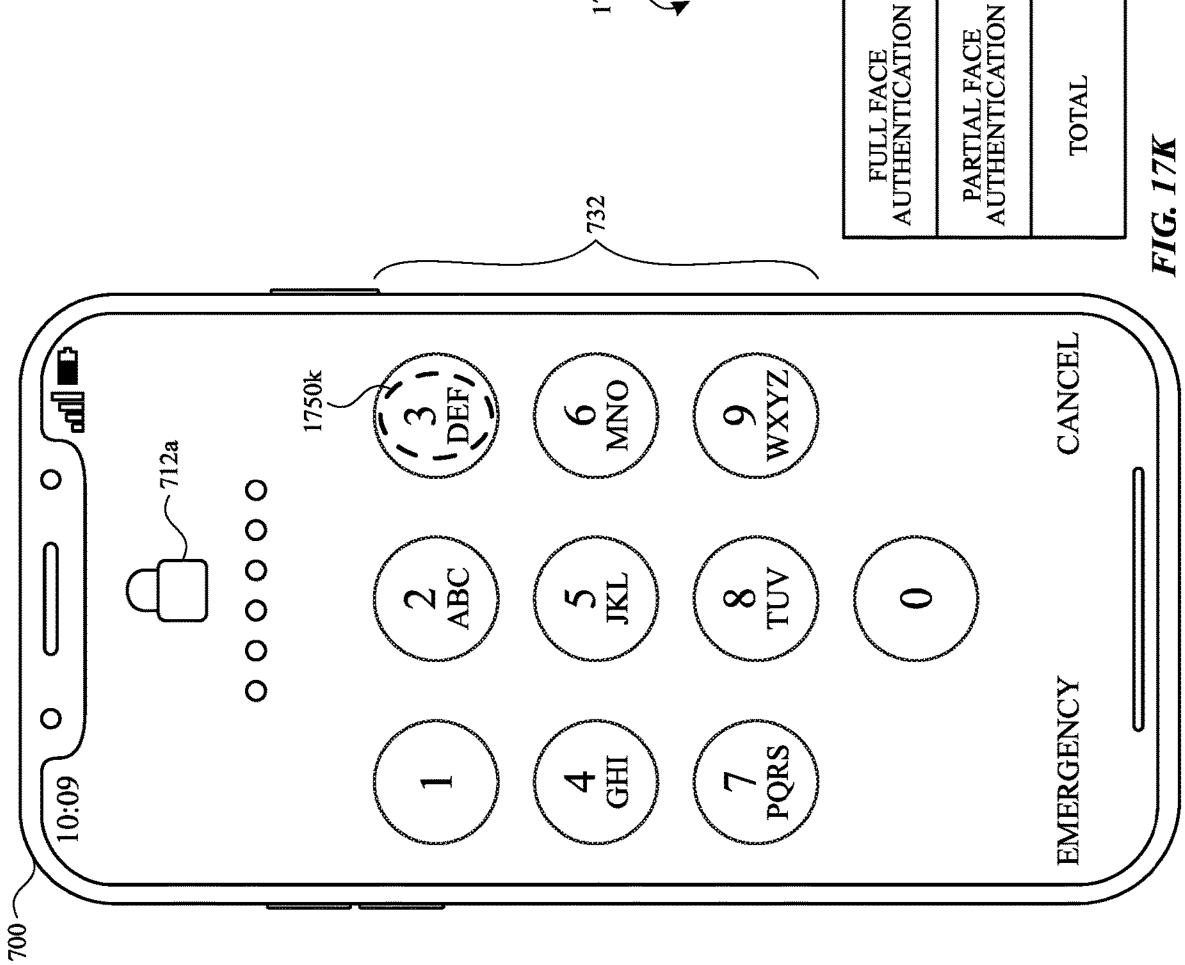
*FIG. 17K*

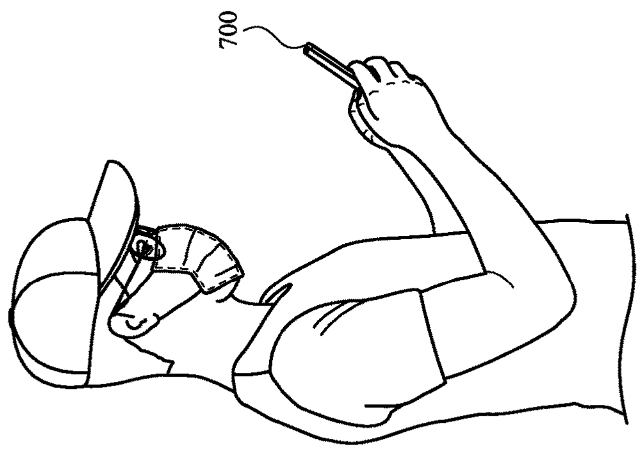
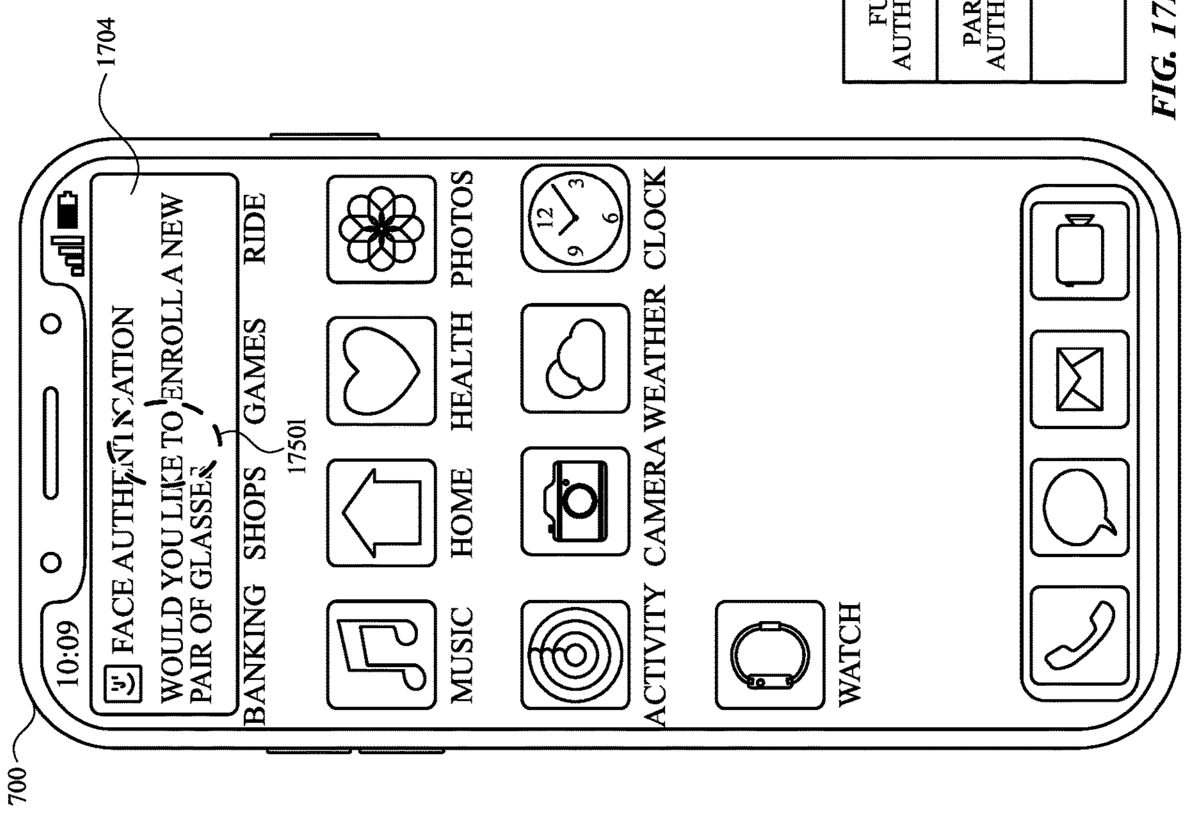
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 0 | YES |
| PARTIAL FACE AUTHENTICATION | 0 | YES |
| TOTAL | 0 | |
*FIG. 17L*

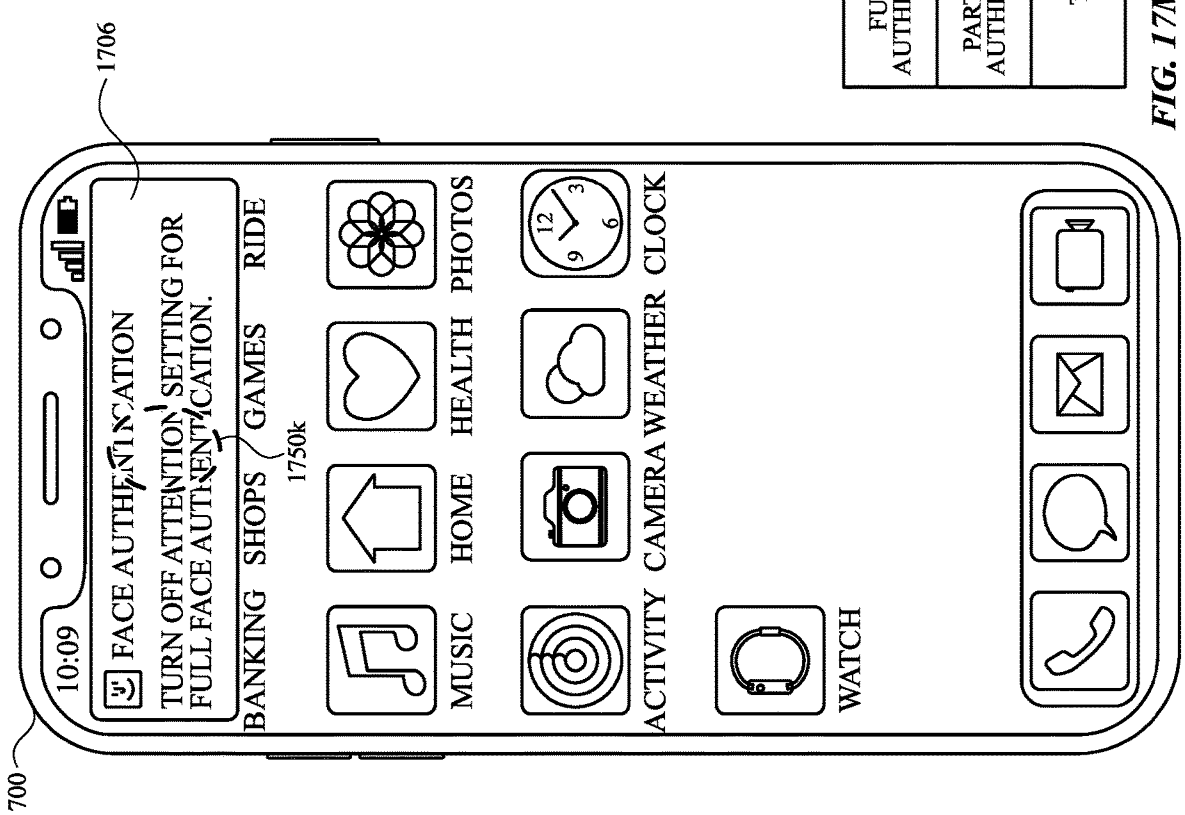
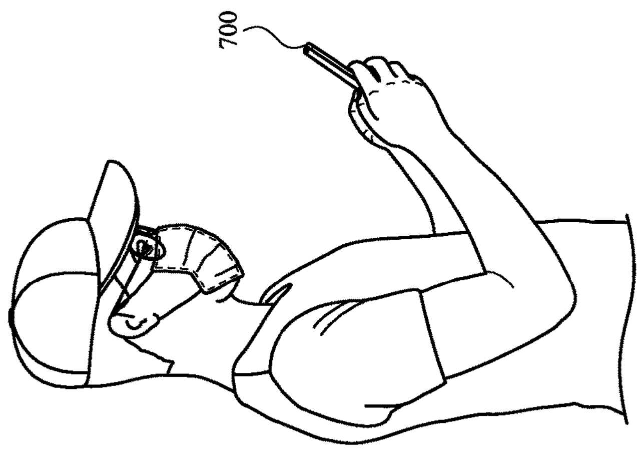
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 0 | YES |
| PARTIAL FACE AUTHENTICATION | 0 | YES |
| TOTAL | 0 | |
*FIG. 17M*

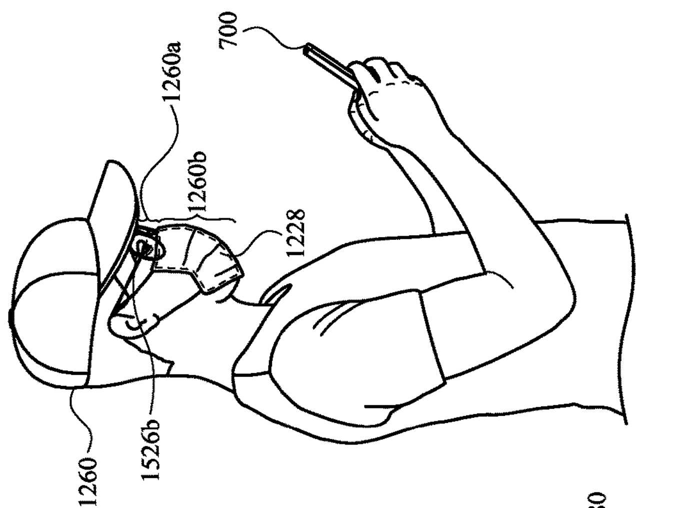
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 0 | YES |
| PARTIAL FACE AUTHENTICATION | 0 | YES |
| TOTAL | 0 | |
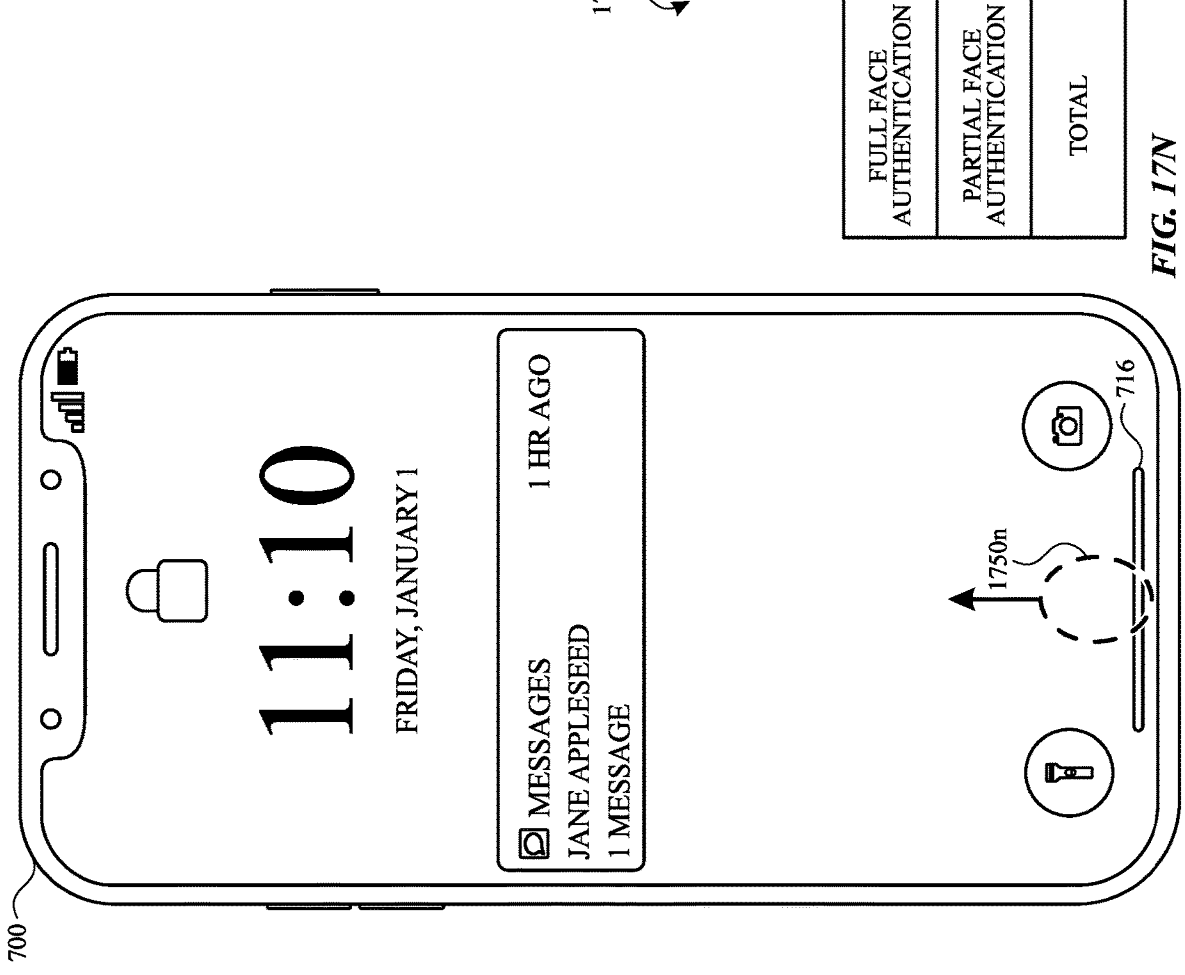
*FIG. 17N*

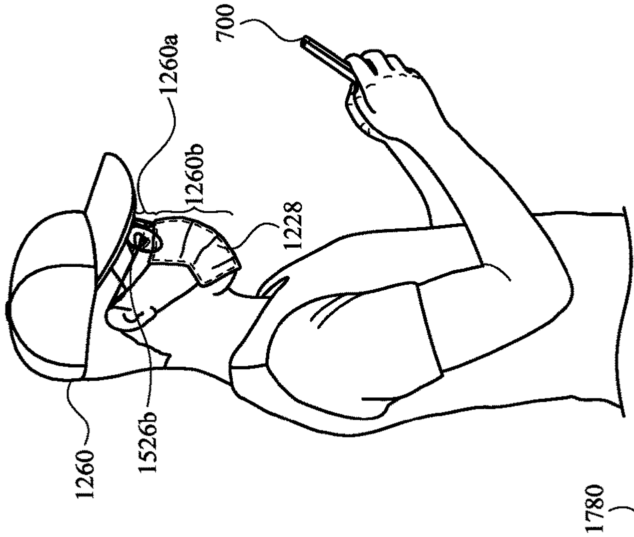
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 0 | YES |
| PARTIAL FACE AUTHENTICATION | 0 | YES |
| TOTAL | 0 | |
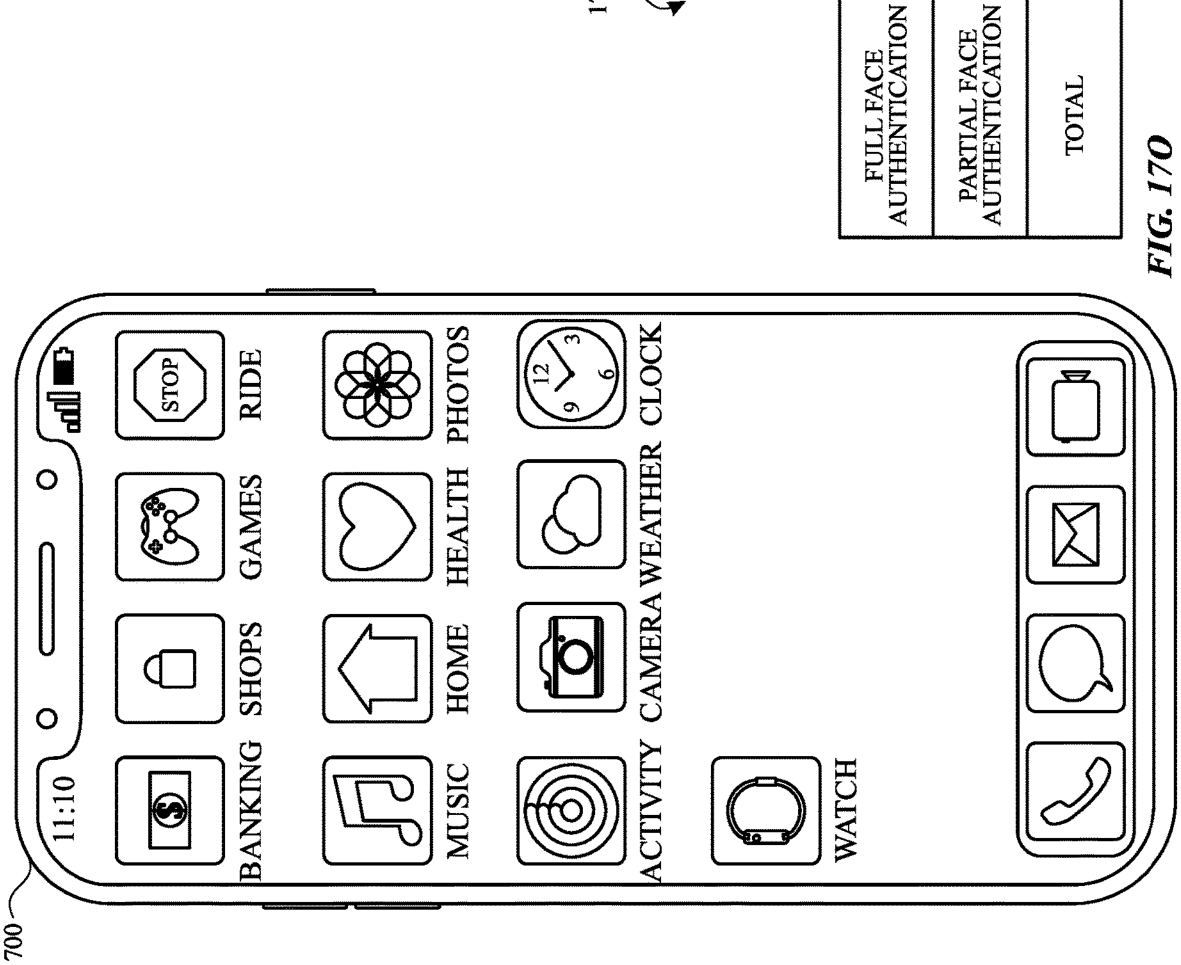
700
*FIG. 17O*

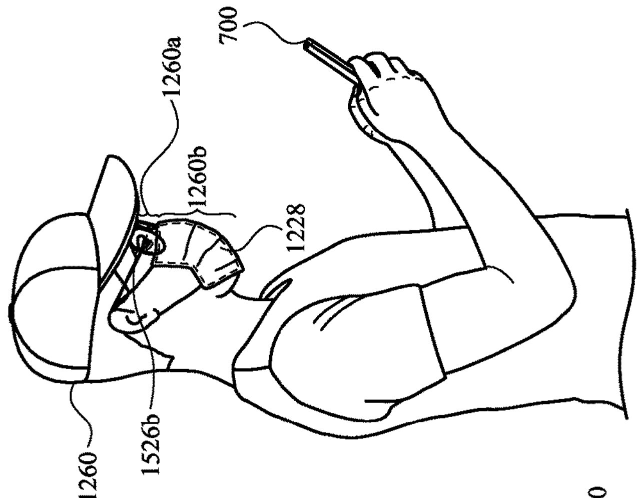
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 0 | YES |
| PARTIAL FACE AUTHENTICATION | 0 | NO |
| TOTAL | 0 | |
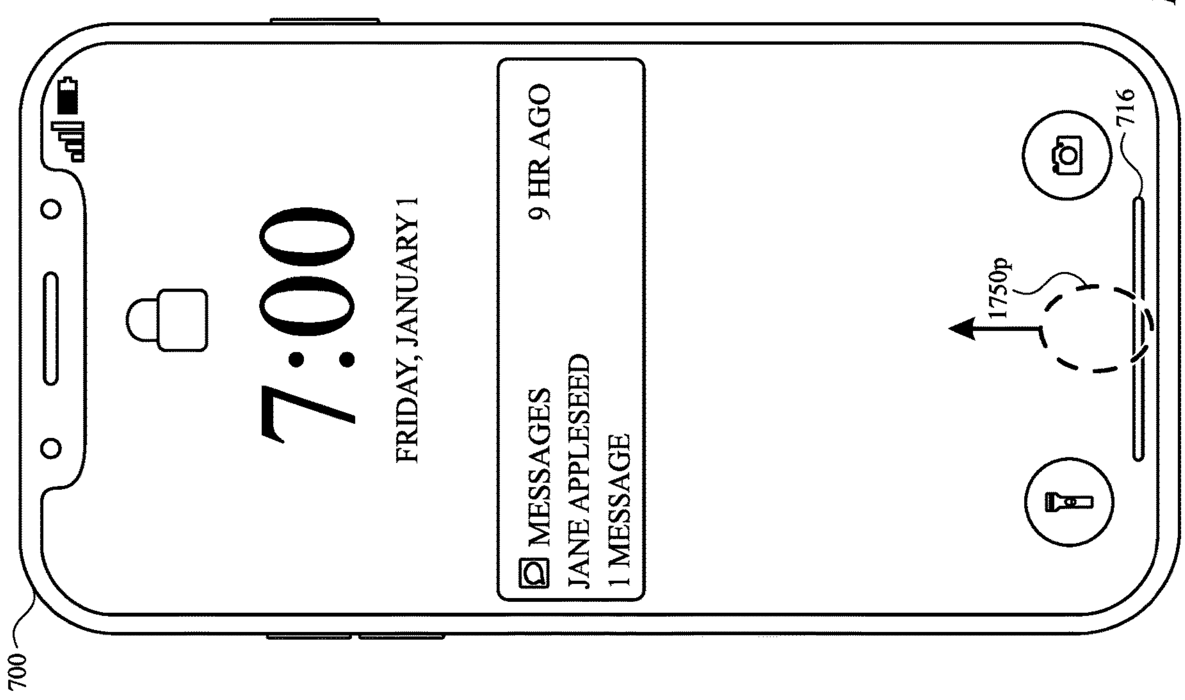
FIG. 17P

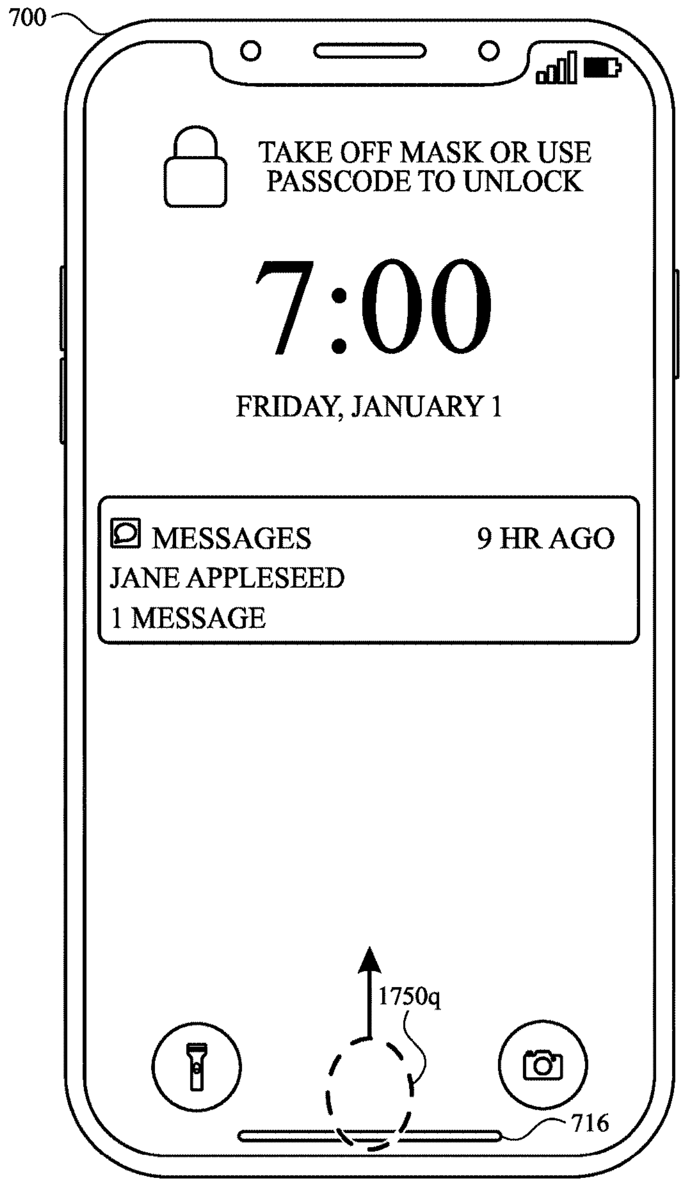
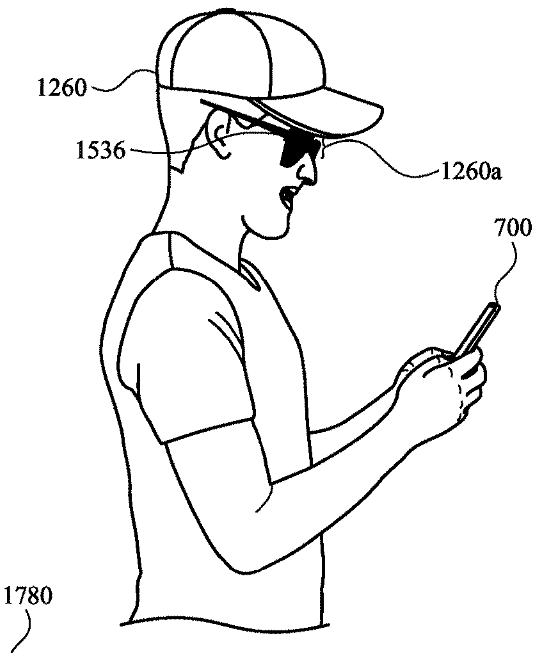
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 0 | YES |
| PARTIAL FACE AUTHENTICATION | 1 | NO |
| TOTAL | 1 | |
*FIG. 17Q*

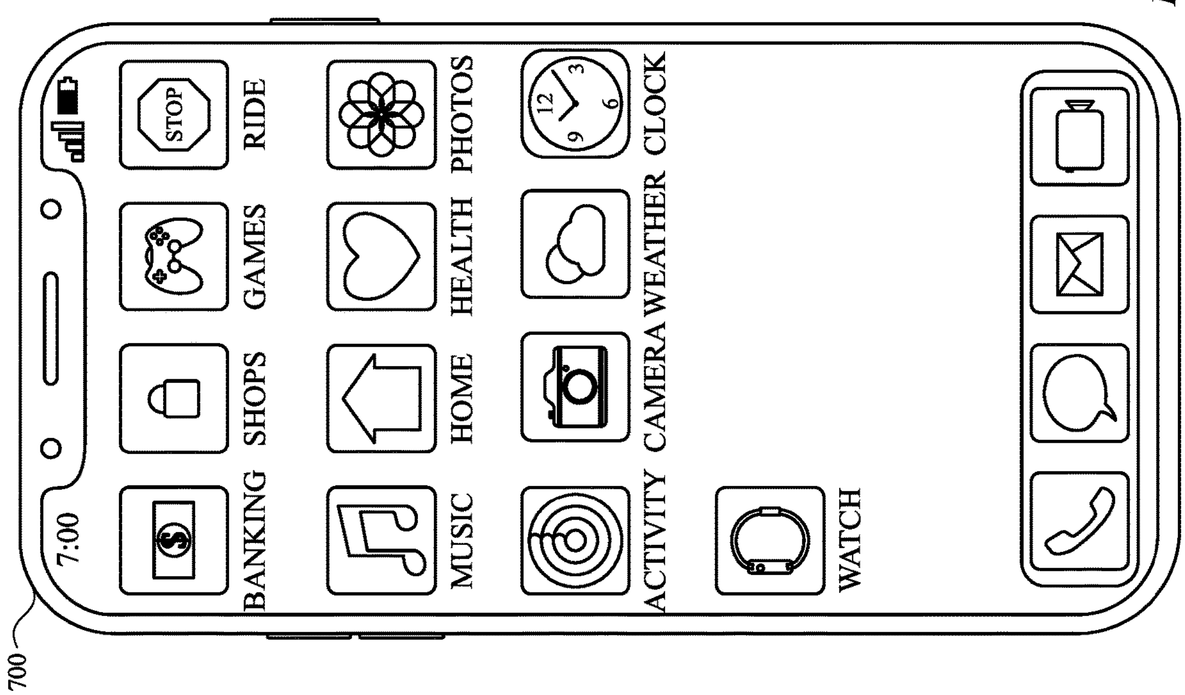
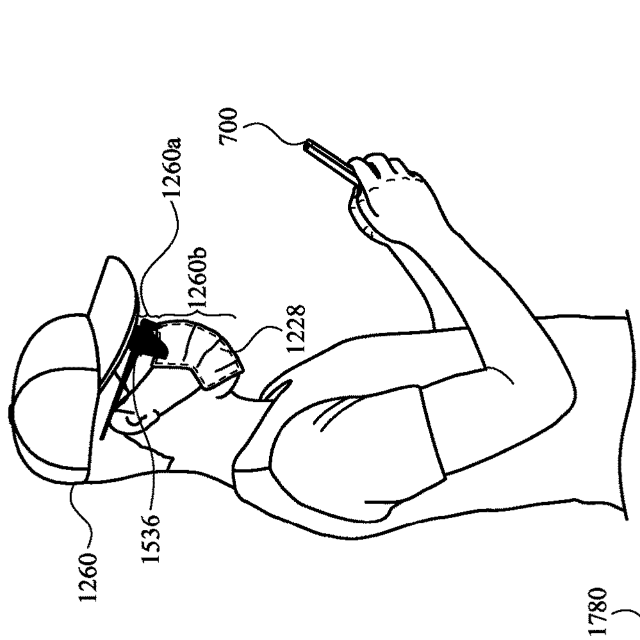
1780
| | CURRENT NUMBER OF UNSUCCESSFUL AUTHENTICATION ATTEMPTS SINCE LAST SUCCESSFUL AUTHENTICATION | AUTHENTICATION AVAILABLE? |
|---|---|---|
| FULL FACE AUTHENTICATION | 0 | YES |
| PARTIAL FACE AUTHENTICATION | 0 | YES |
| TOTAL | 0 | |
*FIG. 17R*

Figure 18B:
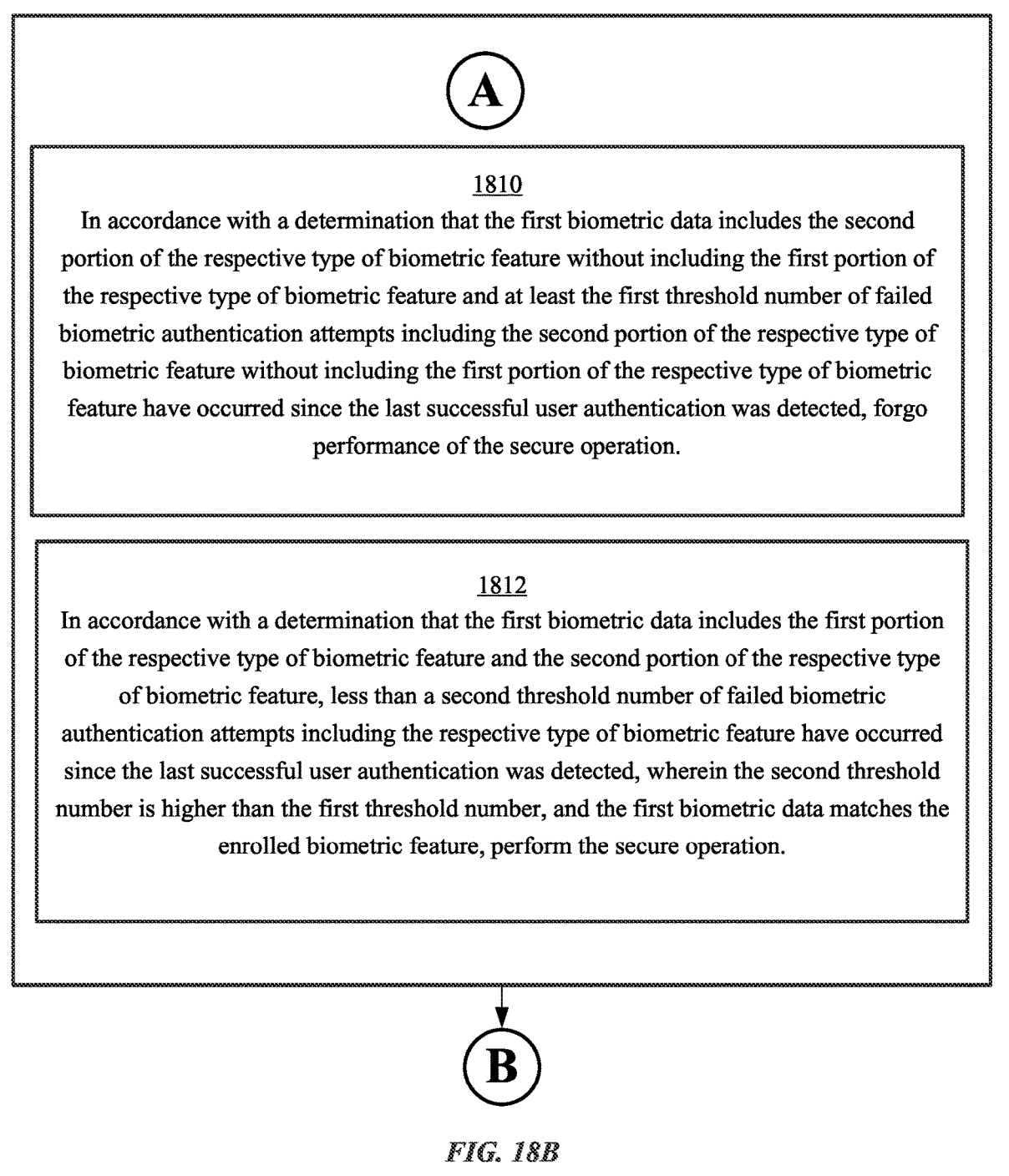

A

1810
In accordance with a determination that the first biometric data includes the second portion of the respective type of biometric feature without including the first portion of the respective type of biometric feature and at least the first threshold number of failed biometric authentication attempts including the second portion of the respective type of biometric feature without including the first portion of the respective type of biometric feature have occurred since the last successful user authentication was detected, forgo performance of the secure operation.

1812
In accordance with a determination that the first biometric data includes the first portion of the respective type of biometric feature and the second portion of the respective type of biometric feature, less than a second threshold number of failed biometric authentication attempts including the respective type of biometric feature have occurred since the last successful user authentication was detected, wherein the second threshold number is higher than the first threshold number, and the first biometric data matches the enrolled biometric feature, perform the secure operation.

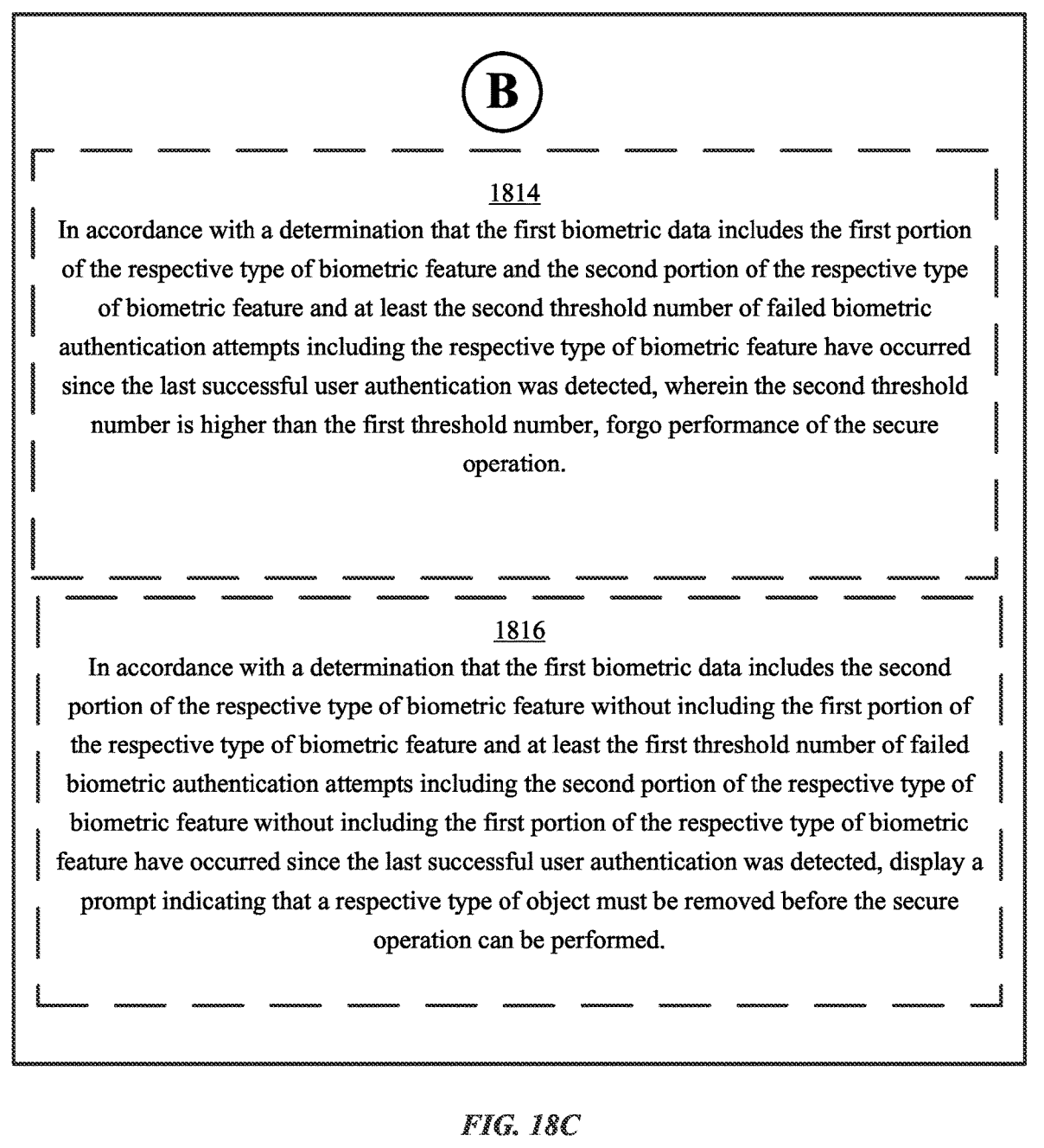

1814
In accordance with a determination that the first biometric data includes the first portion of the respective type of biometric feature and the second portion of the respective type of biometric feature and at least the second threshold number of failed biometric authentication attempts including the respective type of biometric feature have occurred since the last successful user authentication was detected, wherein the second threshold number is higher than the first threshold number, forgo performance of the secure operation.

1816
In accordance with a determination that the first biometric data includes the second portion of the respective type of biometric feature without including the first portion of the respective type of biometric feature and at least the first threshold number of failed biometric authentication attempts including the second portion of the respective type of biometric feature without including the first portion of the respective type of biometric feature have occurred since the last successful user authentication was detected, display a prompt indicating that a respective type of object must be removed before the secure operation can be performed.

*FIG. 18C*

IMPLEMENTATION OF BIOMETRIC AUTHENTICATION

CROSS-REFERENCE TO RELATED APPLICATIONS

This application is a continuation of PCT/US22/13730, titled "IMPLEMENTATION OF BIOMETRIC AUTHENTICATION," filed on Apr. 25, 2022, which claims priority to U.S. Provisional Patent Application Ser. No. 63/179,503, titled "IMPLEMENTATION OF BIOMETRIC AUTHENTICATION," filed on Apr. 25, 2021, and U.S. Provisional Patent Application Ser. No. 63/141,354, titled "IMPLEMENTATION OF BIOMETRIC AUTHENTICATION," filed on Jan. 25, 2021. The contents of which are hereby incorporated by reference in their entireties.

FIELD

The present disclosure generally relates to biometric authentication and, more specifically, to computer user interfaces and techniques for enrollment of biometric feature(s) and authentication when biometric authentication using a biometric feature is unsuccessful.

BACKGROUND

Biometric authentication, for instance, of a face, iris, or fingerprint, using electronic devices is a convenient, efficient, and secure method of authenticating users of electronic devices. Biometric authentication allows a device to quickly, easily, and securely verify the identity of any number of users.

BRIEF SUMMARY

Some techniques for implementing biometric authentication using computer systems (e.g., electronic computing devices), however, are generally cumbersome and inefficient. When a user fails biometric authentication before performing an action because a portion (e.g., a mouth, portion of a finger) of the biometric feature (e.g., a face, finger) is covered (e.g., by a mask), the user is often unable to authenticate or is forced to authenticate via other cumbersome methods. In view of the foregoing drawbacks, existing techniques require more time than necessary, wasting both user time and device energy when biometric authentication fails and/or when biometric authentication fails because a portion of the biometric feature is covered. This latter consideration is particularly important in battery-operated devices.

Accordingly, the present technique provides electronic devices (e.g., computer systems) with faster, more efficient methods and interfaces for implementing biometric authentication. Such methods and interfaces optionally complement or replace other methods for implementing biometric authentication. Such methods and interfaces improve of security of the electronic devices because users are less likely to disable biometric authentication when other techniques are provided to authenticate the user when biometric authentication fails (e.g., because a portion of the feature is covered). Such methods and interfaces reduce the cognitive burden on a user and produce a more efficient human-machine interface. For battery-operated computing devices, such methods and interfaces conserve power and increase the time between battery charges. Such methods and interfaces also reduce the number of unnecessary, extraneous, or repetitive inputs required at computing devices, such as smartphones and smartwatches, when authenticating.

In accordance with some embodiments, a method is described. The method is performed at a computer system that is in communication with one or more biometric sensors and an external accessory device. The method comprises: receiving a request at the computer system to perform a secure operation with the computer system; and in response to the request to perform the secure operation with the computer system; in accordance with a determination that biometric data captured by the computer system meets a set of biometric authentication criteria, performing the secure operation; and in accordance with a determination that the biometric data does not meet the set of biometric authentication criteria and in accordance with a determination that one or more states of the external accessory device meets a set of accessory-based criteria that includes a criterion that is met when the external accessory device is in an unlocked state and a criterion that is met when the external accessory device is physically associated with a user, performing the secure operation.

In accordance with some embodiments a non-transitory computer readable storage is described. The non-transitory computer-readable storage medium stores one or more programs configured to be executed by one or more processors of a computer system that is in communication with one or more biometric sensors and an external accessory device, the one or more programs including instructions for: receiving a request at the computer system to perform a secure operation with the computer system; and in response to the request to perform the secure operation with the computer system; in accordance with a determination that biometric data captured by the computer system meets a set of biometric authentication criteria, performing the secure operation; and in accordance with a determination that the biometric data does not meet the set of biometric authentication criteria and in accordance with a determination that one or more states of the external accessory device meets a set of accessory-based criteria that includes a criterion that is met when the external accessory device is in an unlocked state and a criterion that is met when the external accessory device is physically associated with a user, performing the secure operation.

In accordance with some embodiments a transitory computer readable storage is described. The transitory computer-readable storage medium stores one or more programs configured to be executed by one or more processors of a computer system that is in communication with one or more biometric sensors and an external accessory device, the one or more programs including instructions for: receiving a request at the computer system to perform a secure operation with the computer system; and in response to the request to perform the secure operation with the computer system; in accordance with a determination that biometric data captured by the computer system meets a set of biometric authentication criteria, performing the secure operation; and in accordance with a determination that the biometric data does not meet the set of biometric authentication criteria and in accordance with a determination that one or more states of the external accessory device meets a set of accessory-based criteria that includes a criterion that is met when the external accessory device is in an unlocked state and a criterion that is met when the external accessory device is physically associated with a user, performing the secure operation.

In accordance with some embodiments, a computer system is described. The computer system comprises: one or more processors, wherein the computer system is in communication with one or more biometric sensors and an external accessory device; and memory storing one or more programs configured to be executed by the one or more processors, the one or more programs including instructions for: receiving a request at the computer system to perform a secure operation with the computer system; and in response to the request to perform the secure operation with the computer system; in accordance with a determination that biometric data captured by the computer system meets a set of biometric authentication criteria, performing the secure operation; and in accordance with a determination that the biometric data does not meet the set of biometric authentication criteria and in accordance with a determination that one or more states of the external accessory device meets a set of accessory-based criteria that includes a criterion that is met when the external accessory device is in an unlocked state and a criterion that is met when the external accessory device is physically associated with a user, performing the secure operation.

In accordance with some embodiments, a computer system is described. The computer system comprises: one or more processors, wherein the computer system is in communication with one or more biometric sensors and an external accessory device; memory storing one or more programs configured to be executed by the one or more processors; means for receiving a request at the computer system to perform a secure operation with the computer system; and means, responsive to the request to perform the secure operation with the computer system, for: in accordance with a determination that biometric data captured by the computer system meets a set of biometric authentication criteria, performing the secure operation; and in accordance with a determination that the biometric data does not meet the set of biometric authentication criteria and in accordance with a determination that one or more states of the external accessory device meets a set of accessory-based criteria that includes a criterion that is met when the external accessory device is in an unlocked state and a criterion that is met when the external accessory device is physically associated with a user, performing the secure operation.

In accordance with some embodiments, a computer program product is described. The computer program product comprises: one or more processors of a computer system that is in communication with one or more biometric sensors and an external accessory device; and memory storing one or more programs configured to be executed by the one or more processors. The one or more programs including instructions for: receiving a request at the computer system to perform a secure operation with the computer system; and in response to the request to perform the secure operation with the computer system; in accordance with a determination that biometric data captured by the computer system meets a set of biometric authentication criteria, performing the secure operation; and in accordance with a determination that the biometric data does not meet the set of biometric authentication criteria and in accordance with a determination that one or more states of the external accessory device meets a set of accessory-based criteria that includes a criterion that is met when the external accessory device is in an unlocked state and a criterion that is met when the external accessory device is physically associated with a user, performing the secure operation.

In accordance with some embodiments, a method is described. The method is performed at a computer system that is in communication with one or more biometric sensors and one or more output devices. The method comprises: receiving a request at the computer system to perform a first secure operation with the computer system; in response to the request to perform the first secure operation with the computer system; in accordance with a determination that biometric data captured by the computer system meets a set of biometric authentication criteria, performing the first secure operation; and in accordance with a determination that the biometric data does not meet the set of biometric authentication criteria, forgoing performing the first secure operation; after forgoing performing the first secure operation in response to the request to perform the first secure operation, receiving authentication information that meets a set of authentication criteria; and in response to receiving the authentication information that meets the set of authentication criteria: performing a second secure operation associated with the set of authentication criteria; and providing, via the one or more output devices, a prompt to configure the computer system to perform secure operations when an external accessory device is physically associated with a user.

In accordance with some embodiments, a non-transitory computer readable storage medium is described. The non-transitory computer readable storage medium stores one or more programs configured to be executed by one or more processors of a computer system that is in communication with one or more biometric sensors and one or more output devices, the one or more programs including instructions for: receiving a request at the computer system to perform a first secure operation with the computer system; in response to the request to perform the first secure operation with the computer system; in accordance with a determination that biometric data captured by the computer system meets a set of biometric authentication criteria, performing the first secure operation; and in accordance with a determination that the biometric data does not meet the set of biometric authentication criteria, forgoing performing the first secure operation; after forgoing performing the first secure operation in response to the request to perform the first secure operation, receiving authentication information that meets a set of authentication criteria; and in response to receiving the authentication information that meets the set of authentication criteria: performing a second secure operation associated with the set of authentication criteria; and providing, via the one or more output devices, a prompt to configure the computer system to perform secure operations when an external accessory device is physically associated with a user.

In accordance with some embodiments, a transitory computer readable storage medium is described. The transitory computer readable storage medium stores one or more programs configured to be executed by one or more processors of a computer system that is in communication with one or more biometric sensors and one or more output devices, the one or more programs including instructions for: receiving a request at the computer system to perform a first secure operation with the computer system; in response to the request to perform the first secure operation with the computer system; in accordance with a determination that biometric data captured by the computer system meets a set of biometric authentication criteria, performing the first secure operation; and in accordance with a determination that the biometric data does not meet the set of biometric authentication criteria, forgoing performing the first secure operation; after forgoing performing the first secure operation in response to the request to perform the first secure operation, receiving authentication information that meets a set of authentication criteria; and in response to receiving the authentication information that meets the set of authentication criteria: performing a second secure operation associated with the set of authentication criteria; and providing, via the one or more output devices, a prompt to configure the computer system to perform secure operations when an external accessory device is physically associated with a user.

In accordance with some embodiments, a computer system is described. The computer system comprises: one or more processors, wherein the computer system is in communication with one or more biometric sensors and one or more output devices; and memory storing one or more programs configured to be executed by the one or more processors, the one or more programs including instructions for: receiving a request at the computer system to perform a first secure operation with the computer system; in response to the request to perform the first secure operation with the computer system; in accordance with a determination that biometric data captured by the computer system meets a set of biometric authentication criteria, performing the first secure operation; and in accordance with a determination that the biometric data does not meet the set of biometric authentication criteria, forgoing performing the first secure operation; after forgoing performing the first secure operation in response to the request to perform the first secure operation, receiving authentication information that meets a set of authentication criteria; and in response to receiving the authentication information that meets the set of authentication criteria: performing a second secure operation associated with the set of authentication criteria; and providing, via the one or more output devices, a prompt to configure the computer system to perform secure operations when an external accessory device is physically associated with a user.

In accordance with some embodiments, a computer system is described. The computer system, comprising: one or more processors, wherein the computer system is in communication with one or more biometric sensors and an external accessory device; memory storing one or more programs configured to be executed by the one or more processors; means for receiving a request at the computer system to perform a first secure operation with the computer system; means, responsive to the request to perform the first secure operation with the computer system, for: in accordance with a determination that biometric data captured by the computer system meets a set of biometric authentication criteria, performing the first secure operation; and in accordance with a determination that the biometric data does not meet the set of biometric authentication criteria, forgoing performing the first secure operation; means, after forgoing performing the first secure operation in response to the request to perform the first secure operation, for receiving authentication information that meets a set of authentication criteria; and means, responsive to receiving the authentication information that meets the set of authentication criteria, for: performing a second secure operation associated with the set of authentication criteria; and providing, via the one or more output devices, a prompt to configure the computer system to perform secure operations when an external accessory device is physically associated with a user.

In accordance with some embodiments, a computer program product is described. The computer program product comprises: one or more processors of a computer system that is in communication with one or more biometric sensors and one or more output devices; and memory storing one or more programs configured to be executed by the one or more processors, the one or more programs including instructions for: receiving a request at the computer system to perform a first secure operation with the computer system; in response to the request to perform the first secure operation with the computer system; in accordance with a determination that biometric data captured by the computer system meets a set of biometric authentication criteria, performing the first secure operation; and in accordance with a determination that the biometric data does not meet the set of biometric authentication criteria, forgoing performing the first secure operation; after forgoing performing the first secure operation in response to the request to perform the first secure operation, receiving authentication information that meets a set of authentication criteria; and in response to receiving the authentication information that meets the set of authentication criteria performing a second secure operation associated with the set of authentication criteria; and providing, via the one or more output devices, a prompt to configure the computer system to perform secure operations when an external accessory device is physically associated with a user.

In accordance with some embodiments, a method is described. The method is performed at a computer system that is in communication with one or more biometric sensors, one or more output devices, and one or more input devices. The method comprises: during a biometric enrollment process, providing, via the one or more output devices, an option to enable a first setting to perform a secure operation of a first type when a first portion of a biometric feature is not available to be captured via the one or more biometric sensors, after the biometric enrollment process is completed, receiving, via the one or more input devices, a request to perform the secure operation of the first type; and in response to receiving the request to perform the secure operation of the first type: in accordance with a determination that, based on biometric data captured via the one or more biometric sensors, the first portion of the biometric feature is not available to be captured, a determination that the first setting is enabled, and a determination that the biometric data meets a set of biometric authentication criteria, performing the secure operation of the first type; and in accordance with a determination that the first portion of the biometric feature is not available to be captured and a determination that the first setting is not enabled, forgoing performing the secure operation of the first type.

In some embodiments, a non-transitory computer-readable storage medium is described. The non-transitory computer-readable storage medium storing one or more programs configured to be executed by one or more processors of a computer system that is in communication with one or more biometric sensors, one or more output devices, and one or more input devices, the one or more programs including instructions for: during a biometric enrollment process, providing, via the one or more output devices, an option to enable a first setting to perform a secure operation of a first type when a first portion of a biometric feature is not available to be captured via the one or more biometric sensors; after the biometric enrollment process is completed, receiving, via the one or more input devices, a request to perform the secure operation of the first type; and in response to receiving the request to perform the secure operation of the first type: in accordance with a determination that, based on biometric data captured via the one or more biometric sensors, the first portion of the biometric feature is not available to be captured, a determination that the first setting is enabled, and a determination that the biometric data meets a set of biometric authentication criteria, performing the secure operation of the first type; and in accordance with a determination that the first portion of the biometric feature is not available to be captured and a determination that the first setting is not enabled, forgoing performing the secure operation of the first type.

In some embodiments, a transitory computer-readable storage medium is described. The transitory computer-readable storage medium storing one or more programs configured to be executed by one or more processors of a computer system that is in communication with one or more biometric sensors, one or more output devices, and one or more input devices, the one or more programs including instructions for: during a biometric enrollment process, providing, via the one or more output devices, an option to enable a first setting to perform a secure operation of a first type when a first portion of a biometric feature is not available to be captured via the one or more biometric sensors; after the biometric enrollment process is completed, receiving, via the one or more input devices, a request to perform the secure operation of the first type; and in response to receiving the request to perform the secure operation of the first type; in accordance with a determination that, based on biometric data captured via the one or more biometric sensors, the first portion of the biometric feature is not available to be captured, a determination that the first setting is enabled, and a determination that the biometric data meets a set of biometric authentication criteria, performing the secure operation of the first type; and in accordance with a determination that the first portion of the biometric feature is not available to be captured and a determination that the first setting is not enabled, forgoing performing the secure operation of the first type.

In accordance with some embodiments, a computer system is described. The computer system comprises: one or more processors, wherein the computer system is in communication with one or more biometric sensors, one or more output devices, and one or more input devices; and memory storing one or more programs configured to be executed by the one or more processors, the one or more programs including instructions for: during a biometric enrollment process, providing, via the one or more output devices, an option to enable a first setting to perform a secure operation of a first type when a first portion of a biometric feature is not available to be captured via the one or more biometric sensors; after the biometric enrollment process is completed, receiving, via the one or more input devices, a request to perform the secure operation of the first type; and in response to receiving the request to perform the secure operation of the first type: in accordance with a determination that, based on biometric data captured via the one or more biometric sensors, the first portion of the biometric feature is not available to be captured, a determination that the first setting is enabled, and a determination that the biometric data meets a set of biometric authentication criteria, performing the secure operation of the first type; and in accordance with a determination that the first portion of the biometric feature is not available to be captured and a determination that the first setting is not enabled, forgoing performing the secure operation of the first type.

In accordance with some embodiments, a computer system is described. The computer system comprises: one or more processors, wherein the computer system is in communication with one or more biometric sensors, one or more output devices, and one or more input devices; memory storing one or more programs configured to be executed by the one or more processors; means, during a biometric enrollment process, for providing, via the one or more output devices, an option to enable a first setting to perform a secure operation of a first type when a first portion of a biometric feature is not available to be captured via the one or more biometric sensors; means, after the biometric enrollment process is completed, for receiving, via the one or more input devices, a request to perform the secure operation of the first type; and means, responsive to receiving the request to perform the secure operation of the first type, for: in accordance with a determination that, based on biometric data captured via the one or more biometric sensors, the first portion of the biometric feature is not available to be captured, a determination that the first setting is enabled, and a determination that the biometric data meets a set of biometric authentication criteria, performing the secure operation of the first type; and in accordance with a determination that the first portion of the biometric feature is not available to be captured and a determination that the first setting is not enabled, forgoing performing the secure operation of the first type.

In accordance with some embodiments, a computer program product is described. The computer system comprises: one or more processors of a computer system that is in communication with one or more biometric sensors, one or more output devices, and one or more input devices; and memory storing one or more programs configured to be executed by the one or more processors. The one or more programs including instructions for: during a biometric enrollment process, providing, via the one or more output devices, an option to enable a first setting to perform a secure operation of a first type when a first portion of a biometric feature is not available to be captured via the one or more biometric sensors; after the biometric enrollment process is completed, receiving, via the one or more input devices, a request to perform the secure operation of the first type; and in response to receiving the request to perform the secure operation of the first type: in accordance with a determination that, based on biometric data captured via the one or more biometric sensors, the first portion of the biometric feature is not available to be captured, a determination that the first setting is enabled, and a determination that the biometric data meets a set of biometric authentication criteria, performing the secure operation of the first type; and in accordance with a determination that the first portion of the biometric feature is not available to be captured and a determination that the first setting is not enabled, forgoing performing the secure operation of the first type.

In accordance with some embodiments, a method is described. The method is performed at a computer system that is in communication with one or more biometric sensors, a display generation component, and one or more input devices. The method comprises: receiving, via the one or more input devices, a request to enable performing a secure operation based on a second portion of a biometric feature while a first portion of the biometric feature is not available to be captured by the biometric sensor; and in response to receiving the request to enable performing the secure operation based on the second portion of the biometric feature while the first portion of the biometric feature is not available to be captured by the biometric sensor: in accordance with a determination that biometric data corresponding to the second portion of the biometric feature has been previously enrolled for use in biometric authentication while the first portion of the biometric feature is not available to be captured by the biometric sensor, enabling use of the second portion of the biometric feature for biometric authentication without initiating a biometric enrollment process that includes capturing biometric data corresponding to the second portion of the biometric feature; and in accordance with a determination that data corresponding to the second portion of the biometric feature has not been previously enrolled for use in biometric authentication while the first portion of the biometric feature is not available to be captured by the biometric sensor, initiating the biometric enrollment process that includes capturing biometric data corresponding to the second portion of the biometric feature for use in biometric authentication while the first portion of the biometric feature is not available to be captured by the biometric sensor.

In accordance with some embodiments, a non-transitory computer-readable storage medium is described. The non-transitory computer-readable storage medium stores one or more programs configured to be executed by one or more processors of a computer system that is in communication with one or more biometric sensors, a display generation component, and one or more input devices, the one or more programs including instructions for: receiving, via the one or more input devices, a request to enable performing a secure operation based on a second portion of a biometric feature while a first portion of the biometric feature is not available to be captured by the biometric sensor; and in response to receiving the request to enable performing the secure operation based on the second portion of the biometric feature while the first portion of the biometric feature is not available to be captured by the biometric sensor: in accordance with a determination that biometric data corresponding to the second portion of the biometric feature has been previously enrolled for use in biometric authentication while the first portion of the biometric feature is not available to be captured by the biometric sensor, enabling use of the second portion of the biometric feature for biometric authentication without initiating a biometric enrollment process that includes capturing biometric data corresponding to the second portion of the biometric feature; and in accordance with a determination that data corresponding to the second portion of the biometric feature has not been previously enrolled for use in biometric authentication while the first portion of the biometric feature is not available to be captured by the biometric sensor, initiating the biometric enrollment process that includes capturing biometric data corresponding to the second portion of the biometric feature for use in biometric authentication while the first portion of the biometric feature is not available to be captured by the biometric sensor.

In accordance with some embodiments, a transitory computer-readable storage medium is described. The transitory computer-readable storage medium stores one or more programs configured to be executed by one or more processors of a computer system that is in communication with one or more biometric sensors, a display generation component, and one or more input devices, the one or more programs including instructions for: receiving, via the one or more input devices, a request to enable performing a secure operation based on a second portion of a biometric feature while a first portion of the biometric feature is not available to be captured by the biometric sensor; and in response to receiving the request to enable performing the secure operation based on the second portion of the biometric feature while the first portion of the biometric feature is not available to be captured by the biometric sensor; in accordance with a determination that biometric data corresponding to the second portion of the biometric feature has been previously enrolled for use in biometric authentication while the first portion of the biometric feature is not available to be captured by the biometric sensor, enabling use of the second portion of the biometric feature for biometric authentication without initiating a biometric enrollment process that includes capturing biometric data corresponding to the second portion of the biometric feature; and in accordance with a determination that data corresponding to the second portion of the biometric feature has not been previously enrolled for use in biometric authentication while the first portion of the biometric feature is not available to be captured by the biometric sensor, initiating the biometric enrollment process that includes capturing biometric data corresponding to the second portion of the biometric feature for use in biometric authentication while the first portion of the biometric feature is not available to be captured by the biometric sensor.

In accordance with some embodiments, a computer system is described. The computer system comprises: one or more processors, wherein the computer system is in communication with one or more biometric sensors, a display generation component, and one or more input devices, and memory storing one or more programs configured to be executed by the one or more processors, the one or more programs including instructions for: receiving, via the one or more input devices, a request to enable performing a secure operation based on a second portion of a biometric feature while a first portion of the biometric feature is not available to be captured by the biometric sensor; and in response to receiving the request to enable performing the secure operation based on the second portion of the biometric feature while the first portion of the biometric feature is not available to be captured by the biometric sensor; in accordance with a determination that biometric data corresponding to the second portion of the biometric feature has been previously enrolled for use in biometric authentication while the first portion of the biometric feature is not available to be captured by the biometric sensor, enabling use of the second portion of the biometric feature for biometric authentication without initiating a biometric enrollment process that includes capturing biometric data corresponding to the second portion of the biometric feature; and in accordance with a determination that data corresponding to the second portion of the biometric feature has not been previously enrolled for use in biometric authentication while the first portion of the biometric feature is not available to be captured by the biometric sensor, initiating the biometric enrollment process that includes capturing biometric data corresponding to the second portion of the biometric feature for use in biometric authentication while the first portion of the biometric feature is not available to be captured by the biometric sensor.

In accordance with some embodiments, a computer system is described. The computer system comprises: one or more processors, wherein the computer system is in communication with one or more biometric sensors, a display generation component, and one or more input devices, and memory storing one or more programs configured to be executed by the one or more processors; means for receiving, via the one or more input devices, a request to enable performing a secure operation based on a second portion of a biometric feature while a first portion of the biometric feature is not available to be captured by the biometric sensor; and means, responsive to receiving the request to enable performing the secure operation based on the second portion of the biometric feature while the first portion of the biometric feature is not available to be captured by the biometric sensor, for: in accordance with a determination that biometric data corresponding to the second portion of the biometric feature has been previously enrolled for use in biometric authentication while the first portion of the biometric feature is not available to be captured by the biometric sensor, enabling use of the second portion of the biometric feature for biometric authentication without initiating a biometric enrollment process that includes capturing biometric data corresponding to the second portion of the biometric feature; and in accordance with a determination that data corresponding to the second portion of the biometric feature has not been previously enrolled for use in biometric authentication while the first portion of the biometric feature is not available to be captured by the biometric sensor, initiating the biometric enrollment process that includes capturing biometric data corresponding to the second portion of the biometric feature for use in biometric authentication while the first portion of the biometric feature is not available to be captured by the biometric sensor.

In accordance with some embodiments, a computer program product is described. The computer system comprises: one or more processors of a computer system that is in communication with one or more biometric sensors, a display generation component, and one or more input devices, and memory storing one or more programs configured to be executed by the one or more processors. The one or more programs including instructions for: receiving, via the one or more input devices, a request to enable performing a secure operation based on a second portion of a biometric feature while a first portion of the biometric feature is not available to be captured by the biometric sensor; and in response to receiving the request to enable performing the secure operation based on the second portion of the biometric feature while the first portion of the biometric feature is not available to be captured by the biometric sensor; in accordance with a determination that biometric data corresponding to the second portion of the biometric feature has been previously enrolled for use in biometric authentication while the first portion of the biometric feature is not available to be captured by the biometric sensor, enabling use of the second portion of the biometric feature for biometric authentication without initiating a biometric enrollment process that includes capturing biometric data corresponding to the second portion of the biometric feature; and in accordance with a determination that data corresponding to the second portion of the biometric feature has not been previously enrolled for use in biometric authentication while the first portion of the biometric feature is not available to be captured by the biometric sensor, initiating the biometric enrollment process that includes capturing biometric data corresponding to the second portion of the biometric feature for use in biometric authentication while the first portion of the biometric feature is not available to be captured by the biometric sensor.

In accordance with some embodiments, a method is described. The method is performed at a computer system that is in communication with one or more biometric sensors and one or more output devices. The method comprises: during a biometric enrollment process, capturing, via the one or more biometric sensors, respective content that corresponds to a biometric feature; and in response to capturing the respective content that corresponds to the biometric feature and in accordance with a determination that the respective content meets a respective set of criteria, wherein the respective set of criteria includes a criterion that is met when a determination is made, based on the respective content, that a respective type of object is positioned over a respective portion of the biometric feature, and wherein the biometric feature was previously enrolled in conjunction with data corresponding to the respective type of object positioned over the respective portion of the biometric feature before the respective content was captured, providing, via the one or more output devices, a respective prompt to perform at least a portion of the biometric enrollment process without the respective type of object being positioned over the respective portion of the biometric feature.

In some embodiments, a non-transitory computer-readable storage medium is described. The non-transitory computer-readable storage medium stores one or more programs configured to be executed by one or more processors of a computer system that is in communication with one or more biometric sensors and one or more output devices. The one or more programs including instructions for: during a biometric enrollment process, capturing, via the one or more biometric sensors, respective content that corresponds to a biometric feature; and in response to capturing the respective content that corresponds to the biometric feature and in accordance with a determination that the respective content meets a respective set of criteria, wherein the respective set of criteria includes a criterion that is met when a determination is made, based on the respective content, that a respective type of object is positioned over a respective portion of the biometric feature, and wherein the biometric feature was previously enrolled in conjunction with data corresponding to the respective type of object positioned over the respective portion of the biometric feature before the respective content was captured, providing, via the one or more output devices, a respective prompt to perform at least a portion of the biometric enrollment process without the respective type of object being positioned over the respective portion of the biometric feature.

In some embodiments, a transitory computer-readable storage medium is described. The transitory computer-readable storage medium stores one or more programs configured to be executed by one or more processors of a computer system that is in communication with one or more biometric sensors and one or more output devices. The one or more programs including instructions for: during a biometric enrollment process, capturing, via the one or more biometric sensors, respective content that corresponds to a biometric feature; and in response to capturing the respective content that corresponds to the biometric feature and in accordance with a determination that the respective content meets a respective set of criteria, wherein the respective set of criteria includes a criterion that is met when a determination is made, based on the respective content, that a respective type of object is positioned over a respective portion of the biometric feature, and wherein the biometric feature was previously enrolled in conjunction with data corresponding to the respective type of object positioned over the respective portion of the biometric feature before the respective content was captured, providing, via the one or more output devices, a respective prompt to perform at least a portion of the biometric enrollment process without the respective type of object being positioned over the respective portion of the biometric feature.

In accordance with some embodiments, a computer system is described. The computer system comprises: one or more processors, wherein the computer system is in communication with one or more biometric sensors and one or more output devices; and memory storing one or more programs configured to be executed by the one or more processors. The one or more programs including instructions for: during a biometric enrollment process, capturing, via the one or more biometric sensors, respective content that corresponds to a biometric feature; and in response to capturing the respective content that corresponds to the biometric feature and in accordance with a determination that the respective content meets a respective set of criteria, wherein the respective set of criteria includes a criterion that is met when a determination is made, based on the respective content, that a respective type of object is positioned over a respective portion of the biometric feature, and wherein the biometric feature was previously enrolled in conjunction with data corresponding to the respective type of object positioned over the respective portion of the biometric feature before the respective content was captured, providing, via the one or more output devices, a respective prompt to perform at least a portion of the biometric enrollment process without the respective type of object being positioned over the respective portion of the biometric feature.

In accordance with some embodiments, a computer system is described. The computer system comprises: one or more processors, wherein the computer system is in communication with one or more biometric sensors and one or more output devices; memory storing one or more programs configured to be executed by the one or more processors; means, during a biometric enrollment process, for capturing, via the one or more biometric sensors, respective content that corresponds to a biometric feature; and means, responsive to capturing the respective content that corresponds to the biometric feature, for: in accordance with a determination that the respective content meets a respective set of criteria, wherein the respective set of criteria includes a criterion that is met when a determination is made, based on the respective content, that a respective type of object is positioned over a respective portion of the biometric feature, and wherein the biometric feature was previously enrolled in conjunction with data corresponding to the respective type of object positioned over the respective portion of the biometric feature before the respective content was captured, providing, via the one or more output devices, a respective prompt to perform at least a portion of the biometric enrollment process without the respective type of object being positioned over the respective portion of the biometric feature.

In accordance with some embodiments, a computer program product is described. The computer program product comprises: one or more processors of a computer system that is in communication with one or more biometric sensors and one or more output devices; and memory storing one or more programs configured to be executed by the one or more processors. The one or more programs including instructions for: during a biometric enrollment process, capturing, via the one or more biometric sensors, respective content that corresponds to a biometric feature; and in response to capturing the respective content that corresponds to the biometric feature and in accordance with a determination that the respective content meets a respective set of criteria, wherein the respective set of criteria includes a criterion that is met when a determination is made, based on the respective content, that a respective type of object is positioned over a respective portion of the biometric feature, and wherein the biometric feature was previously enrolled in conjunction with data corresponding to the respective type of object positioned over the respective portion of the biometric feature before the respective content was captured, providing, via the one or more output devices, a respective prompt to perform at least a portion of the biometric enrollment process without the respective type of object being positioned over the respective portion of the biometric feature.

In accordance with some embodiments, a method is described. The method is performed at a computer system that is in communication with one or more biometric sensors. The method comprises: receiving a request to perform a secure operation that requires user authentication; and in response to receiving the request to perform the secure operation and after capturing, via the one or more biometric sensors, first biometric data: in accordance with a determination that the first biometric data does not match an enrolled biometric feature that is a type of biometric feature that has a first portion and a second portion, forgoing performance of the secure operation; in accordance with a determination that: the first biometric data includes a second portion of a respective type of biometric feature without including a first portion of the respective type of biometric feature, fewer than a first threshold number of failed biometric authentication attempts including the second portion of the respective type of biometric feature without including the first portion of the respective type of biometric feature have occurred since the last successful user authentication was detected, and the second portion of the respective type of biometric feature in the first biometric data matches the enrolled biometric feature, performing the secure operation; in accordance with a determination that: the first biometric data includes the second portion of the respective type of biometric feature without including the first portion of the respective type of biometric feature, and at least the first threshold number of failed biometric authentication attempts including the second portion of the respective type of biometric feature without including the first portion of the respective type of biometric feature have occurred since the last successful user authentication was detected, forgoing performance of the secure operation; and in accordance with a determination that: the first biometric data includes the first portion of the respective type of biometric feature and the second portion of the respective type of biometric feature, less than a second threshold number of failed biometric authentication attempts including the respective type of biometric feature have occurred since the last successful user authentication was detected, where the second threshold number is higher than the first threshold number, and the first biometric data matches the enrolled biometric feature, performing the secure operation.

A non-transitory computer-readable storage medium is described. The non-transitory computer-readable storage medium stores one or more programs configured to be executed by one or more processors of a computer system that is in communication with one or more biometric sensors. The one or more programs including instructions for: receiving a request to perform the secure operation that requires user authentication; and in response to receiving the request to perform the secure operation and after capturing, via the one or more biometric sensors, first biometric data: in accordance with a determination that the first biometric data does not match an enrolled biometric feature that is a type of biometric feature that has a first portion and a second portion, forgoing performance of the secure operation; in accordance with a determination that: the first biometric data includes a second portion of a respective type of biometric feature without including a first portion of the respective type of biometric feature, fewer than a first threshold number of failed biometric authentication attempts including the second portion of the respective type of biometric feature without including the first portion of the respective type of biometric feature have occurred since the last successful user authentication was detected, and the second portion of the respective type of biometric feature in the first biometric data matches the enrolled biometric feature, performing the secure operation; in accordance with a determination that: the first biometric data includes the second portion of the respective type of biometric feature without including the first portion of the respective type of biometric feature, and at least the first threshold number of failed biometric authentication attempts including the second portion of the respective type of biometric feature without including the first portion of the respective type of biometric feature have occurred since the last successful user authentication was detected, forgoing performance of the secure operation; and in accordance with a determination that: the first biometric data includes the first portion of the respective type of biometric feature and the second portion of the respective type of biometric feature, less than a second threshold number of failed biometric authentication attempts including the respective type of biometric feature have occurred since the last successful user authentication was detected, where the second threshold number is higher than the first threshold number, and the first biometric data matches the enrolled biometric feature, performing the secure operation.

A transitory computer-readable storage medium is described. The transitory computer-readable storage medium stores one or more programs configured to be executed by one or more processors of a computer system that is in communication with one or more biometric sensors. The one or more programs including instructions for: receiving a request to perform the secure operation that requires user authentication; and in response to receiving the request to perform the secure operation and after capturing, via the one or more biometric sensors, first biometric data: in accordance with a determination that the first biometric data does not match an enrolled biometric feature that is a type of biometric feature that has a first portion and a second portion, forgoing performance of the secure operation; in accordance with a determination that: the first biometric data includes a second portion of a respective type of biometric feature without including a first portion of the respective type of biometric feature, fewer than a first threshold number of failed biometric authentication attempts including the second portion of the respective type of biometric feature without including the first portion of the respective type of biometric feature have occurred since the last successful user authentication was detected, and the second portion of the respective type of biometric feature in the first biometric data matches the enrolled biometric feature, performing the secure operation; in accordance with a determination that: the first biometric data includes the second portion of the respective type of biometric feature without including the first portion of the respective type of biometric feature, and at least the first threshold number of failed biometric authentication attempts including the second portion of the respective type of biometric feature without including the first portion of the respective type of biometric feature have occurred since the last successful user authentication was detected, forgoing performance of the secure operation; and in accordance with a determination that: the first biometric data includes the first portion of the respective type of biometric feature and the second portion of the respective type of biometric feature, less than a second threshold number of failed biometric authentication attempts including the respective type of biometric feature have occurred since the last successful user authentication was detected, where the second threshold number is higher than the first threshold number, and the first biometric data matches the enrolled biometric feature, performing the secure operation.

In accordance with some embodiments, a computer system is described. The computer system comprises: one or more processors, wherein the computer system is in communication with one or more biometric sensors; and memory storing one or more programs configured to be executed by the one or more processors. The one or more programs including instructions for: receiving a request to perform the secure operation that requires user authentication; and in response to receiving the request to perform the secure operation and after capturing, via the one or more biometric sensors, first biometric data: in accordance with a determination that the first biometric data does not match an enrolled biometric feature that is a type of biometric feature that has a first portion and a second portion, forgoing performance of the secure operation; in accordance with a determination that: the first biometric data includes a second portion of a respective type of biometric feature without including a first portion of the respective type of biometric feature, fewer than a first threshold number of failed biometric authentication attempts including the second portion of the respective type of biometric feature without including the first portion of the respective type of biometric feature have occurred since the last successful user authentication was detected, and the second portion of the respective type of biometric feature in the first biometric data matches the enrolled biometric feature, performing the secure operation; in accordance with a determination that: the first biometric data includes the second portion of the respective type of biometric feature without including the first portion of the respective type of biometric feature, and at least the first threshold number of failed biometric authentication attempts including the second portion of the respective type of biometric feature without including the first portion of the respective type of biometric feature have occurred since the last successful user authentication was detected, forgoing performance of the secure operation; and in accordance with a determination that: the first biometric data includes the first portion of the respective type of biometric feature and the second portion of the respective type of biometric feature, less than a second threshold number of failed biometric authentication attempts including the respective type of biometric feature have occurred since the last successful user authentication was detected, where the second threshold number is higher than the first threshold number, and the first biometric data matches the enrolled biometric feature, performing the secure operation.

In accordance with some embodiments, a computer system is described. The computer system comprises: one or more processors, wherein the computer system is in communication with one or more biometric sensors; memory storing one or more programs configured to be executed by the one or more processors; means for receiving a request to perform the secure operation that requires user authentication; and means responsive to, receiving the request to perform the secure operation and after capturing, via the one or more biometric sensors, first biometric data, for: in accordance with a determination that the first biometric data does not match an enrolled biometric feature that is a type of biometric feature that has a first portion and a second portion, forgoing performance of the secure operation; in accordance with a determination that: the first biometric data includes a second portion of a respective type of biometric feature without including a first portion of the respective type of biometric feature, fewer than a first threshold number of failed biometric authentication attempts including the second portion of the respective type of biometric feature without including the first portion of the respective type of biometric feature have occurred since the last successful user authentication was detected, and the second portion of the respective type of biometric feature in the first biometric data matches the enrolled biometric feature, performing the secure operation; in accordance with a determination that:

the first biometric data includes the second portion of the respective type of biometric feature without including the first portion of the respective type of biometric feature, and at least the first threshold number of failed biometric authentication attempts including the second portion of the respective type of biometric feature without including the first portion of the respective type of biometric feature have occurred since the last successful user authentication was detected, forgoing performance of the secure operation; and in accordance with a determination that: the first biometric data includes the first portion of the respective type of biometric feature and the second portion of the respective type of biometric feature, less than a second threshold number of failed biometric authentication attempts including the respective type of biometric feature have occurred since the last successful user authentication was detected, where the second threshold number is higher than the first threshold number, and the first biometric data matches the enrolled biometric feature, performing the secure operation.

In accordance with some embodiments, a computer program product is described. The computer program product comprises: one or more processors of a computer system that is in communication with one or more biometric sensors; and memory storing one or more programs configured to be executed by the one or more processors. The one or more programs including instructions for: receiving a request to perform the secure operation that requires user authentication; and in response to receiving the request to perform the secure operation and after capturing, via the one or more biometric sensors, first biometric data: in accordance with a determination that the first biometric data does not match an enrolled biometric feature that is a type of biometric feature that has a first portion and a second portion, forgoing performance of the secure operation; in accordance with a determination that: the first biometric data includes a second portion of a respective type of biometric feature without including a first portion of the respective type of biometric feature, fewer than a first threshold number of failed biometric authentication attempts including the second portion of the respective type of biometric feature without including the first portion of the respective type of biometric feature have occurred since the last successful user authentication was detected, and the second portion of the respective type of biometric feature in the first biometric data matches the enrolled biometric feature, performing the secure operation; in accordance with a determination that: the first biometric data includes the second portion of the respective type of biometric feature without including the first portion of the respective type of biometric feature, and at least the first threshold number of failed biometric authentication attempts including the second portion of the respective type of biometric feature without including the first portion of the respective type of biometric feature have occurred since the last successful user authentication was detected, forgoing performance of the secure operation; and in accordance with a determination that: the first biometric data includes the first portion of the respective type of biometric feature and the second portion of the respective type of biometric feature, less than a second threshold number of failed biometric authentication attempts including the respective type of biometric feature have occurred since the last successful user authentication was detected, where the second threshold number is higher than the first threshold number, and the first biometric data matches the enrolled biometric feature, performing the secure operation.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for implementing biometric authentication, thereby increasing the effectiveness, efficiency, and user satisfaction with such devices. Such methods and interfaces may complement or replace other methods for implementing biometric authentication.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 10A-10B are a flow diagram for providing authentication at a computer system using an external device in accordance with some embodiments.

FIGS. 11A-11B are a flow diagram for controlling authentication at a computer system using an external device in accordance with some embodiments.

FIGS. 13A-13B are a flow diagram illustrating a method for providing biometric authentication at a computer system in accordance with some embodiments.

FIGS. 14A-14B are a flow diagram illustrating a method for controlling biometric authentication at a computer system in accordance with some embodiments.

FIGS. 17A-17R illustrate exemplary user interfaces for managing the availability of different types of biometric authentication at a computer system in accordance with some embodiments.

FIGS. 18A-18C are a flow diagram illustrating a method for managing the availability of different types of biometric authentication at a computer system in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces methods for implementing biometric authentication. For example, there is a need for electronic devices (e.g., computer systems) that ways to authenticate a user when biometric authentication of a feature is unsuccessful. Such techniques can reduce the cognitive burden on a user who wants to perform a secure transaction, thereby enhancing productivity. Further, such techniques can reduce processor and battery power otherwise wasted on redundant user inputs.

Below, FIGS. 1A-1B, 2, 3, 4A-4B, 5A-5H, and 6 provide a description of exemplary devices for performing the techniques for managing authentication.

Figure 7A:
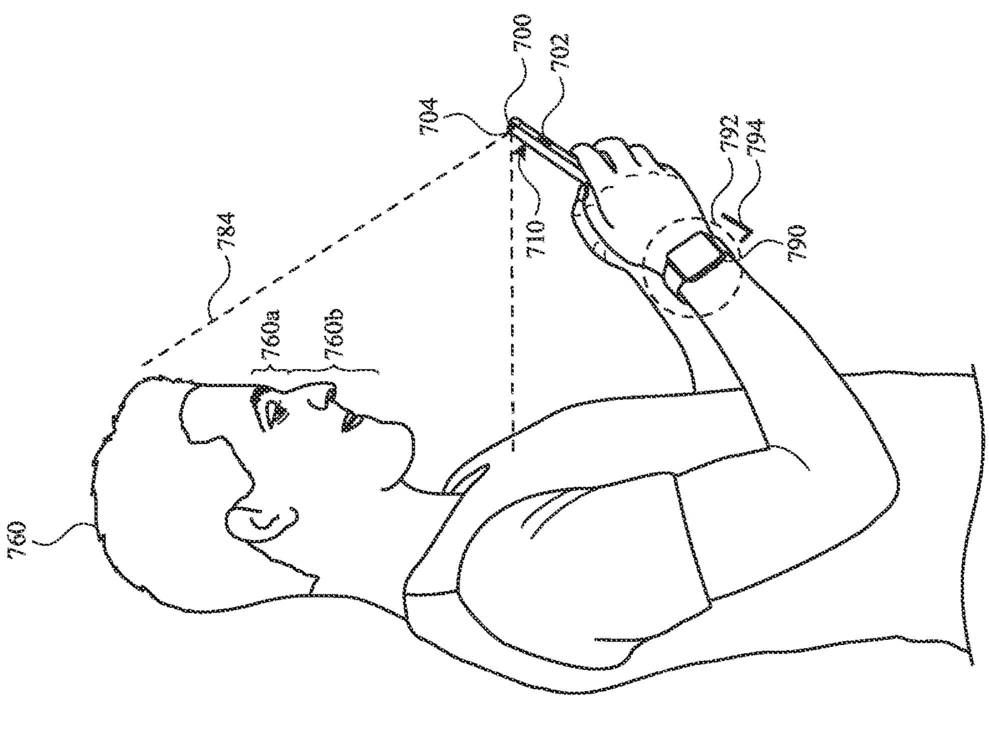
FIGS. 7A-7AM illustrate exemplary user interfaces for providing and controlling authentication at a computer system using an external device in accordance with some embodiments.
Figure 9:
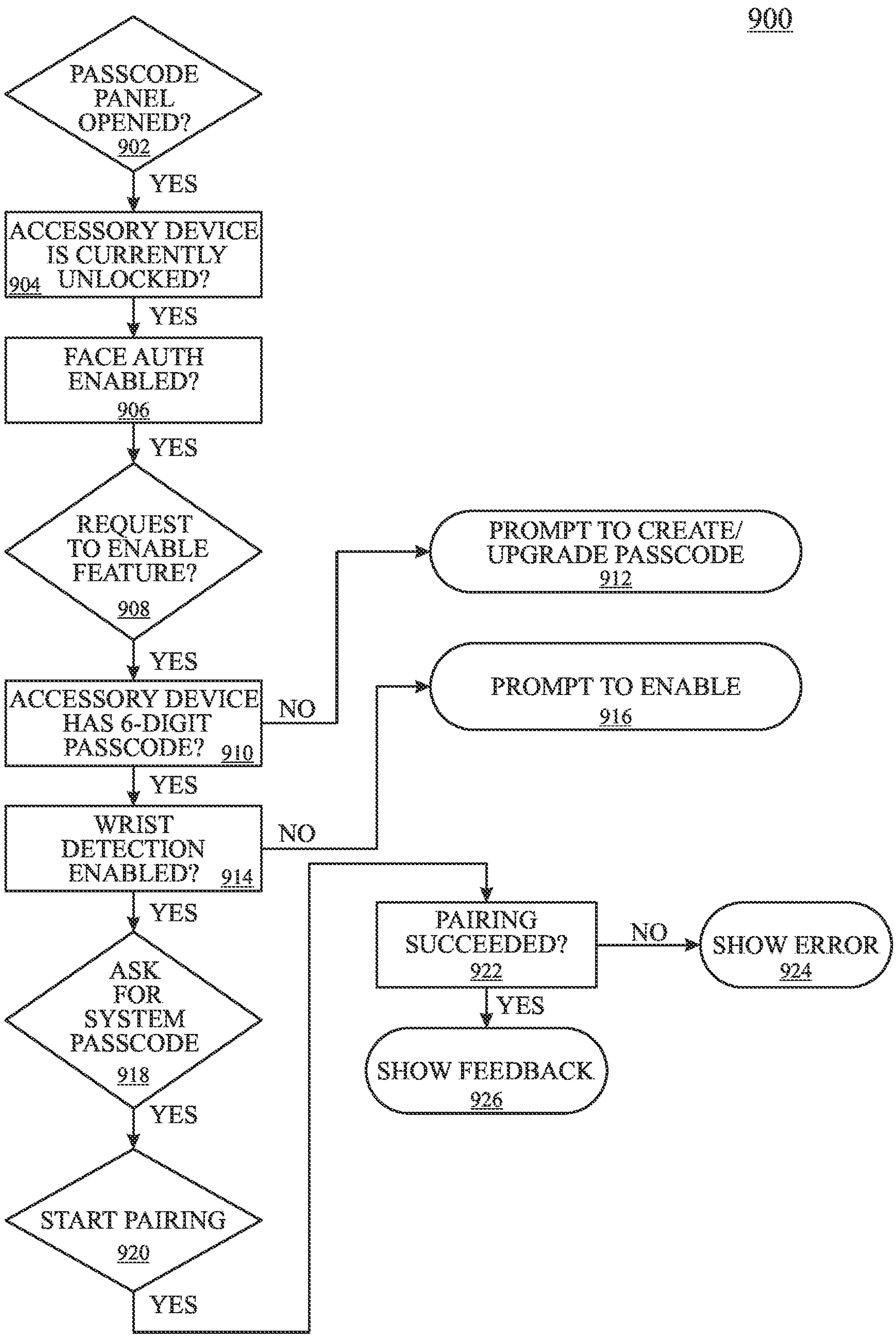
FIG. 9 is a flow diagram illustrating a method for controlling authentication at a computer system using an external device in accordance with some embodiments.
Figure 10A:
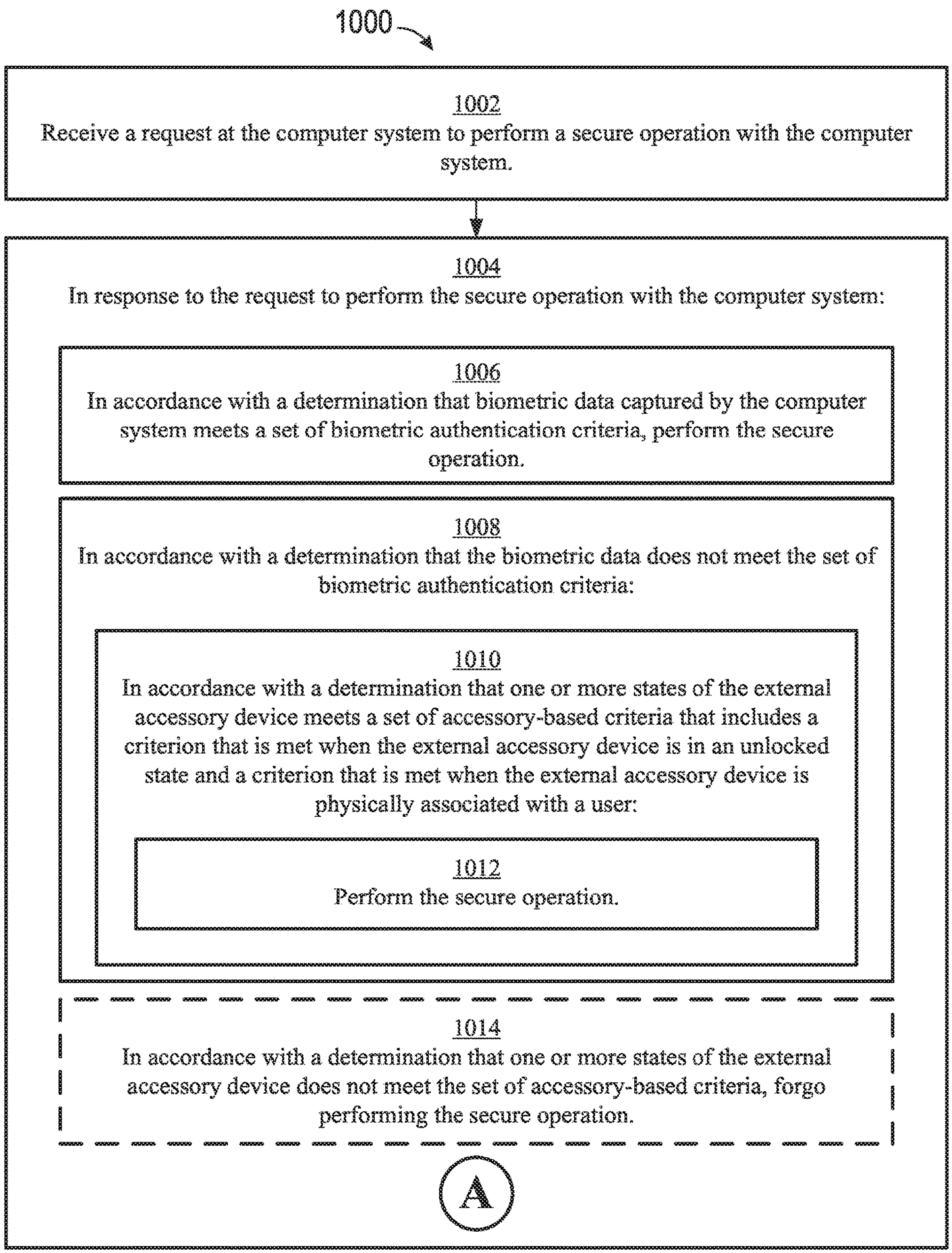
Figure 11A:
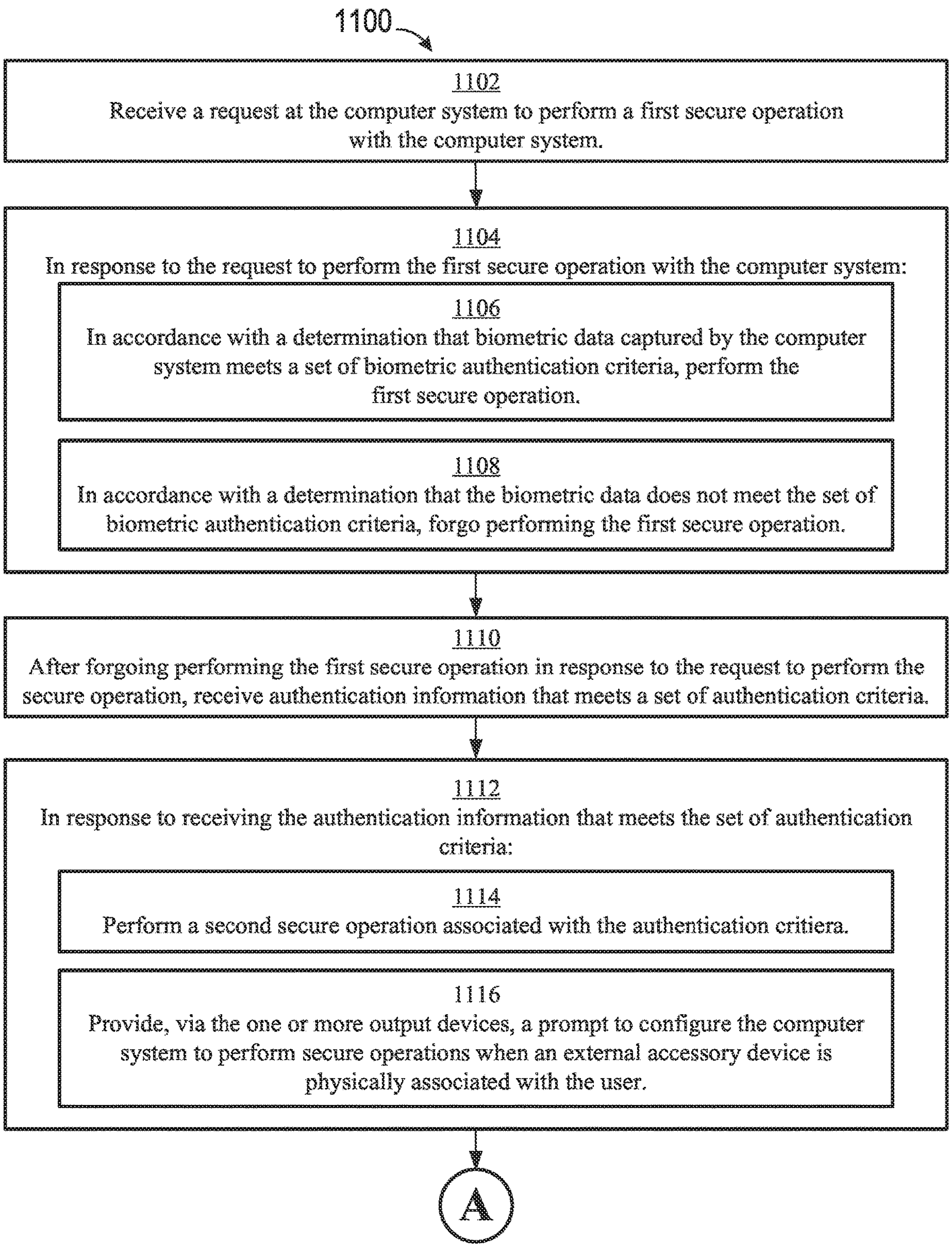

FIGS. 7A-7AM illustrate exemplary user interfaces for providing and controlling authentication at a computer system using an external device in accordance with some embodiments. FIGS. 8A-8E are a flow diagram illustrating providing authentication at a computer system using an external device in accordance with some embodiments. FIG. 9 is a flow diagram illustrating a method for controlling authentication at a computer system using an external device in accordance with some embodiments. FIGS. 10A-10B are a flow diagram for providing authentication at a computer system using an external device in accordance with some embodiments. FIGS. 11A-11B are a flow diagram for controlling authentication at a computer system using an external device in accordance with some embodiments. The user interfaces in FIGS. 7A-7AM are used to illustrate the processes described below, including the processes in FIGS. 8A-8E, FIG. 9, FIGS. 10A-10B, and FIGS. 11A-11B.

Figure 12A:
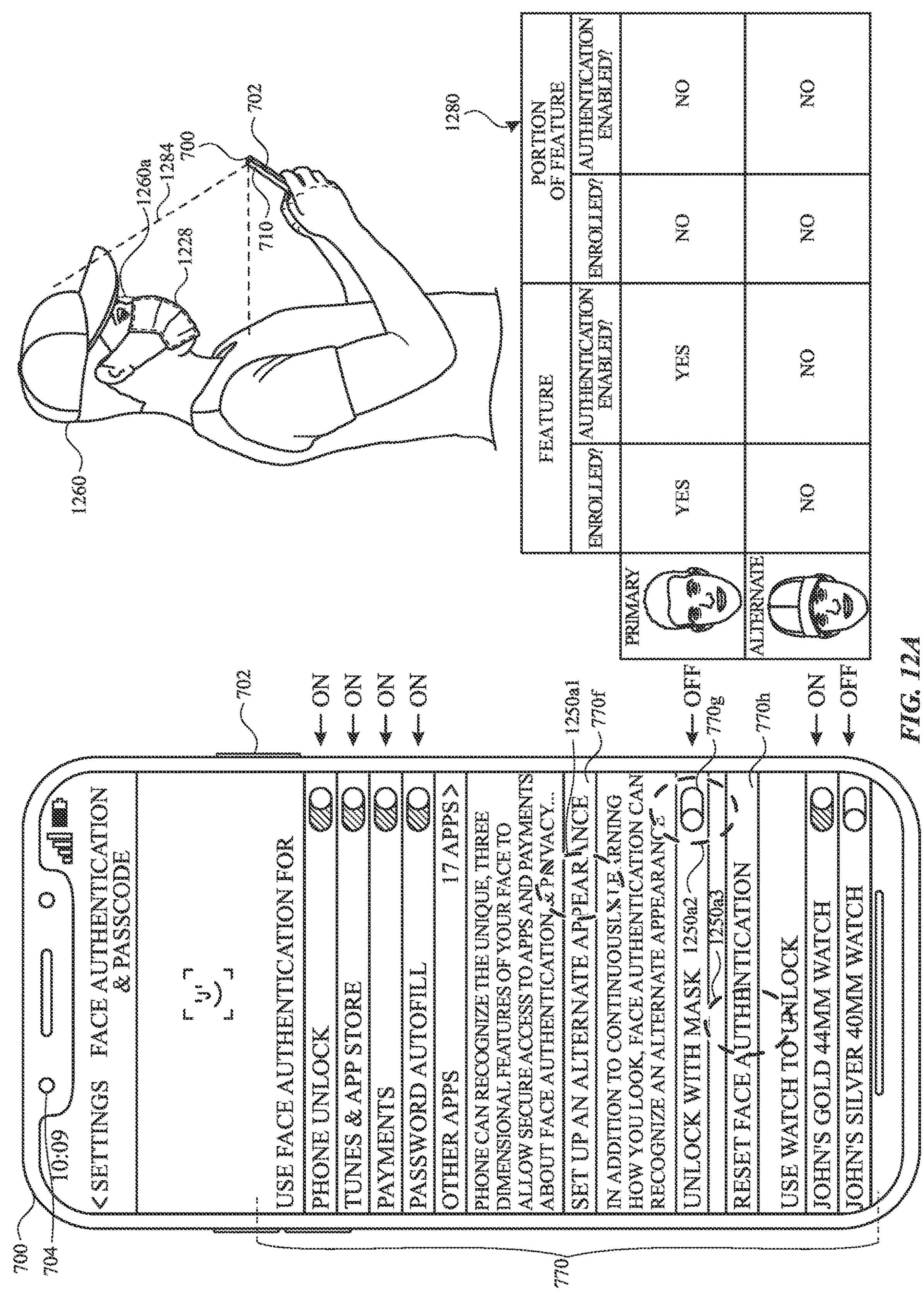
FIGS. 12A-12AA illustrate exemplary user interfaces for providing and controlling biometric authentication at a computer system in accordance with some embodiments.
Figure 13A:
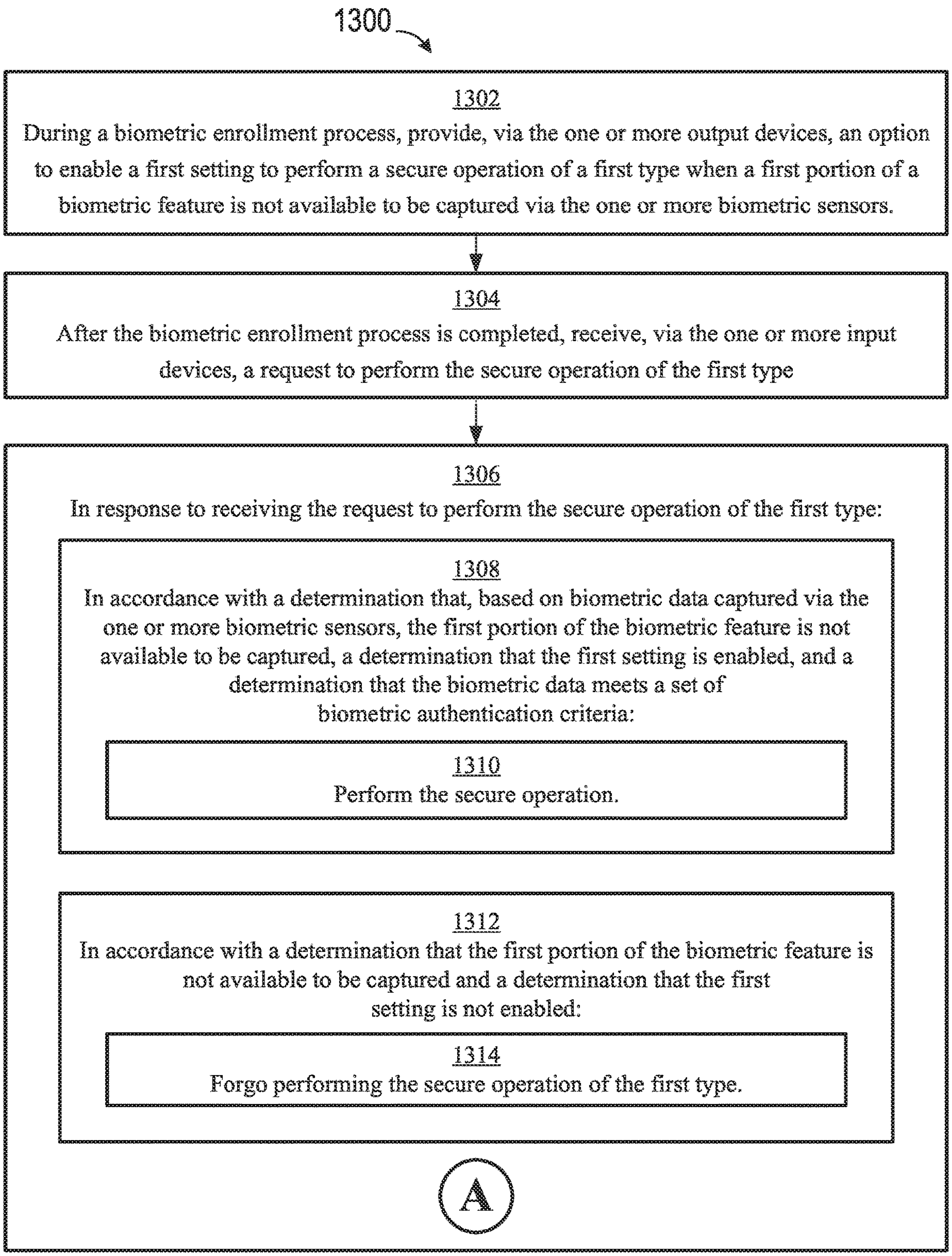
Figure 15A:
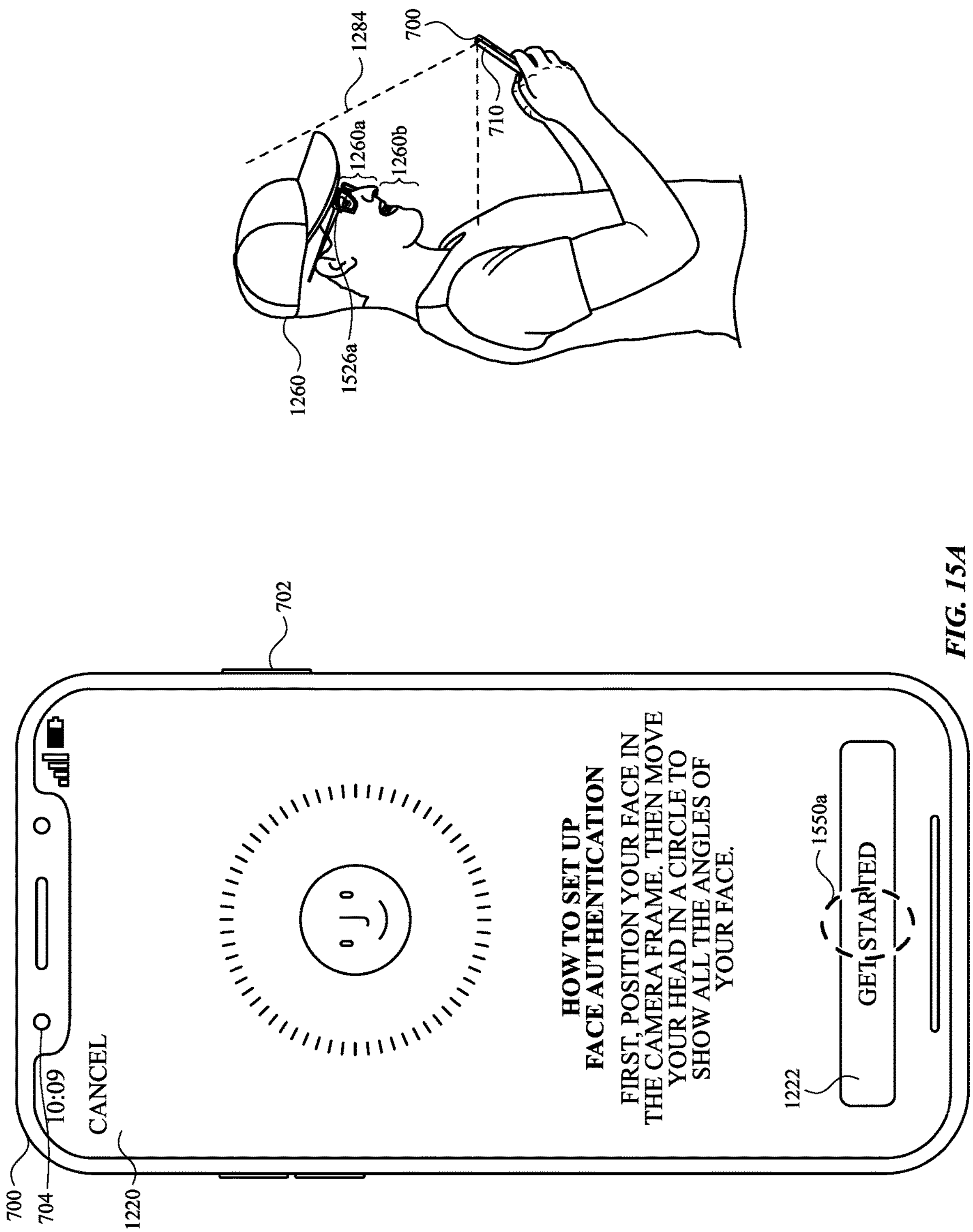
FIGS. 15A-15U illustrate exemplary user interfaces for providing and controlling biometric authentication at a computer system in accordance with some embodiments.
Figure 15C:
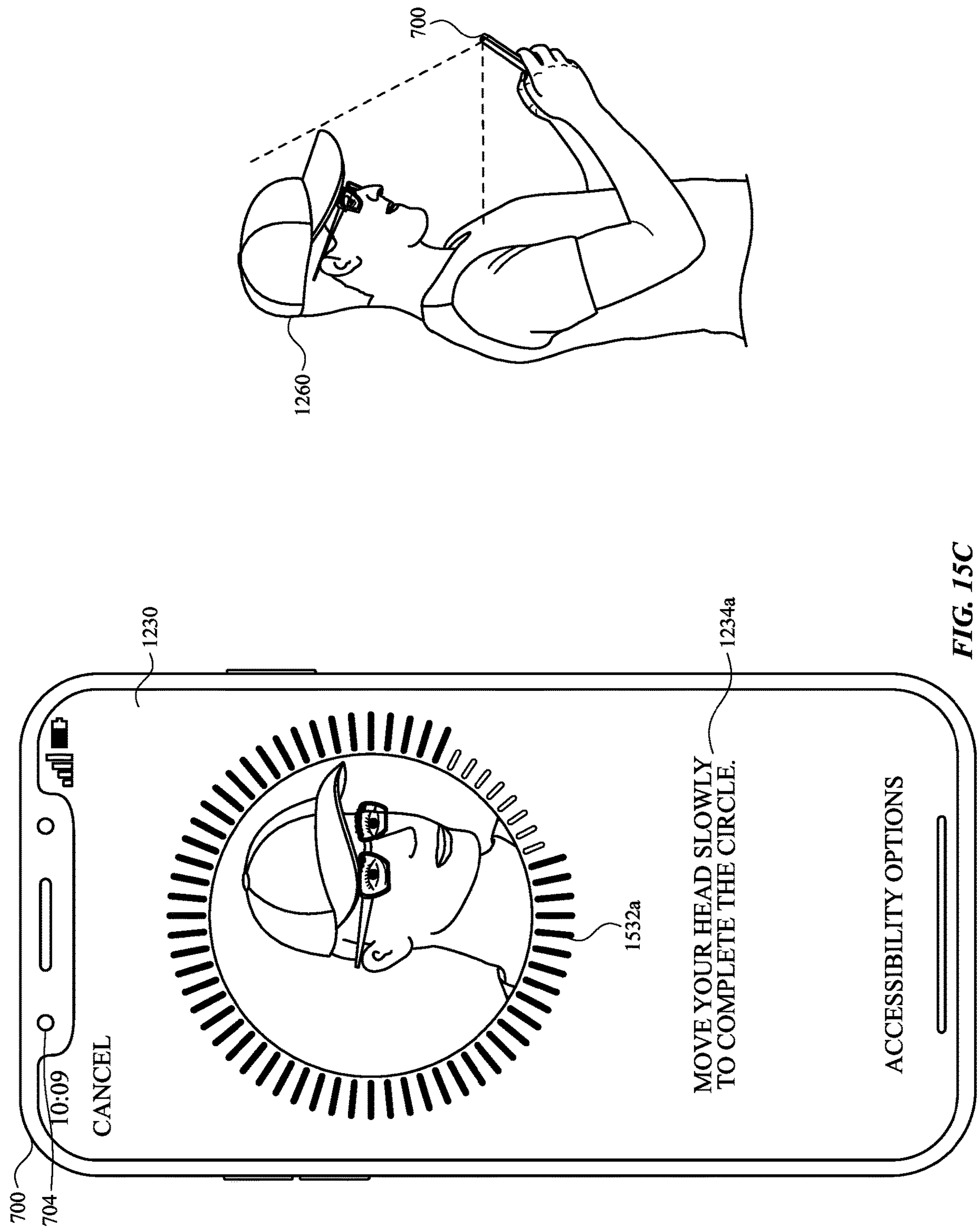
Figure 15D:
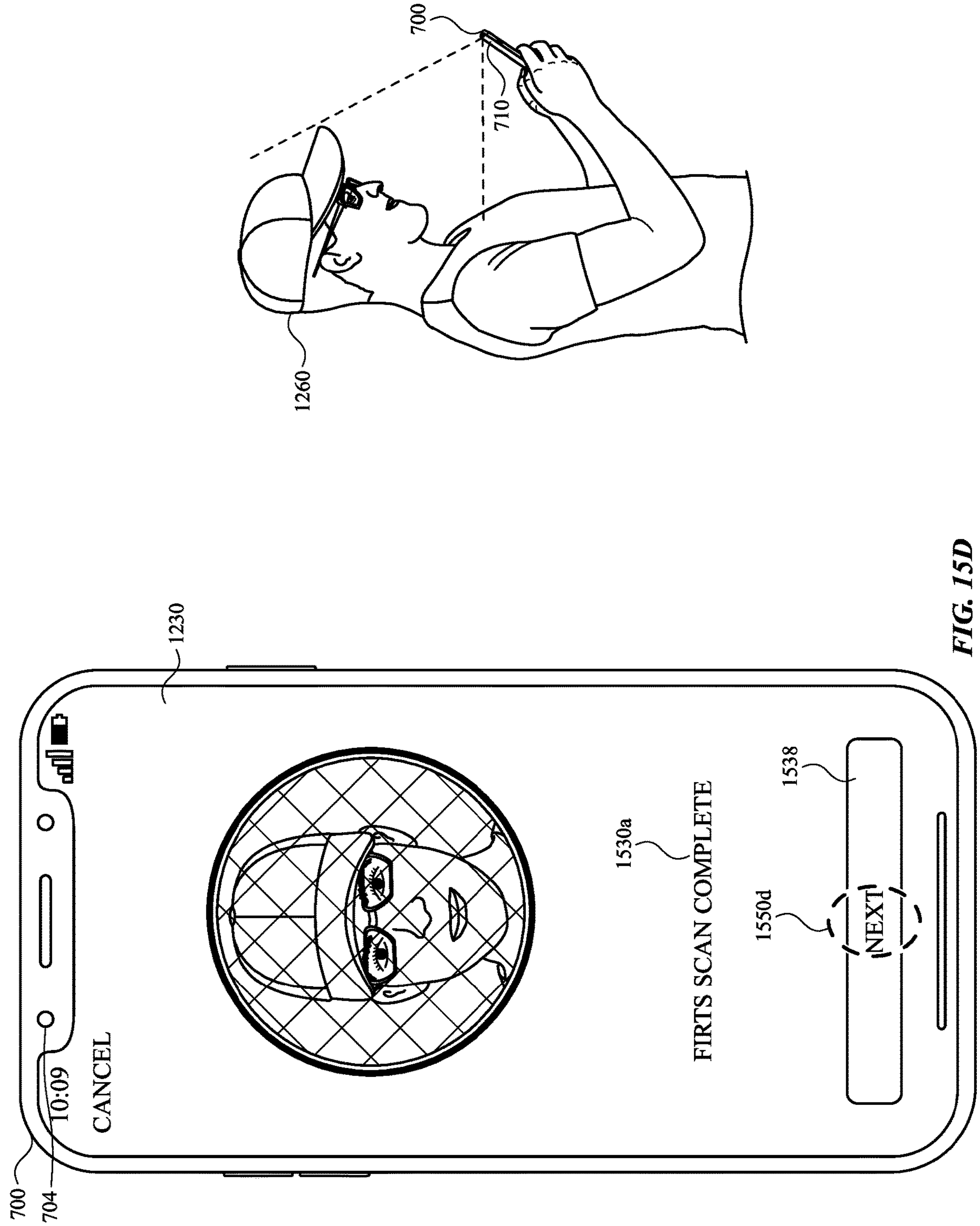
Figure 15E:
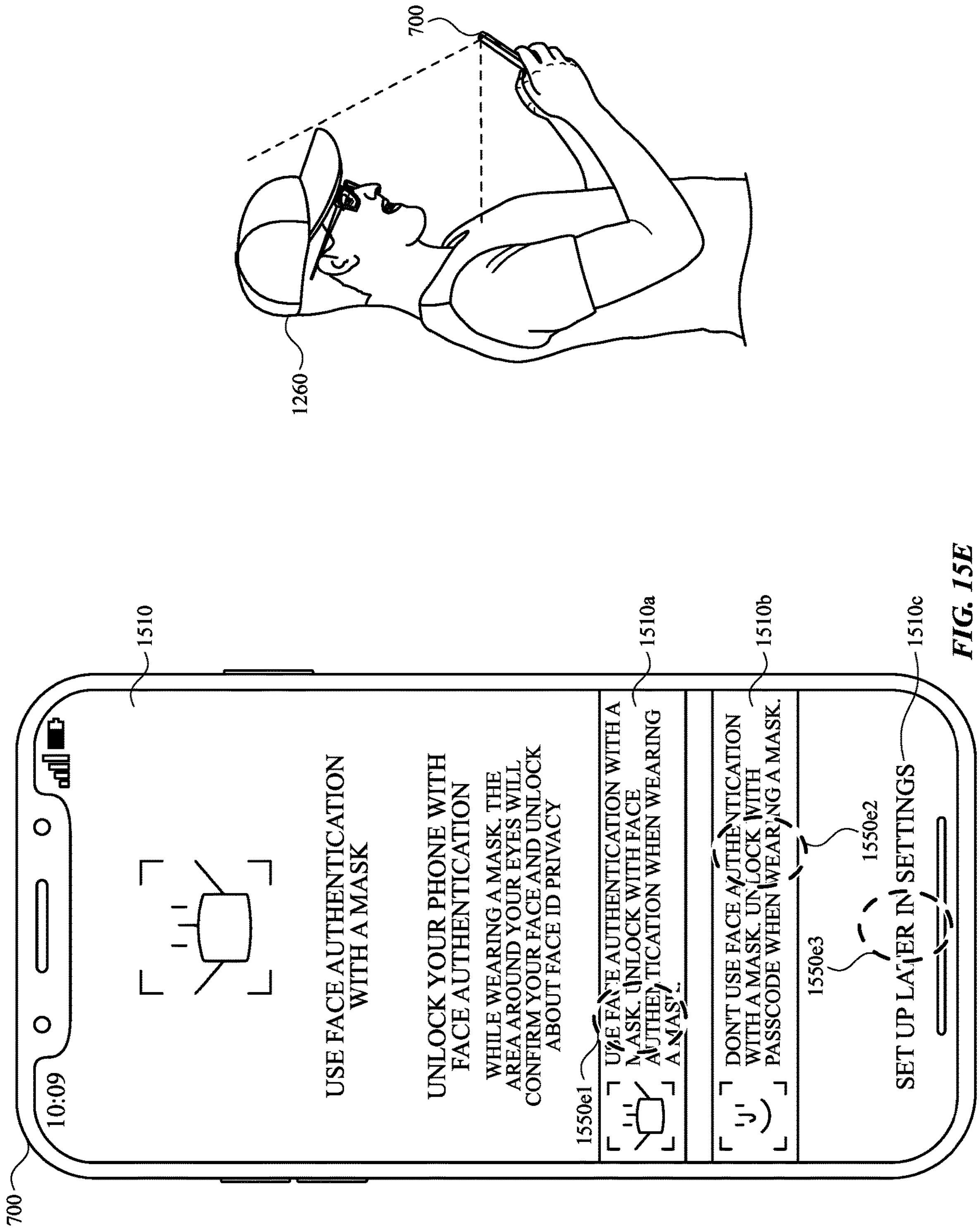
Figure 15F:
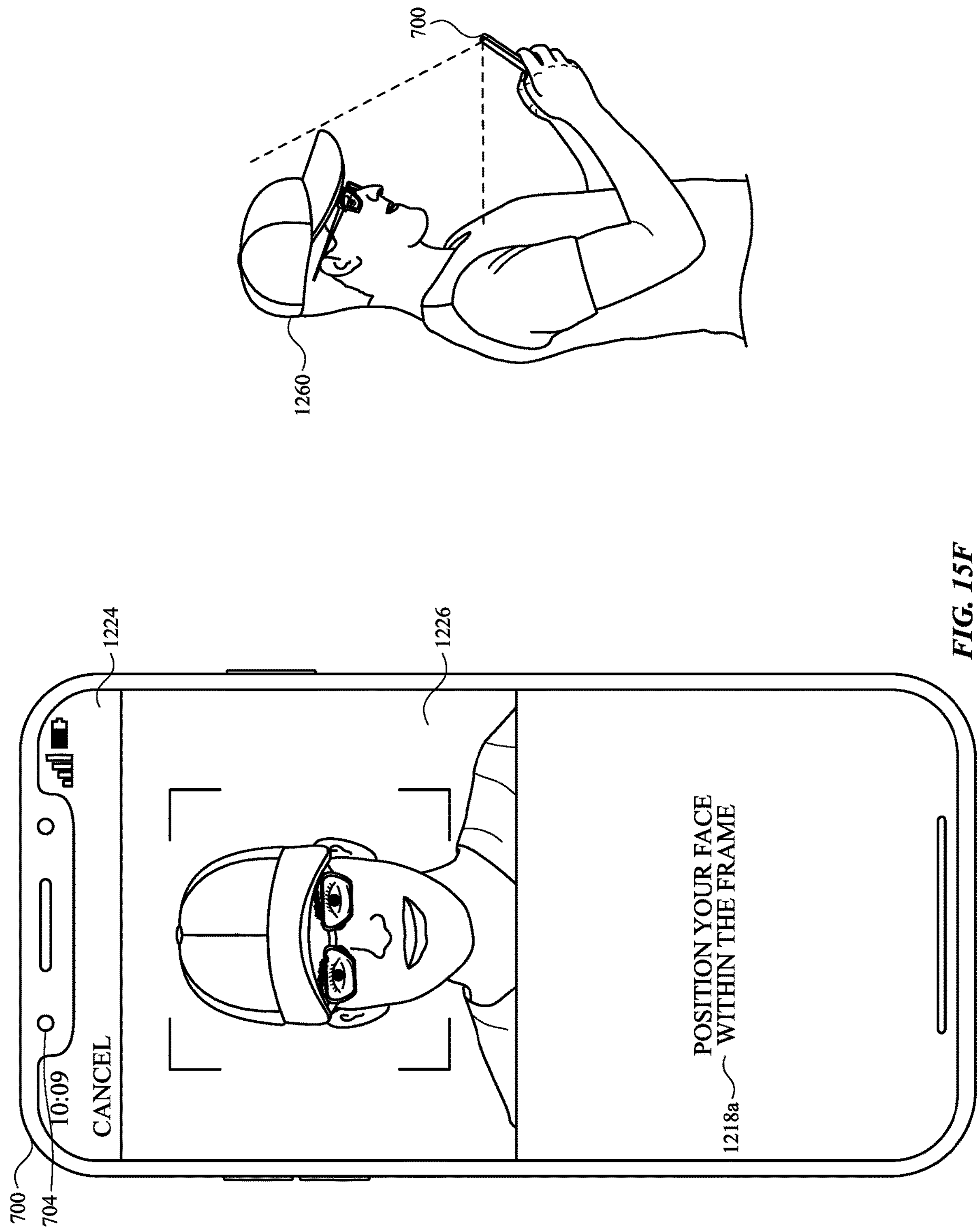
Figure 15G:
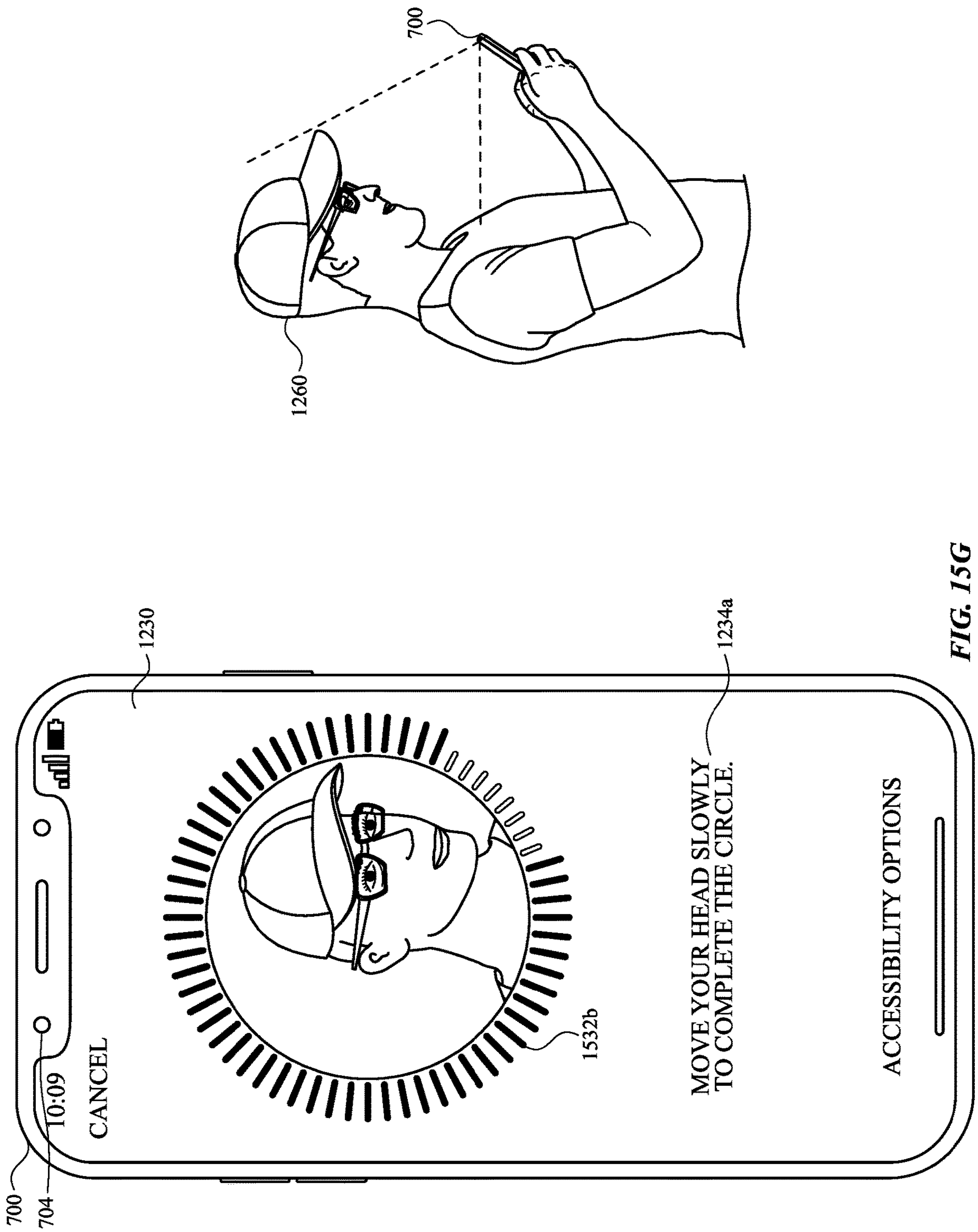
Figure 15H:
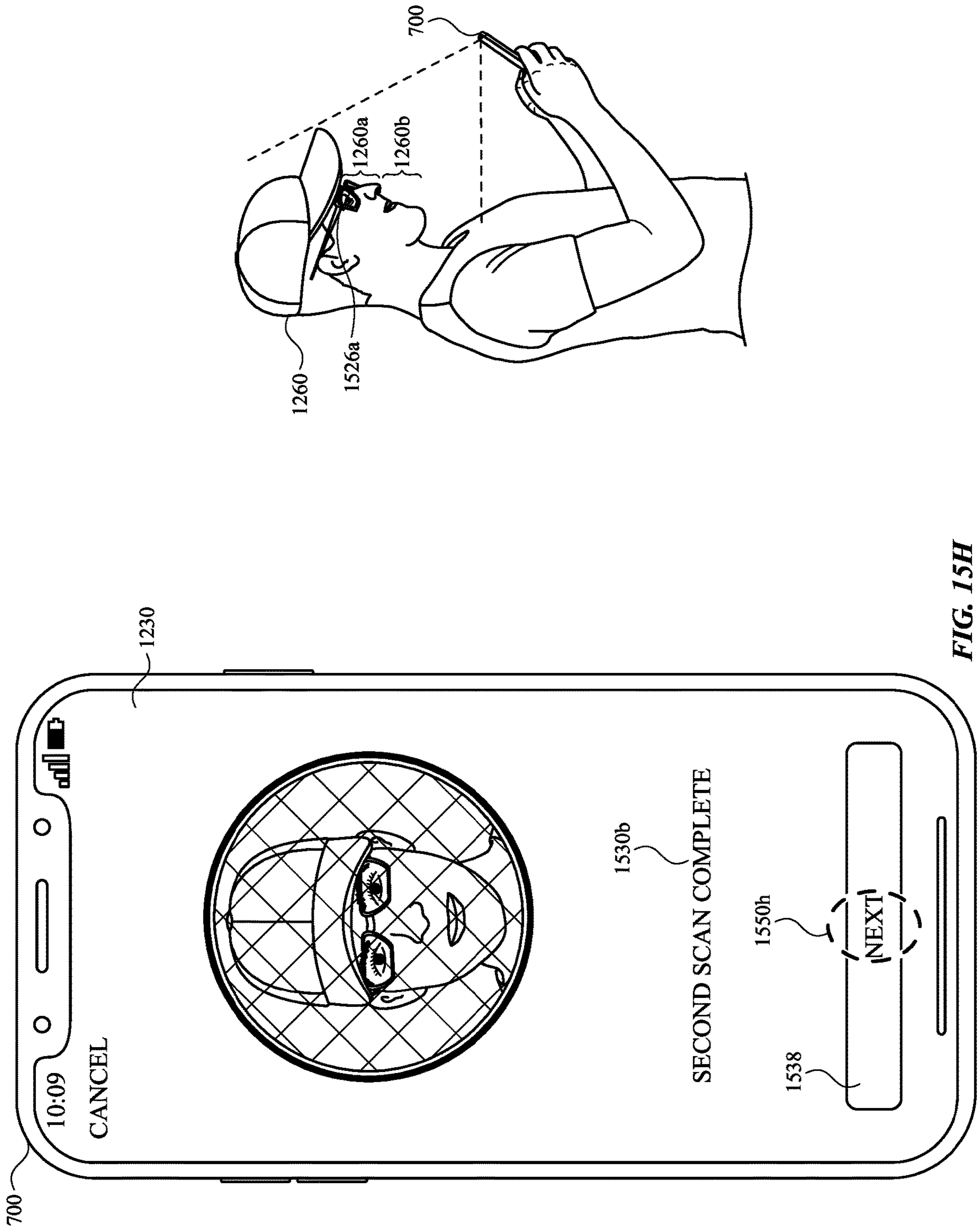
Figure 15I:
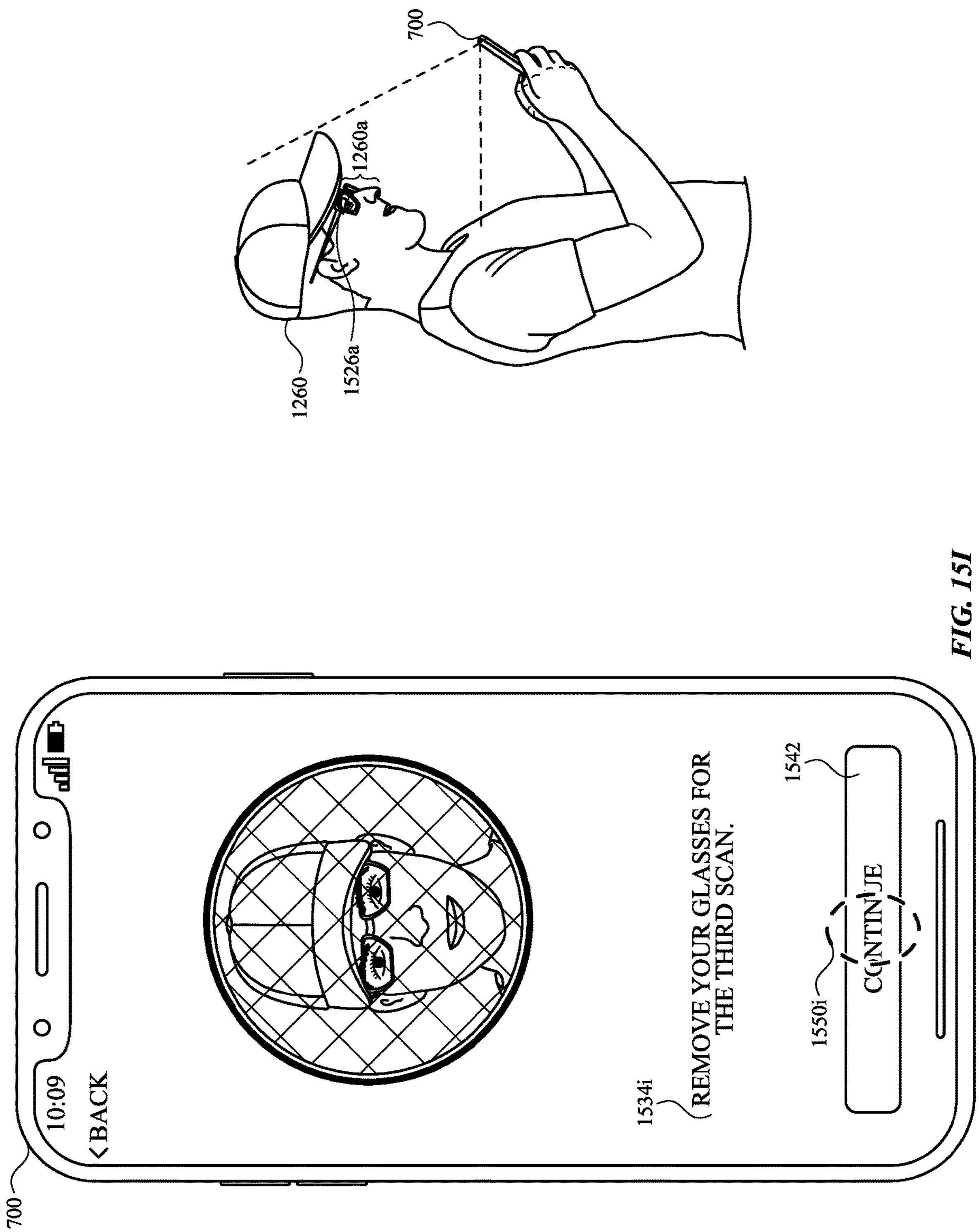
Figure 15J:
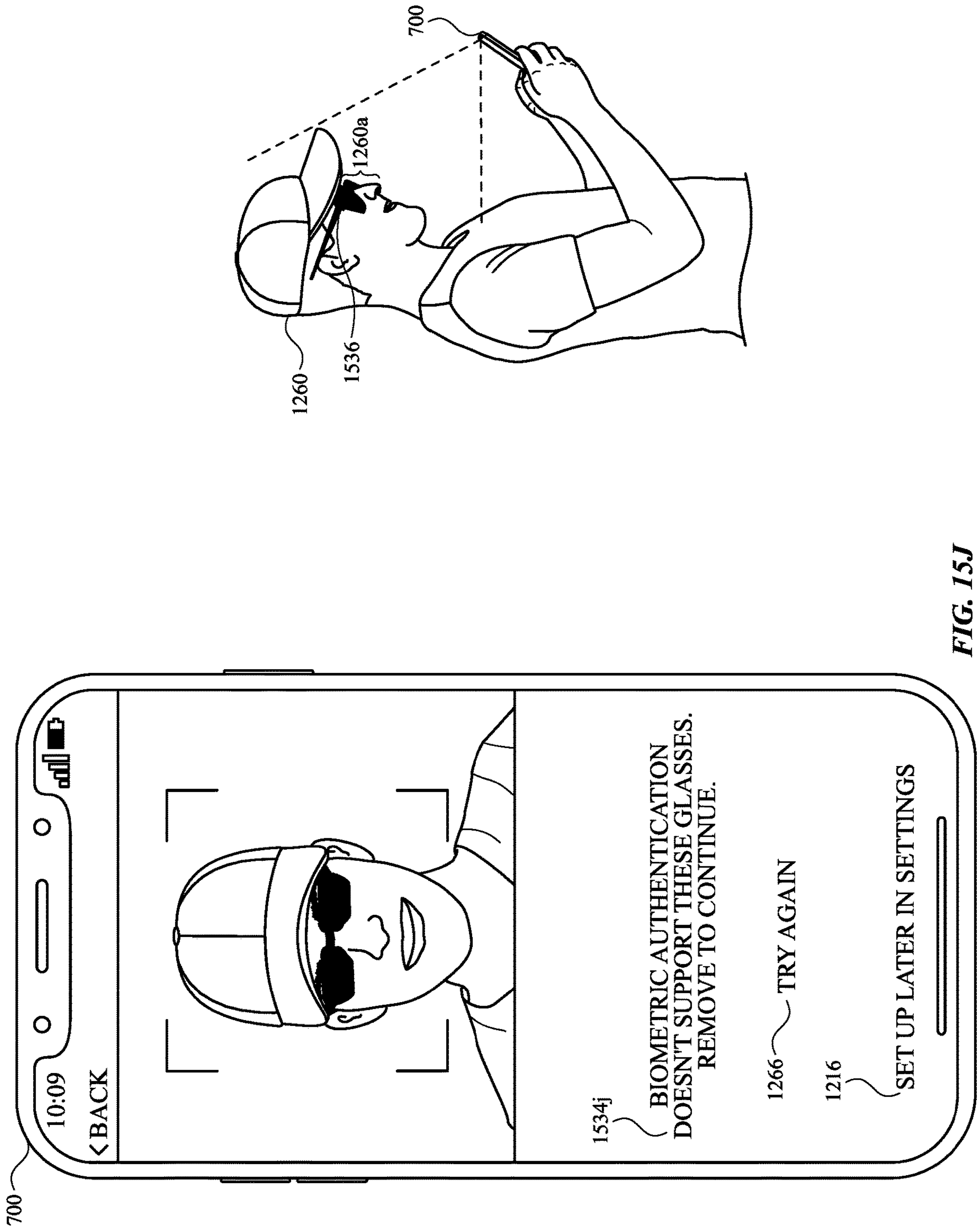
Figure 15K:
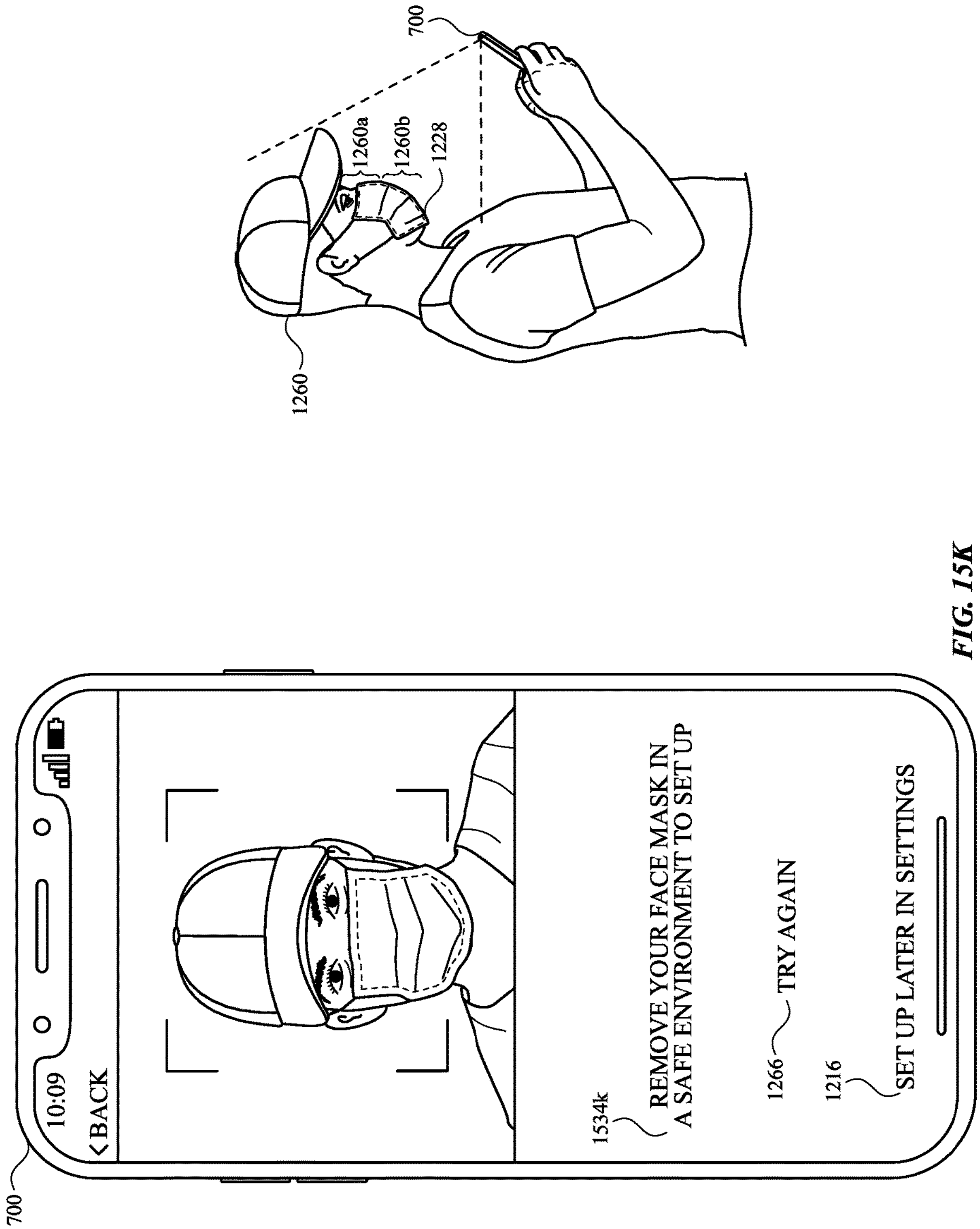
Figure 15L:
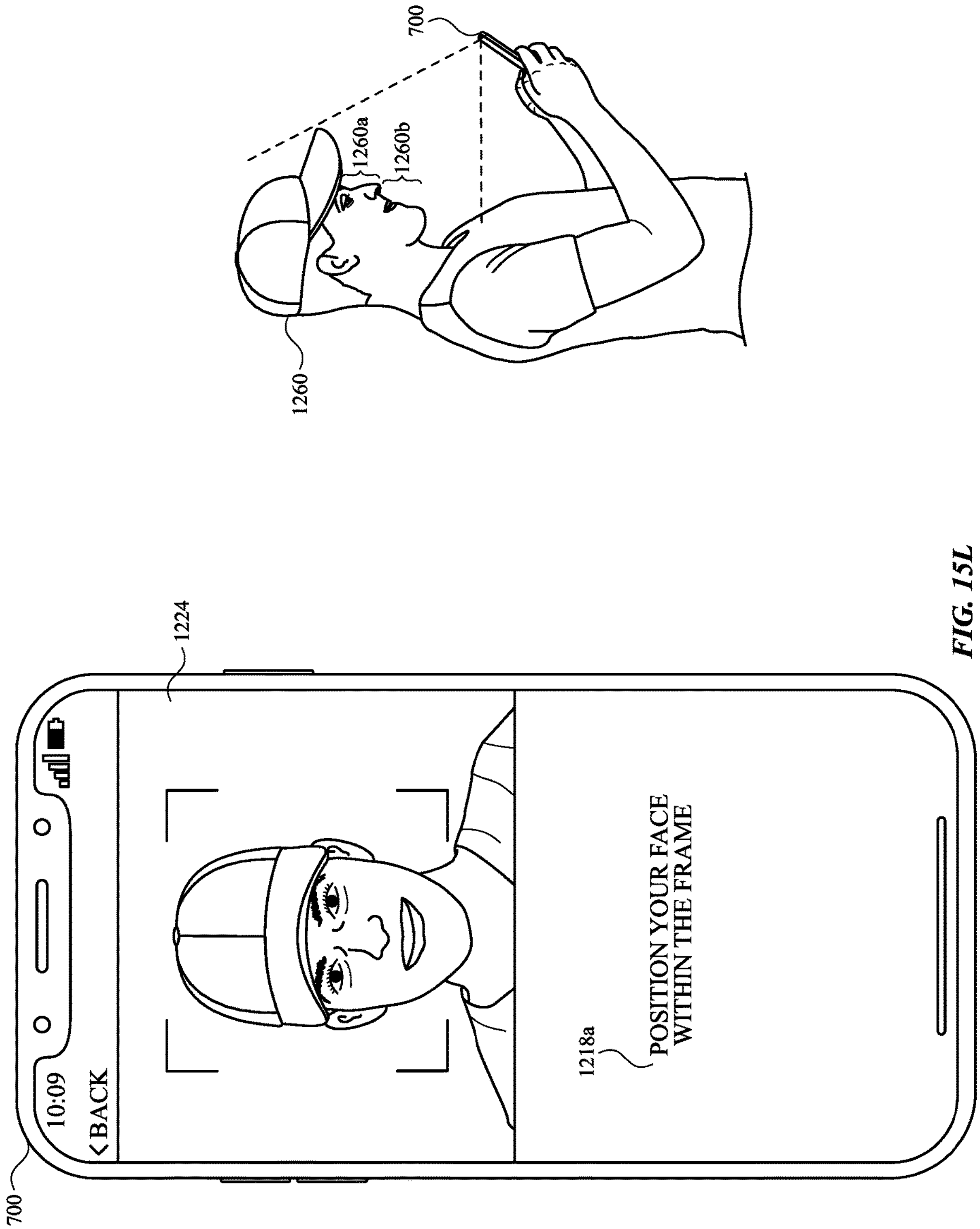
Figure 15M:
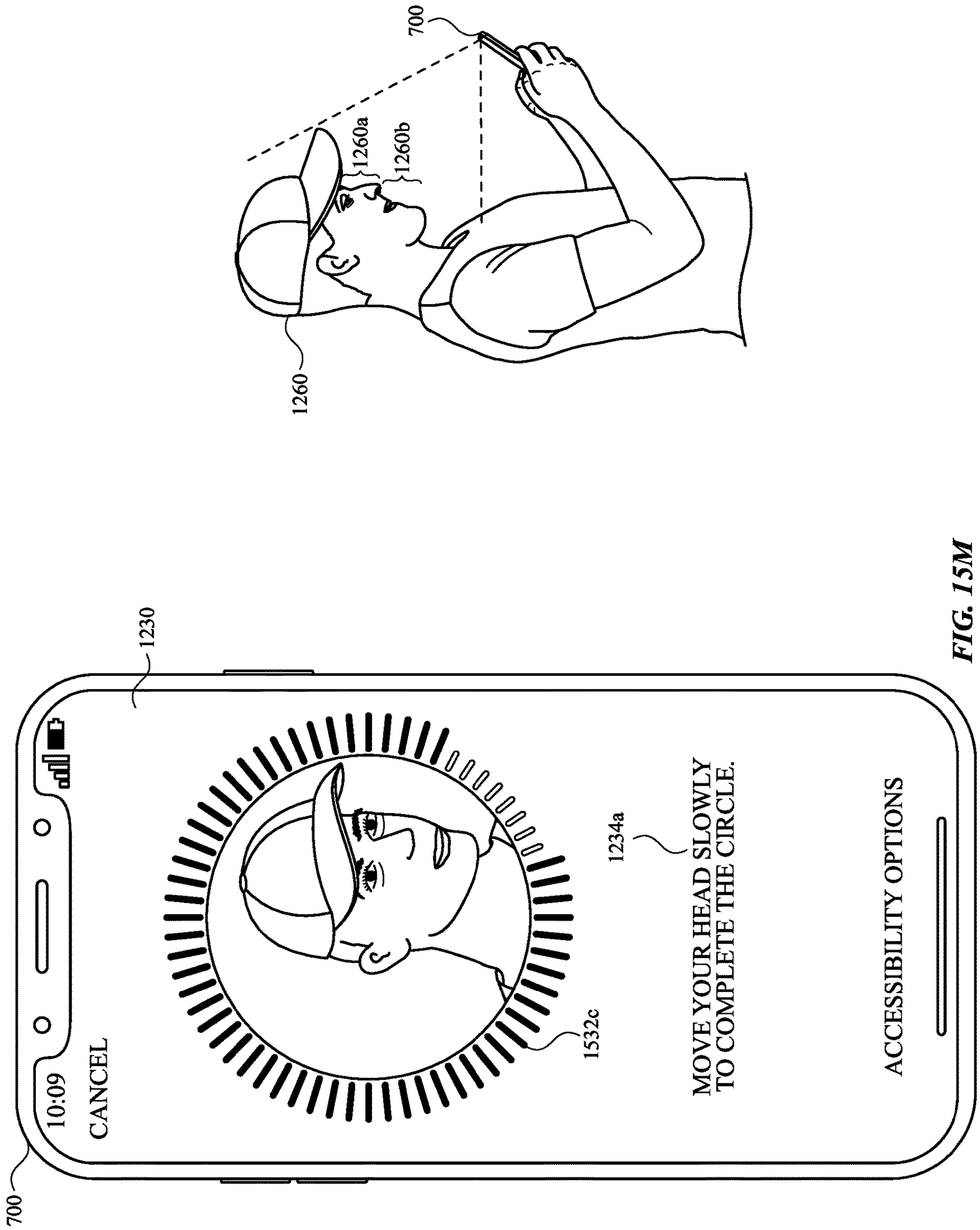
Figure 15N:
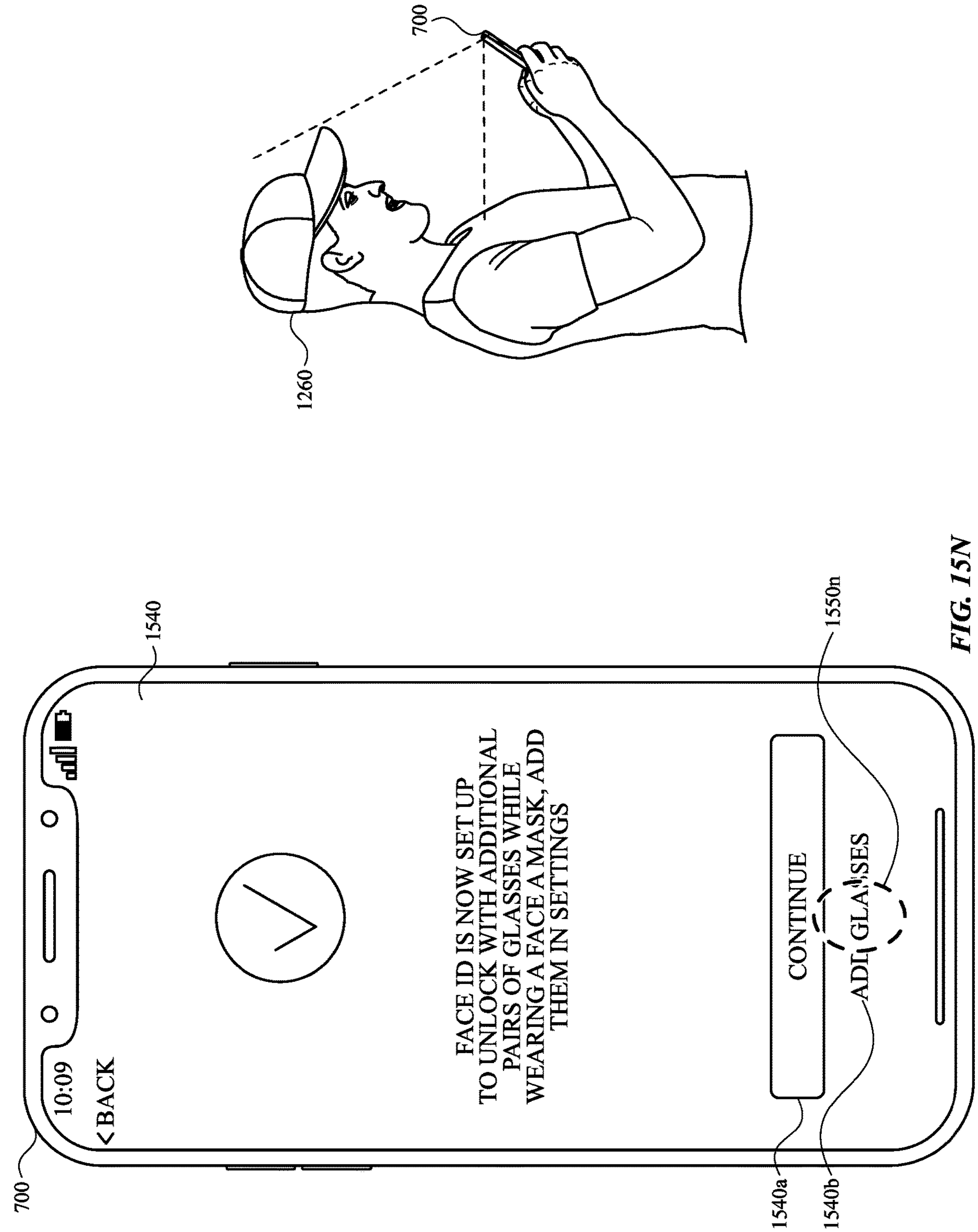
Figure 15O:
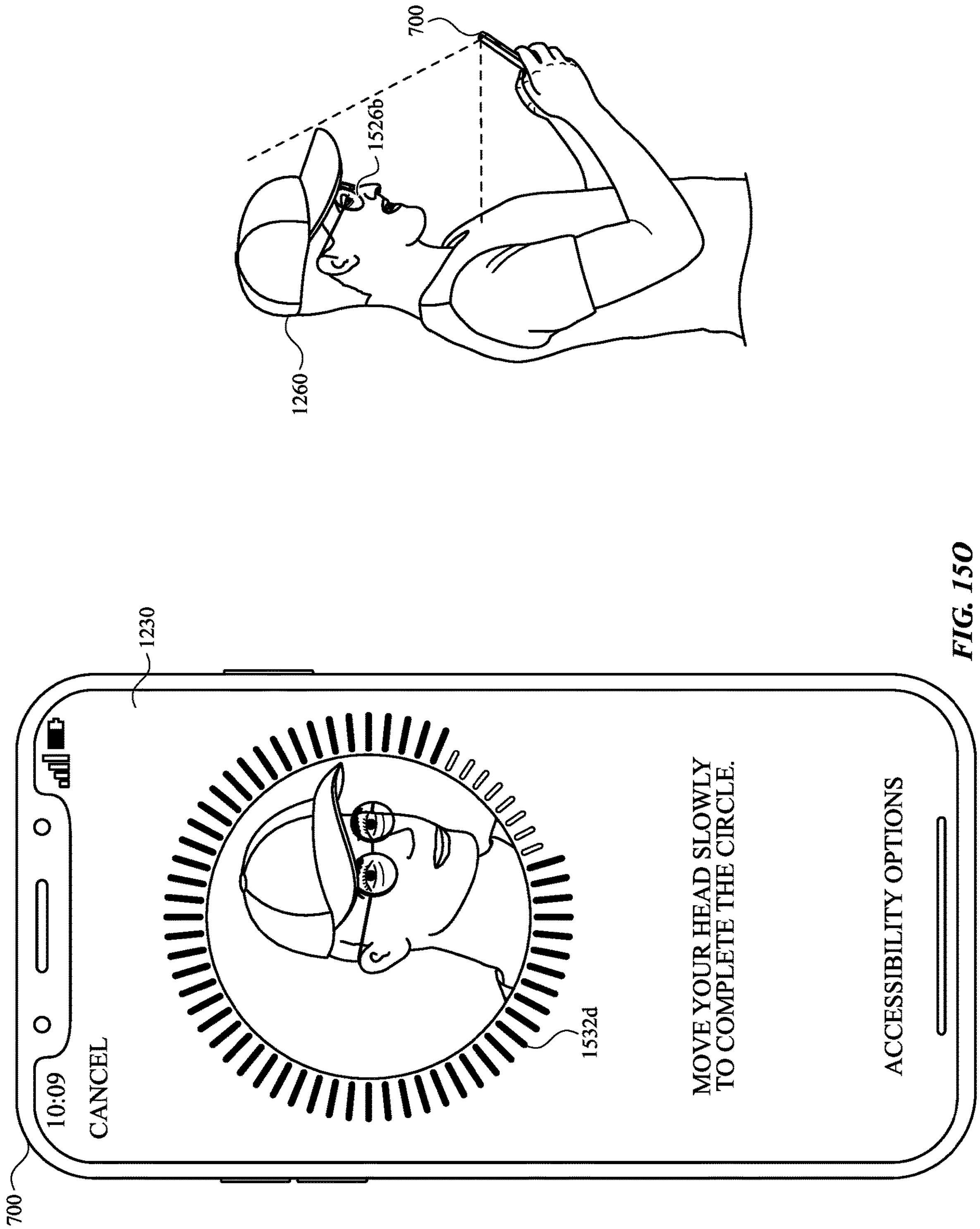
Figure 15P:
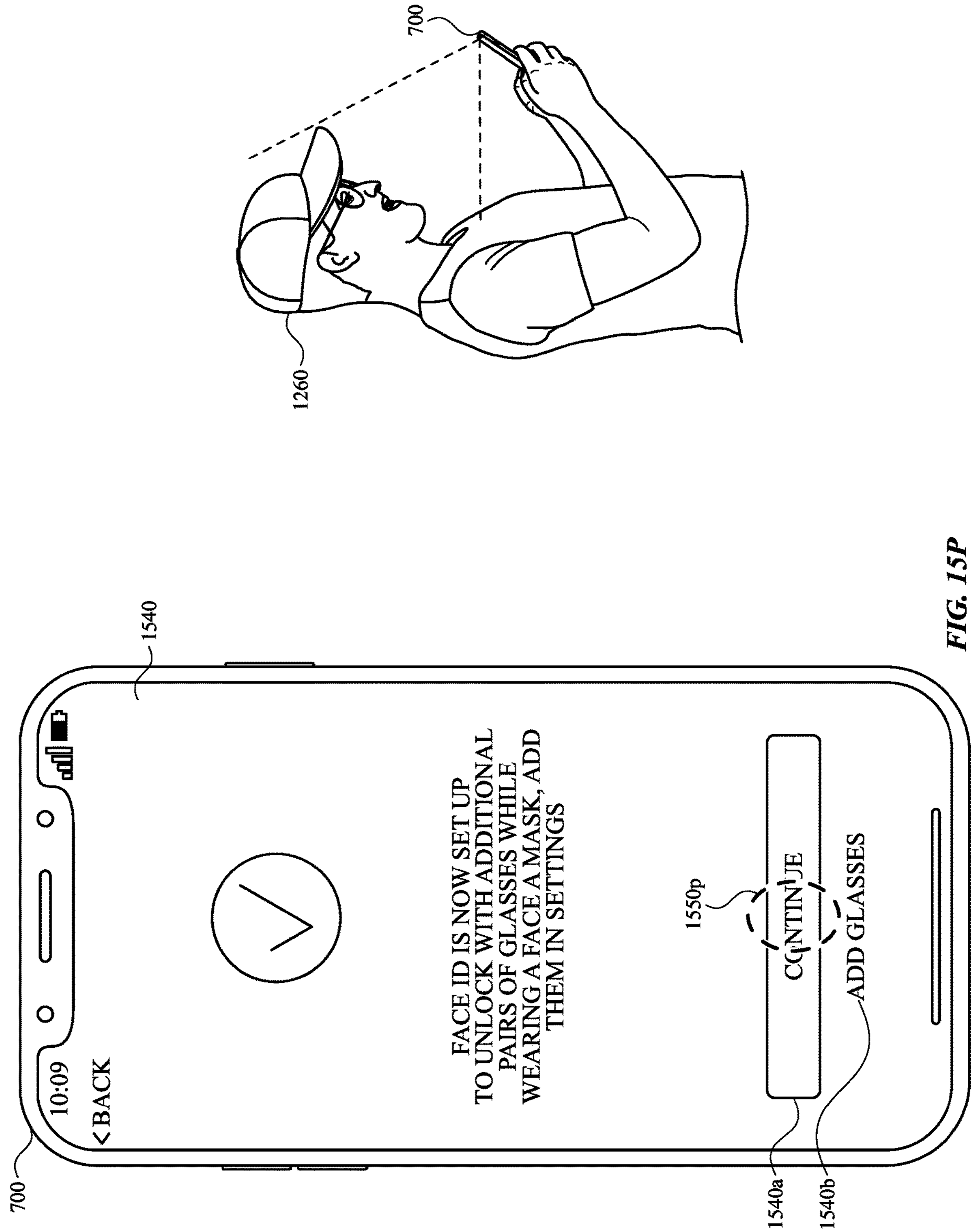
Figure 15Q:
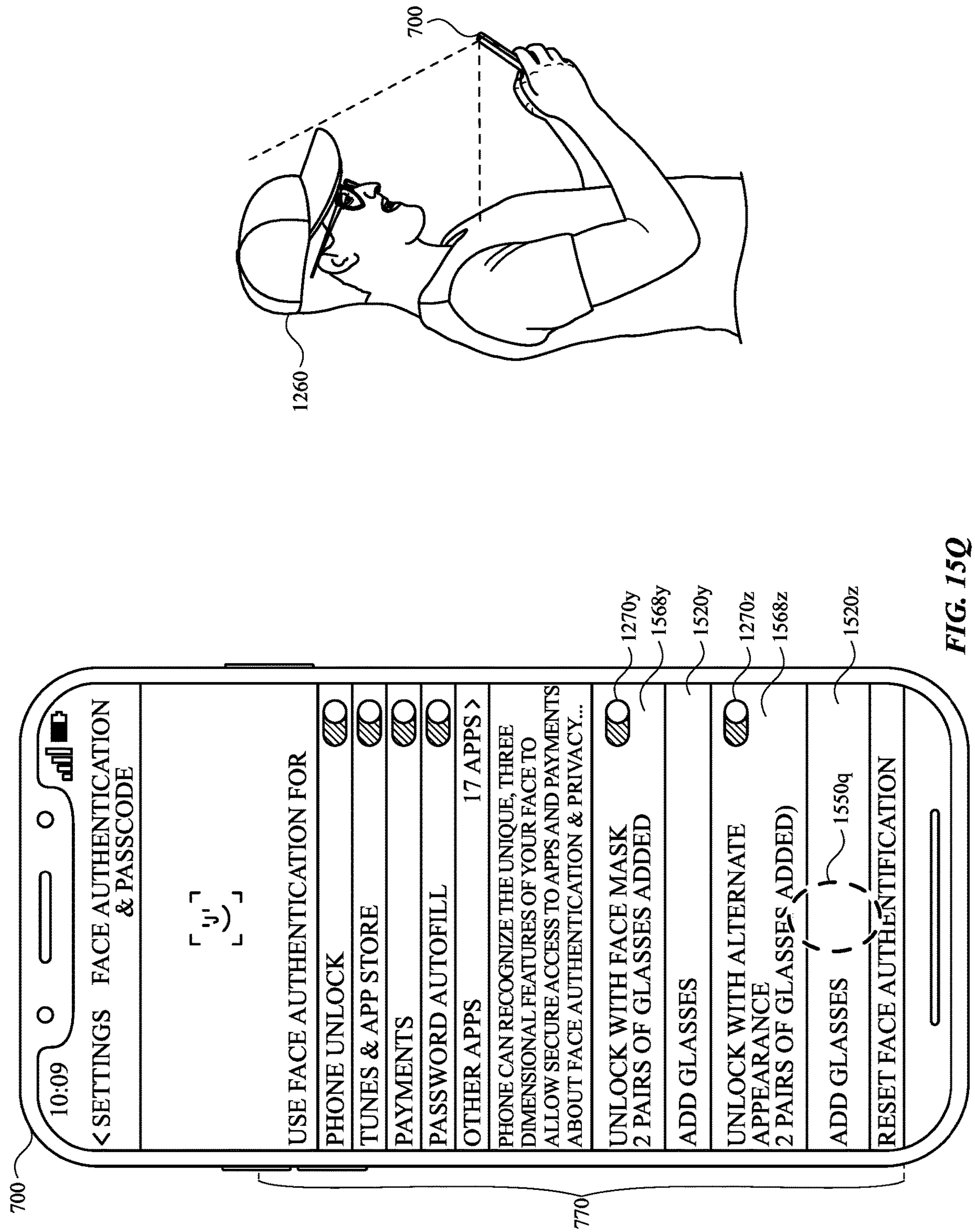
Figure 15R:
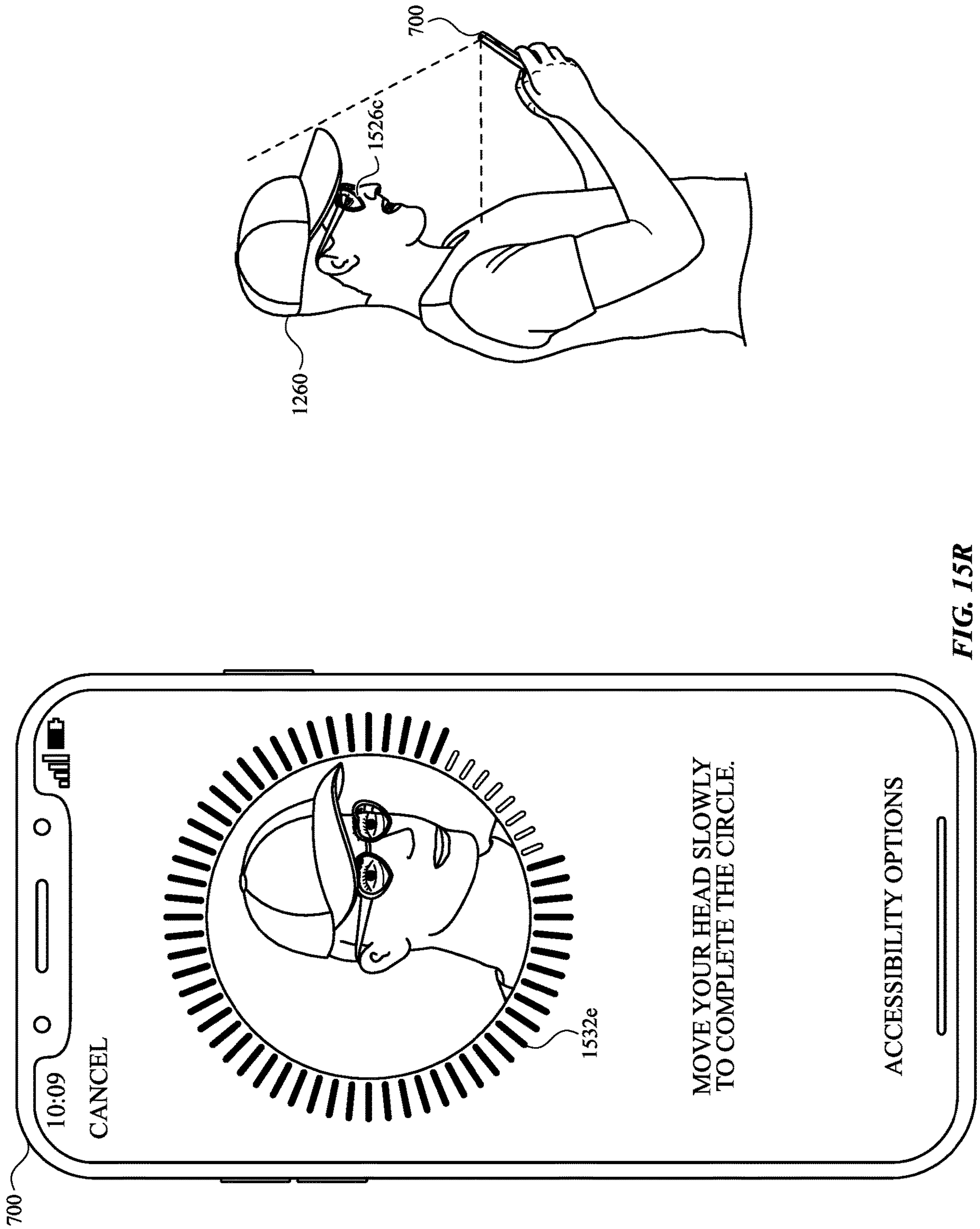
Figure 15S:
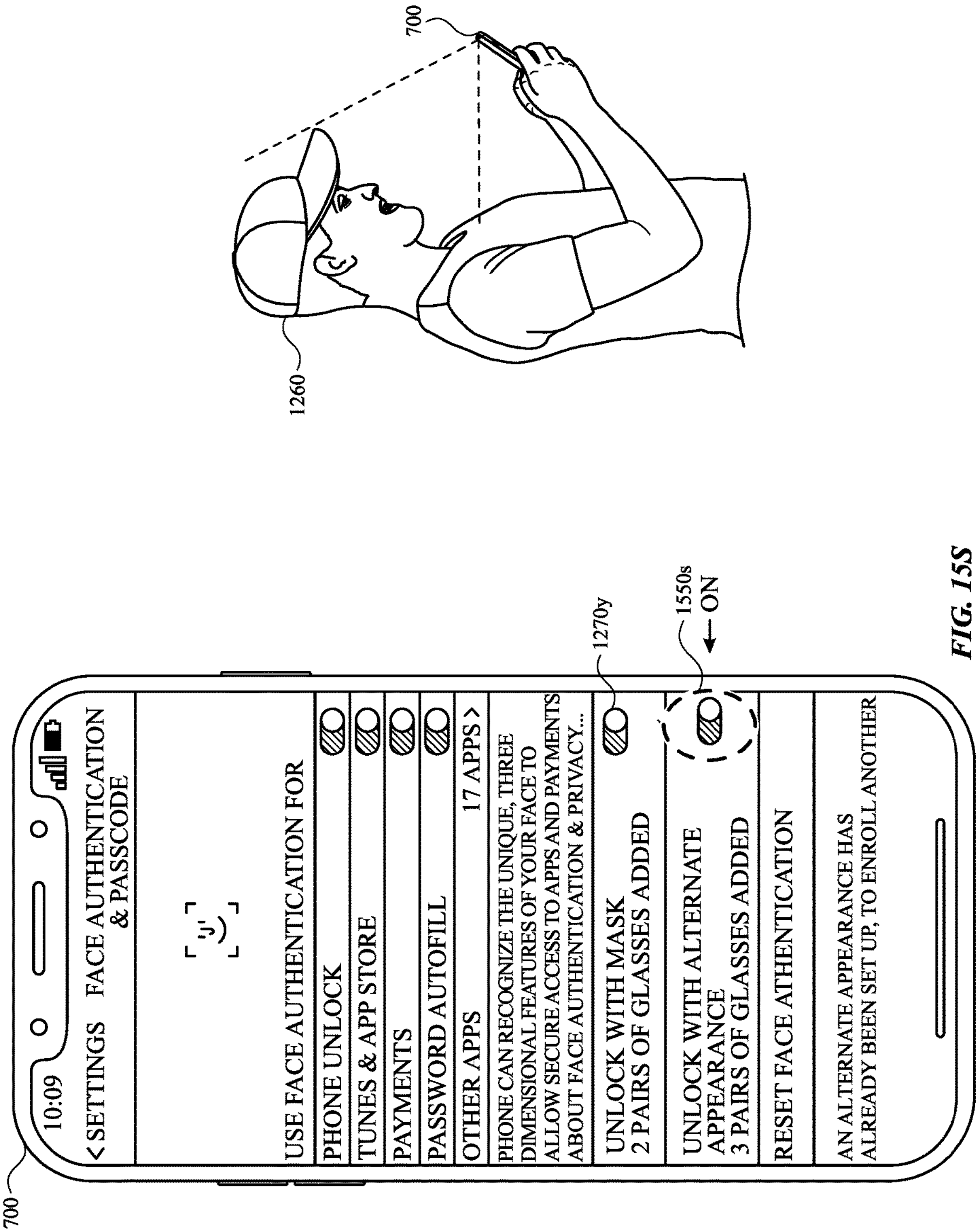
Figure 15T:
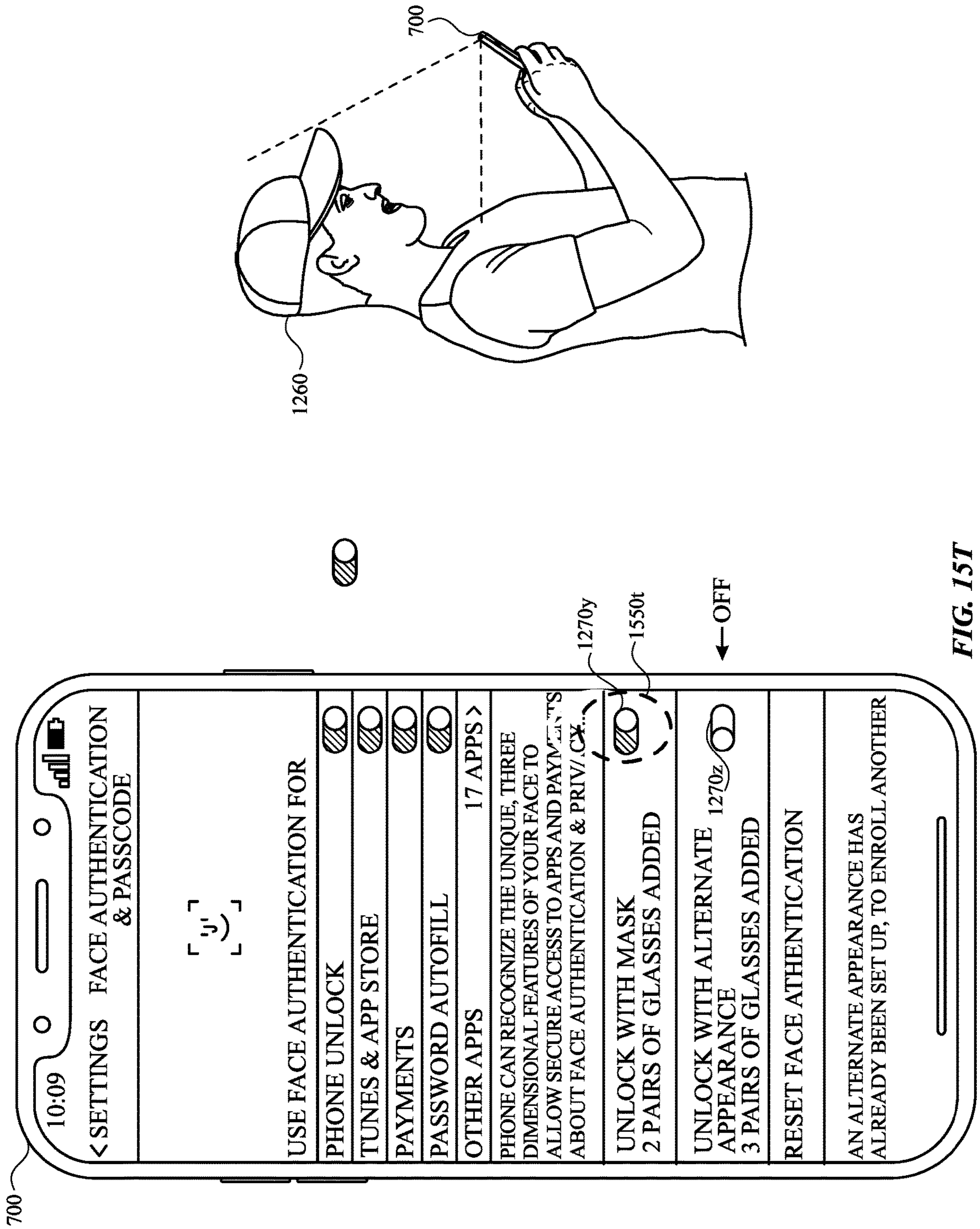
Figure 15U:
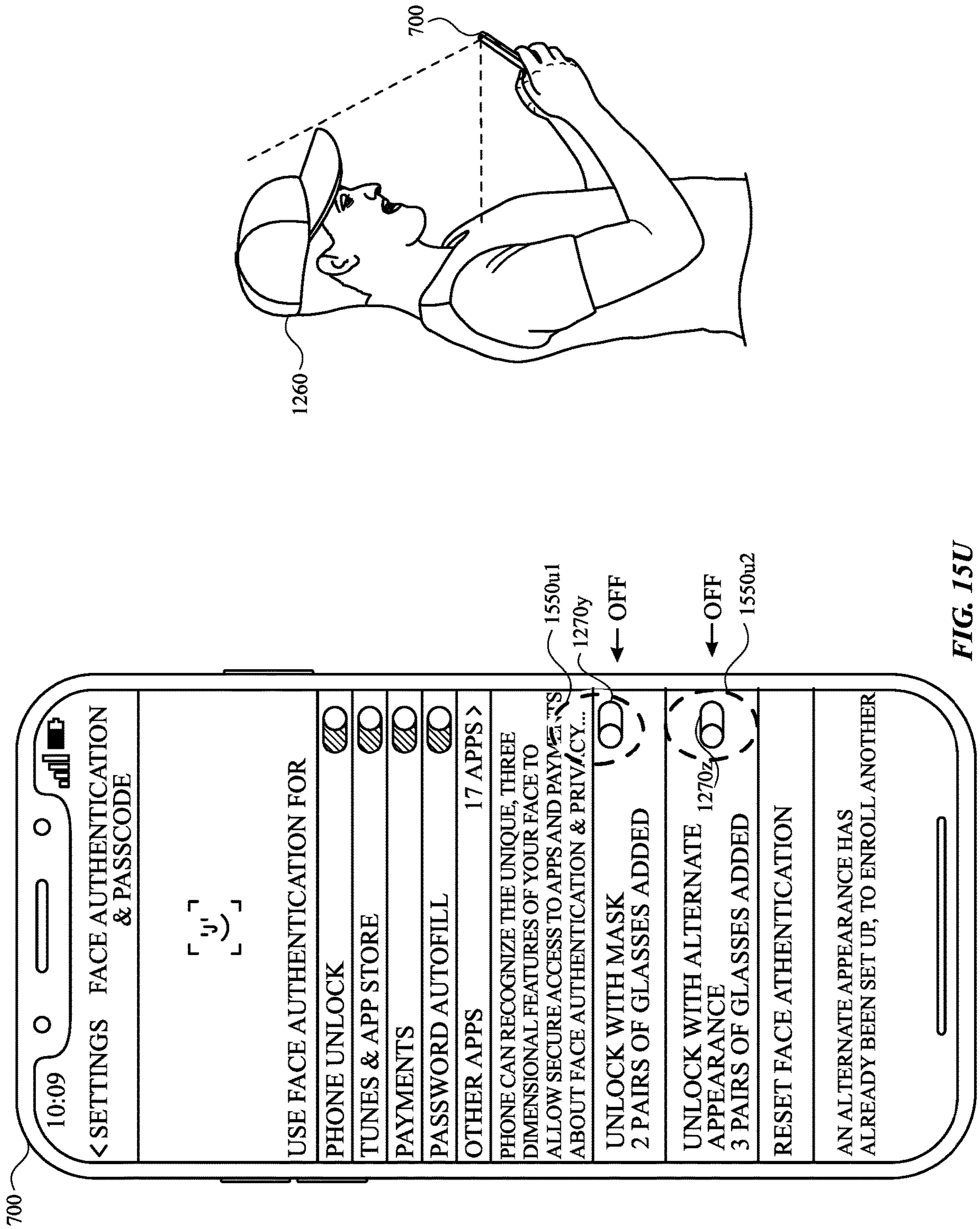
Figure 16:
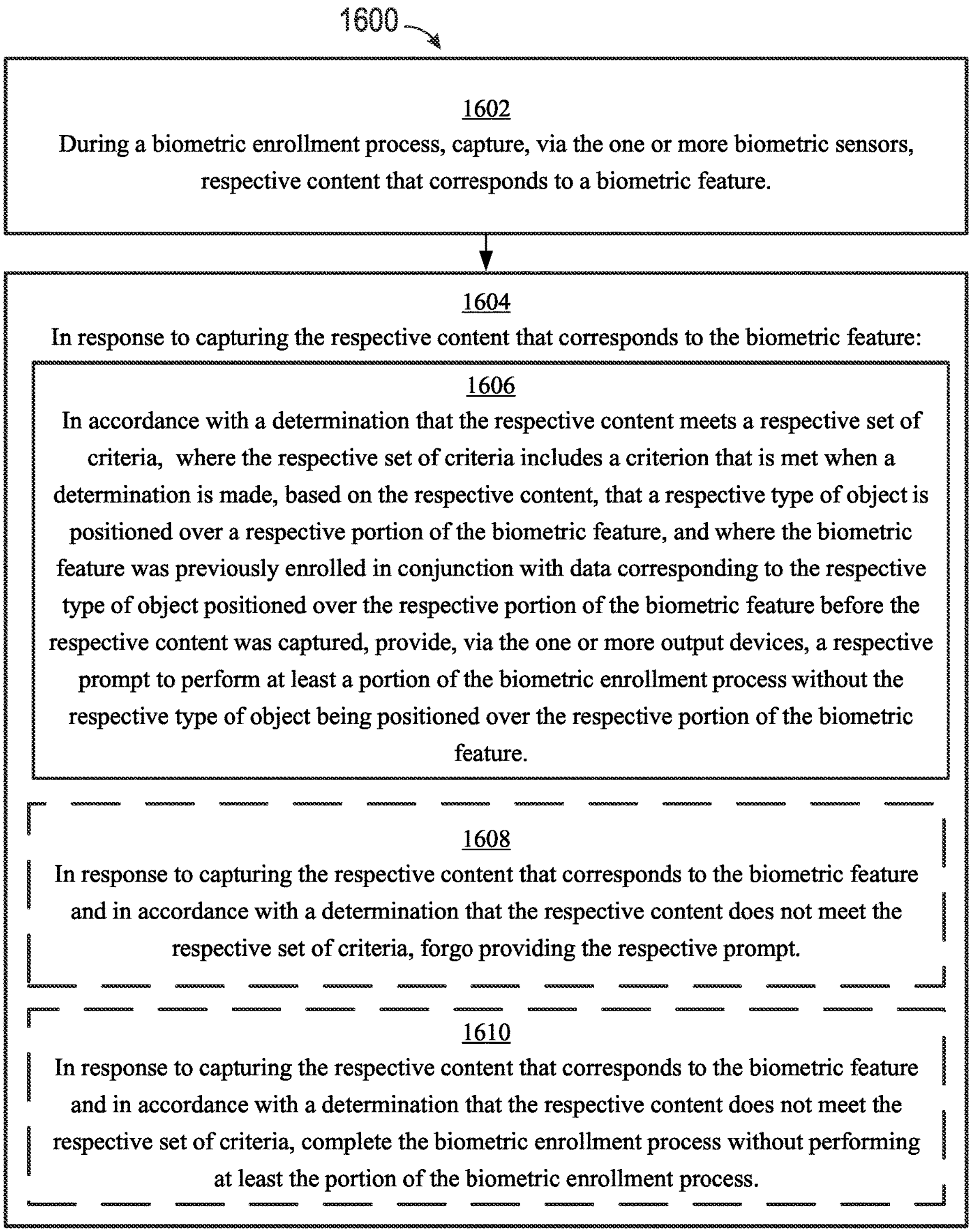
FIG. 16 is a flow diagram illustrating a method for controlling biometric authentication at a computer system in accordance with some embodiments.

FIGS. 12A-12AA and FIGS. 15A-15U illustrate exemplary user interfaces for providing and controlling biometric authentication at a computer system in accordance with some embodiments. FIGS. 13A-13B are a flow diagram illustrating a method for providing biometric authentication at a computer system in accordance with some embodiments. FIGS. 14A-14B are a flow diagram illustrating a method for controlling biometric authentication at a computer system in accordance with some embodiments. FIG. 16 is a flow diagram illustrating a method for controlling biometric authentication at a computer system in accordance with some embodiments. The user interfaces in FIGS. 12A-12AA and FIGS. 15A-15U are used to illustrate the processes described below, including the processes in FIGS. 13A-13B, FIGS. 14A-14B, and FIG. 16.

Figure 18A:
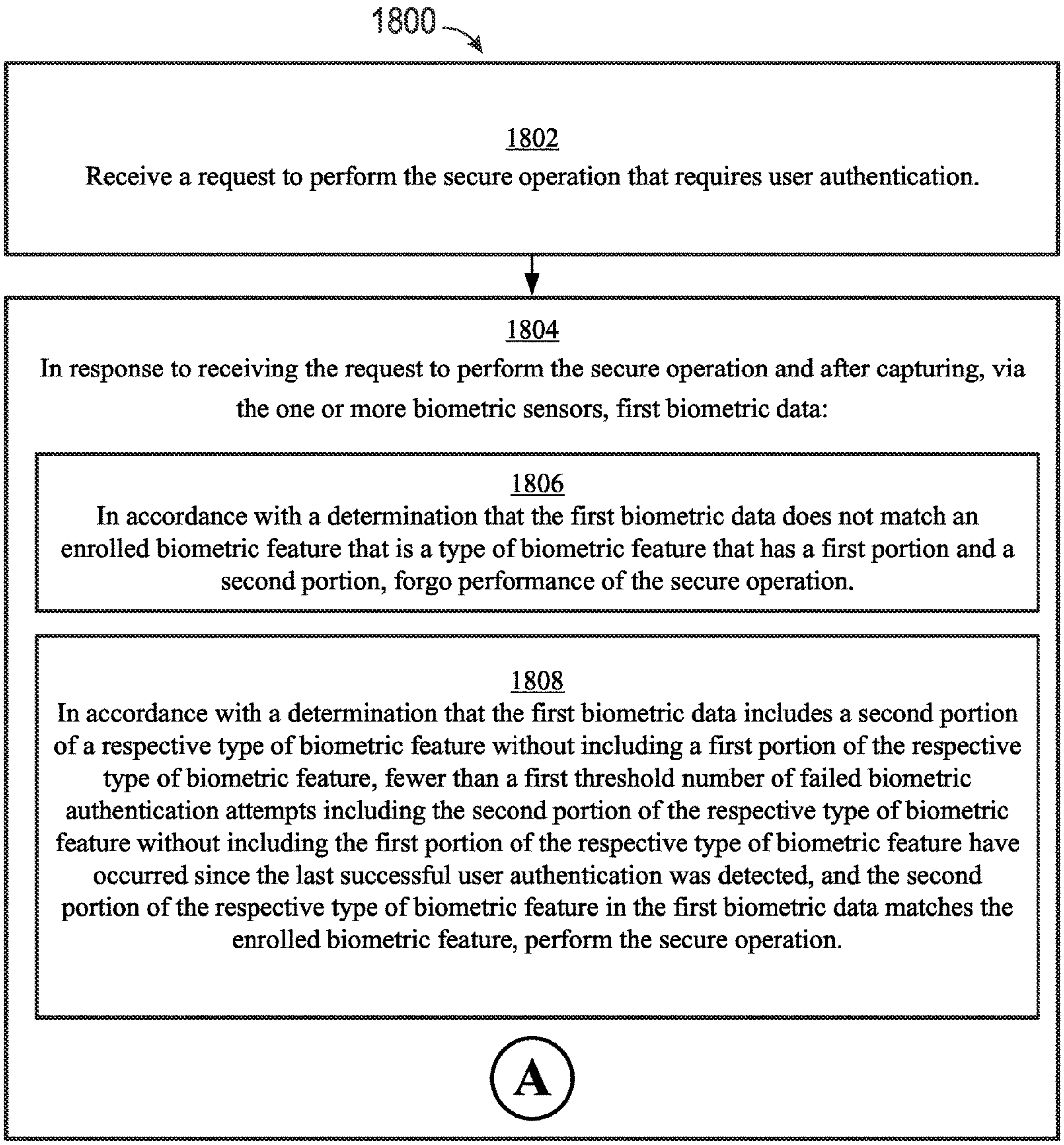

FIGS. 17A-17R illustrate exemplary user interfaces for managing the availability of different types of biometric authentication at a computer system in accordance with some embodiments. FIGS. 18A-18C are a flow diagram illustrating a method for managing the availability of different types of biometric authentication at a computer system in accordance with some embodiments. The user interfaces in FIGS. 17A-17R are used to illustrate the processes described below, including the processes in FIGS. 18A-18C.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises." and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a cathode-ray tube (CRT) display, display via a light emitting diode (LED) display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
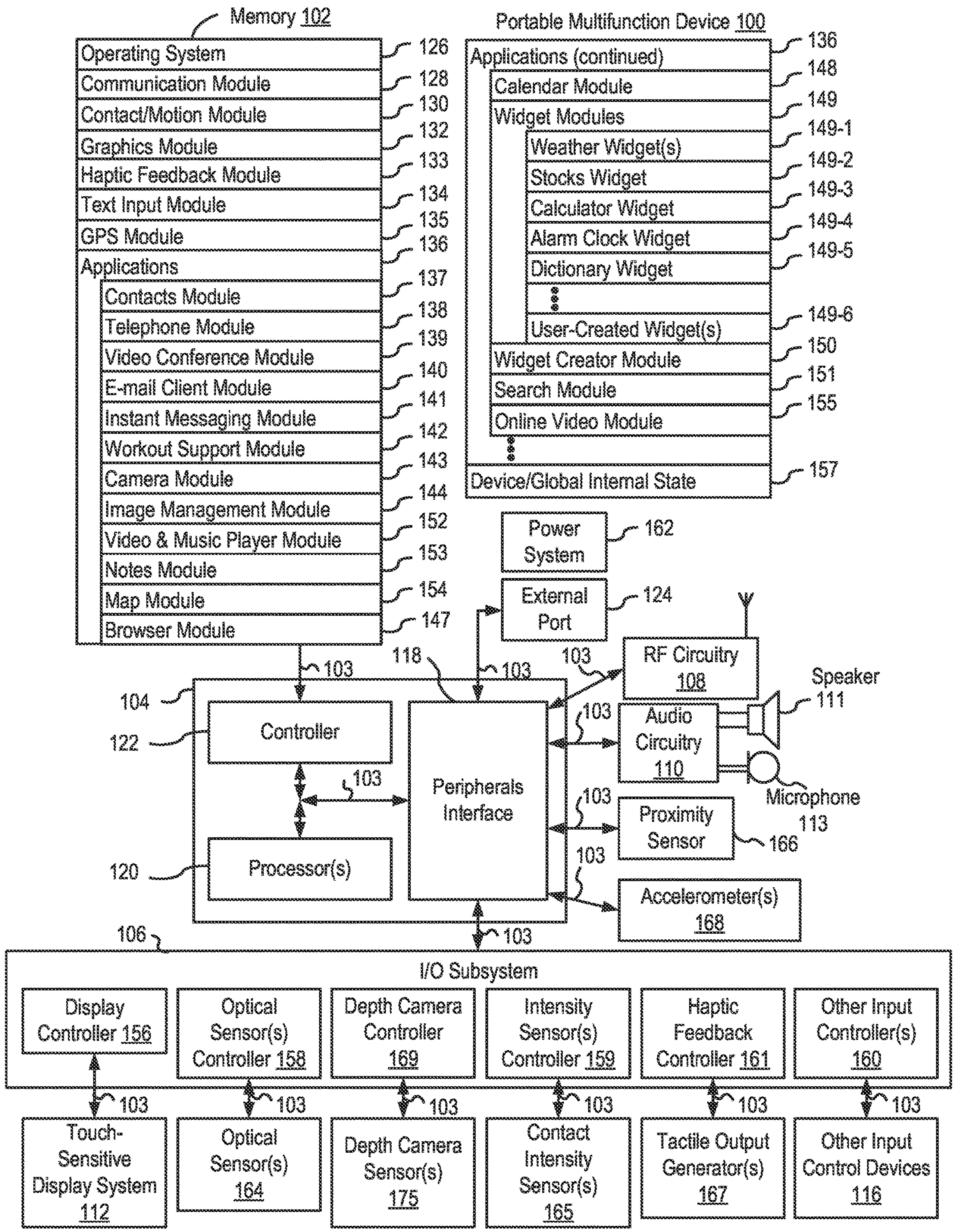
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 1100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to central processing unit (CPU) 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 10, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output" Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in 110 subsystem 106.Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a global positioning system (GPS) (or Globalnaya Navigazionnaya Sputnikovaya Sistema (GLONASS) or other global navigation system) receiver for obtaining information concerning the location and orientation (e.g., portrait or landscape) of device 100.

Figure 3:
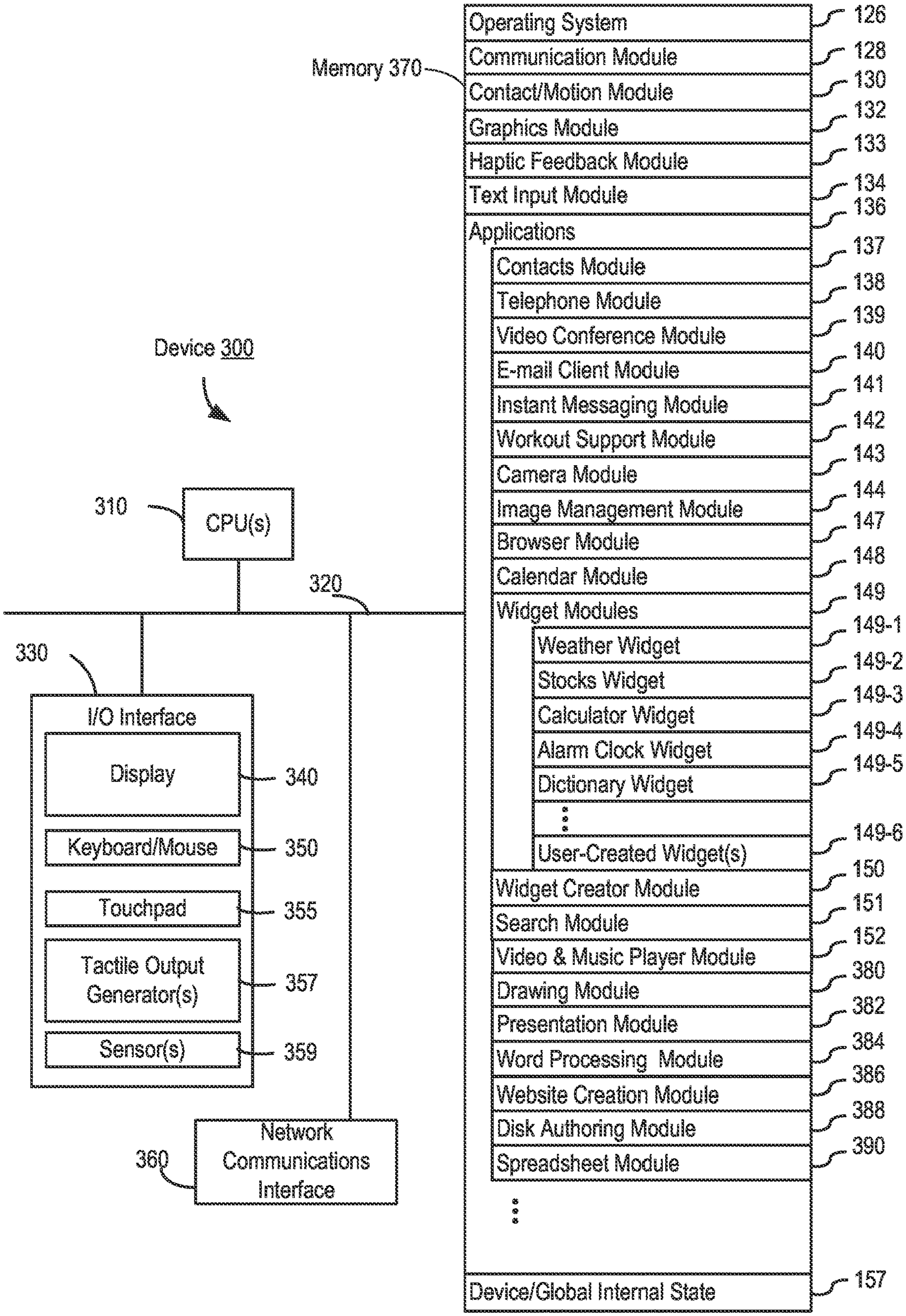
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, instant messaging (IM) module 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134. GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MPEG Audio Layer 3 (MP3) or Advanced Audio Coding (AAC) files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067. "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 10, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
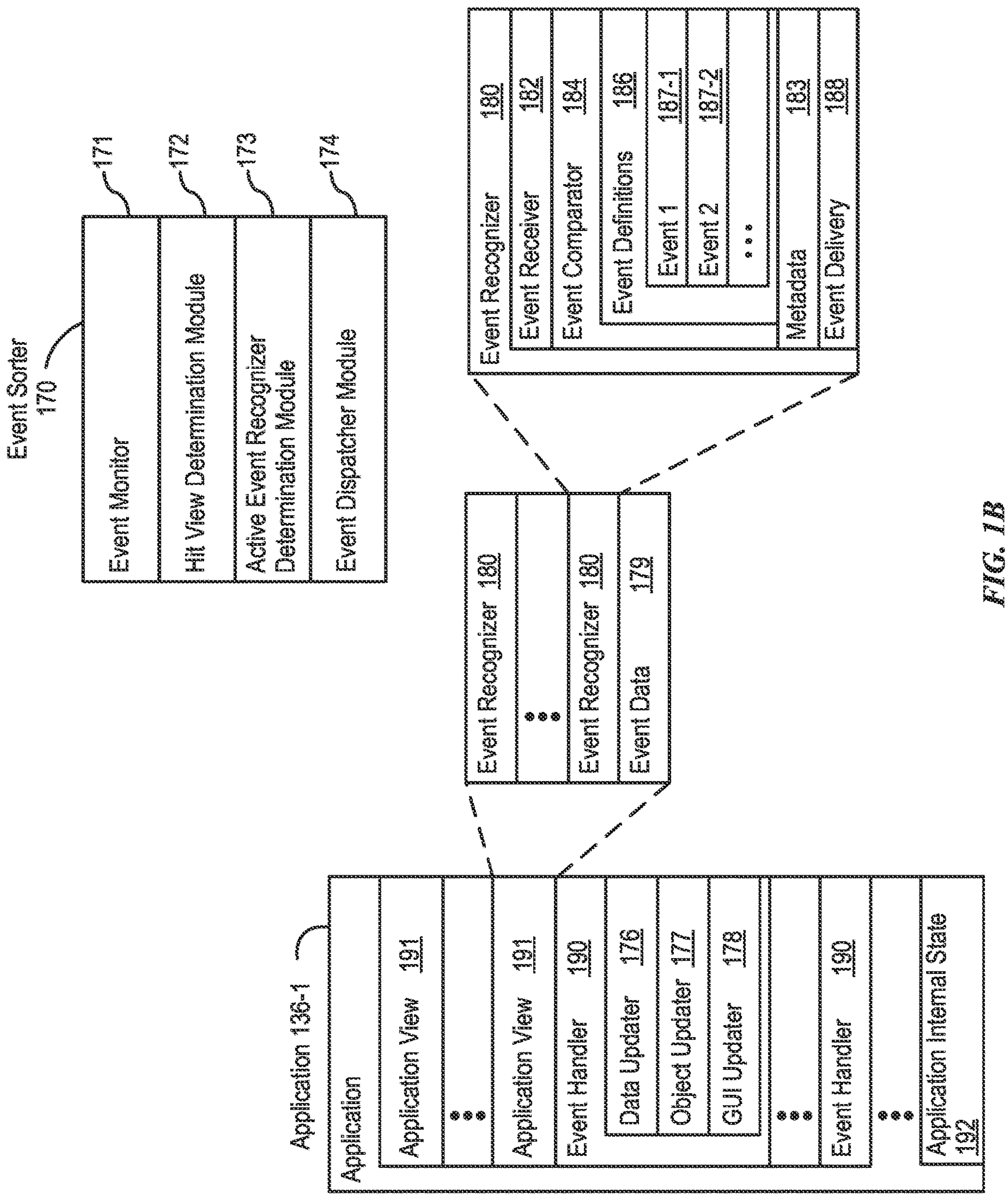
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, Graphical User Interface (GUI) updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
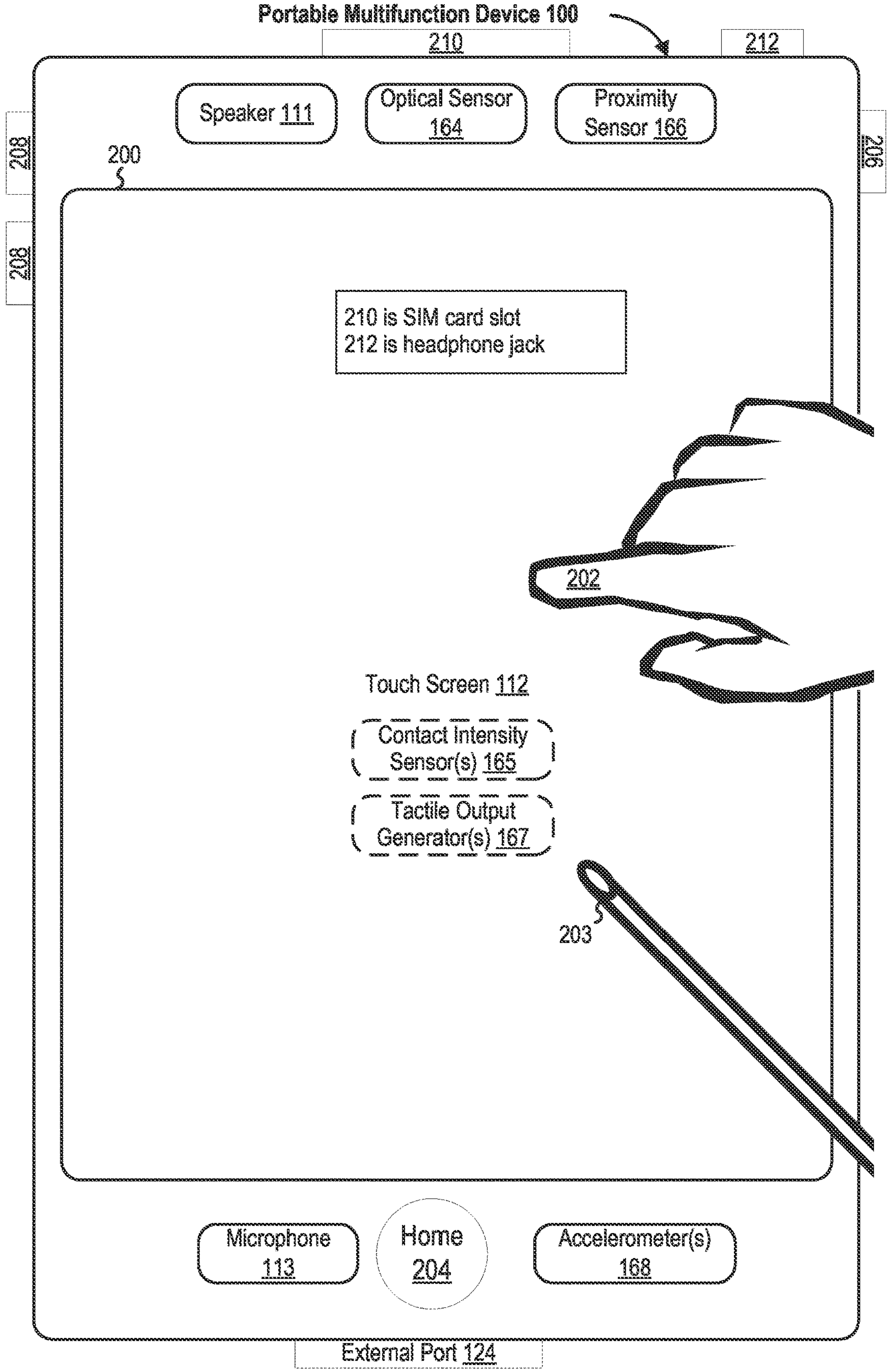
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as dynamic random access memory (DRAM), static random access memory (SRAM), double data rate random access memory (DDR RAM), or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
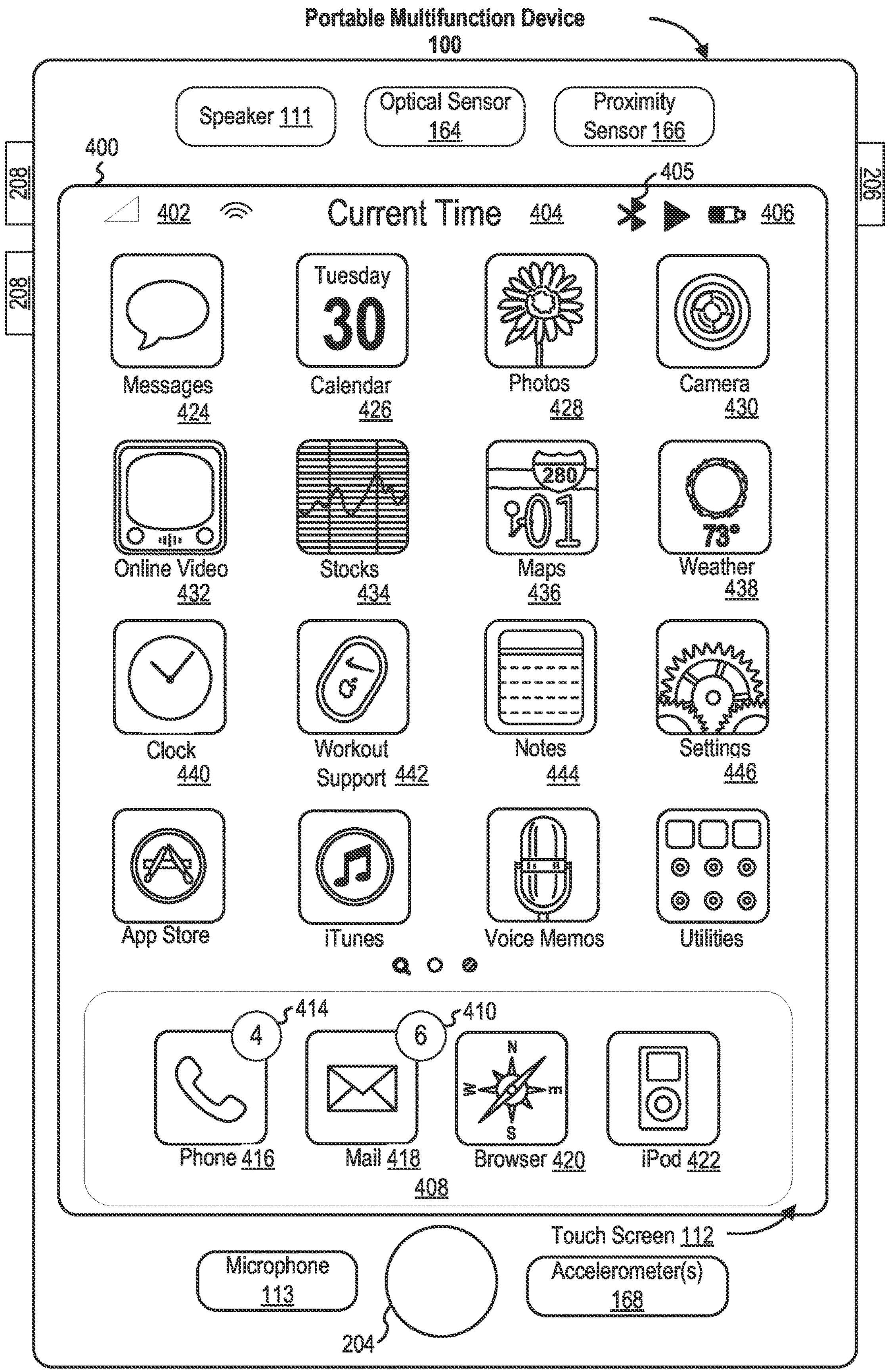
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404,
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather,"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
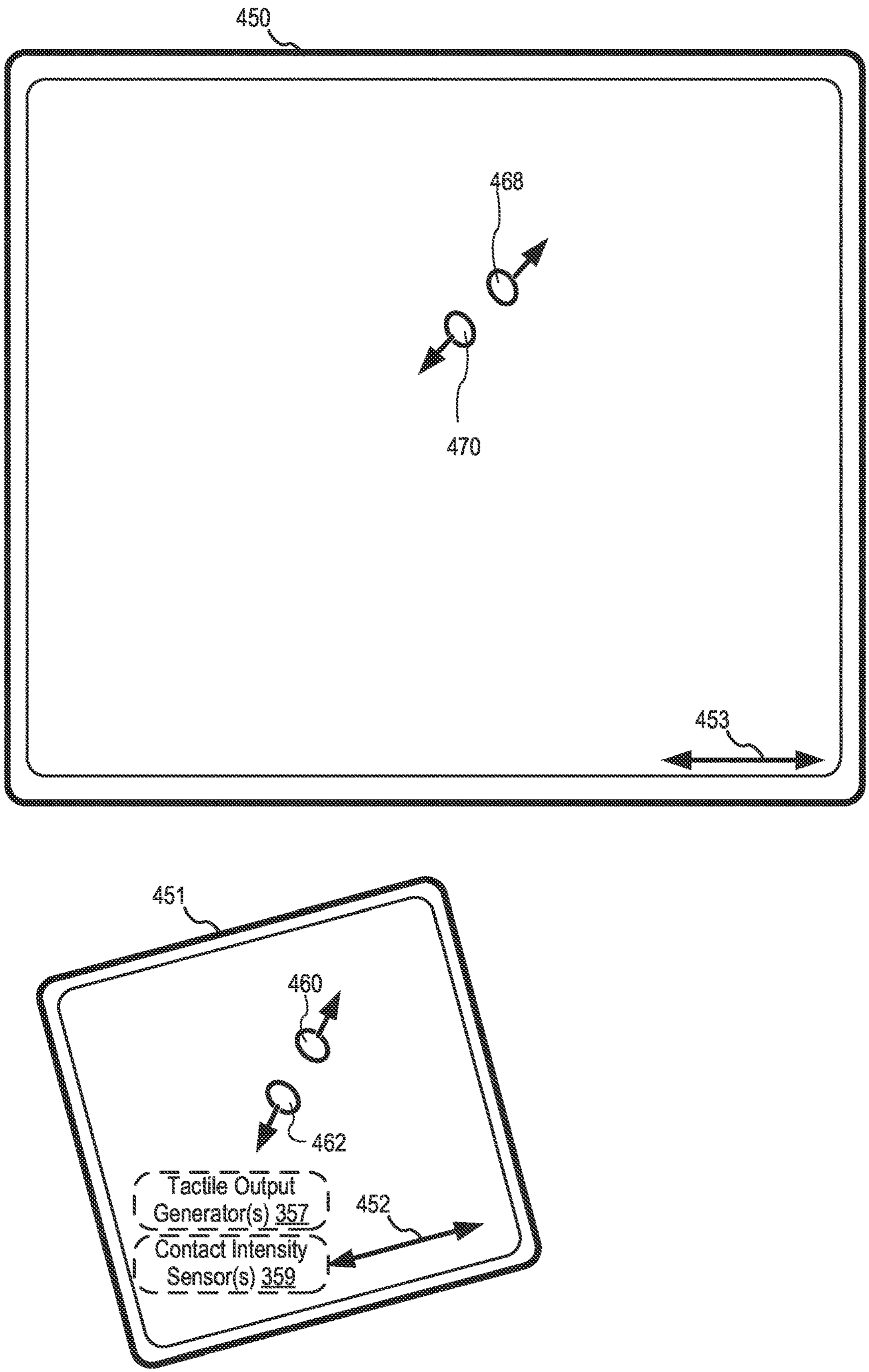
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
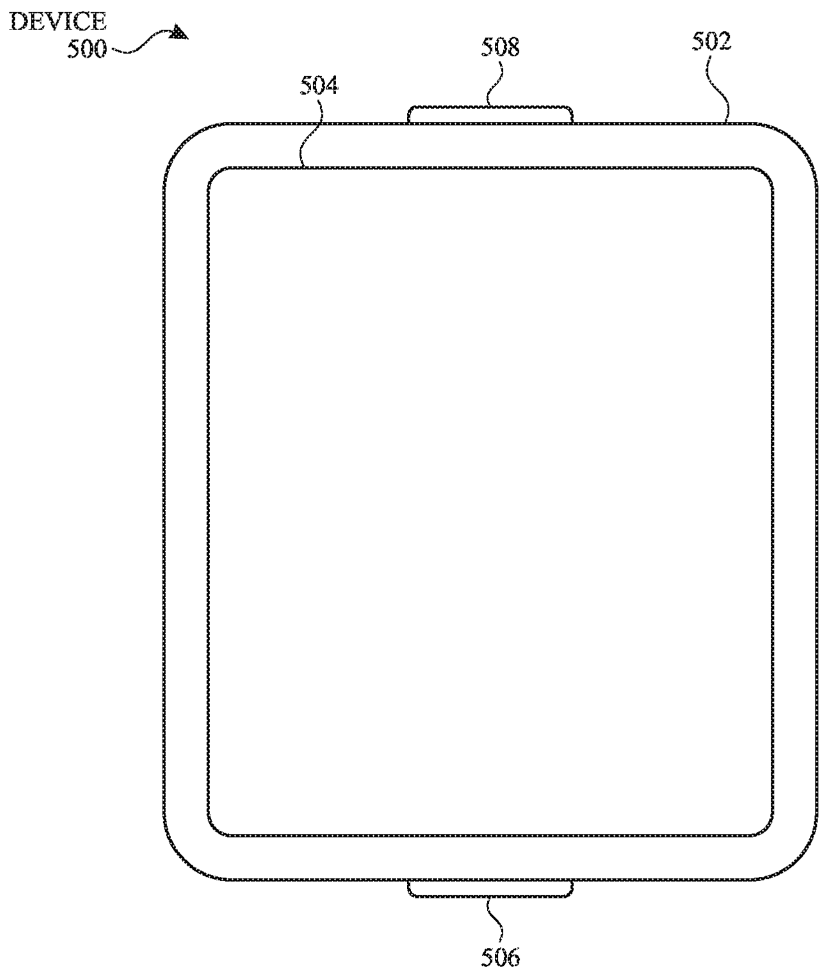
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
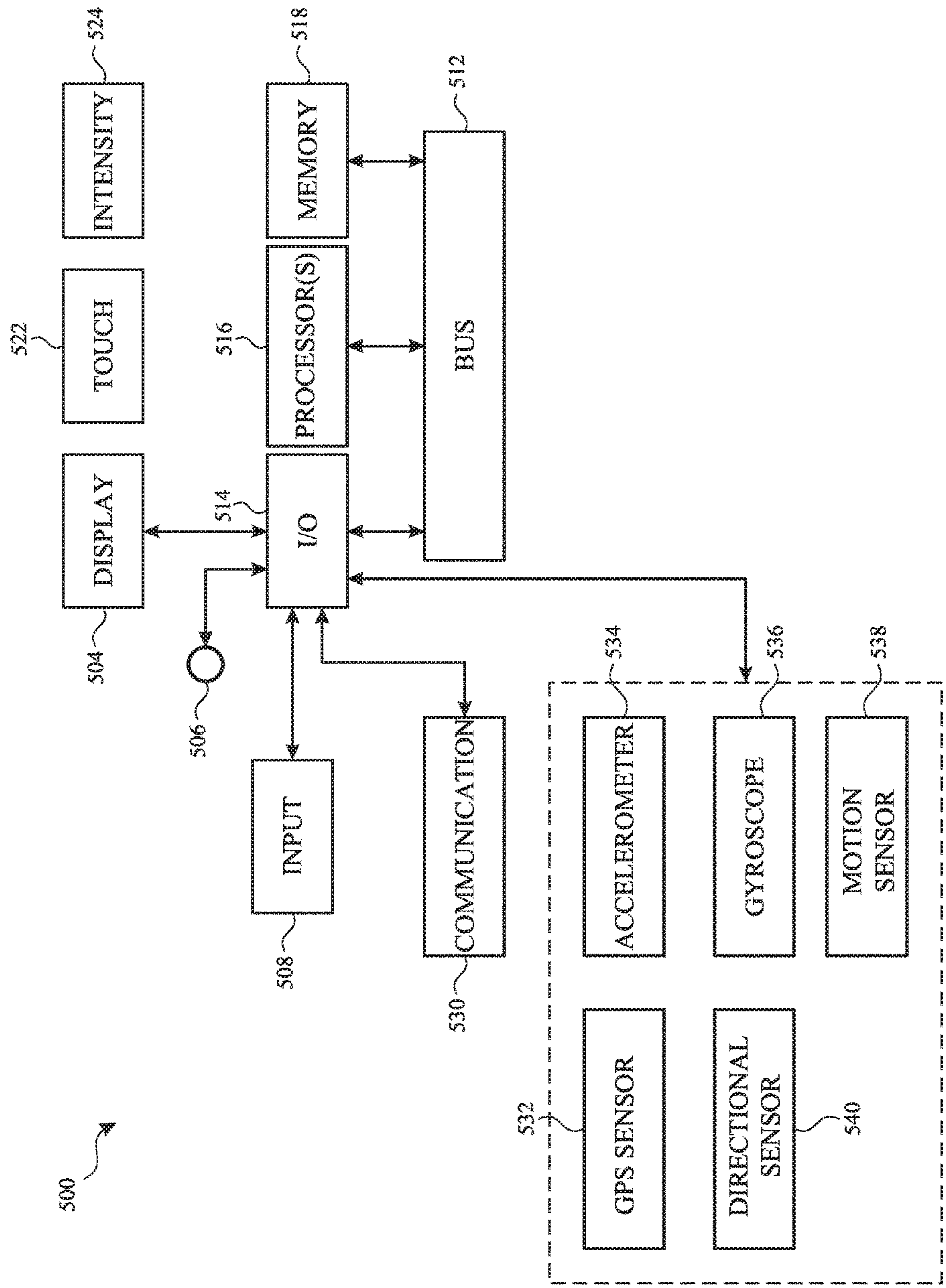
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some embodiments.

Input mechanism 508 is, optionally, a microphone, in some embodiments. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800 (FIGS. 8A-8E), 900 (FIG. 9), 1000 (FIGS. 10A-10B), 1100 (FIGS. 11A-11B), 1300 (FIGS. 13A-13B, 1400 (FIGS. 14A-14B), 1600 (FIG. 16), and 1800 (FIGS. 18A-18C). A computer-readable storage medium can be any medium that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on Compact Disk (CD), digital video disk (DVD), or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, atop 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
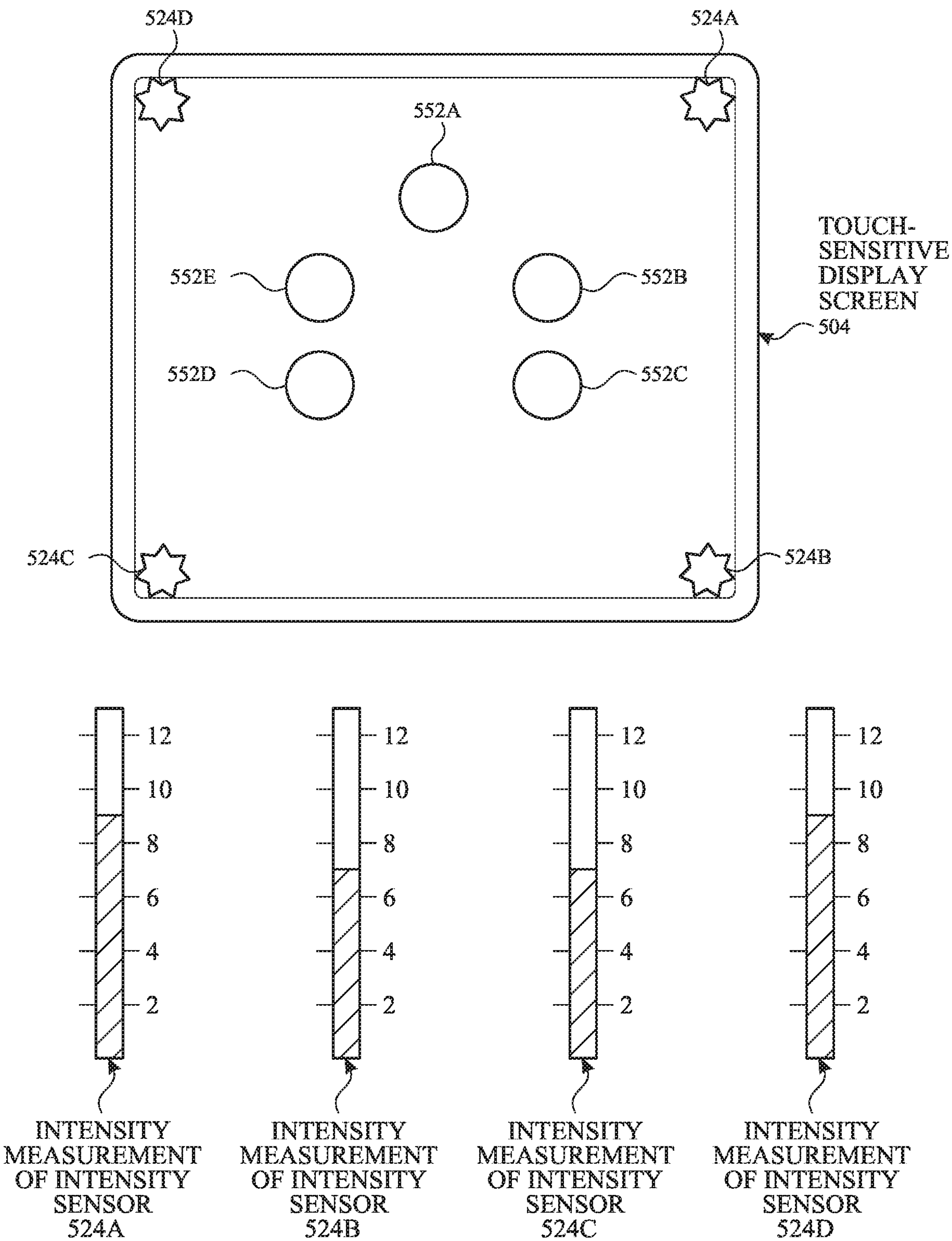
FIGS. 5C-5D illustrate exemplary components of a personal electronic device having a touch-sensitive display and intensity sensors in accordance with some embodiments.
Figure 5D:
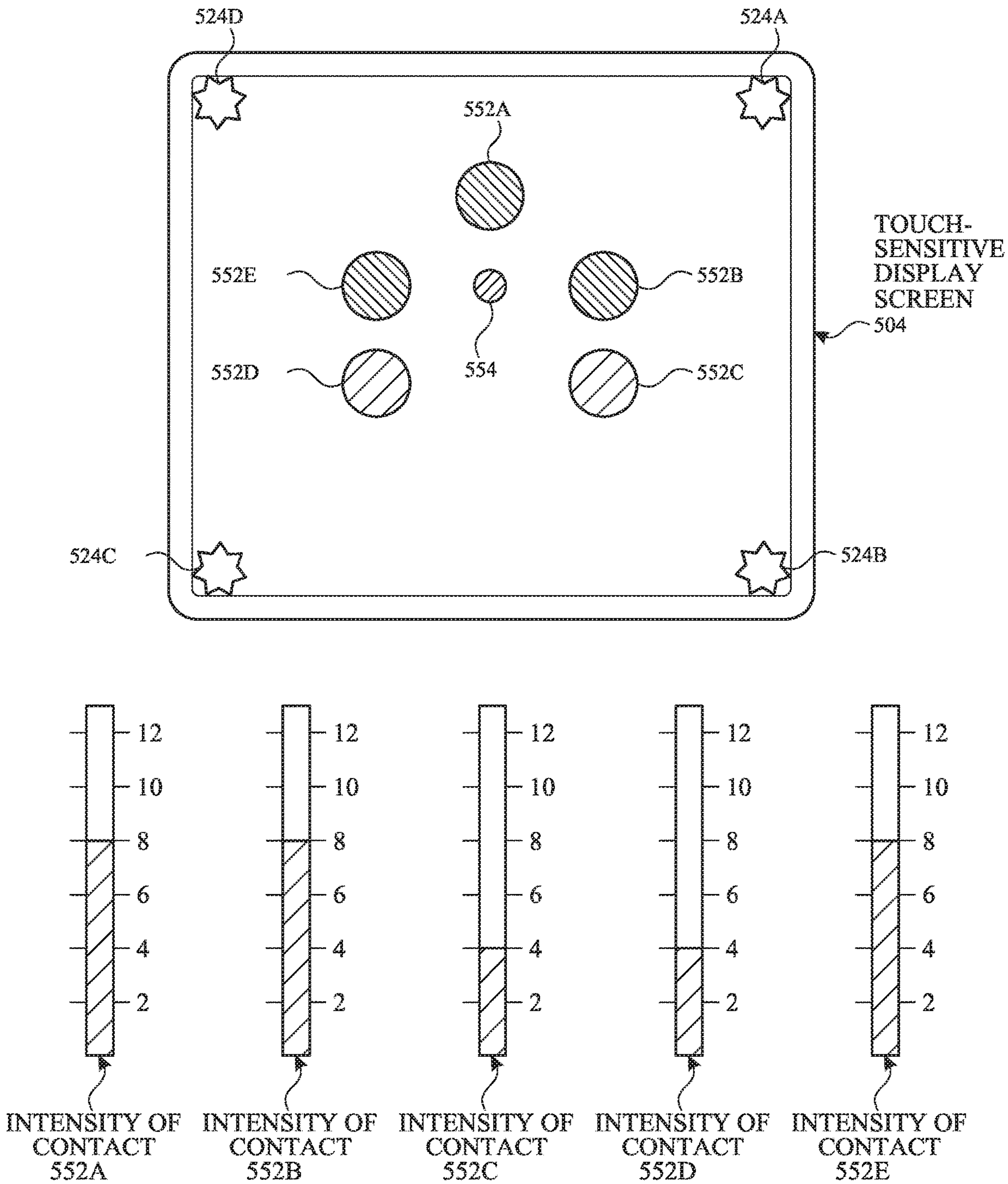

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
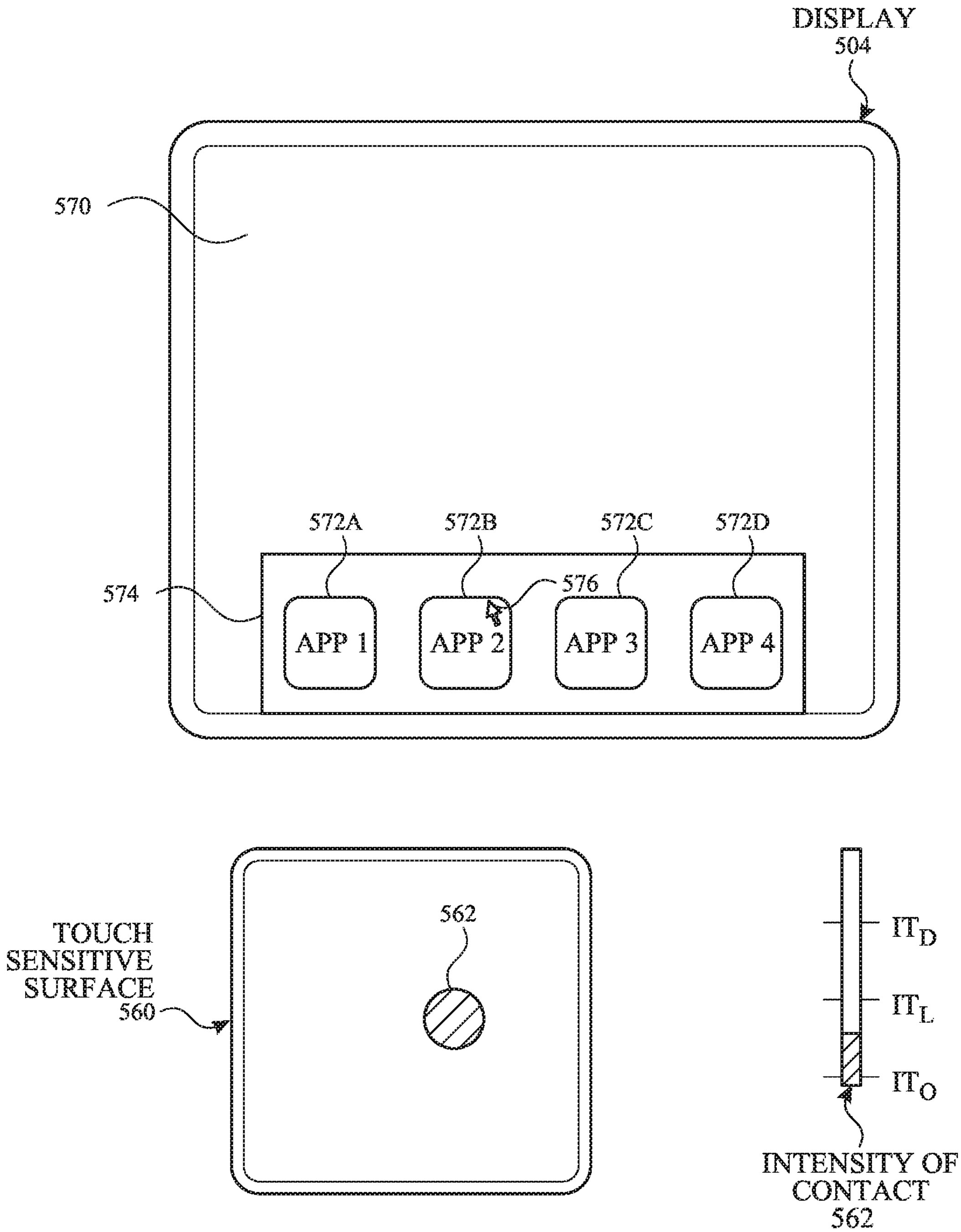
FIGS. 5E-5H illustrate exemplary components and user interfaces of a personal electronic device in accordance with some embodiments.
Figure 5F:
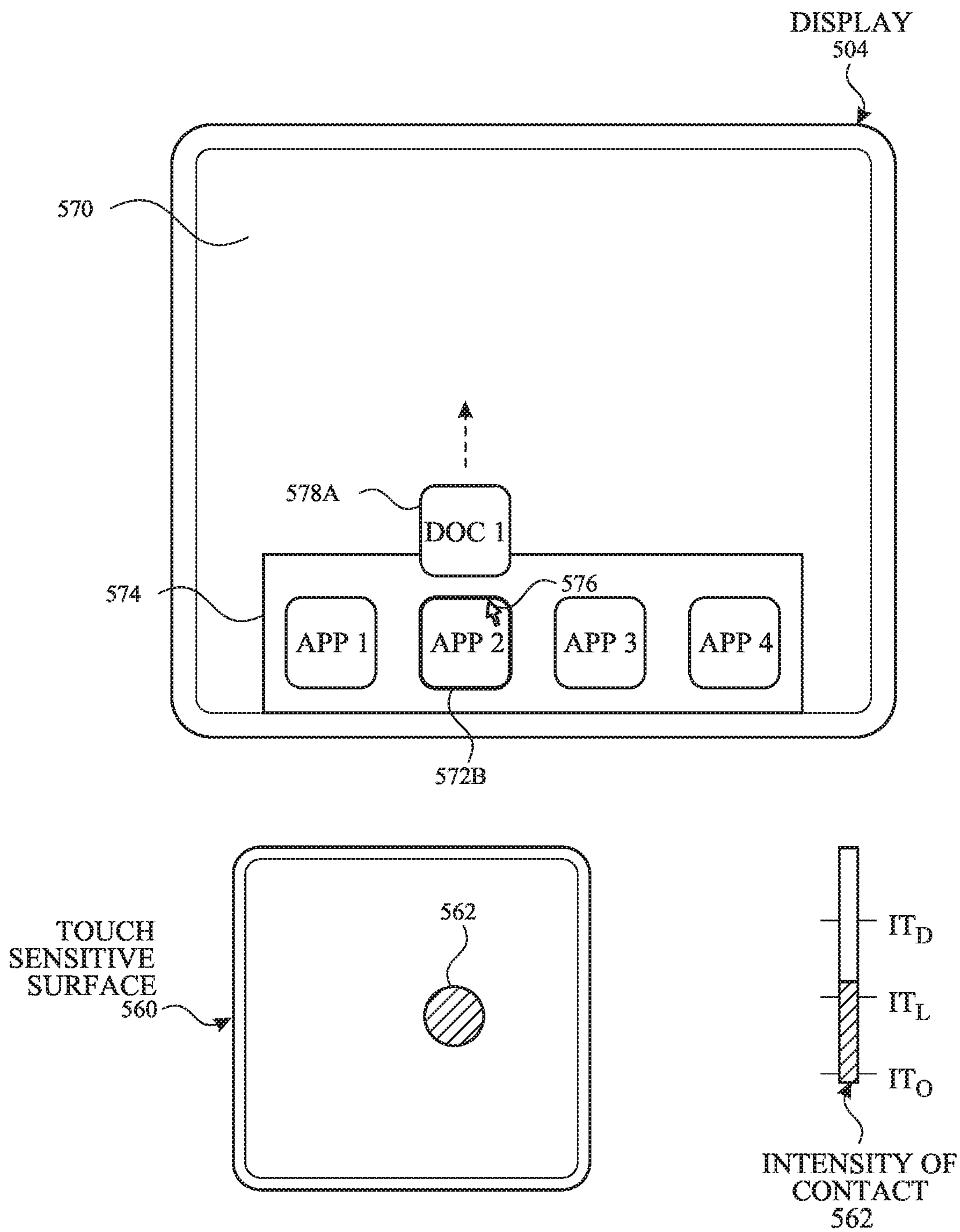
Figure 5G:
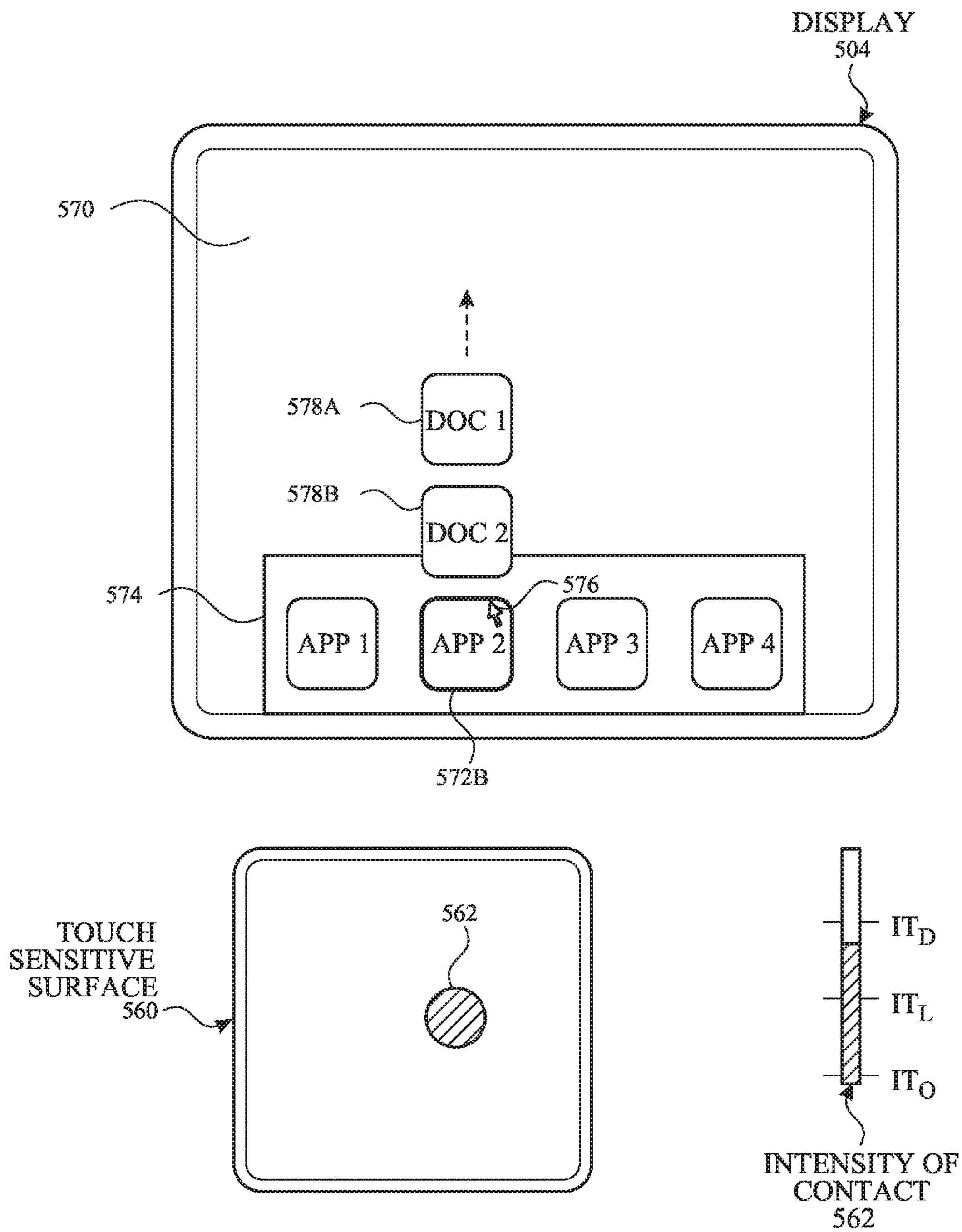
Figure 5H:
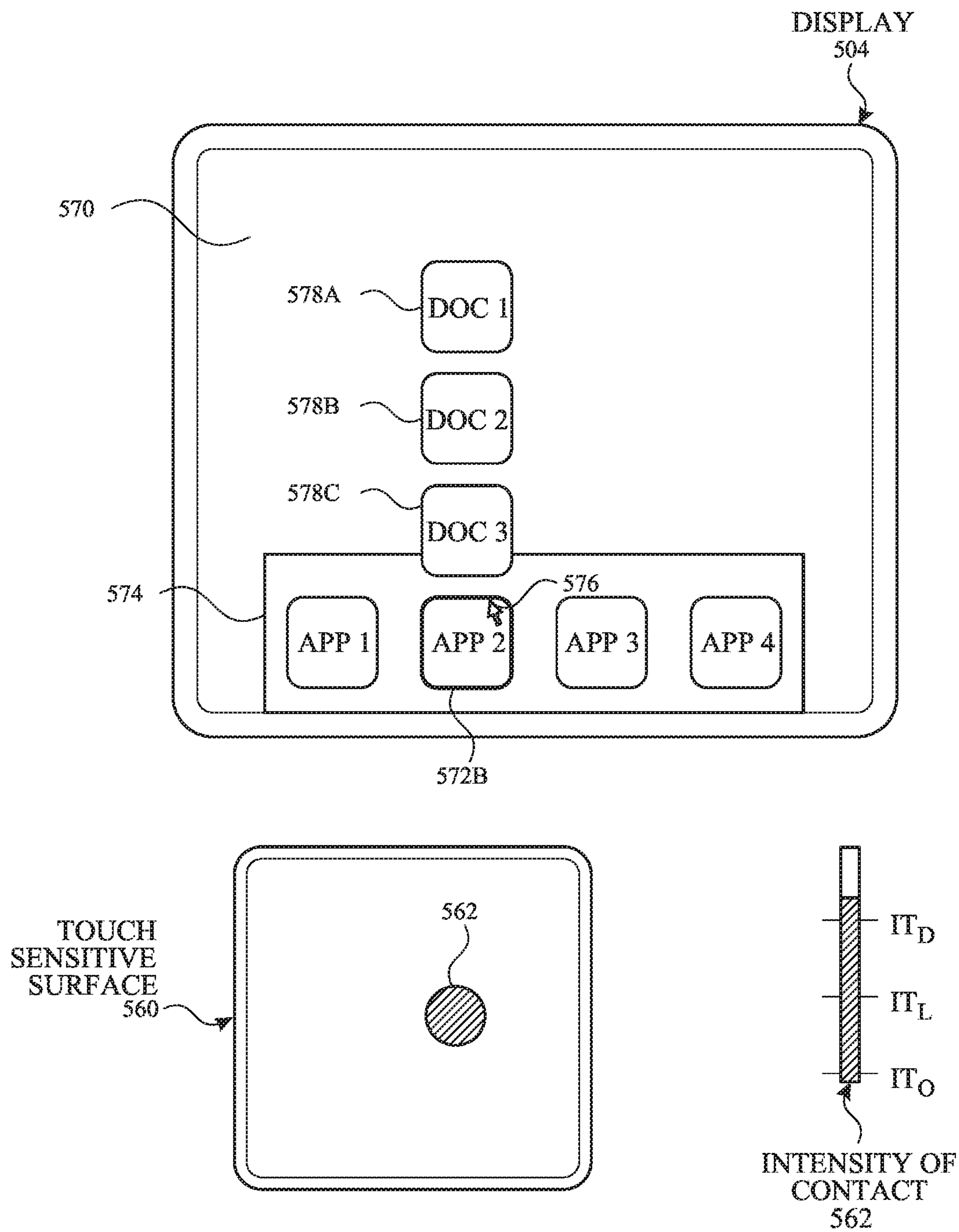

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 56) while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 6:
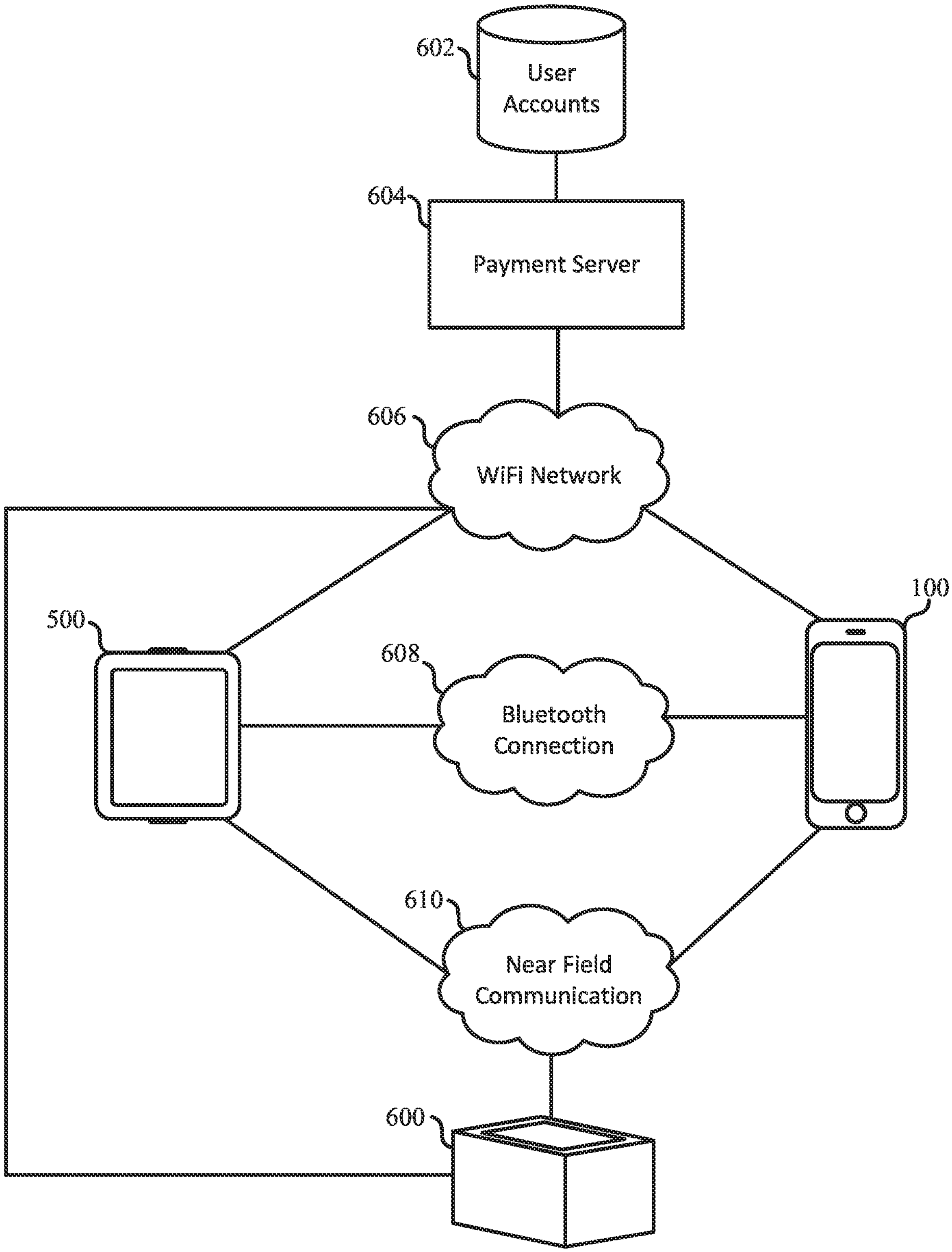
FIG. 6 illustrates exemplary devices connected via one or more communication channels in accordance with some embodiments.

FIG. 6 illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some embodiments, payment account information includes include an image, such as a picture of a payment card (e.g., taken by the device and/or received at the device). In some embodiments, the electronic devices receive user input, including at least some payment account information (e.g., receiving user-entered credit, debit, account, or gift card number and expiration date). In some embodiments, the electronic devices detect at least some payment account information from an image (e.g., of a payment card captured by a camera sensor of the device). In some embodiments, the electronic devices receive at least some payment account information from another device (e.g., another user device or a server). In some embodiments, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some embodiments, after a user initiates such process, the electronic device transmits information for the payment account to a transaction-coordination server, which then communicates with a server operated by a payment network for the account (e.g., a payment server) to ensure validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 608 (e.g., which includes a traditional Bluetooth connection or a Bluetooth Low Energy connection) or using a Wi-Fi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some embodiments, an electronic device (e.g., 100, 300, 500) communicates with payment terminal 600 using an NFC channel 610. In some embodiments, payment terminal 600 communicates with an electronic device (e.g., 100, 300, 500) using a peer-to-peer NFC mode. The electronic device (e.g., 100, 300, 500) is optionally configured to transmit a signal to payment terminal 600 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 600. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, the generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some embodiments, if a communication channel (e.g., an NFC communication channel) with another device (e.g., payment terminal 600) is established within a defined time period from detection of the input, the secure element releases payment information to be transmitted to the other device (e.g., payment terminal 600). In some embodiments, the secure element is a hardware component that controls release of secure information. In some embodiments, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some embodiments, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some embodiments, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some embodiments, a payment is denied when provided payment information is not consistent (e.g., an expiration date does not correspond to a credit, debit, or gift card number) or when no account includes payment information matching that from the POS communication.

In some embodiments, data for the user account further identifies one or more restrictions (e.g., credit limits), current or previous balances; previous transaction dates, locations and/or amounts; account status (e.g., active or frozen), and/or authorization instructions. In some embodiments, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS payment terminal 600 with an indication as to whether a proposed purchase is authorized or denied. In some embodiments, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without the involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations optionally includes navigation between user interfaces, activation or deactivation of a predefined set of functions, and activation or deactivation of certain applications. The locked state can be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state optionally responds to a limited set of user inputs, including input that corresponds to an attempt to transition the device to the unlocked state or input that corresponds to powering the device off.

In some embodiments, a secure element (e.g., 115) is a hardware component (e.g., a secure microcontroller chip) configured to securely store data or an algorithm such that the securely stored data is not accessible by the device without proper authentication information from a user of the device. Keeping the securely stored data in a secure element that is separate from other storage on the device prevents access to the securely stored data even if other storage locations on the device are compromised (e.g., by malicious code or other attempts to compromise information stored on the device). In some embodiments, the secure element provides (or releases) payment information (e.g., an account number and/or a transaction-specific dynamic security code). In some embodiments, the secure element provides (or releases) the payment information in response to the device receiving authorization, such as a user authentication (e.g., fingerprint authentication; passcode authentication, detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Attention is now directed towards embodiments of user interfaces ("UI") and associated processes that are implemented on an electronic device, such as portable multifunction device 100, device 300, or device 500.

FIGS. 7A-7AM illustrate exemplary user interfaces for providing and controlling authentication at a computer system using an external device in accordance with some embodiments. The user interfaces in these figures are used to illustrate the processes described below, including the processes in FIGS. 8A-8E, FIG. 9, FIGS. 10A-10B, and FIGS. 11A-11B.

Figure 7B:
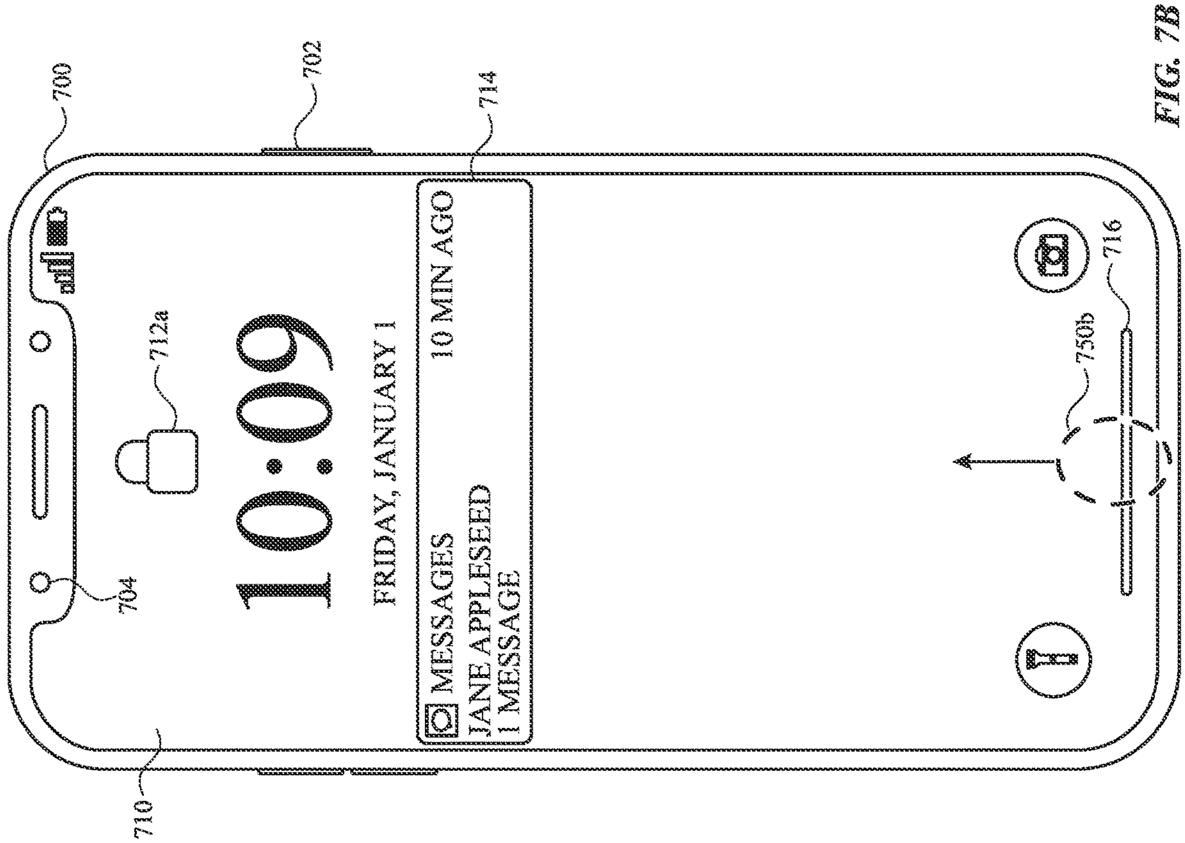
Figure 7D:
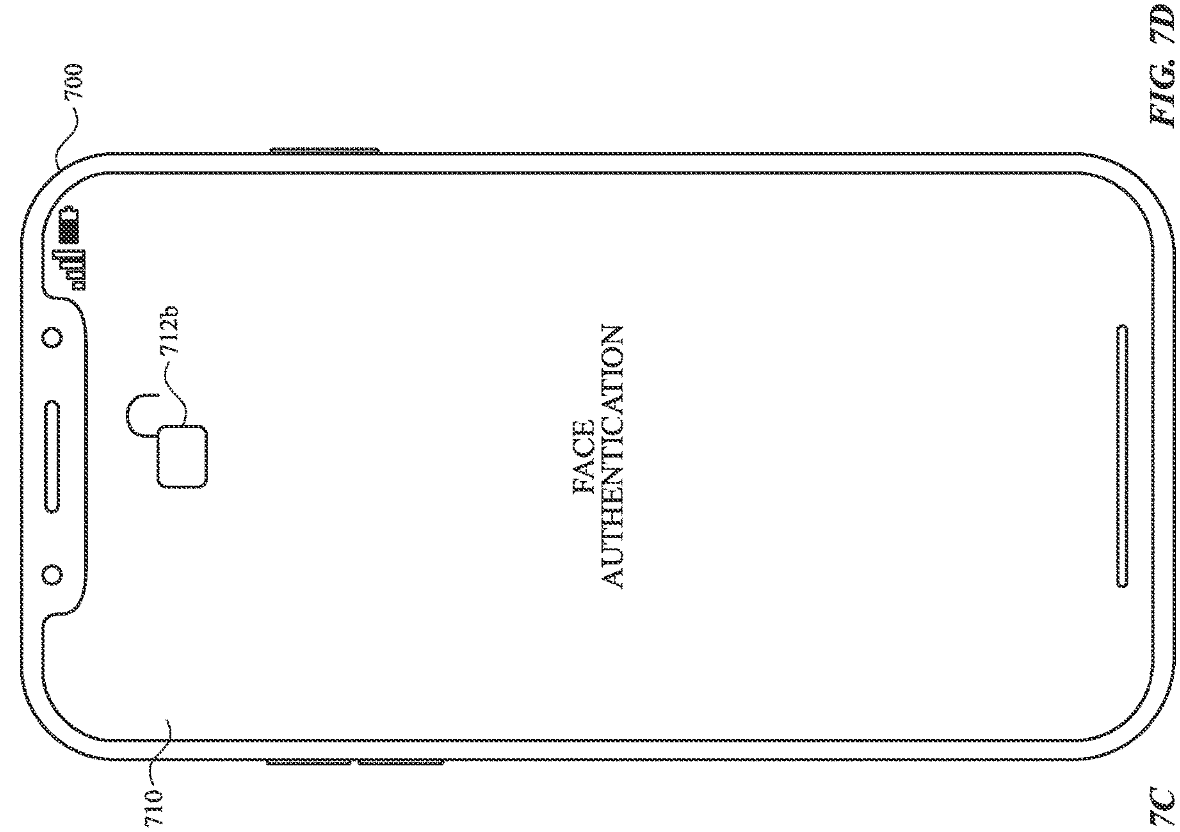
Figure 7C:
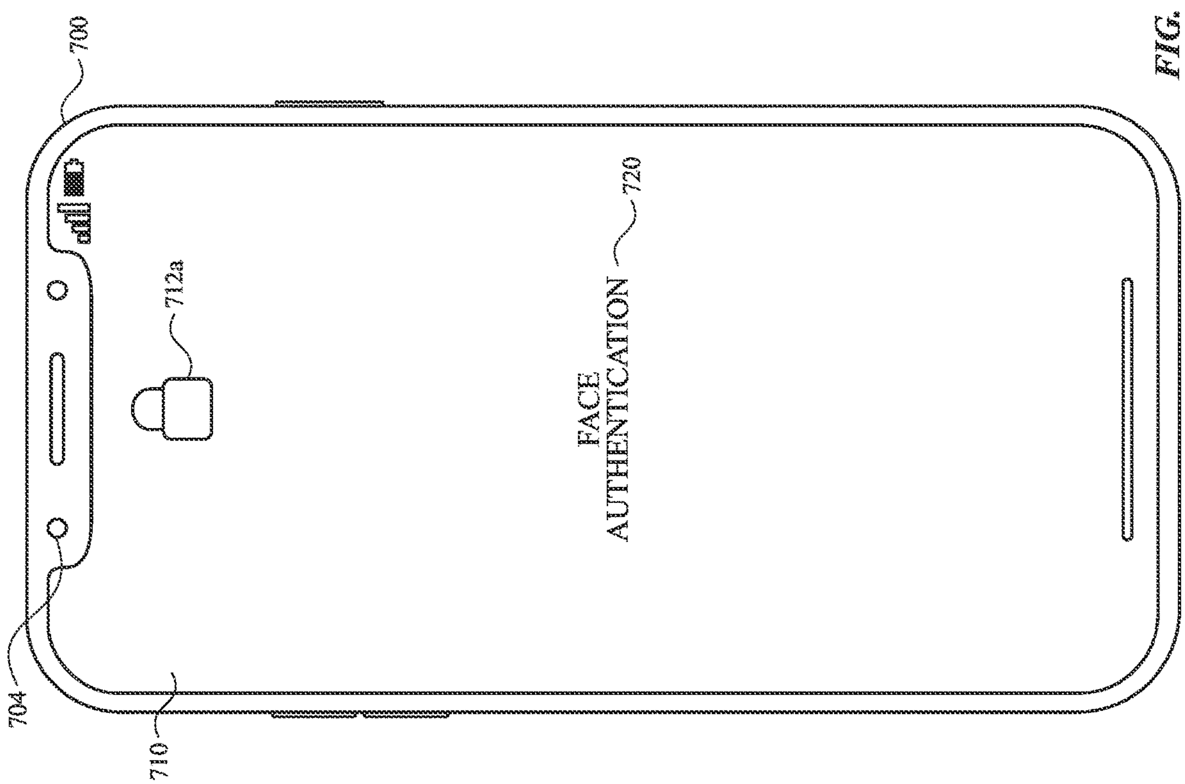

FIGS. 7A-7D illustrate an exemplary scenario where a user (e.g., as shown in FIG. 7A) is able to successfully perform a secure operation (e.g., unlock computer system 700) (e.g., as shown in FIGS. 7B-7D) using biometric data, irrespective of whether the user is wearing an external accessory device.

FIG. 7A illustrates user 760 holding computer system 700 (e.g., portable multifunction device 100, device 300, or device 500) and, optionally (e.g., as indicated by indication 792), wearing external accessory device 790. In the exemplary embodiments provided in FIGS. 7A-7AM, computer system 700 is a smartphone, and external accessory device 790 is a smartwatch. In some embodiments, computer system 700 can be a different type of computer system, such as a tablet computer. In some embodiments, external accessory device 790 can be a different type of external accessory device, such as a smartphone or tablet computer.

As illustrated in FIG. 7A, computer system 700 includes display 710. Computer system 700 also includes one or more inputs devices (e.g., touch screen of display 710, hardware button 702, and a microphone), a wireless communication radio, and one or more biometric sensors (e.g., biometric sensor 704, touch screen of display 710). In some embodiments, biometric sensor 704 includes one or more biometric sensors that include a camera, such as a depth camera (e.g., an infrared camera), a thermographic camera, or a combination thereof. In some embodiments, biometric sensor 704 includes a biometric sensor (e.g., facial recognition sensor), such as those described in U.S. patent application Ser. No. 14/341,860, "Overlapping Pattern Projector," filed Jul. 14, 2014; U.S. Patent Pub. No. 2016/0025993, U.S. patent application Ser. No. 13/810,451, "Scanning Projects and Image Capture Modules For 3D Mapping;" and U.S. Pat. No. 9,098,931, which are hereby incorporated by reference in their entireties for any purpose. In some embodiments, biometric sensor 704 includes one or more fingerprint sensors (e.g., a fingerprint sensor integrated into an affordance). In some embodiments, computer system 700 further includes a light-emitting device (e.g., light projector), such as an IR floodlight, a structured light projector, or a combination thereof. The light-emitting device is, optionally, used to illuminate the biometric feature (e.g., the face) during capture of biometric data of biometric features by biometric sensor 704. In some embodiments, computer system 700 includes a plurality of cameras separate from biometric sensor 704. In some embodiments, computer system 700 includes only one camera separate from biometric sensor 704. In some embodiments, computer system 700 includes one or more features of devices 100, 300, and/or 500.

As illustrated in FIG. 7A, user 760 is holding computer system 700 in a position where user 760 can see content displayed on display 710 and biometric sensor 704 can detect the face of user 760 (e.g., which is shown by zone of detection indication 784). In particular, the face of user 760 includes upper portion 760*a* and bottom portion 760*b*. As illustrated in FIG. 7A, upper portion 760*a* includes the eyes and eyebrows of user 760, and bottom portion 760*b* includes the nose and mouth of user 760. In some embodiments, other portions of the face of user 760 can be delineated as being a different portion. In some embodiments, upper portion 760*a* and/or bottom portion 760*b* can include less or more of the face of user 760. At FIG. 7A, biometric sensor 704 can detect both the upper portion 760*a* and bottom portion 760*b* of the face of user 760. As illustrated in FIG. 7A, external accessory device 790 is in an unlocked state, which is represented by unlock indication 794.

FIGS. 7B-7D illustrate one or more exemplary user interfaces that are displayed on display 710 of computer system 700. In particular, the one or more exemplary user interfaces of FIG. 7B-7D are described in relation to an exemplary scenario where user 760 attempts to use biometric authentication to unlock computer system 700 while user 760, external accessory device 790, and computer system 700 are oriented and in a state as depicted and described above in relation to FIG. 7A.

At FIG. 7B, device 700 displays notification 714 thereby informing user 760 that a message from John Appleseed has been received. User 760 wishes to view the restricted content of notification 714 (e.g., the message from John Appleseed) but is unable to do so, as computer system 700 is currently in a locked state, as indicated by lock indicator 712*a*. As illustrated in FIG. 7B, computer system 700 displays a locked state user interface (UI) on display 710. The locked state UI includes lock indicator 712*a*, which provides an indication that computer system 700 is in a locked state. Viewing the restricted content of notification 714 requires successful authentication (e.g., determining that information (or data) about a biometric feature obtained using biometric sensor 704 corresponds to (or matches) stored authorized credentials or biometric features).

At FIG. 7B, computer system 700 detects upward swipe gesture 750*b* on (e.g., at a location corresponding to) user interface object 716 and determines that a request to perform a secure operation (e.g., a request to initiate biometric authentication) has been received because an unlock gesture, such as an upward swipe gesture 750*b*, has been detected. In some embodiments, computer system 700 determines that the request to perform the secure operation has been received when one or more other gestures and/or other inputs are detected. In some embodiments, the one or more other gestures can include one or more gestures (e.g., a tap gesture) that are detected when computer system 700 is in a low power state, one or more gestures (e.g., a tap gesture) on a notification (e.g., notification 714) or another user interface object, one or more gestures on a notification or another user interface object that is displayed while computer system 700 is in a locked state, and/or one or more gestures and/or inputs (e.g., presses) that are detected on one or more hardware input mechanisms, such as hardware button 702. In some embodiments, computer system 700 receives a request to perform a secure operation when a determination is made that computer system 700 has been lifted (or raised) to a particular position or by more than a particular amount, such as being raised from a substantially horizontal orientation (and/or vertical orientation) to an orientation of computer system 700 shown in FIG. 7A.

At FIG. 7B, in response to detecting upward swipe gesture 750*b* and determining that the request to perform a secure operation has been received, computer system 700 initiates biometric authentication. After initiating biometric authentication (e.g., prior to successful authentication), computer system 700 determines that a face is detected by biometric sensor 704.

As illustrated in FIG. 7C, in response to determining that the request to perform a secure operation has been received and determining that a face is detected by biometric sensor 704, computer system 700 displays biometric authentication status 720 (e.g., "Face Authentication") on display 710 to indicate that biometric authentication is being performed. In addition, computer system 700 continues to display lock indicator 712*a* to indicate that computer system 700 has remained in the locked state. At FIG. 7C, computer system 700 determines that the face of user 760 (e.g., biometric data) that is being captured by biometric sensor 704 has resulted in successful biometric authentication. In some embodiments, computer system 700 determines that the face of user 760 that is being captured by biometric sensor 704 has resulted in successful biometric authentication by determining that the face of user 760 (e.g., biometric data) that is being captured by biometric sensor 704 sufficiently matches an authorized biometric profile (e.g., saved or trusted biometric data, biometric data that was saved and/or trusted before the current biometric authentication process was initiated and/or when computer system 700 was in an unlocked state).

At FIG. 7D, because the biometric authentication was successful, computer system 700 transitions from the locked state to an unlocked state. Because the biometric authentication was successful, computer system 700 replaces lock indicator 712*a* with unlock indicator 712*b* on display 710, as illustrated in FIGS. 7C-7D. Unlock indicator 712*b* indicates that computer system 700 is in an unlocked state. In some embodiments, after displaying the user interface of FIG. 7D, computer system 700 can display one or more user interfaces that would have been previously restricted to the user if biometric authentication were not successful, such as a screen with multiple application icons (e.g., as shown and described below in FIG. 7W) and/or a user interface that was previously displayed before computer system 700 was transitioned from the unlocked state to the locked.

Figure 7F:
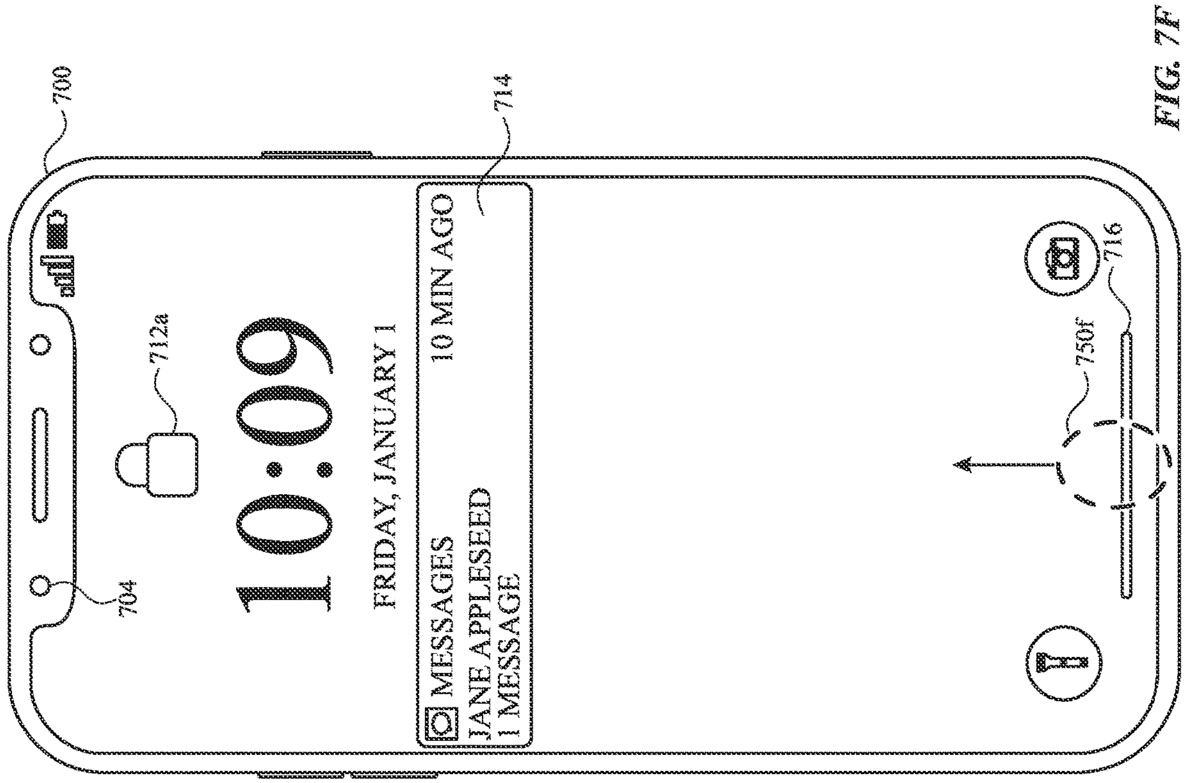
Figure 7E:
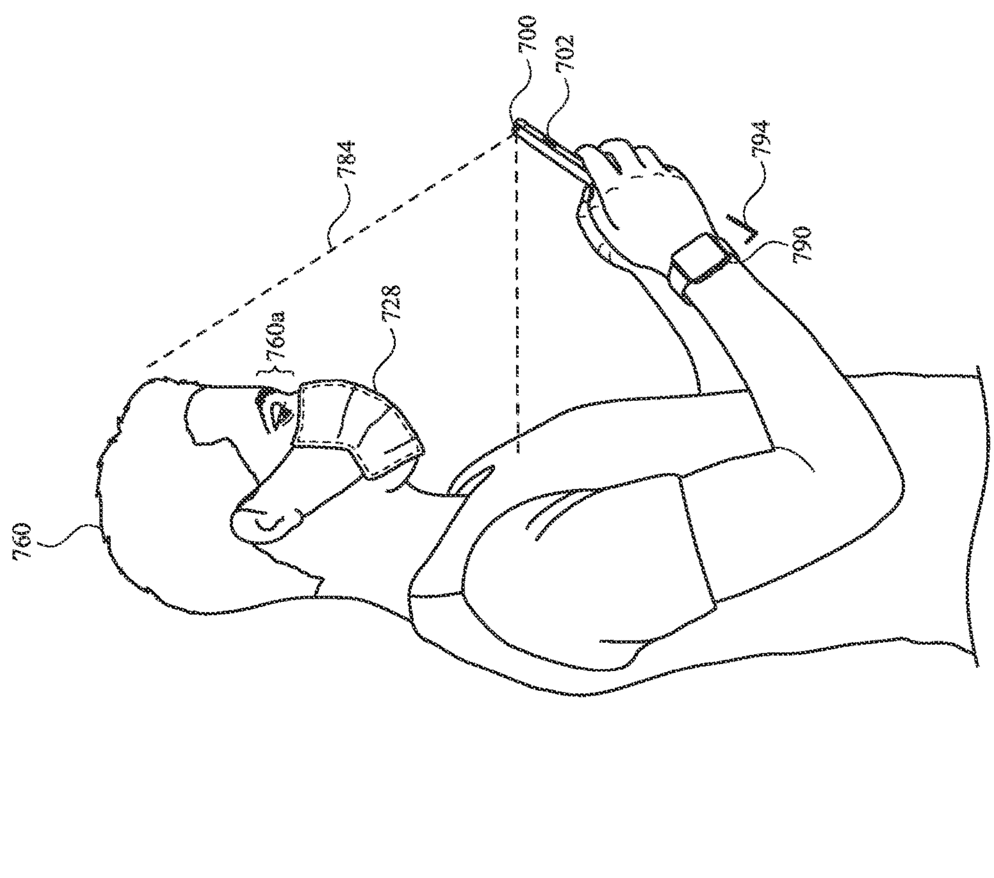
Figure 7G:
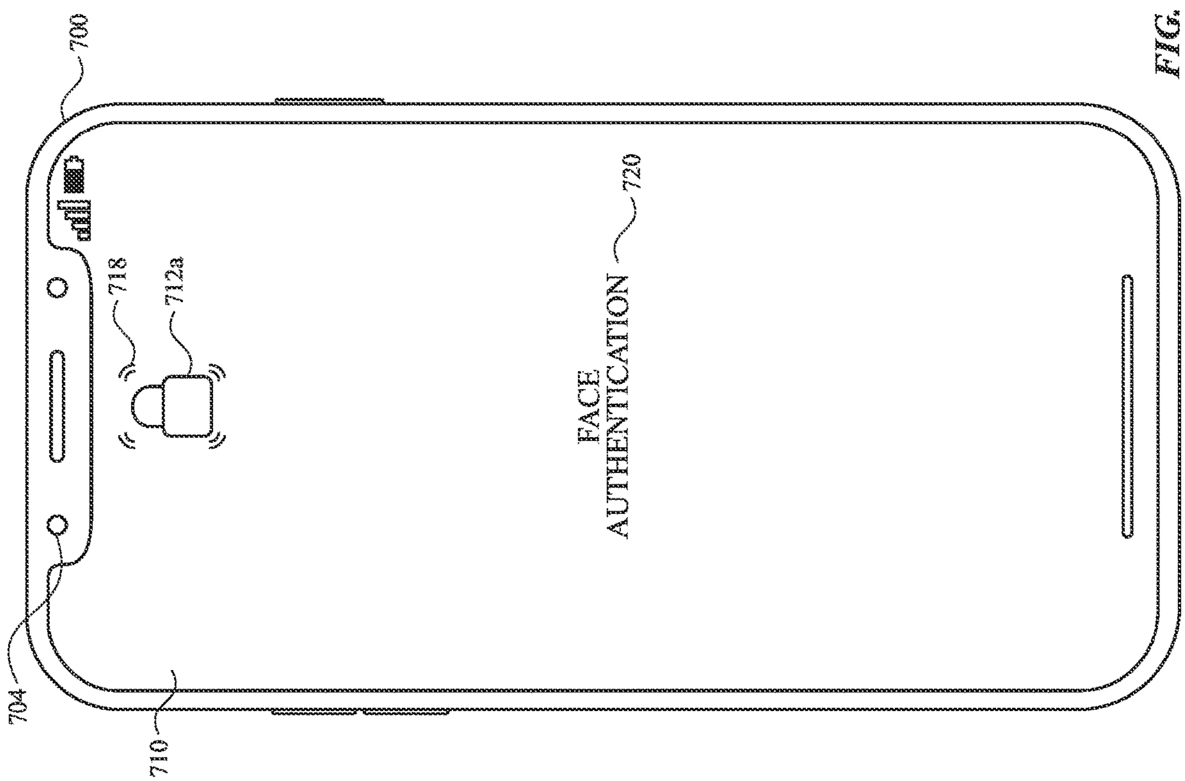
Figure 7H:
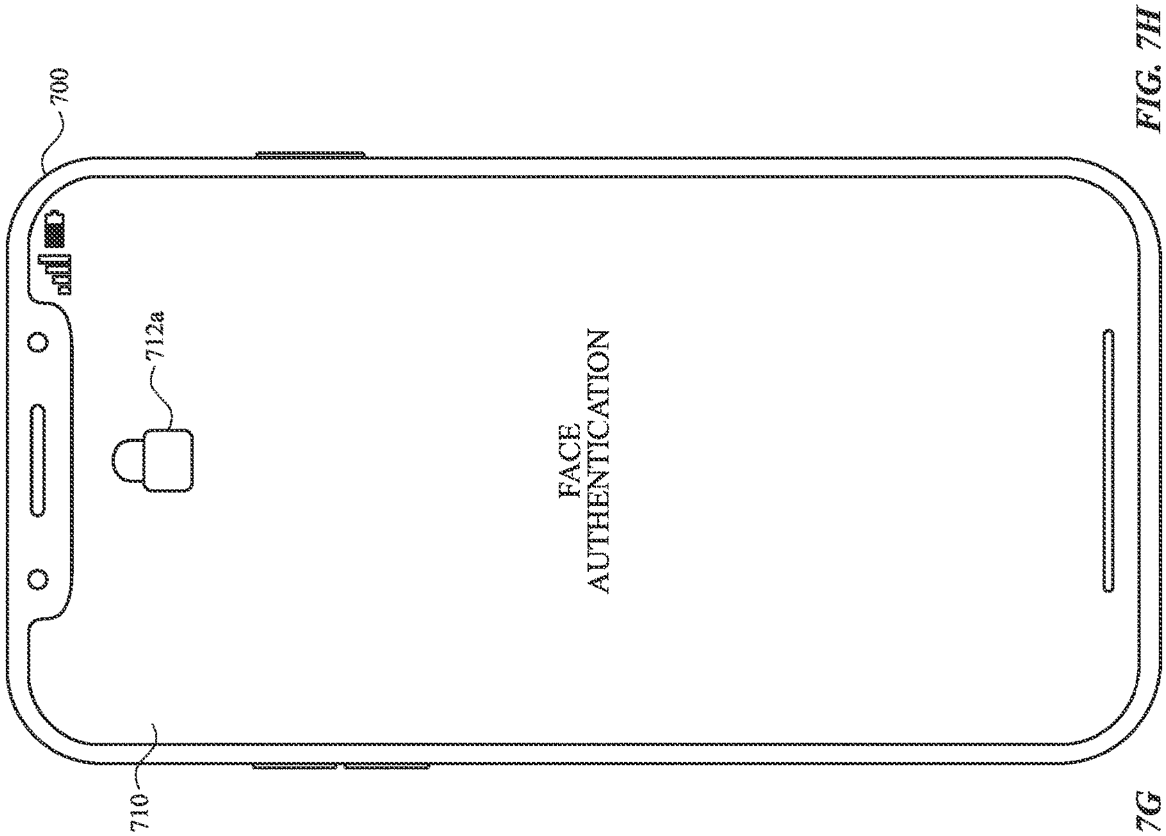

FIGS. 7E-7H illustrate an exemplary scenario where a user, as shown in FIG. 7E, is not able to successfully unlock computer system 700 (e.g., as shown in FIGS. 7F-7H) using biometric data because captured biometric data does not result in successful biometric authentication (e.g., the face of the user that is covered) and accessory-based unlocking criteria are not met (e.g., computer system 700 has not been set up to be unlocked via the external accessory device).

FIG. 7E illustrates user 760 holding computer system 700 and wearing external accessory device 790 in the same position that user 760 was holding computer system 700 in FIG. 7A. To contrast FIG. 7E with FIG. 7A, user 760 is wearing mask 728 (e.g., a face covering) in FIG. 7E while user 760 was not wearing a mask in FIG. 7A. Because user 760 is wearing a mask in FIG. 7E, biometric sensor 704 can only detect upper portion 760*a* of the face of user 760 (e.g., which is shown by zone of detection indication 784) because bottom portion 760*b* is covered by mask 728. While user 760 is illustrated wearing mask 728 that covers bottom portion 760*b*, the embodiments described herein would operate similarly even if another portion of user 760 was covered (e.g., user 760 could wear an eye mask without wearing mask 728, such that upper portion 760*a* could be covered while bottom portion 760*b* (as shown in FIG. 7A) is uncovered). While user 760 is wearing a mask at FIG. 7E, a user wearing another item (e.g., such as a scarf) can have a similar impact (as described herein) as a user wearing a mask.

FIGS. 7F-7H illustrate one or more exemplary user interfaces that are displayed on display 710 of computer system 700. In particular, the one or more exemplary user interfaces of FIG. 7F-7H are described in relation to an exemplary scenario where user 760 attempts to use biometric authentication (e.g., while wearing a mask) to unlock computer system 700 while user 760, external accessory device 790, and computer system 700 are oriented and in a state as depicted and described above in relation to FIG. 7E.

At FIG. 7F, device 700 displays notification 714 thereby informing user 760 that a message from John Appleseed has been received. User 760 wishes to view the restricted content of notification 714 (e.g., the message from John Appleseed) but is unable to do so, as computer system 700 is currently in a locked state, as indicated by lock indicator 712*a*. As illustrated in FIG. 7F, computer system 700 displays a locked state user interface with lock indicator 712*a*, which provides an indication that computer system 700 is in a locked state. At FIG. 7F, computer system 700 detects upward swipe gesture 750*f* on user interface object 716 and determines that a request to perform a secure operation (e.g., a request to initiate biometric authentication) has been received because an unlock gesture, such as an upward swipe gesture 750*f*, has been detected. At FIG. 7F, in response to detecting upward swipe gesture 750*f* and determining that the request to perform a secure operation has been received, computer system 700 initiates biometric authentication. After initiating biometric authentication (e.g., prior to successful authentication), computer system 700 determines that a face is detected by biometric sensor 704.

As illustrated in FIG. 7G, in response to determining that the request to perform a secure operation has been received and determining that a face is detected by biometric sensor 704, computer system 700 displays biometric authentication status 720 (e.g., "Face Authentication") on display 710 to indicate that biometric authentication is being performed and the computer system is currently in the locked state. In addition, computer system 700 continues to display lock indicator 712*a* to indicate that computer system 700 has remained in the locked state.

At FIG. 7G, computer system 700 determines that the face of user 760 (e.g., biometric data) that is being captured by biometric sensor 704 has resulted in unsuccessful biometric authentication. Here, the face of user 760 results in unsuccessful biometric authentication because biometric sensor 704 can only capture a portion (e.g., upper portion 760*a*) of the face of user 760 because the other portion is obstructed (e.g., bottom portion 760*b* is covered by mask 728). Upon determining that biometric authentication has been unsuccessful, computer system 700 determines that accessory-based unlocking criteria are not met because a setting (e.g., watch-to-unlock setting 770*i* as described below in relation to FIG. 7Q) is not enabled that would allow computer system 700 to be unlocked using external accessory device 790. As a result, at FIG. 7G, computer system 700 displays shake output indicator 718 (or makes lock indicator 712*a* appear that it is shaking) and provides a haptic output to indicate that authentication has been unsuccessful.

At FIG. 7H, because biometric authentication was unsuccessful and accessory-based unlocking criteria were not met, computer system 700 remains in the locked state (e.g., is not transitioned to the unlocked state). As illustrated in FIG. 7H, computer system 700 continues to display lock indicator 712*a* because biometric authentication was unsuccessful and accessory-based unlocking criteria were not met.

With reference to FIGS. 7A-7H, computer system 700 does not check whether accessory-based unlocking criteria in FIGS. 7A-7D because biometric authentication was successful in FIGS. 7A-7D. However, computer system 700 checks whether accessory-based unlocking criteria are met in FIGS. 7E-7H because biometric authentication was not successful. Thus, in some embodiments, computer system 700 only checks whether or not accessory-based unlocking criteria are met when there is an unsuccessful attempt to authenticate using biometric authentication. In some embodiments, computer system 700 only checks whether or not accessory-based unlocking criteria are met when computer system 700 determines that the face of user 760 (e.g., only a portion of the biometric feature is available for capture) is obstructed and/or that user 760 is wearing a mask.

Figure 7J:
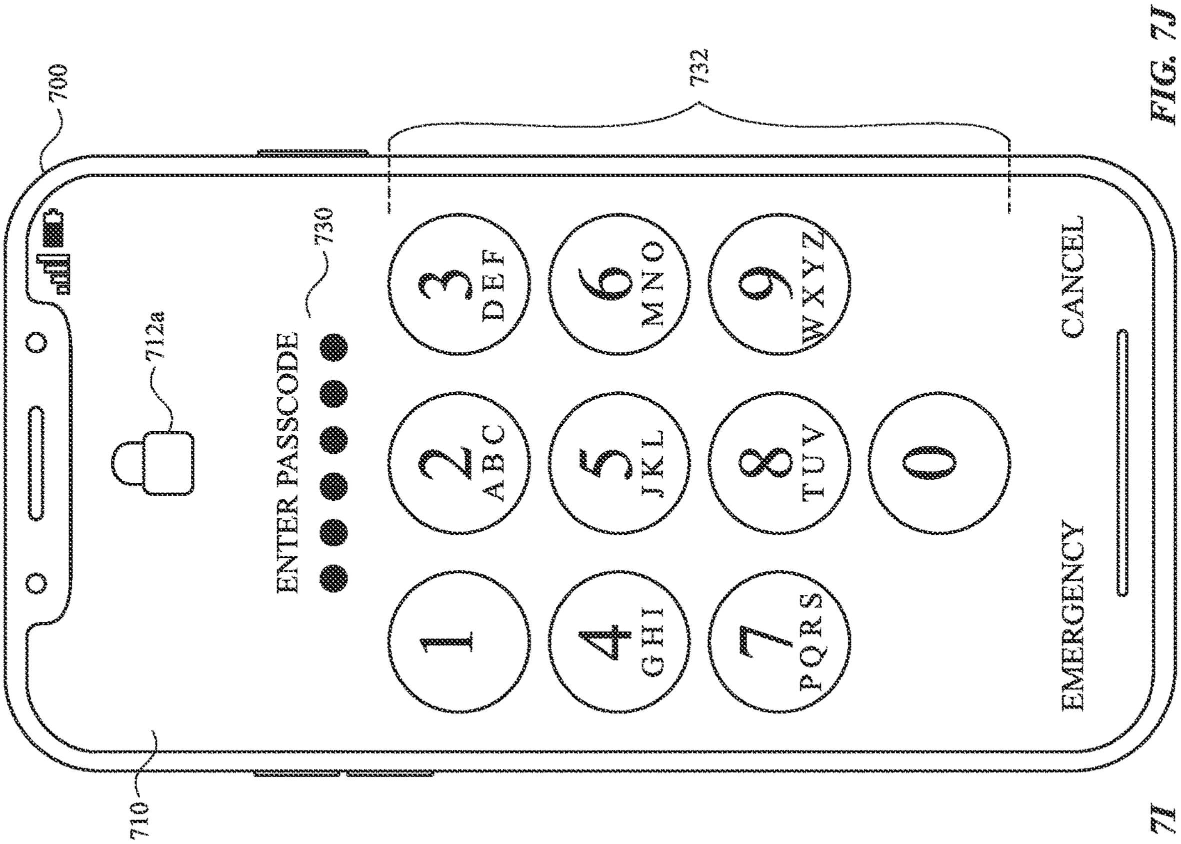
Figure 7I:
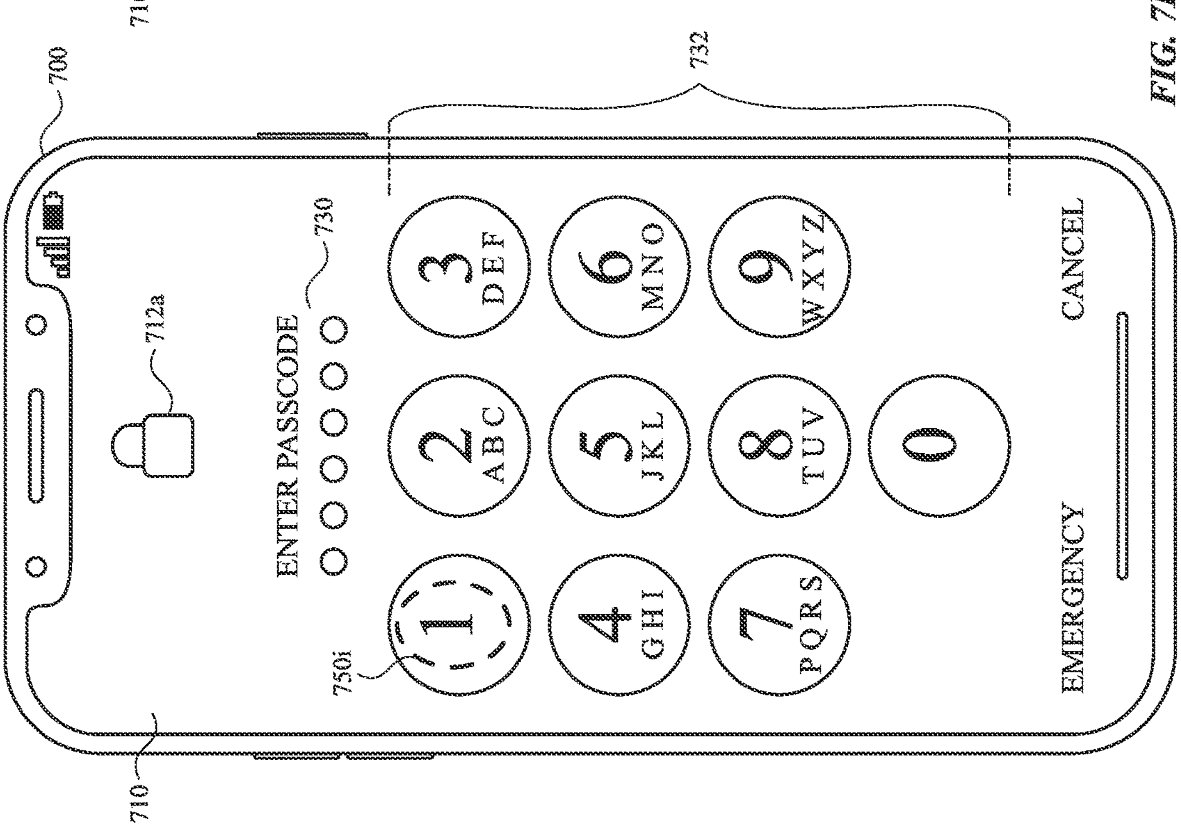

After displaying the user interface of FIG. 7H (e.g., for a predetermined period of time), computer system 700 continues to be in the locked state and displays the user interface of FIG. 7I on display 710. In some embodiments, after displaying the user interface of FIG. 7H, computer system 700 re-displays the user interface of FIG. 7F, instead of displaying the user interface of 7I as described above.

As illustrated in FIG. 7I, the user interface includes lock indicator 712*a*, passcode indications 730, and passcode input affordances 732. In some embodiments, the user interface of FIG. 7I (e.g., passcode entry user interface) is displayed on display 710 because biometric authentication cannot be used to unlock computer system 700. In some embodiments, biometric authentication cannot be used to unlock computer system 700 when a determination is made that a predetermined number (e.g., 3-10) of consecutive (e.g., without an intervening successful attempt) unsuccessful attempts has been made to authenticate using biometric data. In some embodiments, the user interface of FIG. 7I (e.g., passcode entry user interface) is displayed because computer system 700 is requiring that a successful non-biometric authentication (e.g., password/passcode entry) be made to unlock computer system 700 (e.g., perform a secure operation). At FIG. 7I, computer system 700 detects tap gesture 750*i* on one of passcode input affordances 732.

As illustrated in FIG. 7J, in response to detecting tap gesture 750*i* and one or more other gestures, computer system 700 displays passcode indications 730 as being filled-in to indicate that a passcode has been entered. At FIG. 7J, computer system 700 determines that the entered passcode is valid.

Figure 7L:
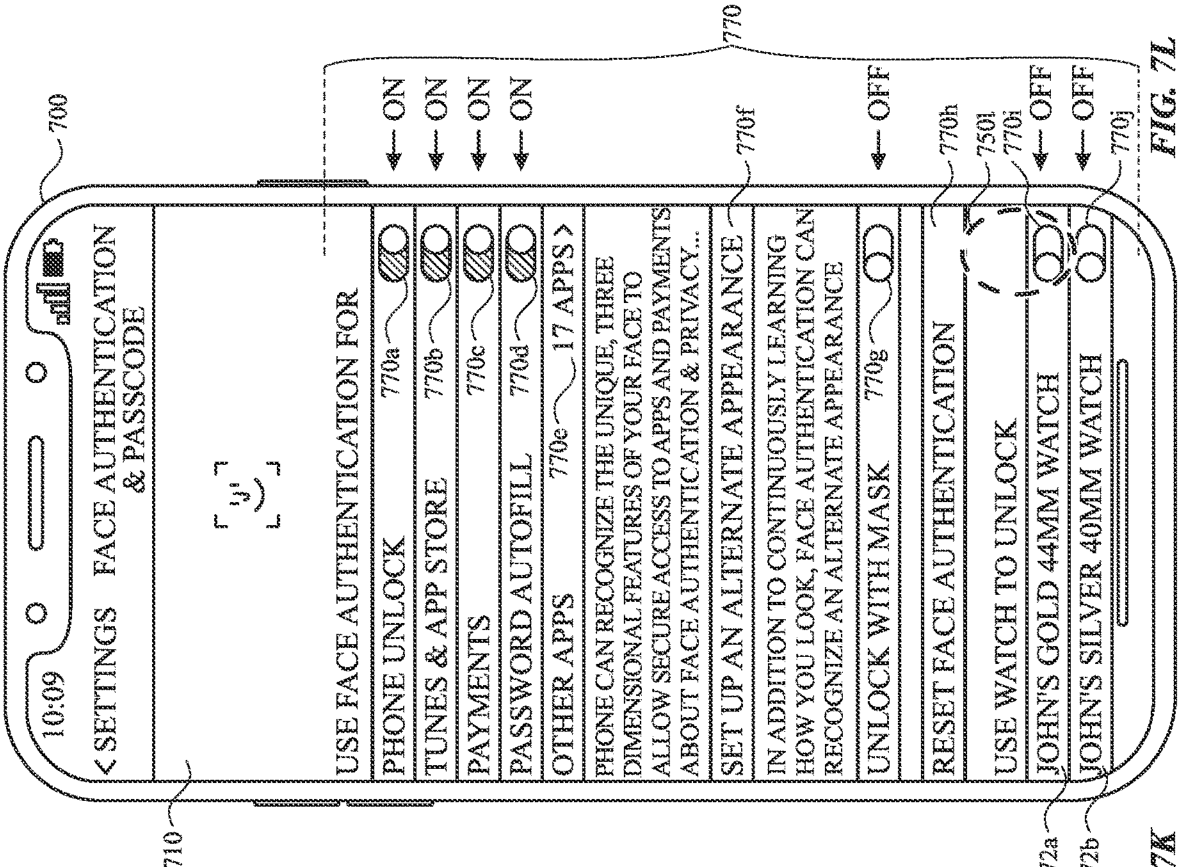
Figure 7K:
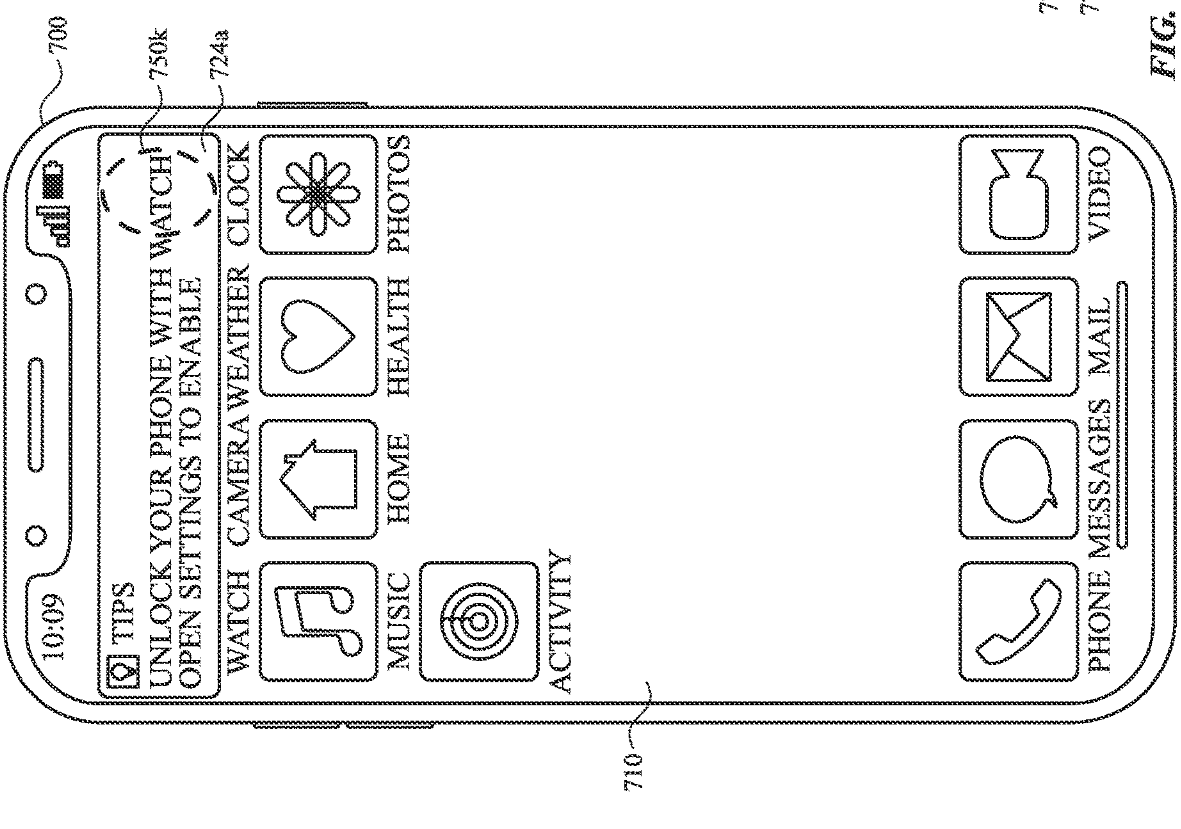

At FIG. 7K, because the passcode is determined to be valid, computer system 700 transitions from the locked state to the unlocked state and displays user interface 710. As illustrated in FIG. 7K, because the passcode is determined to be valid, computer system 700 displays notification 724*a*, which overlays a user interface that was previously restricted from display while computer system 700 was in the unlocked state. Notification 724*a* indicates that computer system 700 can be unlocked with an external accessory device if a setting is enabled (e.g., "Unlock Your Phone With Watch," and/or "Open Settings To Enable"). At FIG. 7K, notification 724*a* is displayed because a successful non-biometric authentication has been performed. In some embodiments, computer system 700 displays notification 724*a* because a successful non-biometric authentication has been performed after (e.g., within a predetermined period of time) determining a biometric authentication that was unsuccessful. In some embodiments, computer system 700 displays notification 724*a* because a different type of biometric authentication (e.g., fingerprint authentication, where the user's hands were covered with a glove or some other object) has been performed than the biometric authentication that was performed and determined to be unsuccessful (e.g., face authentication). In some embodiments, a predetermined number of successful non-biometric authentications (e.g., or other biometric authentication) have to be performed (e.g., within a predetermined period of time after determining that biometric authentication was unsuccessful) before notification 724*a* is displayed. In some embodiments, notification 724*a* is displayed because a determination is made that accessory-based unlocking criteria or one or more criterion of the accessory-based unlocking criteria (e.g., the external accessory device being worn, the external accessory device being unlocked) would have been met if the setting was enabled that would allow computer system 700 to be unlocked using external accessory device 790. At FIG. 7K, computer system 700 detects tap gesture 750*k* on notification 724*a*.

As illustrated in FIG. 7L, in response to detecting tap gesture 750*k*, computer system 700 displays a setting user interface that includes settings 770 ("settings user interface"). Setting 770 includes settings that enable biometric authentication using a face ("face authentication") to be detected when one or more secure operations are detected, such as phone unlock setting toggle 770*a* that allows/disallows computer system 700 to use face authentication to unlock computer system 700 (e.g., as described above in FIGS. 7A-7H), tunes and app setting toggle 770*b* that allows/disallows computer system 700 to use face authentication to download applications and music, payments setting toggle 770*c* that allows/disallows computer system 700 to use face authentication to authorize payment, and password autofill setting toggle 770*d* that allows/disallows computer system 700 to use face authentication to automatically fill in a password into a password field. Settings 770 also includes other settings option 770*e*, where in response to detecting a selection of other settings option 770*e*, computer system 700 displays other setting toggles that allow face authentication to be used with one or more application (e.g., "17 Apps"). Notably, computer system 700 uses face authentication to unlock computer system 700 in FIGS. 7A-7D because unlock setting toggle 770*a* is enabled. In some embodiments, when unlock setting toggle 770*a* is disabled, computer system 700 is prohibited from using face authentication to unlock computer system 700.

Settings 770 also include alternate appearance option 770*f* that allows computer system 700 to provide a user with the ability to set up an alternate appearance (e.g., using one or more techniques as described below in relation to FIGS. 12A-12J). In addition, settings 770 include unlock-with-mask setting toggle 770*g* that computer system 700 to be unlocked with a portion of the user's face covered (e.g., covered with a mask, using one or more techniques as described below in relation to FIGS. 12A-12AA) (e.g., irrespective of whether or not a user is wearing an external accessory device) and reset face authentication option 770*h* that resets authorized/stored biometric data (e.g., of the face of a user) that is included in a stored biometric profile.

Settings 770 further includes watch-to-unlock-setting toggle 770*i* and watch-to-unlock-setting toggle 770*j*. Watch-to-unlock-setting toggle 770*i* enables computer system 700 to be unlocked when the watch (e.g., external accessory device 790) with the identifier of "John's Gold 44 mm Watch" meets one or more accessory-based unlocking criterion and/or one or more accessory device configuration criterion (e.g., the external accessory device having a passcode, the passcode over a certain number of characters). Likewise, watch-to-unlock-setting toggle 770*j* enables computer system 700 to be unlocked when the watch with the identifier of "John's Silver 40 mm Watch" meets one or more accessory-based unlocking criteria. In some embodiments, other watch-to-unlock-setting toggles are displayed in response to computer system 700 receiving a request to display additional settings (e.g., in response to detecting an unlock gesture (e.g., an upward swipe gesture) on the user interface of FIG. 7L). In some embodiments, only the differentiating features are displayed to differentiate the watch-to-unlock-setting toggles. For example, if "John's Silver 40 mm Watch" was identified as "John's Gold 40 mm Watch," computer system 700 would display "John's 44 mm Watch" as watch-to-unlock-setting toggle 770*i* and "John's 40 mm Watch" as watch-to-unlock-setting toggle 770*j* because both watches would be "Gold." In other words, "Gold" would not be a differentiating feature in the previous example and would not be displayed in some embodiments.

In some embodiments, watch-to-unlock-setting toggle 770*i* and watch-to-unlock-setting toggle 770*j* are displayed because each corresponds to a watch that is associated with a particular profile (e.g., "John's" profile). In some embodiments, watch-to-unlock-setting toggle 770*i* and watch-to-unlock-setting toggle 770*j* are displayed because each corresponds to a watch that computer system 700 is configured to control via an application (e.g., an external accessory device settings application that is accessible on (e.g., user interface are displayed, inputs are received on) computer system 700). In some embodiments, a watch-to-unlock setting toggle can enable/disable multiple watches to be used as described below in relation to watch-to-unlock setting toggle 770*i*. Although settings 770 are described as being related to face authentication, one or more other types of biometric authentication (e.g., fingerprint authentication) can have a user interface with similar or different settings (e.g., relative to those of settings 770) that are implemented using one or more similar techniques to those described herein.

At FIG. 7L, computer system 700 detects tap gesture 750*l* on watch-to-unlock-setting toggle 770*i*. In response to detecting tap gesture 750*l* on watch-to-unlock-setting toggle 770*i*, computer system 700 determines whether the watch (e.g., external accessory device 790) that corresponds to watch-to-unlock-setting toggle 770*i* meets accessory device configuration criteria.

FIGS. 7M-7P illustrate exemplary user interfaces that computer system 700 can display based on determining whether the watch that corresponds to watch-to-unlock-setting toggle 770*i* meets accessory device configuration criteria. For the purposes of the discussion herein, external accessory device 790 (e.g., shown in FIG. 7A) is the watch that corresponds to watch-to-unlock-setting toggle 770*i*.

Figure 7N:
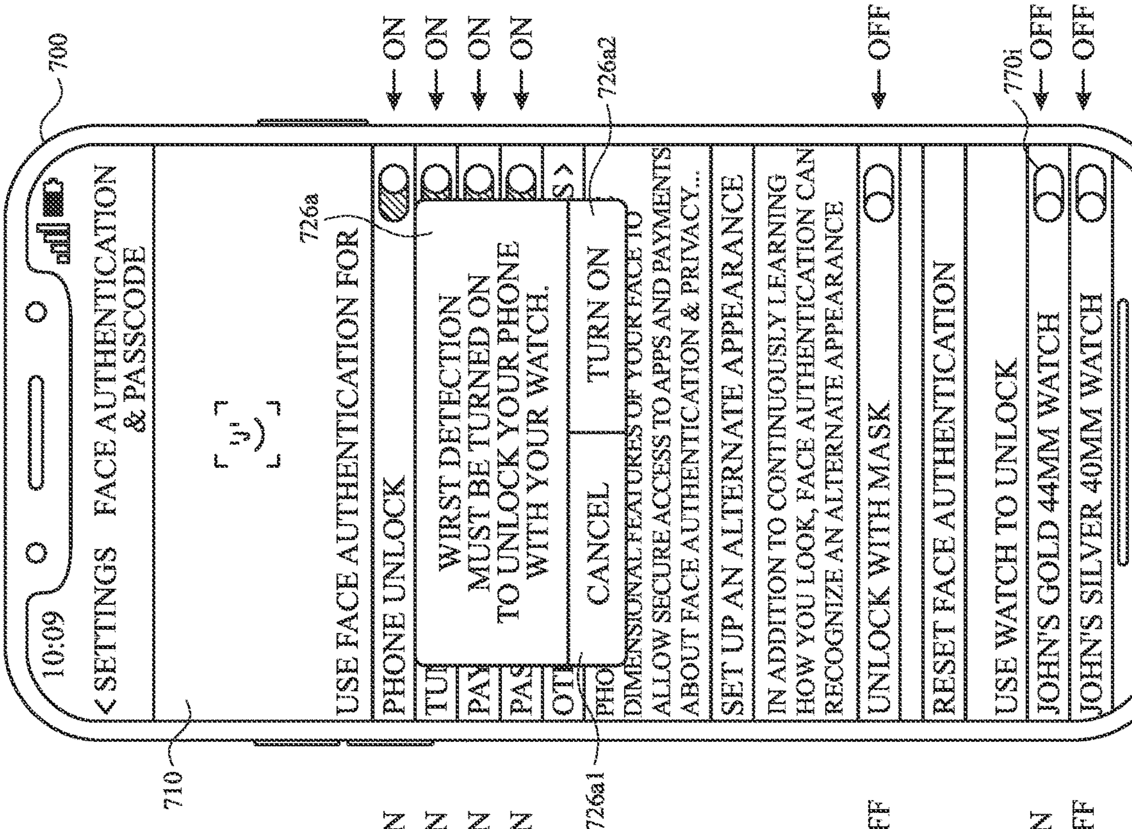
Figure 7M:
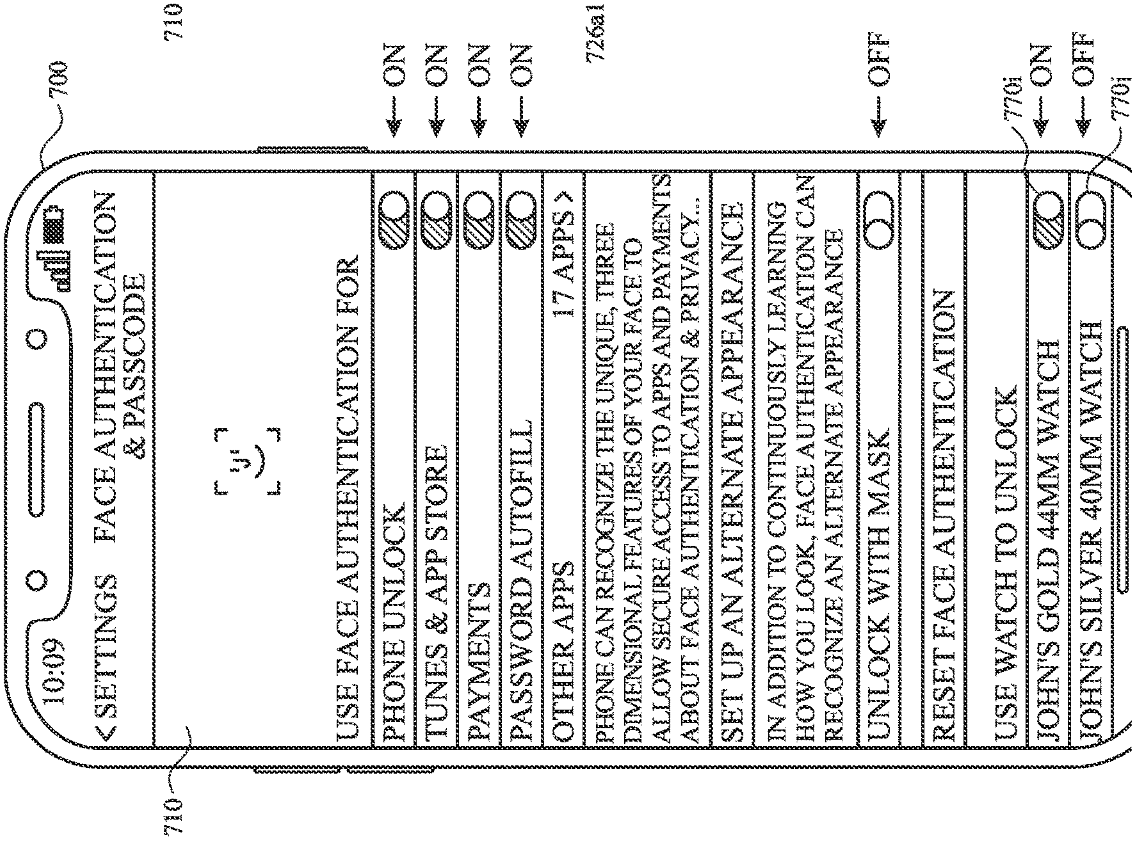

FIG. 7M illustrates an exemplary user interface that computer system 700 can display when a determination is made that external accessory device 790 meets accessory device configuration criteria. As shown in FIG. 7M, in response to determining that external accessory device 790 meets accessory device configuration criteria, computer system 700 changes watch-to-unlock-setting toggle 770*i* from an off state (e.g., an inactive state) to an on state (e.g., an active state). When watch-to-unlock-setting toggle 770*i* is in the on state, computer system 700 is allowed to be unlocked via external accessory device 790 (and when watch-to-unlock-setting toggle 770*i* is in the off state, computer system 700 is not allowed to be unlocked via external accessory device 790). In FIG. 7M, watch-to-unlock setting toggle 770*j* remains in the off state because no gesture was received on the toggle (e.g., in FIG. 7L) and, thus, no determination was made with regards to whether the watch that corresponds to watch-to-unlock setting toggle 770*j* met accessory device configuration criteria.

Figure 7P:
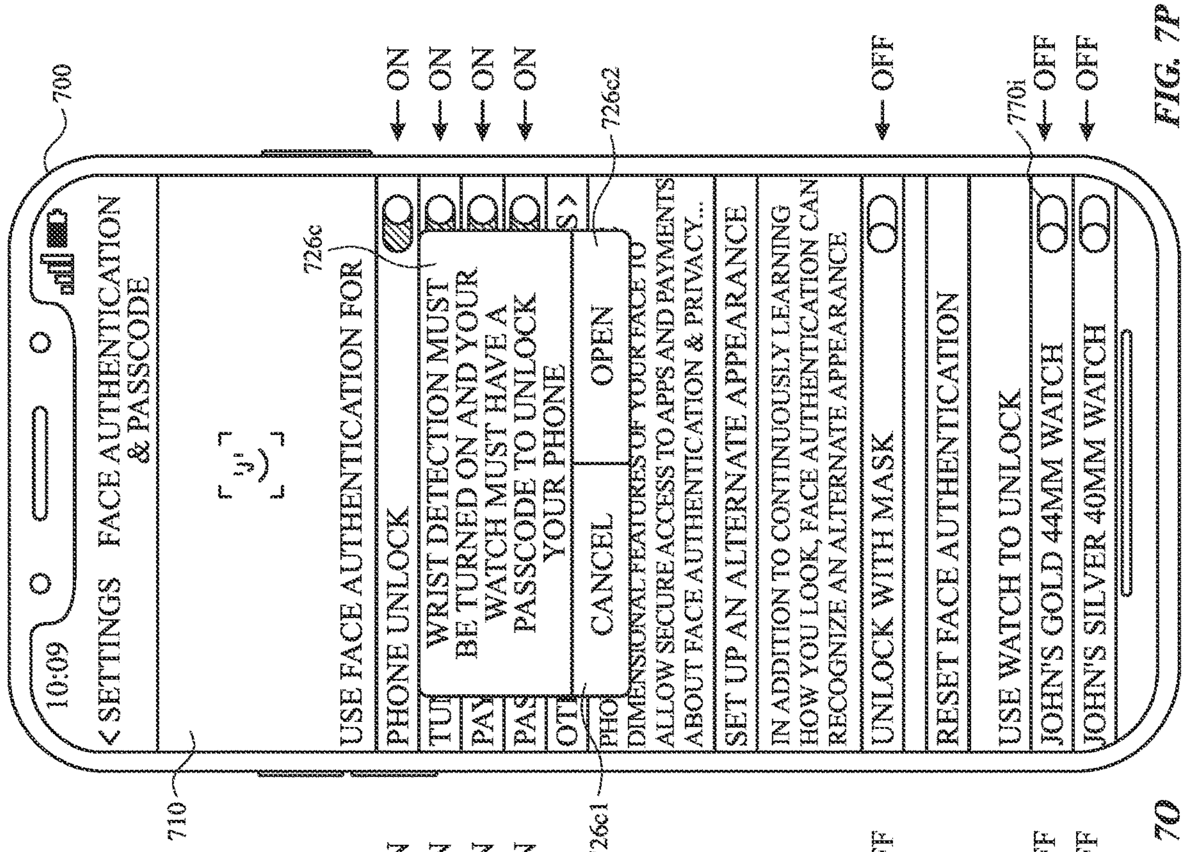
Figure 7O:
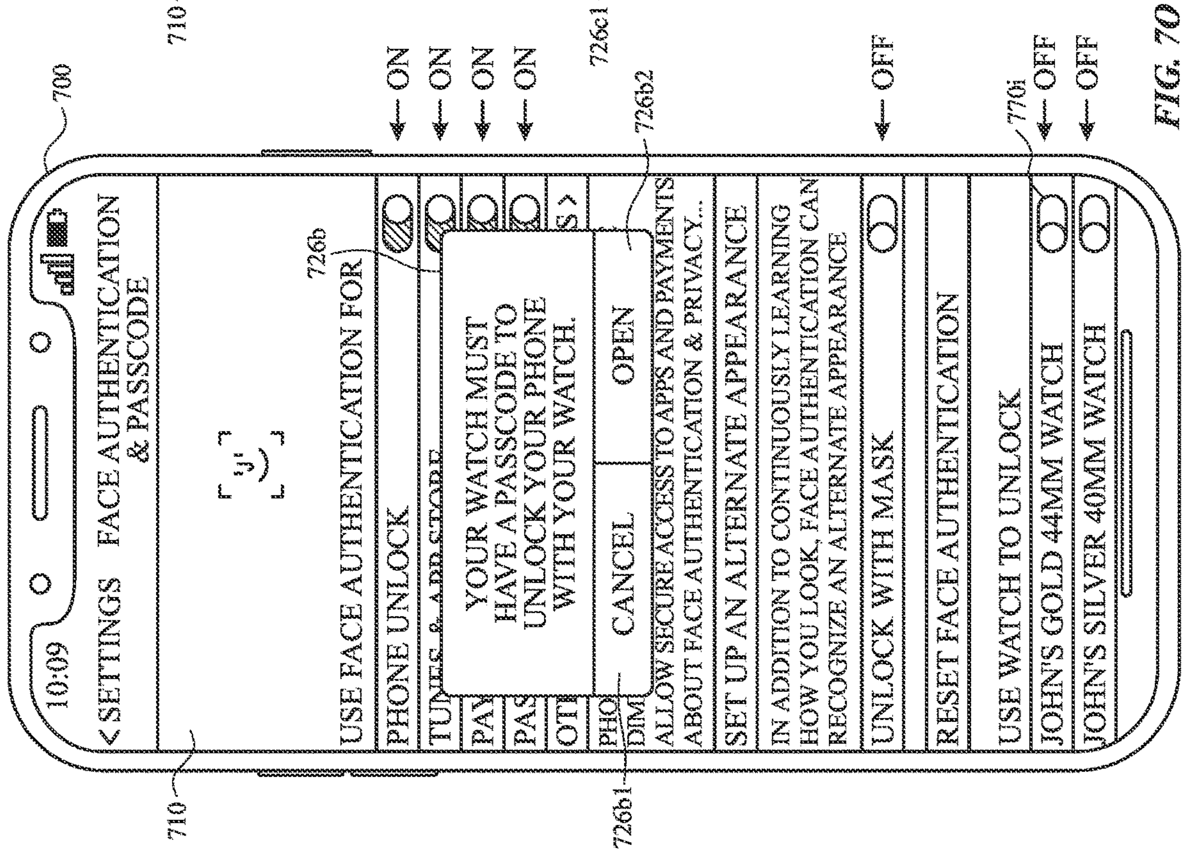

FIGS. 7N-7P illustrate exemplary user interfaces that computer system 700 can display when a determination is made that external accessory device 790 does not meet accessory device configuration criteria. As illustrated in FIGS. 7N-7P, computer system 700 continues to display watch-to-unlock-setting toggle 770*i* in the off state (as watch-to-unlock-setting toggle 770*i* was displayed in FIG. 7L).

As illustrated in FIG. 7N, computer system 700 displays notification 726*a*, which indicates that "wrist detection must be turned on to unlock your phone [(e.g., computer system 700)] from your watch [(e.g., external accessory device 790)]". In particular, computer system 700 displays notification 726*a* because a wrist detection setting is not enabled (e.g., a setting that allows for detection of whether a user is wearing external accessory device 790), and thus, accessory device configuration criteria have not been met. As illustrated in FIG. 7N, notification 726*a* also includes cancel affordance 726*a*1 and turn-on affordance 726*a*2. In some embodiments, in response to detecting a gesture on cancel affordance 726*a*1, computer system 700 ceases to display notification 726*a*, and watch-to-unlock-setting toggle 770*i* remains in the off state. In some embodiments, in response to detecting a gesture on turn-on affordance 726*a*2, computer system 700 enables the wrist detection setting, ceases to display notification 726*a*, and changes watch-to-unlock-setting toggle 770*i* from the off state to the on state (e.g., on state as shown in FIG. 7M). In some embodiments, in response to detecting a gesture on turn-on affordance 726*a*2, computer system 700 displays a user interface that allows a user to enable the watch detection setting.

As illustrated in FIG. 7O, computer system 700 displays notification 726*b*, which indicates that "you must have a passcode to unlock your phone [(e.g., computer system 700)] with your watch [(e.g., external accessory device 790)]." In particular, computer system 700 displays notification 726*b* because external accessory device 790 does not require a passcode before it can be unlocked, and thus, accessory device configuration criteria have not been met. Notification 726*b* includes cancel affordance 726*b*1 and open affordance 726*b*2, which computer system 700 displays and responds to respective gestures towards using one or more techniques discussed above in relation to cancel affordance 726*a*1 and turn-on affordance 726*a*2, respectively. In some embodiments, open affordance 726*b*2 of FIG. 7O differs from turn-on affordance 726*a*2 of FIG. 7N because a gesture on open affordance 726*b*2 causes computer system 700 to display a user interface that allows a user to enable the setting while a gesture on turn-on affordance 726*a*2 causes computer system 700 to automatically enable the respective setting without displaying a user interface that allows a user to enable the setting.

As illustrated in FIG. 7P, computer system 700 displays notification 726*c*, which indicates that "wrist detection must be turned on and your watch [(e.g., external accessory device 790)] must have a passcode to unlock your phone [(e.g., computer system 700)]." FIG. 7P illustrates that a notification that is displayed in response to accessory device configuration criteria being met can indicate multiple reasons that external accessory device 790 did not meet accessory device configuration criteria. Notification 726*c* includes cancel affordance 726*c*1 and open affordance 726*c*2, which computer system 700 displays and responds to respective gestures towards using one or more techniques discussed above in relation to cancel affordance 726*b*1 and open affordance 726*b*2, respectively. In some embodiments, computer system 700 displays one or more other notifications in response to determining that external accessory device 790 does not meet accessory device configuration criteria based on not meeting other criteria than those discussed above in relation to FIGS. 7N-7P. In some embodiments, other criteria can include the criterion that the external accessory device does not have a passcode that meets particular parameters (e.g., length (e.g., six or more characters or digits)), one or more criterion discussed in relation to FIGS. 8A-8E and FIG. 9 (or another criterion). In some embodiments, with reference to FIG. 7M, computer system 700 can automatically toggle (e.g., without user input to turn off or on watch-to-unlock-setting toggle 770*i*) watch-to-unlock-setting toggle 770*i* back to the off state when or after one or more of the criterion cease to be met (e.g., when a user turns off wrist detection for external accessory device 790 after watch-to-unlock-setting toggle 770*i* has been set to the on state). In some embodiments, with reference to FIG. 7M, computer system 700 can automatically toggle watch-to-unlock-setting toggle 770*i* back to the off state when the passcode for external accessory device 790 has been changed (e.g., recently changed).

Figure 7Q:
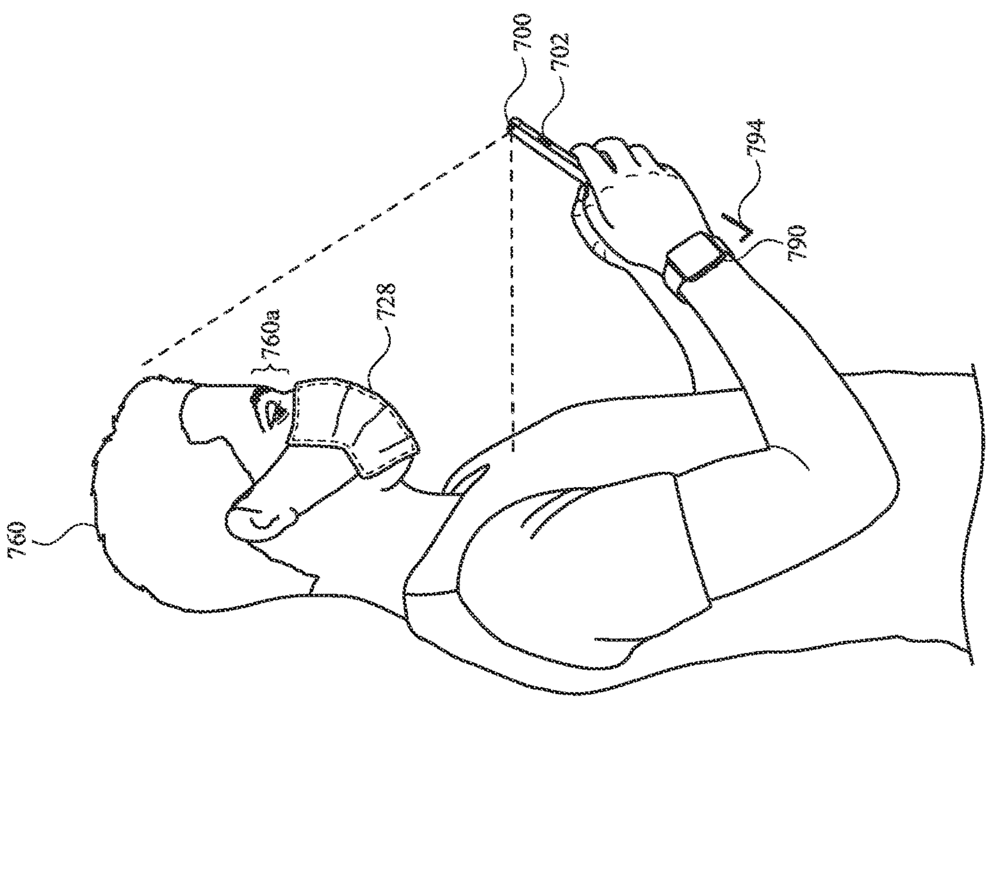

FIGS. 7Q-7T illustrate an exemplary scenario where a user, as shown in FIG. 7Q, is able to successfully unlock computer system 700 (e.g., as shown in FIGS. 7Q-7T) using biometric data because accessory-based unlocking criteria are met, even though biometric authentication (e.g., the face of the user that is covered) is unsuccessful.

FIG. 7Q illustrates user 760 holding computer system 700 and wearing external accessory device 790. In FIG. 7Q, user 760 is wearing mask 728. It should be understood that the description above with respect to FIG. 7E also applies to FIG. 7Q. However, at FIG. 7Q, user 760 is holding computer system 700 and wearing external accessory device 790 while watch-to-unlock-setting toggle 770*i* is in the on state (e.g., sometime after computer system 700 is allowed to be unlocked via external accessory device 790 as shown in FIG. 7M), which is in contrast to user 760 holding computer system 700 and wearing external accessory device 790 in FIG. 7E occurring when watch-to-unlock-setting toggle 770*i* was in the off state (e.g., as shown in FIG. 7L).

Figure 7R:
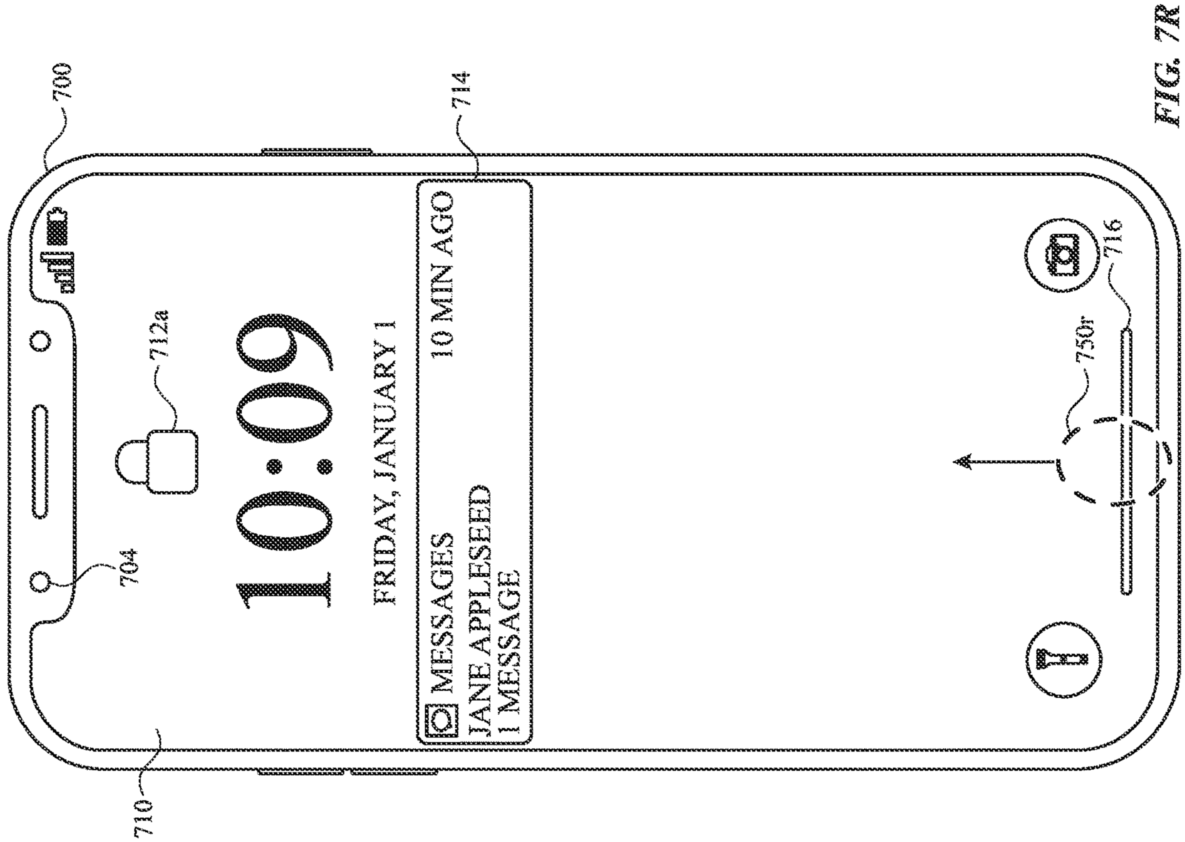
Figure 7T:
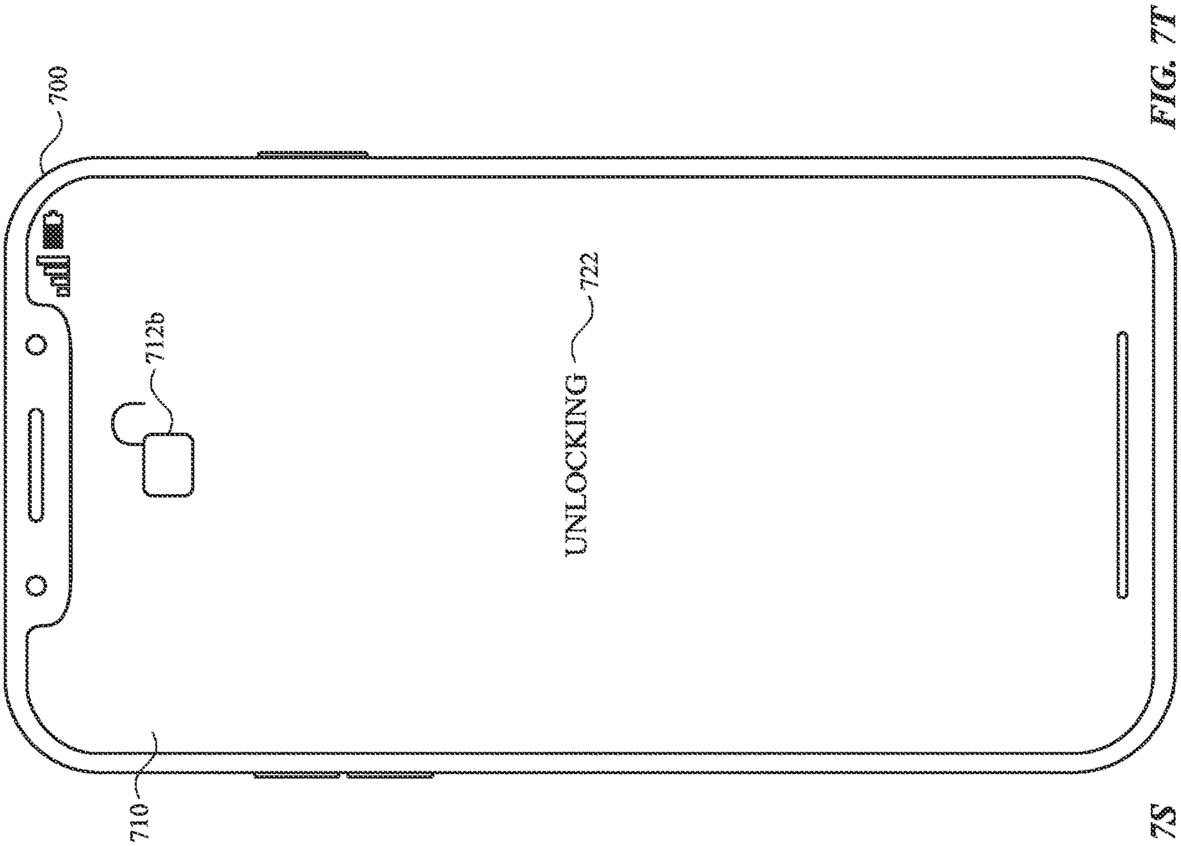
Figure 7S:
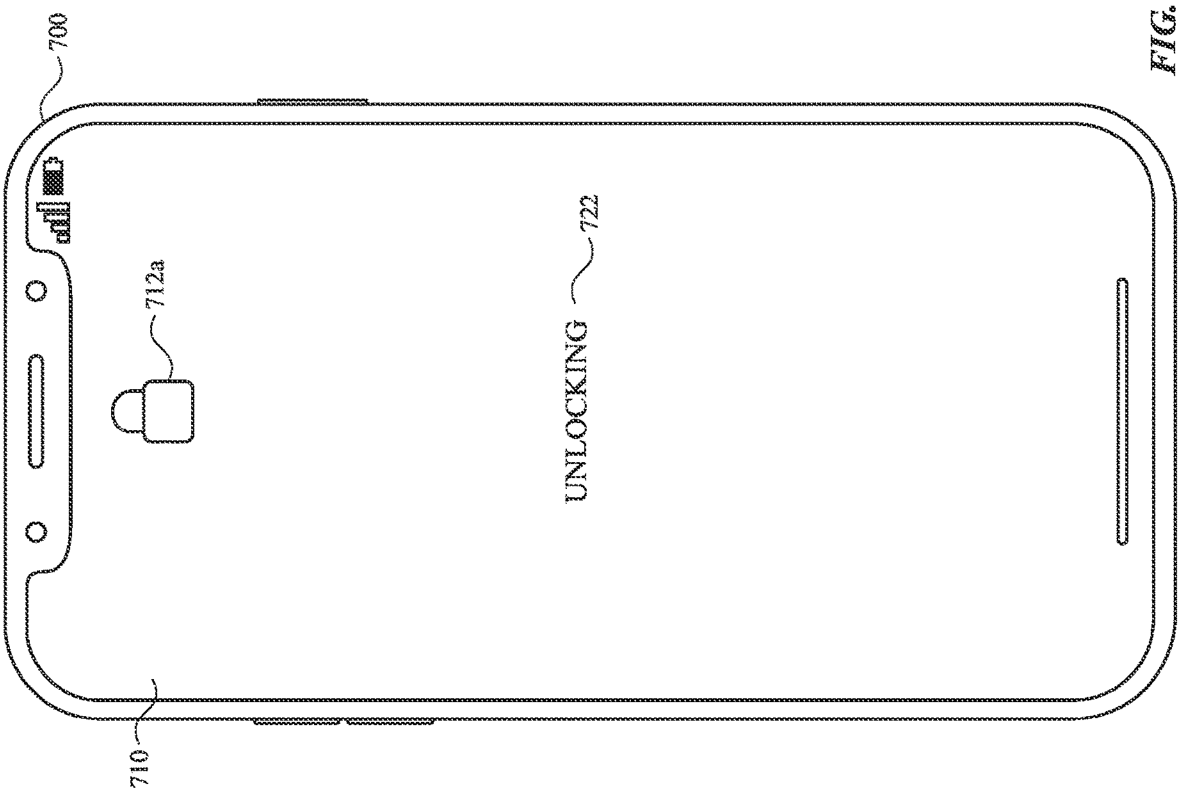

FIGS. 7R-7T illustrate one or more exemplary user interfaces that are displayed on display 710 of computer system 700. In particular, the one or more exemplary user interfaces of FIGS. 7R-7T are described in relation to an exemplary scenario where user 760 attempts to use biometric authentication (e.g., while wearing a mask) to unlock computer system 700 while user 760, external accessory device 790, and computer system 700 are oriented and in a state as depicted and described above in relation to FIG. 7Q.

At FIG. 7R, device 700 displays notification 714 thereby informing user 760 that a message from John Appleseed has been received. User 760 wishes to view the restricted content of notification 714 (e.g., the message from John Appleseed) but is unable to do so, as computer system 700 is currently in a locked state. As illustrated in FIG. 7R, computer system 700 displays a locked state user interface with lock indicator 712*a* on display 710. At FIG. 7R, computer system 700 detects upward swipe gesture 750*r* on user interface object 716 and determines that a request to perform a secure operation (e.g., a request to initiate biometric authentication) has been received because an unlock gesture, such as an upward swipe gesture 750*r* has been detected.

At FIG. 7R, in response to detecting upward swipe gesture 750*r* and determining that the request to perform a secure operation has been received, computer system 700 initiates biometric authentication. After initiating biometric authentication (e.g., prior to successful authentication), computer system 700 determines that a face is detected by biometric sensor 704 and determines that biometric authentication is unsuccessful (e.g., user is wearing a mask and biometric sensor 704 can only capture a portion of the face of user 760) using one or more similar techniques as those discussed above in relation to FIGS. 7F-7G. Upon determining that biometric authentication has been unsuccessful, computer system 700 determines whether accessory-based unlocking criteria is met.

At FIG. 7S, sometime while determining whether accessory-based unlocking criteria is met, computer system 700 displays accessory-based unlocking status 722 (e.g., "Unlocking Authentication") on display 710. At FIG. 7S, computer system 700 displays accessory-based unlocking status 722 without previously displaying or without displaying biometric authentication status 720 (e.g., "Face Authentication," shown in FIG. 7C). In some embodiments, computer system 700 displays accessory-based unlocking status 722 because the setting is enabled that would allow computer system 700 to be unlocked using external accessory device 790 (e.g., watch-to-unlock-setting toggle 770*i* is in an on state). In some embodiments, accessory-based unlocking status 722 is displayed after displaying biometric authentication status 720. In some embodiments, accessory-based unlocking status 722 is displayed to notify a user that computer system 700 is attempting to use a different type of authentication than face authentication (e.g., or some other biometric authentication).

At FIG. 7S, computer system 700 determines that accessory-based unlocking criteria have been met. In particular, computer system 700 determines that accessory-based unlocking criteria have been met because external accessory device 790 has been detected to be worn by user 760, external accessory device 790 is currently in an unlocked state (e.g., as indicated by unlock indication 794 in FIG. 7R and as described above in relation to FIG. 7A), and the setting is enabled that would allow computer system 700 to be unlocked using external accessory device 790 (e.g., watch-to-unlock-setting toggle 770*i* is in an on state).

In some embodiments, computer system 700 determines that accessory-based unlocking criteria have been met based on a determination that computer system 700 and/or external accessory device 790 have been unlocked recently (e.g., within the last 4.5, 5.5, 6.5 hours, as shown when comparing time shown in FIG. 7K with the time shown in FIG. 7J). In some embodiments, computer system 700 determines that accessory-based unlocking criteria have been met based on a determination that computer system 700 (e.g., and/or external accessory device 790) has been unlocked (and/or unlocked recently) using another authentication operation (e.g., passcode operation of FIGS. 7I-7J, successful face authentication of FIGS. 7A-7B) that is different from unlocking using external accessory device 790 (e.g., operation described in FIGS. 7Q-7T).

In some embodiments, computer system 700 determines that the accessory-based unlocking criteria have been met based on a determination that computer system 700 is within a predetermined distance (e.g., 2-3 meters or less) from external accessory device 790. In some embodiments, computer system 700 determines that the accessory-based unlocking criteria have been met based on a determination that computer system 700 and/or external accessory device 790 have moved by a certain amount and/or with a particular speed during a certain timeframe (e.g., moving 2 meters per second within the last hour before and/or after upward swipe input 750*r* of FIG. 7R was received). In some embodiments, computer system 700 determines that the accessory-based unlocking criteria have been met based on a determination that external accessory device 790 (and/or computer system 700) is not operating in one or more modes (e.g., bedtime mode, sleep tracking mode, nightstand mode, do not disturb mode, sleep mode, etc.). In some embodiments, the one or more modes conserve power (e.g., battery power) of external accessory device 790 (and/or computer system 700). In some embodiments, computer system 700 determines that the accessory-based unlocking criteria have been met based on a determination that the user wearing the external device is not asleep and/or not likely to be asleep (e.g., based on motion of computer system 700 and/or external accessory device 790, based on whether computer system 700 and/or external accessory device 790 is operating in the one or more modes).

In some embodiments, computer system 700 determines that the accessory-based unlocking criteria have been met based on a determination that a mask (e.g., mask 728) has been detected on the face of user 760. In some embodiments, computer system 700 determines that the accessory-based unlocking criteria have been met based on a determination that biometric authentication can be used to authorize the performance of the secure operation (e.g., via settings 770*a*-770*d* and 770*g* of FIG. 7M). In some embodiments, computer system 700 determines that the accessory-based unlocking criteria have been met using one or more criterion of the accessory device configuration criteria (e.g., discussed above in relation to FIGS. 7L-7P). In some embodiments, computer system 700 determines that the accessory device configuration criteria have been met (e.g., discussed above in relation to FIGS. 7L-7P) using one or more criterion of the accessory-based unlocking criteria.

While many different criteria have been discussed separately above for use in determining whether the accessory-based unlocking criteria have been met, it should be understood that, in some embodiments, multiple ones of the above-described criteria can be combined to determine whether or not the accessory-based unlocking criteria have been met. For example, two or more of the criteria are optionally required to be met in order for the accessory-based unlocking criteria have been met. In some embodiments, different sets of one or more of the above-described criteria can be used as alternatives for determining whether or not the accessory-based unlocking criteria have been met (e.g., the accessory-based criteria are met if criteria A and B are met or if criteria C and D are met; the accessory-based criteria are met if criteria A and B are met or if criteria C is met and criteria D is not met; or the accessory-based criteria are met if criteria A and C and E are met or if criterion F is met).

At FIG. 7T, because accessory-based unlocking criteria have been met, computer system 700 transitions from the locked state to an unlocked state. Because accessory-based unlocking criteria have been met, computer system 700 also replaces lock indicator 712*a* with unlock indicator 712*b* on display 710, as illustrated in FIGS. 7S-7T. In some embodiments, after displaying the user interface of FIG. 7T, computer system 700 can display one or more user interfaces that would have been previously restricted to the user if authentication were not successful, such as a screen with multiple application icons (e.g., as shown and described below in FIG. 7W) and/or a user interface that was previously displayed before computer system 700 was transitioned from the unlocked state to the locked.

Looking back at FIG. 7M and FIGS. 7Q-7T, if external accessory device 790 of FIG. 7Q corresponded to the watch that represented by watch-to-unlock-setting toggle 770*j* (e.g., "John's Silver 40 mm Watch"), accessory-based unlocking criteria would not have been met and computer system 700 would have continued to remain in the locked state because watch-to-unlock-setting toggle 770*j* is off (e.g., computer system 700 is not able to unlock via "John's Silver 40 mm Watch" at FIGS. 7S-7T). Alternative to FIGS. 7Q-7T, if external accessory device 790 of FIG. 7Q was unlocked but not being worn by user 760 (e.g., as shown in FIG. 7AA below), accessory-based unlocking criteria would not have been met, and computer system 700 would have continued to remain in the locked state because external accessory device 790 would not be worn by the user. Alternative to FIGS. 7Q-7T, if external accessory device 790 of FIG. 7Q was locked but being worn by user 760, accessory-based unlocking criteria would not have been met, and computer system 700 would have continued to remain in the locked state because external accessory device 790 was locked. In some embodiments, accessory-based unlocking criteria can include other criteria that are required to be met as described below in relation to FIGS. 7AA-7AH, FIGS. 8A-8E, FIG. 9, FIGS. 10A-10B, and FIGS. 11A-11B and/or one or more other similar or different criteria than those discussed herein.

Figure 7U:
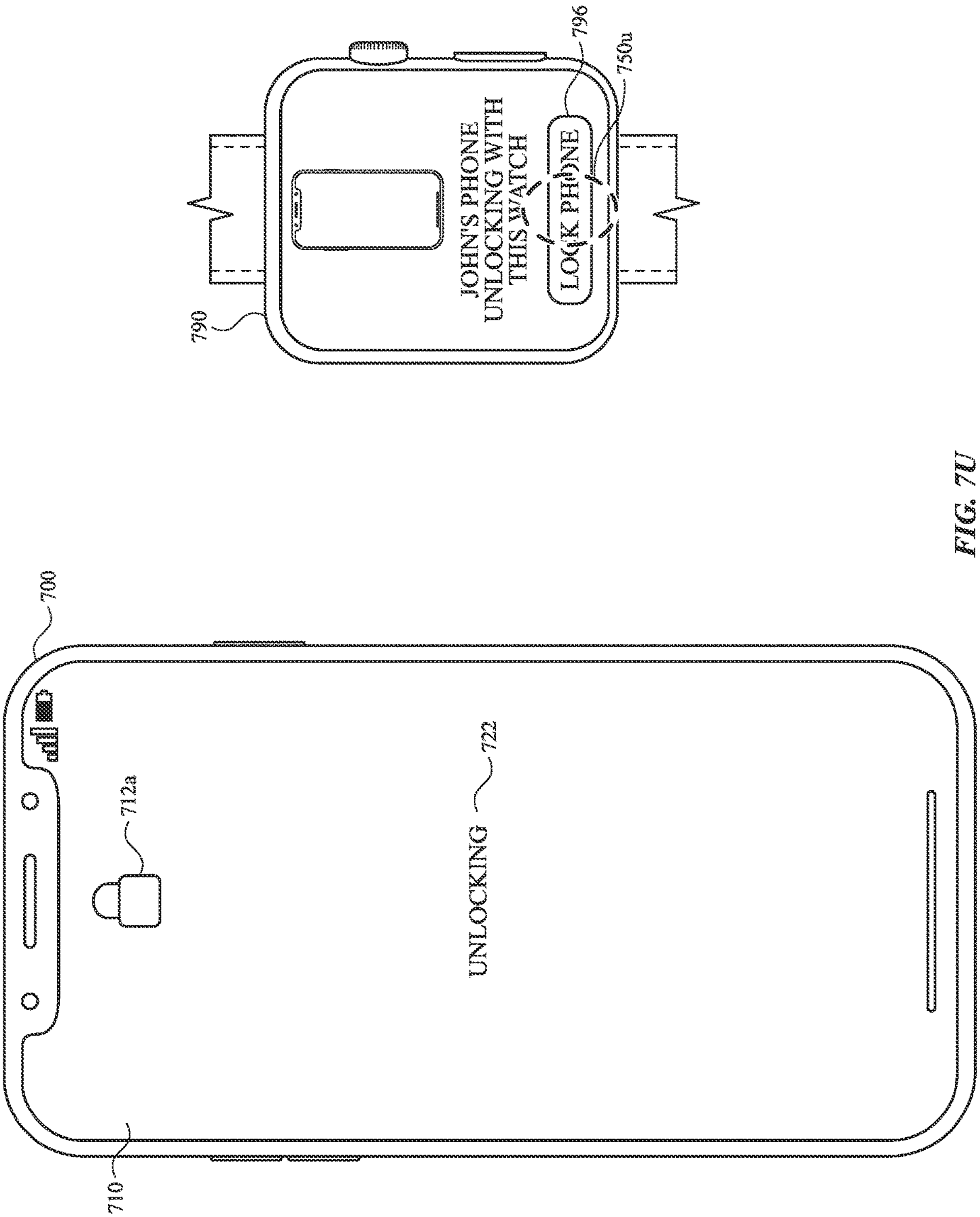

FIGS. 7U-7T illustrate exemplary user interfaces that computer system 700 and external accessory device 790 can display when a determination is being made concerning accessory-based unlocking criteria are met. At FIG. 7U, a determination is being made concerning whether accessory-based unlocking criteria have been met. As illustrated in FIG. 7U, computer system 700 is displaying a user interface using one or more techniques that are similar to those discussed above in relation to displaying the user interface of FIG. 7T (e.g., with unlock indicator 712*b*). In some embodiments, instead of displaying the user interface of FIG. 7U, computer system 700 displays a user interface using one or more techniques that are similar to those discussed above in relation to displaying the user interface of FIG. 7S (e.g., with lock indicator 712*a*).

As illustrated in FIG. 7U, because a determination is being made concerning whether accessory-based unlocking criteria are met, external accessory device 790 displays a user interface that includes an indication that external accessory device 790 is being used to unlock computer system 700 (e.g., "John's Phone unlocking with this watch") and lock-phone affordance 796 (e.g., "Lock Phone") on display 710. At FIG. 7U, external accessory device 790 detects tap gesture 750*u* on lock-phone affordance 796. In response to detecting tap gesture 750*u*, external accessory device 790 transmits an instruction to computer system 700 that corresponds to a request to cancel the unlock operation (and/or maintain computer system 700 in the locked state). In some embodiments, external accessory device 790 can detect another gesture, such as a cover gesture that covers the display of a portion of the display of external accessory device 790, that causes external accessory device 790 to transmit an instruction to computer system 700 that corresponds to a request to cancel the unlock operation (and/or maintain computer system 700 in the locked state).

Figure 7V:
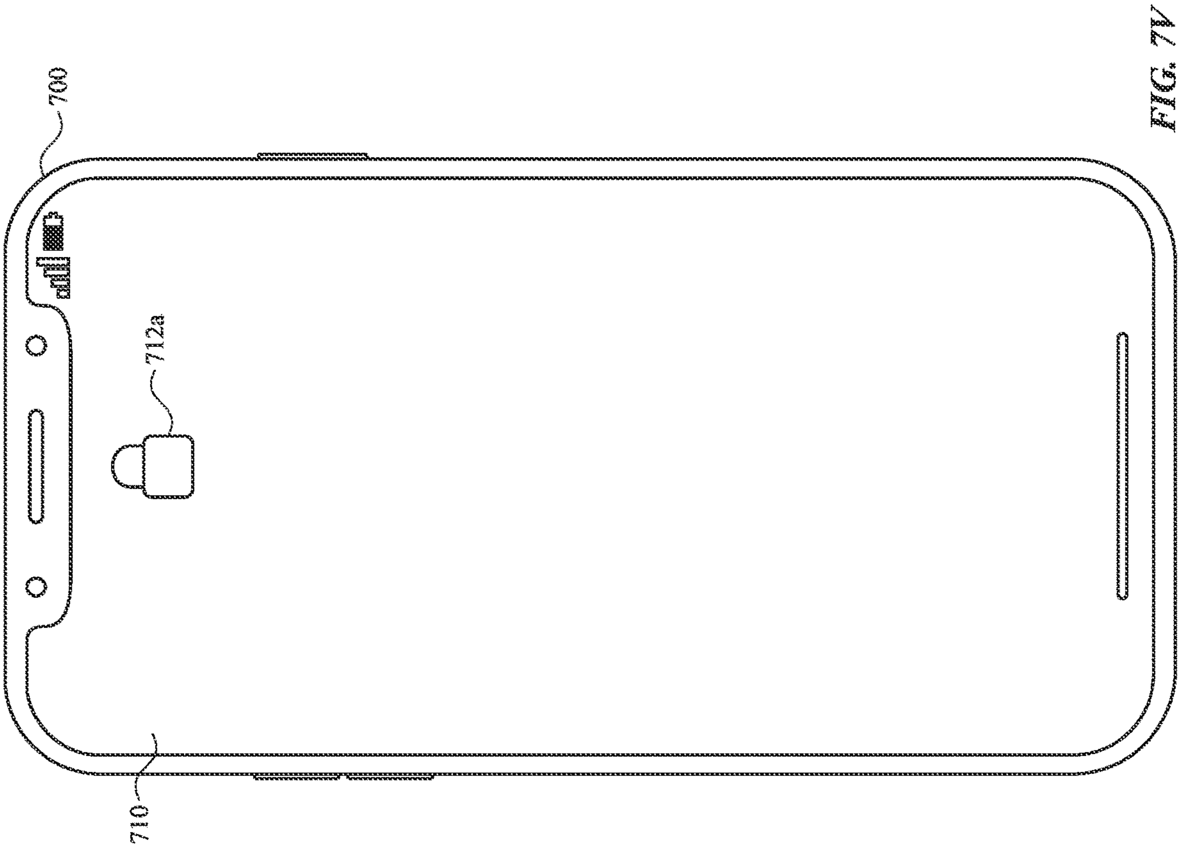

At FIG. 7V, in response to receiving the instruction that corresponds to a request to cancel the unlock operation, computer system 700 continues to be in the locked state and cancels the unlocking operation (e.g., is not transitioned to the unlocked state, irrespective of whether accessory-based unlocking criteria are met). In some embodiments, computer system 700 stops determining whether accessory-based unlocking criteria are met in response to receiving the instruction that corresponds to the request to cancel the unlock operation. As illustrated in FIG. 7V, in response to receiving the instruction that corresponds to a request to cancel the unlock operation, computer system 700 displays lock indicator 712*a* on display 710 to indicate that computer system 700 is in the locked state. In some embodiments, computer system 700 displays a different user interface other than the user interface of FIG. 7V (e.g., the user interface of FIG. 7R) or displays the different user interface in addition to the user interface of FIG. 7V in response to receiving the instruction that corresponds to a request to cancel the unlock operation, computer system 700.

Figure 7W:
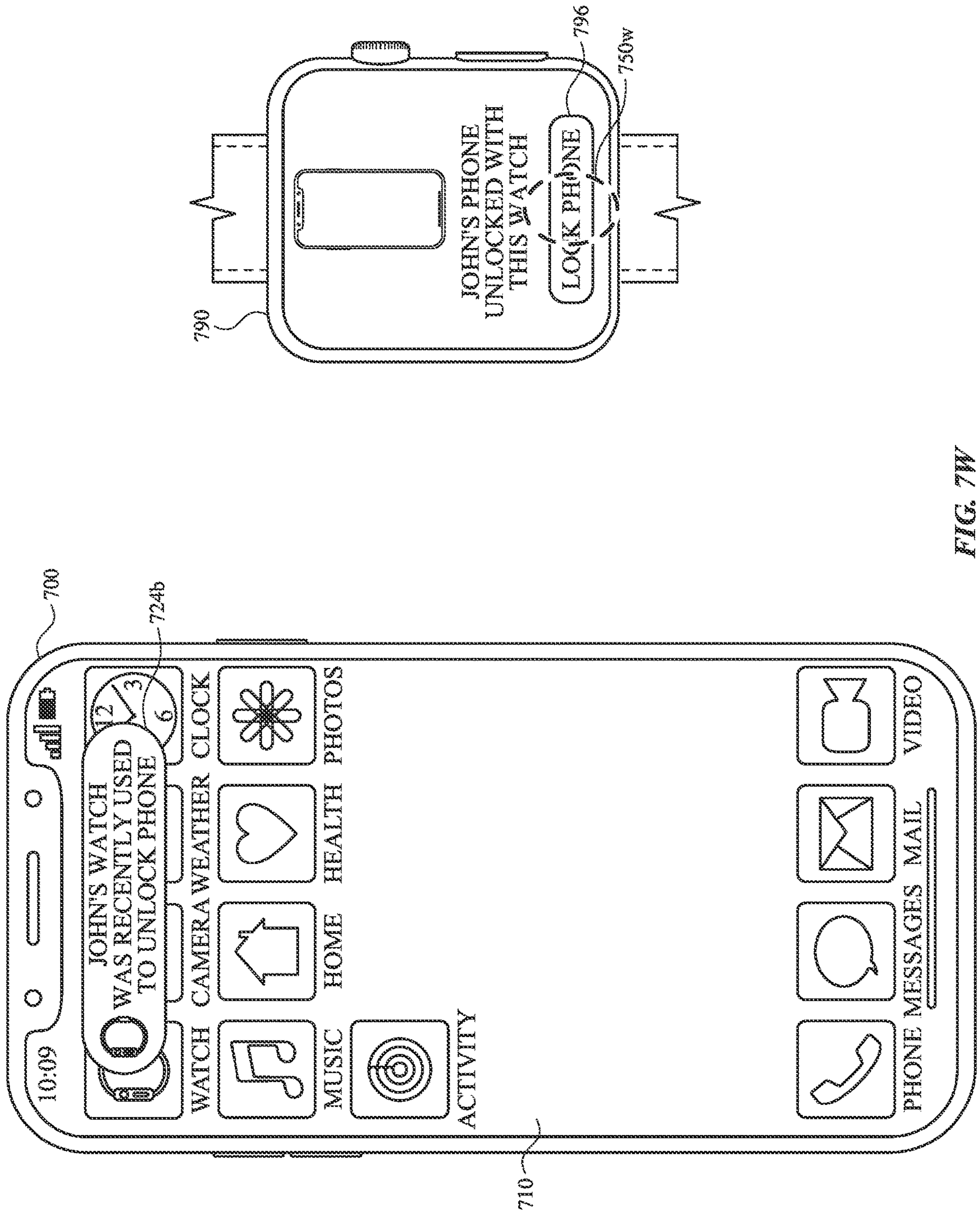
Figure 7X:
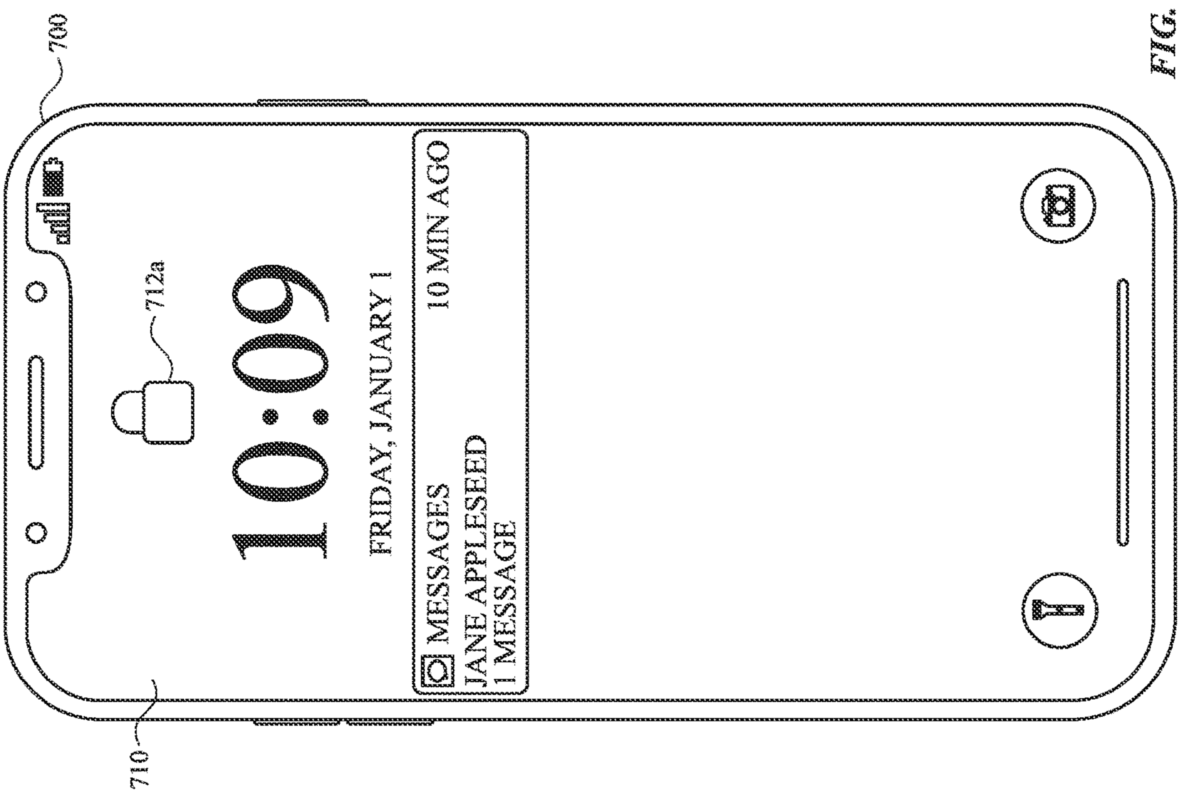

FIGS. 7W-7X illustrate exemplary user interfaces that computer system 700 and external accessory device 790 can display when a determination has been made that accessory-based unlocking criteria have been met. In some embodiments, the user interface of FIG. 7W is displayed, in lieu of or after, the user interface of FIG. 7T.

As illustrated in FIG. 7W, computer system 700 displays notification 724*b* because a determination has been made that accessory-based unlocking criteria have been met. Notification 724*b* includes an indication that external accessory device 790 has been used to unlock computer system 700 (e.g., "John's watch was recently used to unlock phone"). As illustrated in FIG. 7W, external accessory device 790 also displays an indication that external accessory device 790 has been used to unlock computer system 700 (e.g., "John's Phone unlocked with this watch") because a determination has been made that accessory-based unlocking criteria have been met. In addition, external accessory device 790 displays lock-phone affordance 796 (e.g., "Lock Phone"). At FIG. 7W, external accessory device 790 detects tap gesture 750*w* on lock-phone affordance 796. In response to detecting tap gesture 750*w*, external accessory device 790 transmits an instruction to computer system 700 that corresponds to a request to cancel the unlock operation (and/or revert computer system 700 back to the locked state). In some embodiments, external accessory device 790 can detect another gesture, such as a cover gesture that covers the display of a portion of the display of external accessory device 790, that causes external accessory device 790 to transmit an instruction to computer system 700 that corresponds to a request to cancel the unlock operation (and/or revert computer system 700 back to the locked state).

At FIG. 7X, in response to receiving the instruction that corresponds to a request to cancel the unlock operation, computer system 700 transitions from the unlocked state to the locked state. As illustrated in FIG. 7X, computer system 700 displays a user interface with lock indicator 712*a* (e.g., using similar techniques to those discussed above in relation to FIG. 7R) on display 710. In some embodiments, computer system 700 and external accessory device 790 display the user interfaces of FIG. 7W on display 710 after displaying the user interfaces of FIG. 7U if no gesture has been detected on lock-phone affordance 796. Thus, in some embodiments, computer system 700 and external accessory device 790 transition from displaying user interfaces that indicate that external accessory device 790 is being used to unlock the computer system to user interfaces that indicate that external accessory device 790 has been used to unlock the computer system.

Figure 7Y:
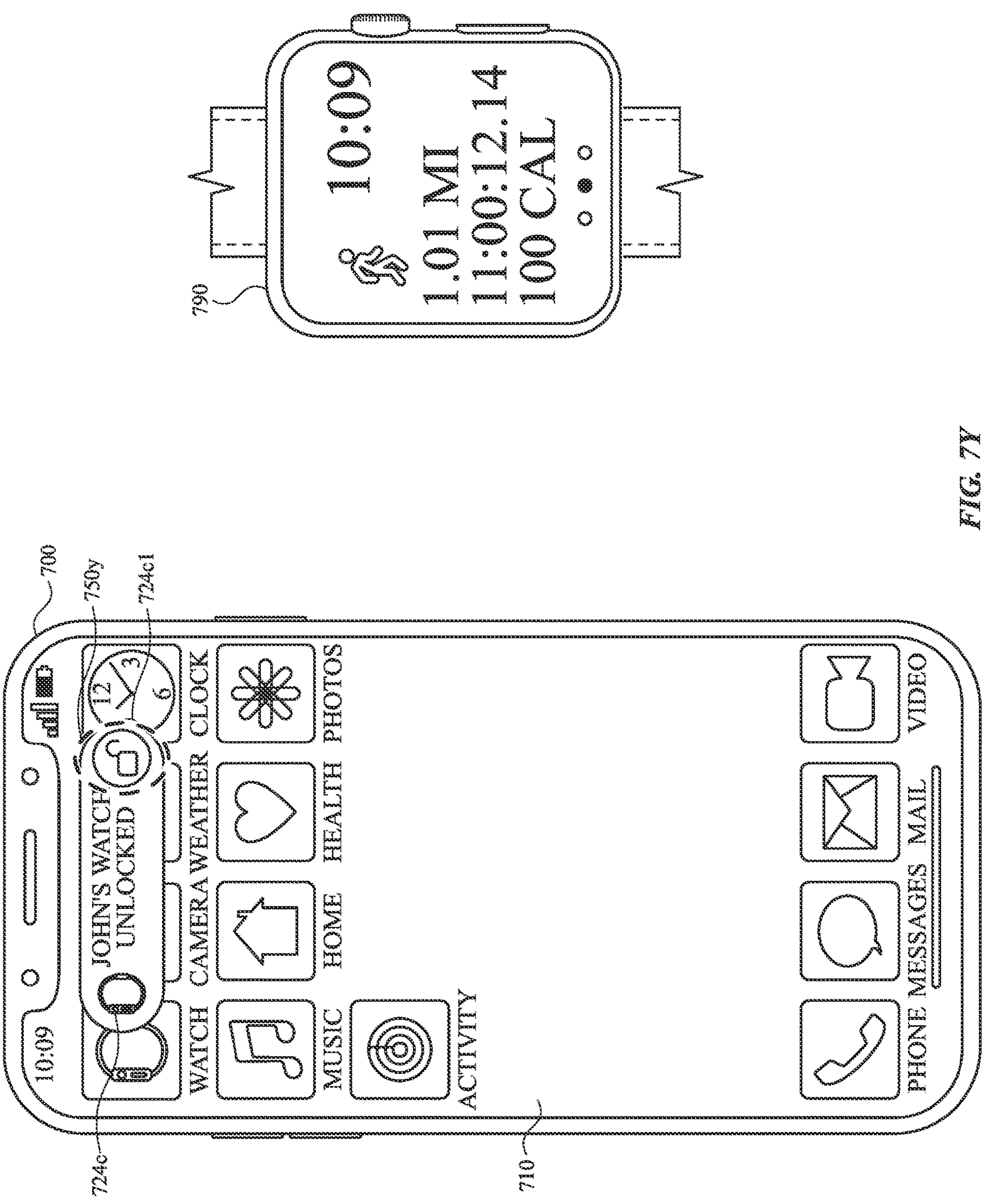
Figure 7Z:
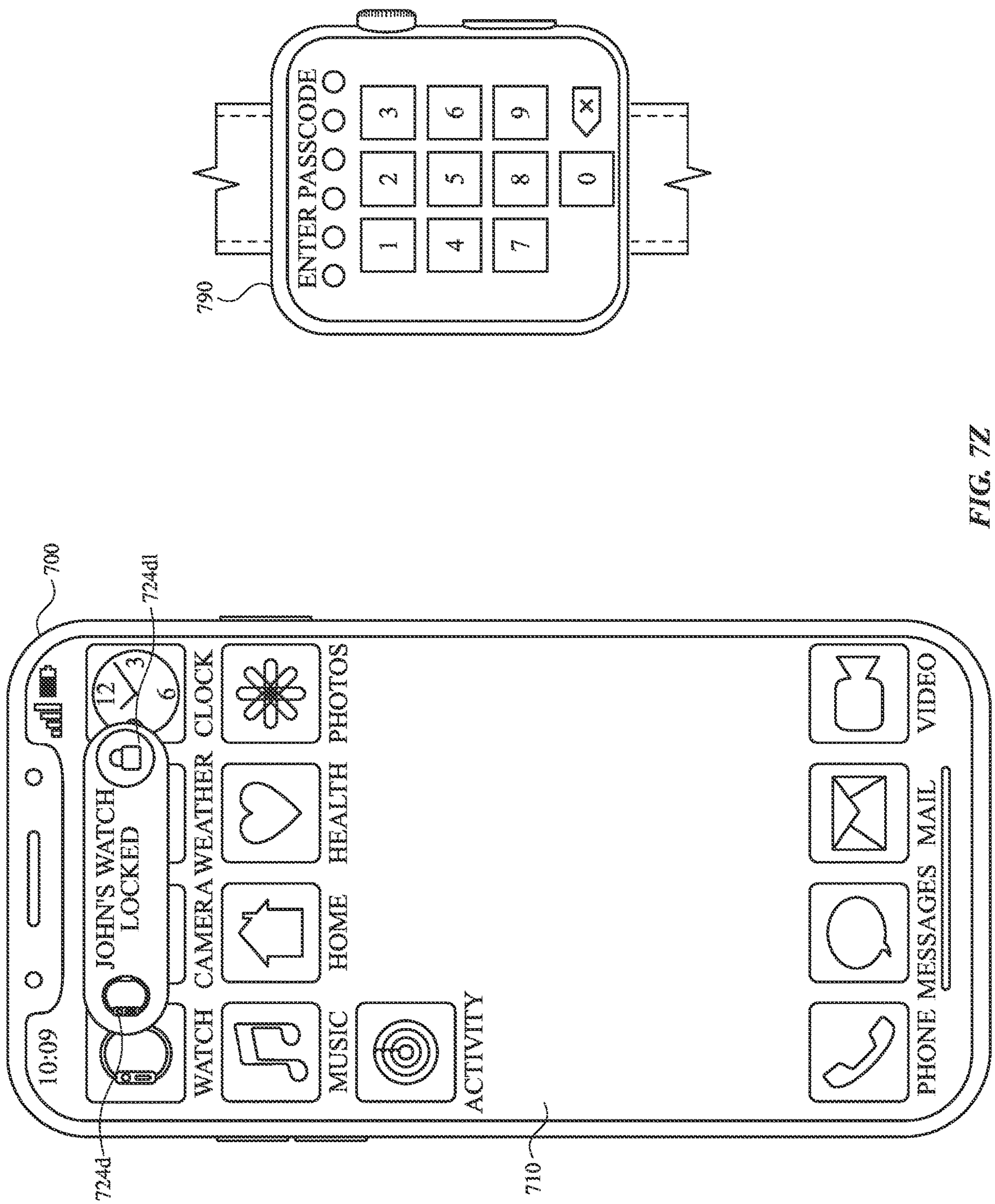
Figure 7A:
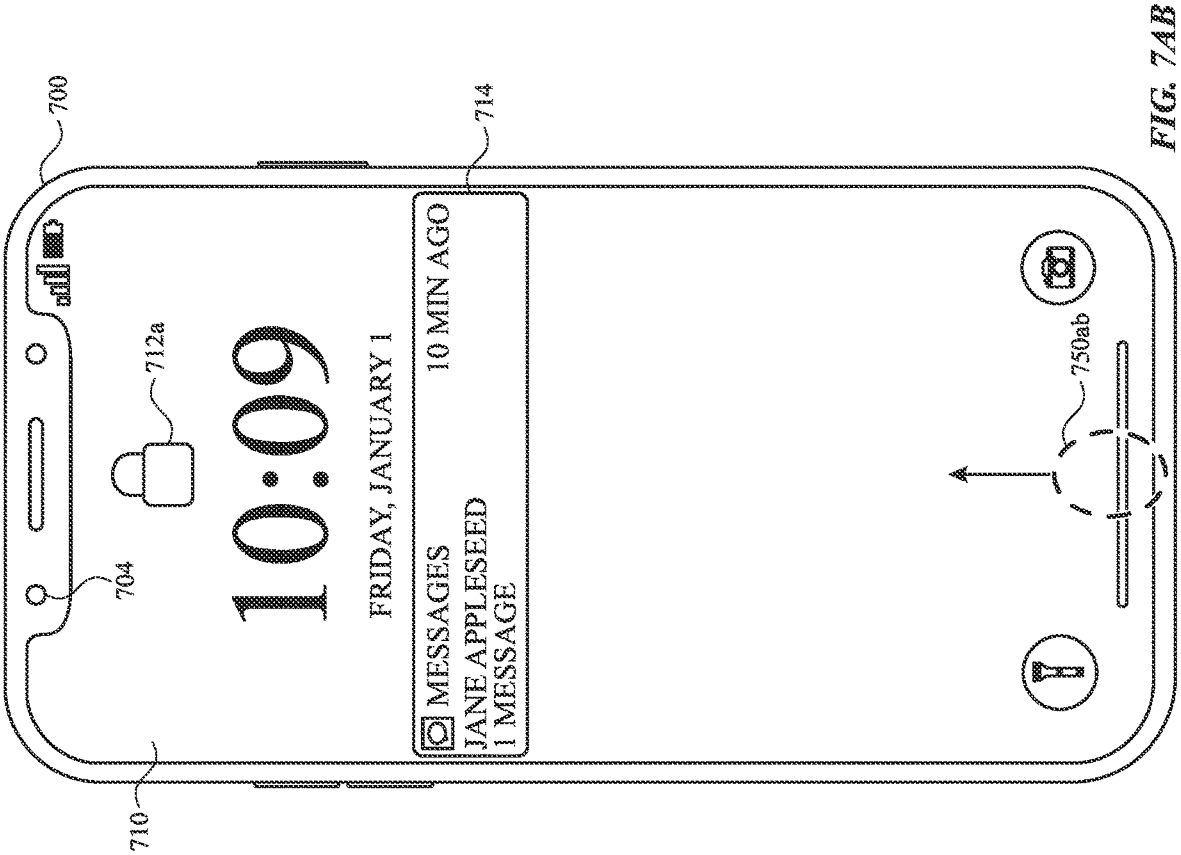
Figure 7A:
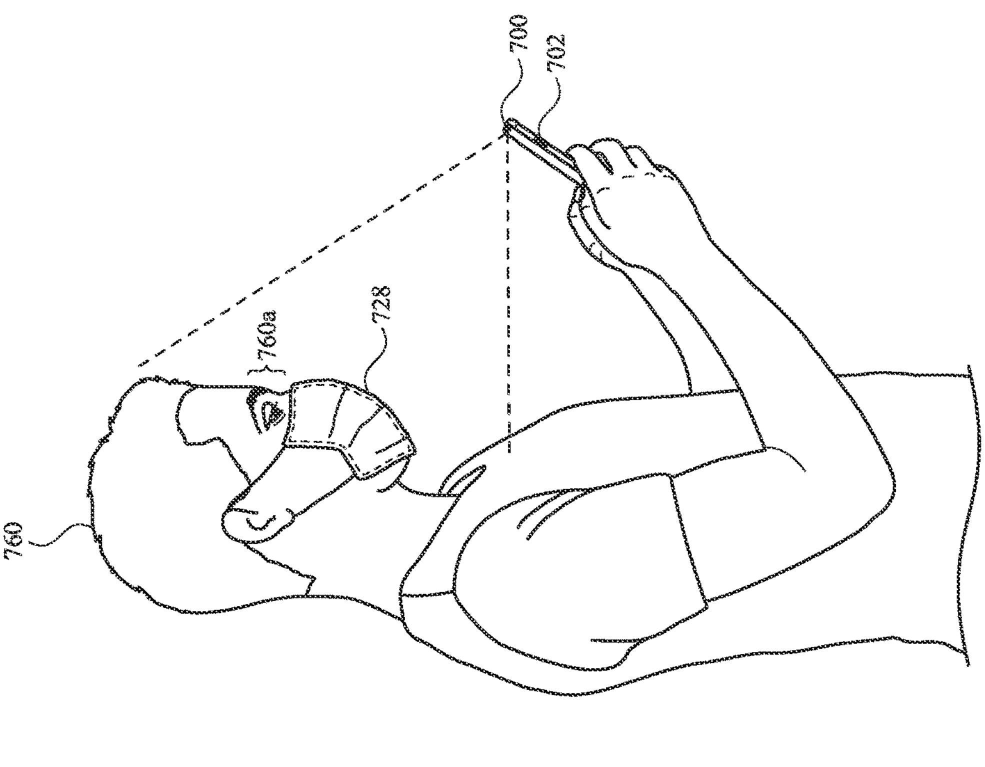
Figure 7A:
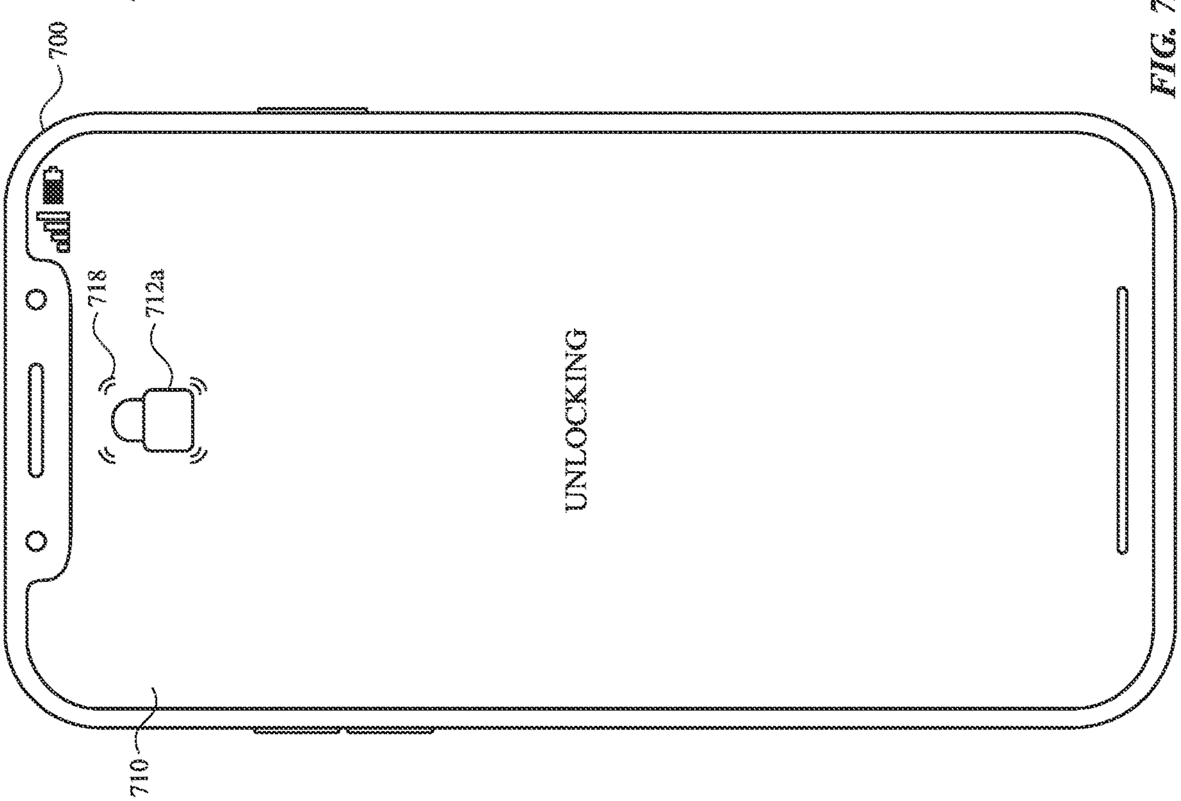
Figure 7A:
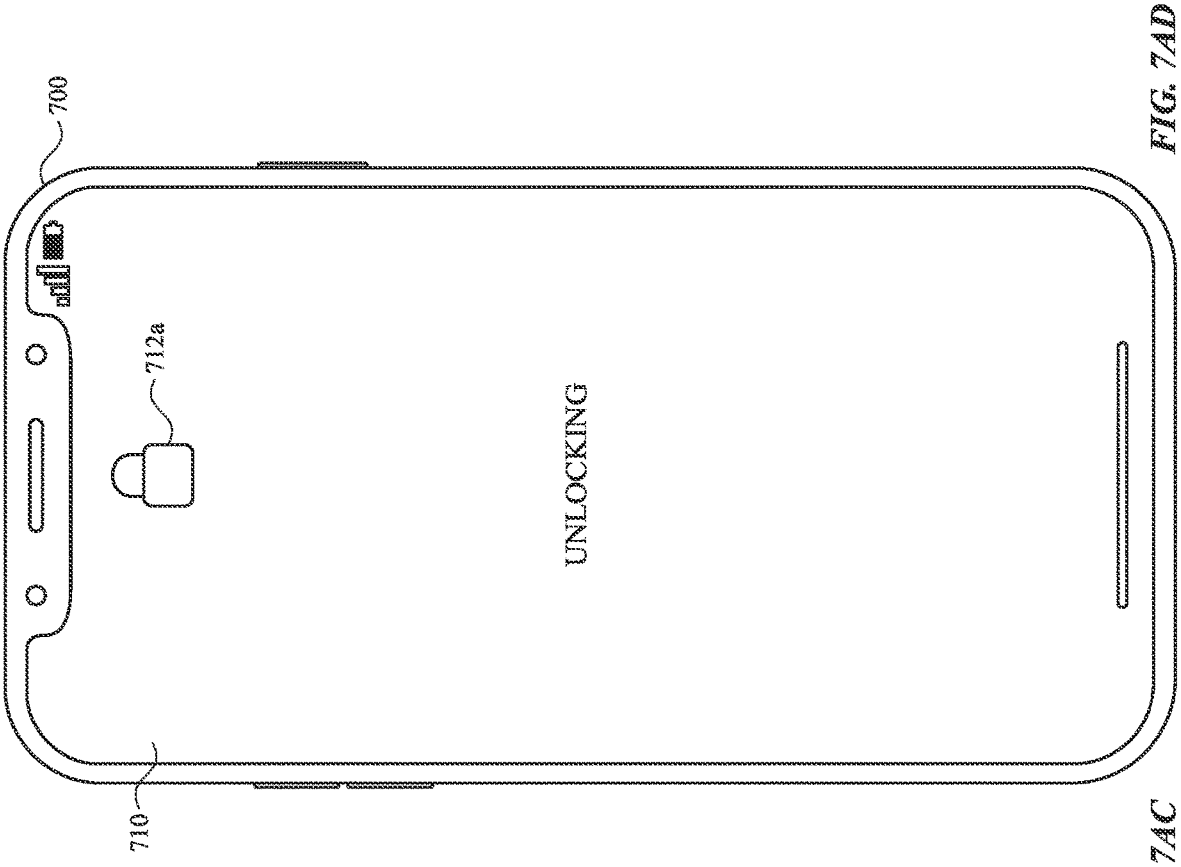
Figure 7A:
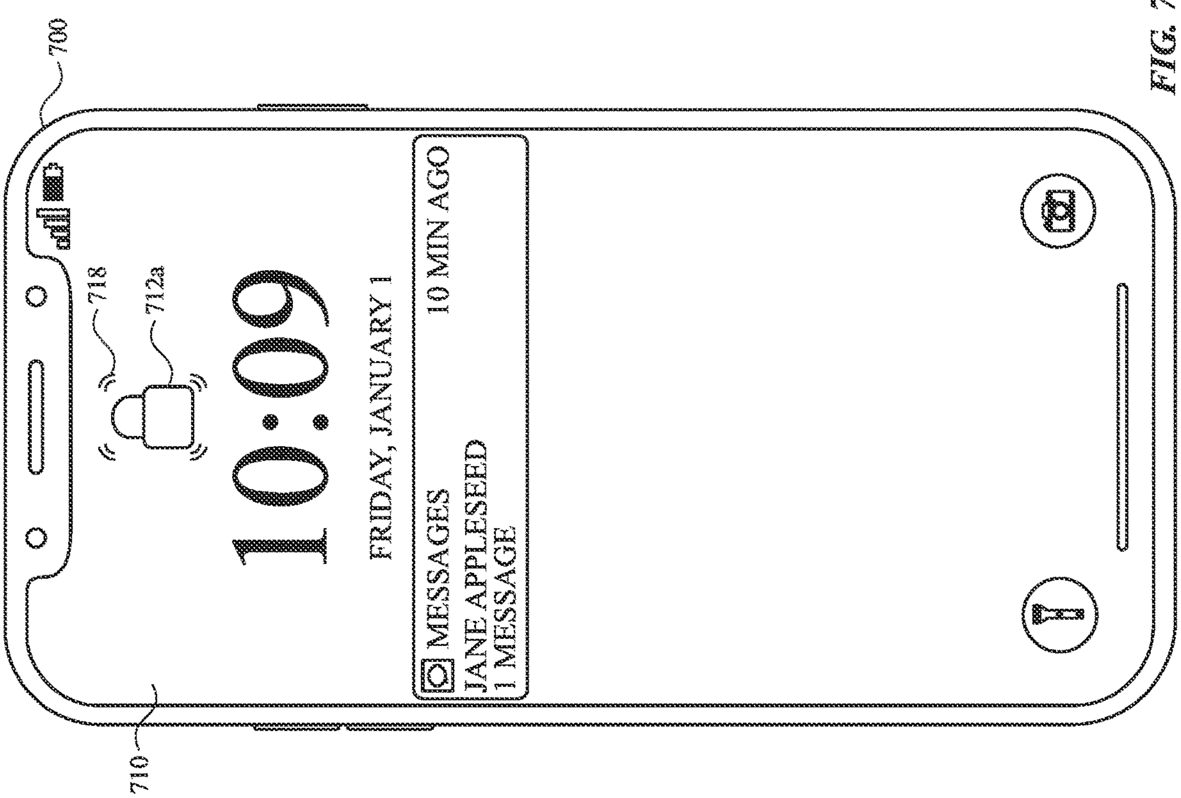
Figure 7A:
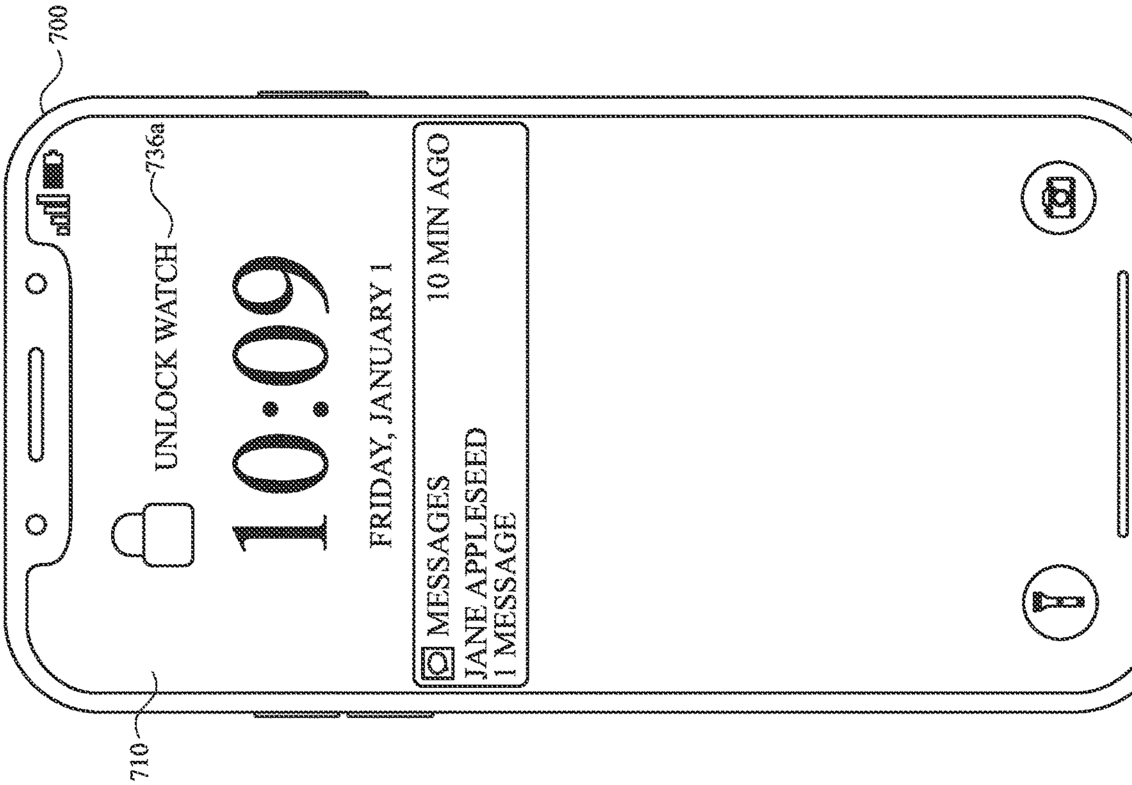
Figure 7A:
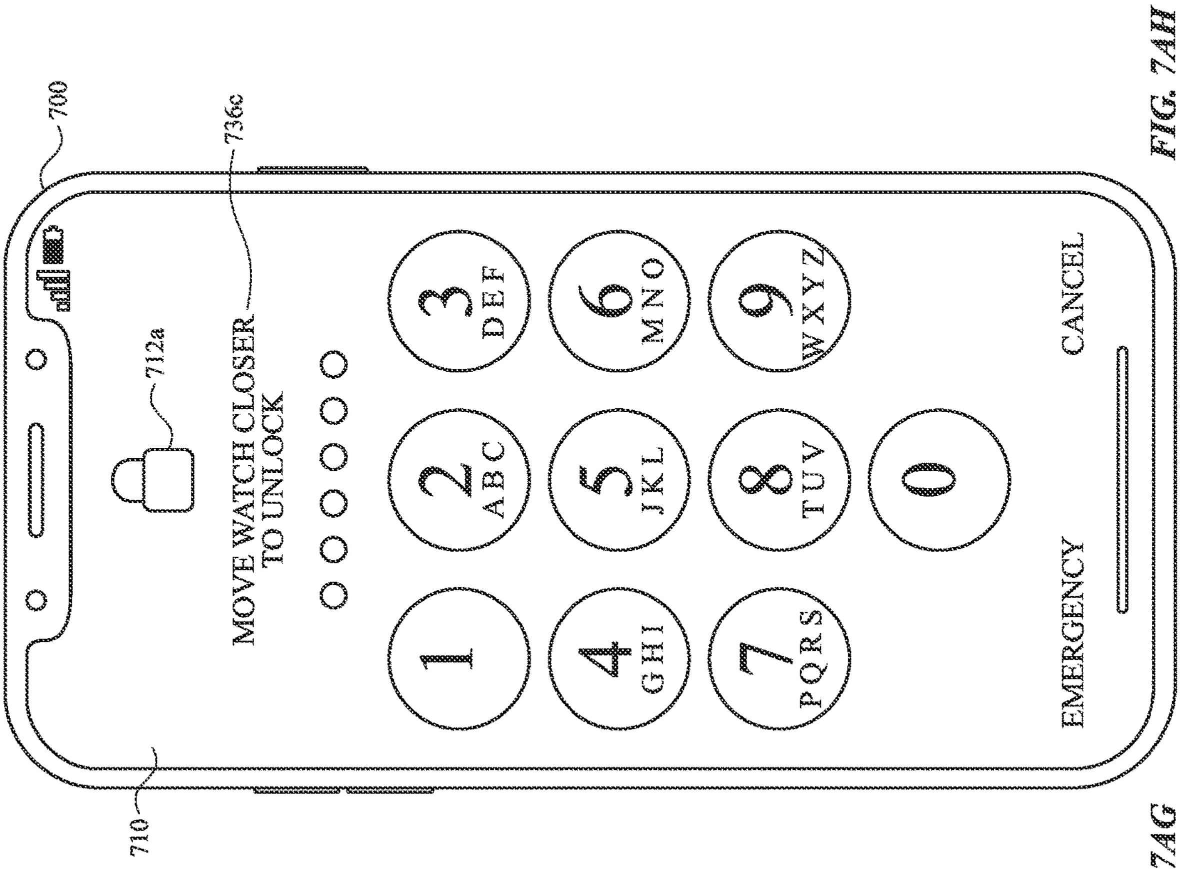
Figure 7A:
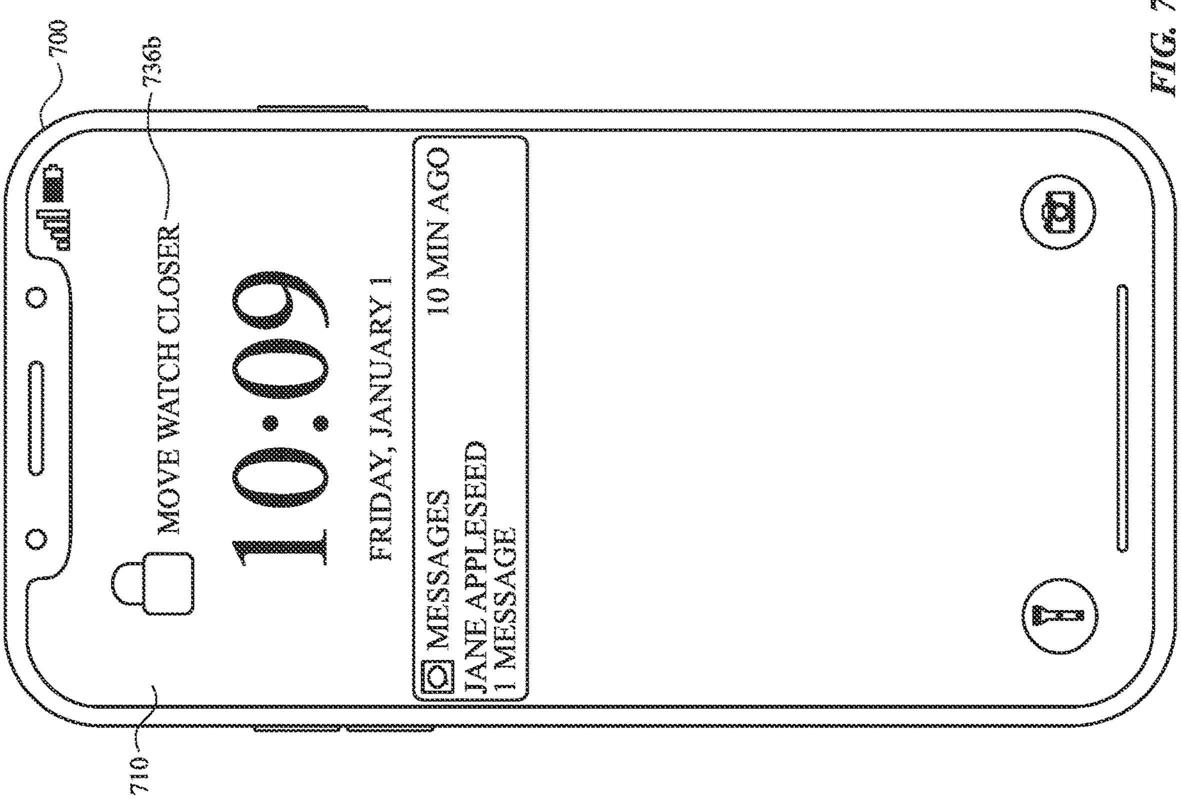
Figure 7A:
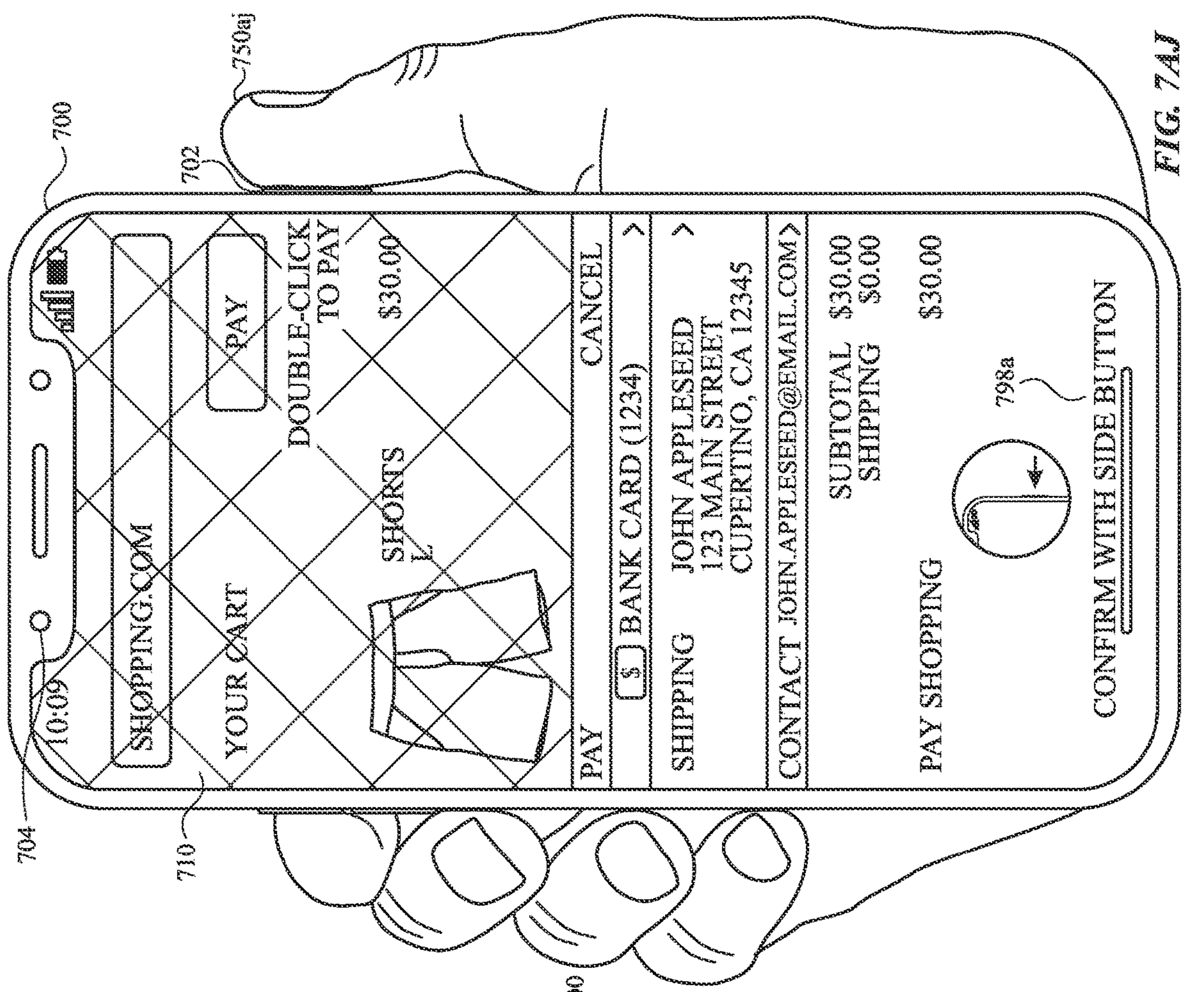
Figure 7A:
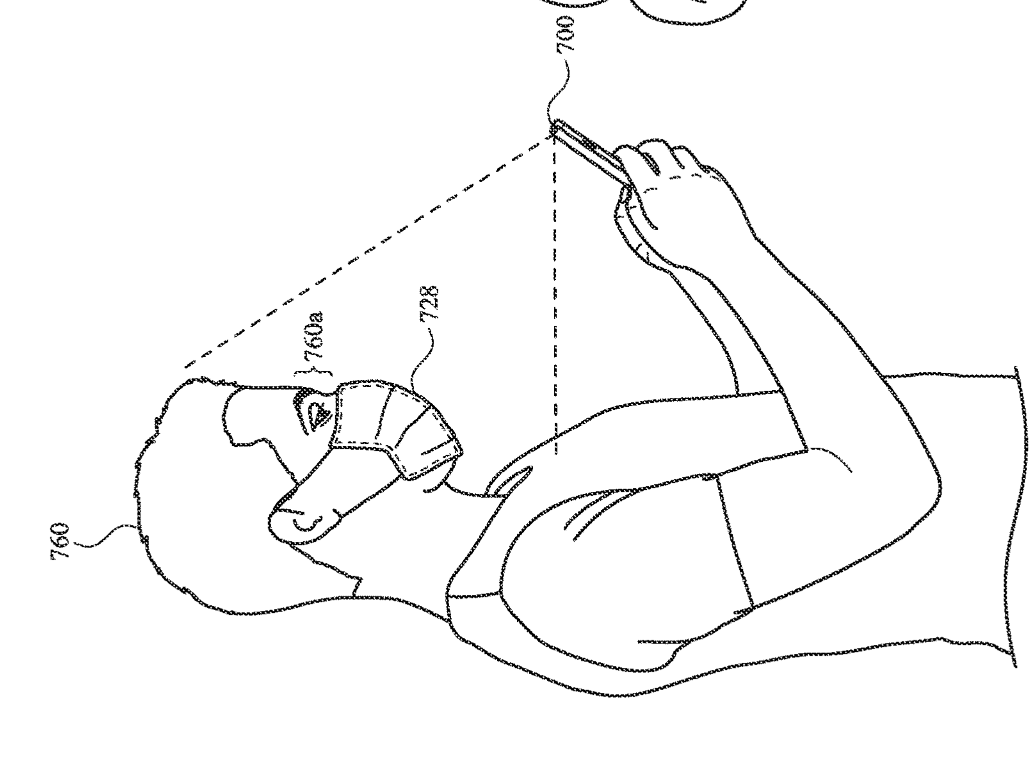
Figure 7A:
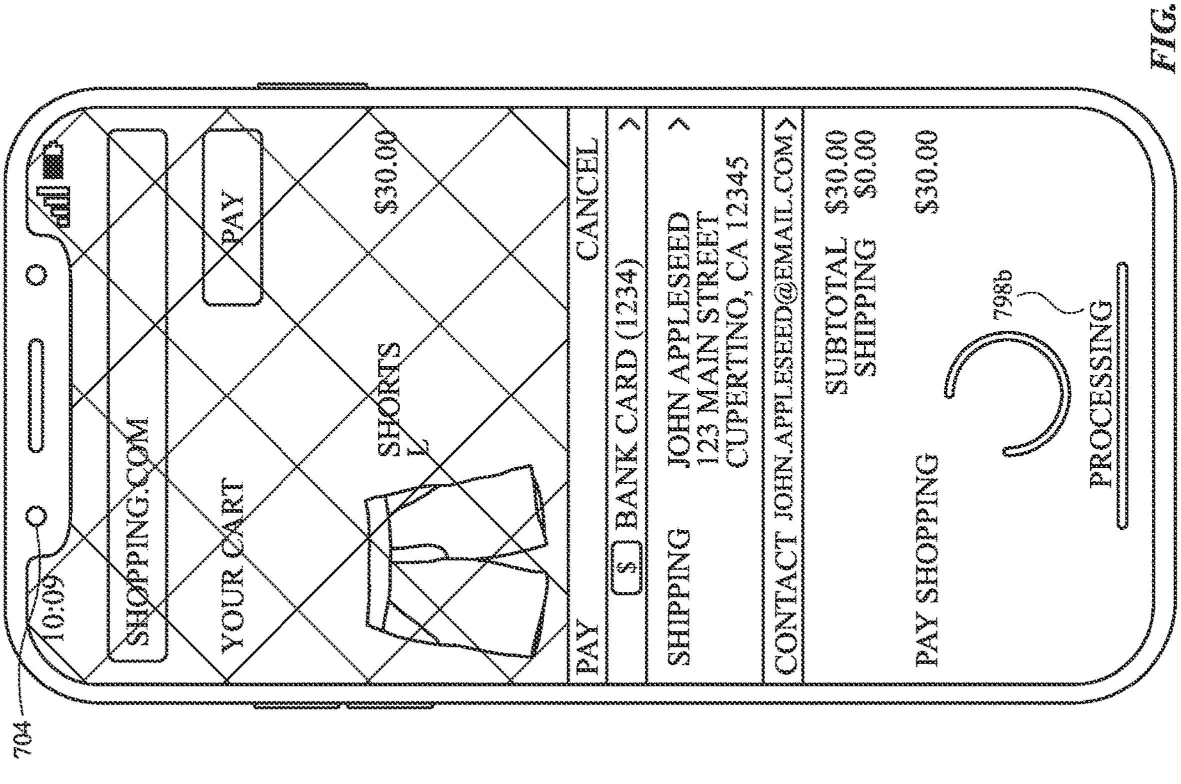
Figure 7A:
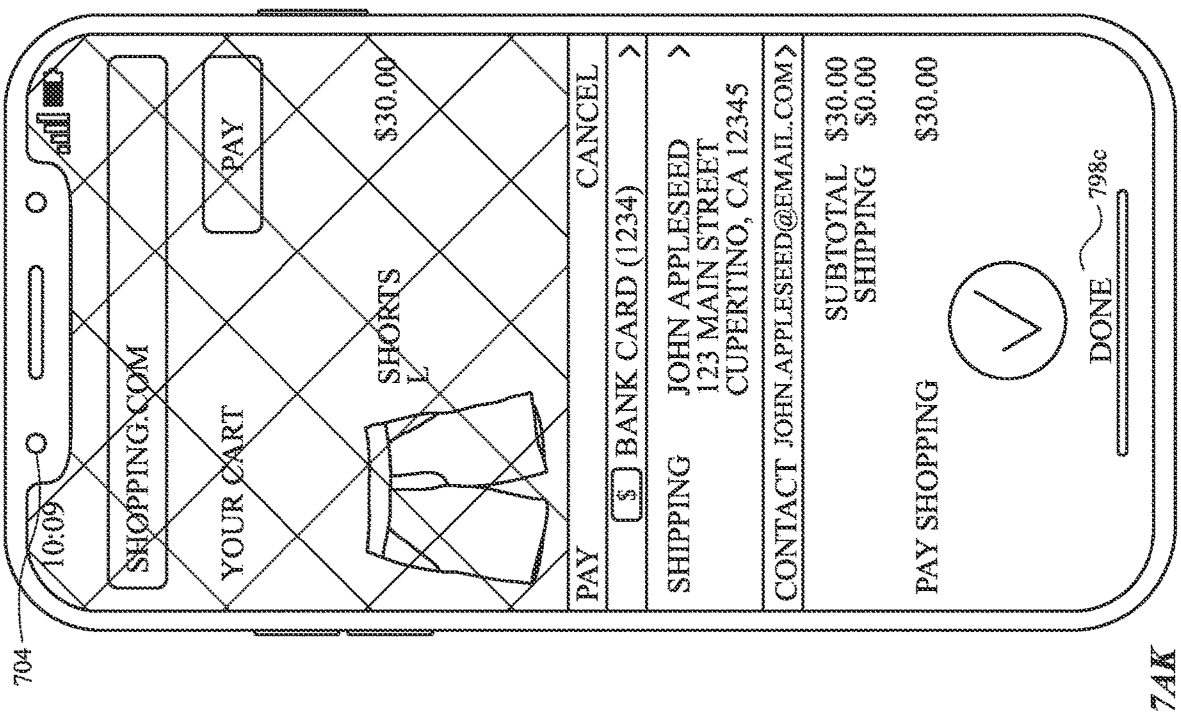
Figure 7A:
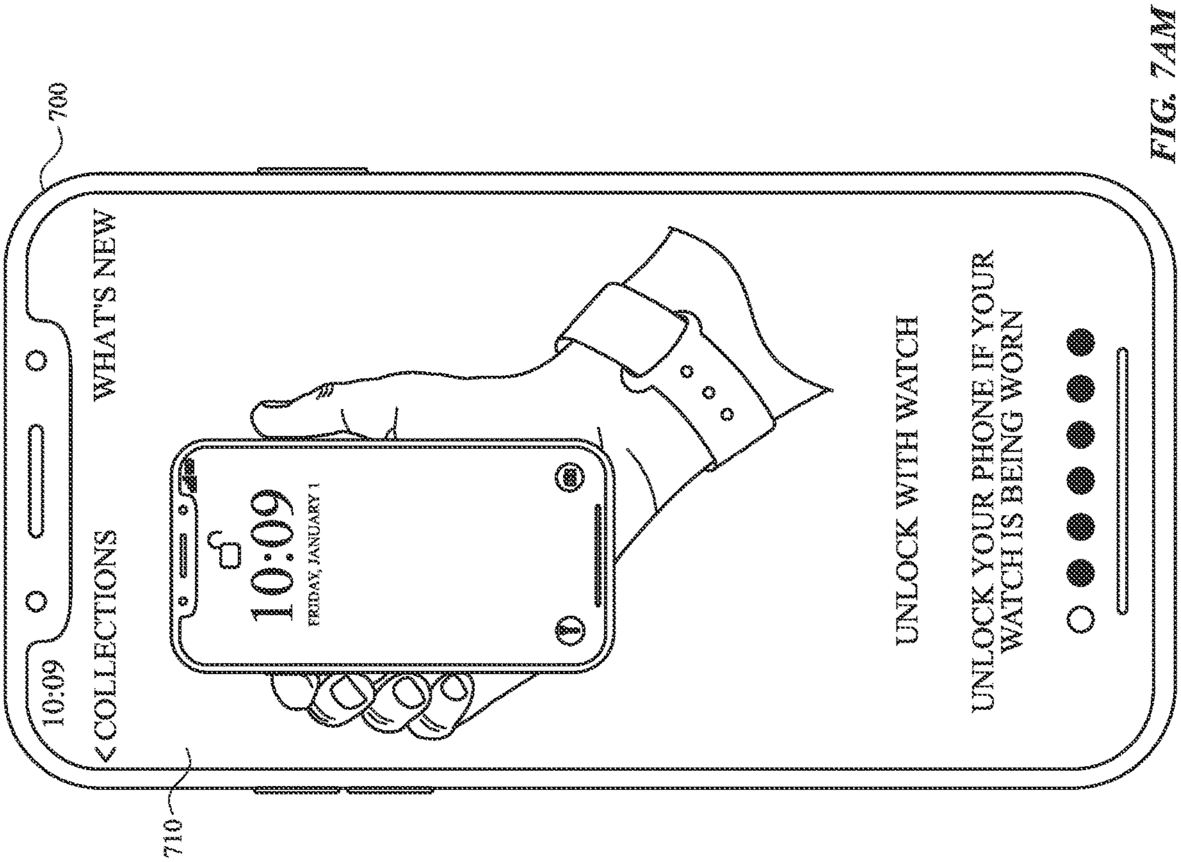

FIGS. 7Y-7Z illustrate exemplary user interfaces that computer system 700 and external accessory device 790 can display when a determination is made that external accessory device 790 has been and/or is unlocked. The user interfaces and/or the components of the user interfaces discussed below in relation to FIGS. 7Y-7Z can be displayed at any point in time where there is a determination that that external accessory device 790 has been unlocked.

At FIG. 7Y, external accessory device 790 is unlocked (e.g., displaying a workout interface). As illustrated in FIG. 7Y, computer system 700 displays a user interface that includes notification 724*c* because a determination is made external accessory device 790 has been unlocked. Notification 724*c* is displayed as being overlaid on top of a user interface that includes a plurality of icons. However, notification 724*c* could also be displayed on top of any other user interface. Notification 724*c* includes an indication that external accessory device 790 is unlocked (e.g., "John's watch unlocked") and unlock affordance 724*c*1. At FIG. 7Y, computer system 700 detects tap gesture 750*y* on unlock affordance 724*c*1.

At FIG. 7Y, in response to detecting tap gesture 750*y*, computer system 700 sends instructions to external accessory device 790 that causes external accessory device 790 to transition from the unlocked state to a locked state (e.g., as shown in FIG. 7Z, where external accessory device 790 is displaying a passcode screen).

As illustrated in FIG. 7Z, because a determination is made external accessory device 790 is now locked, computer system 700 replaces notification 724*c* with notification 724*d*. Notification 724*d* indicates that external accessory device 790 has been locked and includes lock affordance 724*dl*. In some embodiments, in response to detecting a gesture on lock affordance 724*d*1 (e.g., within a predetermined time frame of displaying notification 724*d* (e.g., 1-10 seconds), computer system 700 sends instructions to external accessory device 790 that causes external accessory device 790 to transition from the unlocked state to a locked state.

With reference to FIG. 7Y, in some embodiments, computer system 700 detects a tap gesture on another portion of notification 724*c* (e.g., a portion that does not include unlock affordance 724*c*1), and in response to detecting the tap gesture on the other portion of notification 724*c*, computer system 700 performs an operation (e.g., displays further details concerning notification 724*c*) without sending instructions to external accessory device 790 that causes external accessory device 790 to transition from the unlocked state to the locked state.

FIGS. 7AA-7AD illustrate an exemplary scenario where a user, as shown in FIG. 7AA, is not able to successfully unlock computer system 700 (e.g., as shown in FIGS. 7AA-7AD) using biometric data because biometric authentication is unsuccessful and accessory-based unlocking criteria is not met (e.g., because user 760 is not wearing external accessory device 790).

FIG. 7AA illustrates user 760 holding computer system 700 without wearing external accessory device 790. In FIG. 7AA, user 760 is wearing mask 728. FIG. 7AA occurs while watch-to-unlock-setting toggle 770*i* is in the on state.

FIGS. 7AB-7AD illustrate one or more exemplary user interfaces that are displayed on display 710 of computer system 700. In particular, the one or more exemplary user interfaces of FIG. 7AB-7AD are described in relation to an exemplary scenario where user 760 attempts to use biometric authentication (e.g., while wearing a mask) to unlock computer system 700 while user 760 and computer system 700 are oriented and in a state as depicted and described above in relation to FIG. 7AA.

At FIG. 7AB, device 700 displays notification 714 thereby informing user 760 that a message from John Appleseed has been received. User 760 wishes to view the restricted content of notification 714 (e.g., the message from John Appleseed) but is unable to do so, as computer system 700 is currently in a locked state. As illustrated in FIG. 7AB, computer system 700 displays a locked state user interface with lock indicator 712*a*, which provides an indication that computer system 700 is in a locked state. At FIG. 7AB, computer system 700 detects upward swipe gesture 750*ab* on user interface object 716 and determines that a request to perform a secure operation (e.g., a request to initiate biometric authentication) has been received because an unlock gesture, such as an upward swipe gesture 750*ab*, was detected.

At FIG. 7AB, in response to detecting upward swipe gesture 750*ab* and determining that the request to perform a secure operation has been received, computer system 700 initiates biometric authentication. After initiating biometric authentication (e.g., prior to successful authentication), computer system 700 determines that a face is detected by biometric sensor 704 and determines that biometric authentication is unsuccessful (e.g., user is wearing a mask and biometric sensor 704 can only capture a portion of the face of user 760) using one or more similar techniques like those discussed above in relation to FIG. 7R. Upon determining that biometric authentication has been unsuccessful, computer system 700 determines whether accessory-based unlocking criteria is met.

At FIG. 7AB, sometime while determining whether accessory-based unlocking criteria is met, computer system 700 displays accessory-based unlocking status 722 on display 710 (e.g., using one or more similar techniques to those described in relation to FIG. 7S). At FIG. 7AB, computer system 700 determines that accessory-based unlocking criteria have not been met because external accessory device 790 has not been detected to be worn by user 760 (e.g., irrespective of whether external accessory device 790 is currently in an unlocked state and that setting is enabled that would allow computer system 700 to be unlocked using external accessory device 790). At FIG. 7AC-7AD, computer system 700 continues to be in the locked state and displays user interfaces using techniques as described above in relation to FIGS. 7G-7H (e.g., continues displaying lock indicator 712*a*) because accessory-based unlocking criteria have not been met.

FIGS. 7AE-7AH illustrate exemplary user interfaces that computer system 700 can display when a determination is made that external accessory device 790 does not meet accessory-based unlocking criteria. FIG. 7AE illustrates an exemplary user interface where lock indicator 712*a* and shake output indicator 718 is displayed based on a determination that external accessory device 790 does not meet accessory-based unlocking criteria. In some embodiments, computer system 700 provides a haptic output at FIG. 7AE. In some embodiments, the user interface of FIG. 7AE is displayed after computer system 700 displays the user interface of FIG. 7AB (e.g., without displaying the user interfaces of FIG. 7AC and/or FIG. 7AD). In some embodiments, the user interface of FIG. 7AE is displayed when a request to perform a secure operation that is not based on an upward swipe gesture has been received (e.g., lifting of computer system 700 has been detected).

FIG. 7AF illustrates an exemplary user interface that is displayed using one or more techniques as described above in relation to FIG. 7AE. In FIG. 7AF, computer system 700 displays notification 736*a*, which indicates that external accessory device 790 needs to be unlocked before computer system 700 can be unlocked using external accessory device 790 (e.g., "Unlock Watch"). In particular, computer system 700 displays notification 736*a* when external accessory device 790 does not meet accessory-based unlocking criteria because a determination has been made that external accessory device 790 is locked (or not unlocked).

FIG. 7AG illustrates an exemplary user interface that is displayed using one or more techniques as described above in relation to FIG. 7AE. In FIG. 7AG, computer system 700 displays notification 736*b*, which indicates that external accessory device 790 needs to be positioned closer to computer system 700 before computer system 700 can be unlocked via external accessory device 790 (e.g., "Move Closer"). In particular, computer system 700 displays notification 736*b* when external accessory device 790 does not meet accessory-based unlocking criteria because external accessory device 790 is not close enough to computer system 700. In some embodiments, computer system 700 can display a notification that includes the contents of notification 736*a* and 736*b* when a determination is made that multiple criteria have not been met.

FIG. 7AH illustrates an exemplary user interface that is displayed on a password user interface (e.g., as described above in relation to FIG. 7J). As illustrated in FIG. 7AH, computer system 700 displays notification 736*c*, which indicates that external accessory device 790 needs to be positioned closer to computer system 700 before computer system 700 can be unlocked using external accessory device 790 (e.g., "Move Closer to unlock"). With reference to FIGS. 7AG-7AH, notification 736*c* of FIG. 7AH is more verbose than notification 736*b* of FIG. 7AG, even though both notifications are displayed when external accessory device 790 does not meet accessory-based unlocking criteria because external accessory device 790 is not close enough to computer system 700. Thus, a notification that informs the user as to why criteria are net met can be displayed differently on different user interfaces. In some embodiments, notification 736*c* of FIG. 7AH contains the same content as notification 736*b* of FIG. 7AG. In some embodiments, computer system 700 displays one or more other notifications in response to determining that external accessory device 790 does not meet accessory-based unlocking criteria based on not meeting other criteria than those discussed above in relation to FIGS. 7AA-7AH. In some embodiments, other criteria can include a criterion that is satisfied when the external accessory device is connected to computer system 700, a criterion that is satisfied when the external accessory device and/or computer system 700 is connected to Wi-Fi, one or more criteria discussed in relation to FIGS. 8A-8E, FIG. 9, FIGS. 10A-10B, and FIGS. 11A-11B.

FIGS. 7AI-7AL illustrate exemplary user interfaces that computer system 700 can display when a user is able to successfully authorize computer system 700 to perform a transaction (e.g., a payment transaction) while the user is wearing a mask and wearing external accessory device 790.

FIG. 7AI illustrates user 760 holding computer system 700 and wearing external accessory device 790 sometime after watch-to-unlock-setting toggle 770*i* is in the on state. In FIG. 7AI, user 760 is wearing mask 728. The description above with respect to FIG. 7Q also applies to FIG. 7AI.

FIGS. 7AJ-7AL illustrate one or more exemplary user interfaces that are displayed on display 710 of computer system 700. In particular, the one or more exemplary user interfaces of FIGS. 7AJ-7AL are described in relation to an exemplary scenario where user 760 attempts to use biometric authentication (e.g., while wearing a mask) to authorize a payment transaction while user 760, external accessory device 790, and computer system 700 are oriented and in a state as depicted and described above in relation to FIG. 7AI.

At FIG. 7AJ, user 760 wishes to authorize a payment transaction that requires authentication. As illustrated in FIG. 7AJ, computer system 700 displays notification 798*a* to confirm payment by pressing the side button (e.g., "Confirm with Side Button"). At FIG. 7AJ, computer system 700 detects press input 750*aj* on hardware button 702. In response to detecting press input 750*aj*, computer system 700 determines that a request to perform a secure operation (e.g., a request to initiate biometric authentication) has been received because an unlock input, such as press input 750*aj* has been detected.

As illustrated in FIG. 7AK, because press input 750*aj*, was detected and it was determined that the request to perform a secure operation had been received, computer system 700 initiates biometric authentication and displays notification 798*b* to indicate that computer system 700 is attempting to authenticate the user (e.g., "Processing"). After initiating biometric authentication (e.g., prior to successful authentication), computer system 700 determines that a face is detected by biometric sensor 704 and determines that biometric authentication is unsuccessful (e.g., the user is wearing a mask and biometric sensor 704 can only capture a portion of the face of user 760) using one or more similar techniques like those discussed above in relation to FIGS. 7F-7G. Upon determining that biometric authentication has been unsuccessful, computer system 700 determines whether accessory-based unlocking criteria are met. At FIG. 7AK, computer system 700 determines that accessory-based unlocking criteria have been met (e.g., using one or more similar techniques as discussed above in relation to FIGS. 7Q-7T). In particular, computer system 700 determines that accessory-based unlocking criteria have been met because external accessory device 790 has been detected to be worn by user 760, external accessory device 790 is currently in an unlocked state (e.g., as indicated by unlock indication 794 in FIG. 7AI and as described above in relation to FIG. 7A), and the setting is enabled that would allow computer system 700 to be unlocked using external accessory device 790 (e.g., watch-to-unlock-setting toggle 770*i* of FIG. 7M is in an on state).

At FIG. 7AL, because accessory-based unlocking criteria have been met, computer system 700 authorizes the payment transaction. As illustrated in FIG. 7AL, because accessory-based unlocking criteria have been met, computer system 700 displays notification 798*c* to indicate that the payment transaction has been authorized (and/or completed) (e.g., "Complete"). In some embodiments, when accessory-based unlocking criteria have not been met, computer system 700 does not display notification 798*c* and instead displays a notification that the payment transaction has not been authorized. In some embodiments, computer system 700 provides one or more notifications, such as notifications 726*a*-726*c* and/or 736*a*-736*c* as described above.

In some embodiments, computer system 700 does not authorize the payment transaction based on whether or not accessory-based unlocking criteria have been met (e.g., when payments setting toggle 770*c* is in an off state). In some embodiments, computer system 700 authenticates based on whether accessory-based unlocking criteria have been met with regards to some secure operations (e.g., authorizing payments, unlocking device, auto-filling passwords) but does not authenticate based on whether accessory-based unlocking criteria are met with regards to other secure operations (e.g., authorizing payments, unlocking device, auto-filling passwords/passcodes). In some embodiments, some secure operations cannot be authenticated via the external accessory device while other secure operations can be authenticated via the external accessory device. In some embodiments, whether or not computer system 700 authenticates based on whether accessory-based unlocking criteria are met is determined by whether or not a user has enabled certain setting toggles (e.g., setting toggles 770*a*-770*d*) that enable biometric authentication using a face ("face authentication") to be detected when one or more secure operations are detected. In some embodiments, specific setting toggles are provided that allow/disallow computer system 700 to authenticate based on whether accessory-based unlocking criteria are met when one or more secure operations are detected (e.g., different toggles than those that enable biometric authentication using a face to be detected when one or more secure operations are detected). Throughout the entire description herein, a secure operation can be one or more of authorizing a payment transaction, authorizing the auto-filling of a password, confirming the downloading of an item, unlocking device, providing authentication to access one or more applications, and/or the like. While the description may refer to a particular form of secure operation for ease of discussion, it should be understood that the techniques used with reference to the particular form of authentication can also be applied to the different form of authentication. While FIGS. 7A-7AL describe computer system 700 using various authentication techniques to determine whether to unlock computer system 700 and/or authorize a payment transaction, the discussion of FIGS. 7A-7AL can also be adapted to work with other secure operations that require authentication, such as authorizing the auto-filling of a password and/or confirming the downloading of an item (e.g., application, music, other files) (e.g., as discussed below in relation to FIGS. 12Z-12AA).

FIG. 7AM illustrates an exemplary user interface that computer system 700 can display, which provides a user with information concerning using an external accessory device to provide authentication for performing secure operations on computer system 700. In some embodiments, the user interface of FIG. 7AM is displayed after a user has updated computer system 700 to include software that enables an external accessory device to provide authentication for performing secure operations on computer system 700. In some embodiments, the user interface of FIG. 7AM is displayed after one or more of the user interface described above in FIGS. 7A-7AL. For example, computer system 700 can display the user interface of FIG. 7AM in response to detecting tap gesture 750*l* in FIG. 7L.

FIGS. 8A-8E are a flow diagram illustrating a method for providing authentication at a computer system using an external device in accordance with some embodiments. In particular, method 800 is a method for performing an unlocking operation. However, methods to perform other secure operations (e.g., authorizing payment transactions, authorizing auto-filling of passwords/passcodes, authorizing the downloading of media, etc.) can included one or more blocks of method 800 described below.

Method 800 is perform at a computer system (e.g., 100, 300, 500, 700). In some embodiments, method 800 and/or portions of method 800 are performed at external accessory device (e.g., 790), a server (e.g., an electronic device that is not the computer system and/or the accessory device), and/or the computer system. Some operations in method 800 are, optionally, combined, the orders of some operations are, optionally, changed, and some operations are, optionally, omitted. For example, blocks 806-814 of method 800 (described below) can be performed in any order, blocks 830-876 of method 800 (described below) can be performed in any order, and blocks 887-892 of method 800 (described below) can be performed in any order.

As described below, method 700 provides an intuitive way for authentication at a computer system using an external device. The method reduces the cognitive burden on a user to authenticate at a computer system using an external device, thereby creating a more efficient human-machine interface. For battery-operated computing devices, enabling a user to authenticate at computer system faster and more efficiently conserves power and increases the time between battery charges.

Figure 8A:
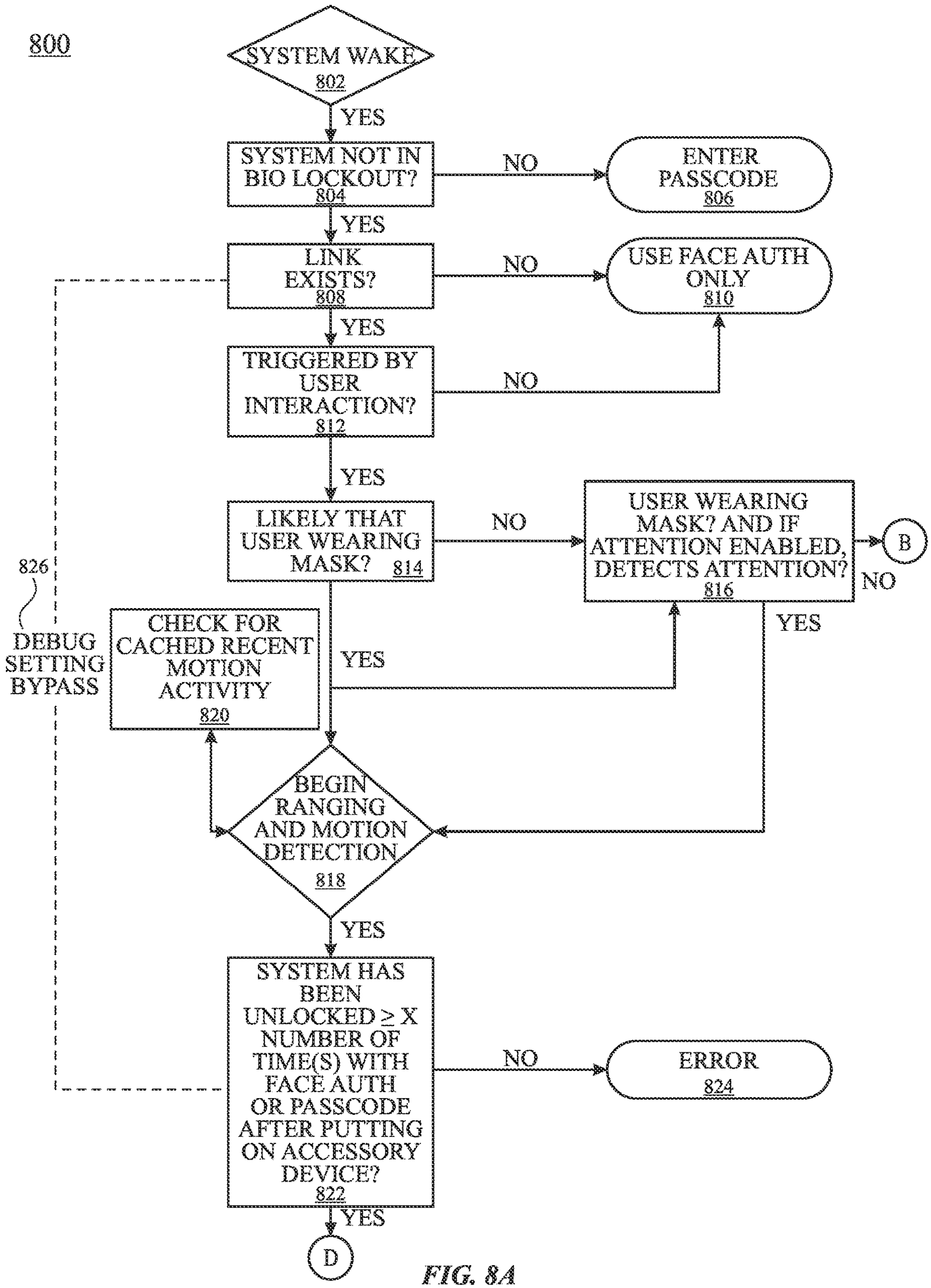
FIGS. 8A-8E are a flow diagram illustrating providing authentication at a computer system using an external device in accordance with some embodiments.
Figure 8B:
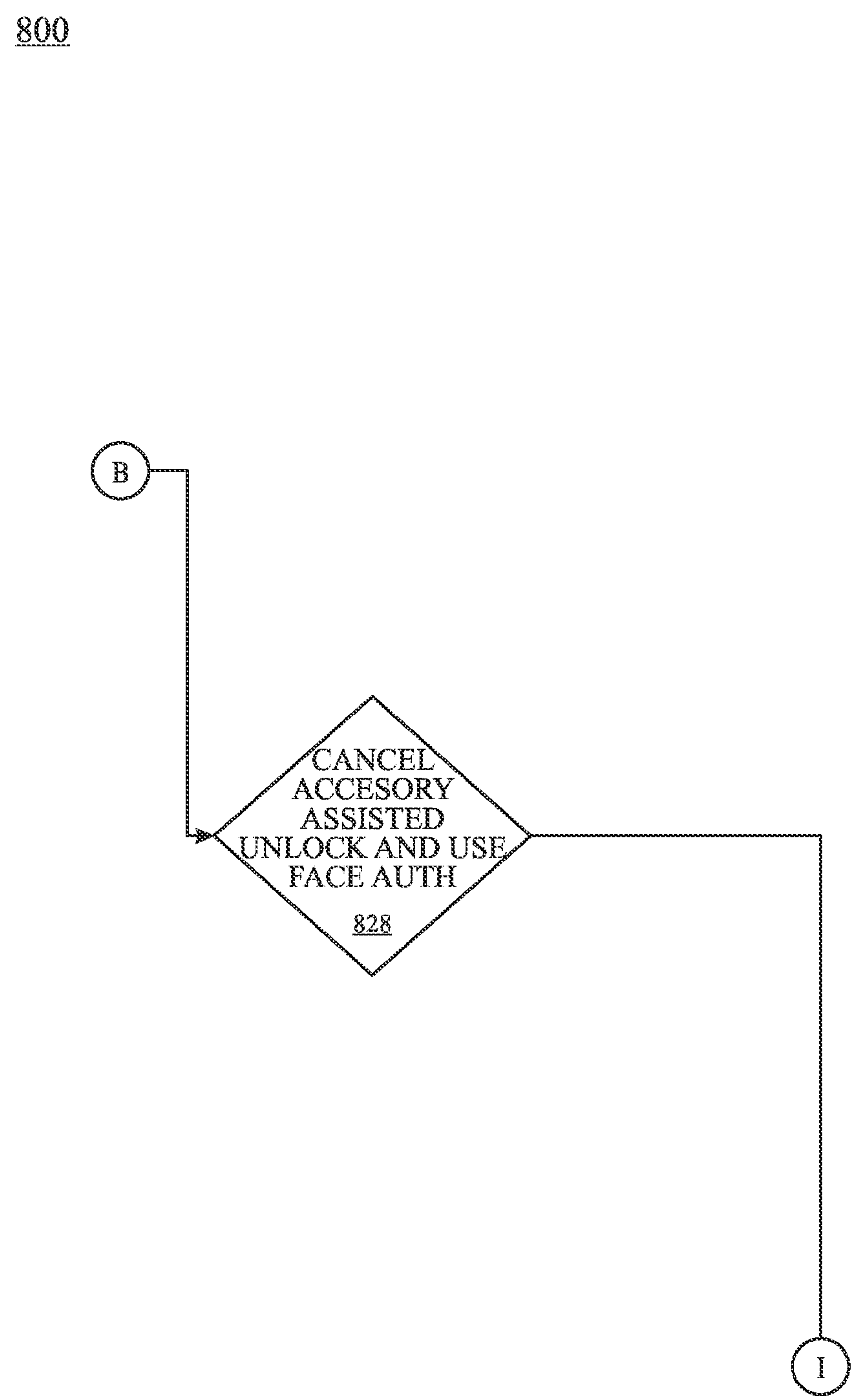

With reference to FIG. 8A, at block 802, a determination is made concerning whether a wake condition has occurred at the computer system (e.g., 700). In some embodiments, a determination is made that the wake condition has occurred at the computer system when a request to perform a secure operation has been received by the computer system (e.g., as discussed in relation to FIGS. 7B-7D, as discussed above in relation to computer system 700 detecting gestures 750*b*, 750*f*, 750*r*, 750*ab*, 750*aj*). For example, with reference to FIGS. 7A-7D, a determination is made that the wake condition has occurred at computer system 700 in response to computer system 700 detecting gesture 750*b*. In some embodiments, the determination is made concerning whether the wake condition has occurred when the user lifts the computer system, presses one or more hardware buttons (e.g., such as hardware button 702 in FIG. 7A), receives one or more notifications (e.g., 714, a phone call, a text message, etc.). In some embodiments, when the wake condition occurs, the computer system (e.g., 700) transitions one or more components from being in an inactive or sleep state to an active state (e.g., transitions the display of the computer system from being in a dark display state and/or an off state to a bright display state and/or an on state).

With reference to FIG. 8A, at block 804, after the determination is made concerning whether the wake condition has occurred, a determination is made concerning whether computer system 700 can be unlocked using biometric data (e.g., biometric authentication is currently and/or temporarily disabled for use by the computer system). In some embodiments, the determination is made that the computer system cannot be unlocked using biometric data after a number (e.g., 1-10) of attempts to authenticate using biometric authentication have been unsuccessful.

With reference to FIG. 8A, at block 806, after a determination is made that the computer system cannot (e.g., currently) be unlocked using biometric data, an option to enter a passcode (or authenticate without using biometric data) is provided or displayed (e.g., by computer system 700). For example, with reference to FIGS. 7H-7I, computer system 700 displays a user interface with passcode indications 730 and passcode input affordances 732 based on the determination that the computer system cannot be unlocked using biometric data. In some embodiments, after a determination is made that the computer system cannot be unlocked using biometric data, computer system 700 is configured to provide the user with an option to enter a passcode in response to a gesture being detected, such as tap gesture **750*f* in FIG. 7F. In some embodiments, computer system 700 is configured to provide the user with an option to enter a passcode when a request to perform a secure operation has been received (e.g., as discussed in relation to FIGS. 7B-7D, as discussed above in relation to computer system 700 detecting gestures 750*b*, 750*f*, 750*r*, 750*ab*, 750*aj***).

With reference to FIG. 8A, at block 808, after a determination is made that the computer system can be unlocked using biometric data, a determination is made concerning whether a link (e.g., a link that is established via a magnetic link, a peer-to-peer communication link, a link established via Bluetooth) (e.g., paired relationship, a Bluetooth connection) exists between the computer system (e.g., 700) and an external accessory device (e.g., 790). In some embodiments, the determination is made that the link exists between the computer system and the external accessory device when the computer system is paired with the external accessory device. In some embodiments, the computer system is paired with the external accessory device via Bluetooth. In some embodiments, a determination is made regarding whether the link exists between the computer system and the external accessory device using one or more techniques described in blocks 902-926 of FIG. 9 described below.

With reference to FIG. 8A, at block 810, after a determination is made that the link does not exist between the computer system and the external accessory device, the computer system is configured to use biometric authentication (e.g., face authentication) to perform a secure operation (e.g., unlock the computer system) but is not configured to authenticate via the external accessory device. For example, with reference to FIGS. 7A-7H, the computer system would be able to authenticate using biometric data (e.g., as discussed in FIGS. 7A-7D) when biometric authentication is successful but would not be able to authenticate via the external accessory device when biometric authentication is unsuccessful (e.g., similar to the discussion concerning FIGS. 7E-7H and 7Q-7T above).

With reference to FIG. 8A, at block 812, after a determination is made that the link does exist between the computer system and the external accessory device, a determination is made concerning whether the wake condition was triggered by a user interaction. In some embodiments, a determination is made that the wake condition is trigger by a user interaction when a request to perform a secure operation has been received by the computer system (e.g., as discussed in relation to FIGS. 7B-7D, as discussed above in relation to computer system 700 detecting gestures **750*b*, 750*f*, 750*r*, 750*ab*, 750*aj*). In some embodiments, a determination is made that the wake condition was not triggered by a user interaction when no user input was received upon receiving the wake condition (e.g., such as a phone call or notification being received that triggers the computer system to wake). When a determination is made that the wake condition was not triggered by a user interaction, the computer system is configured to use biometric authentication to perform a secure operation but is not configured to authenticate via the external accessory device (e.g., as using similar techniques to those discussed above in relation to block 810 of FIG. 8**A).

With reference to FIG. 8A, at block 814, when a determination is made that the wake condition is triggered by a user interaction, a determination is made concerning whether the user is likely wearing a mask (e.g., mask 728 in FIGS. 7E and 7Q). In some embodiments, the determination is made that the user is likely wearing a mask when biometric sensor 704 (e.g., in FIGS. 7E and 7Q) cannot a capture a portion of a user face, such as bottom portion **760*b* of FIG. 7**A.

With reference to FIG. 8A, at block 816, when a determination is made that the user is not likely wearing a mask (and/or a determination cannot be made concerning whether the user is likely wearing a mask), one or more other determinations can be made concerning whether the user is wearing a mask. In some embodiments, the one or more determinations are the same determination that is made in block 814; in some embodiments, at least one of the one or more determinations are different. At block 816, when an attention feature is enabled, an additional determination can be made on whether the user's attention is directed toward the computer system. In some embodiments, the additional determination is used in the determination concerning whether a user is wearing a mask. In some embodiments, when the user is determined to be looking at the computer system, the determine of whether the user is likely wearing a mask is improved and results in a higher confidence that the determination of whether the user is likely wearing a mask (or wearing a mask) is correct.

With reference to FIG. 8A, at block 818, when a determination is made that the user is likely wearing a mask (e.g., 814) and/or a determination is made that the user is wearing a mask (e.g., block 816), motion and range detection is initiated. After initiating motion and range detection, determinations are made concerning whether the computer system (e.g., 700) and the external accessory are within a particular range from each other and/or whether the external accessory device has moved beyond a certain threshold. In some embodiments, a determination is made that range detection is successful when a determination is made that the computer system (e.g., 700) is within a predetermined distance (e.g., a range of 1-5 meters, 2-3 meters, or less than 2-3 meters) from the external accessory device. In some embodiments, a determination is made concerning whether the external accessory device has moved above a threshold amount within a particular period of time (e.g., a movement of 0.1-5.0 meters per second, 5-30 steps within the last 30 minutes). In some embodiments, the determination is made concerning whether the external accessory device has moved above the threshold amount with the particular period of time based on motion activity (e.g., recent motion activity) that has been cached, as indicated by block 820. In some embodiments, the motion activity has been cached by (and/or on) the external accessory device. In some embodiments, the motion activity includes motion activity that is detected by the external accessory device (e.g., during a physical activity, such as running, jumping, etc.). In some embodiments, the determinations are made concerning whether the computer system (e.g., 700) and the external accessory are within a particular range from each other and/or whether the external accessory device has moved beyond a certain threshold occurs concurrently with blocks 822-868 below (shown in FIGS. 8A-8D). In some embodiments, upon one or more determinations that the external accessory are not within a particular range from each other and/or the external accessory device has not moved beyond a certain threshold, a determination can be made to not proceed with the remaining steps and return to block 810 (e.g., the computer system is configured to use biometric authentication (e.g., face authentication) to perform a secure operation (e.g., unlock the computer system) but is not configured to authenticate via the external accessory device).

With reference to FIG. 8A, at block 822, after initiating motion and range detection, a determination is made concerning whether the computer system has been unlocked with face authentication (e.g., as discussed in relation to FIGS. 7A-7D above) (or another type of biometric authentication) and/or passcode authentication (e.g., non-biometric authentication, as discussed in relation to FIG. 7I-7J) more than a threshold number (e.g., 1-10) of times.

With reference to FIG. 8A, at block 824, when a determination is made that the computer system has not been unlocked with face authentication and/or passcode authentication more than a threshold number of time, an error is provided. In some embodiments, the computer system displays an error to the user concerning this determination (e.g., determination made in block 822), such as the errors displayed in FIGS. 7AE-7AH.

With reference to FIG. 8A, at block 826, a determination can be made (e.g., at any of blocks 808-822 described above) on whether a debug bypass setting is enabled. When the debug bypass setting is enabled, one or more blocks of 808-822 can be bypassed (e.g., skipped) (e.g., blocks 827 and 829 are similar, allowing for the bypassing of different blocks as shown in FIGS. 8C-8D).

Turning back to block 828 with reference to FIG. 8B, when a determination is made that the user is not wearing a mask (e.g., or a determination cannot be made that the user is wearing a mask) (e.g., at block 816), the accessory-assisted unlocking process will be canceled (e.g., blocks of FIGS. 8A-8E do not occur) and the computer system is configured to use biometric authentication to perform a secure operation but is not configured to authenticate via the external accessory device (e.g., as using similar techniques to those discussed above in relation to block 810 of FIG. 8A).

Figure 8C:
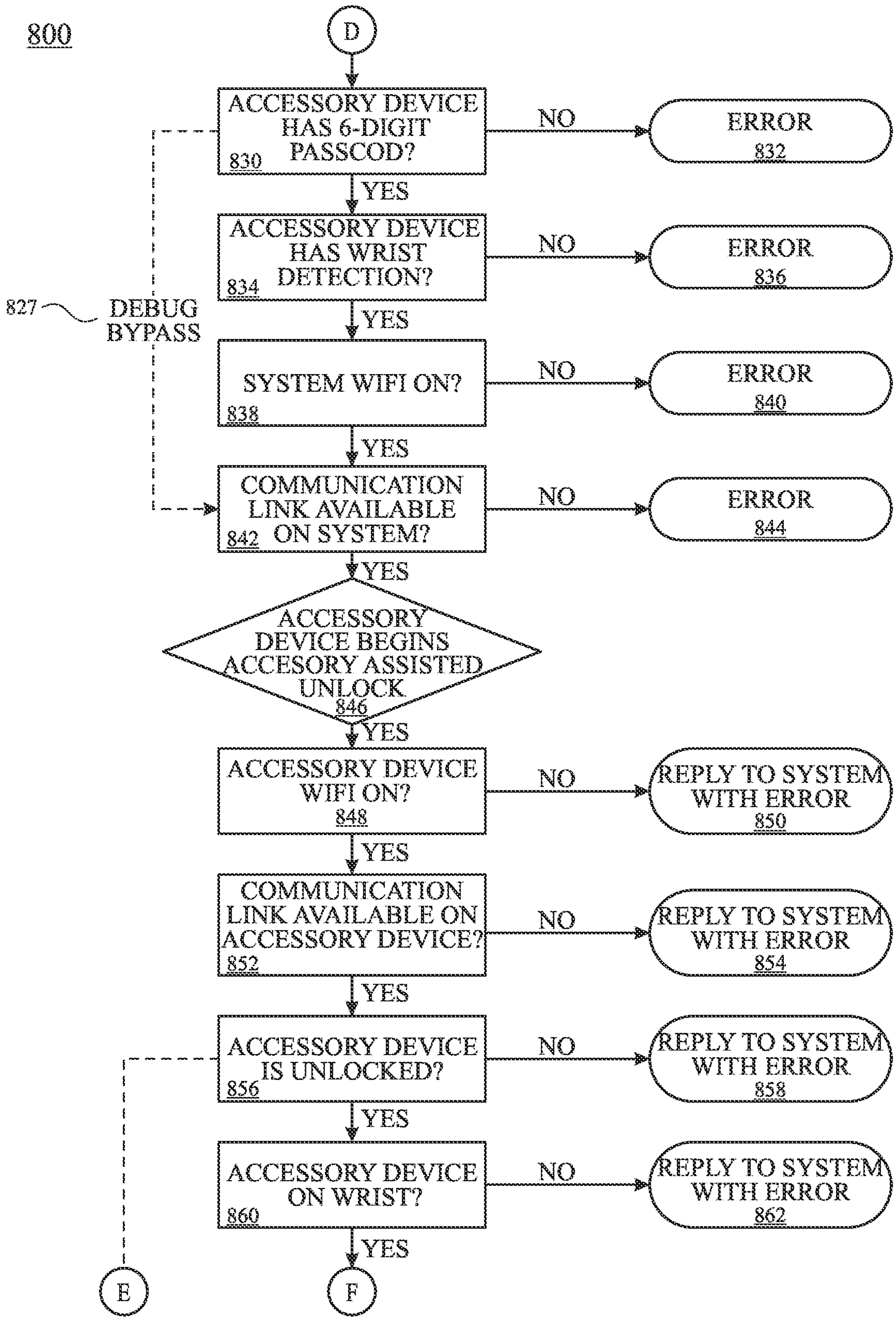
Figure 8D:
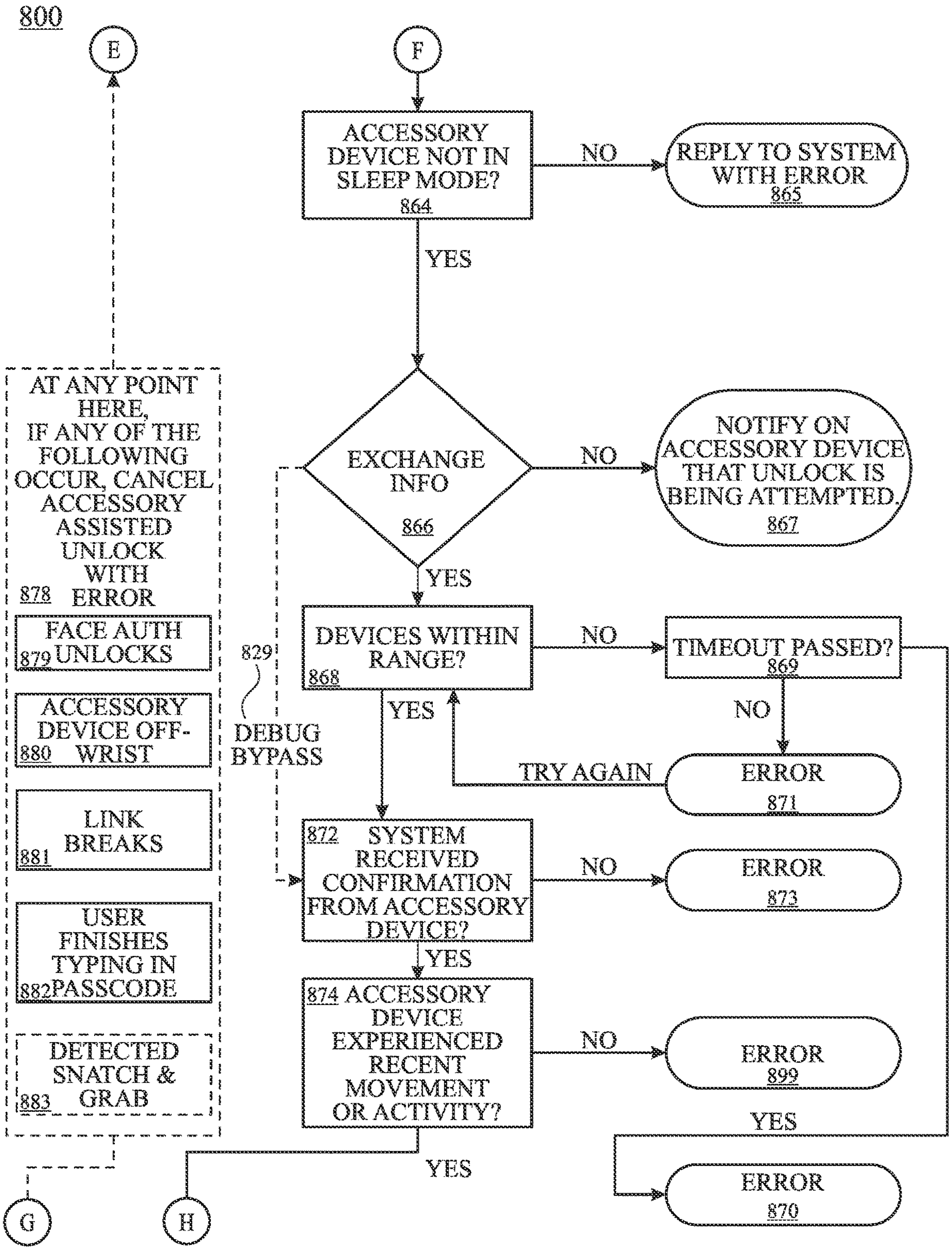

With reference to FIG. 8C, at block 830, when a determination is made that the computer system has been unlocked with face authentication and/or passcode authentication more than a threshold number of time, a determination is made concerning whether the external accessory device (e.g., 790) has a six-digit passcode. While block 830 describes a determination concerning the external accessory device (e.g., 790) has a six-digit passcode, other determinations can be made regarding the passcode (e.g., passcode length being above/below a number of digits or characters (e.g., 1-10), passcode including or not including certain characters, passcode being or not being in a particular format (e.g., non-sequential digits), etc.).

With reference to FIG. 8C, at block 832, after a determination is made that the external accessory device does not have a six-digit passcode, an error is provided. In some embodiments, the computer system displays an error to the user concerning this determination (e.g., determination made in block 830), such as the errors displayed in FIGS. 7AE-7AH.

With reference to FIG. 8C, at block 834, after a determination is made that the external accessory device has a six-digit passcode, a determination is made concerning whether the external accessory device (e.g., 790) has a wrist detection feature enabled (e.g., as discussed in relation to FIGS. 7Q-7T). The wrist detection feature is a feature that, when enabled, allows a determination to be made concerning whether a user is wearing external accessory device (e.g., 790). In some embodiments, a determination can be made concerning whether the external accessory device has a feature that is similar to the wrist detection feature that is enabled (e.g., a feature that determines whether an accessory device (e.g., a pair of glasses) is being worn by the user).

With reference to FIG. 8C, at block 836, after a determination is made that the external accessory device does not have the wrist detecting feature enabled, an error is provided. In some embodiments, the computer system displays an error to the user concerning this determination (e.g., determination made in block 834), such as the errors displayed in FIGS. 7AE-7AH.

With reference to FIG. 8C, at block 838, after a determination is made that the external accessory device have the wrist detecting feature enabled, a determination is made concerning whether the computer system is connected to Wi-Fi (e.g., and/or whether Wi-Fi is enabled). In some embodiments, the determination is made that the computer system is connected to Wi-Fi when the computer system is connected to a Wi-Fi network.

With reference to FIG. 8C, at block 840, after a determination is made that the computer system is not connected to Wi-Fi, an error is provided. In some embodiments, the computer system displays an error to the user concerning this determination (e.g., determination made in block 838), such as the errors displayed in FIGS. 7AE-7AH.

With reference to FIG. 8C, at block 842, after a determination is made that the computer system is connected to Wi-Fi, a determination is made concerning whether a communication link is available on the computer system (e.g., or enabled on the computer system). In some embodiments, the communication link includes a wireless protocol, such as a wireless direct link protocol. In some embodiments, the communication link at block 842 is governed by a different protocol than the link discussed above at block 808. In some embodiments, the communication link is used to detect the distance between the computer system and the external accessory device (e.g., range detection, at block 818).

With reference to FIG. 8C, at block 844, after a determination is made that the communication link is not available on the computer system, an error is provided. In some embodiments, the computer system displays an error to the user concerning this determination (e.g., determination made in block 842), such as the errors displayed in FIGS. 7AE-7AH.

With reference to FIG. 8C, at block 846, after a determination is made that the communication link is available on the computer system, the external accessory device initiates an unlocking process that is assisted by the external accessory device (e.g., being assisting with unlocking the computer system via the external accessory device, as discussed above in FIGS. 7Q-7R) ("accessory-assisted unlocking process").

With reference to FIG. 8C, at block 848, after initiating the accessory-assisted unlocking process, a determination is made concerning whether the external accessory device is connected to Wi-Fi (e.g., and/or whether Wi-Fi is enabled). In some embodiments, the determination is made that the external accessory device is connected to Wi-Fi when the external accessory device is connected to a Wi-Fi network.

With reference to FIG. 8C, at block 850, after a determination is made that the external accessory device is not connected to Wi-Fi, an error is provided. In some embodiments, the external accessory device transmits the error to the computer system. In some embodiments, the computer system displays an error to the user concerning the error that was transmitted to the computer system, such as the errors displayed in FIGS. 7AE-7AH.

With reference to FIG. 8C, at block 852, after a determination is made that the external accessory device is connected to Wi-Fi, a determination is made concerning whether a communication link is available on the external accessory device (e.g., using similar techniques to those discussed above in relation to block 842).

With reference to FIG. 8C, at block 854, after a determination is made that the communication link is not available on the external accessory device, an error is provided. In some embodiments, the external accessory device transmits the error to the computer system. In some embodiments, the computer system displays an error to the user concerning the error that was transmitted to the computer system, such as the errors displayed in FIGS. 7AE-7AH.

With reference to FIG. 8C, at block 856, after a determination is made that the communication link is available on the computer system, a determination is made concerning whether the external accessory device (e.g., 790) is unlocked.

With reference to FIG. 8C, at block 858, after a determination is made that the external accessory device is not unlocked, an error is provided. In some embodiments, the external accessory device transmits the error to the computer system. In some embodiments, the computer system displays an error to the user concerning the error that was transmitted to the computer system, such as the errors displayed in FIGS. 7AE-7AH.

With reference to FIG. 8C, at block 860, after a determination is made that the external accessory device is unlocked, a determination is made concerning whether the external accessory device is on the wrist of a user (e.g., being worn by the user). In some embodiments, the determination is made concerning whether the external accessory device is on the wrist of a user using similar techniques to those discussed in relation to FIGS. 7A-7AM.

With reference to FIG. 8C, at block 862, after a determination is made that the external accessory device is not on the wrist of the user, an error is provided. In some embodiments, the external accessory device transmits the error to the computer system. In some embodiments, the computer system displays an error to the user concerning the error that was transmitted to the computer system, such as the errors displayed in FIGS. 7AE-7AH.

With reference to FIG. 8D, at block 864, after a determination is made that the external accessory device is on the wrist of the user, a determination is made concerning whether the external accessory device is not in a sleep mode (e.g., and/or a do not disturb mode, a mode whether one or more outputs are suppressed in response to receiving a notification, phone call, etc.) and/or a bedtime mode (e.g., a mode where the sleep patterns of a user is being tracked and/or a nightstand/bedside function (and/or mode) is enabled). In some embodiments, the determination that the external accessory device is not in a sleep mode is made when the external accessory device is not determined to be awake (e.g., external accessory device 790 of FIGS. 7Y-7Z).

With reference to FIG. 8D, at block 865, after a determination is made that the external accessory device is in a sleep mode, an error is provided. In some embodiments, the external accessory device transmits the error to the computer system. In some embodiments, the computer system displays an error to the user concerning the error that was transmitted to the computer system, such as the errors displayed in FIGS. 7AE-7AH.

With reference to FIG. 8D, at block 866, after a determination is made that the external accessory device is not in a sleep mode, information (e.g., Wi-Fi information and secure information, such as keys for us in encryption) are shared between the computer system (e.g., 700) and the external accessory device (e.g., 790). In some embodiments, the information that is shared between the computer system and the external accessory device is shared via the communication link (e.g., discussed in relation to blocks 842 and 852).

With reference to FIG. 8D, at block 867, when information cannot be shared between the computer system and the external accessory device, an error is provided. In some embodiments, the external accessory device transmits the error to the computer system. In some embodiments, the computer system displays an error to the user concerning the error that was transmitted to the computer system, such as the errors displayed in FIGS. 7AE-7AH. In some embodiments, the computer system displays a notification that the computer system is attempted to be unlocked via the external accessory device. In some embodiments, the computer system and/or external accessory device display a notification (e.g., such as 722 and 726 in FIG. 7U) that the computer system is attempted to be unlocked via the external accessory device, irrespective of whether the information is shared between the computer system and the external accessory device.

With reference to FIG. 8D, at block 868, after information is shared between the computer system and external accessory device, a determination is made concerning whether the external accessory device is within range of the computer system (e.g., as discussed above in relation to block 818).

With reference to FIG. 8D, at block 869, after the determination cannot be made concerning whether the external accessory device is within range of the computer system (and/or a determination is made that the external accessory device is not within range of the computer system), a determination is made concerning whether a predetermined period of time (e.g., 1-5 seconds) has passed to make the determination of whether the external accessory device is within range of the computer system.

With reference to FIG. 8D, at block 870, after a determination is made that a predetermined period of time has passed to make the determination of whether the external accessory device is in range of the computer system, an error is provided. In some embodiments, the error indicates that the external accessory device could not be used to unlock the computer system because the external accessory device is not within range of the computer system. In some embodiments, after the determination is made that a predetermined period of time has passed to make the determination of whether the device is in range, the computer system is configured to use biometric authentication to perform a secure operation but is not configured to authenticate via the external accessory device (e.g., as using similar techniques to those discussed above in relation to block 810 of FIG. 8A).

With reference to FIG. 8D, at block 871, after a determination is made that a predetermined period of time has not passed to make the determination of whether the external accessory device is within range of the computer system, an error is provided. In some embodiments, the error indicates that the watch needs to be moved closer to the computer system (e.g., "move the watch" closer, as shown in FIG. 7AG). In some embodiments, after the error is provided, the determination concerning whether the external accessory device is within range of the computer system continues to be attempted to be made.

With reference to FIG. 8D, at block 872, after a determination is made that the external accessory device is within range of the computer system, a determination is made concerning whether confirmation has been received from the external accessory device. In some embodiments, the confirmation includes confirmation of the external accessory device being within range of the computer system.

With reference to FIG. 8D, at block 873, after a determination is made that confirmation has not been received from the external accessory device, an error is provided. In some embodiments, the computer system displays an error to the user concerning this determination (e.g., determination made in block 838), such as the errors displayed in FIGS. 7AE-7AH.

With reference to FIG. 8D, at block 874, after a determination is made that confirmation has been received from the external accessory device, a determination is made concerning whether the external accessory device has experienced recent movement or activity. In some embodiments, the determination is made that the external accessory device has experienced recent movement or activity when a determination is made that external accessory device has moved above a threshold amount within a particular period of time (e.g., as discussed above in relation to block 818). In some embodiments, a determination is made that the external accessory device has experienced recent movement or activity based on recent inputs received at the external accessory device.

With reference to FIG. 8D, at block 899, after a determination is made that the external accessory device has not experienced recent movement or activity, an error is provided. In some embodiments, the computer system displays an error to the user concerning this determination (e.g., determination made in block 838), such as the errors displayed in FIGS. 7AE-7AH.

Figure 8E:
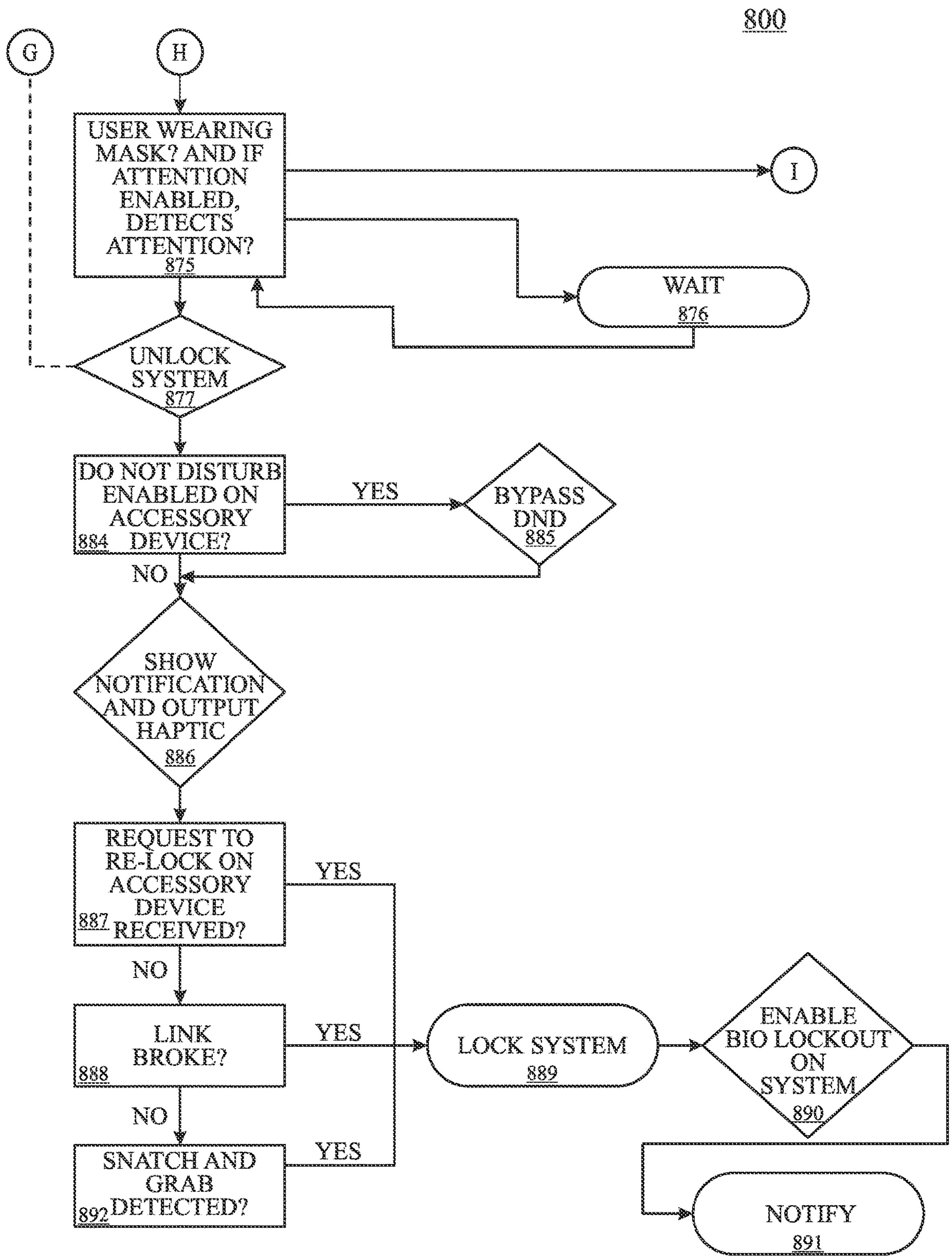

With reference to FIG. 8E, at block 875, after a determination is made that the external accessory device has experienced recent movement or activity, a determination is made concerning whether the user is wearing a mask (e.g., using one or more similar techniques discussed above in relation to blocks 814 and 816). After the determination is made that the user is not wearing a mask, one or more techniques/operations can occur that are similar to those described above in relation to block 828.

With reference to FIG. 8E, at block 876, one or more computer systems and/or devices can wait until face authentication has occurred (e.g., determined to be unsuccessful, as described above in relation to FIGS. 7R-7S) to determine whether the user is wearing a mask (e.g., as described above in relation to block 875).

With reference to FIG. 8E, at block 877, after a determination is made that the user is wearing a mask, the computer system transitions from a locked state to an unlocked state (e.g., as described above in relation to FIGS. 7S-7T).

Turning back to FIG. 8D, at block 878 is provided to show that one or more blocks 856-877 can be interrupted (e.g., not completed) when a determination is made that any one of the steps outlined in blocks 879-883 occurs. In other words, if any one of the determinations in blocks 879-883 occurs, the accessory-assisted unlocking process will be canceled (e.g., one or more of blocks of 856-877 do not occur) and the computer system is configured to use biometric authentication to perform a secure operation but is not configured to authenticate via the external accessory device (e.g., as using similar techniques to those discussed above in relation to block 810 of FIG. 8A).

With reference to FIG. 8D, at block 879, when a determination is made that biometric authentication (e.g., face authentication) is successful, the accessory-assisted unlocking process is canceled. Otherwise, the access-assisted unlocking process proceeds.

With reference to FIG. 8D, at block 880, when a determination is made that the external accessory device is not being worn by the user (e.g., external accessory device has been removed from or is not on the wrist of the user), the accessory-assisted unlocking process is canceled. Otherwise, the access-assisted unlocking process proceeds.

With reference to FIG. 8D, at block 881, when a determination is made that the link has broken between the computer system and the external accessory device (e.g., the computer system is not paired with external accessory device), the accessory-assisted unlocking process is canceled. Otherwise, the access-assisted unlocking process proceeds.

With reference to FIG. 8D, at block 882, when a determination is made that a passcode has been typed into a passcode field (e.g., as described above in relation to FIGS. 7I-7J in response to detecting gesture 750*i*), the accessory-assisted unlocking process is canceled. Otherwise, the access-assisted unlocking process proceeds. In some embodiments, when a determination is made that a valid passcode has been typed into the passcode field, the accessory-assisted unlocking process is canceled; otherwise, the access-assisted unlocking process proceeds.

With reference to FIG. 8D, at block 883, when a determination is made that a snatch and grab condition has been detected, the accessory-assisted unlocking process is canceled. Otherwise, the access-assisted unlocking process proceeds. In some embodiments, the snatch and grab condition is met when the computer system and the external accessory device are above a threshold distance from each other (e.g., above 5-10 meters). In some embodiments, the snatch and grab condition is met when the computer system and the external accessory device have moved outside of a predetermined range (e.g., above 5-10 meters) within a threshold amount of time (e.g., less than 5-10 seconds).

Turning back to FIG. 8E, at block 884, after the computer system transitions from a locked state to an unlocked state, a determination is made whether the external device is in a do not disturb mode (e.g., a mode where output (e.g., audible, visual, haptic) of certain notifications are suppressed).

With reference to FIG. 8E, at block 885, when a determination is made that the external device is in do not disturb mode, an instruction is sent to the external accessory device to ignore do not disturb mode.

With reference to FIG. 8E, at block 886, in response to receiving the instruction to ignore do not disturb mode and/or after the determination is made that the external device is not in a do not disturb mode, to display a notification (e.g., a notification with affordance 796 in FIG. 7W) and/or output a haptic to indicate to that the external accessory device has been used to unlock the computer system (as shown at block 886). In some embodiments, a notification (e.g., 724*b* in FIG. 7W) is displayed on the computer to indicate that the external accessory device has been used to unlock the computer system.

With reference to FIG. 8E, blocks 887-891 illustrate different determination that can cause the computer system to be locked after the computer system has been unlocked via the external accessory device. At block 887, a determination can be made that the external accessory device will be re-locked (e.g., in response to detecting gesture 750*u* or 750*w*). At block 888, a determination can be made that the link has broken between the computer system and the external accessory device (e.g., the computer system is not paired with external accessory device). At block 889, a determination can be made that a snatch and grab condition has been detected (e.g., using one or more similar techniques to those discussed above in relation to block 883).

With reference to FIG. 8E, at block 889, the computer system can be transitioned from the unlocked state to the locked state (e.g., when a determination is made that the external accessory device will be re-locked, when a determination is made that the link has broken between the computer system and the external accessory device, and/or when a determination is made that a snatch and grab condition has been detected). For example, in FIGS. 7W-7X, the computer system transitions from the unlocked state to the locked state in response to tap gesture 750*w* being detected (e.g., a determination is made that the external accessory device will be re-locked).

With reference to FIG. 8E, at block 890, after the computer transitions from the unlocked state to the locked state (e.g., based on one or more of the determinations discussed in relation to blocks 887-889), the computer system cannot (e.g., currently) be unlocked using biometric authentication (e.g., the computer system is configured to not use biometric authentication to unlock the computer system or perform another secure operation before non-biometric authentication is used) (e.g., as described above in relation to FIGS. 7F-7J).

With reference to FIG. 8E, at block 891, after the computer system cannot be unlocked using biometric authentication, a notification is displayed that indicates that computer system cannot be unlocked using biometric authentication and/or a notification is displayed that indicates a non-biometric authenticate is needed to unlock the computer system or perform a secure operation (e.g., "Enter Passcode" in FIG. 7I).

Note that details of the processes described above with respect to method 800 (e.g., FIGS. 8A-8E) are also applicable in an analogous manner to the methods described below. For example, methods 900, 1000, 1100, 1300, 1400, 1600, and 1800 optionally includes one or more of the characteristics of the various methods described above with reference to method 800. For example, method 900 can be used to establish a link between the computer system and the accessory device to enable method 800 to be performed. For brevity, these details are not repeated below.

FIG. 9 is a flow diagram illustrating a method for controlling authentication at a computer system using an external device in accordance with some embodiments. In particular, method 900 is a method for enrollment in a process to perform a secure operation with the assistance of an external accessory device. Method 900 is perform at a computer system (e.g., 10, 300, 500, 700). In some embodiments, method 900 and/or portions of method 900 are performed at external accessory device (e.g., 790), a server (e.g., an electronic device that is not the computer system and/or the accessory device), and/or the computer system. Some operations in method 900 are, optionally, combined, the orders of some operations are, optionally, changed, and some operations are, optionally, omitted. For example, blocks 904-920 of method 900 (discussed below) can be performed in any order.

As described below, method 900 provides an intuitive way or controlling authentication at a computer system using an external device. The method reduces the cognitive burden on a user or controlling authentication at a computer system using an external device, thereby creating a more efficient human-machine interface. For battery-operated computing devices, enabling a user to or controlling authentication faster and more efficiently conserves power and increases the time between battery charges.

At block 902, a determination is made concerning whether a passcode panel has been (or is currently) opened (or has been or is currently displayed). In some embodiments, the determination is made that the passcode panel has been displayed when the computer system displays a prompt for the user to enter a passcode. For example, with reference to FIGS. 7H-7I, computer system 700 displays a user interface with passcode indications 730 and passcode input affordances 732; thus, at FIGS. 7H-7I, a determination can be made that the passcode panel has been opened or has been displayed.

At block 904, after a determination is made that the passcode panel has been opened, a determination is made concerning whether the external accessory device (e.g., 790) is unlocked (e.g., as indicated by unlock indication 794 in FIG. 7E). In some embodiments, the computer system (or external accessory device) can display an error after the determination is made that the external accessory device is not unlocked. In some embodiments, the error is displayed after block 908 (described below).

At block 906, after a determination is made that the external accessory device is unlocked, a determination is made concerning whether face authentication is enabled. In some embodiments, a determination is made that face authentication is enabled when phone unlock setting toggle 770*a* is in the on state, as shown in FIG. 7L. In some embodiments, the computer system (or external accessory device) can display an error after the determination is made that face authentication is not enabled. In some embodiments, the error is displayed after block 908 (described below).

At block 908, after a determination is made that face authentication is enabled, a determination is made that a request to enable the accessory-assisted unlocking process is received. For example, at FIG. 7L a determination is made that a request to enable the accessory-assisted unlocking process for "John's Gold 40 mm Watch" is received when tap gesture 750*l* is detected on watch-to-unlock-setting toggle 770*i*. In some embodiments, a request to enable the accessory-assisted unlocking process is received after one or more inputs on the user interface of FIG. 7AM. In some embodiments, a request to enable the accessory-assisted unlocking process is receiving when an input gesture is detected on a turn-on affordance (e.g., 792*a*2) and/or an open affordance (e.g., 792*b*2, 792*c*2).

At block 910, after the determination request to enable the accessory-assisted unlocking process is received, a determination is made concerning whether the external accessory device (e.g., 790) has a six-digit passcode. While block 910 shows a determination concerning the external accessory device (e.g., 790) has a six-digit passcode, other determinations can be made regarding the passcode (e.g., passcode length being above/below a number of digits or characters (e.g., 1-10), passcode including or not including certain characters, passcode being or not being in a particular format (e.g., non-sequential digits), etc.).

At block 912, after a determination is made that the external accessory device does not have a six-digit passcode, the computer system (or external accessory device) displays a prompt for the user to create and/or upgrade the passcode for the external accessory device. In some embodiments, after the determination is made that the external accessory device does not have a six-digit passcode, the computer system displays notification (e.g., using similar techniques as those described above in relation to notification 726*b* of FIG. 7O and/or 726*c* of FIG. 7P). In some embodiments, in response to detecting a gesture on open affordance 726*b*2, a user interface is displayed that allows a user to create and/or upgrade the passcode for the external accessory device.

At block 914, after a determination is made that the external accessory device has a six-digit passcode (e.g., and/or after the determination request to enable the accessory-assisted unlocking process is received), a determination is made concerning whether the external accessory device (e.g., 790) has a wrist detection feature enabled (e.g., as discussed in relation to block 834 of FIG. 8C and FIGS. 7Q-7T).

At block 916, after a determination is made that the external accessory device does not have the wrist detection feature enabled, the computer system (or external accessory device) displays a prompt for the user to enable wrist detection (e.g., notification 726*a* in FIG. 7N and/or notification 726*c* in FIG. 7P). In some embodiments, the wrist detection feature is automatically turned on after the determination is made that the external accessory device has the wrist detection feature enabled. In some embodiments, after the wrist detection feature is automatically turned on, a prompt is displayed (e.g., on the computer system and/or on the watch) that indicates that the wrist detection feature has automatically turned on.

At block 918, after a determination is made that the external accessory device has the wrist detection feature enabled (e.g., and/or after the determination request to enable the accessory-assisted unlocking process is received), a prompt that corresponds to a request for a passcode of the computer system is displayed (e.g., on the computer system). In some embodiments, after displaying the prompt that corresponds to the request for the passcode of the computer system, the computer system detects entry of the passcode (e.g., 730, 732 in FIG. 7J).

At block 920, the prompt that corresponds to the request for the passcode of the computer system is displayed, pairing is initiated between the computer system and the external accessory device.

At block 922, after pairing is initiated between the computer system and the external accessory device, a determination is made concerning whether pairing was successful.

At block 924, after a determination is made that pairing is not successful, an error is provided. In some embodiments, the computer system displays an error to the user concerning this determination (e.g., determination made in block 922), such as the errors displayed in FIGS. 7N-7P.

At block 926, after a determination is made that pairing is successful, feedback of the successful pairing is provided. In some embodiments, feedback of the successful pairing is indicated by setting a watch-to-unlock-setting toggle transitioning from an off state to an on state (e.g., as indicated by watch-to-unlock-setting toggle 770*i* in FIGS. 7L-7M).

Note that details of the processes described above with respect to method 900 (e.g., FIG. 9) are also applicable in an analogous manner to the methods described below/above. For example, method 900 optionally includes one or more of the characteristics of the various methods described above with reference to methods 800, 1000, 1100, 1300, 1400, 1600, and 1800. For example, method 800 and 1000 can be used to perform an authentication technique where the computer system and the accessory device are paired using the steps of method 900. For brevity, these details are not repeated below.

FIGS. 10A-10B are a flow diagram for providing authentication at a computer system using an external device in accordance with some embodiments. Method 1000 is performed at a computer system (e.g., 00, 300, 500, 700). The computer system (e.g., 700) (e.g., a smartphone, a tablet) is in communication with (e.g., wirelessly or by wire; integrates or includes) one or more biometric sensors (e.g., 704) (e.g., a fingerprint sensor, a facial recognition sensor (e.g., one or more depth sensors; one or more cameras (e.g., dual cameras, triple camera, quad cameras, etc.)) on the same side or different sides of the computer system (e.g., a front camera, a back camera)), an iris scanner) (e.g., is hidden or concealed) and an external accessory device (e.g., 790) (e.g., a computer system (e.g., a wearable device ((e.g., a smartwatch, headphones, glasses)), a device that is external to (e.g., not physically linked to or connected to) the computer system, a device that is in communication with the computer system via a communication channel, a device with a display generation component and one or more input devices). Some operations in method 700 are, optionally, combined, the orders of some operations are, optionally, changed, and some operations are, optionally, omitted.

As described below, method 1000 provides an intuitive way for providing authentication at a computer system using an external device. The method reduces the cognitive burden on a user for providing authentication at a computer system using an external device, thereby creating a more efficient human-machine interface. For battery-operated computing devices, enabling a user to provide authentication at a computer system faster and more efficiently conserves power and increases the time between battery charges.

The computer system receives (1002) a request (e.g., 750*b*, 750*f*, 750*r*, 750*ab*, 750*aj*, 1250*z*) (e.g., 812) at the computer system (e.g., 700) to perform a secure operation (e.g., as indicated by one or more of 770*a*-770*e*) with the computer system (e.g., 700) (e.g., unlocking the computer system, authorizing a payment with the computer system, authorizing use of a secure credential with the computer system, accessing a restricted application or restricted information with the computer system, auto-filling information with the computer system). In some embodiments, while the computer system is in a locked state, a first user interface is displayed (e.g., a locked user interface) with an indication that the computer system is locked (e.g., a locked icon). In some embodiments, the request to unlock the computer system can include, but is not limited to: raising the computer system, pressing a hardware or software button, tapping the display when the system is in a low or lower power state, tapping a notification on the display, swiping on the display, including swiping up from a bottom of the display, etc.

In response to (1004) the request (e.g., 750*b*, 750*f*, 750*r*, 750*ab*, 750*aj*, 1250*z*) to perform the secure operation with the computer system (e.g., 700) and in accordance with a determination that biometric data captured by the computer system (e.g., 700) (e.g., captured by the computer system in response to the request to perform the secure operation) meets a set of biometric authentication criteria, the computer system performs (1006) the secure operation.

In response to (1004) the request (e.g., 750*b*, 750*f*, 750*r*, 750*ab*, 750*aj*, 1250*z*) to perform the secure operation with the computer system (e.g., 700) and in accordance with (1008) a determination that the biometric data (e.g., 760*a*,

760*b*) does not meet the set of biometric authentication criteria (e.g., a set of criteria that includes a criterion that is met when the biometric data sufficiently matches an authorized biometric profile) and in accordance with (1010) a determination that one or more states (e.g., locked/unlocked state of the external accessory device, state of being physically associated with a user, state of being in communication with the computer system (e.g., via wireless connection (e.g., Bluetooth, Wi-Fi)), state of a configuration of a passcode/password that is associated with the external accessory device (e.g., length of passcode/password that is above/below a min/max length required of a passcode/password), state of whether the watch is set to a particular mode/setting (e.g., do not disturb mode (e.g., a mode where one or more incoming notifications are muted and/or one or more types of output (e.g., audio, visual, haptic) are suppressed for an incoming notification)), a state where significant motion (e.g., motion above a threshold level of motion) of the external accessory device has been detected within a predetermined period of time (e.g., the external accessory device has moved 1-5 meters within 30-60 seconds)) of the external accessory device (e.g., 790) meets a set of accessory-based criteria (e.g., 814-883) (e.g., accessory based unlocking criteria) that includes a criterion that is met when the external accessory device is in an unlocked state (e.g., as indicated by 794) (e.g., a state where the computer system is not locked and/or a state where one or more functions of the computer system are available without providing authentication) and a criterion that is met when the external accessory device (e.g., 790) is physically associated (e.g., 790 in FIGS. 7Q and 7AI) (e.g., is being worn by the user (e.g., on a body part (e.g., a wrist) of a user), is in contact with the user, is within a predefined proximity to the user and/or the computer system) with a user (e.g., 760) (e.g., a user of the computer system), the computer system performs (1012) the secure operation (e.g., indicated by 712*a* to 712*b* in FIGS. 7Q-7T, indicated by 798*b*-798*c* in FIGS. 7AK-AL) (e.g., 877) (e.g., transitioning the computer system from a locked state to an unlocked state when the requested secure operation is a request to unlocked the computer system). In some embodiments, as a part of transitioning the computer system from the locked state to the unlocked state, the computer system displays a second user interface that includes an indication that the computer system is unlocking and/or is unlocked (e.g., an unlocked icon). In some embodiments, transitioning the computer system from the locked state to the unlocked state occurs because a process has been completed and/or a setting has been activated to allow the computer system to be transitioned to the unlocked state based on data associated with the external accessory device (e.g., such as the process and/or setting described in relation to methods 800 and 1100). In some embodiments, in accordance with a determination that the biometric data meets the set of biometric authentication criteria, the computer system is transitioned from the locked state to an unlocked state (e.g., without requiring the state of the external accessory device to meet the set of accessory-based criteria). In some embodiments, in accordance with a determination that the state of the external accessory device does not meet the set of accessory-based criteria, the computer system is maintained in the unlocked state. Performing the secure operation when the biometric data does not meet the set of biometric authentication criteria but when one or more states of the external accessory device meets a set of accessory-based criteria and when the external accessory device is physically associated with a user reduces the number of inputs that are needed to allow the computer system to perform the secure operation when biometric data does not meet the set of biometric authentication criteria and provides the user with more control of the computer system by allowing the computer system to perform the secure operation in situations where biometric authentication fails. Reducing the number of inputs that are needed and to allow the computer system to perform the secure operation when biometric data does not meet the set of biometric authentication criteria and providing the user with more control of the computer system enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Performing the secure operation when the biometric data does not meet the set of biometric authentication criteria but when one or more states of the external accessory device meets a set of accessory-based criteria and when the external accessory device is physically associated with a user allows the computer system to perform the secure operation when biometric authentication is not successful but other security criteria are satisfied, which allows the computer system to limit unauthorized performance of secure operations while providing an additional way to authorize the performance of the secure operation and improves security because the user is more likely to keep the security features enabled if they are less disruptive to use of the computer system. Providing improved security reduces the unauthorized performance of secure operations which, additionally, reduces power usage and improves battery life of the computer system by enabling the user to use the computer system more securely and efficiently.

In some embodiments, in response to (1004) the request (e.g., 750*b*, 750*f*, 750*r*, 750*ab*, 750*aj*) to perform the secure operation with the computer system (e.g., 700) and in accordance with a determination that the biometric data (e.g., 760*a*, 760*b*) does not meet the set of biometric authentication criteria and in accordance with a determination that one or more states of the external accessory device (e.g., 790) does not meet the set of accessory-based criteria (e.g., 814-883), the computer system forgoes performing (1014) the secure operation (e.g., indicated by 712*a* in FIGS. 7AA-7AD) (e.g., 810, 828) (e.g., forgoing transitioning the computer system from a locked state to an unlocked state when the requested secure operation is a request to unlocked the computer system). Forgoing performing the secure operation when the biometric data does not meet the set of biometric authentication criteria and one or more states of the external accessory device does not meet the set of accessory-based criteria allows the computer system to limit unauthorized performance of secure operations, which provides improved security. Providing improved security reduces the unauthorized performance of secure operations which, additionally, reduces power usage and improves battery life of the computer system by enabling the user to use the computer system more securely and efficiently.

In some embodiments, the request (e.g., 750*b*, 750*f*, 750*r*, 750*ab*) to perform the secure operation with the computer system is a request to unlock the computer system. In some embodiments, as a part of performing the secure operation, the computer system transitions the computer system from a locked state (e.g., as described above in relation to FIG. 6) (e.g., as indicated by 712*a*) to an unlocked state (e.g., as indicated by 712*b*) (e.g., as described above in relation to FIG. 6) (e.g., as indicated by 712*a*, 712*b* in FIGS. 7S-7T).

Transitioning the computer system from the locked state to the unlocked state when the biometric data does not meet the set of biometric authentication criteria but when one or more states of the external accessory device meets a set of accessory-based criteria and when the external accessory device is physically associated with a user reduces the number of inputs that are needed to allow the computer system to transition the computer system from the locked state to the unlocked state when biometric data does not meet the set of biometric authentication criteria and user provides the user with more control of the computer system by allowing the computer system to transition the computer system from the locked state to the unlocked state in situations where biometric authentication fails. Reducing the number of inputs that are needed to allow the computer system to perform the secure operation when biometric data does not meet the set of biometric authentication criteria and providing the user with more control of the computer system enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Transitioning the computer system from the locked state to the unlocked state when the biometric data does not meet the set of biometric authentication criteria but when one or more states of the external accessory device meets a set of accessory-based criteria and when the external accessory device is physically associated with a user allows the computer system to be transitioned from the locked state to the unlocked state when biometric authentication is not successful but other security criteria are satisfied, which allows the computer system to limit unauthorized performance of secure operations while providing an additional way to authorize the performance of the secure operation and improves security. Providing improved security reduces the unauthorized performance of secure operations which, additionally, reduces power usage and improves battery life of the computer system by enabling the user to use the computer system more securely and efficiently.

In some embodiments, the request to perform the secure operation with the computer system (e.g., 700) is a request to autofill (e.g., automatically populate; fill-in without requiring the user to specifically enter the information) content (e.g., stored, secure content (e.g., a user name, a user credential, a password, payment account information, address information)) into one or more fillable fields (e.g., text entry fields (e.g., password entry fields, credential entry fields)) (e.g., as described in relation to FIG. 7AM). In some embodiments, as a part of performing the secure operation, the computer system auto-fills content into the one or more fillable fields (e.g., as described in relation to FIG. 7AM). Auto-filling content when the biometric data does not meet the set of biometric authentication criteria but when one or more states of the external accessory device meets a set of accessory-based criteria and when the external accessory device is physically associated with a user reduces the number of inputs that are needed to allow the computer system to autofill content when biometric data does not meet the set of biometric authentication criteria and provides the user with more control of the computer system by allowing the computer system to autofill content in situations where biometric authentication fails. Reducing the number of inputs that are needed to allow the computer system to perform the secure operation when biometric data does not meet the set of biometric authentication criteria and providing the user with more control of the computer system enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Auto-filling content when the biometric data does not meet the set of biometric authentication criteria but when one or more states of the external accessory device meets a set of accessory-based criteria and when the external accessory device is physically associated with a user allows the computer system to autofill content when biometric authentication is not successful but other security criteria are satisfied, which allows the computer system to limit unauthorized performance of secure operations while providing an additional way to authorize the performance of the secure operation and improves security. Providing improved security reduces the unauthorized performance of secure operations which, additionally, reduces power usage and improves battery life of the computer system by enabling the user to use the computer system more securely and efficiently.

In some embodiments, after (and/or, in some embodiments, in response to) receiving the request (e.g., 750*b*, 750*f*, 750*r*, 750*ab*) to perform the secure operation with the computer system (e.g., 700), the computer system captures (e.g., detecting, receiving), via the one or more biometric sensors (e.g., 704), biometric data (e.g., 760*a*, 760*b*) (e.g., fingerprint data, data representative of a user's face and/or other body part).

In some embodiments, the request to perform the secure operation is a request to perform a secure operation of a first type (e.g., a request to unlock the computer system; a request that is not a request to perform a secure operation of a second type). In some embodiments, as a part of performing the secure operation, the computer system performs the secure operation of the first type. In some embodiments, the computer system receives a request (e.g., 750*b*, 750*f*, 750*r*, 750*ab*) at the computer system to perform a secure operation (e.g., one or more of 770*a*-770*e*) of a second type (e.g., authorizing a payment; auto-filling information), different from the first type. In some embodiments, in response to the request at the computer system to perform the secure operation of the second type with the computer system (e.g., 700) and in accordance with a determination that biometric data captured by the computer system (e.g., captured by the computer system in response to the request to perform the secure operation of the second type) meets a second set of biometric authentication criteria (e.g., a set of criteria that is the same as the set of biometric authentication criteria) (e.g., based on one or more settings 770), the computer system performs the secure operation of the second type. In some embodiments, in response to the request at the computer system to perform the secure operation of the second type with the computer system (e.g., 700) an in accordance with a determination that the biometric data does not meet the set of biometric authentication criteria (e.g., based on one or more settings 770), the computer system forgoes performing the secure operation of the second type (e.g., forgoing performing the secure operation of the second type regardless of whether one or more states of the external accessory device meets the set of accessory-based criteria). Forgoing performing the secure operation of the second type when biometric data does not meet the set of biometric authentication criteria allows the computer system to limit unauthorized performance of secure operations (e.g., regardless of whether one or more states of the external accessory device meets the set of accessory-based criteria), which provides improved security. Forgoing performing the secure operation of the second type when biometric data does not meet the set of biometric authentication criteria reduces the unauthorized performance of secure operations which, additionally, reduces power usage and improves battery life of the computer system by enabling the user to use the computer system more securely and efficiently.

In some embodiments, performing the secure operation in accordance with the determination that biometric data (e.g., 760*a*, 760*b*) captured by the computer system (e.g., 700) meets the set of biometric authentication criteria occurs without a determination of whether one or more states of the external accessory device meets the set of accessory-based criteria (e.g., 814-883) (e.g., as discussed above in relation to FIGS. 7Q-7T). In some embodiments, a determination of whether one or more states of the external accessory device meet the set of accessory-based criteria only occurs after a determination is made that that the biometric data does not meet the set of biometric authentication criteria. Performing the secure operation when biometric data captured by the computer system meets the set of biometric authentication criteria occurs without a determination of whether one or more states of the external accessory device meets the set of accessory-based criteria reduces the number of operations that the computer needs to perform being performing the secure operation. Reducing the number of operations that the computer needs to perform enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Performing the secure operation when biometric data captured by the computer system meets the set of biometric authentication criteria occurs without a determination of whether one or more states of the external accessory device meets the set of accessory-based criteria allows the computer system to limit unauthorized performance of secure operations and provides the computer system with technique to determine whether a particular set of security criteria are required to be met in order to perform a secure transaction, where the particular set of criteria is required to be met based on certain conditions, which improves security. Providing improved security reduces the unauthorized performance of secure operations which, additionally, reduces power usage and improves battery life of the computer system by enabling the user to use the computer system more securely and efficiently.

In some embodiments, performing the secure operation in accordance with a determination that the biometric data (e.g., 760*a*, 760*b*) does not meet the set of biometric authentication criteria and in accordance with a determination that one or more states of the external accessory device meets a set of accessory-based criteria (e.g., 814-883) is performed when (e.g., in response to a determination that) the determination that biometric data (e.g., 760*a*, 760*b*) captured by the computer system does not meet the set of biometric authentication criteria occurs (e.g., as discussed above in relation to FIGS. 7Q-7T) (e.g., the check for a wearable device that is unlocked and being worn by the user occurs if the primary biometric authentication method fails, for example, because the user is wearing a mask that covers a portion of the face and prevents the computer system from recognizing the user's face). Performing the secure operation in accordance with a determination that the biometric data does not meet the set of biometric authentication criteria and in accordance with a determination that one or more states of the external accessory device meets a set of accessory-based criteria when the determination that biometric data captured by the computer system does not meet the set of biometric authentication criteria occurs reduces the number of operations that the computer needs to perform being performing the secure operation. Reducing the number of operations that the computer needs to perform enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Performing the secure operation in accordance with a determination that the biometric data does not meet the set of biometric authentication criteria and in accordance with a determination that one or more states of the external accessory device meets a set of accessory-based criteria when the determination that biometric data captured by the computer system does not meet the set of biometric authentication criteria occurs allows the computer system to limit unauthorized performance of secure operations and provides the computer system with technique to determine whether a particular set of security criteria are required to be met in order to perform a secure transaction, where the particular set of criteria is required to be met based on certain conditions, which improves security. Providing improved security reduces the unauthorized performance of secure operations which, additionally, reduces power usage and improves battery life of the computer system by enabling the user to use the computer system more securely and efficiently.

In some embodiments, the determination that one or more states of the external accessory device meets the set of accessory-based criteria (e.g., 814-883) is made after (e.g., in response to) a determination (e.g., 814, 875) that the biometric data does not meet the set of biometric authentication criteria due to, at least in part, a predefined portion (e.g., 760*b*) (e.g., a portion of the biometric feature used (e.g., required for) biometric authentication (e.g., a mouth of the user)) of a biometric feature (e.g., face of user 760) not being available to be captured by the one or more biometric sensors (e.g., 704) (e.g., the mouth of the user is covered with a mask (e.g., 728) or scarf or other face covering). In some embodiments, if a determination is not made that the predefined portion of the biometric feature is not available to be captured by the one or more biometric sensors and the biometric data does not meet the set of biometric authentication criteria, the computer system forgoes performing the secure operation without a determination of whether one or more states of the external accessory device meets the set of accessory-based criteria being made (e.g., forgoing performing the secure operation occurs irrespective of whether one or more states of the external accessory device meets the set of accessory-based criteria if a determination is not made that that the predefined portion of the biometric feature is not available to be captured by the one or more biometric sensors).

In some embodiments, the computer system is in communication with one or more output devices. In some embodiments, in response to (1004) the request to perform the secure operation with the computer system (e.g., 700) and in accordance with a determination that the external accessory device (e.g., 790) is in a locked state (e.g., as indicated by 712*a*) (e.g., not in an unlocked state) (and, in some embodiments, in response to a determination that the biometric data does not meet the set of biometric authentication criteria), the computer system outputs (1016) (e.g., 858), via the one or more output devices (e.g., 710) (e.g., a display generation component (e.g., a display controller, a touch-sensitive display system); an audio speaker), a prompt (e.g., similar to 736*a*) to transition the external accessory device to an unlocked state (e.g., as indicated by 712*b*) (e.g., a prompt (e.g., a visual prompt, an audio prompt) to unlock the computer system). In some embodiments, the prompt is a visual prompt displayed on a lock screen or a passcode screen displayed at the computer system. Outputting a prompt to transition the external accessory device to an unlocked state provides the user with feedback about the current state of the authentication process and informs the user of an action that is needed to complete the authentication process and automatically surfaces a relevant function to improve the user-machine interface. Providing improved user feedback and automatically surfaces a relevant function to improve the user-machine interface enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Outputting a prompt to transition the external accessory device to an unlocked state informs the user of an action that is needed to complete the authentication process, which provides improved security because the user is informed that authentication is taking place and the action that is needed to complete authentication. Providing improved security reduces the unauthorized performance of secure operations which, additionally, reduces power usage and improves battery life of the computer system by enabling the user to use the computer system more securely and efficiently.

In some embodiments, the computer system is in communication with one or more output devices. In some embodiments, in response to (1004) the request to perform the secure operation with the computer system (e.g., 700) and in accordance with a determination that the external accessory device (e.g., 790) does not meet a set of proximity criteria (e.g., 868), the computer system outputs (1018) (e.g., 871), via the one or more output devices (e.g., 710) (e.g., a display generation component (e.g., a display controller, a touch-sensitive display system); an audio speaker), a prompt (e.g., 736*b*, 736*c*) to move the external accessory device (e.g., 790) closer to the computer system (e.g., 700) (e.g., a prompt (e.g., a visual prompt, an audio prompt) to unlock the computer system). In some embodiments, the prompt is a visual prompt displayed on a lock screen or a passcode screen displayed at the computer system. In some embodiments, the set of proximity criteria includes a criterion that is met when the external accessory device is determined to be (e.g., via a GPS signal; a wireless signal) within a predetermined distance of the computer system (and, in some embodiments, in response to a determination that the biometric data does not meet the set of biometric authentication criteria). Outputting a prompt to move the external accessory device closer to the computer system with feedback about the current state of the authentication process and informs the user of an action that is needed to complete the authentication process. Providing improved user feedback enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Outputting a prompt to move the external accessory device closer to the computer informs the user of an action that is needed to complete the authentication process, which provides improved security because the user is informed that authentication is taking place and the action that is needed to complete authentication. Providing improved security reduces the unauthorized performance of secure operations which, additionally, reduces power usage and improves battery life of the computer system by enabling the user to use the computer system more securely and efficiently.

In some embodiments, the computer system is in communication with one or more output devices (e.g., 710). In some embodiments, in response to (1004) the request to perform the secure operation with the computer system (e.g., 700) and in accordance with a determination (e.g., 860) that the external accessory device (e.g., 790) is not physically associated with the user (e.g., 760) (e.g., is not being worn by the user (e.g., on a body part (e.g., a wrist) of a user), is not in contact with the user, is not within a predefined proximity to the user and/or the computer system) (and, in some embodiments, in response to a determination that the biometric data does not meet the set of biometric authentication criteria), the computer system outputs (1020) (e.g., 862), via the one or more output devices (e.g., 710) (e.g., a display generation component (e.g., a display controller, a touch-sensitive display system); an audio speaker), a prompt (e.g., similar to 736*b*) to physically associate the external accessory device (e.g., 790) with the user (e.g., 760) (e.g., a prompt (e.g., a visual prompt, an audio prompt) to put the external accessory device on). In some embodiments, the prompt is a visual prompt displayed on a lock screen or a passcode screen displayed at the computer system. Outputting a prompt to physically associate the external accessory device with the user with feedback about the current state of the authentication process and informs the user of an action that is needed to complete the authentication process. Providing improved user feedback enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Outputting a prompt to physically associate the external accessory device informs the user of an action that is needed to complete the authentication process, which provides improved security because the user is informed that authentication is taking place and the action that is needed to complete authentication. Providing improved security reduces the unauthorized performance of secure operations which, additionally, reduces power usage and improves battery life of the computer system by enabling the user to use the computer system more securely and efficiently.

In some embodiments, the computer system is in communication with a display generation component (e.g., 710) (e.g., a display controller, a touch-sensitive display system). In some embodiments, after receiving a request at the computer system to perform a secure operation with the computer system and in accordance with a determination that a determination of whether the biometric data meets the set of biometric authentication is being made (being made by the computer system; being made by an external computer system in communication with the computer system), the computer system displays, via the display generation component, a first indication (e.g., 720) (e.g., "biometric recognition ongoing", and/or "facial recognition occurring").

In some embodiments, the computer system is in communication with a display generation component (e.g., 710) (e.g., a display controller, a touch-sensitive display system). In some embodiments, after receiving a request at the computer system to perform a secure operation with the computer system and in accordance with a determination that a determination of whether the one or more states of the external accessory device meets the set of accessory-based criteria is being made (being made by the computer system; being made by an external computer system in communication with the computer system), the computer system displays, via the display generation component, a second indication (e.g., 722), different from the first indication (e.g., "unlocking", "accessory-based unlocking"). Providing a first indication when a determination of whether the biometric data meets the set of biometric authentication is being made and a second indication of whether a determination of whether the one or more states of the external accessory device meets the set of accessory-based criteria is being made provides the user with visual feedback concerning the current type of authentication being performed. Providing improved user feedback enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Providing a first indication when a determination of whether the biometric data meets the set of biometric authentication is being made and a second indication of whether a determination of whether the one or more states of the external accessory device meets the set of accessory-based criteria is being made informs the user about the current type of authentication being perform, which provides improved security. Providing improved security reduces the unauthorized performance of secure operations which, additionally, reduces power usage and improves battery life of the computer system by enabling the user to use the computer system more securely and efficiently.

In some embodiments, the external accessory device includes a display and the external accessory device displays, after the computer system receives the request to perform the secure operation (and, in some embodiments, after or while the computer system is performing the secure operation), a first visual indication (e.g., user interface displayed by 790 in FIG. 7U (e.g., "John's phone unlocking with this watch")) (e.g., "computer system performing operation"; computer system unlocking"; computer system unlocked) that the computer system (e.g., 700) has initiated a process (e.g., is in the process)(and, in some embodiments, the computer system has completed the process) of performing the secure operation. Displaying a first visual indication that the computer system has initiated a process of performing the secure operation on the external accessory device informs a user that the authentication process is taking place and enhances security of the computer system by notify a user of a potential unauthorized performance of the secure operation. Providing improved user feedback enhances the operability of the external accessory device and makes the user-system interface more efficient (e.g., by helping the user to provide proper inputs and reducing user mistakes when operating/interacting with the device) which, additionally, reduces power usage and improves battery life of the device by enabling the user to use the external accessory device more quickly and efficiently. Providing improved security makes the user interface more secure and reduces the unauthorized performance of secure operations which, additionally, reduces power usage and improves battery life of the computer system by enabling the user to use the computer system more securely and efficiently. Displaying a first visual indication that the computer system has initiated a process of performing the secure operation on the external accessory device informs a user that the authentication process is taking place so that the user can cancel the authentication process if needed, which provides improved security. Providing improved security reduces the unauthorized performance of secure operations which, additionally, reduces power usage and improves battery life of the computer system by enabling the user to use the computer system more securely and efficiently.

In some embodiments, the first visual indication includes a first user-selectable graphical object (e.g., 796) (e.g., an affordance) that, when selected, causes the process (e.g., 889-891) of performing the secure operation to be cancelled (and/or, in some embodiments, reversed if the secure operation was partially or completely completed) by the computer system (e.g., 700). Providing the first visual indication that includes a first user-selectable graphical object that, when selected, causes the process of performing the secure operation to be cancelled by the computer system allows the computer system and external accessory to limit unauthorized performance of secure operations, which provides improved security because the user is able to cancel the secure operation before it is completed. Providing improved security reduces the unauthorized performance of secure operations which, additionally, reduces power usage and improves battery life of the computer system by enabling the user to use the computer system more securely and efficiently.

In some embodiments, receiving an input (e.g., 750*u*) (e.g., an input of a first type (e.g., a cover gesture over a predetermined portion of the display of the external accessory device)) at the external accessory device (e.g., 790) while the first visual indication is being displayed, causes (e.g., 889-891) the process of performing the secure operation to be cancelled (and/or, in some embodiments, reversed if the secure operation was partially or completely completed) by the computer system (e.g., 700 in FIGS. 7U-7V). Receiving an input at the external accessory device while the first visual indication is being displayed, the process of performing the secure operation to be cancelled by the computer system allows the computer system to cancel an unauthorized performance of secure operations, which provides improved security because the user is able to cancel the secure operation before it is completed. Providing improved security reduces the unauthorized performance of secure operations which, additionally, reduces power usage and improves battery life of the computer system by enabling the user to use the computer system more securely and efficiently.

In some embodiments, the external accessory device (e.g., 790) includes a display and the external accessory device displays, after the computer system performs the secure operation (and/or, in some embodiments, after or while the computer system is performing the secure operation), a second visual indication (e.g., user interface displayed by 790 in FIG. 7W (e.g., "John's phone unlocked with this watch")) (e.g., "computer system performing operation"; computer system unlocking"; computer system unlocked) that indicates that the computer system has performed the secure operation. Displaying a second visual indication that the computer system has performed the secure operation on the external accessory device informs a user that the authentication process has taken place and enhances security of the computer system by notify a user of a potential unauthorized performance of the secure operation. Providing improved user feedback enhances the operability of the external accessory device and makes the user-system interface more efficient (e.g., by helping the user to provide proper inputs and reducing user mistakes when operating/interacting with the device) which, additionally, reduces power usage and improves battery life of the device by enabling the user to use the external accessory device more quickly and efficiently. Providing improved security makes the user interface more secure and reduces the unauthorized performance of secure operations which, additionally, reduces power usage and improves battery life of the computer system by enabling the user to use the computer system more securely and efficiently. Displaying a second visual indication that the computer system has performed the secure operation on the external accessory device informs a user that the authentication process is taking place so that the user can cancel the authentication process if needed, which provides improved security. Providing improved security reduces the unauthorized performance of secure operations which, additionally, reduces power usage and improves battery life of the computer system by enabling the user to use the computer system more securely and efficiently.

In some embodiments, the second visual indication includes a second user-selectable graphical object (e.g., 796) (e.g., an affordance or button) that, when selected, causes the secure operation to be reversed (e.g., 889-891) by the computer system (e.g., to re-lock the phone when the secure operation was unlocking the phone). Providing the second visual indication that includes a second user-selectable graphical object that, when selected, causes the secure operation to be reversed by the computer system allows the computer system and external accessory device to limit unauthorized performance of secure operations, which provides improved security because the user is able to reverse the secure operation after it has been completed. Providing improved security reduces the unauthorized performance of secure operations which, additionally, reduces power usage and improves battery life of the computer system by enabling the user to use the computer system more securely and efficiently.

In some embodiments, receiving an input (e.g., 750*w*) (e.g., an input of a first type (e.g., a cover gesture over a predetermined portion of the display of the external accessory device)) at the external accessory device (e.g., 790) while the second visual indication is being displayed, causes the secure operation to be reversed (e.g., 889-891) by the computer system (e.g., 700 in FIGS. 7W-7X). Receiving an input at the external accessory device while the second visual indication is being displayed, causes the secure operation to be reversed by the computer system allows the computer system to reverse an unauthorized performance of secure operations, which provides improved security because the user is able to reverse the secure operation after it has been completed. Providing improved security reduces the unauthorized performance of secure operations which, additionally, reduces power usage and improves battery life of the computer system by enabling the user to use the computer system more securely and efficiently.

In some embodiments, in accordance with a determination that the external accessory device (e.g., a watch) does not meet the set of accessory-based criteria because the external accessory device is not within a particular distance, the computer system displays a prompt that the external accessory has not moved closer within the particular period of time.

In some embodiments, in accordance with a determination that biometric authentication is successful, the computer system does not check whether the external accessory device (e.g., a wearable device) is worn and/or unlocked.

In some embodiments, when the computer system is in communication with the computer system via a communication link (e.g., Wi-Fi communication). In some embodiments, the computer system is paired with the external accessory device. In some embodiments, the computer system and the external accessory device are required to be connected via Wi-Fi and/or Bluetooth connection(s) in order for the computer system to perform the secure operation with the assistance of the external accessory device.

In some embodiments, in accordance with a determination that the external accessory device (e.g., a watch) does not meet the set of accessory-based criteria because the external accessory device does not have a passcode, the computer system displays a prompt to indicate that the external device needs a passcode to be set (or a particular type of passcode) before the secure operation is performed with the assistance of the external accessory device.

In some embodiments, in accordance with a determination that the external accessory device (e.g., a watch) does not meet the set of accessory-based criteria because the external accessory device does not have a passcode that meets passcode parameters (e.g., length (e.g., six or more characters or digits)), the computer system displays a prompt that external accessory device needs passcode or a particular type of passcode (e.g., while providing notification that watch is being unlocked).

In some embodiments, the computer system cancels the performance of the secure operation if one or more error conditions occur (e.g., watch is off-wrist, user finishes typing in passcode on phone, snatch and grab detected) (e.g., before the performance of the secure operation is completed).

In some embodiments, the computer system provides a notification that the external accessory device has been unlocked even when the external accessory device has a do-no-disturb mode that is enabled (e.g., bypasses do-not-disturb mode).

In some embodiments, the computer system disables authentication of the computer system with the assistance of the external device (e.g., disables 770*i*, 770*j*) when passcode is changed (e.g., on watch, on phone).

In some embodiments, the external accessory device (e.g., a watch) does not meet the set of accessory-based criteria because motion has not been detected (e.g., by the watch, walking motion, running motion, etc.) within a period of time (or at least a certain amount of motion has not been detected) (e.g., a described above in relation to FIGS. 8A-8E).

In some embodiments, the set of accessory-based criteria includes a criterion that is met after (e.g., when) the computer system (e.g., 700) has performed the secure operation, in accordance with a determination that a set of authentication criteria (e.g., a set of criteria that is the same as the set of biometric authentication criteria or different than the set of biometric authentication criteria (e.g., passcode/password authentication criteria)) (e.g., as described below in relation to method 1100 (e.g., step 1110) of FIG. 11A) (e.g., 732 in FIGS. 7I and 7J), that does not include the set of accessory-based criteria, are satisfied, within a period of time after (and/or while) the external accessory device (e.g., 790) is in the unlocked state and physically associated with the user (and, in some embodiments, before the external accessory device is determined to be no longer physically associated with the user). Performing the secure operation in accordance with a determination that one or more states of the external accessory device meets a set of accessory-based criteria that includes a criterion that is met after the computer system has performed the secure operation, in accordance with a determination that a set of authentication criteria are satisfied that does not include the set of accessory-based criteria, within a period of time after the external accessory device is in the unlocked state and physically associated with the user allows the computer system to limit unauthorized performance of secure operations, which improves security. Providing improved security reduces the unauthorized performance of secure operations which, additionally, reduces power usage and improves battery life of the computer system by enabling the user to use the computer system more securely and efficiently.

In some embodiments, the set of accessory-based criteria includes a criterion that is met when a determination is made that a physical object (e.g., 728) (e.g., a mask, a cloth) is covering (e.g., obscuring or blocking from detection via the one or more biometric sensors) a portion of a face (e.g., 760*a*-760*b*) of a user (e.g., 760) (e.g., a portion that includes the nose and/or mouth of the user). In some embodiments, the secure operation is performed—in accordance with a determination that the biometric data does not meet the set of biometric authentication criteria and in accordance with a determination that one or more states of the external accessory device meets a set of accessory-based criteria—in accordance with a determination that the physical object is covering a portion of the face of the user. Performing the secure operation in accordance with a determination of whether one or more states of the external accessory device meets the set of accessory-based criteria that includes a criterion that is met when a determination is made that a physical object is covering a portion of a face of a user allows the computer system to limit unauthorized performance of secure operations based whether the user is wearing, which improves security. Providing improved security reduces the unauthorized performance of secure operations which, additionally, reduces power usage and improves battery life of the computer system by enabling the user to use the computer system more securely and efficiently.

In some embodiments, the set of accessory-based criteria includes a criterion that is met when the external accessory device is within a predetermined distance (e.g., a distance that is less than 2-3 meters, a distance that is less than 5 meters) from the computer system (e.g., 700). Performing the secure operation in accordance with a determination of whether one or more states of the external accessory device meets the set of accessory-based criteria that includes a criterion that is met when the external accessory device (and/or the computer system) is within a predetermined distance from the computer allows the computer system to limit unauthorized performance of secure operations based on whether the computer system and the external accessory device are within a predetermined distance from each other (e.g., are close to each other), which improves security. Providing improved security reduces the unauthorized performance of secure operations which, additionally, reduces power usage and improves battery life of the computer system by enabling the user to use the computer system more securely and efficiently.

In some embodiments, the set of accessory-based criteria includes a criterion that is met when the external accessory device (e.g., 790) (and/or the computer system) is not operating in a reduced-power compensation mode (e.g., a bedtime mode, a sleep mode, a do-not-disturb mode). In some embodiments, a first mode in which a display of the external accessory device does not respond to one or more types of inputs that it would respond to when it is in a second mode (e.g., a normal mode) that is different from the bedtime mode). In some embodiments, the bedtime mode is a sleep tracking mode, where the external accessory device tracks sleep activity patterns and/or bedtime activity patterns of a user wearing the external accessory device. In some embodiments, the bedtime mode is a mode (e.g., a bedside/nightstand mode) where the external accessory device displays a clock user interface (and, in some embodiment, the clock user interface includes the current time and/or one or more times for one or more alarms that are set) and/or displays a clock user interface in response to detecting an input directed to the display of the external accessory device. In some embodiments, the external accessory device is connected to charger when the external accessory device displays a clock user interface. In some embodiments, while operating in the reduced-power compensation mode, the display of the external accessory device is in a dimmed state (e.g., a state having less brightness than it would have in a normal mode). In some embodiments, while operating in the reduced-power compensation mode, the external accessory device (e.g., and/or the computer system) suppresses the output (e.g., haptic (e.g., vibration), audio, visual) of one or more notifications (e.g., incoming calls, text, messages, application notifications) (e.g., the output of notifications that occur when the external accessory device was not operating in the reduced-power compensation mode). In some embodiments, the reduced-power compensation mode is a reduced-power compensation mode that operates during a particular timeframe and/or time of day (e.g., a predefined time of day). In some embodiments, the reduced-power compensation mode is a reduced-power compensation mode that operates when (and/or while) a determination is made that the computer system has not moved (e.g., more than a predetermined threshold amount) and/or has not detected sound (e.g., above a predetermined audio level) for a predetermined period of time. In some embodiments, the reduced-power compensation mode is a reduced-power compensation mode that operates when (and/or while) a determination is made that a user of the external accessory device is asleep, is likely to be asleep, and/or was recently asleep. Performing the secure operation in accordance with a determination of whether one or more states of the external accessory device meets the set of accessory-based criteria that includes a criterion that is met when the external accessory device (and/or the computer system) is not operating in a reduced-power compensation mode allows the computer system to limit unauthorized performance of secure operations based on the mode that the external accessory device is operating in and/or to limit authorized performance of secure operations during a time where the user is asleep, is likely to be asleep, and/or was recently asleep, which improves security. Providing improved security reduces the unauthorized performance of secure operations which, additionally, reduces power usage and improves battery life of the computer system by enabling the user to use the computer system more securely and efficiently.

In some embodiments, the set of accessory-based criteria includes a criterion that is met when a determination is made that the external accessory device (e.g., 790) has moved a first amount within a first predetermined time (e.g., to indicate that user of the external accessory device is active (e.g., not asleep, is likely to be asleep, and/or was recently asleep)) (e.g., has moved with a first amount of speed within a predetermined period of time). Performing the secure operation in accordance with a determination of whether one or more states of the external accessory device meets the set of accessory-based criteria that includes a criterion that is met when a determination is made that the external accessory device has moved a first amount within a first predetermined time allows the computer system to limit unauthorized performance of secure operations based on whether a user of the external accessory device is (and/or has been) active, which improves security. Providing improved security reduces the unauthorized performance of secure operations which, additionally, reduces power usage and improves battery life of the computer system by enabling the user to use the computer system more securely and efficiently.

In some embodiments, the set of accessory-based criteria includes a criterion that is met when a determination is made that the external accessory device (e.g., 790) has been unlocked at least a first amount of times (e.g., 1, 2, 3, 5) within a second predetermined period of time (e.g., over the past 3, 4, 5 hours (e.g., past amount of time before the request to perform the secure operation was received)) (e.g., one time in the past 6.5 hours). In some embodiments, the set of accessory-based criteria includes a criterion that is met when a determination is made that the computer system (e.g., 700) has been unlocked at least a second amount of times (e.g., 1, 2, 3, 5) over a third predetermined period of time (e.g., over the past 3, 4, 5 hours (e.g., past amount of time before the request to perform the secure operation was received)) (e.g., one time in the past 6.5 hours). Performing the secure operation in accordance with a determination of whether one or more states of the external accessory device meets the set of accessory-based criteria that includes a criterion that is met when the external accessory device and/or the computer system has been unlocked at least a particular amount of times over a predetermined period of time allows the computer system to limit unauthorized performance of secure operations based on whether the respective device has been unlocked (e.g., unlocked recently), which improves security. Providing improved security reduces the unauthorized performance of secure operations which, additionally, reduces power usage and improves battery life of the computer system by enabling the user to use the computer system more securely and efficiently.

In some embodiments, the set of accessory-based criteria includes a criterion that is met when the computer system (e.g., 700) is configured to perform the secure operation based on the set of biometric authentication criteria being met. In some embodiments, the computer system is configured to perform the secure operation using biometric data based on one or more settings (e.g., a setting to unlock the computer system using biometric data). Performing the secure operation in accordance with a determination of whether one or more states of the external accessory device meets the set of accessory-based criteria that includes a criterion that is met when the computer system is configured to perform the secure operation using biometric data allows the computer system to limit unauthorized performance of secure operations, which improves security. Providing improved security reduces the unauthorized performance of secure operations which, additionally, reduces power usage and improves battery life of the computer system by enabling the user to use the computer system more securely and efficiently.

Note that details of the processes described above with respect to method 1000 (e.g., FIGS. 10A-10B) are also applicable in an analogous manner to the other methods described herein. For example, methods 800, 900, 1100, 1300, 1400, 1600, and 1800 optionally includes one or more of the characteristics of the various methods described above with reference to method 1000. For example, the methods 800, 900, 1000, and 1100 can be combined with methods 1300 and 1400, such that, when a biometric authentication process is unsuccessful using the techniques (e.g., biometric enrollment using a portion of biometric feature) described by methods 1300 and 1400, the techniques described by methods 800, 900, 1000, and 1100 can be used to unlock the computer system with the assistance of an external device (or vice-versa). For brevity, these details are not repeated below.

FIGS. 11A-11B are a flow diagram for controlling authentication at a computer system using an external device in accordance with some embodiments. Method 1100 is performed at a computer system (e.g., 100, 300, 500, 700) (e.g., a smartphone, a tablet) that is in communication with (e.g., wirelessly or by wire; integrates or includes) one or more biometric sensors (e.g., 704) (e.g., a fingerprint sensor, a facial recognition sensor (e.g., one or more cameras (e.g., dual cameras, triple camera, quad cameras, etc.) on the same side or different sides of the electronic device (e.g., a front camera, a back camera)), an iris scanner) (e.g., is hidden or concealed) and one or more output devices (e.g., 710) (e.g., a display generation component (e.g., a display controller, a touch-sensitive display system); an audio speaker)) (and one or more input devices (e.g., a touch-sensitive surface)). Some operations in method 1100 are, optionally, combined, the orders of some operations are, optionally, changed, and some operations are, optionally, omitted.

As described below, method 1100 provides an intuitive way for controlling authentication at a computer system using an external device. The method reduces the cognitive burden on a user for controlling authentication at a computer system, thereby creating a more efficient human-machine interface. For battery-operated computing devices, enabling a user to control authentication at a computer system faster and more efficiently conserves power and increases the time between battery charges.

The computer system receives (1102) a request (e.g., 750*f*) at the computer system (e.g., 700) to perform a first secure operation (e.g., as indicated by one or more of 770*a*-770*e*) with the computer system (e.g., 700) (e.g., unlocking the computer system, authorizing a payment with the computer system, authorizing use of a secure credential with the computer system, accessing a restricted application or restricted information with the computer system, auto-filling information with the computer system), (authorizing a payment with the computer system, authorizing use of a secure credential with the computer system, accessing a restricted application or restricted information with the computer system, auto-filling information with the computer system). In some embodiments, the request to unlock the computer system can include, but is not limited to: raising the computer system, pressing a hardware or software button, tapping the display when the system is in a low or lower power state, tapping a notification on the display, swiping on the display, including swiping up from a bottom of the display.

In response to (1104) the request (e.g., 750*b*, 750*f*) to perform the first secure operation with the computer system (e.g., 700) and in accordance with a determination that biometric data (e.g., 760*a*, 760*b*) captured by the computer system (e.g., captured by the computer system in response to the request to perform the secure operation) meets a set of biometric authentication criteria, the computer system performs (1106) the first secure operation.

In response to (1104) the request (e.g., 750*b*, 750*f*) to perform the first secure operation with the computer system (e.g., 700) and in accordance with a determination that the biometric data (e.g., 760*a*) does not meet the set of biometric authentication criteria (e.g., a set of criteria that includes a criterion that is met when the biometric data sufficiently matches an authorized biometric profile), the computer system forgoes performing (1108) the first secure operation.

After forgoing performing the first secure operation in response to the request (e.g., 750*f*) to perform the secure operation (e.g., within a predetermined period of time after the first set of respective criteria was not met, within the same session (e.g., while the computer system has continued to be in an active and/or wake state) in which the biometric authentication criteria was not met), the computer system receives (1110) (e.g., via 750*i*) authentication information (e.g., 730 in FIG. 7J) (a passcode/password e.g., via one or more input devices (e.g., a touch-sensitive surface) in communication with the computer system), additional/subsequent biometric data) that meets a set of authentication criteria (e.g., a set of criteria that is the same as the set of biometric authentication criteria or different than the set of biometric authentication criteria (e.g., passcode/password authentication criteria)).

In response to (1112) receiving (e.g., via 750*i*) the authentication information (e.g., 730 in FIG. 7J) that meets the set of authentication criteria, the computer system performs (1114) a second secure operation (e.g., as indicated by one or more of 770*a*-770*e*) associated with the authentication criteria (e.g., as discussed in relation to FIGS. 7J-7K) (e.g., unlocking the computer system, authorizing a payment with the computer system, authorizing use of a secure credential with the computer system, accessing a restricted application or restricted information with the computer system, autofilling information with the computer system). In some embodiments, the second secure operation is different from the first secure operation. In some embodiments, the second secure operation is the same as the first secure operation (e.g., unlocking the computer system) (e.g., a state where the computer system is not locked and/or a state where one or more functions of the computer system are available without providing authentication). In some embodiments, transitioning the computer system from the locked state to the unlocked state includes displaying a second user interface that includes an indication that the computer system is unlocking and/or is unlocked.

In response to (1112) receiving (e.g., via 750*i*) the authentication information (e.g., 730 in FIG. 7J) that meets the set of authentication criteria, the computer system provides (1116), (e.g., displaying a prompt, providing an audio/haptic output), via the one or more output devices (e.g., 710), a prompt (e.g., 724*a*) (e.g., one or more representations; via words, text, symbols, audio) to configure the computer system (e.g., 700) to perform secure operations when an external accessory device (e.g., 790) is physically associated with the user (e.g., 760) (e.g., a computer system (e.g., a wearable device (e.g., a smartwatch, headphones, glasses)), a device that is external to the computer system, a device that is in communication with the computer system via a communication channel, a device with a display generation component and one or more input devices). In some embodiments the prompt includes or is a selectable user interface object (e.g., a selectable user interface that was not previously displayed and/or displayed before receiving the authentication information that met the respective authentication criteria). In some embodiments, selection of the selectable user interface object initiates a process for configuring the computer system to be unlocked using an accessory device. In some embodiments, the prompt is a notification that is overlaid on top of another user interface (e.g., a home screen) and/or is displayed while the computer is in the unlocked state. In some embodiments, when the computer system is configured to be unlocked using the external accessory device one or more steps that are described in relation to method 1000 are completed to transition the computer system from a locked state to an unlocked state. In some embodiments, in accordance with a determination that a first set of respective criteria has been met, transitioning the computer system from a locked state to an unlocked state without displaying the selectable user interface object. In some embodiments, in response to receiving authentication information that does not satisfy respective authentication criteria, the computer system is maintained to be in the locked state and the prompt that indicates the option to configure the computer system to be unlocked using an accessory device is not displayed. Providing a prompt to configure the computer system to perform secure operations when an external accessory device is physically associated with the user after forgoing performing the first secure operation in response to the request to perform the secure operation and in response to receiving the authentication information that meets the set of authentication criteria provides the user with feedback about the ability to perform secure operations when an external accessory device is physically associated with the user and allows the computer system to limit notifying unauthorized users about the ability to perform secure operations when an external accessory device is physically associated with the user, which provides improved security. Providing improved user feedback enhances the operability of the computer system and makes the user-system interface more efficient (e.g., by helping the user to provide proper inputs and reducing user mistakes when operating/interacting with the system) which, additionally, reduces power usage and improves battery life of the system by enabling the user to use the computer system more quickly and efficiently. Providing improved security reduces the unauthorized performance of secure operations which, additionally, reduces power usage and improves battery life of the computer system by enabling the user to use the computer system more securely and efficiently.

In some embodiments, the request (e.g., 750*b*, 750*f*, 750*r*, 750*ab*, 750*aj*, 1250*z*) to perform the first secure operation with the computer system (e.g., 700) is a request to unlock the computer system (e.g., 700). In some embodiments, as a part of performing the first secure operation, the computer system transitions (e.g., as described above in relation to FIG. 6) the computer system from a locked state to an unlocked state (e.g., as described above in relation to FIG. 6). In some embodiments, as a part of performing the second secure operation associated with the authentication criteria, the computer system transitions the computer system from a locked state (e.g., as described above in relation to FIG. 6) to an unlocked state (e.g., as described above in relation to FIG. 6). Providing a prompt to configure the computer system to transition the computer system from a locked state to an unlocked state when an external accessory device is physically associated with the user after forgoing performing the first secure operation in response to the request to perform the secure operation and in response to receiving the authentication information that meets the set of authentication criteria allows the computer system to limit notifying unauthorized users about the ability to transition the computer system from a locked state to an unlocked state when an external accessory device is physically associated with the user, which provides improved security. Providing improved security reduces the unauthorized performance of secure operations which, additionally, reduces power usage and improves battery life of the computer system by enabling the user to use the computer system more securely and efficiently.

In some embodiments, the request to perform the first secure operation with the computer system (e.g., 700) is a request to autofill (e.g., automatically populate; fill-in without requiring the user to specifically enter the information) first content (e.g., stored, secure content (e.g., a user name, a user credential, a password, payment account information, address information) into a first set of one or more fillable fields (e.g., text entry fields (e.g., password entry fields; credential entry fields)) (e.g., as described in relation to FIG. 7AM). In some embodiments, as a part of performing the first secure operation the computer system auto-fills the first content into the first set of one or more fillable fields (e.g., as described in relation to FIG. 7AM). In some embodiments, as a part of performing the second secure operation associated with the authentication criteria, the computer system auto-fills second content (e.g., that is the same as the first content, that is different than the first content) into a second set of one or more fillable fields (e.g., as described in relation to FIG. 7AM). Providing a prompt to configure the computer system to autofill content when an external accessory device is physically associated with the user after forgoing performing the first secure operation in response to the request to perform the secure operation and in response to receiving the authentication information that meets the set of authentication criteria allows the computer system to limit notifying unauthorized users about the ability to autofill content when an external accessory device is physically associated with the user, which provides improved security. Providing improved security reduces the unauthorized performance of secure operations which, additionally, reduces power usage and improves battery life of the computer system by enabling the user to use the computer system more securely and efficiently.

In some embodiments, after (and/or, in some embodiments, in response to) receiving the request (e.g., 750*b*, 750*f*, 750*r*, 750*ab*, 750*aj*, 1250*z*) at the computer system (e.g., 700) to perform the first secure operation with the computer system (e.g., 700), the computer system captures (e.g., detecting, receiving), via the one or more biometric sensors (e.g., 704), biometric data (e.g., 760*a*, 760*b*) (e.g., fingerprint data, data representative of a user's face and/or other body part).

In some embodiments, after configuring the computer system to perform secure operations when an external accessory device (e.g., 790) is physically associated with the user (e.g., 760), the computer system receives a request (e.g., 750*b*, 750*f*, 750*r*, 750*ab*, 750*aj*, 1250*z*) at the computer system (e.g., 700) to perform a secure operation (e.g., one or more of 770*a*-770*e*) of the first type (e.g., as indicated by settings 770). In some embodiments, in response to receiving the request (e.g., 750*b*, 750*f*, 750*r*, 750*ab*, 750*aj*, 1250*z*) at the computer system to perform the secure operation of the first type and in accordance with a determination that biometric data (e.g., 760*a*, 760*b*) captured by the computer system (e.g., 700) (e.g., captured by the computer system in response to the request to perform the secure operation) meets the set of biometric authentication criteria, the computer system performs the first secure operation. In some embodiments, in response to receiving the request (e.g., 750*b*, 750*f*, 750*r*, 750*ab*, 750*aj*, 1250*z*) at the computer system to perform the secure operation of the first type and in accordance with a determination that the biometric data (e.g., 760*a*, 760*b*) does not meet the set of biometric authentication criteria but that one or more states of the external accessory device (e.g., 790) meets a set of accessory-based criteria (e.g., as described above with respect to method 1000), the computer system performs the first secure operation. In some embodiments, in response to receiving the request (e.g., 750*b*, 750*f*, 750*r*, 750*ab*, 750*aj*, 1250*z*) at the computer system to perform the secure operation of the first type and in accordance with a determination that the biometric data (e.g., 760*a*, 760*b*) does not meet the set of biometric authentication criteria and that one or more states of the external accessory device (e.g., 790) do not meet the set of accessory-based criteria (e.g., as described above with respect to method 1000), the computer system forgoes performing the first secure operation.

In some embodiments, the second secure operation associated with the set of criteria operation is a secure operation (e.g., one or more of 770*a*-770*e*) of a first type (e.g., a request to unlock the computer system; a request that is not a request to perform a secure operation of a second type). In some embodiments, the computer system receives a request (e.g., 750*b*, 750*f*, 750*r*, 750*ab*, 750*aj*, 1250*z*) at the computer system (e.g., 700) to perform a secure operation of a second type (e.g., authorizing a payment; auto-filling information), different from the first type of secure operation. In some embodiments, in response to receiving the request (e.g., 750*b*, 750*f*, 750*r*, 750*ab*, 750*aj*, 1250*z*) at the computer system (e.g., 700) to perform the secure operation of a second type and in accordance with a determination that biometric data (e.g., 760*a*, 760*b*) captured by the computer system (e.g., 700) (e.g., captured by the computer system in response to the request to perform the secure operation) meets the set of biometric authentication criteria, the computer system performs the second secure operation. In some embodiments, in response to receiving the request (e.g., 750*b*, 750*f*, 750*r*, 750*ab*, 750*aj*, 1250*z*) at the computer system (e.g., 700) to perform the secure operation of a second type and in accordance with a determination that the biometric data (e.g., 760*a*, 760*b*) does not meet the set of biometric authentication criteria (e.g., a set of criteria that includes a criterion that is met when the biometric data sufficiently matches an authorized biometric profile), the computer system forgoes performing the second secure operation without checking whether the external accessory meets the set of accessory-based criteria. Not providing a prompt to configure the computer system to perform secure operations of the second type when an external accessory device is physically associated with the user after forgoing performing the first secure operation in response to the request to perform the secure operation and in response to receiving the authentication information that meets the set of authentication criteria provides the user with additional control over the user interface. Providing additional control over the user interface enhances the operability of the external accessory device and makes the user-system interface more efficient (e.g., by helping the user to provide proper inputs and reducing user mistakes when operating/ interacting with the computer system) which, additionally, reduces power usage and improves battery life of the computer system by enabling the user to use the external accessory device more quickly and efficiently. Not providing a prompt to configure the computer system to perform secure operations of the second type when an external accessory device is physically associated with the user after forgoing performing the first secure operation in response to the request to perform the secure operation and in response to receiving the authentication information that meets the set of authentication criteria allows the computer system to limit notifying unauthorized users about the ability to perform secure operations when an external accessory device is physically associated with the user, which provides improved security. Providing improved security reduces the unauthorized performance of secure operations which, additionally, reduces power usage and improves battery life of the computer system by enabling the user to use the computer system more securely and efficiently.

In some embodiments, the one or more output devices includes a display generation component (e.g., 710) (e.g., a display controller, a touch-sensitive display system). In some embodiments, the prompt is a visual prompt (724*a*) (e.g., a visual notification) that is provided via the display generation component. In some embodiments, the prompt includes a first user-selectable graphical object (e.g., an affordance; a virtual button) that, when selected (e.g., 750*k*) (e.g., via a tap gesture; via a mouse click), initiates a process to configure the computer system (e.g., 700) to perform secure operations when the external accessory device (e.g., 790) is physically associated with the user (e.g., 760) (e.g., using one or more techniques as described above with respect to method 1000). In some embodiments, the computer system detects an input on the first user-selectable graphical object and, in response to detecting the input on the first user-selectable graphical object, the computer system is configured to perform secure operations when the external accessory device is physically associated with the user. In some embodiments, the process to configure the computer system to perform secure operations when the external accessory device is physically associated with a user includes displaying a settings user interface that includes an option that, when selected, configures the computer system to perform secure operations when the external accessory device is physically associated with the user. Providing a visual prompt that includes a first user-selectable graphical object that, when selected, initiates a process to configure the computer system to perform secure operations when the external accessory device is physically associated with the user reduces the number of inputs needs to initiate the process. Reducing the number of operations that the computer needs to perform enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Providing a visual prompt that includes a first user-selectable graphical object that, when selected, initiates a process to configure the computer system to perform secure operations when the external accessory device is physically associated with the user allows the computer system to inform an authorized user about the ability for the computer system to perform secure operations when an external accessory device is physically associated with the user, which provides improved security. Providing improved security reduces the unauthorized performance of secure operations which, additionally, reduces power usage and improves battery life of the computer system by enabling the user to use the computer system more securely and efficiently.

In some embodiments, after providing the prompt (e.g., 724*a*) (e.g., one or more representations; via words, text, symbols, audio) to configure the computer system (e.g., 700) to perform secure operations when an external accessory device (e.g., 790) is physically associated with the user, the computer system receives (1118) a request at the computer system to perform a secure operation (e.g., one or more of 770*a*-770*e*) of the first type. In some embodiments, in response to (1120) receiving the request (e.g., 750*b*, 750*f*, 750*r*, 750*ab*, 750*aj*, 1250*z*) at the computer system to perform the secure operation of the first type and in accordance with a determination that biometric data (e.g., 760*a*, 760*b*) captured by the computer system (e.g., 700) (e.g., captured by the computer system in response to the request to perform the secure operation) meets the set of biometric authentication criteria, the computer system performs (1122) the first secure operation. In some embodiments, in response to (1120) receiving the request (e.g., 750*b*, 750*f*, 750*r*, 750*ab*, 750*aj*, 1250*z*) at the computer system to perform the secure operation of the first type and in accordance with a determination that the biometric data (e.g., 760*a*, 760*b*) does not meet the set of biometric authentication criteria but the computer system (e.g., 700) has been configured to perform secure operations when the external accessory device (e.g., 790) is physically associated with the user (e.g., 760) and that one or more states of the external accessory device (e.g., 790) meets a set of accessory-based criteria (e.g., as described above with respect to method 1000), the computer system performs (1124) the first secure operation. In some embodiments, in response to (1120) receiving the request (e.g., 750*b*, 750*f*, 750*r*, 750*ab*, 750*aj*, 1250*z*) at the computer system to perform the secure operation of the first type and in accordance with a determination that the biometric data (e.g., 760*a*, 760*b*) does not meet the set of biometric authentication criteria but the computer system (e.g., 700) has not been configured to perform secure operations when the external accessory device (e.g., 790) is physically associated with the user (e.g., 760), the computer system forgoes performing (1126) the first secure operation (e.g., without regard to whether or not the one or more states of the external accessory device meets the set of accessory-based criteria) (e.g., as described above with respect to method 1000). In some embodiments, in response to receiving the request at the computer system to perform the secure operation of the first type and in accordance with a determination that the biometric data does not meet the set of biometric authentication criteria and that one or more states of the external accessory device do not meet the set of accessory-based criteria (e.g., as described above with respect to method 1000), forgoing performing the first secure operation (e.g., even if the computer system has been configured to perform secure operations when the external accessory device is physically associated with the user).

In some embodiments, the biometric data captured by the computer system (e.g., 700) includes data regarding one or more facial features (e.g., 760*a*, 760*b*) (e.g., one or more portions of a face of a user of the computer system).

In some embodiments, the biometric data captured by the computer system (e.g., 700) includes (e.g., includes in addition to including biometric data of other features) data regarding one or more fingerprint features (e.g., one or more portions of a fingerprint(s) of a user of the computer system).

In some embodiments, the biometric data captured by the computer system includes biometric data (e.g., 760*a*) of a biometric feature (e.g., face of user 760) (e.g., a face scan; a fingerprint pattern scan) and does not meet the set of biometric authentication criteria due to, at least in part, a predefined portion (e.g., 760*b*) (e.g., a portion of the biometric feature used (e.g., required for) (biometric authentication (e.g., a mouth of the user))) of the biometric feature (e.g., face of user 760) (e.g., a face) not being available to be captured by the one or more biometric sensors (e.g., 704) (e.g., the mouth of the user is covered with a mask (e.g., 728) or scarf or other face covering, eyes of the user are covered by glasses or sunglasses, fingers of the user are covered by gloves, etc.).

In some embodiments, in response to the request (e.g., 750*b*) to perform the first secure operation with the computer system (e.g., 700) and in accordance with a determination that biometric data (e.g., 760*a*, 760*b*) captured by the computer system (e.g., 700) (e.g., captured by the computer system in response to the request to perform the secure operation) meets the set of biometric authentication criteria, the computer system performs the first secure operation without providing (e.g., forgoing providing), via the one or more output devices (e.g., 710), a prompt (e.g., 724*a*) (e.g., one or more representations; via words, text, symbols, audio) to configure the computer system (e.g., 700) to perform secure operations when an external accessory device (e.g., 790) is physically associated with the user (e.g., in FIGS. 7A-7D). Performing the third secure operation without providing the prompt to configure the computer system to perform secure operations when an external accessory device is physically associated in response to receiving the third authentication information (e.g., without forgoing the third secure operation when biometric authentication fails) allows the computer system to limit notifying unauthorized users about the ability to perform secure operations when an external accessory device is physically associated with the user, which conserves system resources and increases the relevance when the prompt is provided. Improving the relevance of prompts and conserving system resources enhances the operability of the external accessory device and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Providing improved security reduces the unauthorized performance of secure operations which, additionally, reduces power usage and improves battery life of the computer system by enabling the user to use the computer system more securely and efficiently.

In some embodiments, the one or more output devices includes a display generation component (e.g., a display controller, a touch-sensitive display system). In some embodiments, the computer system displays (1128) a settings user interface (e.g., 770) that includes a second user-selectable graphical object (e.g., 770*i*, 770*j*) (e.g., an affordance; a virtual button) that, when selected (e.g., via a tap gesture; via a mouse click), modifies (e.g., 750*l*1) (e.g., that enables if currently disabled; disables if currently enabled) a configuration (e.g., a setting) of the computer system (e.g., 700) that authorizes the computer system (e.g., 700) to perform secure operations when a first external accessory device (e.g., 790) is physically associated with the user (e.g., 760) (e.g., regardless of whether (e.g., without requiring) biometric authentication data meets the set of biometric authentication criteria). In some embodiments, the settings user interface includes a third user-selectable graphical object that, when selected, modifies a configuration of the computer system that authorizes the computer system to perform secure operations when a second external accessory device, different than the first external accessory device, is physically associated with the user. In some embodiments, the settings user interface includes a third user-selectable graphical object that, when selected, initiates a process (e.g., 902-926) for modifying a configuration of the computer system that authorizes the computer system to perform secure operations with a second external accessory device is physically associated with the user. In some embodiments, when a determination is made that the computer system cannot be modified to authorize the computer system to perform secure operations when the external accessory device meets a set of accessory-based criteria, the computer system displays a prompt that indicates the reason why the computer system cannot be modified to authorize the computer system to perform secure operations using the external accessory device (e.g., 912, 916, 924) (e.g., 726*a*-726*c*). Providing a second user-selectable graphical object that, when selected a configuration of the computer system that authorizes the computer system to perform secure operations when a first external accessory device is physically associated with the user allows the computer system to the respective external accessory device that allows the computer system to perform secure operations when the respective external accessory device is physically associated with the user, which conserves system resources and increases the relevance when the prompt is provided. Improving the relevance of prompts and conserving system resources enhances the operability of the external accessory device and makes the user-system interface more efficient (e.g., by helping the user to provide proper inputs and reducing user mistakes when operating/interacting with the system) which, additionally, reduces power usage and improves battery life of the system by enabling the user to use the external accessory device more quickly and efficiently. Providing improved security reduces the unauthorized performance of secure operations which, additionally, reduces power usage and improves battery life of the computer system by enabling the user to use the computer system more securely and efficiently.

In some embodiments, the settings user interface (e.g., 770) includes a third user-selectable graphical object (e.g., 770*i*, 770*j*) that, when selected, modifies a configuration of the computer system that authorizes the computer system to perform secure operations when a second external accessory device, different than the first external accessory device (e.g., 790), is physically associated with the user (e.g., 760). In some embodiments, the second user-selectable graphical object (e.g., 770*i*, 770*j*) includes an identifier of the first external accessory device (e.g., 790) (e.g., "Watch 1"; "Jane's silver watch"; "38 mm watch") and an indication (e.g., a check mark; a toggle) of whether the computer system is currently configured to perform secure operations when the first external accessory device is physically associated with the user. In some embodiments, if only one external accessory device is available for use with the computer system to perform secure operations when the one external accessory device is physically associated with the user, the settings user interface does not include the identifier of the one external accessory device (e.g., the settings user interface includes an indication that the feature is enabled without the identifier). Providing an identifier of the first external accessory device and an indication of whether the computer system is currently configured to perform secure operations when the first external accessory device is physically associated with the user provides the user with feedback about the current external accessory devices that are available to be configured to perform secure operations when a current respective external accessory device is physically associated with the user. Providing improved user feedback enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Providing an identifier of the first external accessory device and an indication of whether the computer system is currently configured to perform secure operations when the first external accessory device is physically associated with the user informs the user about the current external accessory devices that are available to be configured to perform secure operations when a current respective external accessory device is physically associated with the user, which improves security because a user is aware of the current external accessory devices that are available to be configured to perform secure operations and is able to make changes based on the information. Providing improved security reduces the unauthorized performance of secure operations which, additionally, reduces power usage and improves battery life of the computer system by enabling the user to use the computer system more securely and efficiently.

In some embodiments, the third user-selectable graphical object (e.g., 770*i*, 770*j*) includes an identifier of the second external accessory device (e.g., 790) (e.g., "Watch 2"; "Jane's gold watch"; "42 mm watch") and an indication (e.g., a check mark; a toggle) of whether the computer system (e.g., 700) is currently configured to perform secure operations when the second external accessory device is physically associated with the user. Providing an identifier of the second external accessory device and an indication of whether the computer system is currently configured to perform secure operations when the second external accessory device is physically associated with the user provides the user with feedback about the current external accessory devices that are available to be configured to perform secure operations when a current respective external accessory device is physically associated with the user. Providing improved user feedback enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Providing an identifier of the second external accessory device and an indication of whether the computer system is currently configured to perform secure operations when the second external accessory device is physically associated with the user informs the user about the current external accessory devices that are available to be configured to perform secure operations when a current respective external accessory device is physically associated with the user, which improves security because a user is aware of the current external accessory devices that are available to be configured to perform secure operations and is able to make changes based on the information. Providing improved security reduces the unauthorized performance of secure operations which, additionally, reduces power usage and improves battery life of the computer system by enabling the user to use the computer system more securely and efficiently.

In some embodiments, while the computer system (e.g., 700) is not currently configured to perform secure operations when the first external accessory device (e.g., 790) is physically associated with the user (e.g., the feature is currently disabled), the computer system receives receiving a user input corresponding to the second user-selectable graphical object (e.g., 770*i*, 770*j*). In some embodiments, in response to receiving the user input (e.g., 750*l*) corresponding to the second user-selectable graphical object and in accordance with a determination that one or more states (e.g., locked/unlocked state of the external accessory device, state of being physically associated with a user, state of being in communication with the computer system (e.g., via wireless connection (e.g., Bluetooth, Wi-Fi), state of a configuration of a passcode/password that is associated with the external accessory device (e.g., length of passcode/password that is above/below a min/max length required of a passcode/password), state of whether the watch is set to a particular mode/setting (e.g., do not disturb mode (e.g., a mode where one or more incoming notifications are muted and/or one or more types of output (e.g., audio, visual, haptic) are suppressed for an incoming notification), a state where significant motion (e.g., motion above a threshold level of motion) of the external accessory device has been detected within a predetermined period of time (e.g., the external accessory device has moved 1-5 meters within 30-60 seconds))) of the first external accessory device meets a set of accessory-based criteria (814-883, 902-920) (e.g., accessory based unlocking criteria) that includes a criterion that is met when the first external accessory device is in an unlocked state (e.g., a state where the computer system is not locked and/or a state where one or more functions of the computer system are available without providing authentication) and includes a criterion that is met when the external accessory device is physically associated (e.g., is being worn by the user (e.g., on a body part (e.g., a wrist) of a user), is in contact with the user, is within a predefined proximity to the user and/or the computer system) with a user (e.g., a user of the computer system) (e.g., as described above in relation to method 1000), the computer system is configured to perform secure operations when the first external accessory device is physically associated with the user (e.g., 926). In some embodiments, in response to receiving the user input (e.g., 750*l*) corresponding to the second user-selectable graphical object and in accordance with a determination that one or more states of the first external accessory device does not meet the set of accessory-based criteria (814-883, 902-920), the computer system forgoes configuring the computer system to perform secure operations when the first external accessory device is physically associated with the user (e.g., 924). In some embodiments, in response to receiving the user input (e.g., 750*l*) corresponding to the second user-selectable graphical object and in accordance with a determination that one or more states of the first external accessory device does not meet the set of accessory-based criteria (814-883, 902-920), the computer system issues a prompt to modify the state of the first external accessory device to meet the accessory-based criteria (e.g., "unlock the accessory device to enable this feature")). Configuring the computer system to perform secure operations when the first external accessory device is physically associated with the user (e.g., when a set of conditions are met) allows the computer system to limit the unauthorized configuration of the computer system to perform secure operations when the first external accessory device is physically associated with the user which makes the computer system more secure by requiring the user to be in physical possession of the external accessory in order to enable it to be used to authorize performance of secure operations. Providing improved security reduces the unauthorized performance of secure operations which, additionally, reduces power usage and improves battery life of the computer system by enabling the user to use the computer system more securely and efficiently.

Note that details of the processes described above with respect to method 1100 (e.g., FIGS. 11A-11B are also applicable in an analogous manner to the methods described below/above. For example, methods 800, 900, 1000, 1300, 1400, 1600, and 1800 optionally includes one or more of the characteristics of the various methods described above with reference to method 1000. For example, the methods 800, 900, 1000, and 1100 can be combined with methods 1300 and 1400, such that, when a biometric authentication process is unsuccessful using the techniques (e.g., biometric enrollment using a portion of biometric feature) described by methods 1300 and 1400, the techniques described by methods 800, 900, 100), and 1100 can be used to unlock the computer system with the assistance of an external device (or vice-versa). For brevity, these details are not repeated below.

FIGS. 12A-12AA illustrate exemplary user interfaces for providing and controlling biometric authentication at a computer system in accordance with some embodiments. The user interfaces in these figures are used to illustrate the processes described below, including the processes in FIGS. 13A-13B and FIGS. 14A-14B.

FIGS. 12A-12K illustrate exemplary user interfaces for biometric enrollment of biometric feature that corresponds to an appearance profile (e.g., primary, alternate, or another profile). To aid in the discussion of FIGS. 12A-12AA, some of FIGS. 12A-12AA include Table 1280, which indicates whether a biometric feature (e.g., the face of the user) has been enrolled for an appearance profile (e.g., column 1 of Table 1280), whether authentication is enabled using the biometric feature for an appearance profile (e.g., column 2 of Table 1280), whether a portion of the biometric feature (e.g., eyes of the user, upper portion 1260*a*) has been enrolled for an appearance profile (e.g., column 3 of Table 1280), and whether a portion of the biometric feature has been enabled using only the portion of the biometric feature for an appearance profile (e.g., column 4 of Table 1280). The rows of Table 1280 correspond to a particular appearance profile for the embodiments described in FIGS. 12A-12AA, Table 1280 shows a row for a primary appearance profile and an alternate appearance profile. Thus, in the embodiments described in FIGS. 12A-12AA, a user can configure computer system 700 to recognize two different appearances for the user and/or configure computer system 700 to store and operate differently with respect to each respective appearance. While the biometric feature represented in Table 1280 is the face of the user and the portion of the biometric feature is the eyes of the user, additional tables could be used to represent different state(s) for other biometric features (e.g., fingerprint) and/or other portion(s) (e.g., portion of a finger) of biometric features.

In FIG. 12A, Table 1280 represents that the biometric feature (e.g., the face of the user) has been enrolled for the primary appearance profile (e.g., an authorized version of the biometric feature has been saved) (e.g., indicated by "Yes" in row 1, column 1 of Table 1280 in FIG. 12A) and authentication using the biometric feature has been enabled (e.g., indicated by "Yes" in row 1, column 2 of Table 1280 in FIG. 12A). However, Table 1280 also represents that the portion of the biometric feature (e.g., a portion of the face of the user) has not been enrolled for the primary appearance profile (e.g., indicated by "No" in row 1, column 3 of Table 1280 in FIG. 12A) and authentication using the portion of biometric feature has not been enabled (e.g., indicated by "No" in row 1, column 4 of Table 1280 in FIG. 12A).

As used herein, the portion of the biometric feature not being enrolled for a particular appearance profile means that the portion of the biometric feature is not available to be used for separate biometric authentication (e.g., biometric authentication using on the portion of the biometric feature). Thus, in some embodiments where the full biometric feature is enrolled (e.g., the entire face of the user is enrolled), including a portion that corresponds to the portion of the biometric feature (e.g., a portion that corresponds to the area surrounding the moth of the user) (e.g., a "No" in column 1 of Table 1280), the portion of the biometric feature that is available to be used for separate biometric authentication is not enrolled (e.g., a "No" in column 3 of Table 1280).

In some embodiments, the portion of the biometric feature has not been enrolled for the primary appearance profile because a user has recently updated computer system 700, where the portion of the biometric feature was not captured during an initial set up process before the user updated computer system 700.

In FIG. 12A, Table 1280 further represents that the biometric feature is not enrolled (e.g., indicated by "No" in row 2, column 1 of Table 1280 in FIG. 12A), the portion of the biometric feature is not enrolled (e.g., indicated by "No" in row 2, column 3 of Table 1280 in FIG. 12A), authentication using the portion of biometric feature has not been enabled (e.g., indicated by "No" in row 2, column 4 of Table 1280 in FIG. 12A), and authentication using the portion of biometric feature has not been enabled (e.g., indicated by "No" in row 2, column 2 of Table 1280 in FIG. 12A) for the alternate appearance profile. In some embodiments, the alternate appearance profile does not exist in memory of computer system 700 in FIG. 12A and/or a user has not set up the alternate appearance profile (e.g., which is a reason for the columns related to the alternate appearance profile in Table 1280 of FIG. 12A all being "No").

As illustrated in FIG. 12A, the appearance of user 1260 is similar to the alternate appearance profile (row 2 of Table 1280). Thus, user 1260 is in the alternate appearance in FIG. 12A. As illustrated in FIG. 12A, user 1260 is wearing mask 1228 and holding computer system 700. In the exemplary embodiments provided in FIGS. 12A-12AA, computer system 700 is a smartphone. In some embodiments, computer system 700 can be a different type of computer system, such as a tablet computer.

As illustrated in FIG. 12A, computer system 700 includes display 710. Computer system 700 also includes one or more inputs devices (e.g., touch screen of display 710, hardware button 702, and a microphone), a wireless communication radio, and one or more biometric sensors (e.g., biometric sensor 704, touch screen of display 710) (e.g., as described above in relation to FIG. 7A). As illustrated in FIG. 12A, user 1260 is holding computer system 700 in a position, where user 1260 can see content displayed on display 710 and biometric sensor 704 can detect the face of user 1260 (e.g., which is shown by zone of detection indication 1284). In particular, the face of user 1260 includes upper portion 1260*a*. In addition, the face of user 1260 includes bottom portion 1260*b* (as shown in FIG. 12E), which is covered by mask 1228 in FIG. 12A. Upper portion 1260*a* includes the eyes and eyebrows of user 1260, and bottom portion 1260*b* (as shown in FIG. 12E) includes the nose and mouth of user 1260. In some embodiments, other portions of the face of user 1260 can be delineated. In some embodiments, the upper portion 1260*a* (and/or bottom portion 1260*b* in FIG. 12E) can include less or more of the face of user 1260. At FIG. 12A, biometric sensor 704 can detect only the upper portion 1260*a* the face of user 1260.

As illustrated in FIG. 12A, computer system 700 is displaying a settings user interface that includes settings 770, using one or more techniques as described above in relation to FIG. 7L. At FIG. 12A, computer system 700 detects tap gesture 1250*a*1 on (e.g., at a location corresponding to) alternate appearance option 770*f* (e.g., "Set Up An Alternate Appearance").

Figure 12B:
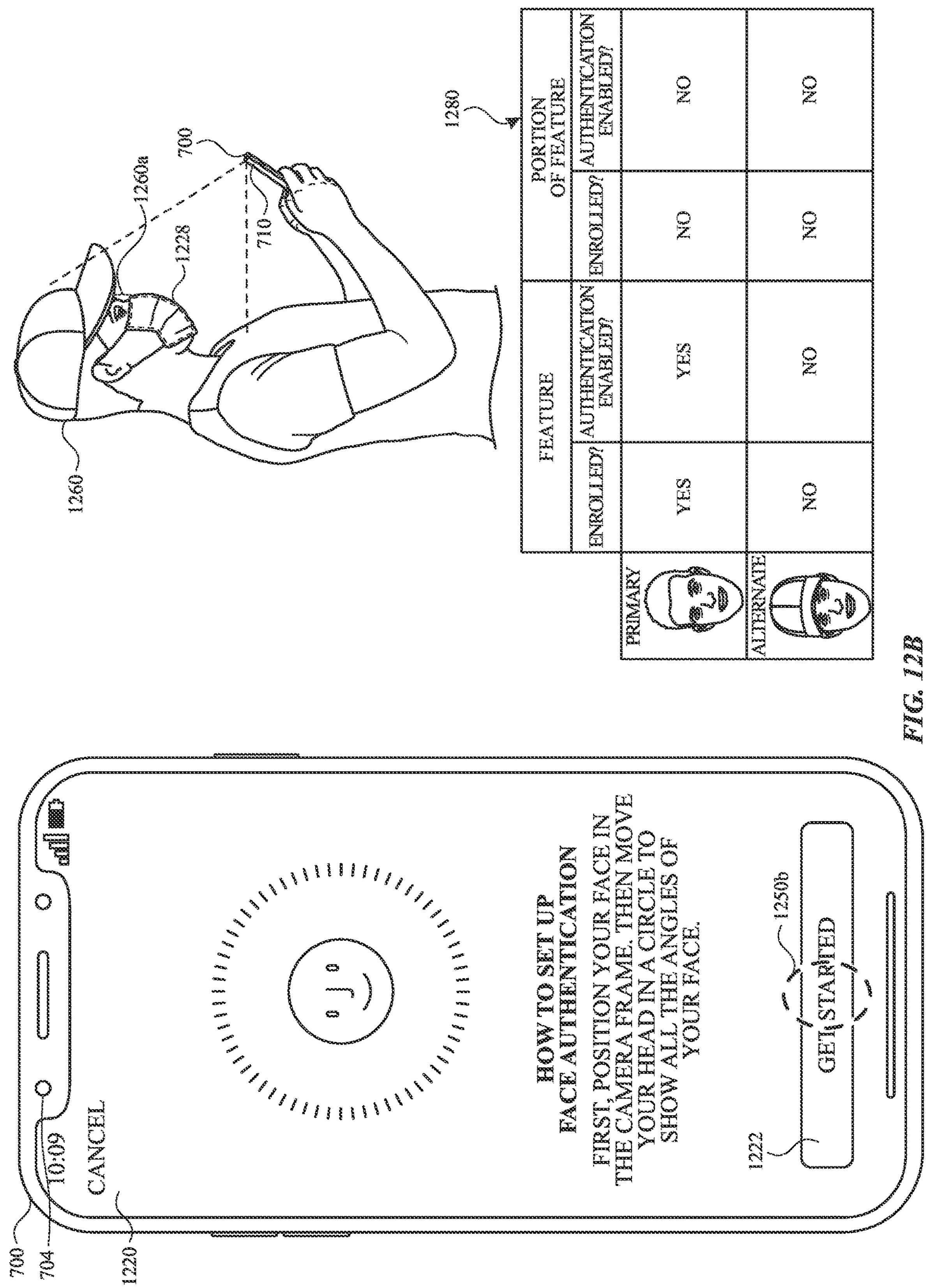
Figure 12E:
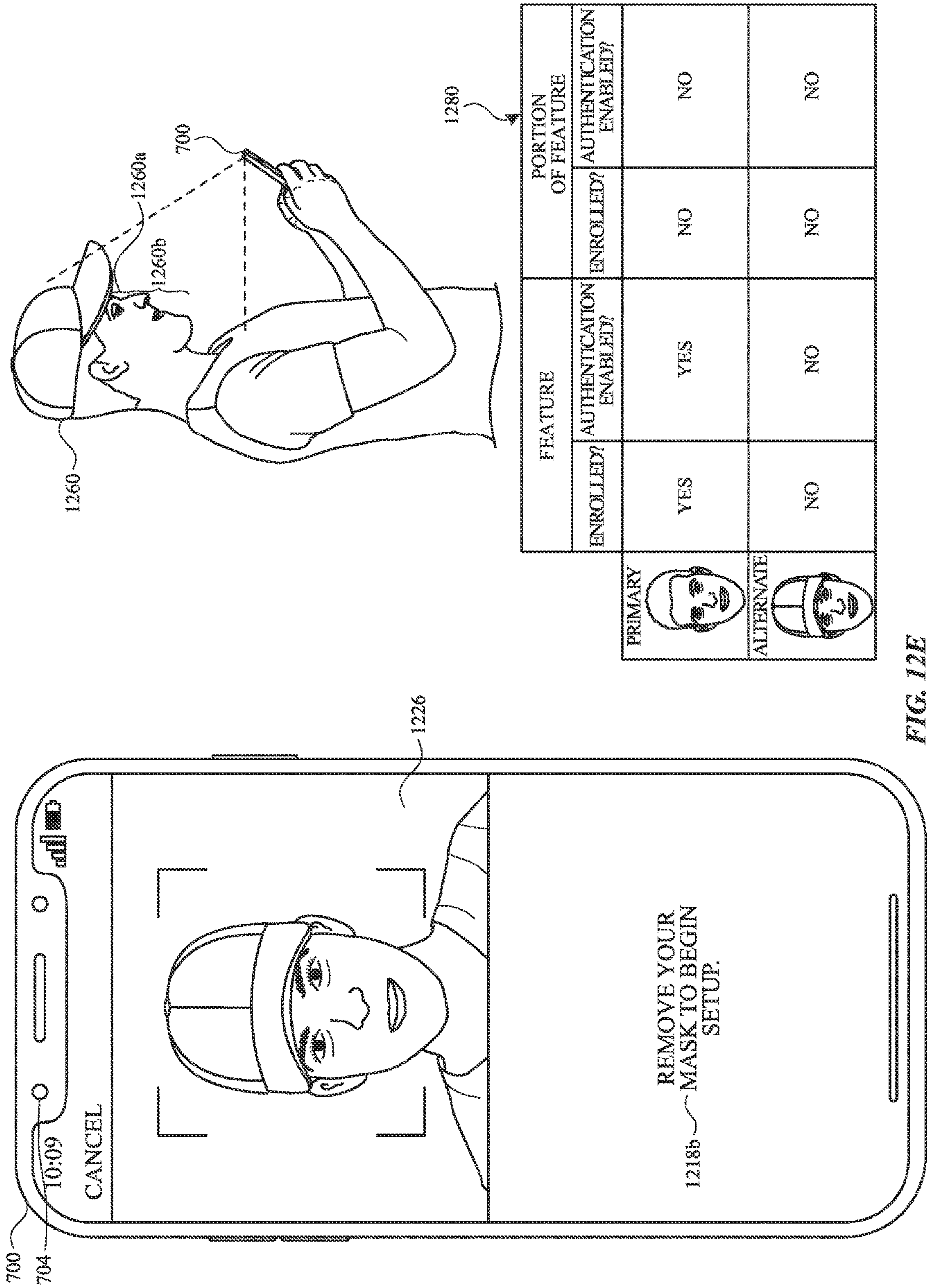

As illustrated in FIG. 12B, in response to detecting tap gesture 1250*a*1, computer system 700 initiates a biometric feature enrollment process for the alternate appearance profile and displays user interface 1220 (e.g., "How to Set Up Face Authentication") that includes start affordance 1222. In some embodiments, computer system 700 initiates a biometric feature enrollment process in other ways. In some embodiments, computer system 700 initiates a biometric feature enrollment process in response to detecting tap gesture 1250*a*2 on unlock-with-mask setting toggle 770*g* or in response to detecting tap gesture 1250*a*3 on reset face authentication option 770*h*. In some embodiments, computer system 700 initiates a biometric feature enrollment process for the primary appearance profile (and/or the alternate appearance profile) when the biometric feature is not enrolled for the primary appearance profile (and/or the alternate appearance profile) in response to detecting tap gesture 1250*a*2. In some embodiments, in response to detecting tap gesture 1250*a*3, computer system 700 resets (deletes) one or more of the stored biometric feature profiles (and/or initiates a process resetting one or more of the stored biometric feature profiles) and initiates a biometric feature enrollment process for the primary appearance profile (and/or the alternate appearance profile). In some embodiments, computer system 700 initiates a biometric feature enrollment process for the primary appearance profile (and/or the alternate appearance profile) when computer system 700 has been turned on for the first time and/or reset to a factory condition state. In some embodiments, computer system 700 displays user interface 1220 when initiating the biometric feature enrollment process for an appearance profile. At FIG. 12B, while displaying user interface 1220 that includes start affordance 1222 on display 710, computer system 700 detects tap gesture 1250*b* on start affordance 1222.

As illustrated in FIG. 12C, in response to detecting tap gesture 1250*b*, computer system 700 displays user interface 1224 that includes viewfinder 1226 and notification 1218*a* (e.g., "Position Your Face Within The Frame"). As illustrated in FIG. 12C, viewfinder 1226 includes a representation of the field-of-view of biometric sensor 704. Here, the representation of the field-of-view of biometric sensor 704 includes the face of user 1260 that is positioned within a frame that is displayed on viewfinder 1226. At FIG. 12C, biometric sensor 704 captures one or more representations of the face of user 1260 and determines that user 1260 is wearing mask 1228 (or likely wearing mask 1228).

As illustrated in FIG. 12D, because the determination was made that user 1260 is wearing a mask, computer system 700 ceases to display notification 1218*a* and displays notification 1218*b*, which instructs the user to "[r]emove your mask to begin set up."

At FIG. 12E, a determination is made that user 1260 is no longer wearing mask 1228 (e.g., as shown in FIG. 12E) (or a determination that upper portion 1260*a* of FIG. 12E and bottom portion 1260*b* of FIG. 12E are available to be captured). In some embodiments, the determination is made that user 1260 is no longer mask 1228 based on one or more images captured by biometric sensor 704, where both upper portion 1260*a* of FIG. 12E and bottom portion 1260*b* of FIG. 12E are represented in the respective images.

Figure 12F:
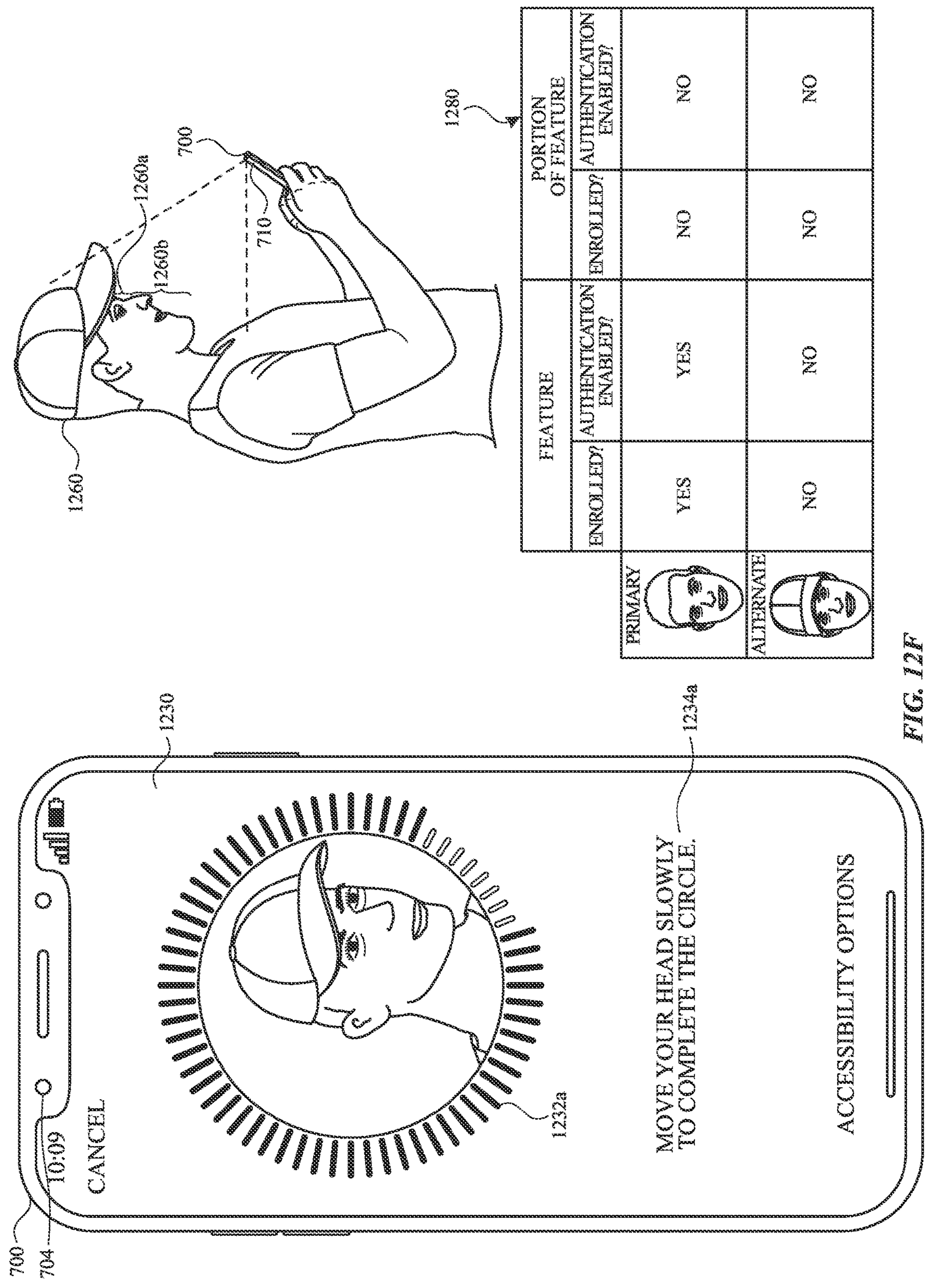

As illustrated in FIG. 12F, because the determination is made that user 1260 is no longer wearing mask 1228, computer system 700 initiates a process for scanning (or capturing) the biometric feature to be enrolled (e.g., as authorized biometric data, stored and associated with the alternate appearance profile) and displays user interface 1230 that includes capture indicator 1232*a* that surrounds a live representation of user 1260 that is captured by biometric sensor 704. In addition, user interface 1230 also includes notification 1234*a*, which indicates that the user should "move [their] head slowly to complete the circle" (e.g., shown as capture indicator 1232*a*). In some embodiments, computer system 700 does not initiate a process for scanning the biometric feature to be saved until determining that the user is no longer wearing mask 1228 in order to capture/scan the entirety of the face of user 1260 and/or scan the face of user 1260 without a portion of the face being covered. At FIG. 12F, a determination is made that the face of user 1230 has been scanned (or captured) (e.g., capture indicator 1232*a* is completed).

Figure 12G:
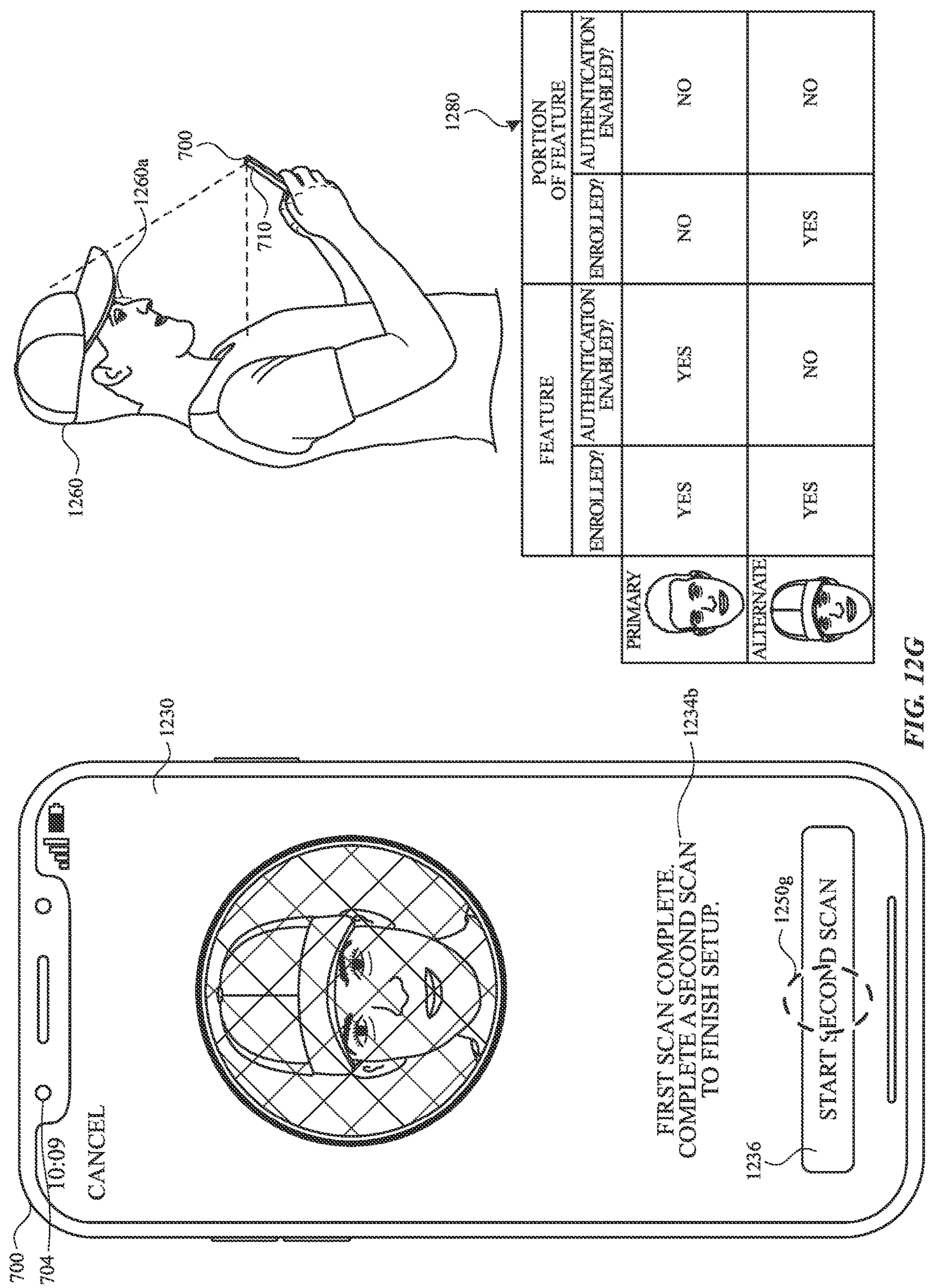

At FIG. 12G, because the determination was made that the face of user 1260 has been scanned, computer system 700 enrolls (or saves) the biometric feature for the face of the user (e.g., biometric feature) and the eyes of the user (e.g., portion of the biometric feature) (e.g., as shown in Table 1280 being updated from "No" to "Yes" in row 2, column 1 and row 2, column 4 when comparing FIGS. 12F-12G). As illustrated in FIG. 12G, computer system 700 displays a user interface with notification 1234*b* and start-second-scan affordance 1236 because the determination was made that the face of user 1230 has been scanned. Notification 1234*b* indicates that the first scan has been complete and that a second scan is needed to complete the biometric feature enrollment process. At FIG. 12G, computer system 700 detects tap gesture 1250*g* on start-second-scan affordance 1236.

As illustrated in FIG. 12H, in response to detecting tap gesture 1250*g*, computer system 700 initiates a second process for scanning (or capturing) the biometric feature to be enrolled and displays user interface 1230 that includes capture indicator 1232*b* that surrounds a live representation of user 1260 that is captured by biometric sensor 704. In addition, user interface 1260 also includes notification 1234*a*. At FIG. 12H, a determination is made that the face of user 1260 has been scanned (or captured) (e.g., capture indicator 1232*b* is completed).

At FIG. 12I, because the determination was made that the face of user 1260 has been scanned, computer system 700 finishes the enrollment of the biometric feature (e.g., face) and the portion of the biometric feature (e.g., eyes of user). In some embodiments, computer system 700 enrolls the biometric feature (e.g., entire face of user) separately from the portion of the biometric feature. In some embodiments, when the computer system enrolls the biometric feature, the enrolled biometric feature is available to be used in a first type of biometric authentication (e.g., biometric authentication where the face of the user is captured to authenticate). In some embodiments, when the computer system enrolls the portion of the biometric feature, the portion of the biometric feature is available to be used in a second type of biometric authentication (e.g., biometric authentication where only a predefined portion of the face of the user is captured to authenticate). In some embodiments, the biometric feature cannot be used to authenticate captured biometric data using the second type of biometric authentication and/or the enrolled portion of the biometric feature cannot be used to authenticate captured biometric data using the first type of biometric authentication.

As illustrated in FIG. 12I, computer system 700 displays next affordance 1238 and notification 1234*c*, which indicates that the second scan is complete. In some embodiments, during the first scan (e.g., in FIGS. 12F-12G), the first feature is enrolled (or the enrollment of the first feature is finalized), and during the second scan (e.g., FIGS. 12H-12I), the portion of the first feature is enrolled (or the enrollment of the portion of the first feature is finalized) (e.g., row 2, column 3 would be "No" of Table 1280 in FIG. 12F until the second scan is completed in FIG. 12G). In some embodiments, the second scan is a different type of scan than the first scan. In some embodiments, the second scan captures a smaller area of the face of user 1260 than the area that the first can captures. In some embodiments, the first scan captures the portions outside of the face (e.g., area outside of the area surrounding the mouth of the user) other than a predefined portion of the face (e.g., the area surrounding the mouth of the user). At FIG. 12I, computer system 700 detects tap gesture 1250*i* on next affordance 1238.

Figure 12J:
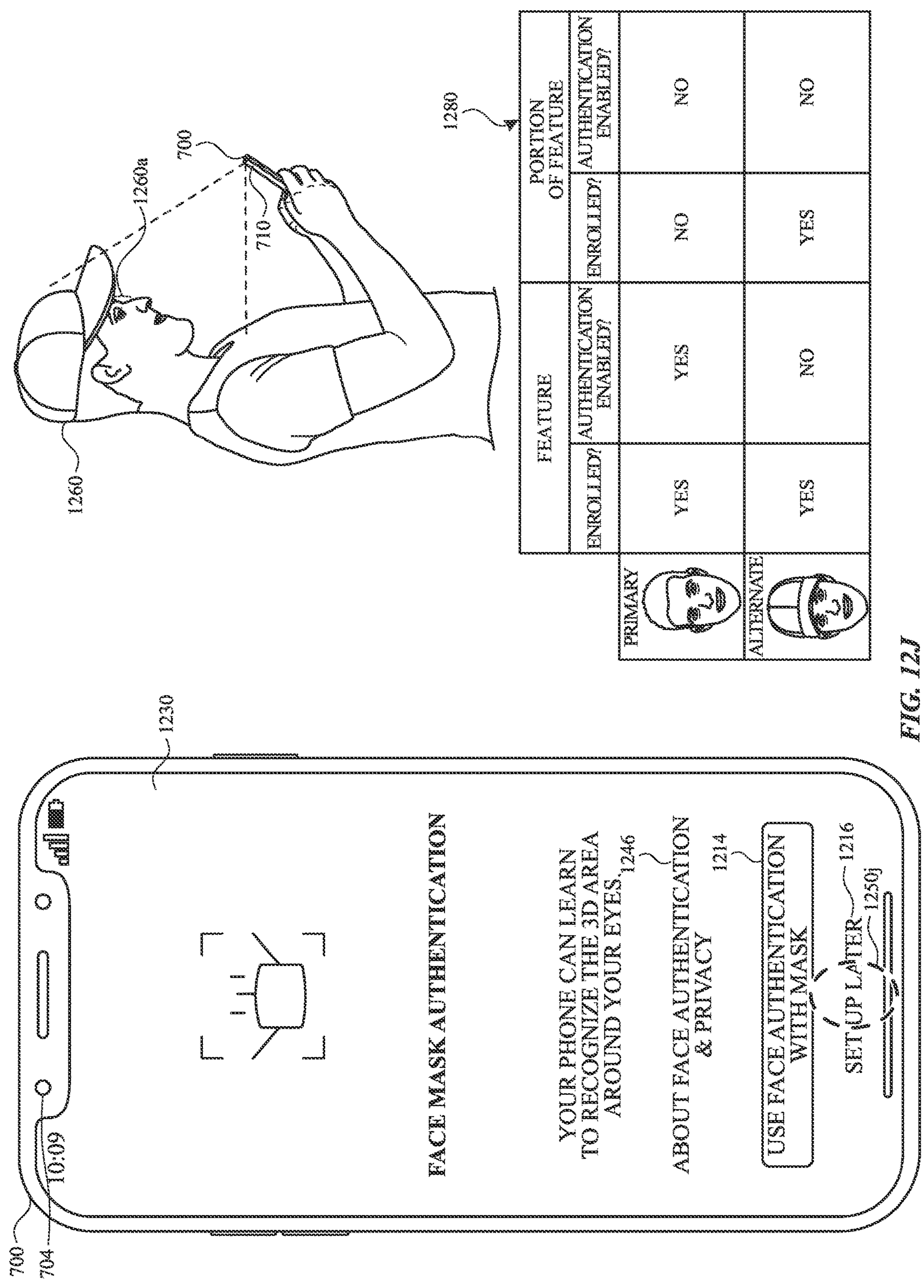

As illustrated in FIG. 12J, in response to detecting tap gesture 1250*i*, computer system 700 displays a user interface that includes accept-use-face-with-mask-authentication affordance 1214 (e.g., "Use Face Authentication with Mask") and reject-use-face-with-mask-authentication affordance 1216. In some embodiments, in response to detecting a tap gesture on accept-use-face-with-mask-authentication affordance, computer system 700 enables biometric authentication using only a portion of the captured portions of the face of user 1260 for a particular profile (e.g., alternate profile in FIG. 12J). In some embodiments, in response to detecting a tap gesture on accept-use-face-with-mask-authentication affordance 1214, enables authentication using the face of user 1260 for a particular profile (e.g., in addition to enabling biometric authentication using the captured portion of the face of user 1260). In some embodiments, after enabling authentication using the face of user 1260 for a particular profile, computer system 700 displays the user interface of FIG. 12Y (discussed below) and/or FIG. 12Y1 (discussed below) with unlock-with-mask-alternate-appearance setting toggle 1270*z* enabled (discussed below). In some embodiments, the user interface of FIG. 12J includes an indication that authenticating using a portion of the biometric feature is less secure than authenticating using the full biometric feature. In some embodiments, the indication that authenticating using a portion of the biometric feature is less secure than authenticating using the full biometric feature is displayed in response to detecting a tap gesture on affordance 1246 (e.g., "About Face Authentication & Privacy"). At FIG. 12J, computer system 700 detects tap gesture 1250*j* on reject-use-face-with-mask-authentication affordance 1216.

Figure 12K:
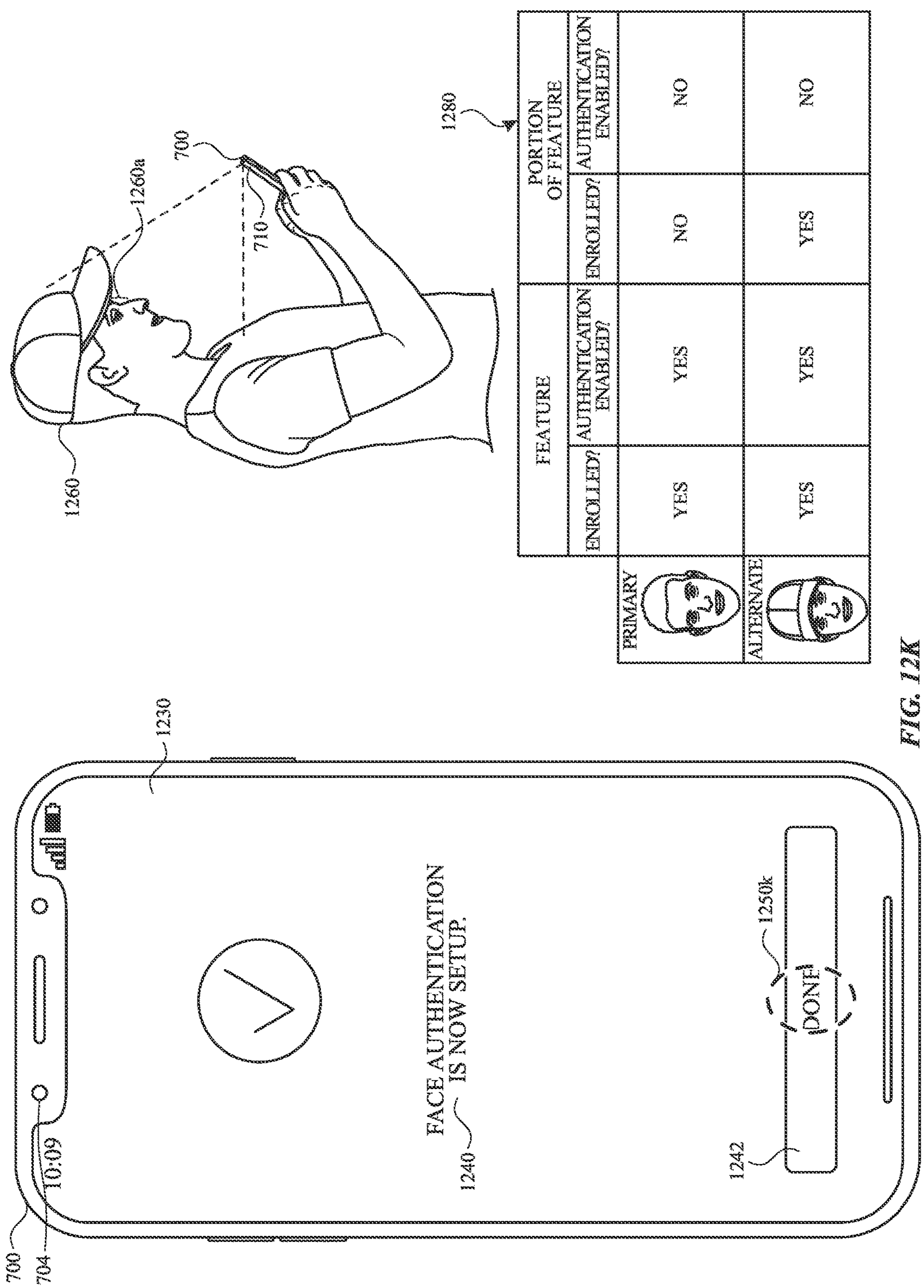

As illustrated in FIG. 12K, in response to detecting tap gesture 1250*j*, computer system 700 displays a user interface that includes notification 1240, which indicates that "Face Authentication is now Set Up" and done affordance 1242. In FIG. 12K, Table 1280 has been updated to show that authenticating using the biometric feature for the alternate appearance profile is enabled (e.g., indicated by "Yes" in row 2, column 2 of Table 1280 FIG. 12K when compared to the "No" in row 2, column 2 of Table 1280 in FIG. 12J). However, Table 1280 has not been updated to show that authenticating using the portion of the biometric feature is enabled for the alternate appearance profile because computer system 700 detects tap gesture 1250*j* on reject-use-face-with-mask-authentication affordance 1216 instead of on accept-use-face-with-mask-authentication affordance 1214 in FIG. 12J. While FIG. 12K shows Table 1280 being updated to reflect that authenticating using the biometric feature is enabled for the alternate appearance profile, authenticating using the biometric feature could have been enabled for the alternate appearance profile at another step of the process for initiating a biometric feature enrollment process for the alternate appearance profile (e.g., as discussed above in relation to FIGS. 12B-12K).

Turning back to FIG. 12J, in some embodiments, the user interface of FIG. 12J can be displayed before the first scan (e.g., FIGS. 12F-12G) has started and/or the second scan has started (FIGS. 12H-12I). In some of these embodiments, computer system 700 does not enroll data corresponding to the portion of the biometric feature in response to detecting tap gesture 1250*j* on reject-use-face-with-mask-authentication affordance 1216. In some of these embodiments, computer system 700 enrolls data corresponding to the portion of the biometric feature in response to detecting a tap gesture on accept-use-face-with-mask-authentication affordance 1214.

Figure 12L:
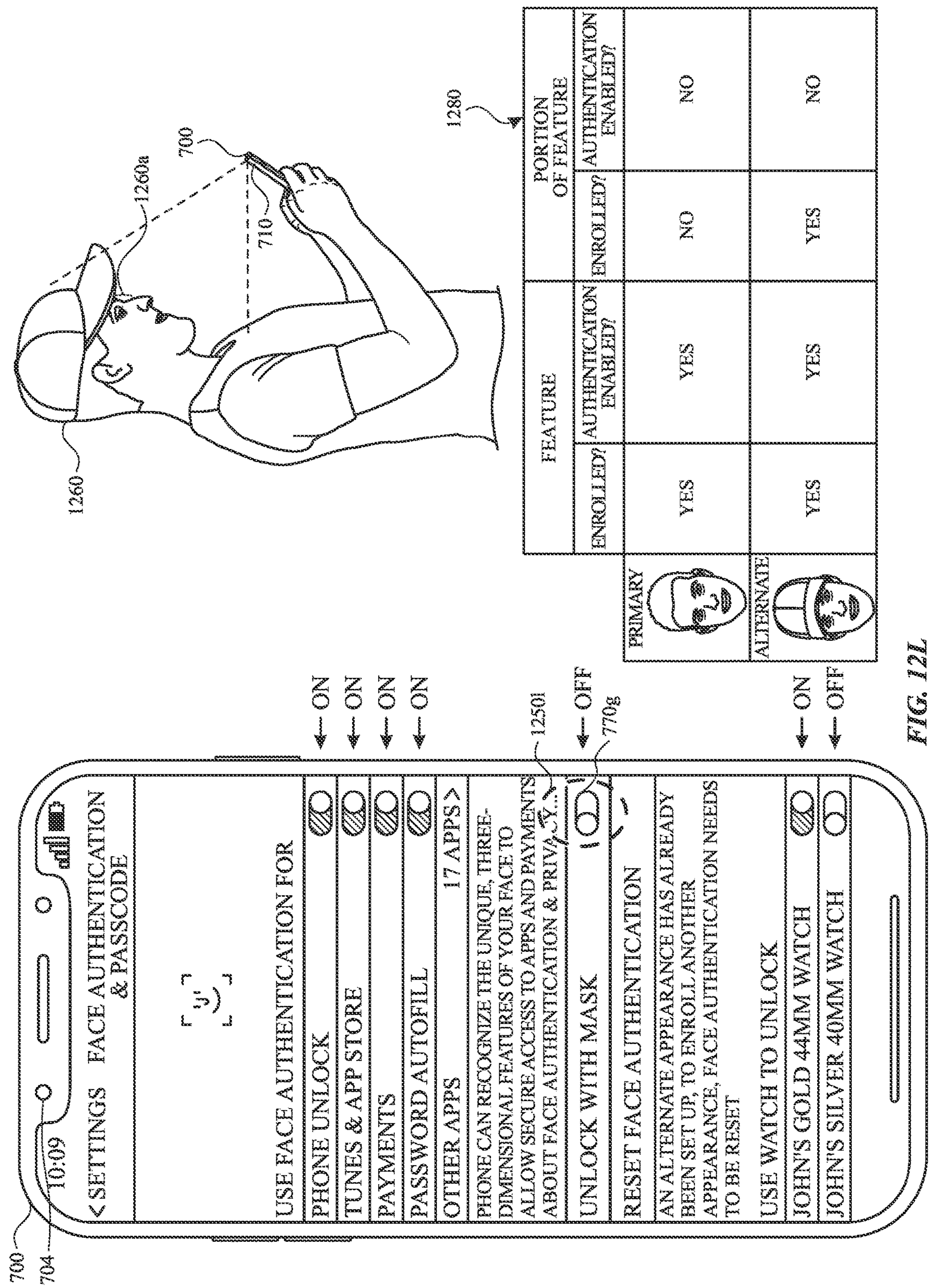

Turning back to FIG. 12K, computer system 700 detects tap gesture 1250*k* on done affordance 1242. As illustrated in FIG. 12L, in response to detecting tap gesture 1250*k*, computer system 700 re-displays the settings user interface. The settings user interface of FIG. 12L does not include alternate appearance option 770*f* because a max number of alternate appearance profiles have been set for computer system 700 (or user 1260).

FIG. 12L1 illustrates an alternate (or additional, in some embodiments) figure to FIG. 12L that computer system 700 can display. In some embodiments, FIG. 12L1 is displayed after computer system 700 has been updated to include new software (e.g., which is indicated by "Update to Complete" being displayed on the user interface of FIG. 12L1). In some embodiments, the new software contains functionality that allows for biometric authentication using only a portion of the biometric feature, while the software included on computer system 700 did not contain functionality that allows for biometric authentication using only a portion of the biometric feature. The user interface of FIG. 12L1 includes accept-use-face-with-mask-authentication affordance 1214 (e.g., "Use Face Authentication With Mask") and reject-use-face-with-mask-authentication affordance 1216. In some embodiments, computer system 700 performs similar actions to those described above in FIG. 12J with respect to receiving a gesture on accept-use-face-with-mask-authentication affordance 1214 or and reject-use-face-with-mask-authentication affordance 1216. In some embodiments, in response to detecting tap gesture 1250/1 on accept-use-face-with-mask-authentication affordance 1214, computer system 700 performs similar actions to those described below in relation to computer system 700 detecting tap gesture 1250*l* in FIG. 12L.

At FIG. 12L, computer system 700 detects tap gesture 1250*l* on unlock-with-mask setting toggle 770*g*. At FIG. 12L, in response to detecting tap gesture 1250*l*, a determination is made that the portion of the biometric feature has not been enrolled for the primary appearance profile (and, in some embodiments, the alternate appearance profile). In some embodiments, in response to detecting tap gesture 1250*l*, a determination is made that the portion of the biometric feature has been enrolled, and computer system 700 displays the user interface of FIG. 12Y1 (or some version of user interface FIG. 12Y1) (discussed below) based on this determination.

Figure 12M:
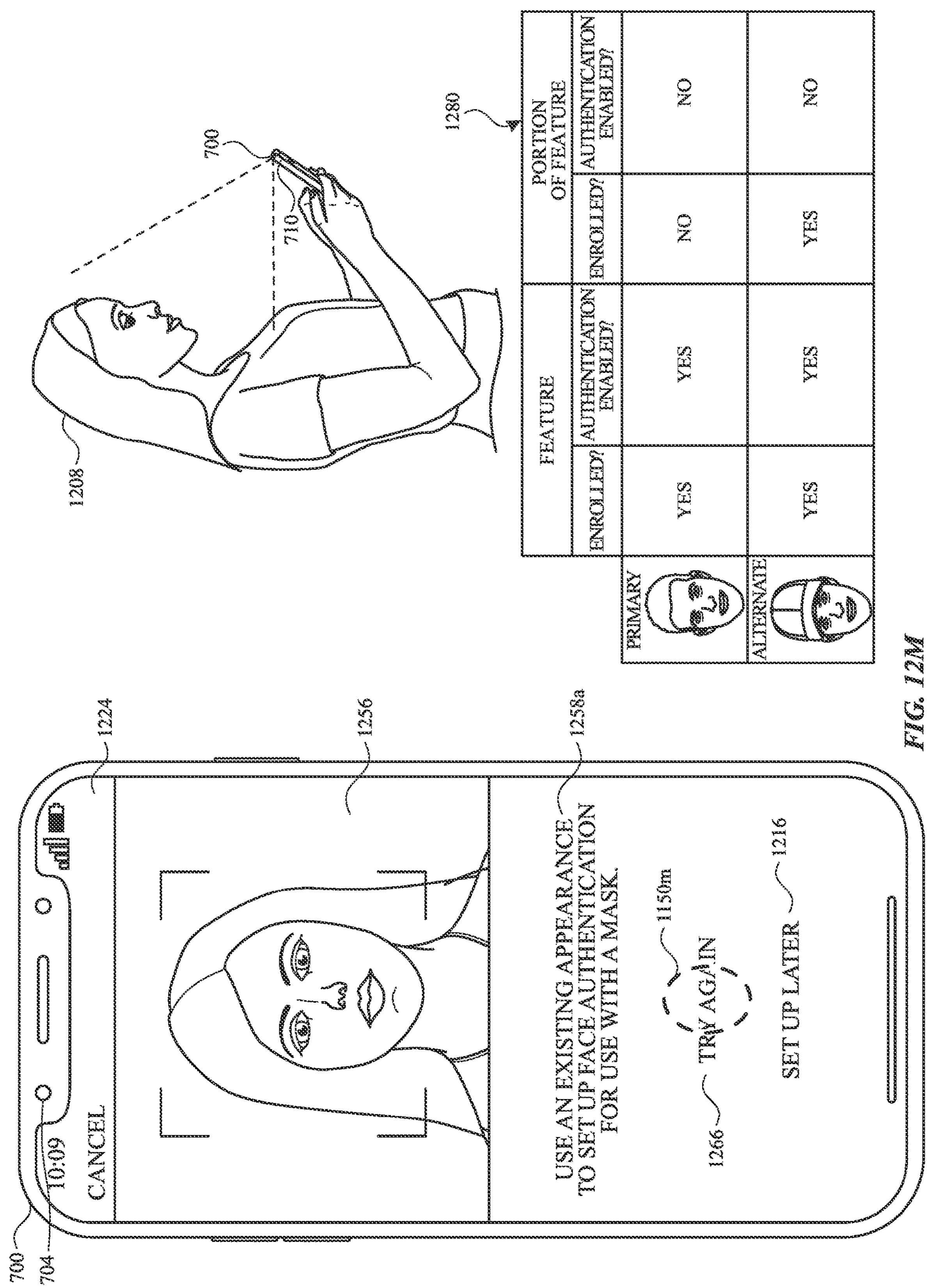

As illustrated in FIG. 12M, because the portion of the biometric feature has not been enrolled for the primary appearance profile, computer system 700 initiates a process to enroll the portion of the biometric feature when user 1260. At FIG. 12M, as a part of initiating the process, computer system 700 displays a user interface that includes viewfinder 1256 (e.g., using similar techniques like those discussed above in relation to viewfinder 1226), try affordance 1266, and reject-use-face-with-mask-authentication affordance 1216. The user interface of FIG. 12M also includes notification 1258*a*, which indicates that a user should "use an existing appearance [(e.g., primary appearance, alternate appearance in Table 1280 in FIG. 12M)] to set up face authentication for use with a mask." In some embodiments, the user interface of FIG. 12M is displayed in response to detecting a tap gesture on unlock-with-mask-primary-appearance setting toggle 1270*y* in FIG. 12Y1 (discussed above).

As illustrated in FIG. 12M, user 1260 of FIG. 12L has been replaced with user 1208 in FIG. 12M. Accordingly, computer system 700 updates viewfinder 1256 to include the representation of user 1208 instead of user 1260. While viewfinder 1256 includes the representation of user 1208, computer system 700 detects tap gesture 1250*m* on try affordance 1266. At FIG. 12M, in response to detecting tap gesture 1250*m*, a determination is made that the representation of user 1208 does not match the enrolled feature for the primary appearance profile and the alternate appearance profile.

Figure 12N:
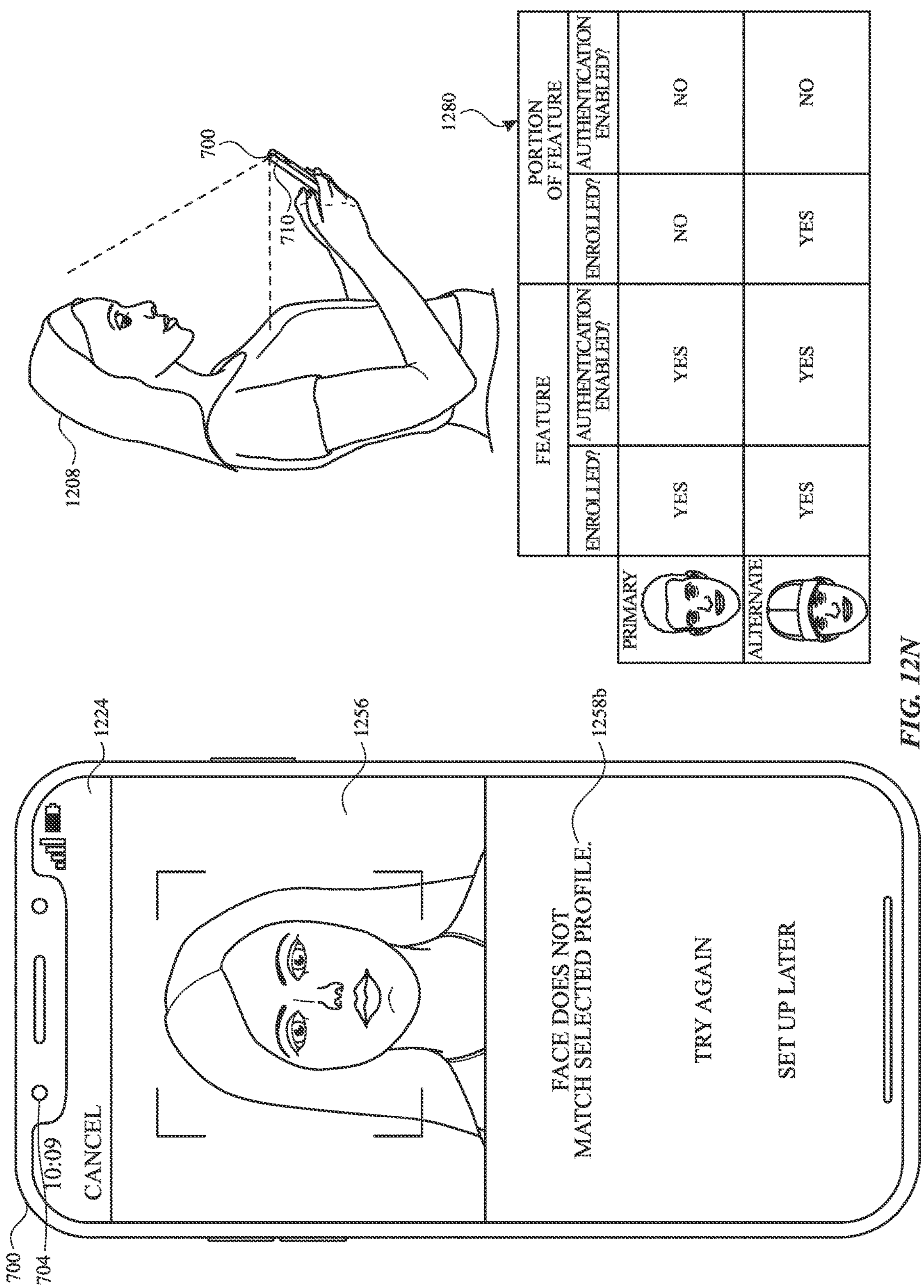

As illustrated in FIG. 12N, because the determination is made that the representation of user 1208 does not match the enrolled feature for the primary appearance profile and the alternate appearance profile, computer system 700 displays notification 1258*b*, which indicates that the "face does not match selected profile." Thus, as shown by FIGS. 12M-12N, computer system 700 does not initiate a process to scan the portion of the biometric feature when user 1260 is not being captured by biometric sensor 704.

Figure 12O:
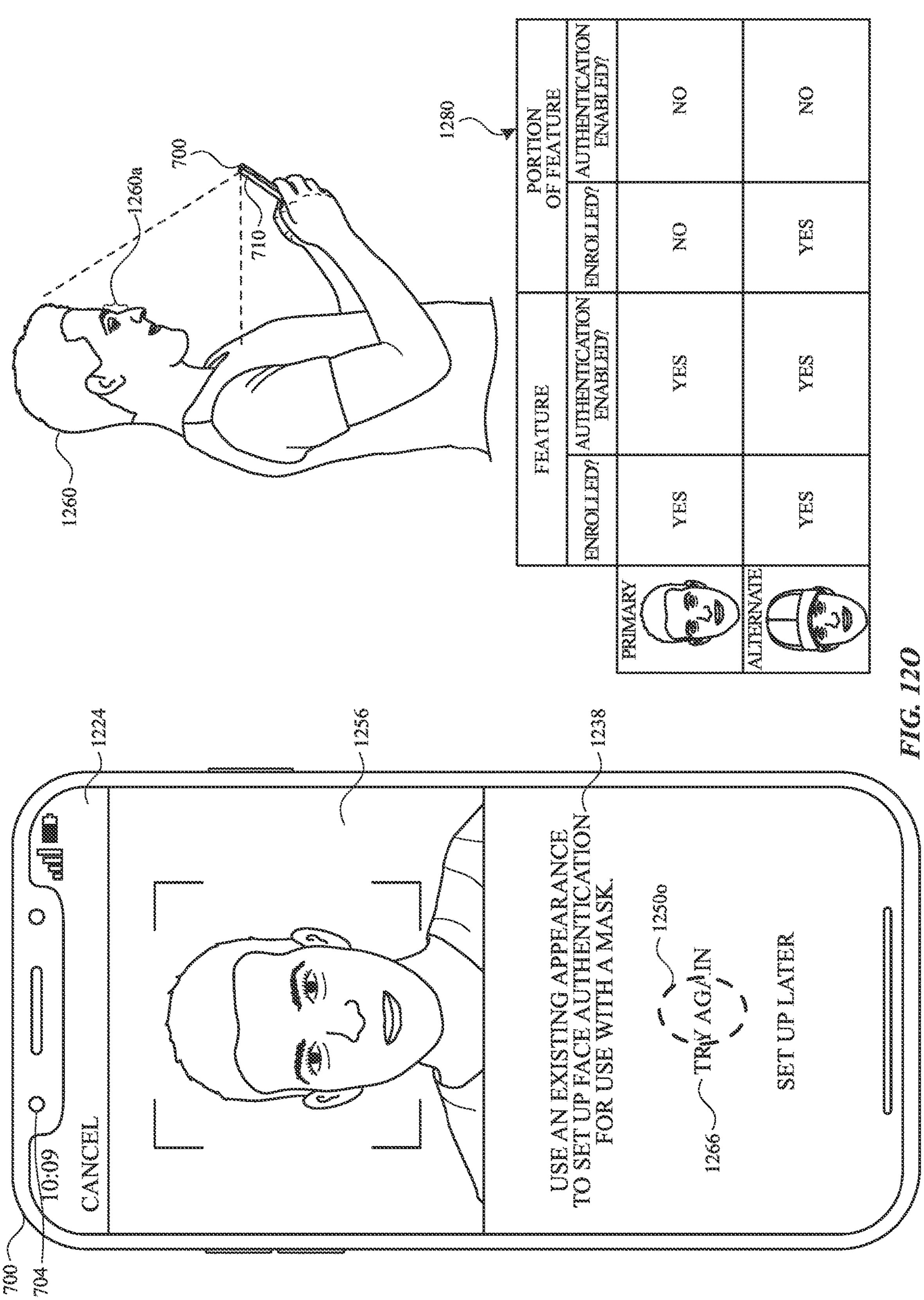

As illustrated in FIG. 12O, user 1208 of FIG. 12M has been replaced with user 1260 in FIG. 12O. Accordingly, computer system 700 updates viewfinder 1256 to include the representation of user 1260 instead of user 1208. While viewfinder 1256 includes the representation of user 1260, computer system 700 detects tap gesture 1250*o* on try affordance 1266. At FIG. 12O, in response to detecting tap gesture 1250*o*, a determination is made that the representation of user 1208 matches the enrolled feature for the primary appearance profile. In some embodiments, the determination is made that the representation of user 1208 matches the enrolled feature for the primary appearance profile when the computer system 700 performs successful biometric authentication based on biometric data that is being captured by the biometric sensor.

Figure 12P:
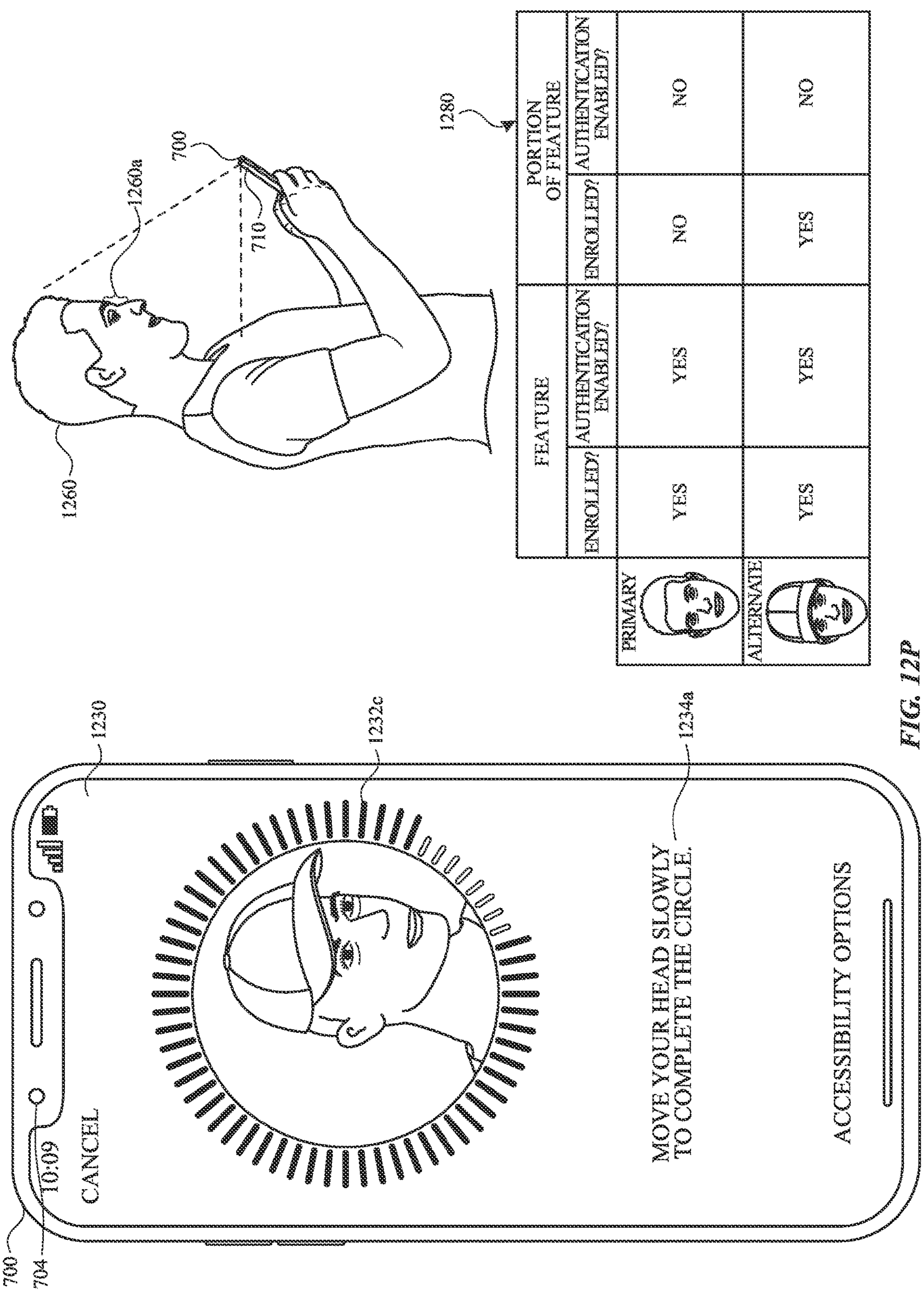

As illustrated in FIG. 12P, because the determination was made that representation of user 1208 matches the enrolled feature for the primary appearance profile, computer system 700 initiates a process to scan the portion of the biometric feature for the primary appearance profile. In embodiments where the portion of the biometric feature is not enrolled for the primary appearance and the alternate appearance, computer system 700 determines whether the user being captured by biometric sensor 704 matches the enrolled feature for the primary appearance or the enrolled feature for the alternate appearance and initiates a process to scan the portion of the biometric feature for the appearance profile that the user being captured by biometric sensor 704 matches.

As illustrated in FIG. 12P, computer system 700 displays user interface 1230 that includes capture indicator 1232*c* that surrounds a live representation of user 1260 that is captured by biometric sensor 704. In addition, user interface 1260 also includes notification 1234*a*. At FIG. 12P, a determination is made that the face of user 1260 has been scanned (or captured) (e.g., capture indicator 1232*c* is completed).

Figure 12Q:
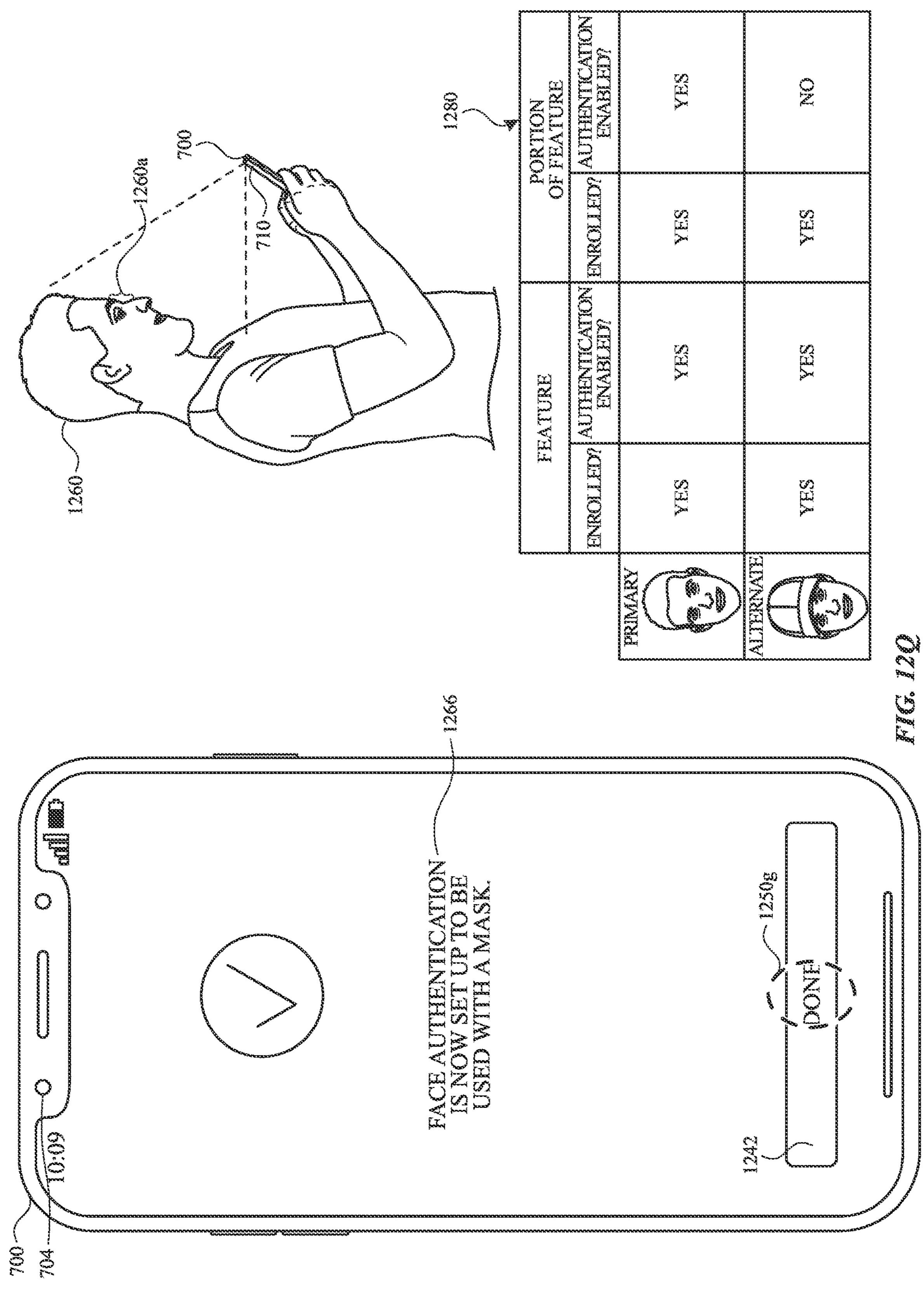

At FIG. 12Q, because the determination was made that the face of user 1260 has been scanned, computer system 700 finishes the enrollment of the portion (e.g., eyes of the user) of the biometric feature for the primary appearance profile. As shown in Table 1280, the portion of the biometric feature for the primary appearance profile is shown as being enrolled (e.g., indicated by "Yes" in row 1, column 3 of Table 1280 in FIG. 12Q) and authentication using the biometric feature for the primary profile is shown as being enabled (e.g., indicated by "Yes" in row 1, column 4 of Table 1280 in FIG. 12Q). Notably, in FIGS. 12O-12P, computer system 700 performs fewer scans (e.g., 1) to enroll the portion of the biometric feature than the number of scans (e.g., 2) there were performed to enroll the biometric feature (e.g., in FIGS. 12E-12I). In some embodiments, the scan performed in FIGS. 12P-12Q is the same type of scan as the second scan (e.g., scan perfumed in FIGS. 12H-12I). Thus, in some embodiments, computer system 700 requires fewer scans to enroll the portion of the biometric feature than the number of scans there are required to enroll the biometric feature.

Figure 12S:
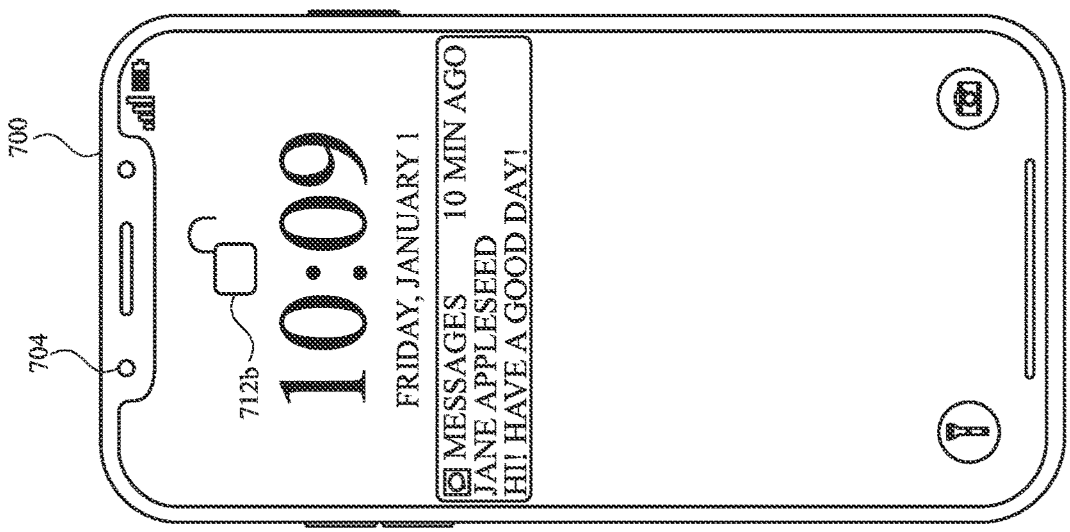
Figure 12R:
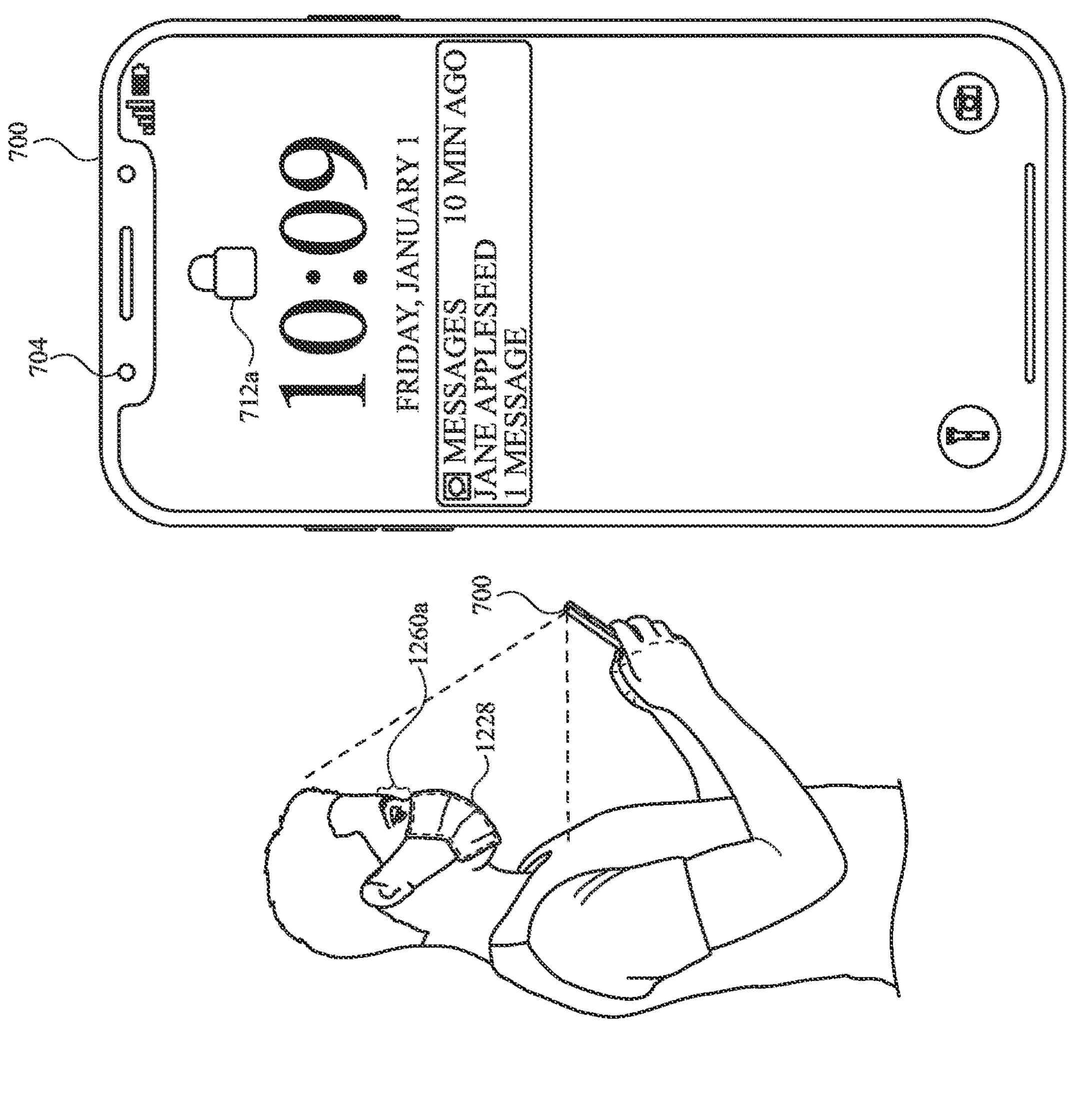

FIGS. 12R-12S illustrate exemplary user interfaces for biometric authentication when biometric sensor 704 can capture only a portion of the primary appearance of user 1260. To aid in the explanation of FIGS. 12R-12S, Table 1280 in FIG. 12Q shows the current states (e.g., states as they are in FIGS. 12R-12S) of whether the feature or portion of the feature is enrolled and/or whether authentication is enabled for the feature or portion of the feature. In addition, it is also assumed that the appearance of user 1260 holding computer system 700 in FIG. 12R is the same as the appearance of user 1260 holding computer system 700 in FIG. 12S. A detailed explanation of FIGS. 12R-12S is provided below.

As illustrated in FIG. 12R, user 1260 is wearing mask 1228 and holding computer system 700 in a position, where biometric sensor 704 can detect the face of user 1260. As illustrated in FIG. 12R, the appearance of user 1260 in FIG. 12R is similar to the user's primary appearance profile (e.g., "primary" on row 1 in table 1280 in FIG. 12Q). Further, as illustrated in FIG. 12R, computer system 700 is displaying lock indicator 712*a*, which indicates that computer system 700 is currently in a locked state. At FIG. 12R, computer system 700 determines that a request to perform a secure operation (e.g., unlock computer system 700) has been received (e.g., using one or more techniques as described above in relation to FIG. 7B). Upon determining that the request to perform the secure operation has been received, computer system 700 initiates biometric authentication. After initiating biometric authentication, computer system 700 determines that only upper portion 1260*a* of the face of user 1260 is available to be captured by biometric sensor 704. In some embodiments, computer system 700 determines that only a portion of the face of user 1260 is available to be captured by biometric sensor 704 based on determining that user 1260 is wearing mask 1228 and/or that the data captured by biometric sensor 704 does not contain the second portion (e.g., bottom portion 1260*b* in FIG. 12E). In some embodiments, computer system 700 determines that only a portion of the face of user 1260 is available to be captured by biometric sensor 704 after determining that biometric authentication using the captured portions of the face of user 1260 (e.g., including the mask) is unsuccessful (e.g., because the user is wearing a mask). In some embodiments, computer system 700 determines that only a portion of the face of user 1260 is available to be captured by biometric sensor 704 before determining that biometric authentication using the captured portions of the face of user 1260.

At FIG. 12R, because the determination was made that that only upper portion 1260*a* of the face of user 1260 is available to be captured by biometric sensor 704, computer system 700 determines that the secure operation can be performed when only a portion of the biometric feature is authenticated (e.g., indicated by "Yes" in row 1, column 4 of Table 1280 in FIG. 12Q) and determines that biometric authentication using only upper portion 1260*a* is successful because only upper portion 1260*a* that is captured in FIG. 12R matches (or significantly matches) the previously enrolled portion of the face of user 1260 for the primary profile (e.g., indicated by "Yes" in row 1, column 3 of Table 1280 in FIG. 12Q). In some embodiments, at FIG. 12R, computer system 700 intelligently identifies that upper portion 1260*a* of the face of user 1260 corresponds to the primary appearance of user 1260. In some embodiments, at FIG. 12R, upon identifying that upper portion 1260*a* of the face of user 1260 corresponds to the primary appearance of user 1260, computer system 700 makes determinations based on the enrolled profile and the authentication permissions for the primary appearance profile and not the alternate appearance profile.

At FIG. 12S, computer system 700 transitions from the locked state to an unlocked state, because the determinations were made that the secure operation can be performed when only a portion of the biometric feature is authenticated and that biometric authentication using only upper portion 1260*a* was successful. As illustrated in FIG. 12S, computer system 700 ceases display of lock indicator 712*a* and displays unlock indicator 712*b* to indicate that computer system 700 is in the unlocked state. In embodiments where a determination is made that upper portion 1260*a* that is captured in FIG. 12R does not match (or significantly match) the previously enrolled portion of the face of user 1260 for the primary profile, computer system 700 would not be transitioned from the locked state to the unlocked state (e.g., computer system 700 would continue to be in the locked state) even if computer system 700 determined that the secure operation could be performed when only a portion of the biometric feature is authenticated.

Figure 12U:
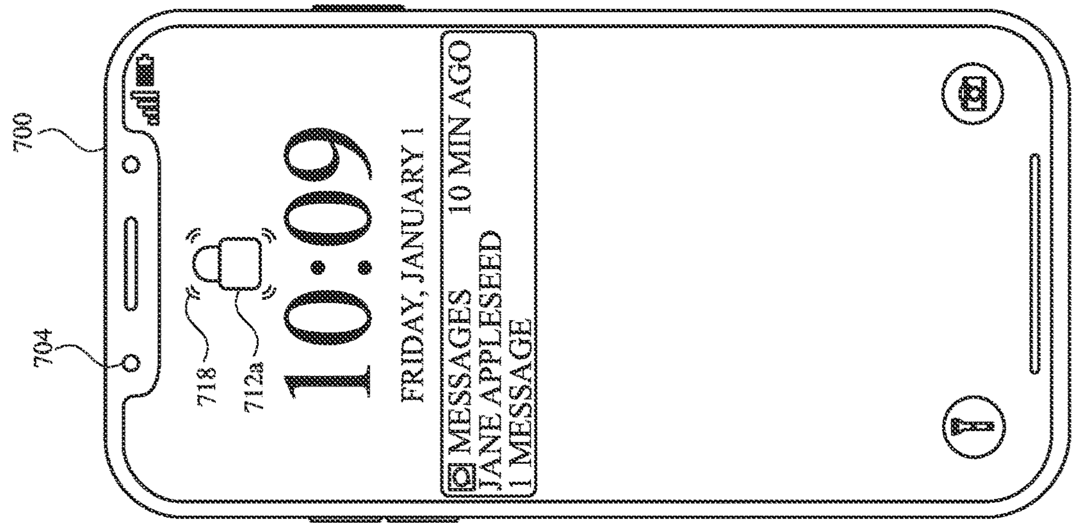
Figure 12T:
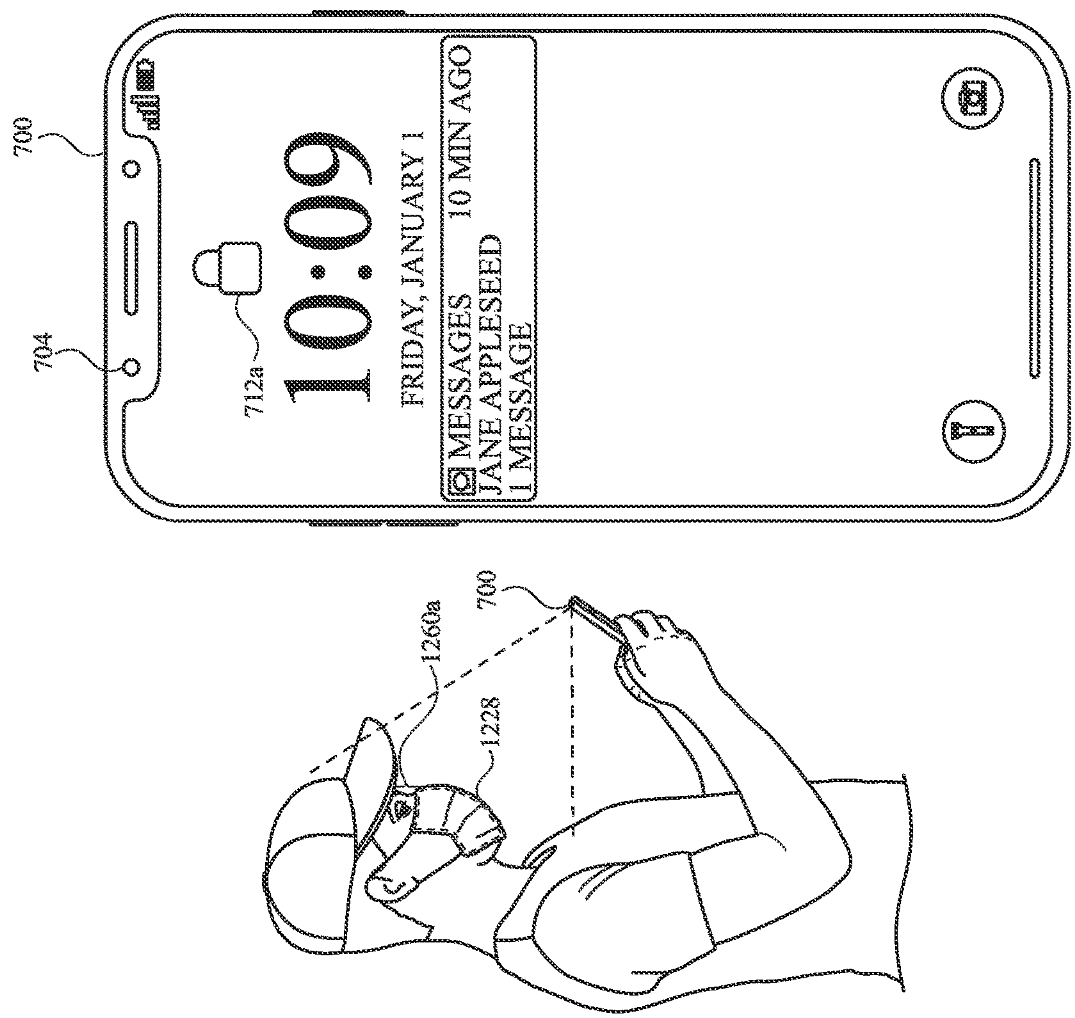

FIGS. 12T-12U illustrate exemplary user interfaces for biometric authentication when biometric sensor 704 can capture only a portion of the alternate appearance of user 1260. To aid in the explanation of FIGS. 12T-12U, Table 1280 in FIG. 12Q shows the current states (e.g., states as they are in FIGS. 12T-12U) of whether the feature or portion of the feature is enrolled and/or whether authentication is enabled for the feature or portion of the feature. In addition, it is also assumed that the appearance of user 1260 holding computer system 700 in FIG. 12T is the same as the appearance of user 1260 holding computer system 700 in FIG. 12U. A detailed explanation of FIGS. 12T-12U is provided below.

As illustrated in FIG. 12T, user 1260 is wearing mask 1228 and holding computer system 700 in a position, where biometric sensor 704 can detect the face of user 1260. As illustrated in FIG. 12T, the appearance of user 1260 in FIG. 12T is similar to the user's alternate appearance profile (e.g., "alternate" on row 2 in table 1280 in FIG. 12Q). Further, as illustrated in FIG. 12T, computer system 700 is displaying lock indicator 712*a*, which indicates that computer system 700 is currently in a locked state. At FIG. 12T, computer system 700 determines that a request to perform a secure operation, initiates biometric authentication, and determines that only upper portion 1260*a* of the face of user 1260 is available to be captured by biometric sensor 704 using one or more similar techniques as discussed above in relation to FIG. 12R. At FIG. 12T, because the determination was made that only upper portion 1260*a* of the face of user 1260 is available to be captured by biometric sensor 704, computer system 700 determines that the secure operation cannot be performed when only a portion of the biometric feature is authenticated (e.g., indicated by "No" in row 2, column 4 of Table 1280 in FIG. 12Q).

As illustrated in FIG. 12U, because the determination was made that the secure operation cannot be performed when only a portion of the biometric feature is authenticated, computer system 700 displays shake output indicator 718 (or makes lock indicator 712*a* appear that it is shaking), which indicates that computer system 700 has not been transitioned from the locked state to the unlocked state. At FIG. 12U, computer system 700 remains in the locked state, irrespective of whether the biometric authentication using only upper portion 1260*a* (e.g., of FIG. 12T) would have been successful. In some embodiments, computer system 700 does not make any determination of whether the biometric authentication using only upper portion 1260*a* (e.g., of FIG. 12T) would have been successful after a determination is made that the secure operation cannot be performed when only a portion of the biometric feature is authenticated.

Figure 12W:
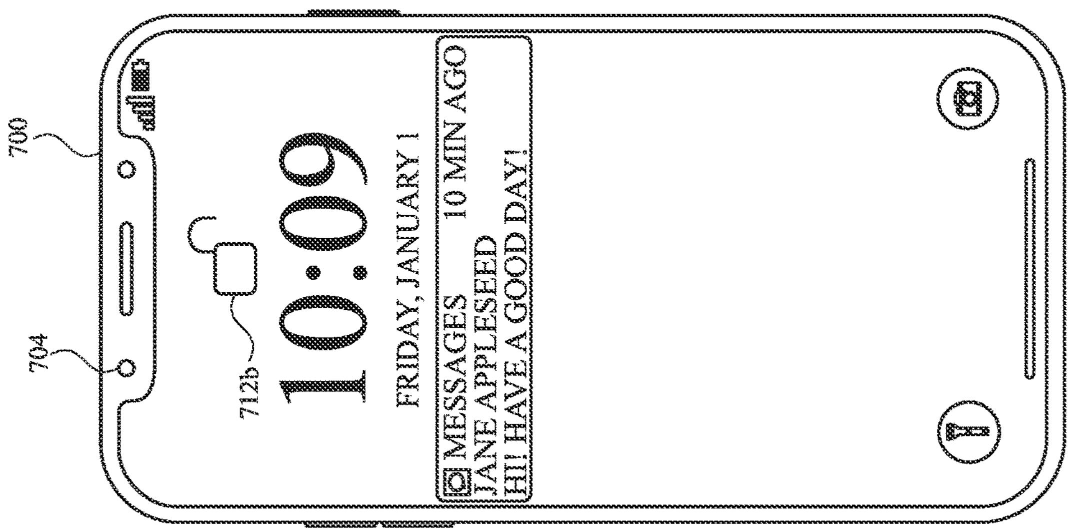
Figure 12V:
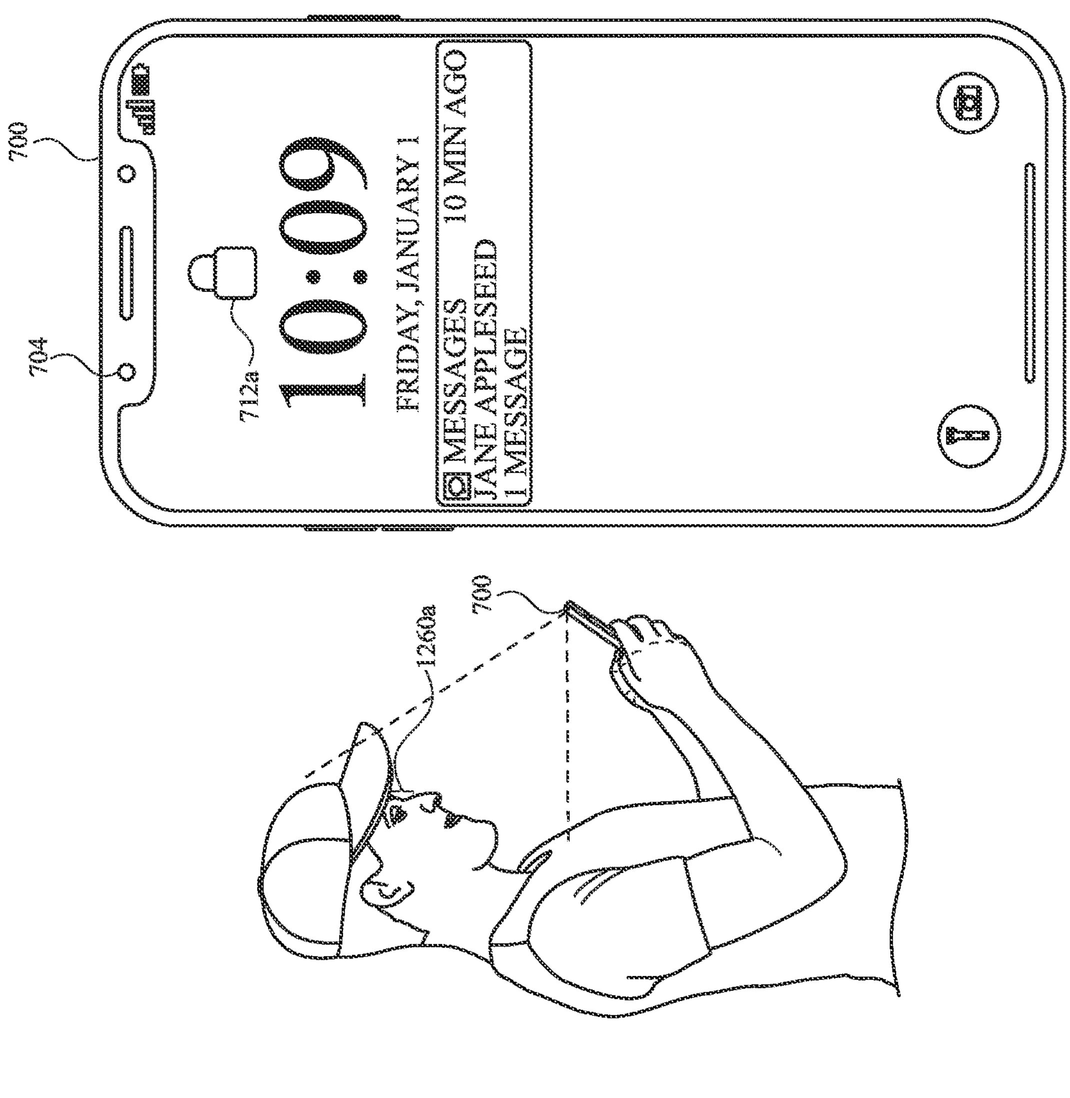

FIGS. 12V-12W illustrate exemplary user interfaces for biometric authentication when biometric sensor 704 can capture the face (e.g., the entire face) of the alternate appearance of user 1260. To aid in the explanation of FIGS. 12V-12W, Table 1280 in FIG. 12Q shows the current states (e.g., states as they are in FIGS. 12T-12U) of whether the feature or portion of the feature is enrolled and/or whether authentication is enabled for the feature or portion of the feature. In addition, it is also assumed that the appearance of user 1260 holding computer system 700 in FIG. 12V is the same as the appearance of user 1260 holding computer system 700 in FIG. 12W. A detailed explanation of FIGS. 12V-12W is provided below.

As illustrated in FIG. 12V, the face of user 1260 is uncovered, and the user is holding computer system 700 in a position where biometric sensor 704 can detect the face of user 1260. As illustrated in FIG. 12V, the appearance of user 1260 in FIG. 12T is similar to the user's alternate appearance profile (e.g., "alternate" on row 2 in table 1280 in FIG. 12Q). Further, as illustrated in FIG. 12V, computer system 700 is displaying lock indicator 712*a*, which indicates that computer system 700 is currently in a locked state. At FIG. 12V, computer system 700 determines that a request to perform a secure operation, initiates biometric authentication. After initiating biometric authentication, computer system 700 determines that the secure operation can be performed when the biometric feature (e.g., face) is authenticated (e.g., indicated by "Yes" in row 2, column 2 of Table 1280 in FIG. 12Q). Because the determination is made that the secure operation can be performed when the biometric feature is authenticated, computer system 700 determines that the face of the user that is captured in FIG. 12V matches (or significantly matches) the previously enrolled portion of the face of user 1260 for the primary profile (e.g., indicated by "Yes" in row 1, column 2 of Table 1280 in FIG. 12Q).

At FIG. 12W, computer system 700 transitions from the locked state to an unlocked state, because the determinations were made that the secure operation can be performed when the biometric feature is authenticated and the biometric authentication using the face of the user captured in FIG. 12V was successful. As illustrated in FIG. 12W, computer system 700 ceases display of lock indicator 712*a* and displays unlock indicator 712*b* to indicate that computer system 700 is in the unlocked state. In FIG. 12W, computer system 700 does not check whether the portion of the biometric feature can be authenticated and/or whether the secure operation can be performed when using only a portion of the biometric feature is authenticated. Here, computer system 700 does not perform these checks because computer system 700 was able to perform biometric authentication using the biometric feature (e.g., the entire face). In some embodiments, authentication using the entire biometric feature is more secure (e.g., harder to infiltrate by an untrusted party) than authentication using only the portion of the biometric feature. Thus, in some embodiments, computer system 700 prioritizes authenticating using the entire biometric feature over authenticating using the portion of the biometric feature. In some embodiments, computer system 700 disables the use of authenticating using the portion of the biometric feature when authenticating using the entire biometric feature is disabled (e.g., when face authentication disabled, automatically (e.g., without user input on) disables unlock with mask (e.g., unlock-with-mask setting toggle 770*g*).

Figure 12X:
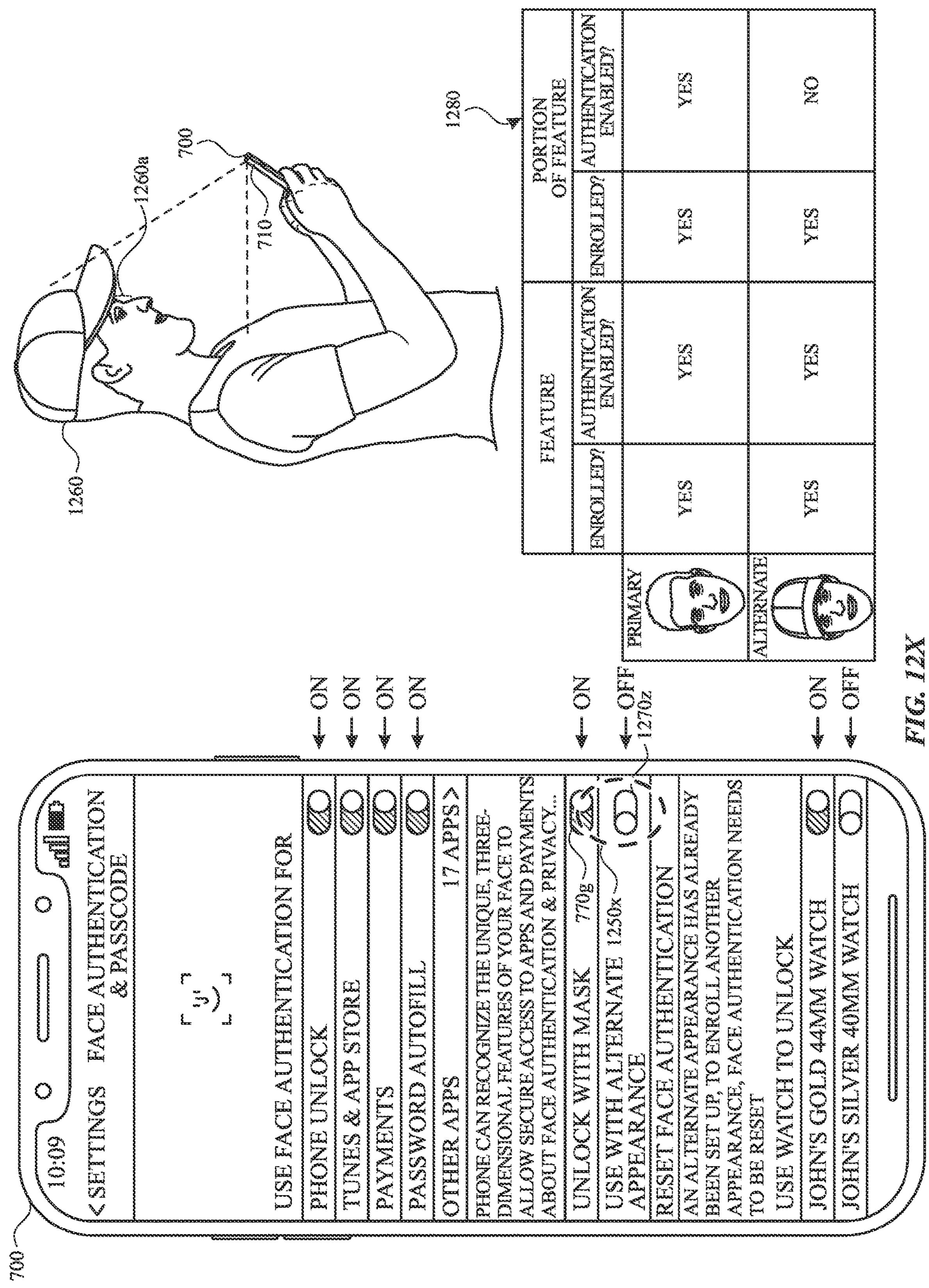
Figure 12Y:
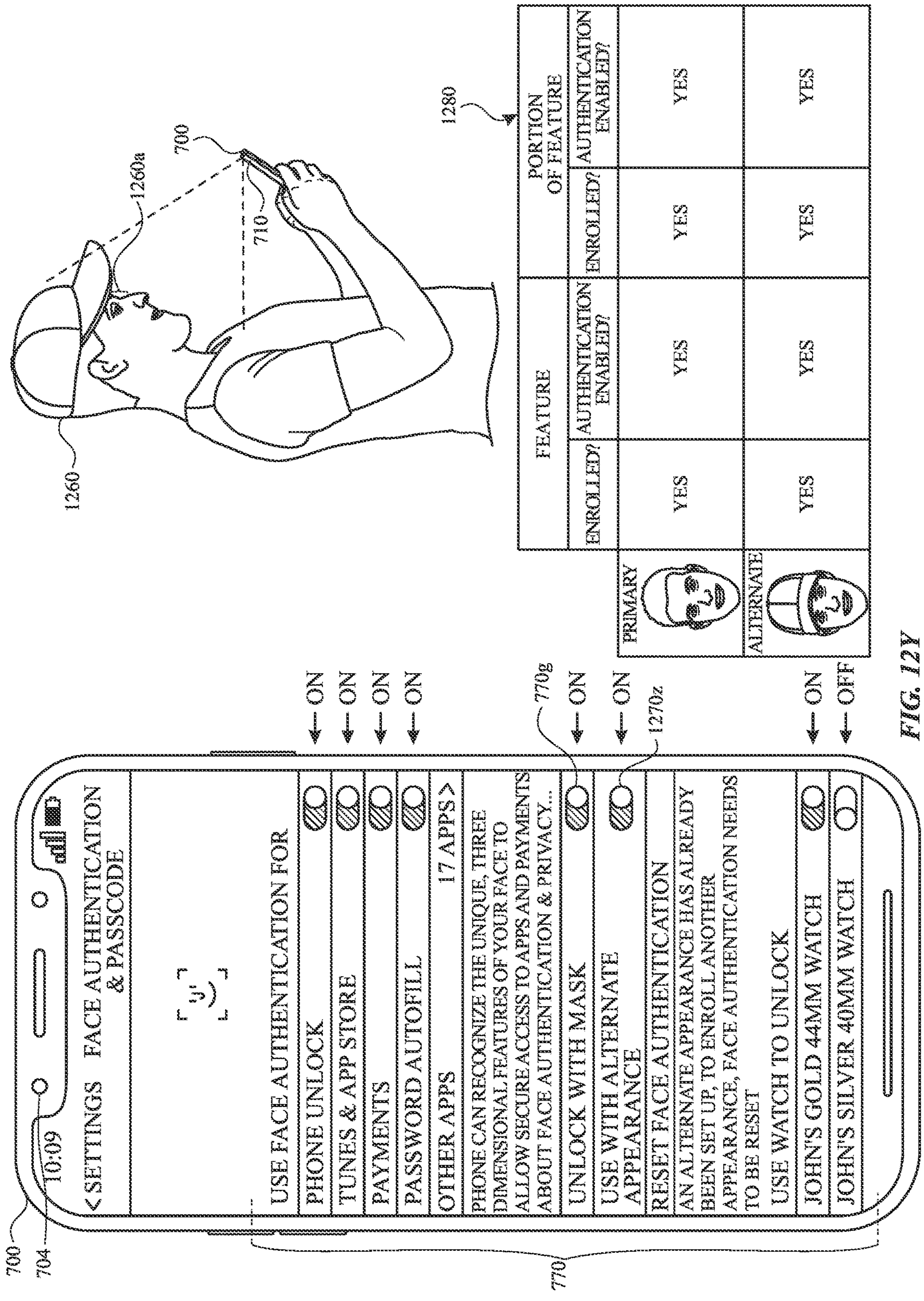

FIGS. 12X-12Y illustrate exemplary user interfaces for biometric authentication and enrollment to use only a portion of the face of user 1260. As illustrated in FIG. 12X, computer system 700 is displaying the user interface that includes settings 770. In some embodiments. FIG. 12X is displayed in response to receiving tap gesture 1250*r* of FIG. 12Q.

At FIG. 12X, unlock-setting toggle 770*j* has changed from being in an off state in FIG. 12L to being in the on state in FIG. 12X. In FIG. 12X, unlock-setting toggle 770*j* has changed to being in the on state because of the enrollment of the portion of the face of user 1260 (e.g., row 1, column 3 of Table 1280) and enabling of authentication using only a portion of the face of user 1260 for the primary appearance (e.g., row 1, column 4 of Table 1280) as described above in relation to FIGS. 12L and 12O-12Q (e.g., in response to detecting tap gesture 750*l*). With reference to FIGS. 12L and 12X, computer system 700 displays unlock-with-mask-alternate-appearance setting toggle 1270*z* in FIG. 12X that was not previously displayed in FIG. 12L. At FIG. 12X, computer system 700 displays unlock-with-mask-alternate-appearance setting toggle 1270*z* because computer system 700 has been set up to authenticate using only the portion of the biometric feature for the primary appearance profile (row 1, column 2 of Table 1280 in FIG. 12X) and to authenticate using the biometric feature of the alternate appearance profile (row 2, column 2 of Table 1280 in FIG. 12X). In addition, unlock-with-mask-alternate-appearance setting toggle 1270*z* is displayed in an unlocked state in FIG. 12X because computer system 700 is not set up to authenticate using only the portion of the biometric feature of the alternate appearance profile (row 2, column 4 of Table 1280 in FIG. 12X) (e.g., as discussed above in relation to FIG. 12J in response to detecting tap gesture 1250*j*). At FIG. 12X, computer system 700 detects tap gesture 1250*x* on unlock-with-mask-alternate-appearance setting toggle 1270*z*.

Looking back at FIG. 12L, in response to detecting tap gesture 1250*l*, computer system 700 can display a modified version of the user interface of FIG. 12X instead of displaying FIG. 12H in some embodiments. In some of these embodiments, the modified user interface of FIG. 12X would unlock-with-mask-primary-appearance setting toggle 1270*y* (as described in FIG. 12Y1 below) instead of unlock-with-mask-alternate-appearance setting toggle 1270*z*. In some embodiments, the modified user interface would be displayed because the portion of the feature has been enrolled for the alternate appearance (e.g., indicated by "Yes" in row 2, column 3 of Table 1280 in FIG. 12L) and the portion of the feature has not been enrolled for the primary appearance (e.g., indicated by "No" in row 1, column 3 of Table 1280 in FIG. 12L). In some embodiments, unlock-with-mask-setting toggle 770*g* would be in an on state and computer system 700 would be set up to authenticate using only the portion of the biometric feature of the alternate appearance profile (row 2, column 4 in Table 1280 of the modified version of FIG. 12L would be "Yes"). Thus, in some embodiments, computer system 700 can switch unlock-with-mask setting toggle 770*g* to the on state, display a toggle that corresponds to the appearance profile that does not have the portion enrolled, and enable the computer system to authenticate using the portion of the biometric feature for the appearance profile that does have the portion of the biometric feature enrolled, in response to detecting tap gesture on unlock-with-mask setting toggle 770*g*.

As illustrated in FIG. 12Y, in response to detecting tap gesture 1250*x*, computer system 7R) changes unlock-with-mask-alternate-appearance setting toggle 1270*z* from the off state to the on state. At FIG. 12Y, computer system 700 changes unlock-with-mask-alternate-appearance setting toggle 1270*z* to the on state because the portion of the biometric feature for the alternate profile has already been enrolled (e.g., row 2, column 3 of Table 1280). As shown in FIG. 12Y, Table 1280 has been updated to show that computer system 700 is set up to authenticate using only the portion of the biometric feature of the alternate appearance profile (e.g., change from "NO" in row 2, column 4 of Table 1280 in FIG. 12X to "YES" in row 2, column 4 of Table 1280 in FIG. 12Y). Thus, at FIG. 12Y, computer system 700 does not prompt the user to go through steps to enroll the portion of the biometric feature for the alternate profile (e.g., user interfaces of FIGS. 12L and 12O-12Q) because the portion of the biometric feature for the alternate profile has already been enrolled. In order words, a process is not initiated to scan the face of the user in response to tap gesture 1250*x* as oppose to the process being initiated to scan the face of the user in response to tap gesture 1250*l* in FIG. 12L. In embodiments where the portion of the biometric feature for the alternate profile has not been enrolled, computer system 700 initiates a process to scan the face of the user (e.g., that is similar to the process described in FIGS. 12L-12Q above) in response to tap gesture 1250*x*.

FIG. 12Y1 illustrates an alternate (or additional, in some embodiments) figure to FIGS. 12X-12Y that computer system 700 can display. In this embodiment, FIG. 12Y1 is displayed in response to detecting tap gesture 1250*l* in FIG.

12L. However, in some embodiments, FIG. 12Y1 is displayed after detecting other gestures, such as tap gesture 1250*q* in FIG. 12Q.

As illustrated in FIG. 12Y1, in response to detecting tap gesture 1250*l* in FIG. 12L, computer system 700 displays FIG. 12Y1 that includes unlock-with-mask-primary-appearance setting toggle 1270*y* in an off state and unlock-with-mask-alternate-appearance setting toggle 1270*z* in an on state. Unlock-with-mask-alternate-appearance setting toggle 1270*z* is displayed in the on state because a determination was made that the portion of the biometric feature for the alternate appearance profile has been enrolled (row 2, column 4 of Table 1280 in FIG. 12L is "Yes") and determination was made that the portion of biometric feature for the primary appearance has not been enrolled (row 1, column 3 of Table 1280 in FIG. 12L is "No"). Thus, in response to detecting tap gesture 1250*l* in FIG. 12L and based on one or more of these determinations, computer system 700 automatically selects and enables the computer system to authenticate using the portion of the biometric feature for the appearance profile that has the portion of the biometric feature enrolled (e.g., unlock-with-mask-alternate-appearance setting toggle 1270*z* in this embodiment). In some embodiments, unlock-with-mask-alternate-appearance setting toggle 1270*z* is not displayed, where the state of unlock-with-mask toggle 770*g* (e.g., "on state") takes its place ("indicates that authenticate using only the portion of the biometric feature of the alternate appearance profile is enabled) while unlock-with-mask-primary-appearance setting toggle 1270*y* is displayed as being in the off state (e.g., similar to FIG. 12X).

When compared with FIGS. 12X-12Y, FIG. 12Y1 differs from FIGS. 12X-12Y because FIG. 12Y1 provides an additional toggle unlock-with-mask-primary-appearance setting toggle 1270*y*. In FIG. 12Y1, unlock-with-mask setting toggle 770*g* is separate from unlock-with-mask-primary-appearance setting toggle 1270*y*, that is, unlock-with-mask setting toggle 770*g* is not tied to the state of (e.g., a gesture directed to the toggle does not change the state of) whether computer system 700 has been set up to authenticate using only the portion of the biometric feature for the primary appearance profile while unlock-with-mask-primary-appearance setting toggle 1270*y* is tied in FIG. 12Y1. Thus, unlock-with-mask setting toggle 770*g* of FIG. 12Y1 is different from unlock-with-mask setting toggle 770*g* of FIGS. 12X-12Y because unlock-with-mask setting toggle 770*g* of FIG. 12Y1 is not tied to the state whether computer system 700 has been set up to authenticate using only the portion of the biometric feature for the primary appearance profile while unlock-with-mask setting toggle 770*g* of FIGS. 12X-12Y is tied. Thus, computer system 700 would detect a gesture on unlock-with-mask-primary-appearance setting toggle 1270*y* to change the state of whether computer system 700 has been set up to authenticate using only the portion of the biometric feature for the primary appearance profile (row 1, column 2 in Table 1280 in FIG. 12Y1).

In some embodiments, in response to detecting an input on unlock-with-mask setting toggle 770*g* at FIG. 12Y1, computer system 700 ceases to display unlock-with-mask-primary-appearance setting toggle 1270*y* and unlock-with-mask-alternate-appearance setting toggle 1270*z* or displays (or changes) unlock-with-mask-primary-appearance setting toggle 1270*y*, and unlock-with-mask-alternate-appearance setting toggle 1270*z* in an off state. In some embodiments, in response to detecting an input on unlock-with-mask setting toggle 770*g* at FIG. 12Y1, computer system 700 is not set up to authenticate using only the portion of the primary appearance and the alternate appearance (e.g., both row 1, column 4 and row 2, column 4 of Table 1280 are "No").

In some embodiments, in response to detecting an input on unlock-with-mask-primary-appearance setting toggle 1270*y*, computer system 700 initiates a process to capture a portion of the biometric feature for the primary appearance profile (e.g., because the portion of the biometric feature is not already enrolled for the appearance profile at FIG. 12Y1) (e.g., as described above in relation to FIGS. 12O-12Q). In some embodiments where unlock-with-mask-alternate-appearance setting toggle 1270*z* is in an off state, computer system 700 enables computer system 700 to authenticate using the portion of the biometric feature for the appearance profile (e.g., because the portion of the biometric features is already enrolled for the appearance profile at FIG. 12Y 1) without initiating the process to capture a portion of the biometric feature for the primary appearance profile, in response to detecting an input on unlock-with-mask-alternate-appearance setting toggle 1270*z* (e.g., as described above in relation to FIGS. 12X-12Y).

In some embodiments when a biometric feature is enrolled for only one profile (e.g., where there is only a primary appearance profile), computer system 700 does not display any of unlock-with-mask-primary-appearance setting toggle 1270*y* and unlock-with-mask-alternate-appearance setting toggle 1270*z*.

Figure 12Z:
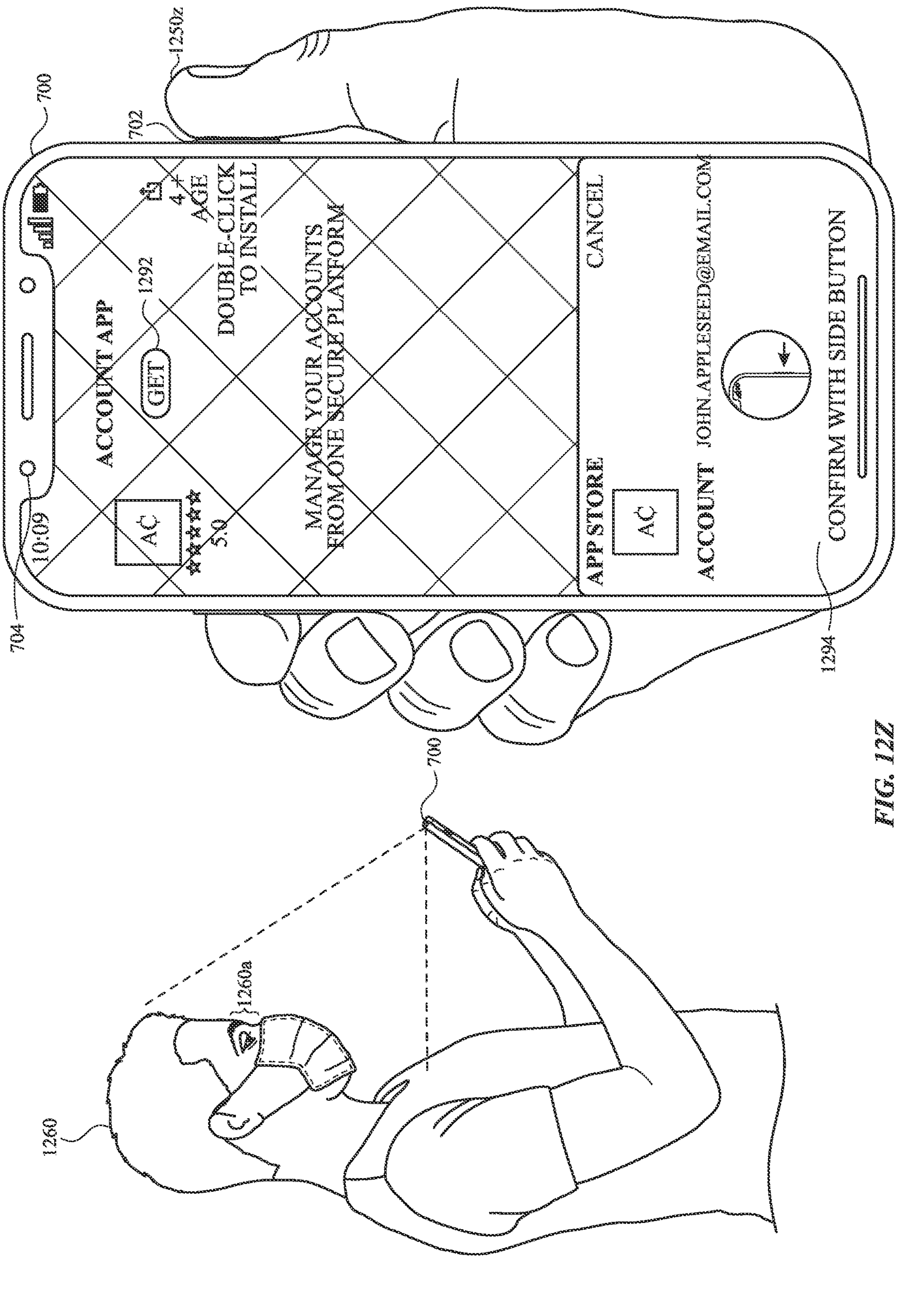
Figure 12A:
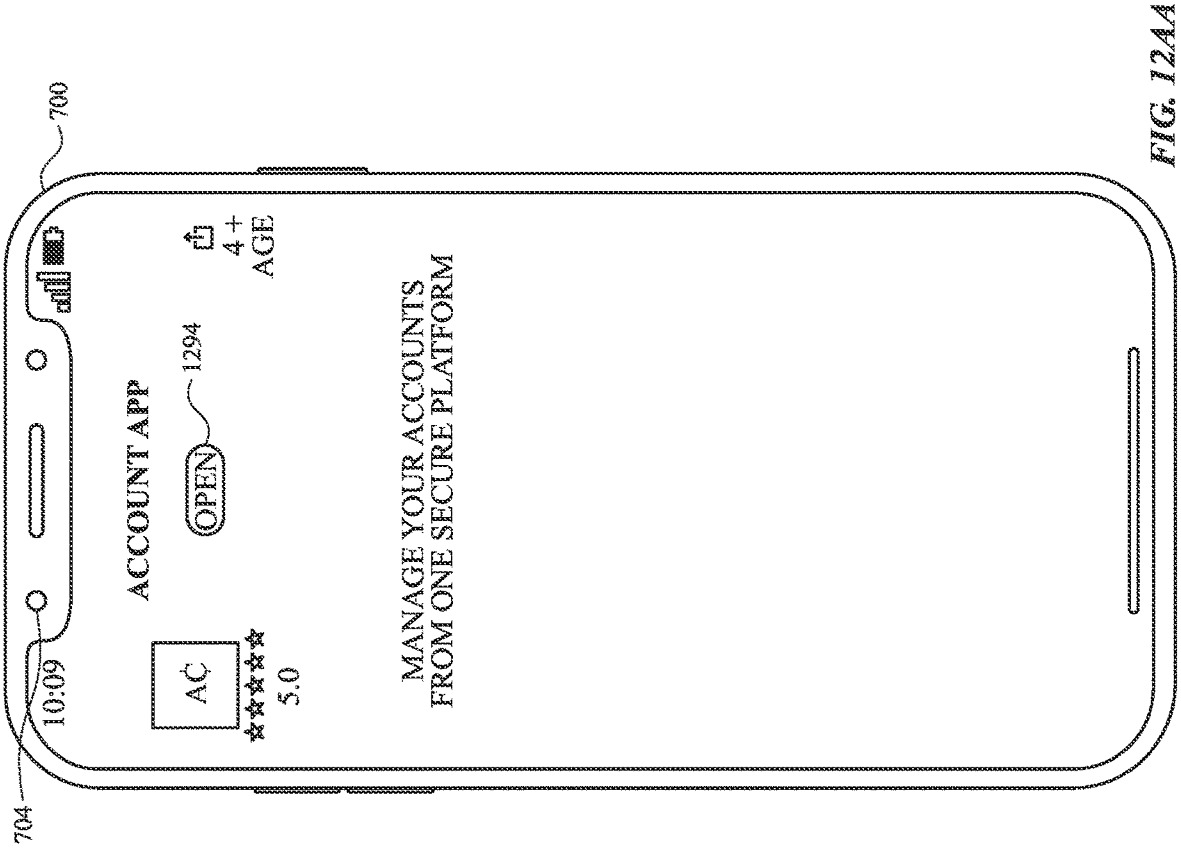

FIGS. 12Z-12AA illustrates one or more exemplary user interfaces that are displayed on display 710 of computer system 700. In particular, the one or more exemplary user interfaces of FIGS. 12Z-12AA are described in relation to an exemplary scenario where user 1260 attempts to use biometric authentication (e.g., while wearing a mask) to download an application. To aid in the explanation of FIGS. 12Z-12AA, Table 1280 in FIG. 12Y shows the current states (e.g., states as they are in FIGS. 12Z-12AA) of whether the feature or portion of the feature is enrolled and/or whether authentication is enabled for the feature or portion of the feature. In addition, it is also assumed that the appearance of user 1260 holding computer system 700 in FIG. 12Z is the same as the appearance of user 1260 holding computer system 700 in FIG. 12AA. A detailed explanation of FIGS. 12Z-12AA is provided below.

At FIG. 12Z, user 1260 wishes to download an application but is unable to do so without authenticating. As illustrated in FIG. 12Z, computer system 700 displays notification 1298*a* to confirm downloading of the application by pressing the side button (e.g., "Confirm With Side Button"). At FIG. 12Z, computer system 700 detects press input 1250*z* on hardware button 702. In response to detecting press input 1250*z*, computer system 700 determines that a request to perform a secure operation (e.g., a request to initiate biometric authentication) has been received because a unlock input, such as press input 1250*z*, has been detected. At FIG. 12Z, because press input 1250*z* was detected and it was determined that the request to perform a secure operation has been received, computer system 700 initiates biometric authentication. Upon determining that the request to perform the secure operation has been received, computer system 700 initiates biometric authentication. After initiating biometric authentication, computer system 700 determines that only upper portion 1260*a* of the face of user 1260 is available to be captured by biometric sensor 704. At FIG. 12Z, because the determination was made that that only upper portion 1260*a* of the face of user 1260 is available to be captured by biometric sensor 704, computer system 700 determines that the secure operation can be performed when only a portion of the biometric feature is authenticated (e.g., indicated by "Yes" in row 2, column 4 of Table 1280 in FIG. 12Y) and determines that biometric authentication using only upper portion 1260*a* is successful because only upper portion 1260*a* that is captured in FIG. 12Z matches (or significantly matches) the previously enrolled portion of the face of user 1260 for the primary profile (e.g., indicated by "Yes" in row 2, column 3 of Table 1280 in FIG. 12Y).

At FIG. 12Z, because the determinations were made that the secure operation can be performed when only a portion of the biometric feature is authenticated and that biometric authentication using only upper portion 1260*a* was successful, computer system 700 downloads the application. In FIG. 12Z, the downloading of the application is indicated by computer system 700 ceases to display get affordance 1292 to open affordance 1294. In other words, open affordance 1294 indicates that computer system 700 has downloaded the corresponding application at some point between the display of FIGS. 12Z and 12AA. In some embodiments, at FIG. 12Z, computer system 700 intelligently identifies that upper portion 1260*a* of the face of user 1260 corresponds to the alternate appearance of user 1260. In some embodiments, at FIG. 12Z, upon identifying that upper portion 1260*a* of the face of user 1260 corresponds to the alternate appearance of user 1260, computer system 700 makes determinations based on the enrolled data and the authentication permissions for the alternate appearance profile and not the primary appearance profile. In some embodiments, computer system 700 does not authorize downloading when only a portion of the biometric feature is available while authorizing payment transactions and/or unlocking of computer system 700 when only a portion of the biometric feature is available. In some embodiments, individual settings (or multiple settings for each (e.g., one for primary appearance, another for alternate appearance) are displayed to individually control whether or not computer system 700 will authenticate using only a portion of the biometric feature for an individual secure operation. While FIGS. 12R-12AA describe computer system 700 using various authentication techniques to determine whether to unlock computer system 700 and/or confirming an application for downloading (or, in general, downloading a file), the discussion of FIGS. 12R-12AA can also be adapted to work with other secure operations that require authentication, such as authorizing the auto-filling of a password/passcode, performance of a transaction (e.g., a payment transaction as discussed above in relation to FIGS. 7AJ-7AL).

FIGS. 13A-13B are a flow diagram illustrating a method for providing biometric authentication at a computer system in accordance with some embodiments. Method 1300 is performed at a computer system (e.g., 100, 300, 500, 700) (e.g., a smartphone, a tablet computer) that is in communication with one or more biometric sensors (e.g., 704) (e.g., a fingerprint sensor, a facial recognition sensor (e.g., one or more cameras (e.g., dual cameras, triple camera, quad cameras, etc.) on the same side or different sides of the electronic device (e.g., a front camera, a back camera)), an iris scanner) (e.g., is hidden or concealed), one or more output devices (e.g., 710) (e.g., a display generation component (e.g., a display controller, a touch-sensitive display system); an audio speaker), and one or more input devices (e.g., surface of 710) (e.g., a touch-sensitive surface). Some operations in method 1300 are, optionally, combined, the orders of some operations are, optionally, changed, and some operations are, optionally, omitted.

As described below, method 1300 provides an intuitive way for providing biometric authentication at a computer system. The method reduces the cognitive burden on a user for providing biometric authentication at a computer system, thereby creating a more efficient human-machine interface. For battery-operated computing devices, enabling a user to biometric authenticate faster and more efficiently conserves power and increases the time between battery charges.

During a biometric enrollment process, the computer system provides (1302) (e.g., user interface(s) of FIGS. 12J, 12L1) (e.g., displaying a prompt, providing an audio/haptic output), via the one or more output devices, an option (e.g., 1214) to enable (e.g., for future requests) a first setting to perform a secure operation of a first type (e.g., one or more of 770*a*-770*e*) (e.g., unlock operation, content viewing operation, secure payment operation, a secure operation that are available to be performed when the first setting is enabled) when a first portion (e.g., 1260*b*) (e.g., a predefined portion of face (e.g., a mouth), a predefined portion of an eye, a predefined portion of a finger (e.g., fingertip); a partial portion (e.g., a portion that is less than the entirety of the biometric feature)) of a biometric feature (e.g., face of user 1260) (e.g., a face, a finger, an eye) is not available to be captured via the one or more biometric sensors (e.g., 704) (e.g., due to the first portion being obscured or covered or not within the field-of-sensing of the one or more biometric sensors) (e.g., the mouth of the user is covered with a mask or scarf or other face covering). In some embodiments, providing, via the one or more output devices, the option to enable the first setting to perform a secure operation of a first type includes displaying a prompt that indicates an option to enable a setting that corresponds to a permission to perform one or more secure operations. In some embodiments, the biometric enrollment process was initiated using one or more techniques described in method 1400.

After the biometric enrollment process is completed, the computer system receives (1304), via the one or more input devices, a request (e.g., as discussed in FIGS. 12R, 12T, 12V, 12Z (e.g., 1250*z*)) to perform the secure operation of the first type (e.g., one or more of 770*a*-770*e*). In some embodiments, the biometric enrollment process includes capturing biometric data that corresponds to a second portion of the biometric feature that is different than the first portion) that was available for capture by the one or more biometric sensors during the enrollment process.

In response to (1306) receiving the request (e.g., as discussed in FIGS. 12R, 12T, 12V, 12Z (e.g., 1250*z*)) to perform the secure operation of the first type (e.g., one or more of 770*a*-770*e*) and in accordance with (1308) a determination that, based on biometric data (e.g., 1260*a*, 1260*b*) captured via the one or more biometric sensors (e.g., 704) (e.g., biometric data captured via the one or more biometric sensors proximate to a time at which the request to perform the secure operation was received or in response to the request to perform the secure operation), the first portion (e.g., 1260*b*) of the biometric feature (e.g., face of user 1260) is not available to be captured, a determination that the first setting (e.g., 770*g*, 1270*y*, 1270*z*) is enabled, and a determination that the biometric data (e.g., 1260*a*, 1260*b*) meets a set of biometric authentication criteria (e.g., a set of criteria that includes a criterion that is met when the biometric data sufficiently matches an authorized biometric profile), the computer system performs (1310) the secure operation of the first type (e.g., one or more of 770*a*-770*e*). In some embodiments, performing the secure operation of the first type includes displaying an indication that the secure operation is being and/or has been performed. In some embodiments, in response to receiving the request to perform the secure operation of the first type, the computer system captures, via the one or more biometric sensors, the biometric data)

In response to (1306) receiving the request (e.g., as discussed in FIGS. 12R, 12T, 12V, 12Z (e.g., 1250*z*)) to perform the secure operation of the first type (e.g., one or more of 770*a*-770*e*) and in accordance with (1312) a determination that (e.g., based on the biometric data) the first portion (e.g., 1260*b*) of the biometric feature (e.g., face of user 1260) is not available to be captured and a determination that the first setting (e.g., 770*g*, 1270*y*, 1270*z*) is not enabled, the computer system forgoes performing (1314) the secure operation of the first type (e.g., one or more of 770*a*-770*e*) (e.g., without regard to whether the biometric data meets the set of biometric authentication criteria). In some embodiments, forgoing performing the respective secure operation includes forgoing displaying an indication that the secure operation is being and/or has been performed. In some embodiments, the biometric data includes data corresponding to a second portion of the biometric feature that sufficiently matches a portion of the biometric feature that was enrolled during the enrollment process without including the first portion of the biometric feature. In some embodiments, a determination that the first portion of the biometric feature is not available to be captured is made when the first portion of the biometric feature (e.g., data corresponding to the first portion of the biometric feature) is included in the biometric data. Performing the secure operation of the first type only when a set of determinations are made allows the computer system to limit unauthorized performance of secure operations, which provides improved security and allows the computer system to optimize performance of the secure operation when the set of conditions are met. Providing improved security reduces the unauthorized performance of secure operations. Performing the secure operation of the first type only when a set of determinations are made allows the computer system to limit unauthorized performance of secure operations additionally reduces power usage and improves battery life of the computer system by enabling the user to use the computer system more securely and efficiently. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to (1306) receiving the request (e.g., as discussed in FIGS. 12R, 12T, 12V, 12Z (e.g., 1250*z*)) to perform the secure operation of the first type (e.g., one or more of 770*a*-770*e*) and in accordance with a determination that, based on biometric data (e.g., 1260*a*, 1260*b*) captured via the one or more biometric sensors (e.g., 704), the first portion (e.g., 1260*b*) of the biometric feature (e.g., face of user 1260) is not available to be captured, a determination that the first setting is enabled (e.g., 770*g*, 1270*y*, 1270*z*), and a determination that the biometric data (e.g., 1260*a*, 1260*b*) does not meet the set of biometric authentication criteria (e.g., biometric data for portion(s) of the biometric feature that are available for capture and that were captured), the computer system forgoes performing (1316) the secure operation of the first type (e.g., one or more of 770*a*-770*e*). Forgoing performing the secure operation of the first type only when a set of determinations are made (e.g., determination that, based on biometric data captured via the one or more biometric sensors, the first portion of the biometric feature is not available to be captured, a determination that the first setting is enabled, and a determination that the biometric data does not meet the set of biometric authentication criteria) allows the computer system to limit unauthorized performance of secure operations, which provides improved security. Providing improved security reduces the unauthorized performance of secure operations which, additionally, reduces power usage and improves battery life of the computer system by enabling the user to use the computer system more securely and efficiently.

In some embodiments, in response to receiving the request (1306) (e.g., as discussed in FIGS. 12R, 12T, 12V, 12Z (e.g., 1250*z*)) to perform the secure operation of the first type and in accordance with a determination that, based on biometric data (e.g., 1260*a*, 1260*b*) captured via the one or more biometric sensors (e.g., 704), the first portion (e.g., 1260*b*) of the biometric feature (e.g., face of user 1260) is available to be captured and a determination that the biometric data (e.g., biometric data from the portions of the feature that are captured, including the first portion) meets the set of biometric authentication criteria, the computer system performs (1318) the secure operation of the first type. In some embodiments, in response to (1306) receiving the request (e.g., as discussed in FIGS. 12R, 12T, 12V, 12Z (e.g., 1250*z*)) to perform the secure operation of the first type and in accordance with a determination that, based on biometric data (e.g., 1260*a*, 1260*b*) captured via the one or more biometric sensors (e.g., 704), the first portion (e.g., 1260*b*) of the biometric feature is available to be captured and a determination that the biometric data (e.g., biometric data from the portions of the feature that are captured, including the first portion) does not meet the set of biometric authentication criteria, the computer system forgoes performing (1320) the secure operation of the first type. Performing the secure operation of the first type when the first portion of the biometric feature is available to be captured and determination that the biometric data meets the set of biometric authentication criteria and forgoing performing the secure operation of the first type when the first portion of the biometric feature is available to be captured and determination that the biometric data does not meet the set of biometric authentication criteria allows the computer system to limit unauthorized performance of secure operations, which provides improved security. Providing improved security reduces the unauthorized performance of secure operations which, additionally, reduces power usage and improves battery life of the computer system by enabling the user to use the computer system more securely and efficiently.

In some embodiments, the biometric feature is selected from the group consisting of: a face, one or more eyes, one or more hands, one or more fingerprints, and a combination thereof.

In some embodiments, the secure operation of the first type includes unlocking (e.g., enabling) one or more functions (e.g., providing access to secure information; providing access to a secured feature; providing access to previously-locked input functions; providing the ability to complete a payment transaction; auto-filling content) of the computer system. Unlocking one or more functions of the computer system only when a set of determinations are made allows the computer system to limit the unauthorized unlocking of one or more functions of the computer system, which provides improved security. Providing improved security reduces the unauthorized performance of secure operations which, additionally, reduces power usage and improves battery life of the computer system by enabling the user to use the computer system more securely and efficiently.

In some embodiments, the secure operation of the first type includes unlocking a user interface of the computer system (e.g., enabling one or more user interface functions of the computer system that are not available while the user interface is locked). Unlocking a user interface of the computer system only when a set of determinations are made allows the computer system to limit the unauthorized unlocking of the user interface of the computer system, which provides improved security. Providing improved security reduces the unauthorized performance of secure operations which, additionally, reduces power usage and improves battery life of the computer system by enabling the user to use the computer system more securely and efficiently.

In some embodiments, the secure operation of the first type includes authorizing a secure transaction (e.g., a resource transfer transaction; a payment transaction; transferring information to an external device for completion of a secure transaction; a transaction that release transaction information (e.g., payment information) to allow an application on the computer system (or electronic device) to access the information (e.g., as described above in relation to FIG. 6)). Authorizing a secure transaction only when a set of determinations are made allows the computer system to limit the unauthorized authorization of a secure transaction, which provides improved security. Providing improved security reduces the unauthorized performance of secure operations which, additionally, reduces power usage and improves battery life of the computer system by enabling the user to use the computer system more securely and efficiently.

In some embodiments, the biometric feature is a face (e.g., face of user 1260) (e.g., including the regions around the eyes, nose, and mouth) of a user of the computer system and the first portion (e.g., 1260*b*) of the biometric feature includes a region around the mouth of the user (e.g., 1260) (and/or, in some embodiments, that does not include a region around the eyes of the user) of the computer system. In some embodiments the biometric feature is limited to a region around the mouth of the user. In some embodiments the biometric feature is limited to a region around the mouth of the user that does not include a region around the eyes of the user.

In some embodiments, the computer system provides (1322), via the one or more output devices (e.g., 710), an indication (e.g., as described above in relation to FIG. 12F) (e.g., a visual indication (e.g., text; a graphic); an audio indication) that the first setting to perform the secure operation of the first type when the first portion (e.g., 1260*b*) of the biometric feature is not available to be captured via the biometric sensors (e.g., 704) will reduce a security level (e.g., increase the occurrence of false positives) of biometric authentication (e.g., relative to biometric authentication without the first setting being enabled (e.g., biometric authentication that requires the first portion of the biometric feature)). Providing an indication that the first setting to perform the secure operation of the first type when the first portion of the biometric feature is not available to be captured via the biometric sensors will reduce a security level of biometric authentication increases the security of the computer system by informing the user about the decrease level of security when performing the secure operation of the first type when the first portion of the biometric feature is not available to be captured via the biometric sensors will reduce a security level of biometric authentication and encourages a user to actually use biometric authentication instead of turning biometric authentication off entirely (e.g., informing users of this tradeoff is important in letting the user make an informed decision about whether or not to use the less secure authentication method). Providing improved security and reduces the unauthorized performance of secure operations which, additionally, reduces power usage and improves battery life of the computer system by enabling the user to use the computer system more securely and efficiently. Providing an indication that the first setting to perform the secure operation of the first type when the first portion of the biometric feature is not available to be captured via the biometric sensors will reduce a security level of biometric authentication provides feedback informing the user about the decrease level of security when performing the secure operation of the first type when the first portion of the biometric feature is not available to be captured via the biometric sensors will reduce a security level of biometric authentication. Providing improved security reduces the unauthorized performance of secure operations which, additionally, reduces power usage and improves battery life of the computer system by enabling the user to use the computer system more securely and efficiently. Providing improved user feedback enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently.

In some embodiments, during the biometric enrollment process (e.g., in FIGS. 12B-12J) (e.g., prior to capturing biometric data for enrolling the biometric feature for future requests to authenticate using the feature), in accordance with a determination that the first portion of the biometric feature is not available to be captured via the one or more biometric sensors (e.g., 704), the computer system provides, via the one or more output devices (e.g., 710), a prompt (e.g., 1218*b*) to make the first portion (e.g., 1260*b*) of the biometric feature available to be captured via the one or more biometric sensors (e.g., a prompt to address a cause of the first portion not being available (e.g., "Remove Your Mask To Begin Setup")). Providing a prompt to make the first portion of the biometric feature available to be captured via the one or more biometric sensors during the biometric enrollment process provides feedback to the user concerning a step a user will need to take in order to complete the enrollment process. Providing improved user feedback enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Providing a prompt to make the first portion of the biometric feature available to be captured via the one or more biometric sensors during the biometric enrollment process informs the user concerning the type of data that will be captured during the biometric enrollment process, which improves security by informing and giving the user control over providing data that will be captured during the biometric enrollment process. Providing improved security reduces the unauthorized performance of secure operations which, additionally, reduces power usage and improves battery life of the computer system by enabling the user to use the computer system more securely and efficiently.

In some embodiments, as a part of the biometric enrollment process, the computer system captures (e.g., as described in relation to FIGS. 12F-12H), via the one or more biometric sensors (e.g., 704), first biometric data (e.g., 1260*a*, 1260*b*) corresponding to the biometric feature (e.g., to the entire biometric feature) including capturing biometric data corresponding to the first portion (e.g., 1260*a*) of the biometric feature (e.g., face of user 1260) and a second portion (e.g., 1260*b*) of the biometric feature, different from the first portion (e.g., 1260*a*) (e.g., a portion or region outside of an area around the mouth of the user of the computer system; a portion that includes the areas around the eyes of the user; a portion that does not include the first portion; a portion that does not overlap with the first portion). In some embodiments, as a part of the biometric enrollment process, the computer systems captures (e.g., as described in relation to FIGS. 12G-12I), via the one or more biometric sensors, second biometric data (e.g., 1260*a*, 1260*b*) that includes biometric data corresponding to the second portion (e.g., 1260*b*) of the biometric feature (e.g., face of user 1260). In some embodiments, the second biometric data does not include data corresponding to the first portion of the biometric feature).

In some embodiments, the computer system captures the second biometric data (e.g., 1260*a*, 1260*b*) prior to providing the option (e.g., 1214) to enable the first setting (e.g., 770*g*, 1270*y*, 1270*z*) to perform the secure operation (e.g., one or more of 770*a*-770*e*) of the first type when the first portion (e.g., 1260*b*) of the biometric feature is not available to be captured via the one or more biometric sensors (e.g., 704). Capturing the second biometric data occurs prior to providing the option to enable the first setting to perform the secure operation of the first the when the first portion of the biometric feature is not available to be captured via the one or more biometric sensors reduces the number of inputs that the user would have to make to enable the first setting (e.g., because the user would to go through a process to capture the data if it was not captured prior to providing the option). Reducing the number of inputs enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently.

In some embodiments, the computer system captures the second biometric data (e.g., 1260*a*, 1260*b*) after providing the option (e.g., 1214) to enable the first setting (e.g., 770*g*, 1270*y*, 1270*z*) to perform the secure operation (e.g., one or more of 770*a*-770*e*) of the first type when the first portion (e.g., 1260*b*) of the biometric feature is not available to be captured via the one or more biometric sensors (e.g., 704).

In some embodiments, after providing the option (e.g., 1214) to enable the first setting (e.g., 770*g*, 1270*y*, 1270*z*) to perform the secure operation of the first type when the first portion of the biometric feature is not available to be captured via the one or more biometric sensors, the computer system receives a user input (e.g., 1250*j*). In some embodiments, in response to receiving the user input (e.g., 1250*a*1, 1250*a*2, 1250*a*3, 1250*l*, 1250/1, 1250*j*) and in accordance with a determination that the user input (e.g., 1250*a*1, 1250*a*2, 1250*a*3, 1250*l*, 1250/1, 1250*j*) corresponds to a request to enable the first setting (e.g., 770*g*, 1270*y*, 1270*z*) the computer system captures, via the one or more biometric sensors, third biometric data that includes biometric data corresponding to a third portion (e.g., 1260*a*) of the biometric feature, different from the first portion (e.g., 1260*b*) (e.g., a portion or region outside of an area around the mouth of the user of the computer system; a portion that includes the areas around the eyes of the user; a portion that does not include the first portion; a portion that does not overlap with the first portion). In some embodiments, in response to receiving the user input (e.g., 1250*a*1, 1250*a*2, 1250*a*3, 1250*l*, 1250/1, 1250*j*) and in accordance with a determination that the user input (e.g., 1250*a*1, 1250*a*2, 1250*a*3, 1250*l*, 1250/1, 1250*j*) corresponds to a request to enable the first setting (e.g., 770*g*, 1270*y*, 1270*z*) the computer system enables the first setting (e.g., 770*g*, 1270*y*, 1270*z*). In some embodiments, in response to receiving the user input (e.g., 1250*a*1, 1250*a*2, 1250*a*3, 1250*l*, 1250/1, 1250*j*) and in accordance with a determination that the user input (e.g., 1250*a*1, 1250*a*2, 1250*a*3, 1250*l*, 1250/1, 1250*j*) corresponds to a request to not enable the first setting (e.g., 770*g*, 1270*y*, 1270*z*) (e.g., the input is an input to decline enabling the first setting) the computer system forgoes capturing the third biometric data (e.g., 1260*a*) (e.g., forgoing separately capturing the third biometric data without capturing biometric data corresponding to the first portion of the biometric feature). In some embodiments, in response to receiving the user input (e.g., 1250*a*1, 1250*a*2, 1250*a*3, 1250*l*, 1250/1, 1250*j*) and in accordance with a determination that the user input (e.g., 1250*a*1, 1250*a*2, 1250*a*3, 1250*l*, 1250/1, 1250*j*) corresponds to a request to not enable the first setting (e.g., 770*g*, 1270*y*, 1270*z*) (e.g., the input is an input to decline enabling the first setting) the computer system forgoes enabling the first setting (e.g., 770*g*, 1270*y*, 1270*z*). In some embodiments, where capturing the second biometric data occurs after providing the option to enable the first setting to perform a secure operation of the first type when the first portion of the biometric feature is not available to be captured via the one or more biometric sensors, a second user input is received that corresponds to a request to not enable the first setting at a first time before capture the second biometric data and, in response to receiving the second user input is received that corresponds to a request to not enable the first setting at the first time before capture the second biometric data, the computer system does capture the third biometric data and does not enable the first setting. In some embodiments, enabling the first setting includes enabling authentication based on (e.g., that uses) the third biometric data). In some embodiments. In some embodiments, the biometric data corresponding to the third portion of the biometric feature is captured separately (e.g., in a discrete capture step) without capturing biometric data corresponding to the first portion of the biometric feature. Forgoing capturing the third biometric data and enabling the first setting when a determination is made that the user input corresponds to a request to not enable the first setting provides the user with control regarding the security of the computer system and biometric data that is stored via the computer system. Providing the user with more control over the computer system enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Forgoing capturing the third biometric data and enabling the first setting when a determination is made that the user input corresponds to a request to not enable the first setting provides the user with control regarding the security of the computer system and biometric data that is stored via the computer system, which improves security of the computer system. Providing improved security reduces the unauthorized performance of secure operations which, additionally, reduces power usage and improves battery life of the computer system by enabling the user to use the computer system more securely and efficiently.

Note that details of the processes described above with respect to method 1300 (e.g., FIGS. 13A-13B) are also applicable in an analogous manner to the methods described below/above. For example, methods 800, 900, 1000, 1100, 1400, 1600, and 1800 optionally includes one or more of the characteristics of the various methods described above with reference to method 1300. For example, the methods 800, 900, 1000, and 1100 can be combined with methods 1300 and 1400, such that, when a biometric authentication process is unsuccessful using the techniques (e.g., biometric enrollment using a portion of biometric feature) described by methods 1300 and 1400, the techniques described by methods 800, 900, 1000, and 1100 can be used to unlock the computer system with the assistance of an external device (or vice-versa). For brevity, these details are not repeated below.

FIGS. 14A-14B are flow diagrams illustrating a method for controlling biometric authentication at a computer system in accordance with some embodiments. Method 1400 is performed at a computer system (e.g., 100, 300, 500, 700) (e.g., a smartphone, a tablet computer) that is in communication with one or more biometric sensors (e.g., 704) (e.g., a fingerprint sensor, a facial recognition sensor (e.g., one or more cameras (e.g., dual cameras, triple camera, quad cameras, etc.) on the same side or different sides of the electronic device (e.g., a front camera, a back camera)), an iris scanner) (e.g., is hidden or concealed), a display generation component (e.g., 710), and (e.g., a display controller, a touch-sensitive display system) one or more input devices (e.g., surface of 710) (e.g., a touch-sensitive surface). Some operations in method 1400 are, optionally, combined, the orders of some operations are, optionally, changed, and some operations are, optionally, omitted.

As described below, method 1400 provides an intuitive way for controlling biometric authentication at a computer system. The method reduces the cognitive burden on a user for controlling biometric authentication at a computer system, thereby creating a more efficient human-machine interface. For battery-operated computing devices, enabling a user to control biometric authentication at a computer system faster and more efficiently conserves power and increases the time between battery charges.

The computer system receives (1402), via the one or more input devices, a request (e.g., 1250*a*1, 1250*a*2, 1250*a*3, 1250*l*, 1250/1, 1250*j*) (e.g., selection of an option/setting in a settings menu) to enable performing a secure operation based on a second portion (e.g., 1260*a*) of the biometric feature (e.g., face of user 1260) while a first portion (e.g., 1260*b*) of the biometric feature is not available to be captured by the biometric sensor (e.g., to authenticate and/or authorize request(s) to perform a secure operation). In some embodiments, the request is a request to enable using the first portion of the biometric feature without using and/or requiring a second portion, different from the first portion, of the biometric feature for biometric authentication. In some embodiments, the second portion does not include the first portion and/or the first portion does not include the second portion.

In response to (1404) receiving the request (e.g., 1250*a*1, 1250*a*2, 1250*a*3, 1250*l*, 1250/1, 1250*j*) to enable performing a secure operation based on a second portion (e.g., 1260*a*) of the biometric feature (e.g., face of user 1260) while a first portion (e.g., 1260*b*) of the biometric feature (e.g., face of user 1260) is not available to be captured by the biometric sensor (e.g., 704) (e.g., as described in relation to method 1300) and in accordance with (1406) a determination that biometric data (e.g., 1260*a*, 1260*b*) corresponding to a second portion (e.g., 1260*a*) of the biometric feature has been previously enrolled (e.g., previously captured during an enrollment process) for use in biometric authentication while the first portion (e.g., 1260*b*) of the biometric feature is not available to be captured by the biometric sensor, the computer system enables (1408) use of the second portion (e.g., 1260*a*) of the biometric feature (e.g., use of biometric data corresponding to the first portion) for biometric authentication (e.g., biometric authentication operations to authenticate and/or authorize future requests to perform a secure operation) without initiating a biometric enrollment process (e.g., as described in relation to 1300) (e.g., without initiating an enrollment process for capturing biometric data) that includes capturing (and/or saving for later use in a biometric authentication process) biometric data corresponding to the second portion (e.g., 1260*a*) of the biometric feature (e.g., as described above in relation to FIGS. 12X-12Y).

In response to (1404) receiving the request (e.g., 1250*a*1, 1250*a*2, 1250*a*3, 1250*l*, 1250/1, 1250*j*) to enable performing a secure operation based on the second portion (e.g., 1260*a*) of the biometric feature (e.g., face of user 1260) while the first portion (e.g., 1260*b*) of the biometric feature (e.g., face of user 1260) is not available to be captured by the biometric sensor (e.g., 704) (e.g., as described in relation to 1300) and in accordance with (1410) a determination that data corresponding to the second portion (e.g., 1260*a*) of the biometric feature has not been previously enrolled for use in biometric authentication while the first portion (e.g., 1260*b*) of the biometric feature is not available to be captured by the biometric sensor, the computer system initiates (1412) the biometric enrollment process that includes capturing biometric data corresponding to the second portion (e.g., 1260*a*) of the biometric feature for use in biometric authentication while the first portion (e.g., 1260*b*) of the biometric feature is not available to be captured by the biometric sensor (e.g., 704) (e.g., as described above in relation to FIGS. 12L-12Q). In some embodiments, as a part of initiating the biometric enrollment process (and/or the biometric authentication process does not include) the computer system displays a new interface and the computer system ceases to display the interface that was displayed when the request to use the first portion was received. In some embodiments, during the biometric enrollment process, the computer system displays a new prompt that indicates an option to enable a setting that corresponds to permission to perform one or more secure operations. In some embodiments, as a part of enabling use of the first portion of the biometric feature, the computer system does not display a new prompt that indicates an option to enable a setting that corresponds to permission to perform one or more secure operations. In some embodiments, as a part of initiating a biometric authentication process, the computer system captures biometric data and authenticates using the biometric data (e.g., authenticating to perform one or more secure operations described in relation to in response to the determination that data corresponding to the second portion of the biometric feature has been enrolled. In some embodiments, as a part of initiating a biometric enrollment process, the computer system does not capture biometric data and authenticate using the biometric data (e.g., authenticating to perform one or more secure operations described in relation to 1300) in response to the determination that data corresponding to the first portion of the biometric feature has been enrolled. In some embodiments, as a part of enabling use of the second portion of the biometric feature, the computer system displays one or more indications of successful or non-successful authentication. Enabling use of the second portion of the biometric feature for biometric authentication without initiating a biometric enrollment process when a determination is made that biometric data corresponding to a second portion of the biometric feature has been previously enrolled for use in biometric authentication while the first portion of the biometric feature is not available to be captured by the biometric sensor reduces the number of inputs needed to enabling use of the second portion of the biometric feature for biometric authentication (e.g., because user does not have to go through the biometric enrollment process). Reducing the number of inputs that are needed to allow the computer system to perform the secure operation when biometric data does not meet the set of biometric authentication criteria enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Choosing to initiate the biometric enrollment process that includes capturing biometric data corresponding to the second portion of the biometric feature only when a set of predefined conditions are met allows the computer system to initiate the biometric enrollment process in a particular situations, which optimizes performance of the initiation process. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Enabling use of the second portion of the biometric feature for biometric authentication without initiating a biometric enrollment process when a determination is made that biometric data corresponding to a second portion of the biometric feature has been previously enrolled for use in biometric authentication while the first portion of the biometric feature is not available to be captured by the biometric sensor allows the computer system intelligently enabling use of the second portion of the biometric feature for biometric without require the user to go through the biometric enrollment process when the biometric feature has been previously enrolled, which improves security by making the process for enabling the feature less time consuming. Providing improved security reduces the unauthorized performance of secure operations which, additionally, reduces power usage and improves battery life of the computer system by enabling the user to use the computer system more securely and efficiently. Choosing to initiate the biometric enrollment process that includes capturing biometric data corresponding to the second portion of the biometric feature only when a set of predefined conditions are met allows the computer system to initiate the biometric enrollment process in a particular situation, which improves security by making the enrollment process easier for the user. Providing improved security reduces the unauthorized performance of secure operations which, additionally, reduces power usage and improves battery life of the computer system by enabling the user to use the computer system more securely and efficiently.

In some embodiments, the computer system receives (e.g., before receiving the request to enable performing a secure operation based on a first portion of the biometric feature while a second portion of the biometric feature is not available to be captured by the biometric sensor), via the one or more input devices, a first request (e.g., as described in relation to FIG. 12V) to perform a secure operation. In some embodiments, in response to receiving the first request (e.g., as described in relation to FIG. 12V) and in accordance with a determination that biometric data captured by the computer system that includes biometric data corresponding to the first portion (e.g., 1260*b*) and the second portion (e.g., 1260*a*) of the biometric feature (e.g., both the first and second portions of the biometric feature are available for capture) meets a first set of biometric authentication criteria, the computer system performs the first secure operation, regardless of whether or not the computer system (e.g., 700) is currently enabled to perform the secure operation based on the second portion (e.g., 1260*a*) of the biometric feature while the first portion (e.g., 1260*b*) of the biometric feature is not available to be captured by the biometric sensor (e.g., 704). Performing the first secure operation, regardless of whether the computer system is currently enabled or not enabled to perform the secure operation based on the second portion of the biometric feature while a first portion of the biometric feature is not available to be captured by the biometric sensor, when a determination is made that biometric data captured by the computer system that includes biometric data corresponding to the first portion and the second portion of the biometric feature meets a first set of biometric authentication criteria allows the computer system to perform the secure operation in different ways in a variety of different situations. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently.

In some embodiments, the computer system receives (1414), via the one or more input devices, a second request to perform a secure operation (e.g., as described above in relation to FIGS. 12T, 12R) (e.g., 1250*z*). In some embodiments, in response to (1416) receiving the second request and in accordance with a determination that, based on biometric data captured via the biometric sensor, the first portion (e.g., 1260*b*) of the biometric feature (face of user 1260) is not available to be captured and a determination that biometric data captured by the computer system (e.g., 700) (and/or, in some embodiments, captured while the computer system is enabled to perform a secure operation based on a second portion of the biometric feature while a first portion of the biometric feature is not available to be captured by the biometric sensor) that includes biometric data corresponding to the second portion (e.g., 1260*a*) of the biometric feature meets a second set of biometric authentication criteria, the computer system performs (1418) the secure operation (e.g., as described above in relation to FIGS. 12R-12S and 12Z-

12AA). In some embodiments, in response to receiving the second request (1416) and in accordance with a determination that, based on biometric data captured via the biometric sensor, the first portion (e.g., 1260*b*) of the biometric feature (face of user 1260) is not available to be captured and a determination that biometric data captured by the computer system (e.g., 700) (and/or, in some embodiments, captured while the computer system is enabled to perform a secure operation based on a second portion of the biometric feature while a first portion of the biometric feature is not available to be captured by the biometric sensor) that includes biometric data corresponding to the second portion (e.g., 1260*a*) of the biometric feature does not meet the second set of biometric authentication criteria, the computer system forgoes performing (1420) the secure operation (e.g., FIGS. 12T-12U). Performing the first secure operation when a determination is made that, based on biometric data captured via the biometric sensor, the first portion of the biometric feature is not available to be captured and that biometric data captured by the computer system that includes biometric data corresponding to the second portion of the biometric feature meets a second set of biometric authentication criteria allows the computer system to limit unauthorized performance of secure operations, which provides improved security. Providing improved security reduces the unauthorized performance of secure operations which, additionally, reduces power usage and improves battery life of the computer system by enabling the user to use the computer system more securely and efficiently. Forgoing performing the first secure operation when a determination is made that, based on biometric data captured via the biometric sensor, the first portion of the biometric feature is not available to be captured and that biometric data captured by the computer system that includes biometric data corresponding to the second portion of the biometric feature does not meet a second set of biometric authentication criteria allows the computer system to limit unauthorized performance of secure operations, which provides improved security. Providing improved security reduces the unauthorized performance of secure operations which, additionally, reduces power usage and improves battery life of the computer system by enabling the user to use the computer system more securely and efficiently.

In some embodiments, in response to (1416) receiving the second request (e.g., 1250*z*) and in accordance to a determination that biometric data captured by the computer system that includes biometric data corresponding to the first portion (e.g., 1260*b*) and the second portion (e.g., 1260*a*) of the biometric feature meets a third set of biometric authentication criteria, the computer system performs (1422) the secure operation (e.g., without regard to whether the computer system is enabled or not enabled to perform a secure operation based on a second portion of the biometric feature while a first portion of the biometric feature is not available to be captured by the biometric sensor) (e.g., as described above in relation to FIGS. 12R-12S and 12Z-12AA). In some embodiments, in response to (1416) receiving the second request (e.g., 1250*z*) and in accordance to a determination that biometric data captured by the computer system (and/or, in some embodiments, captured while the computer system is enabled or not enabled to perform a secure operation based on a second portion of the biometric feature while a first portion of the biometric feature is not available to be captured by the biometric sensor) that includes biometric data corresponding to the first portion (e.g., 1260*b*) and the second portion (e.g., 1260*a*) of the biometric feature does not meet the third set of biometric authentication criteria, the computer system forgoes performing (1424) the secure operation (e.g., as described above in relation to FIGS. 12R-12S) (e.g., without regard to whether the computer system is enabled or not enabled to perform a secure operation based on a second portion of the biometric feature while a first portion of the biometric feature is not available to be captured by the biometric sensor). Performing the first secure operation when a determination is made that biometric data captured by the computer system that includes biometric data corresponding to the first portion and the second portion of the biometric feature meets a third set of biometric authentication criteria allows the computer system to limit unauthorized performance of secure operations, which provides improved security. Providing improved security reduces the unauthorized performance of secure operations which, additionally, reduces power usage and improves battery life of the computer system by enabling the user to use the computer system more securely and efficiently. Forgoing performing the first secure operation when a determination is made that biometric data captured by the computer system that includes biometric data corresponding to the first portion and the second portion of the biometric feature does not meet a third set of biometric authentication criteria allows the computer system to limit unauthorized performance of secure operations, which provides improved security. Providing improved security makes the user interface more secure which, additionally, reduces power usage and improves battery life of the computer system by enabling the user to use the computer system more securely and efficiently.

In some embodiments, the request (e.g., 1250*x*) to enable performing the secure operation based on the second portion of the biometric feature (e.g., the entirety of the biometric feature, the biometric feature including both the first and second portions) while the first portion (e.g., 1260*b*) of the biometric feature is not available to be captured by the biometric sensor is received while the biometric feature is enrolled (e.g., currently enrolled; already enrolled) for use in biometric authentication (and/or, in some embodiments, enrolled for authentication using the entirety of the biometric feature without having been enabled to perform a secure operation based on the second portion of the biometric feature while a first portion of the biometric feature is not available to be captured by the biometric sensor).

In some embodiments, the biometric feature is the face of a user (e.g., 1260) of the computer system. In some embodiments, the second portion (e.g., 1260*a*) of the biometric feature is a portion of the face around the eyes of the user (e.g., a portion that does not include the mouth and/or the nose of the user). In some embodiments the second portion of the biometric feature is a portion of the face around the mouth of the user and the first portion of the biometric feature is a portion of the face around the eyes of the user (e.g., so that the user can enable biometric authentication with just a lower part of the user's face, such as when the eyes of the user are obscured with glasses or goggles or hair).

In some embodiments, as a part of the biometric enrollment process that includes capturing biometric data corresponding to the second portion (e.g., 1260*a*) of the biometric feature for use in biometric authentication while the first portion (e.g., 1260*b*) of the biometric feature is not available to be captured by the biometric sensor the computer system captures, via the biometric sensor, a single biometric data scan (e.g., as shown in FIG. 12P) (e.g., a single discrete scanning event) of the second portion (e.g., 1260*a*) of the biometric feature (e.g., and/or any portion of the biometric feature without capturing biometric data corresponding to the first portion of the biometric feature).

In some embodiments, as a part of enrolling the biometric feature (e.g., the entirety of the biometric feature; the biometric feature including both the first and second portions) for use in biometric authentication, the computer system captures, via biometric sensor, a first biometric scan (e.g., as shown in FIG. 12F) corresponding to the biometric feature (e.g., to the entire biometric feature) that includes capturing biometric data corresponding to the first portion (e.g., 1260*b*) of the biometric feature and the second portion (e.g., 1260*a*) of the biometric feature. In some embodiments, as part of enrolling the biometric feature (e.g., the entirety of the biometric feature; the biometric feature including both the first and second portions) for use in biometric authentication, the computer system captures, via the biometric sensor, second biometric scan (e.g., as shown in FIG. 12H) that includes biometric data corresponding to the second portion (e.g., 1260*a*) of the biometric feature. In some embodiments, the second biometric scan does not include data corresponding to the first portion of the biometric feature.

In some embodiments, during the biometric enrollment process that includes capturing biometric data corresponding to the second portion (e.g., 1260*a*) of the biometric feature for use in biometric authentication while the first portion (e.g., 1260*b*) of the biometric feature is not available to be captured by the biometric sensor and in accordance with a determination that biometric data captured during the enrollment process corresponds to (e.g., matches; sufficiently matches, is consistent with) an enrolled biometric feature (e.g., a biometric feature previously enrolled for use in biometric authentication), the computer system proceeds with the enrollment process (e.g., as shown in FIGS. 12O-12P). In some embodiments, during the biometric enrollment process that includes capturing biometric data corresponding to the second portion (e.g., 1260*a*) of the biometric feature for use in biometric authentication while the first portion (e.g., 1260*b*) of the biometric feature is not available to be captured by the biometric sensor and in accordance with a determination that biometric data captured during the enrollment process does not correspond to an enrolled biometric feature (e.g., any enrolled biometric feature), the computer system forgoes proceeding with the enrollment process (e.g., as shown in FIGS. 12M-12N, indicated by 1258*b*) (e.g., until capturing biometric data that does correspond to an enrolled biometric feature). Forgoing proceeding with the enrollment process in accordance with a determination that biometric data captured during the enrollment process does not correspond to an enrolled biometric feature allows the computer system to not proceed with the enrollment process when biometric data captured during the enrollment process does not correspond to an enrolled biometric feature, which provides improved security. Providing improved security reduces the unauthorized performance of secure operations which, additionally, reduces power usage and improves battery life of the computer system by enabling the user to use the computer system more securely and efficiently.

In some embodiments, as a part of forgoing proceeding with the enrollment process the computer system displays, via the display generation component, an indication (e.g., 1258*b*) that biometric data captured during the enrollment process does not correspond to an enrolled biometric feature (e.g., an indication that a currently detected biometric feature does not match a currently enrolled biometric feature (e.g., "Face Does Not Match An Enrolled Face")). Displaying an indication that biometric data captured during the enrollment process does not correspond to an enrolled biometric feature provides the user with feedback about the current state of the enrollment process and informs the user of an action that is needed to complete the enrollment process. Providing improved user feedback enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Displaying an indication that biometric data captured during the enrollment process does not correspond to an enrolled biometric feature provides informs the user of the actions that are required before biometric data is enrolled and improves the chances that the correct biometric data will be captured, which increases security of the system. Providing improved security reduces the unauthorized performance of secure operations which, additionally, reduces power usage and improves battery life of the computer system by enabling the user to use the computer system more securely and efficiently.

In some embodiments, during the biometric enrollment process that includes capturing biometric data corresponding to the second portion (e.g., 1260*a*) of the biometric feature for use in biometric authentication while the first portion of the biometric feature is not available to be captured by the biometric sensor and in accordance with a determination that biometric data captured during the enrollment process corresponds to (e.g., matches: sufficiently matches) a first enrolled biometric feature (e.g., primary appearance, as shown in Table 1280) (e.g., a biometric feature previously enrolled for use in biometric authentication, a previously enrolled face), the computer system proceeds with the enrollment process for the first enrolled biometric feature (e.g., as discussed above in relation to FIGS. 12L and 12Y1) (e.g., capturing additional biometric data corresponding to the second portion of the first enrolled biometric feature and associating that data with existing biometric data corresponding the second enrolled biometric feature for use in biometric authentication). In some embodiments, during the biometric enrollment process that includes capturing biometric data corresponding to the second portion (e.g., 1260*a*) of the biometric feature for use in biometric authentication while the first portion of the biometric feature is not available to be captured by the biometric sensor and in accordance with a determination that biometric data captured during the enrollment process corresponds to (e.g., matches: sufficiently matches) a second enrolled biometric feature (e.g., a biometric feature previously enrolled for use in biometric authentication; a previously enrolled face), different from the first enrolled biometric feature, the computer system proceeds with the enrollment process for the second enrolled biometric feature (e.g., alternate appearance, as shown in Table 1280) (e.g., as discussed above in relation to FIGS. 12L and 12Y1) (e.g., capturing additional biometric data corresponding to the second portion of the second enrolled biometric feature and associating that data with existing biometric data corresponding the second enrolled biometric feature for use in biometric authentication). Automatically proceeding with the enrollment process for a particular biometric feature based on a determination that biometric data captured during the enrolment process corresponds to the particular feature allows the computer system to automatically choose which feature that the biometric feature in which the captured feature would be enrolled, which optimizes the operation when a set of conditions has been met. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Automatically proceeding with the enrollment process for a particular biometric feature based on a determination that biometric data captured during the enrolment process corresponds to the particular feature allows the computer system to automatically choose which feature that the biometric feature in which the captured feature would be enrolled, which improves the security because the user is more likely to keep the security features enabled if they are less disruptive to use of the system. Providing improved security reduces the unauthorized performance of secure operations which, additionally, reduces power usage and improves battery life of the computer system by enabling the user to use the computer system more securely and efficiently.

In some embodiments, after enabling performing a secure operation based on a second portion (e.g., 1260*a*) of the biometric feature (e.g., primary appearance, as shown in Table 1280) while a first portion (e.g., 1260*b*) of the biometric feature is not available to be captured by the biometric sensor (e.g., 704) and in accordance with a determination that a second biometric feature (e.g., alternate appearance, as shown in Table 1280) is enrolled for use in biometric authentication at the computer system (e.g., 700) without the computer system being enabled to perform the secure operation based on the second portion (e.g., 1260*a*) of the second biometric feature while a first portion of the second biometric feature is not available to be captured by the biometric sensor, the computer system displays, via the display generation component, an option (e.g., 1270*y*, 1270*z*) to enable performing the secure operation based on the second portion (e.g., 1260*a*) of the second biometric feature while the first portion (e.g., 1260*b*) of the second biometric feature is not available to be captured by the biometric sensor (e.g., displaying a user-selectable graphical object that, when selected, initiates a process to enable performing a secure operation based on a second portion of the second biometric feature while a first portion of the second biometric feature is not available to be captured by the biometric sensor). Displaying an option to enable performing a secure operation based on a second portion of the second biometric feature while a first portion of the second biometric feature is not available to be captured by the biometric sensor provides the user with feedback about the ability to enable performing a secure operation based on a second portion of the second biometric feature while a first portion of the second biometric feature is not available to be captured by the biometric sensor. Providing improved user feedback enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Displaying an option to enable performing a secure operation based on a second portion of the second biometric feature while a first portion of the second biometric feature is not available to be captured by the biometric sensor notifies about the ability to enable performing a secure operation based on a second portion of the second biometric feature while a first portion of the second biometric feature is not available to be captured by the biometric sensor, which improves security because the user is more likely to keep biometric authentication enabled for the secure process than to disable it. Providing improved security reduces the unauthorized performance of secure operations which, additionally, reduces power usage and improves battery life of the computer system by enabling the user to use the computer system more securely and efficiently.

In some embodiments, as a part of displaying the option the computer system displays the option (e.g., 1270*y*, 1270*z*), in a first user interface (e.g., user interface that includes settings 770), at a first location that is adjacent to (e.g., near) a first user-selectable graphical object (e.g., 770*g*) that, when selected, modifies a state of first configuration of the computer system. In some embodiments, the computer system, while in the first configuration is enabled, is enabled to perform a secure operation based on a second portion (e.g., 1260*a*) of one or more biometric features of a plurality of enrolled biometric features, which includes the biometric feature and the second biometric feature, while a first portion (e.g., 1260*b*) of one or more biometric features of the plurality of biometric features is not available to be captured by the biometric sensor (e.g., 770). In some embodiment, selecting the first user-selectable graphical object enables or disables use of the second portion to perform secure operations, when the first portion is not available to be captured by the biometric sensor for the plurality of the enrolled biometric sensors, as a set). Displaying the option a first location that is adjacent to a first user-selectable graphical object that, when selected, modifies a state of first configuration of the computer system, where the computer system, while in the first configuration is enabled, is enabled to perform a secure operation based on a second portion of one or more biometric features of a plurality of enrolled biometric features, which includes the biometric feature and the second biometric feature, while a first portion of one or more biometric features of the plurality of biometric features is not available to be captured by the biometric sensor provide the user with visual feedback to indicate that the option corresponds to the first user-selectable graphical object. Providing improved user feedback enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently.

In some embodiments, while the computer system displays the option (e.g., 1270*y*, 1270*z*) and while the first configuration of the computer system is enabled, the computer system receives a user input (e.g., 1250*l*) corresponding to the first user-selectable graphical object. In some embodiments, in response to receiving the user input corresponding to the first user-selectable graphical object the computer system ceases to enable (e.g., disabling) the first configuration of the computer system. In some embodiments, in response to receiving the user input corresponding to the first user-selectable graphical object the computer system ceases to display the option (e.g., 1270*y*, 1270*z*) to enable performing the secure operation based on the second portion (e.g., 1260*a*) of the second biometric feature (e.g., for primary appearance or secondary appearance in table 1280) while the first portion (e.g., 1260*b*) of the second biometric feature is not available to be captured by the biometric sensor. Ceasing to enable the first configuration of the computer system and to display the option in response to receiving the user input corresponding to the first user-selectable graphical object provides the user with visual feedback that the option is not available. Providing improved user feedback enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Ceasing to enable the first configuration of the computer system and to display the option in response to receiving the user input corresponding to the first user-selectable graphical object allows the user to be informed of options that are relevant to the biometric features that are available and to set whether the secure operation will be performed based on the second portion of the second biometric feature while the first portion of the second biometric feature is not available to be captured by the biometric sensor for each biometric feature. Providing improved security reduces the unauthorized performance of secure operations which, additionally, reduces power usage and improves battery life of the computer system by enabling the user to use the computer system more securely and efficiently.

In some embodiments, the computer system displays, via the display generation component (e.g., 710), a second instance of the first user interface (e.g., after displaying the first user interface with the option) (e.g., user interface that includes settings 770). In some embodiments, as a part of displaying, via the display generation component (e.g., 710), the second instance of the first user interface and in accordance with a determination that a plurality of biometric features (e.g., for primary appearance or secondary appearance in table 1280) are enrolled for use in biometric authentication, the computer system displays the second instance of the first user interface (e.g., user interface of FIG. 12X) with the option (e.g., 1270*y*, 1270*z*) to enable performing the secure operation based on the second portion (e.g., 1260*a*) of the second biometric feature while the first portion (e.g., 1260*b*) of the second biometric feature is not available to be captured by the biometric sensor (e.g., 704). In some embodiments, as a part of displaying, via the display generation component (e.g., 710), the second instance of the first user interface and in accordance with a determination that a plurality of biometric features (e.g., for primary appearance or secondary appearance in table 1280) are not enrolled for use in biometric authentication (e.g., one or fewer biometric features are enrolled for use in biometric authentication), the computer system displays the second instance (e.g., user interface of FIG. 12L) of the first user interface without the option to enable performing the secure operation based on the second portion (e.g., 1260*a*) of the second biometric feature while the first portion (e.g., 1260*b*) of the second biometric feature is not available to be captured by the biometric sensor (e.g., 704). In some embodiments, the second instance of the first user interface includes the first selectable graphical object without including the option). Displaying the second instance of the first user interface with the option in accordance with a determination that a plurality of biometric features are enrolled for use in biometric authentication provides the user with feedback concerning the availability of the option. Providing improved user feedback enhances the operability of the computer system and makes the user-system interface more efficient (e.g., by helping the user to provide proper inputs and reducing user mistakes when operating/interacting with the computer system) which, additionally, reduces power usage and improves battery life of the system by enabling the user to use the computer system more quickly and efficiently. Determining whether or not to display the second instance of the first user interface with the option based on a determination as to whether or not a plurality of biometric features are enrolled for use in biometric authentication allows the user to be informed of options that are relevant to the biometric features that are available and to set whether the secure operation will be performed based on the second portion of the second biometric feature while the first portion of the second biometric feature is not available to be captured by the biometric sensor for each biometric feature. Providing improved security reduces the unauthorized performance of secure operations which, additionally, reduces power usage and improves battery life of the computer system by enabling the user to use the computer system more securely and efficiently.

Note that details of the processes described above with respect to method 1400 (e.g., FIGS. 14A-14B) are also applicable in an analogous manner to the methods described above. For example, methods 800, 900, 1000, 1100, 1300, 1600, and 1800 optionally includes one or more of the characteristics of the various methods described above with reference to method 1400. For example, the methods 800, 900, 1000, and 1100 can be combined with methods 1300 and 1400, such that, when a biometric authentication process is unsuccessful using the techniques (e.g., biometric enrollment using a portion of biometric feature) described by methods 1300 and 1400, the techniques described by methods 800, 900, 1000, and 1100 can be used to unlock the computer system with the assistance of an external device (or vice-versa). For brevity, these details are not repeated below.

FIGS. 15A-15U illustrate exemplary user interfaces for providing and controlling biometric authentication at a computer system in accordance with some embodiments. The user interfaces in these figures are used to illustrate the processes described below, including the processes in FIG. 16.

FIGS. 15A-15P illustrate exemplary user interfaces for biometric enrollment of a biometric feature that corresponds to an appearance profile (e.g., primary, alternate, or another profile). In particular, FIGS. 15A-15P illustrate an exemplary scenario where the computer system identifies an object (e.g., a pair of glasses) and enables the computer system to provide biometric authentication to perform a secure operation while a user is wearing the object. In some instances, the biometric feature is enrolled in conjunction with the object. For ease of discussion, FIGS. 15A-15U describes the object as being a pair of glasses. However, in some embodiments, the object is a different object, such as an eye covering, a finger-tip covering, and/or a partial hand covering, etc. In some embodiments, the user interfaces of FIGS. 15A-15U are combined with and/or displayed in lieu of the user interfaces of FIGS. 12A-12AA. In some embodiments, the description related to the user interface of FIGS. 15A-15U also apply to the description of the user interface of FIGS. 12A-12AA (and vice-versa).

As illustrated in FIG. 15A, the appearance of user 1260 is similar to the alternate appearance profile, as shown and described above in relation to row 2 of Table 1280 in FIG. 12B. In some embodiments, the computer system operates in lieu of and/or in addition to the description below of FIGS.

15A-15U instead of the description provided in FIGS. 12B-12K (e.g., in response to detecting one or more of inputs 1250*a*1-1250*a*3 of FIG. 12A).

As illustrated in FIG. 15A, computer system 700 includes display 710. Computer system 700 also includes one or more inputs devices, such as the touch screen of display 710 and hardware button 702 (e.g., among one or more input devices described above in relation to FIG. 12A), and one or more biometric sensors, such as biometric sensor 704 (e.g., using one or more techniques as described above in relation to FIGS. 7A-7B). As illustrated in FIG. 15A, user 1260 is holding computer system 700 in a position where user 1260 can see content displayed on display 710 and biometric sensor 704 can detect the face of user 1260 (e.g., which is shown by zone of detection indication 1284). In particular, the face of user 1260 includes upper portion 1260*a* and bottom portion 1260*b*. Upper portion 1260*a* includes the eyes and eyebrows of user 1260, which are at least partially covered by glasses 1526*a* in FIG. 15A. Bottom portion 1260*b* includes the mouth of user 1260. At FIG. 15A, computer system 700 is displaying user interface 1220 (e.g., a "How to Set Up Face Authentication" user interface) that includes start affordance 1222, using one or more similar techniques as described above in relation to FIG. 12B. At FIG. 15A, while displaying user interface 1220 that includes start affordance 1222 on display 710, computer system 700 detects tap gesture 1550*a* on start affordance 1222.

As illustrated in FIG. 15B, in response to detecting tap gesture 1550*a*, computer system 700 displays user interface 1224 that includes viewfinder 1226 and notification 1218*a* (e.g., "Position Your Face Within the Frame"), using one or more techniques as described above in relation to FIG. 12C. At FIG. 15B, biometric sensor 704 captures one or more representations of the face of user 1260. In some embodiments, computer system 700 performs one or more techniques as described above in relation to FIGS. 12C-12D when user 1260 is wearing mask 1228 (e.g., as shown in FIG. 12B). In some embodiments, one or more portions of the descriptions of FIG. 12B also apply to the description of the user interface of FIG. 15B.

At FIG. 15C, computer system 700 initiates a first scan and/or a first process for scanning (or capturing) the biometric feature to be enrolled (e.g., as authorized biometric data that is stored and associated with the alternate appearance profile) and displays user interface 1230 that includes capture indicator 1532*a* that surrounds a live representation of user 1260 that is captured by biometric sensor 704 (e.g., using one or more techniques as described above in relation to FIG. 12F). As illustrated in FIG. 15C, user interface 1230 also includes notification 1234*a*, which indicates that the user should "move [their] head slowly to complete the circle" (e.g., the perimeter of capture indicator 1532*a*). At FIG. 15C, a determination is made that the face of user 1260 has been scanned (or captured) (e.g., capture indicator 1532*a* completely surrounds the representation of user 1260 that is being displayed on the user interface 1230).

At FIG. 15D, because the determination was made that the face of user 1260 has been scanned, computer system 700 enrolls (or saves) the biometric feature for the face of the user (e.g., biometric feature) and the eyes of the user (e.g., portion of the biometric feature) (e.g., as described above in relation to FIG. 12F). Computer system 700 also displays notification 1530*a*, which indicates that the scan has been completed ("First Scan Complete"). In some embodiments, the biometric feature is the face of user 1260, which includes the eyes of user 1260. At FIG. 15D, computer system 700 detects tap gesture 1550*d* on next affordance 1538.

As illustrated in FIG. 15E, in response to detecting tap gesture 1550*d*, computer system 700 displays user interface 1510 that includes accept-use-face-with-mask-authentication affordance 1510*a* (e.g., "Use Face Authentication with a Mask. Unlock with Face Authentication When Wearing a Mask."), reject-use-face-with-mask-authentication affordance 1510*b* (e.g., "Don't Use Face Authentication with a Mask. Unlock with Passcode When Wearing a Mask."), and reject-use-face-with-mask-authentication affordance 1510*c* ("Set up Later in Settings"). In some embodiments, in response to detecting a tap gesture (e.g., tap gesture 1550*e*2 or tap gesture 1550*e*3) on reject-use-face-with-mask-authentication affordance 1510*b* and/or reject-use-face-with-mask-authentication affordance 1510*c*, computer system 700 terminates the process for enrolling the biometric feature. In some embodiments, the biometric feature is enrolled while the portion of the biometric feature is not independently enrolled after computer system 700 terminates the process for enrolling the biometric feature. In some embodiments, after computer system 700 terminates the process for enrolling the biometric feature, computer system 700 is enabled to authenticate using the full biometric authentication (e.g., using the full biometric feature and/or authenticating without wearing a mask) but is not enabled to authenticate using the partial biometric authentication (e.g., using a portion of the biometric feature and/or authenticating while wearing a mask) (e.g., as described above in relation to FIGS. 12R-12W and below in relation to FIGS. 17A-17Q). At FIG. 15E, computer system 700 detects tap gesture 1550*e*1 on accept-use-face-with-mask-authentication affordance 1510*a*.

At FIG. 15F, in response to detecting tap gesture 1550*e*1, computer system 700 displays user interface 1224 that includes viewfinder 1226 and notification 1218*a*, using one or more techniques as described above in relation to FIG. 15B. At FIG. 15F, biometric sensor 704 captures one or more representations of the face of user 1260. In some embodiments, computer system 700 performs one or more techniques as described above in relation to FIGS. 12C-12D when user 1260 is wearing mask 1228 (e.g., as show in FIG. 12B).

At FIG. 15G, computer system 700 initiates a second scan and/or a second process for scanning (or capturing) the biometric feature to be enrolled (e.g., as authorized biometric data, stored and associated with the alternate appearance profile). As illustrated in FIG. 15G, computer system 700 displays user interface 1230 that includes capture indicator 1532*b* that surrounds a live representation of user 1260, which is being captured by biometric sensor 704 (e.g., using one or more techniques as described above in relation to FIG. 12F). As illustrated in FIG. 15G, user interface 1230 also includes notification 1234*a*, which indicates that the user should "move [their] head slowly to complete the circle" (e.g., the perimeter of capture indicator 1532*b*). At FIG. 15G, a determination is made that the face of user 1260 has been scanned (or captured) (e.g., capture indicator 1532*b* completely surrounds the representation of user 1260 that is being displayed on the user interface of FIG. 15G).

At FIG. 15H, because the determination was made that the face of user 1260 has been scanned, computer system 700 enrolls (or saves) the biometric feature for the face of the user (e.g., biometric feature) and the eyes of the user (e.g., portion of the biometric feature) (e.g., as described above in relation to FIG. 12F). In some embodiments, at FIG. 15H, computer system 700 completes the scan to enroll upper portion 1260*a* and/or performs a different type of scan (e.g., a periocular scan) than the scan (e.g., a full face scan) performed in FIGS. 15C-15D. In some embodiments, the scan performed at FIGS. 15C-15D is an initial scan to enroll the biometric feature (e.g., the full face of the user) and/or establish the biometric enrollment profile, and the scan performed at FIGS. 15G-15H is a scan that enrolls upper portion 1260*a* (e.g., the eyes of the user) with the biometric profile that includes the enrolled biometric feature. In some embodiments, the scan performed at FIGS. 15C-15D is a full face scan (e.g., scans and/or captures the full biometric feature (e.g., upper portion 1260*a* and bottom portion 1260*b*)) and the scan performed at FIGS. 15G-15H is a partial face scan (e.g., scans or captures the upper portion 1260*a* and, in some embodiments, does not scan or capture bottom portion 1260*b*). At FIG. 15H, computer system 700 detects tap gesture 1550*h* on next affordance 1538. In response to detecting tap gesture 1550*h*, a determination is made that user 1260 is wearing glasses 1526*a* (e.g., over upper portion 1260*a*). At FIG. 15H, because the determination was made that user 1260 is wearing glasses 1526*a*, computer system 700 enrolls the biometric feature in conjunction with glasses 1526*a*. In some embodiments, computer system 700 enrolls the biometric feature in conjunction with glasses 1526*a*, such that user 1260 can successfully authenticate while wearing glasses 1526*a* and wearing a mask (e.g., as described below in relation to FIGS. 17A-17R). In some embodiments, computer system 700 enrolls the biometric feature in conjunction with glasses 1526*a* after another scan is complete (e.g., in FIG. 15N).

As illustrated in FIG. 15I, because the determination was made that user 1260 is wearing glasses 1526*a*, computer system 700 displays prompt 1534*i*. Prompt 1534*i* indicates that user 1260 should remove glasses 1526*a* so that an additional scan can be performed (e.g., "Remove Your Glasses For The Third Scan"). In some embodiments, computer system 700 does not display prompt 1534*i* when a determination is made that user 1260 is not wearing glasses (e.g., if user 1260 was not wearing glasses in FIG. 15H). In some embodiments, when a determination is made that user 1260 is not wearing glasses upon completing the scan described above in relation to FIGS. 15G-15H, computer system 700 displays the user interface of FIG. 15N and the process for biometric enrollment is complete. In some embodiments, when a determination is made that user 1260 is not wearing glasses upon completing the scan in FIGS. 15G-15H, computer system 700 does not enroll the biometric feature in conjunction with a pair of glasses and/or an object that can be worn while authenticating via partial biometric authentication. In some embodiments, computer system 700 does not enroll the biometric feature in conjunction with the pair of glasses because a determination is made that the user does not wear glasses and/or that glasses are irrelevant to the user. At FIG. 15I, computer system 700 detects tap gesture 1550*i* on continue affordance 1542.

FIGS. 15J-15M illustrate exemplary user interface that computer system 700 can display as a part of the biometric enrollment process (and/or in response to detecting tap gesture 1556*i*). As illustrated in FIG. 15J, user 1260 is wearing sunglasses 1536 over upper portion 1260*a* of the face of user 1260. At FIG. 15J, in response to detecting tap gesture 1550*i*, a determination is made that sunglasses 1536 is an unsupported type of object (e.g., sunglasses) and/or an object that is not supported to be worn by a user while authenticating via partial biometric authentication (e.g., while the user is wearing a mask). As illustrated in FIG. 15J, because the determination was made that sunglasses 1536 is an unsupported type of object, computer system 700 displays notification 1534*j* and does not initiate an additional scan (and/or display user interface 1224 of FIG. 15L). Notification 1534*j* indicates that the user needs to stop wearing sunglasses 1536 so that the biometric enrollment process can continue ("Biometric Authentication Doesn't Support These Glasses. Remove to Continue.") and/or for the additional scan to be initiated. In addition, because the determination is made that sunglasses 1536 is an unsupported type of object, computer system 700 displays try affordance 1266 and reject-use-face-with-mask-authentication affordance 1216, which operate according to the description described above in relation to FIG. 12M. In some embodiments, sunglasses 1536 is an unsupported object because computer system 700 cannot detect the attention of the user while the user is wearing sunglasses 1536. In some embodiments, the attention of the user is required while the user is complete the biometric enrollment process to set-up partial biometric authentication.

As illustrated in FIG. 15K, user 1260 is wearing mask 1228 over bottom portion 1260*b* of the face of user 1260 while upper portion 1260*a* of the face of user 1260 is uncovered (e.g., an object is not positioned over upper portion 1260*a*). At FIG. 15K, in response to detecting tap gesture 1550*i*, a determination is made that user 1260 is wearing a mask. As illustrated in FIG. 15K, because the determination was made that user 1260 is wearing a mask, computer system 700 displays notification 1534*k* ("Remove Your Face Mask In A Safe Environment to Set Up") and does not initiate an additional scan (and/or display user interface 1224). As illustrated in FIG. 15K, notification 1534*k* indicates that the user will need to remove mask 1228 before the biometric enrollment process can continue ("Biometric Authentication Doesn't Support These Glasses. Remove to Continue.") and/or for the additional scan to be initiated. In addition, because the determination was made that user 1260 is wearing a mask, computer system 700 displays try affordance 1266 and reject-use-face-with-mask-authentication affordance 1216, which operate according to the description provided above (e.g., in FIG. 12M). In some embodiments, computer system 700 displays other notifications (e.g., other than notification 1534*j* and notification 1534*k*), such as a determination that the face of the user does not match the face of the user (e.g., user 1260 who is completing the biometric enrollment process in FIGS. 15A-15P) that was previously completing the biometric enrollment (e.g., using similar techniques to those described above in relation to FIGS. 12M-12O), and does not initiate an additional scan based on one or more other determinations.

As illustrated in FIG. 15L, user 1260 is not wearing an object over the upper portion 1260*a* and bottom portion 1260*b* of the face of user 1260. In other words, at FIG. 15L, user 1260 has removed glasses 1526*a* of FIG. 15I. At FIG. 15L, in response to detecting tap gesture 1550*i*, a determination is made that user 1260 is not wearing a pair of glasses (and/or an object over upper portion 1260*a*). As illustrated in FIG. 15L, because the determination is made that user 1260 is not wearing a pair of glasses, computer system 700 displays user interface 1224 that includes viewfinder 1226 (e.g., a live camera preview as described above in relation to FIG. 12C) and notification 1218*a* (and/or initiates the additional scan), using one or more techniques as described above in relation to FIG. 15B. In some embodiments, in response to detecting tap gesture 1550*i*, a determination is made that user 1260 is wearing a pair of glasses and, in response to this determination, computer system 700 redisplays prompt 1534*i* of FIG. 15I (e.g., that indicates that the user should remove the pair of glasses) and does not initiate the additional scan (and/or does not display user interface 1224). At FIG. 15L, biometric sensor 704 captures one or more representations of the face of user 1260.

At FIG. 15M, computer system 700 initiates a third scan and/or a third process for scanning (or capturing) the biometric feature to be enrolled. As illustrated in FIG. 15M, computer system 700 displays user interface 1230 that includes capture indicator 1532*c* that surrounds a live representation of user 1260 that is captured by biometric sensor 704 (e.g., using one or more techniques as described above in relation to FIG. 12F). As illustrated in FIG. 15M, computer system 700 also displays notification 1234*a*, which indicates that the user should "move [their] head slowly to complete the circle" (e.g., the perimeter of capture indicator 1532*c*). At FIG. 15M, a determination is made that the face of user 1260 has been scanned (or captured) (e.g., capture indicator 1532*c* completely surrounds the representation of user 1260 that is being displayed on the user interface of FIG. 15M).

At FIG. 15N, because the determination was made that the face of user 1260 has been scanned, computer system 700 completes the enrollment for (or saving of) the biometric feature for the face of the user (e.g., biometric feature) and the eyes of the user (e.g., portion of the biometric feature) (e.g., as described above in relation to FIG. 12F). At FIG. 15N, completing the enrollment of the biometric feature for the face of the user and the eyes of the user includes saving data associated with glasses 1526*a* (e.g., captured in FIGS. 15G-15H) in conjunction with the biometric feature, such that user 1260 can wear glasses 1526*a* while authenticating via partial biometric authentication to perform a secure operation (e.g., as further described below in FIGS. 17A-17R). As illustrated in FIG. 15N, because the determination was made that the face of user 1260 has been scanned, computer system 700 displays user interface 1540. User interface 1540 includes continue affordance 1540*a* and add glasses affordance 1540*b*. In some embodiments, computer system 700 displays add glasses affordance 1540*b* because a determination is made that the biometric feature (e.g., for an appearance profile of the user and/or for a biometric profile of the user and irrespective of the particular appearance profile of the user) has not been enrolled in conjunction with a threshold number of glasses (e.g., 1-50). In some embodiments, the threshold number of glasses is provided to limit the number of possible appearance that the computer system must recognize in order to authenticate a user. In some embodiments, based on the determination being made that the biometric feature has been enrolled in conjunction with the threshold number of glasses, computer system 700 does not display add glasses affordance 1540*b* (and maintains display of continue affordance 1540*a*). At FIG. 15N, computer system 700 detects tap gesture 1550*n* on add glasses affordance 1540*b*.

At FIG. 15O, in response to detecting tap gesture 1550*n*, computer system 700 initiates an additional scan to enroll the biometric feature in conjunction with a new pair of glasses (e.g., glasses 1526*b* of FIG. 15O are different from glasses 1526*a* of FIG. 15H). As illustrated in FIG. 15O, computer system 700 displays user interface 1230 that includes capture indicator 1532*d* (e.g., using one or more techniques as described above in relation to FIG. 12F). In some embodiments, computer system 700 displays user interface 1224 of FIG. 15L (e.g., in response to detecting tap gesture 1550*n*) and, based on a determination being made that the face of user 1260 is positioned within the frame, displays user interface 1230.

At FIG. 15O, a determination is made that the face of user 1260 has been scanned (or captured) (e.g., capture indicator 1532*c* completely surrounds the representation of user 1260 that is being displayed on the user interface of FIG. 15O). At FIG. 15O, because the determination was made that the face of user 1260 has been scanned, computer system 700 saves data associated with glasses 1526*b* (e.g., captured in FIG. 15O) in conjunction with the biometric feature, such that user 1260 can wear glasses 1526*b* while authenticating via partial biometric authentication to perform a secure operation (e.g., as further described below in FIGS. 17A-17R). As illustrated in FIG. 15P, after the determination was made that the face of user 1260 has been scanned, computer system 700 re-displays user interface 1540 that includes continue affordance 1540*a* and add glasses affordance 1540*b*. At FIG. 15P, computer system 700 detects tap gesture 1550*p* on continue affordance 1540*a*. In some embodiments, in response to detecting tap gesture 1550*p*, computer system 700 terminates the biometric enrollment processes.

FIG. 15Q illustrates computer system 700 displaying the settings user interface that includes settings 770 (e.g., where the settings user interface and settings 770 operates using one or more techniques as described above in relation to FIG. 7L, FIG. 12A, FIG. 12L, and FIGS. 12X-12Y1). As illustrated in FIG. 15Q, settings 770 include unlock-with-mask-primary-appearance setting toggle 1270*y* and unlock-with-mask-alternate-appearance setting toggle 1270*z*, which operate and are displayed as described above in relation to FIGS. 12X-12Y1. Unlock-with-mask-primary-appearance setting toggle 1270*y* is displayed with indication 1568*y* and unlock-with-mask-alternate-appearance setting toggle 1270*z* with indication 1568*z*. Indication 1568*y* indicates that two pairs of glasses can be worn by user 1260 to provide the partial biometric authentication (e.g., "2 Pairs of Glasses Added") while the user is in the primary appearance. Indication 1568*z* indicates two pairs of glasses can be worn by user 1260 to provide the partial biometric authentication (e.g., "2 Pairs of Glasses Added") while the user is in the alternate appearance. Thus, at FIG. 15Q, indication 1568*y* and indication 1568*z* indicate the same number of glasses that can be worn by user 1260 to provide the partial biometric authentication while the user is in the primary or the alternate appearance. However, in some embodiments, indication 1568*y* and indication 1568*z* indicate different number of glasses that can be worn by user 1260 to provide the partial biometric authentication. In some embodiments, indication 1568*y* indicates that a first number of glasses can be worn by user 1260 to provide the partial biometric authentication while the user is in the primary appearance and indication 1568*z* indicates that a second number of glasses can be worn by user 1260 to provide the partial biometric authentication while the user is in the alternate appearance, where the first number of glasses is different than the second number of glasses. Thus, in some embodiments, computer system 700 can allow a different pair of glasses to be used with different appearance profiles for a biometric feature profile. In some embodiments, at FIG. 15Q, glasses 1526*a* (e.g., which in conjunction with the biometric feature were enrolled as described above in relation to FIG. 15M) and glasses 1526*b* (e.g., which in conjunction with the biometric feature were enrolled as described above in relation to FIG. 15O) are the two pairs of glasses that are indicated by indication 1568*z* (e.g., for the alternate appearance profile) and are not the two pairs of glasses that are indicated by indication 1568*z* (e.g., for the primary appearance profile). In some embodiments, glasses 1526*a* and glasses 1526*b* are indicated by indication 1568*z*

(e.g., for the alternate appearance profile) and not indicated by indication 1568*y* (e.g., for the primary appearance profile) because these pairs of glasses were captured while user 1260 was in the alternate appearance. In some embodiments, computer system 700 has to perform additional scans to enroll the biometric feature in conjunction with glasses 1526*a* and glasses 1526*b* for use with the primary appearance profile, while user 1260 is in the primary appearance and wearing glasses 1526*a* and glasses 1526*b*. In some embodiments, computer system 700 only enrolls the biometric feature in conjunction with a pair of glasses for the appearance profile that the user is in while one or more portions of the biometric feature are being captured. In some embodiments, computer system 700 enrolls the biometric feature in conjunction with a pair of glasses for multiple appearance profiles (e.g., irrespective of the user's appearance while one or more portions of the biometric feature are being captured).

As illustrated in FIG. 15Q, unlock-with-mask-primary-appearance setting toggle 1270*v* is displayed with add glasses affordance 1520*y* and unlock-with-mask-alternate-appearance setting toggle 1270*z* with add glasses affordance 1520*z*. In some embodiments, in response to detecting an input on add glasses affordance 1520*y*, computer system 700 initiates a process to save data for a new pair of glasses (e.g., enroll the new pair of glasses), such that the new pair of glasses can be worn while user 1260 is in the primary appearance (and, in some embodiments, cannot be worn while user 1260 is in the alternate appearance). In some embodiments, in response to detecting an input on add glasses affordance 1520*z* computer system 700 initiates a process to save data for a new pair of glasses, such that the new pair of glasses can be worn while user 1260 is in the alternate appearance (and, in some embodiments, the biometric feature is not enrolled in conjunction with the new pair of glasses for the primary appearance; so, in some of these embodiments, partial biometric authentication will likely fail while user 1260 is in the primary appearance and is wearing the new pair of glasses). In some embodiments, the user interface of FIG. 15Q includes one add glasses affordance per enrolled biometric profile. Thus, in some embodiments, the user interface of FIG. 15Q includes a single add glasses affordance for the primary appearance profile and the alternate appearance profile. In some embodiments, in response to detecting an input on an add glasses affordance, computer system 700 automatically enrolls the new pair of glasses with the primary appearance and/or the alternate appearance based on the appearance of the user while the user is enrolling the new pair of glasses (e.g., if the user is in the primary appearance, the computer system enrolls the new pair of glasses with the primary appearance profile; and if the user is in the alternate appearance, the computer system enrolls the new pair of glasses with the alternate appearance profile). At FIG. 15Q, computer system 700 detects tap gesture 1550*q* on add glasses affordance 1520*z*.

At FIG. 15R, in response detecting the tap gesture 1550*q*, computer system 700 initiates a process to enroll glasses 1526*c* (e.g., a new pair of glasses that is different from the previously enrolled/captured glasses, glasses 1526*a* of FIG. 15I and glasses 1526*b* of FIG. 15O). At FIG. 15R, computer system 700 completes enrollment of glasses 1526*c*, using one or more techniques as described above in relation to FIGS. 15A-15P (e.g., including displaying the various error notifications and/or terminating the biometric enroll process when certain determinations are made). In some embodiments, computer system 700 performs less scans to enroll the biometric feature in conjunction with glasses 1526*c* than the number of scans that were needed to enroll glasses 1526*a* of FIGS. 15H-15I. In some embodiments, when looking at FIGS. 15A-15P, computer system 700 performs a first scan (e.g., at FIGS. 15C-15D) to enroll the biometric feature, performs a second scan (e.g., at FIGS. 15G-15H) to enroll the portion of the biometric feature and/or enroll the biometric feature in conjunction with the glasses (e.g., when the glasses are detected), and performs a third scan (e.g., at FIGS. 15M-15N) to enroll the portion of the biometric feature without the glasses (e.g., if the glasses are detected during the second scan). Thus, in some embodiments, computer system 700 can perform more successful scans to enable the use of full biometric authentication and the use of partial biometric authentication (e.g., FIGS. 15A-15P, an initial set up process, such an out-of-the-box set up process, a set up process that occurs after factory settings and/or the authentication settings have been reset to a default factory settings and/or out-of-the box settings) than to enable the use of only partial biometric authentication (e.g., an upgrade set up process and/or enabling partial authentication via the settings user interface when partial authentication was not initially enabled, such as the situations that occurs in response to detecting tap gesture 1550*e*2 of FIG. 15E as described above). In some embodiments, computer system 700 can perform more successful scans to enable the use of partial biometric authentication than to enable the use of an object to be worn while the user is complete the partial biometric authentication process and/or when partial biometric authentication has been previously enabled on computer system 700 (e.g., such as the situations that occurs when glasses are not detected during the second scan in FIGS. 15G-15H).

At FIG. 15R, a determination is made that the face of user 1260 has been scanned (or captured) (e.g., capture indicator 1532*d* completely surrounds the representation of user 1260 that is being displayed on the user interface of FIG. 15R). After the determination is made that the face of user 1260 has been scanned, computer system 700 re-displays the settings user interface, as illustrated in FIG. 15S. Notably, in FIG. 15S, computer system 700 has ceased to display add glasses affordance 1520*y* and add glasses affordance 1520*z* of FIG. 15Q because a determination is made that a maximum number of glasses have been enrolled. In some embodiments, computer system 700 displays add glasses affordance 1520*y* and add glasses affordance 1520*z* of FIG. 15Q as inactive (e.g., and/or not selectable) because a determination is made that a maximum number of glasses have been enrolled. In some embodiments, based on a determination that the maximum number glasses have not been enrolled, computer system 700 maintains display of glasses affordance 1520*y* and add glasses affordance 1520*z*. In some embodiments, based on a determination that the maximum number of glasses have not been enrolled for the primary appearance profile and the maximum number of glasses have been enrolled for the alternate appearance profile, computer system 700 displays add glasses affordance 1520*y* and does not display add glasses affordance 1520*z* (e.g., or vice-versa when the opposite determination is made). In some embodiments, the maximum number of glasses that can be added is different for each appearance profile and/or is cumulative for a biometric profile (e.g., irrespective of the appearance profiles for the biometric profile). In some embodiments, computer system 700 displays an error and does not perform a scan when a determination is made that the appearance of the user does not match the selected appearance profile (e.g., the appearance profile that the selected add glasses affordance corresponds to). At FIG. 15S, computer system 700 detects tap gesture 1550*s* on unlock-with-mask-alternate-appearance setting toggle 1270*z*.

As illustrated in FIG. 15T, in response to detecting tap gesture 1550*s*, computer system 700 displays unlock-with-mask-alternate-appearance setting toggle 1270*z* in an inactive and/or off state and computer system 700 is transitioned to not be configured to authenticate using partial biometric authentication while the user is in the alternate appearance (e.g., using one or more techniques as discussed above in relation to FIGS. 12X-12Y1). Notably, at FIG. 15T, computer system 700 remains configured to authenticate using partial biometric authentication while the user is in the primary appearance (e.g., using one or more techniques as discussed above in relation to FIGS. 12X-12Y1) (e.g., because unlock-with-mask-primary-appearance setting toggle 1270*y* remains displayed in an on and/or active state). At FIG. 15T, computer system 700 detects tap gesture 1550*t* on unlock-with-mask-primary-appearance setting toggle 1270*y*. As illustrated in FIG. 15U, in response to detecting tap gesture 1550*t*, computer system 700 displays unlock-with-mask-primary-appearance setting toggle 1270*y* in an inactive and/or off state and computer system 700 is transitioned to not be configured to authenticate using partial biometric authentication while the user is in the primary appearance (e.g., using one or more techniques as discussed above in relation to FIGS. 12X-12Y1). At FIG. 15U, computer system 700 detects tap gesture 1550*u*1 and tap gesture 1550*u*2 and, in response to detecting tap gesture 1550*u*1 and tap gesture 1550*u*2, computer system 700 re-displays the user interface of FIG. 15S and is transitioned to being re-configured to authenticate using partial biometric authentication while the user is in the primary appearance and the alternate appearance. Notably, computer system 700 is transitioned to being re-configured to authenticate using partial biometric authentication while the user is in the primary appearance and the alternate appearance without needing the biometric feature, the portion of the biometric feature, and/or glasses 1526*a*-1526*c* to be rescanned and/or re-enrolled. Thus, in some embodiments, computer system 700 preserves data related to the partial biometric authentication while partial biometric authentication is inactive for one or more biometric profiles and/or appearance profiles for a biometric profile.

FIG. 16 is a flow diagram illustrating a method for providing and controlling biometric authentication at a computer system in accordance with some embodiments. Method 1600 is performed at a computer system (e.g., 100, 300, 500, and/or 700) (e.g., a smartphone, a tablet computer) that is in communication with one or more biometric sensors (e.g., 704) (e.g., 704) (e.g., a fingerprint sensor and/or a facial recognition sensor (e.g., one or more depth sensors; one or more cameras (e.g., dual cameras, triple camera, and/or quad cameras)) on the same side or different sides of the computer system (e.g., a front camera and/or a back camera)), and/or an iris scanner) (e.g., is hidden or concealed) and one or more output devices (e.g., 710) (e.g., a display generation component (e.g., a display controller and/or a touch-sensitive display system) and/or an audio speaker). Some operations in method 1600 are, optionally, combined, the orders of some operations are, optionally, changed, and some operations are, optionally, omitted.

As described below, method 1600 provides an intuitive way for providing and controlling biometric authentication at a computer system. The method reduces the cognitive burden on a user for providing and controlling biometric authentication at a computer system, thereby creating a more efficient human-machine interface. For battery-operated computing devices, enabling a user to provide and control biometric authentication at a computer system faster and more efficiently conserves power and increases the time between battery charges.

During a biometric enrollment process (and after completing a first scan of the biometric feature and/or a least the portion of the biometric feature), the computer system captures (1602), via the one or more biometric sensors (e.g., 704), respective content that corresponds to a biometric feature (e.g., 1260*a* and 1260*b*) (e.g., face of the user). In some embodiments, during the biometric enrollment process, the computer system provides, via the one or more output devices, an option to enable a first setting to perform a secure operation of a first type when a first portion (e.g., a predefined portion of face (e.g., a mouth), a predefined portion of an eye, a predefined portion of a finger (e.g., fingertip); and/or a partial portion (e.g., a portion that is less than the entirety of the biometric feature)) of a biometric feature (e.g., a face, a finger, or an eye) is not available to be captured via the one or more biometric sensors (e.g., due to the first portion being obscured or covered or not within the field-of-sensing of the one or more biometric sensors) (e.g., the mouth of the user is covered with a mask or scarf or other face covering) (e.g., as described above in relation to methods 1300 and/or 1400).

In response to (1604) capturing the respective content (e.g., visual content and/or data) that corresponds to the biometric feature (e.g., 1260*a* and 1260*b*) (and, in some embodiments, in response to detecting selection of the option to enable the first setting to perform the secure operation of the first type when the first portion of the biometric feature is not available to be captured by the one or more biometric sensors) and in accordance with a determination that the respective content meets a respective set of criteria, where the respective set of criteria includes a criterion that is met when a determination is made, based on the respective content, that a respective type of object (e.g., 1526*a*-1526*d*) (e.g., contacts over an iris, a set of glasses and/or a set of sunglasses over the eyes of a face, or a glove over a finger) is positioned over (and/or obstructs) a respective portion (e.g., 1260*a*) of the biometric feature (e.g., is position around, on, and/or obstructs a predefined portion of the biometric feature (e.g., the eyes of the user), (e.g., as described above in relation to methods 1300 and/or 1400), and where the biometric feature (e.g., 1260*a* and 1260*b*) was previously enrolled (e.g., as described above in relation to methods 1300, and/or 1400) in conjunction with (e.g., associated with (e.g., programmatically associated with) and/or with) data corresponding to the respective type of object (e.g., 1526*a*-1526*d*) positioned over the respective portion of the biometric feature before the respective content was captured (e.g., data corresponding to the respective type of object (e.g., the actual respective type of object) and/or data corresponding to an area (e.g., a voided, missing, and/or obstructed area of the biometric feature) that the respective type of object occupies (e.g., an area that corresponds to the shape and/or design of the respective type of object) while being positioned over the biometric feature), the computer system provides (1606) (e.g., displays and/or outputs), via the one or more output devices (e.g., 710), a respective prompt (e.g., 1534*i*) to perform (e.g., to restart or to continue) at least a portion of the biometric enrollment process (e.g., scanning, via the one or more biometric sensors, of at least the portion of the biometric feature) without the respective type of object being positioned over the respective portion of the biometric feature (e.g., a prompt indicating that a process to enroll at least the respective portion of the biometric feature cannot be completed until the respective object is removed from being positioned over the respective portion of the biometric feature) (e.g., providing the respective prompt without performing at least the portion of the biometric enrollment process). In some embodiments, in accordance with a determination that the respective content meets the respective set of criteria, the computer system does not initiate the process to enroll at least the respective portion of the biometric feature and/or does not perform at least the portion of the biometric enrollment process. In some embodiments, in accordance with a determination that the respective content does not meet the respective set of criteria, the computer system does not provide the respective prompt. In some embodiments, in accordance with a determination that the visual content does not meet the respective set of criteria, the computer system does not initiate the process to enroll at least the respective portion of the biometric feature and/or does not perform at least the portion of the biometric enrollment process. Providing a respective prompt to perform at least a portion of the biometric enrollment process without the respective type of object being positioned over the respective portion of the biometric feature allows the computer system to provide visual feedback concerning the steps that need to be performed to complete the portion of the biometric enrollment process and improves security by informing the user concerning the steps are needed to perform the portion of the biometric enrollment process, which provides improved visual feedback and improves security.

In some embodiments, in response to (1604) capturing the respective content that corresponds to the biometric feature (e.g., 1260*a* and 1260*b*) and in accordance with a determination that the respective content does not meet the respective set of criteria (e.g., because the respective type of object is not positioned over the respective portion of the biometric feature), the computer system forgoes providing (1608) the respective prompt (e.g., 1534*i*, as further described above in relation to FIG. 15I). Not providing the respective prompt to perform at least the portion of the biometric enrollment process without the respective type of object being positioned over the respective portion of the biometric feature allows the computer system to provide visual feedback concerning the steps that need to be performed to complete the portion of the biometric enrollment process when needed and improves security by not informing the user concerning the steps are needed to perform the portion of the biometric enrollment process when these steps are not relevant, which provides improved visual feedback and improves security.

In some embodiments, in response to (1604) capturing the respective content that corresponds to the biometric feature (e.g., 1260*a* and 1260*b*) and in accordance with a determination that the respective content does not meet the respective set of criteria (e.g., because the respective type of object is not positioned over the respective portion of the biometric feature) (and/or, in some embodiments, in accordance with a determination that the respective content meets a set of content sufficiency criteria (e.g., the content corresponds to biometric feature data sufficient to complete the biometric enrollment process)), the computer system completes (1610) (and/or ending) the biometric enrollment process without performing at least the portion of the biometric enrollment process (e.g., as described above in relation to FIG. 15I). In some embodiments, as a part of completing the biometric enrollment process without performing at least the portion of the biometric enrollment process, the computer system completes the biometric enrollment process without performing an additional scan (e.g., at least the portion of the biometric enrollment process). In some embodiments, the computer system completes the biometric enrollment process without performing the additional scan (in response to capturing the respective content that corresponds to the biometric feature and in accordance with a determination that the respective content does not meet the respective set of criteria) because enrolling the biometric feature in conjunction with the object can be irrelevant to the user (e.g., because the user may not wear the object (e.g., glasses) and/or does not wear the object while performing biometric authentication). In some embodiments, the respective content the respective set of criteria when a determination is made that the respective prompt was previously displayed during the biometric enrollment process and/or that a respective type of object is (or was or has been) positioned over (and/or obstructs) the respective portion of the biometric feature (e.g., at a time (e.g., at any time) during the biometric enrollment process). Completing the biometric enrollment process without performing at least the portion of the biometric enrollment process when prescribed conditions are met allows the computer system to automatically not perform at least the portion of the biometric enrollment process in situations where performance at least the portion of the biometric enrollment process is not needed and improves security by limiting the performance of at least the portion of the biometric enrollment process in situations where performance of at least the portion of the biometric enrollment process is not needed, which performs an operation when a set of conditions has been met without requiring further user input and improves security.

In some embodiments, after displaying the respective prompt (e.g., 1534*i*), the computer system captures, via the one or more biometric sensors, second respective content that corresponds to the biometric feature (e.g., 1260*a* and 1260*b*) (e.g., face of the user). In some embodiments, in response to capturing the second respective content that corresponds to the biometric feature and in accordance with a determination that the second respective content does not meet the respective set of criteria, the computer system performs at least the portion of the biometric enrollment process (and/or completing the biometric enrollment process by performing at least the portion of the biometric enrollment process) (e.g., as described above in relation to FIGS. 15L-15N). In some embodiments, in response to capturing the second respective content that corresponds to the biometric feature and in accordance with a determination that the second respective content meets the respective set of criteria, the computer system forgoes performing at least the portion of the biometric enrollment process (e.g., as described above in relation to FIGS. 15I-15K). In some embodiments, the computer system does not perform at least the portion of the biometric enrollment process while displaying and/or re-displaying the respective prompt. Performing at least the portion of the biometric enrollment process or forgoing performing at least the portion of the biometric enrollment process when prescribed conditions are met provides improved security and allows the computer system to automatically limit the performance of at least the portion of the biometric enrollment process to situations where respective content meets the respective set of criteria, which performs an operation when a set of conditions has been met without requiring further user input and improves security.

In some embodiments, in response to capturing the second respective content that corresponds to the biometric feature (e.g., 1260*a* and 1260*b*) and in accordance with a determination that the second respective content meets the respective set of criteria, the computer system displays (e.g., re-displaying and/or continuing to display) the respective prompt (e.g., 1534*i* and as further described above in relation to FIGS. 15I-15N) (without, in some embodiments, performing at least the portion of the biometric enrollment process) (and, in some embodiments, forgoing performing at least the portion of the biometric enrollment process). In some embodiments, in response to capturing the second respective content that corresponds to the biometric feature and in accordance with a determination that the second respective content does not meet the respective set of criteria, the computer system does not display the respective prompt (e.g., and, in some embodiments, performs at least the portion of the biometric enrollment process). Displaying the respective prompt in response to capturing the second respective content that corresponds to the biometric feature and in accordance with a determination that the second respective content meets the respective set of criteria allows the computer system to automatically re-display the prompt when the user has not complied with the prompt without requiring additional user input and provides improved security by informing the user that the necessary steps have not been taken to perform at least the portion of the biometric enrollment, which performs an operation when a set of conditions has been met without requiring further user input and improves security.

In some embodiments, the biometric feature (e.g., 1260*a* and 1260*b*) was previously enrolled in conjunction with the data corresponding to the respective type of object (e.g., 1526*a*-1526*d*) positioned over the respective portion (e.g., 1260*a*) of the biometric feature via performing a first scan (e.g., capturing data corresponding to and/or mages of), via the one or more biometric sensors, of at least a second respective portion (e.g., the respective portion and/or a respective portion that is different from the respective portion) of the biometric feature (e.g., as described above in relation to FIGS. 15A-15H). In some embodiments, at least the portion of the biometric enrollment process includes (and, in some embodiments, is a process to) a performance of a second scan (e.g., capturing data corresponding to and/or images of), via the one or more biometric sensors, of the respective portion of the biometric feature (e.g., as described above in relation to FIGS. 15I and 15L-15N). In some embodiments, the first scan is performed (and/or completed) before the second scan. In some embodiments, the first scan is performed irrespective of whether capture content meters the respective set of criteria and/or irrespective of whether the respective type of object is positioned over the respective portion of the biometric feature. In some embodiments, the computer system outputs an indication that the first scan has been completed before the second scan is performed (and/or is initiated). In some embodiments, performing a scan (e.g., the first scan, the second scan, a third scan, etc.) includes capturing one or more biometric features using a biometric sensor and one or more techniques described above in relation to FIG. 7A. In some embodiments, the one or more biometric features are captured using a depth camera (e.g., an infrared camera), a thermographic camera, or a combination thereof. In some embodiments, the one or more biometric features are captured using visible light in the field-of-view of one or more cameras of the computer system. In some embodiments, the one or more biometric features are captured using an infrared camera (and, in some embodiments, in addition to visible light). In some embodiments, the one or more biometric features are captured using an infrared camera without use of an infrared projector (e.g., an infrared projector that is included in the computer system). Providing a respective prompt to perform at least a portion of the biometric enrollment process that includes a second scan without the respective type of object being positioned over the respective portion of the biometric feature allows the computer system to provide visual feedback concerning the steps that need to be performed to complete the portion of the biometric enrollment process and improves security by informing the user concerning the steps are needed to perform the portion of the biometric enrollment process, which provides improved visual feedback and improves security.

In some embodiments, performing the first scan of at least the second respective portion (e.g., 1260*a*) of the biometric feature (e.g., 1260*a* and 1260*b*) includes scanning the second respective portion (e.g., 1260*a*) of the biometric feature while the respective type of object (e.g., 1526*a*-1526*d*) is positioned over the respective portion of the biometric feature (e.g., as described above in relation to FIGS. 15A-15H). In some embodiments, the first scan is a part of the biometric enrollment process. In some embodiments, the first scan is a part of a separate biometric enrollment process that occurs before the biometric enrollment process (e.g., add glasses)).

In some embodiments, before performing the first scan (e.g., as described above in relation to FIGS. 15F-15H), the computer system performs a third scan (e.g., as described above in relation to FIGS. 15A-15D), via the one or more biometric sensors, of at least a third respective portion (e.g., 1260*a*) (e.g., a respective portion that includes the respective portion and/or the second respective portion and/or a respective portion that is bigger than the respective portion and/or the second respective portion) of the biometric feature. In some embodiments, the respective type of object (e.g., 1526*a*-1526*d*) is not positioned over the respective portion (e.g., 1260*a*) of the biometric feature while the third respective portion (e.g., 1260*a* and/or 1260*b*) of the biometric feature is scanned. In some embodiments, after performing the third scan (e.g., as described above in relation to FIGS. 15A-15D), the computer system enrolls the third respective portion of the biometric feature (e.g., with data that does not include (e.g., and/or does not correspond to) the respective type of object positioned over the respective portion of the biometric feature before the respective content was captured)).

In some embodiments, in response to capturing the respective content that corresponds to the biometric feature (e.g., 1260*a* and 1260*b*) and in accordance with a determination that the respective content meets the respective set of criteria and in accordance with a determination that the biometric enrollment process is a first type of biometric enrollment process (e.g., as described above in relation to FIGS. 15A-15P) (e.g., an initial biometric enrollment process (e.g., a biometric enrollment process that occurs during an initial (e.g., out of the box) set up (e.g., set up process) of the computer system), the biometric enrollment process includes performing a first number (e.g., three or more) of scans of one or more portions of the biometric feature. In some embodiments, in response to capturing the respective content that corresponds to the biometric feature (e.g., 1260*a* and 1260*b*) and in accordance with a determination that the respective content meets the respective set of criteria and in accordance with a determination that the biometric enrollment process is a second type of biometric enrollment process (e.g., as described above in relation to FIG. 15R)

(e.g., an upgrade biometric enrollment process (e.g., a biometric enrollment process that occurs after and/or during a software upgrade and, in some embodiment, not after a reinstall of an operating system and/or application), a biometric enrollment process that is not the first type of biometric enrollment process, and/or a biometric enrollment process that does not occur during the initial set up process of the computer system) that is different from the first type of biometric enrollment process, the biometric enrollment process includes performing a second number of scans (e.g., two or more) of the one or more portions (e.g., 1260*a* and 1260*b*) of the biometric feature. In some embodiments, the second number of scans is less than the first number of scans. Performing a different number of scans based on whether the biometric enrollment process is a first type of biometric enrollment process or a second type of biometric enrollment process allows the computer system to automatically control the number of scans that are attempted without requiring further user input and improves security by allowing the computer system to limit the number of scans performed based on the type of biometric enrollment process, which performs an operation when a set of conditions has been met without requiring further user input and improves security.

In some embodiments, during the biometric enrollment process (and after displaying the respective prompt), the computer system initiates a process to perform a first portion of the biometric enrollment process (e.g., as described above in relation to FIGS. 15H-15I) (e.g., at least the portion of the biometric enrollment process or a different portion of the biometric enrollment process). In some embodiments, after initiating the process to perform the first portion of the biometric enrollment process (and before the process to perform at least the portion of the biometric enrollment process has been completed), the computer system captures, via the one or more biometric sensors, third respective content that corresponds to the biometric feature. In some embodiments, in response to capturing the third respective content that corresponds to the biometric feature and in accordance with a determination that the third respective content meets the respective set of criteria, the computer system provides (e.g., 1534*i*), via the one or more output devices, a prompt (e.g., a visual, haptic, and/or audio prompt) to perform at least the first portion of the biometric enrollment process without the respective type of object (e.g., 1526*a*-1526*d*) being positioned over the respective portion (e.g., 1260*a*) of the biometric feature (and does not complete the process to perform the first portion of the biometric enrollment process (and/or, in some embodiments, the computer system pauses, terminates, delays, and/or stops the process to perform the first portion of the biometric enrollment process)). In some embodiments, the second respective prompt is different from (e.g., includes one or more different words and/or UI objects than are included in) the first respective prompt. In some embodiments, in response to capturing the third respective content that corresponds to the biometric feature and in accordance with a determination that the third respective content does not meet the respective set of criteria, the computer system does not provide the second respective prompt and/or continues complete the process to perform the first portion of the biometric enrollment process. Providing a prompt to perform at least the first portion of the biometric enrollment process without the respective type of object being positioned over the respective portion of the biometric feature allows the computer system to provide visual feedback concerning the steps that need to be performed to complete a portion of the biometric enrollment process and improves security by informing the user concerning the steps are needed to perform a portion of the biometric enrollment process, which provides improved visual feedback and improves security.

In some embodiments, during the biometric enrollment process (and after displaying the respective prompt), the computer system initiates a process to perform a second portion of the biometric enrollment process (e.g., as described above in relation to FIGS. 15H and 15J) (e.g., at least the portion of the biometric enrollment process or a different portion of the biometric enrollment process). In some embodiments, after initiating the process to perform the second portion of the biometric enrollment process (and before the process to perform at least the portion of the biometric enrollment process has been completed), the computer system captures, via the one or more biometric sensors, fourth respective content that corresponds to the biometric feature (e.g., 1260*a* and 1260*b*). In some embodiments, in response to capturing the fourth respective content that corresponds to the biometric feature and in accordance with a determination that the fourth respective content meets the respective set of criteria and that the respective object (e.g., 1536) is a first type of object (e.g., 1536), the computer system provides (e.g., displays and/or outputs), via the one or more output devices, a prompt (e.g., 1534*j*) (e.g., a visual, haptic, and/or audio prompt) indicating that the respective object is an unsupported object (e.g., that must be removed before the biometric enrollment process and/or the portion of the biometric enrollment process can be completed) (and does not complete the process to perform the second portion of the biometric enrollment process (and/or, in some embodiments, the computer system pauses, terminates, delays, and/or stops the process to perform the second portion of the biometric enrollment process)). In some embodiments, in response to capturing the third respective content that corresponds to the biometric feature and in accordance with a determination that the third respective content meets the respective set of criteria and that the respective object is a second type of object that is different from the first type of object, the computer system does not provide the prompt indicating that the respective object is an unsupported object and/or continues complete the process to perform the second portion of the biometric enrollment process. Providing a prompt indicating that the respective object is an unsupported object allows the computer system to provide visual feedback concerning the steps that need to be performed to complete a portion of the biometric enrollment process and improves security by informing the user concerning the steps are needed to perform a portion of the biometric enrollment process, which provides improved visual feedback and improves security.

In some embodiments, during the biometric enrollment process (and after displaying the respective prompt), the computer system initiates a process to perform a third portion of the biometric enrollment process (e.g., as described above in relation to FIGS. 15I and 15K) (e.g., at least the portion of the biometric enrollment process or a different portion of the biometric enrollment process). In some embodiments, after initiating the process to perform the third portion of the biometric enrollment process (and before the process to perform at least the portion of the biometric enrollment process has been completed), the computer system captures, via the one or more biometric sensors (e.g., 704), fifth respective content that corresponds to the biometric feature (e.g., 1260*a* and 1260*b*). In some embodiments, in response to capturing the fifth respective content that corresponds to the biometric feature and in accordance with a determination that, based on the fifth respective content, a second respective type of object (e.g., 1228) is positioned over a first portion (e.g., 1260*b*) (e.g., a mouth or a part of a finger) of the biometric feature that is different from the respective portion (e.g., 1260*a*) of the biometric feature, the computer system provides (e.g., displays and/or outputs), via the one or more output devices, a prompt (e.g., 1534*k*) (e.g., a visual, haptic, and/or audio prompt) indicating that the second respective object has to be removed from over the second portion of the biometric feature that is different from the respective portion of the biometric feature before the third portion of the biometric enrollment process can be performed (e.g., a prompt that is different from the respective prompt) (and/or, in some embodiments, the computer system pauses, terminates, delays, and/or stops the process to perform the third portion of the biometric enrollment process). In some embodiments, the second respective type of object is different from the respective type of object. In some embodiments, the second respective type of object is different from the first respective type of object. In some embodiments, the second respective type of object is a mask, a face covering, and/or a cloth and the first respective type of object is an eye mask, a pair of glasses and/or other forms of eye wear. In some embodiments, in response to capturing the fifth respective content that corresponds to the biometric feature and in accordance with a determination that, based on the fifth respective content, the second respective type of object is not positioned over the portion of the biometric feature that is different from the respective portion of the biometric feature, the computer system does not provide the prompt indicating that the second respective object has to be removed before the third portion of the biometric enrollment process can be performed. Providing a prompt indicating that the second respective object has to be removed from over the second portion of the biometric feature that is different from the respective portion of the biometric feature before the third portion of the biometric enrollment process can be performed allows the computer system to provide visual feedback concerning the steps that need to be performed to complete a portion of the biometric enrollment process and improves security by informing the user concerning the steps are needed to perform a portion of the biometric enrollment process, which provides improved visual feedback and improves security.

In some embodiments, during the biometric enrollment process (and after displaying the respective prompt), the computer system initiates a process to perform a fourth portion of the biometric enrollment process (e.g., as described above in relation to FIGS. 12M and 153-15K) (e.g., at least the portion of the biometric enrollment process or a different portion of the biometric enrollment process). In some embodiments, after initiating the process to perform the fourth portion of the biometric enrollment process (and before the process to perform at least the portion of the biometric enrollment process has been completed), the computer system captures, via the one or more biometric sensors, sixth respective content that corresponds to the biometric feature (e.g., as described above in relation to FIGS. 12M and 15J-15K). In some embodiments, in response to capturing the sixth respective content that corresponds to the biometric feature and in accordance with a determination that the sixth respective content does not include a portion of the biometric feature that matches (e.g., substantially matches (e.g., within 50-100% confidence) and/or is determined to match) at least a (e.g., trusted and/or saved data representing the) (e.g., a portion of the biometric feature and/or the biometric feature that was previously enrolled with data corresponding to the respective type of object positioned over the respective portion of the biometric feature before the respective content was captured) portion of the biometric feature that was previously enrolled (e.g., with data corresponding to the respective type of object positioned over the respective portion of the biometric feature before the respective content was captured) (e.g., as discussed above in relation to 1300, and/or 1400), the computer system provides (e.g., displays and/or outputs) (e.g., 1258*a*), via the one or more output devices, a prompt (e.g., a visual, haptic, and/or audio prompt) indicating that the portion of the biometric feature that matches the enrolled portion of the biometric feature must be detected (and/or captured) before the fourth portion of the biometric enrollment process can be performed (and/or, in some embodiments, the computer system pauses, terminates, delays, and/or stops the process to perform the fourth portion of the biometric enrollment process) (e.g., as described above in relation to FIGS. 12M and 15J-15K). In some embodiments, in response to capturing the fifth respective content that corresponds to the biometric feature and in accordance with a determination that the sixth respective content does not include the portion of the biometric feature that matches the enrolled portion of the biometric feature, the computer system does not provide the prompt indicating that the portion of the biometric feature that matches the enrolled portion of the biometric feature must be detected before the fourth portion of the biometric enrollment process can be performed. In some embodiments, the prompt indicating that the portion of the biometric feature that matches the enrolled portion of the biometric feature must be detected before the fourth portion of the biometric enrollment process can be performed is a prompt indicating that the biometric feature (e.g., face) of a user must match an enrolled biometric feature (e.g., face) for an enrolled user (e.g., enrolled user profile). Providing a prompt indicating that the portion of the biometric feature that matches the portion of the biometric feature that was previously enrolled must be detected before the fourth portion of the biometric enrollment process can be performed allows the computer system to provide visual feedback concerning the steps that need to be performed to complete a portion of the biometric enrollment process and improves security by informing the user concerning the steps are needed to perform a portion of the biometric enrollment process, which provides improved visual feedback and improves security.

In some embodiments, the respective set of criteria includes a criterion that is met when a determination is made that the computer system has received a request to be configured to perform a first secure operation (e.g., as described above in relation to method 1300, and/or 1400) based on capturing content that corresponds to the respective portion (e.g., one or more eyes) of the biometric feature irrespective of whether content that corresponds to a second portion (e.g., mouth) of the biometric feature (e.g., face) that is different from the respective portion of the biometric feature is also captured (e.g., as described in relation to tap gesture 1550*e*1 being detected) (e.g., as described above in relation to method 1300, and/or 1400). Providing a respective prompt to perform at least a portion of the biometric enrollment process without the respective type of object being positioned over the respective portion of the biometric feature when prescribed conditions are met allows the computer system to automatically provide the prompt in relevant situations without further user input and improves security by allowing the computer system the prompt in relevant situations, which performs an operation when a set of conditions has been met without requiring further user input and improves security.

In some embodiments, after displaying the respective prompt (e.g., 1534*i*), the computer system performs at least the portion of the biometric enrollment process (and/or completing the biometric enrollment process by performing at least the portion of the biometric enrollment process). In some embodiments, as a part of performing at least the portion of the biometric enrollment process, the computer system enrolls the biometric feature in conjunction with a first object (e.g., captured via the one or more biometric sensors) that is the respective type of object (e.g., as described above in relation to FIGS. 15I and 15L-N). In some embodiments, after (e.g., immediately after and/or in response to (e.g., without any intervening user input)) performing at least the portion of the biometric enrollment process, the computer system displays an option (e.g., 1540*b*) to enroll the biometric feature in conjunction with a second object that is the respective type of object and is different from the first object (e.g., a different set or pair of glasses). In some embodiments, the option to enroll the biometric feature in conjunction with the second object is displayed concurrently with a user interface object that, when selected, causes the computer system to continue the biometric enrollment process and/or cease to display the option to enroll the biometric feature in conjunction with the second object. In some embodiments, in response to detected selection (e.g., 1550*n*) of the option to enroll the biometric feature in conjunction with the second object, the computer system performs at least the portion of the biometric enrollment process (e.g., performs at least the portion of the biometric process an additional time and/or re-peats performance of at least the portion of the biometric process to enroll the biometric feature in conjunction with the second object). Displaying an option to enroll the biometric feature in conjunction with the second object that is different from the first object and is the respective type of object provides a user with visual feedback that the biometric feature in conjunction with a second object can optionally be enrolled and improves security by informing a user that the second object can be, optionally, enrolled so the user can properly manage the biometric enrollment of objects, which provides improved visual feedback and improves security.

In some embodiments, during the biometric enrollment process (and after displaying the respective prompt), the computer system initiates a process to perform a fifth portion of the biometric enrollment process (e.g., at least the portion of the biometric enrollment process or a different portion of the biometric enrollment process) (e.g., as described above in relation to FIG. 15R). In some embodiments, after initiating the process to perform the fifth portion of the biometric enrollment process (and before the process to perform at least the portion of the biometric enrollment process has been completed), the computer system captures, via the one or more biometric sensors, seventh respective content that corresponds to a biometric feature for a first respective user (e.g., as described above in relation to FIG. 15R). In some embodiments, in response to capturing the seventh respective content that corresponds to the biometric feature for the first respective user and in accordance with a determination that the seventh respective content does not include a portion of the biometric feature for the first respective user that matches a portion of the biometric feature (e.g., face for an appearance profile) that is currently being enrolled (e.g., and/or that is partially enrolled) for a respective profile (e.g., an appearance profile (e.g., primary appearance profile and/or secondary appearance profile (e.g., as described above in relation to method 1300, and/or 1400))) corresponding to (e.g., belong to and/or designated as belonging to) the first respective user (e.g., 1260) (e.g., that one or more scans have captured data corresponding to the portion of the biometric feature that has been partially enrolled), the computer system provides (e.g., displays and/or outputs), via the one or more output devices, a prompt (e.g., a visual, haptic, and/or audio prompt) indicating that the portion of the biometric feature that matches the portion of the biometric feature that has been partially enrolled for the respective profile corresponding to the first respective user must be detected (and/or captured) before the fifth portion of the biometric enrollment process can be performed (e.g., as described above in relation to FIG. 15R) (e.g., irrespective of whether the seventh respective content includes a portion of the biometric feature for the first respective user that matches a portion of the biometric feature for a profile for the first user that is different from the respective profile). In some embodiments, in response to capturing the seventh respective content that corresponds to the biometric feature and in accordance with a determination that the seventh respective content does not include a portion of the biometric feature for the first respective user that matches a portion of the biometric feature that has been partially enrolled for a respective profile corresponding to the first respective user, the computer system does not perform the fifth portion of the biometric enrollment process. In some embodiments, in response to capturing the seventh respective content that corresponds to the biometric feature and in accordance with a determination that the seventh respective content does include a portion of the biometric feature for the first respective user that matches a portion of the biometric feature that has been partially enrolled for a respective profile corresponding to the first respective user, the computer system does not provide the prompt indicating that the portion of the biometric feature that matches the portion of the biometric feature that has been partially enrolled for the respective profile corresponding to the first respective user must be detected, and/or the computer system performs the fifth portion of the biometric enrollment process. Providing a prompt indicating that the portion of the biometric feature that matches the portion of the biometric feature that has been partially enrolled for the respective profile corresponding to the first respective user must be detected before the fifth portion of the biometric enrollment process can be performed allows the computer system to provide visual feedback concerning the steps that need to be performed to complete a portion of the biometric enrollment process and improves security by informing the user concerning the steps are needed to perform a portion of the biometric enrollment process, which provides improved visual feedback and improves security.

In some embodiments, after displaying the respective prompt (e.g., 1534*i*), the computer system performs at least the portion of the biometric enrollment process (and/or completing the biometric enrollment process by performing at least the portion of the biometric enrollment process) (e.g., as described above in relation to FIGS. 15P-15S). In some embodiments, as a part of performing at least the portion of the biometric enrollment process, the computer system, in accordance with a determination that eighth respective content includes a portion of the biometric feature that matches an enrolled portion of the biometric feature for a second respective user (e.g., 1260) (e.g., as described above in relation to FIGS. 15P-15S); in accordance with a determination that the eighth respective content corresponds to (e.g., includes content that matches an appearance (e.g., particular type and/or pattern of makeup and/or one or more particular modifications that are made to the biometric feature)) a first appearance profile (and not a second profile) for the second respective user, enrolls the biometric feature in conjunction with a third object (e.g., that is the respective type of object) for use with the first appearance profile, such that the third object can be worn by the second respective user while the second user is providing biometric authentication data that corresponds to the first appearance profile (e.g., and not the second appearance profile) to perform a second secure operation (e.g., providing biometric authentication process while wearing a mask, as discussed in relation to methods 1300 and/or 1400) (e.g., as described above in relation to FIGS. 15P-15S); and in accordance with a determination that the eighth respective content corresponds to a second appearance profile (and not the first appearance profile) for the second respective user that is different from the first appearance profile, enrolls the biometric feature in conjunction with the third object for use with the second appearance profile, such that the third object can be worn by the second respective user while the second user is providing biometric authentication data that corresponds to the second appearance profile (e.g., and not the first profile) to perform the second secure operation (e.g., providing biometric authentication process while wearing a mask, as discussed in relation to methods 1300 and/or 1400) (e.g., as described above in relation to FIGS. 15P-15S). Choosing whether to enroll the biometric feature in conjunction with the third object for use with the first appearance profile and/or the second appearance profile when prescribed conditions are met allows the computer system to automatically determine which appearance profile to enroll the biometric feature in conjunction with the third object without requiring additional input, which performs an operation when a set of conditions has been met without requiring further user input.

In some embodiments, the biometric enrollment process is initiated during an initial setup process for the computer system (e.g., a set up process that occurs when the computer system is taken out of the box and/or a set up process that occurs after the computer system has been reset to factory settings and/or conditions) (e.g., as described above in relation to FIGS. 15A and 15R). In some embodiments, the biometric enrollment process is initiated during a software upgrade process for the computer system (e.g., as described above in relation to FIG. 15R) (e.g., a set up process that does not occur when the computer system is taken out of the box and/or a set up process that does not occur after the computer system has been reset to factory settings) (e.g., a set up process that occurs when the software (e.g., operating system) of the computer system is updated (e.g., a periodic software upgrade). In some embodiments, during the software upgrade process, the computer system displays prompt to initiate a biometric enrollment process that includes capturing biometric data corresponding to the second portion of the biometric feature for use in biometric authentication while the first portion of the biometric feature is not available to be captured by the biometric sensor (e.g., as described above in relation to methods 1300 and/or 1400). In some embodiments, the software upgrade process includes (and/or adds) the ability to the biometric feature in conjunction with one or more objects (e.g., glasses). In some embodiments, the computer system uses fewer scans to enable performance a secure operation based on a second portion of the biometric feature while a first portion of the biometric feature is not available to be captured by the biometric sensor (e.g., as described above in relation to methods 1300 and/or 1400) when the biometric enrollment process is initiated during a software upgrade process for the computer system than when the biometric enrollment process is initiated during an initial setup process for the computer system.

In some embodiments, before initiating the biometric enrollment process (and before capturing, via the one or more biometric sensors, respective content that corresponds to the biometric feature), the computer system displays a settings user interface that includes a first respective option (e.g., 1270*y*, 1270*z*) to manage (e.g., enable and/or disable) performing a third secure operation based on a second portion (e.g., 1260*a*) of the biometric feature while a first portion (e.g., 1260*b*) of the biometric feature is not available to be captured by the one or more biometric sensors (e.g., as described above in relation to methods 1300 and/or 1400). In some embodiments, while displaying the setting user interface that includes the first respective option, the computer system detects an input (e.g., via a tap input and, in some embodiments, via a non-tap input (e.g., a mouse click, a swipe input, a press-and-hold input, and/or a multi-tap input)) that corresponds to selection of the first respective option. In some embodiments, in response to detecting the input that corresponds to selection of the first respective option, the computer system initiates the biometric enrollment process (e.g., as described above in relation to FIGS. 12A-12AA and FIG. 15Q). In some embodiments, in accordance with a determination that the computer system (e.g., 700) is configured to perform the third secure operation based on the second portion (e.g., 1260*a*) of the biometric feature while the first portion (e.g., 1260*b*) of the biometric feature is not available to be captured by the one or more biometric sensors, the setting user interface includes a first option (e.g., 1520*y* and 1520*z*) to enroll the biometric feature in conjunction with the respective type of object, such that the respective type of object can be worn while providing biometric authentication to perform the third secure operation based on the second portion of the biometric feature while the first portion of the biometric feature is not available to be captured by the one or more biometric sensors. In some embodiments, while displaying the first option to enroll the biometric feature in conjunction with the respective type of object, the computer system detects an input (e.g., 1550*q*) (e.g., via a tap input and, in some embodiments, via a non-tap input (e.g., a mouse click, a swipe input, a press-and-hold input, and/or a multi-tap input)) that corresponds to selection of the first option to enroll the biometric feature in conjunction with the respective type of object. In some embodiments, in response to detecting the input that corresponds to selection of the first option to enroll the biometric feature in conjunction with the respective type of object, the computer system initiates a biometric enrollment process to enroll the biometric feature in conjunction with a fourth object that is the respective type of object (and ceasing to display the settings user interface) (e.g., as described above in relation FIGS. 15Q-15S). In some embodiments, in accordance with a determination that the computer system is not configured to perform the secure operation based on the second portion of the biometric feature while the first portion of the biometric feature is not available to be captured by the one or more biometric sensors, the setting user interface does not include an option to enroll the biometric feature in conjunction with the respective type of object. Displaying the first option to enroll the biometric feature in conjunction with the respective type of object provides a user with visual feedback that a second object can optionally be enrolled and improves security by informing a user that the second object can be, optionally, enrolled so the user can properly manage the biometric enrollment of objects, which provides improved visual feedback and improves security.

In some embodiments, after completing the biometric enrollment process to enroll the biometric feature in conjunction with the fourth object that is the respective type of object and after enrolling the biometric feature in conjunction with the fourth object (e.g., such that the fourth object can be worn while providing biometric authentication to perform the secure operation based on the second portion of the biometric feature while the first portion of the biometric feature is not available to be captured by the one or more biometric sensors), the computer system displays the settings user interface. In some embodiments, the settings user interface includes a second option (e.g., 1540_a_, 1520_y_, and 1520_z_) to enroll the biometric feature in conjunction with the respective type of object (e.g., 1526_a_-1526_d_) (e.g., as described above in relation to FIGS. 15Q and 15S) (e.g., such that the respective type of object can be worn while providing biometric authentication to perform the secure operation based on the second portion of the biometric feature while the first portion of the biometric feature is not available to be captured by the one or more biometric sensors). In some embodiments, in response to detecting the input that corresponds to selection of the second option to enroll the biometric feature in conjunction with the respective type of object, the computer system initiates a biometric enrollment process to enroll the biometric feature in conjunction with a fifth object (e.g., that is different from the fourth object) that is the respective type of object. In some embodiments, the second option to enroll the biometric feature in conjunction with is not displayed in the settings user interface prior to enrolling the biometric feature in conjunction with the fourth object. Displaying a second option to enroll the biometric feature in conjunction with the respective type of object provides a user with visual feedback that the biometric feature in conjunction with second object can optionally be enrolled and improves security by informing a user that the biometric feature in conjunction with the second object can be, optionally, enrolled so the user can properly manage the biometric enrollment of objects in conjunction with the biometric feature, which provides improved visual feedback and improves security.

In some embodiments, in accordance with a determination that a maximum number of objects (e.g., 2-10) of the respective type of object are currently enrolled (e.g., for a respective user and/or for a respective appearance profile) (e.g., such each object can be worn while providing biometric authentication to perform the secure operation based on the second portion of the biometric feature while the first portion of the biometric feature is not available to be captured by the one or more biometric sensors) in conjunction with the biometric feature, the first option (e.g., 1520_y_ and 1520_z_) (or second option) is displayed as being in an active state (e.g., enabled) (e.g., not grey-out, not-crossed out and/or faded, and/or not de-emphasized). In some embodiments, in accordance with a determination that a maximum number of objects of the respective type of object are not currently enrolled in conjunction with the biometric feature, the first option (or second option) is displayed as being in an inactive state (e.g., as described above in relation to FIGS. 15Q and 15S) (e.g., the inactive state is different from the active state) (e.g., grey-out, crossed out and/or faded, and/or de-emphasized). In some embodiments, in accordance with a determination that a maximum number of objects of the respective type of object are not currently enrolled in conjunction with the biometric feature, the first option is not displayed. In some embodiments, in response to detecting an input that corresponds to selection of the first option while the first option is in the inactive state, the computer system does not perform an operation that corresponds to the first option. In some embodiments, a number of concurrently enrolled types of objects in conjunction with the biometric feature are displayed on the settings user interface. Choosing whether to display the option to enroll the biometric feature in conjunction with the respective type of object as being in an active and/or inactive based on prescribed conditions provides a user with visual feedback that another object can or cannot be optionally be enrolled in conjunction with the biometric feature and improves security by informing a user that the second object can be, optionally, enrolled in conjunction with the biometric feature so the user can properly manage the biometric enrollment of objects, which provides improved visual feedback and improves security.

In some embodiments, a determination of whether or not the maximum number of objects of the respective type of object (e.g., 1526_a_-1526_d_) are currently enrolled in conjunction with the biometric feature (e.g., 1260_a_ and 1260_b_) is made based adding a total number of objects of the respective type of object that are enrolled in conjunction with the biometric feature for use with a third appearance profile for a third respective user with a total number of objects of the respective type that are enrolled for a fourth appearance profile (e.g., that is different from the first appearance profile) for the third respective user (e.g., as described above in relation to FIGS. 15Q and 15S). Choosing whether to display the option to enroll the biometric feature in conjunction with the respective type of object as being in an active and/or inactive based on prescribed conditions (e.g., a determination of whether or not the maximum number of objects of the respective type of object are currently enrolled in conjunction with the biometric feature is made based adding a total number of objects of the respective type that are enrolled in conjunction with the biometric feature for user with a third appearance profile for a third respective user with a total number of objects of the respective type that are enrolled for a fourth appearance profile for the third respective user) with visual feedback that another object can or cannot be optionally be enrolled in conjunction with the biometric feature and improves security by informing a user that the second object can be, optionally, enrolled in conjunction with the biometric feature so the user can properly manage the biometric enrollment of objects in conjunction with the biometric feature, which provides improved visual feedback and improves security.

In some embodiments, the first option (e.g., 1520_y_ and 1520_z_) to enroll the biometric feature in conjunction with the respective type of object is an option to enroll the biometric feature in conjunction with the respective type of object to be used with a plurality of appearance profiles (e.g., for a user) (e.g., in some embodiments, the plurality of appearance profiles includes all the appearance profiles for one or more users) (e.g., types of objects can be used for the two or more appearances). In some embodiments, the first option to enroll the biometric feature in conjunction with the respective type of object is displayed with a third option to enroll the biometric feature in conjunction with the respective type of object, where the first option manages enrolling the biometric feature in conjunction with the respective type of object to be used with an enrolled profile for a first user and/or for a first set of appearance profiles and the second option manages enrolling the biometric feature in conjunction with the respective type of object to be used with an enrolled profile for a second user and/or for a second set of appearance profiles. Displaying a first option to enroll the biometric feature in conjunction with the respective type of object that is an option to enroll the biometric feature in conjunction with the respective type of object to be used with a plurality of appearance profiles provides a user with visual feedback that a second object can optionally be enrolled in conjunction with the biometric feature and improves security by informing a user that the second object are, optionally, enrolled in conjunction with the biometric feature so the user can properly manage the biometric enrollment of objects, which provides improved visual feedback and improves security.

In some embodiments, the settings user interface includes a second respective option (e.g., 1270$y$, 1270$z$) to manage (e.g., enable and/or disable) performing the third secure operation based on the second portion (e.g., 1260$a$) of the biometric feature while the first portion (e.g., 1260$b$) of the biometric feature is not available to be captured by the one or more biometric sensors (e.g., as described above in relation to methods 1300 and/or 1400) (e.g., as described above in relation to FIGS. 15S-15U). In some embodiments, in response to detecting the input (e.g., 1550$u$1 and 1550$u$2) that corresponds to selection of the second respective option and in accordance with a determination that the computer system was configured, before the input that corresponds to selection of the second respective option was detected, to perform the third secure operation based on the second portion of the biometric feature while the first portion is not available to be captured by the one or more biometric sensors (and/or in accordance with a determination that the input was detected while the second respective option was displayed in an active state), the computer system disables use of enrollment data corresponding to performance of the third secure operation based on the second portion of the biometric feature while the first portion is not available to be captured by the one or more biometric sensors e.g., as described above in relation to FIGS. 15S-15U). In some embodiments, in accordance with a determination that the computer system was configured, before the input that corresponds to selection of the second respective option was detected, to perform the secure operation based on the second portion of the biometric feature while the first portion is not available to be captured by the one or more biometric sensors, the computer system configures the computer system to not perform the secure operation based on the second portion of the biometric feature while the first portion is not available to be captured by the one or more biometric sensors. In some embodiments, in response to detecting the input (e.g., 1550$u$1 and 1550$u$2) that corresponds to selection of the second respective option and in accordance with a determination that the computer system was not configured, before the input that corresponds to selection of the second respective option was detected, to perform the third secure operation based on the second portion of the biometric feature while the first portion is not available to be captured by the one or more biometric sensors (and/or in accordance with a determination that the input was detected while the second respective option was displayed in an inactive state), the computer system enables use of the enrollment data corresponding to performance of the third secure operation based on the second portion of the biometric feature while the first portion is not available to be captured by the one or more biometric sensors (e.g., as described above in relation to FIGS. 15S-15U). In some embodiments, in accordance with a determination that the computer system was not configured, before the input that corresponds to selection of the second respective option was detected, to perform the secure operation based on the second portion of the biometric feature while the first portion is not available to be captured by the one or more biometric sensors, the computer system configures the computer system to perform the secure operation based on the second portion of the biometric feature while the first portion is not available to be captured by the one or more biometric sensors. Disabling or enabling use of the enrollment data corresponding to performance of the third secure operation when prescribed conditions are met gives the computer system the ability to preserve enrollment data based on selection of the second respective option and improves security by automatically using or not preserved enrollment data in certain situations, which performs an operation when a set of conditions has been met without requiring further user input and improves security.

In some embodiments, the settings user interface includes a third respective option (e.g., 1270$y$, 1270$z$) to manage (e.g., enable and/or disable) performing the third secure operation for a first respective profile based on the second portion (e.g., 1260$a$) of the biometric feature while the first portion (e.g., 1260$b$) of the biometric feature is not available to be captured by the one or more biometric sensors (e.g., as described above in relation to methods 1300 and/or 1400). In some embodiments, in response to detecting the input (e.g., 1550$s$) corresponding to selection of the third respective option, the computer system configures the computer system to perform the third secure operation for the first respective appearance profile based on the second portion of the biometric feature while the first portion of the biometric feature is not available to be captured by the one or more biometric sensors without configuring the computer system (or while the computer system is not configured) to perform the third secure operation for a second respective appearance profile, different from the first respective appearance profile, based on the second portion of the biometric feature while the first portion of the biometric feature is not available to be captured by the one or more biometric sensors e.g., as described above in relation to FIGS. 15S-15T). Configuring the computer system to perform the third secure operation for the first respective appearance profile based on the second portion of the biometric feature while the first portion of the biometric feature is not available to be captured by the one or more biometric sensors without configuring the computer system to perform the third secure operation for a second respective appearance profile, different from the first respective appearance profile, based on the second portion of the biometric feature while the first portion of the biometric feature is not available to be captured by the one or more biometric sensors gives the user control over the configuration of the computer system and improves security by allowing a user to control the configuration of the computer system, which provides additional control options without cluttering the user interface and improves security.

In some embodiments, the settings user interface includes a fourth respective option (e.g., 1270$y$ and 1270$z$) to manage performing a fourth secure operation based on a second portion of a second biometric feature while a first portion of the second biometric feature is not available to be captured by the one or more biometric sensors. In some embodiments, while displaying the fourth respective option (and while the computer system is to perform the secure operation based on the second portion of the biometric feature while the first portion of the biometric feature is not available to be captured by the one or more biometric sensors (e.g., for a third appearance profile)) (e.g., as described above in relation to methods 1300 and/or 1400), the computer system detects an input corresponding to selection of the fourth respective option (e.g., as described above in relation to FIGS. 12A-12AA and 15S-15U). In some embodiments, in response to detecting the input corresponding to selection of the fourth respective option, the computer system initiates the biometric enrollment process to enroll biometric data corresponding to the second biometric feature (and to configure the computer system to perform the secure operation based on a second portion of a second biometric feature while a first portion of the second biometric feature is not available to be captured by the one or more biometric sensors) (e.g., as described above in relation to methods 1300 and/or 1400) (e.g., as described above in relation to FIGS. 12A-12AA and 15S-15U). In some embodiments, the biometric feature corresponds to a third appearance profile and the second biometric feature corresponds to a fourth appearance profile that is different from the third appearance profile. Initiating the biometric enrollment process to enroll biometric data corresponding to the second biometric feature in response to detecting the input corresponding to selection of the fourth respective option gives the user control over the configuration of the computer system and improves security by allowing a user to control the configuration of the computer system, which provides additional control options without cluttering the user interface and improves security.

In some embodiments, capturing the respective content that corresponds to the biometric feature occurs at least in response to detecting an input (e.g., at the beginning and/or near the beginning of the biometric enrollment process) corresponding to selection (e.g., 1550*e*1) of an option to enable the computer system to perform a fifth secure operation based on a fourth portion of the biometric feature while a third portion of the biometric feature is not available to be captured by the one or more biometric sensor (e.g., as described above in relation to methods 1300 and/or 1400) (e.g., and/or an option to perform at least a portion of the biometric enrollment process without the respective type of object being positioned over the respective portion of the biometric feature) (e.g., as described above in relation to FIG. 15E).

In some embodiments, during the biometric enrollment process (e.g., after displaying the respective prompt and/or after performing one or more steps in at least the portion of the biometric enrollment process without the respective type of object being positioned over the respective portion of the biometric feature), the computer system captures, via the one or more biometric sensors, ninth respective content that corresponds to the biometric feature (e.g., as described above in relation to FIG. 15J). In some embodiments, in response to capturing the ninth respective content and in accordance with a determination that an option to enable the computer system to perform a sixth secure operation based on a sixth portion of the biometric feature while a fifth portion of the biometric feature is not available to be captured by the one or more biometric sensor was previously selected (e.g., as described above in relation to methods 1300 and/or 1400) and the attention of the user is not directed towards the computer system, the computer system forgoes continuing to perform the biometric enrollment process (e.g., as described above in relation to FIG. 15J). In some embodiments, in response to capturing the ninth respective content and in accordance with a determination that an option to enable the computer system to perform the sixth secure operation based on a sixth portion of the biometric feature while a fifth portion of the biometric feature is not available to be captured by the one or more biometric sensor was previously selected and the attention of the user is directed towards the computer system, the computer system continues to perform the biometric enrollment process. In some embodiments, attention of the user is not required (e.g., does not have to be directed to the computer system) to enroll the biometric feature (e.g., the full biometric feature, such as the full face of the user) (e.g., to enroll the biometric feature while the user is not wearing a mask) (e.g., as described above in relation to methods 1300 and/or 1400) that was previously enrolled. Forgoing continuing to perform the biometric enrollment process when prescribed conditions are met allows the computer system to stop the biometric enrollment process in situations that can be less secure, which provides improved security.

In some embodiments the respective prompt uses different words based on whether or not an alternate appearance is enrolled and/or based one whether there are multiple appearance enrolled. In some embodiments, when a single appearance (e.g., primary appearance) is enrolled for a biometric profile, the respective prompt includes the words, "the appearance." In some embodiments, when multiple appearances (e.g., primary and alternate appearance) are enrolled for a biometric profile, the respective prompt includes the words, "an appearance."

Note that details of the processes described above with respect to method 1600 (e.g., FIG. 16) are also applicable in an analogous manner to the other methods described herein. For example, methods 800, 900, 1000, 1100, 1300, 1400, and 1800 optionally includes one or more of the characteristics of the various methods described above with reference to method 1600. For example, the methods 800, 900, 1000, and 1100 can be combined with methods 1300, 1400, 1600, and 1800 such that, when a biometric authentication process is unsuccessful using the techniques (e.g., biometric enrollment using a portion of biometric feature) described by methods 1300, 1400, 1600, and 1800, the techniques described by methods 800, 900, 1000, and 1100 can be used to unlock the computer system with the assistance of an external device (or vice-versa). For brevity, these details are not repeated below.

FIGS. 17A-17R illustrate exemplary user interfaces managing the availability of different types of biometric authentication at a computer system in accordance with some embodiments. The user interfaces in these figures are used to illustrate the processes described below, including the processes in FIGS. 18A-18C.

FIGS. 17A-17R illustrate exemplary scenarios where a respective user is attempting to perform a secure operation (e.g., unlock computer system 700) by providing a type of biometric authentication (e.g., as discussed above in relation to FIGS. 12A-12AA). Table 1780 is provided to aid in the discussion of FIGS. 17A-17R. Table 1780 indicates the current number of unsuccessful authentication attempts (e.g., a number of biometric authentication attempts that have failed) since the last successful authentication attempt (e.g., column 1 of Table 1780) and whether authentication is available for a particular type of biometric authentication (e.g., whether the computer system is configured to (and/or can) use a particular type of biometric authentication to perform the secure operation) (e.g., column 2 of Table 1780). For example, Table 1780 of FIG. 17A indicates that biometric authentication that requires a full portion (e.g., more than a partial portion) of the biometric feature (e.g., face of the user) be authenticated ("Full Face Authentication", "full face authentication", and/or "full face authentication") (e.g., the biometric authentication described above in relation to FIGS. 12R-12S) has been unsuccessfully attempted once since the last successful authentication (e.g., "1" in row 1, column 1 of Table 1780) and the full face authentication is available (e.g., "Yes" in row 1, column 2 of Table 1780). In addition, Table 1780 of FIG. 17A also indicates that biometric authentication that requires a partial portion (e.g., less than the full portion) of the biometric feature authenticated ("Partial Face Authentication", "partial face authentication", and/or "partial biometric authentication") (e.g., the biometric authentication described above in relation to FIGS. 12T-12U and 12Z-12AA) has not been attempted since the last successful authentication (e.g., "0" in row 2, column 1 of Table 1780) and the partial face authentication is available (e.g., "Yes" in row 2, column 2 of Table 1780). Additionally. Table 1780 includes the total number of unsuccessful authentication attempts (e.g., full face authentication and partial face authentication in FIGS. 17A-17R) available since the last successful authentication, which is one in Table 1780 of FIG. 17A (e.g., "1" in row 3, column 1). As further described below in relation to FIGS. 17H-17I, the total number of unsuccessful authentication attempts represented in Table 1780 (e.g., in row 3, column 1) does not necessarily indicate every unsuccessful authentication attempt that has occurred since the last successful authentication attempt. Rather, the total number of unsuccessful authentication attempts represented in Table 1780 indicates the total number of unsuccessful authentication attempts that the computer system has registered to determine whether one or more particular types of biometric authentication techniques should be available (e.g., as described further below in relation to FIGS. 17H-17I).

Although the description of FIGS. 17A-17R uses types of biometric authentication that include the term "face," it should be understood that biometric authentication techniques that rely on other biometric features, such as one or more eyes, one or more hands, and/or one or more fingerprints of the user, could be used in lieu of or in addition to the face authentication techniques (e.g., as described above in relation to FIGS. 12A-12AA and FIGS. 13A-13B) used in the description of FIGS. 17A-17R. In addition, it should be understood that an enrolled biometric feature (e.g., face of the user) and/or one or more enrolled portions of the enrolled biometric feature could be enrolled using one or more techniques, as described above in relation to FIGS. 12A-12AA, FIGS. 13A-13B, FIGS. 15A-15U, and FIG. 16. Moreover, in FIGS. 17A-17R, each of type of biometric technique in Table 1780 (e.g., full face authentication and partial face authentication) are currently enabled, such that authentication via the biometric authentication technique can be provided to perform the secure operation. As used in reference to FIGS. 17A-17R, when a respective biometric authentication technique is referred to as being "enabled," a user has given permission via a setting (e.g., using one or more techniques as described above in relation to 770*g*, 1270*y*, and 1270*z*) for the respective biometric authentication technique to be used to perform a secure operation. However, when a respective biometric authentication referred to as being "available" with respect to FIGS. 17A-17R, the computer system has determined that the respective biometric technique can be used to perform the secure operation based on respective criteria In some embodiments, the respective criteria includes a criterion that is satisfied when a threshold number of unsuccessful biometric authentication attempt have not occurred since the last successful authentication attempt (e.g., as further described below in FIGS. 17A-17M) and/or a criterion that is satisfied when a threshold period of time has not passed since the last successful biometric authentication attempt of a particular type (e.g., a successful full face authentication and/or a successful non-biometric authentication attempt, such as password entry) (e.g., as further described below in FIGS. 17N-17R). In some embodiments, a last successful authentication attempt can be a successful biometric authentication attempt and/or a successful non-biometric authentication attempt. In some embodiments, the last successful authentication attempt is the last successful attempt that was used to perform the secure operation that would be performed as a result of a current biometric attempt being successful. In some embodiments, the last successful authentication attempt is the last successful attempt that was used to perform a set of secure operations, including one or more secure operations that are different from the secure operation that would be performed as a result of a current biometric attempt being successful.

FIGS. 17A-17M illustrate exemplary scenarios where the computer system either performs or does not perform the secure operation based on whether a biometric authentication attempt is successful and whether one or more threshold numbers of biometric authentication attempts have failed since the last successful biometric authentication attempt. For ease of discussion, FIGS. 17A-17M references two different thresholds, a full biometric authentication threshold (or full face authentication threshold) and a partial biometric authentication threshold (or partial face authentication threshold). As discussed below, when it is determined that the full biometric authentication threshold number of unsuccessful biometric attempts have occurred since the last successful biometric attempt, the computer system is not configured to perform the secure operation after a full face authentication attempt (e.g., irrespective of whether full face authentication was successful or not) and/or full face authentication is unavailable. Likewise, when it is determined that the partial biometric authentication threshold number of unsuccessful biometric attempts have occurred since the last successful biometric attempt, the computer system is not configured to perform the secure operation after a partial face authentication attempt (e.g., irrespective of whether partial face authentication was successful or not) and/or partial face authentication is unavailable. As described herein, the full biometric authentication threshold can be reached based on a combination (e.g., tracked by the total number of current successful biometric attempts in row 3, column 1 of Table 1780 of FIG. 17A) of the number of unsuccessful full face authentication attempts (e.g., tracked by row 1, column 1 of Table 1780 of FIG. 17A) and the number of unsuccessful partial face authentication attempts (e.g., tracked by row 2, column 1 of Table 1780 of FIG. 17A) while the partial biometric authentication threshold can only be reached based on the number of unsuccessful partial authentication attempts. For ease of discussion and for exemplary purposes only, in FIGS. 17A-17M, the full biometric authentication threshold is five and the partial biometric authentication is three. However, in some embodiments, the full biometric authentication threshold is a different number than five (e.g., 1-50) and the partial biometric authentication threshold is a different number than three (e.g., 1-50). In some embodiments, the full face authentication threshold is not reached based on the number of unsuccessful partial face authentication attempts (e.g., tracked by row 2, column 1 of Table 1780 of FIG. 17A). In some embodiments, the partial biometric authentication threshold can be reached based on a combination of the number of unsuccessful full face authentication attempts and the number of unsuccessful partial face authentication attempts. In some embodiments, the computer system utilizes one respective threshold (or less thresholds), such that the full face authentication and the partial face authentication become unavailable after the respective threshold is reached. In some embodiments, the computer system uses more than two thresholds and/or thresholds for other types of authentication (e.g., using similar techniques described below in relation to FIGS. 17A-17M). In some embodiments, the computer system monitors different thresholds for different appearance profiles (e.g., as described above in relation to FIGS. 12A-12AA). In some embodiments, there is a respective full biometric authentication threshold and a respective partial biometric authentication threshold for each respective appearance profile (e.g., primary appearance and/or secondary appearance) that has been enrolled. In some embodiments, the respective full biometric authentication threshold is higher than the partial biometric authentication threshold because the partial biometric authentication technique is less secure than the full biometric authentication technique. Thus, in some embodiments, computer system 700 allows the user to fail to authenticate using the more secure biometric technique more times than computer system 700 allows the user to fail to authenticate using the less secure technique.

As illustrated in FIG. 17A, user 1260 is wearing mask 1228 and sunglasses 1536 while holding computer system 700. As illustrated in FIG. 17A, computer system 700 includes display 710. Computer system 700 also includes one or more inputs devices (e.g., touch screen of display 710, hardware button 702, and a microphone), a wireless communication radio, and one or more biometric sensors (e.g., biometric sensor 704, touch screen of display 710) (e.g., as described above in relation to FIG. 7A). As illustrated in FIG. 17A, user 1260 is holding computer system 700 in a position, where user 1260 can see content displayed on display 710 and biometric sensor 704 can detect the face of user 1260 (e.g., which is shown by zone of detection indication 1284). In particular, the face of user 1260 includes upper portion 1260*a* and bottom portion 1260*b*. Upper portion 1260*a* includes the eyes and eyebrows of the user 1260, which are covered by sunglasses 1536 in FIG. 17A. Bottom portion 1260*b* includes the mouth of user 1260, which is covered by mask 1228 in FIG. 17A. At FIG. 17A, computer system 700 detects upward swipe gesture 1750*a* on user interface object 716 and determines that a request to perform a secure operation (e.g., a request to initiate biometric authentication) has been received because an unlock gesture (e.g., upward swipe gesture 1750*a*) has been detected (e.g., using one or more similar techniques as described above in relation to upward swipe gesture 750*b*). In some embodiments, computer system 700 determines that a request to perform a secure operation has been received using one or more other techniques as described above in relation to FIG. 7B.

At FIG. 17A, in response to detecting upward swipe gesture 1750*a* and determining that the request to perform a secure operation has been received, computer system 700 initiates biometric authentication (e.g., using one or more similar techniques as described above in relation to FIGS. 7A-7H, FIGS. 12R-12W, and FIGS. 12Z-12AA). After initiating biometric authentication, a determination is made that user 1260 is attempting to authenticate using partial face authentication. After the determination is made that user 1260 is attempting to authenticate using partial face authentication, a determination is made that partial face authentication is available to be used to complete the biometric authentication process (e.g., as shown by the "Yes" in row 2, column 2) and a determination is made that the attempt to authenticate using partial face authentication is unsuccessful. Here, the determination is made that partial face authentication is available to be used to complete the biometric authentication process because the current number of unsuccessful partial face authentication attempts (e.g., "0" in row 2, column 1 of Table 1780) that have occurred since the last successful authentication attempt is less than the partial biometric authentication threshold (e.g., "3"). In addition, the determination is made that the attempt to authenticate using partial authentication is unsuccessful because a determination is made that user 1260 is wearing an unsupported object (e.g., sunglasses 1536, as further described above in relation to FIG. 16J) over at least a subset of upper portion 1260*a*. In some embodiments, the determination is made that the attempt to authenticate using partial authentication is unsuccessful because user 1260 is wearing an object that has not been enrolled (e.g., is not an object that was enrolled in FIGS. 15A-15U). In some embodiments, the determination is made that the attempt to authenticate using partial authentication is unsuccessful because computer system 700 cannot detect the attention of user 1260 (e.g., eyes of user 1260 looking towards biometric sensor 704) (e.g., because the tint of sunglasses 1536 is obstructing the eyes of user 1260 from biometric sensor 704). In some embodiments, the determination is made that user 1260 is attempting to authenticate using partial face authentication because mask 1228 is being worn by user 1260 over bottom portion 1260*b*. In some embodiments, the determination that the attempt to authenticate using partial face authentication is unsuccessful is not made until the determination is made that the current number of unsuccessful partial face authentication attempts that have occurred since the last successful authentication attempt is less than the partial biometric authentication threshold. In some embodiments, the determination the determination that the attempt to authenticate using partial face authentication is unsuccessful is not made when a determination is made that the current number of unsuccessful partial face authentication attempts that have occurred since the last successful authentication attempt is greater than (or equal to) the partial biometric authentication threshold.

As illustrated in FIG. 17B, in response to determining that the attempt to authenticate using partial face authentication is unsuccessful and determining that user 1260 is wearing an unsupported object, computer system 700 displays (e.g., optionally displays) shake output indicator 718 (or makes lock indicator 712*a* appear that it is shaking) and provides (e.g., optionally provides) a haptic output to indicate that authentication has been unsuccessful. As illustrated in FIG. 17A-17B, computer system 700 continues to display lock indicator 712*a*, which indicates that the secure operation (e.g., unlocking the computer system) has not been performed in response to detecting upward swipe gesture 1750*a*. Moreover, as illustrated in FIG. 17B, Table 1780 has been updated to show that one partial face authentication attempt was unsuccessful (e.g., "1" in row 2, column 1 of Table 1780) since the last successful authentication occurred. Table 1780 also has been updated to show that a total of two unsuccessful face authentication attempts have been tracked by computer system 700 to have occurred since the last successful authentication attempt (e.g., "2" in row 1, column 3 of Table 1780) (e.g., a combination of the current number of full face authentication attempts (e.g., "1" in row 1, column 1 of Table 1780) and the current number of partial face authentication attempts (e.g., "1" in row 2, column 1 of Table 1780).

As illustrated in FIG. 17C, after displaying shake output indication 718 and providing the haptic output to indicate that authentication has been unsuccessful, computer system 700 displays visual prompt 1714*a*. As illustrated in FIG. 17C, visual prompt 1714*a* is adjacent to makes lock indicator 712*a*. Visual prompt 1714*a* (e.g., "Take Off Sunglasses To Unlock") indicates that the user has to remove sunglasses 1536 before authentication via partial face authentication can be performed and computer system 700 can be unlocked. In some embodiments, computer system 700 does not display visual prompt 1714*a* in an area that is adjacent to lock indicator 712*a*. In some embodiments, visual prompt 1714*a* is displayed as a notification that is positioned along a side (e.g., top, bottom, right, and/or left side) of computer system 700. In some embodiments, shake output indication 718 and/or a haptic output is not provided before computer system 700 displays visual prompt 1714*a*.

As illustrated in FIG. 17D, user 1260 is wearing glasses 1726 instead of sunglasses 1536 while holding computer system 700 and wearing mask 1228. Notably, the biometric feature is not currently enrolled in conjunction with glasses 1726 (e.g., glasses 1726 were not captured and enrolled in conjunction with the biometric feature in FIGS. 15A-15U). At FIG. 17D, computer system 700 detects upward swipe gesture 1750*d* on user interface object 716 and determines that a request to perform a secure operation (e.g., a request to initiate biometric authentication) has been received, using one or more similar techniques as described above in relation to upward swipe gesture 1750*a*. At FIG. 17D, in response to detecting upward swipe gesture 1750*d* and determining that the request to perform a secure operation has been received, computer system 700 initiates biometric authentication (e.g., using one or more similar techniques as described above in relation to FIGS. 7A-7H, FIGS. 12R-12W, and FIGS. 12Z-12AA). After initiating biometric authentication, a determination is made that user 1260 is attempting to authenticate using partial face authentication, using one or more techniques as described above in relation to FIG. 17A. After the determination is made that user 1260 is attempting to authenticate using partial face authentication, a determination is made that partial face authentication is available to be used to complete the biometric authentication process (e.g., as shown by the "Yes" in row 2, column 2) and a determination is made that the attempt to authenticate using partial face authentication is unsuccessful. Here, the determination is made that partial face authentication is available to be used to complete the biometric authentication process because the current number of unsuccessful partial face authentication attempts (e.g., "1" in row 2, column 1 of Table 1780) that have occurred since the last successful authentication attempt is less than the partial biometric authentication threshold (e.g., "3"). In addition, the determination is made that the attempt to authenticate using partial face authentication is unsuccessful because the biometric feature is not currently enrolled in conjunction with glasses 1726. In some embodiments, a determination is made that the biometric feature is not currently enrolled in conjunction with glasses 1726 because computer system 700 detects that data representing glasses 1726 has not been captured and/or detects that the shape that glasses 1726 that occupies the space on the face of user 1260 does not currently match an enrolled portion the face of user 1260 that includes the shape (e.g., a voided and/or obstructed area of upper portion 1260*a*) that matches the shape occupied by glasses 1726.

As illustrated in FIG. 17E, in response to determining that the attempt to authenticate using partial face authentication is unsuccessful, computer system 700 displays (e.g., optionally displays) shake output indicator 718 (or makes lock indicator 712*a* appear that it is shaking) and provides (e.g., optionally provides) a haptic output to indicate that authentication has been unsuccessful. Moreover, as illustrated in FIG. 17E, Table 1780 has been updated to show that two partial face authentication attempts were unsuccessful (e.g., "2" in row 2, column 1 of Table 1780) since the last successful authentication occurred. Table 1780 also has been updated to show that a total of three unsuccessful face authentication attempts have been tracked by computer system 700 to have occurred since the last successful authentication attempt (e.g., "3" in row 1, column 3 of Table 1780) (e.g., a combination of the current number of full face authentication attempts (e.g., "I" in row 1, column 1 of Table 1780) and the current number of partial face authentication attempts (e.g., "2" in row 2, column 1 of Table 1780)).

As illustrated in FIG. 17F, after displaying shake output indication 718 and providing the haptic output to indicate that authentication has been unsuccessful, computer system 700 does display a visual prompt. However, in some embodiments, computer system 700 displays a visual prompt that indicates that the user has to remove glasses 1726 before authentication via partial face authentication can be performed and computer system 700 can be unlocked.

As illustrated in FIG. 17F, user 1260 is wearing glasses 1526*b* instead of glasses 1726 while holding computer system 700 and wearing mask 1228 over bottom portion 1260*b*. Notably, the biometric feature are currently enrolled in conjunction with glasses 1526*b* (e.g., the biometric feature was enrolled in conjunction with glasses 1526*b* in relation to FIGS. 15O-15P). At FIG. 17F, computer system 700 detects upward swipe gesture 1750*f* on user interface object 716 and determines that a request to perform a secure operation (e.g., a request to initiate biometric authentication) has been received, using one or more similar techniques as described above in relation to upward swipe gesture 1750*a*. At FIG. 17F, in response to detecting upward swipe gesture 1750*f* and determining that the request to perform a secure operation has been received, computer system 700 initiates biometric authentication (e.g., using one or more similar techniques as described above in relation to FIGS. 7A-7H, FIGS. 12R-12W, and FIGS. 12Z-12AA). After initiating biometric authentication, a determination is made that user 1260 is attempting to authenticate using partial face authentication, using one or more techniques as described above in relation to FIG. 17A. After the determination is made that user 1260 is attempting to authenticate using partial face authentication, a determination is made that partial face authentication is available to be used to complete the biometric authentication process (e.g., as shown by the "Yes" in row 2, column 2) and a determination is made that the attempt to authenticate using partial face authentication is unsuccessful. Here, the determination is made that partial face authentication is available to be used to complete the biometric authentication process because the current number of unsuccessful partial face authentication attempts (e.g., "2" in row 2, column 1 of Table 1780) that have occurred since the last successful authentication attempt is less than the partial biometric authentication threshold (e.g., "3"). In some embodiments, the determination is made that the attempt to authenticate using partial face authentication is unsuccessful because the computer system 700 has not captured the relevant portions (e.g., upper portion 1260*a*) and/or has not captured the relevant portions of the face of user 1260 that matches an enrolled portion of the face of user 1260 (e.g., that includes glasses 1526*b*). In some embodiments, if computer system 700 had captured the relevant portions (e.g., upper portion 1260*a*) and/or had captured the relevant portions of the face of user 1260 that matches an enrolled portion of the face of user 1260 at FIG. 17F, a determination could have been made that the attempt to authenticate using partial face authentication is successful (e.g., given that the biometric feature is currently enrolled in conjunction with glasses 1526*b*). In some embodiments, computer system 700 displays a shake output indication and/or provides haptic output to indicate that authentication has been unsuccessful (e.g., after making the determination that the attempt to authenticate using partial face authentication is unsuccessful and before displaying the user interface of FIG. 17G).

As illustrated in FIG. 17G, in response to determining that the attempt to authenticate using partial face authentication was unsuccessful, computer system 700 displays visual prompt 1714*b*, which indicates that the user must take off mask 1228 (e.g., and/or use full face authentication) or provide a passcode to perform the secure operation (e.g., "Take Off Mask Or Use Passcode To Unlock"). Here, computer system 700 displays visual prompt 1714*b* because a determination is made that partial face authentication is no longer available to be used to perform the secure operation. Thus, the user cannot use partial face authentication (e.g., provide authentication while wearing mask 1228) to perform the secure operation and must use the full face authentication or the passcode to perform the secure operation (and/or another type of authentication that is not the partial face authentication). At FIG. 17G, the determination is made that partial face authentication is no longer available to be used to perform the secure operation because the threshold number of partial face authentication attempts (e.g., "3") have occurred since the last successful authentication attempt, as shown by the current number of unsuccessful partial face authentication attempts being updated to "3" in row 2, column 1 of Table 1780 in FIG. 17G. To show that partial face authentication is no longer available to be used to perform the secure operation and/or for authentication purposes, Table 1780 has been updated to show "No" in row 2, column 2 of Table 1780 in FIG. 17G instead of "Yes," which was shown in row 2, column 2 of Table 1780 in FIG. 17F.

At FIG. 17H, computer system 700 detects upward swipe gesture 1750*h* on user interface object 716 and determines that a request to perform a secure operation (e.g., a request to initiate biometric authentication) has been received, using one or more similar techniques as described above in relation to upward swipe gesture 1750*a*. At FIG. 17H, in response to detecting upward swipe gesture 1750*h* and determining that the request to perform a secure operation has been received, computer system 700 initiates biometric authentication (e.g., using one or more similar techniques as described above in relation to FIGS. 7A-7H, FIGS. 12R-12W, and FIGS. 12Z-12AA). After initiating biometric authentication, a determination is made that user 1260 is attempting to authenticate using partial face authentication, using one or more techniques as described above in relation to FIG. 17A. After the determination is made that user 1260 is attempting to authenticate using partial face authentication, a determination is made that partial face authentication is not available to be used to complete the biometric authentication process (e.g., as shown by the "No" in row 2, column 2). In some embodiments, computer system 700 does not make a determination of whether the attempt to authenticate using partial face authentication is successful because the determination is made that partial face authentication is not available to be used to complete the biometric authentication process. In some embodiments, computer system 700 makes a determination of whether the attempt to authenticate using partial face authentication is successful, irrespective of the determination that partial face authentication is not available to be used to complete the biometric authentication process.

At FIG. 17I, in response to determine that partial face authentication is not available to be used to complete the biometric authentication process, computer system 700 does not perform the secure operation and re-displays visual prompt 1714*b*, which indicates that the user must take off mask 1228 (e.g., and/or use full face authentication) or provide a passcode to perform the secure operation (e.g., "Take Off Mask Or Use Passcode To Unlock"). Notably, at FIG. 17I, the number of partial face authentication attempts (e.g., "3" in row 2, column 1 of FIGS. 17H-17I) and the total number of face authentication attempts (e.g., "4" in row 2, column 1 of FIGS. 17H-17I) are not updated because computer system 700 does not consider partial face authentication attempts that occur after a determination has been made that partial face authentication is not available to be used to complete the biometric authentication process. Thus, the partial authentication attempt described in response to detecting upward swipe gesture 1750*h* is not consider in the total number of face authentication attempts that have occurred since the last successful authentication attempt, which is notable because the total number of face authentication attempts impact whether or not full face authentication is determined to be available (e.g., as described below in relation to FIGS. 17J-17K). Thus, in some embodiments, partial face authentication attempts that occur after a determination has been made that partial face authentication is not available to be used to complete the biometric authentication process (and/or after partial face authentication is no longer available to be used to complete the biometric authentication process) do not have an impact on whether or not full face authentication is determined to be available.

As illustrated in FIG. 17J, user 1762 is not wearing a mask (or glasses) while holding computer system 700. At FIG. 17J, computer system 700 detects upward swipe gesture 1750*j* on user interface object 716 and determines that a request to perform a secure operation (e.g., a request to initiate biometric authentication) has been received, using one or more similar techniques as described above in relation to upward swipe gesture 1750*a*. At FIG. 17J, in response to detecting upward swipe gesture 1750*j* and determining that the request to perform a secure operation has been received, computer system 700 initiates biometric authentication (e.g., using one or more similar techniques as described above in relation to FIGS. 7A-7H, FIGS. 12R-12W, and FIGS. 12Z-12AA). After initiating biometric authentication, a determination is made that user 1762 is attempting to authenticate using full face authentication because user 1762 is not wearing a mask, using one or more techniques as described above in relation to FIGS. 12R-12W, and FIGS. 12Z-12AA. After the determination is made that user 1762 is attempting to authenticate using full face authentication, a determination is made that full face authentication is available to be used to complete the biometric authentication process (e.g., as shown by the "Yes" in row 1, column 2). Here, the determination is made that full face authentication is available to be used to complete the biometric authentication because the total number of face authentication attempts (e.g., "4") is less than the full face authentication threshold (e.g., "5"). As stated above, the full biometric authentication threshold can be reached based on a combination (e.g., "4" in row 3, column 1 of Table 1780 of FIG. 17J) of the number of unsuccessful full face authentication attempts (e.g., "I" in row 1, column 1 of Table 1780 of FIG. 17J) and the number of unsuccessful partial face authentication attempts (e.g., "3" in row 2, column 1 of Table 1780 of FIG. 17J). At FIG. 17J, after the determination is made that full face authentication is available to be used to complete the biometric authentication, a determination is made that full face authentication attempt is unsuccessful because the face of user 1762 does not match an enrolled biometric profile (e.g., for user 1260 of FIG. 17J) for similar reasons as described above in relation to FIGS. 12R-12W and FIGS. 12Z-12AA. In some embodiments, the determination that full face authentication attempt is unsuccessful is made before the determination is made that full face authentication is available to be used to complete the biometric authentication.

At FIG. 17K, in response to determining that the full face authentication attempt was unsuccessful, computer system 700 does not perform the secure operation (e.g., is not unlocked), as indicated by lock indicator 712*a* being displayed in FIG. 17K. Looking at FIGS. 17J-17K, after determining that the full face authentication attempt was unsuccessful, a determination is made that full face authentication is no longer available to be used to complete the biometric authentication process. Here, the determination is made that full face authentication is no longer available to be used to complete biometric authentication because the total number of face authentication attempts (e.g., "5" in row 3, column 1 of Table 1780 of FIG. 17K) is not less than the full face authentication threshold (e.g., "5"). In other words, the unsuccessful full face authentication attempt that occurred in response to detecting upward swipe input 1750*j* caused the current total number of face authentication attempts to meet the full face authentication threshold, which caused the full face authentication to no longer be available to be used to complete the biometric authentication process. As illustrated in FIG. 17K, because the determination is made that full face authentication is no longer available to be used to complete the biometric authentication, computer system 700 displays a passcode entry user interface that includes passcode input affordance 732 (e.g., using one or more similar techniques as described above in relation to FIG. 7I). At FIG. 17K, computer system 700 displays the passcode entry user interface because computer system 700 cannot be unlocked using full face authentication or partial face authentication. Thus, computer system 700 prompts the user to enter a passcode and/or perform a non-biometric authentication process because too many unsuccessful face authentication attempts have occurred since the last successful biometric authentication attempt. At FIG. 17K, computer system 700 detects tap gesture 1750*k* on one of passcode input affordances 732.

At FIG. 17L, in response to detecting tap gesture 1750*k* and one or more other gestures, computer system 700 successfully authenticates the passcode entered via tap gesture 1750*k* (and one or more other gestures) and performs the secure operation (e.g., is unlocked), as indicated by a home screen user interface being displayed. As illustrated in FIG. 17L, in response to detecting tap gesture 1750*k* and one or more other gestures, computer system 700 can optionally display notification 1704, which indicates that the user can enroll a new pair of glasses (e.g., "Would You Like To Enroll A New Pair Of Glasses"). At FIG. 17L, notification 1704 is displayed because computer system 700 determined that an unsuccessful partial face authentication attempt was made while a user was wearing a pair of glasses that were not previously enrolled (e.g., an unsuccessful partial face authentication attempt that occurred before the successful authentication of FIGS. 17K-17L occurred). Here, the unsuccessful partial face authentication attempt was made while the user was wearing glasses 1726 in FIGS. 17D-17E. At FIG. 17L, in some embodiments, computer system 700 detects tap gesture 1750*l* on notification 1704. In some embodiments, in response to detecting tap gesture 1750*l*, computer system 700 displays a settings user interface that includes an add glasses options (e.g., as described above in relation to FIG. 15Q). In some embodiments, in response to detecting tap gesture 1750*l*, computer system 700 displays the user interface of FIG. 15N and/or the user interface of FIG. 15O. In some embodiments, in response to detecting tap gesture 1750*l*, computer system 700, automatically initiates (e.g., without intervening user input) the scanning processes (e.g., as described above in relation to FIG. 15O) to enroll a new pair of glasses. In some embodiments, notification 1704 is only displayed when the biometric feature has not been enrolled in conjunction with more than the threshold number of glasses for a biometric profile (e.g., for one or more reasons as not displaying an add glasses option as described above in relation to FIG. 15R). In some embodiments, notification 1704 is only displayed when the biometric feature has not been enrolled in conjunction with any glasses for a biometric profile. In some embodiments, notification 1704 is only displayed when the new pair of glasses was detected during at least a threshold number of failed biometric attempts (e.g., two or more).

At FIG. 17M, in response to detecting tap gesture 1750*k* and one or more other gestures, computer system 700 successfully authenticates the passcode entered via tap gesture 1750*k* (and one or more other gestures) and performs the secure operation (e.g., is unlocked), as indicated by a home screen user interface being displayed. As illustrated in FIG. 17M, in response to detecting tap gesture 1750*k* and one or more other gestures, computer system 700 can optionally display notification 1706, which indicates that the user can turn off an attention setting for full face authentication (e.g., "Turn Off Attention Setting For Full Face Authentication"). Here, notification 1706 is displayed because computer system 700 detected that a user attempted to authenticate while the attention of the user could not be detected (e.g., while the user was wearing sunglasses 1536 in FIGS. 17A-17C and as described above in relation to FIGS. 17A-17C). In some embodiments, in response to detecting tap gesture 1750*k*, computer system 700 displays one or more settings that include an attention setting and/or is automatically configured (e.g., without intervening user input) to not require a user's attention (e.g., as described above) when authenticating via full face authentication. Notably, in some embodiments, computer system 700 cannot be configured to require a user's attention when authenticating via partial face authentication because attention of the user is required to authenticate via partial face authentication (e.g., while attention of the user is not required to authenticate via full face authentication).

In FIGS. 17L-17M, Table 1780 is updated to show that zero full face authentication attempts and zero partial face authentication attempts have occurred since the last successful authentication due to the authentication via passcode entered via tap gesture 1750*k* (and one or more other gestures) being the last successful authentication attempt. In addition, Table 1780 is also updated to show that full face authentication and partial face authentication are both available to be used to perform the secure operation. Thus, in some embodiments, computer system 700 is automatically configured to perform the secure operation via full face authentication and partial face authentication in response to a successful authentication attempt. In some embodiments, computer system 700 has to be manually reconfigured to perform the secure operation via full face authentication and partial face authentication after a successful authentication attempt. In some embodiments, while partial authentication is not available to be used to complete the biometric authentication process, a determination is made that a current face authentication attempt is successful. In some embodiments, while partial face authentication is not available to be used to complete the biometric authentication process and in response to determining that the current full authentication attempt is successful, the availability of the partial face authentication is changed, such that partial face authentication is available to be used to complete the biometric authentication process to perform a secure operation.

FIGS. 17N-17R illustrate exemplary scenarios where the computer system either performs or does not perform the secure operation based on whether a partial biometric authentication attempt is successful and whether the last successful non-biometric and/or full face authentication attempt occurred within a threshold period of time of the partial biometric authentication attempt. For ease of discussion, the threshold period of time for the discussion of FIGS. 17N-17R will be six hours. However, the threshold period of time could be another period of time (e.g., 30 minutes-48 hours).

At FIG. 17N, user 1260 is wearing glasses 1526*b* while holding computer system 700 and wearing mask 1228. Notably, the biometric feature was enrolled in conjunction with glasses 1526*b* (e.g., using one or more techniques described above in relation to FIGS. 15O-15P). At FIG. 17N, computer system 700 detects upward swipe gesture 1750*n* on user interface object 716 and determines that a request to perform a secure operation (e.g., a request to initiate biometric authentication) has been received, using one or more similar techniques as described above in relation to upward swipe gesture 1750*a*. At FIG. 17N, in response to detecting upward swipe gesture 1750*n* and determining that the request to perform a secure operation has been received, computer system 700 initiates biometric authentication (e.g., using one or more similar techniques as described above in relation to FIGS. 7A-7H, FIGS. 12R-12W, and FIGS. 12Z-12AA). After initiating biometric authentication, a determination is made that user 1260 is attempting to authenticate using partial face authentication, using one or more techniques as described above in relation to FIG. 17A. After the determination is made that user 1260 is attempting to authenticate using partial face authentication, a determination is made that partial face authentication is available to be used to complete the biometric authentication process (e.g., as shown by the "Yes" in row 2, column 2) and a determination is made that the attempt to authenticate using partial face authentication is successful (e.g., due to the biometric feature being previously enrolled in conjunction with glasses 1526*b*). Here, the determination is made that partial face authentication is available to be used to complete the biometric authentication process for two reasons: (1) because the current number of unsuccessful partial face authentication attempts (e.g., "0" in row 2, column 1 of Table 1780) that have occurred since the last successful authentication attempt is less than the partial biometric authentication threshold (e.g., "3") and (2) because less than the threshold period of time (e.g., 6 hours) has passed since the last successful non-biometric and/or full face authentication attempt occurred (e.g., one hour and one minute has passed when comparing 11:10 on the user interface of FIG. 17N to 10:09 on any one of the user interfaces of FIGS. 17J-17M). As illustrated in FIG. 17O, in response to determining that partial face authentication is available to be used to complete the biometric authentication process and determining that the attempt to authenticate using partial face authentication is successful, computer system 700 performs the secure operation (e.g., unlocks and displays the home screen user interface of FIG. 17O).

At FIG. 17P, user 1260 is wearing glasses 1526*b* while holding computer system 700 and wearing mask 1228. At FIG. 17P, in response to detecting upward swipe gesture 1750*p* and determining that the request to perform a secure operation has been received, computer system 700 initiates biometric authentication (e.g., using one or more similar techniques as described above in relation to FIGS. 7A-7H, FIGS. 12R-12W, and FIGS. 12Z-12AA). After the determination is made that user 1260 is attempting to authenticate using partial face authentication, a determination is made that partial face authentication is not available to be used to complete the biometric authentication process (e.g., as shown by the "No" in row 2, column 2) because the threshold period of time (e.g., 6 hours) has passed since the last successful non-biometric and/or full face authentication attempt occurred (e.g., approximately 9 hours have passed when comparing 7:00 on the user interface of FIG. 17P to 10:09 on any one of the user interfaces of FIGS. 17J-17M). As illustrated in FIG. 17P, in response to determining that partial face authentication is not available to be used to complete the biometric authentication process, computer system 700 does not perform the secure operation (e.g., does not unlock and/or display the home screen user interface of FIG. 17O). In some embodiments, computer system 700 allows the user to authenticate using partial face authentication any number of times (e.g., an unlimited number) as long as the threshold period of time has not passed since the last successful non-biometric and/or full face authentication attempt occurred and as long as the current amount of unsuccessful partial biometric authentication attempts since the last success attempt is less than the partial face authentication threshold. In some embodiments, computer system 700 does not allow the user to authenticate via the partial face authentication after the threshold amount of time since the last successful non-biometric and/or full face authentication attempt to improve security of the computer system 700 (e.g., requiring that the user use a more secure authentication technique within a certain time period before a less secure authentication technique can be used).

As illustrated in FIG. 17Q, user 1260 is wearing sunglasses 1536 while holding computer system 700 without wearing a mask. At FIG. 17Q, computer system 700 detects upward swipe gesture 1750*q* on user interface object 716 and determines that a request to perform a secure operation (e.g., a request to initiate biometric authentication) has been received, using one or more similar techniques as described above in relation to upward swipe gesture 1750*a*. At FIG. 17Q, in response to detecting upward swipe gesture 1750*q* and determining that the request to perform a secure operation has been received, computer system 700 initiates biometric authentication (e.g., using one or more similar techniques as described above in relation to FIGS. 7A-7H, FIGS. 12R-12W, and FIGS. 12Z-12AA). After initiating biometric authentication, a determination is made that user 1260 is attempting to authenticate using full face authentication because user 1260 is not wearing a mask, using one or more techniques as described above in relation to FIGS. 12R-12W, and FIGS. 12Z-12AA. After the determination is made that user 1260 is attempting to authenticate using full face authentication, a determination is made that full face authentication is available to be used to complete the biometric authentication process (e.g., as shown by the "Yes" in row 1, column 2) (e.g., using similar techniques as described above in relation to FIG. 17J). At FIG. 17Q, after the determination is made that full face authentication is available to be used to complete the biometric authentication, a determination is made that the full face authentication attempt is successful even though user 1260 is wearing sunglasses 1536 and computer system 700 is not able to detect the attention of the user. This is because computer system 700 has been configured not require detection of the attention of the user while performing the full face authentication (e.g., as further described in relation to FIG. 17M). At FIG. 17R, in response to determining that the full face authentication attempt is successful, computer system 700 performs the secure operation (e.g., unlocks and displays the home screen user interface of FIG. 17R). Notably, full face authentication is available in FIGS. 17Q-17R because the availability of full face authentication is not based on the threshold amount of time (e.g., 6 hours) unlike partial face authentication. In some embodiments, the ability of full face authentication is based on a respective threshold amount of time (e.g., 24 hours) that is longer than the threshold amount of time that impacts the availability of partial face authentication.

FIGS. 18A-18C are a flow diagram illustrating a method for managing the availability of different types of biometric authentication at a computer system in accordance with some embodiments. Method 1800 is performed at a computer system (e.g., 100, 300, 500, and/or 700) (e.g., a smartphone, a tablet computer) that is in communication with one or more biometric sensors (e.g., 704) (e.g., a fingerprint sensor and/or a facial recognition sensor (e.g., one or more depth sensors; one or more cameras (e.g., dual cameras, triple camera, and/or quad cameras)) on the same side or different sides of the computer system (e.g., a front camera and/or a back camera)), and/or an iris scanner) (e.g., is hidden or concealed. In some embodiments, the computer system is in communication with one or more output devices (e.g., a display generation component (e.g., a display controller and/or a touch-sensitive display system) and/or an audio speaker). Some operations in method 1800 are, optionally, combined, the orders of some operations are, optionally, changed, and some operations are, optionally, omitted.

As described below, method 1800 provides an intuitive way for managing the availability of different types of biometric authentication at a computer system. The method reduces the cognitive burden on a user for managing the availability of different types of biometric authentication at a computer system, thereby creating a more efficient human-machine interface. For battery-operated computing devices, enabling a user to manage the availability of different types of biometric authentication at a computer system faster and more efficiently conserves power and increases the time between battery charges.

The computer system receiving (1802) (e.g., via one or more input devices) a request (e.g., 1750*a*, 1750*d*, 1750*f*, 1750*h*, 1750*j*, 1750*n*, 1750*p*, or 1750*q*) to perform the secure operation that requires user authentication (e.g., a request for the computer system to perform the secure operation) (e.g., as described above in relation to methods 1300 and/or 1400).

The computer system, in response to (1804) receiving the request (e.g., 1750*a*. 1750*d*, 1750*f*, 1750*h*, 1750*j*, 1750*n*, 1750*p*, or 1750*q*) to perform the secure operation and after capturing, via the one or more biometric sensors (e.g., 704), first biometric data (e.g., 1260*a* and 1260*b*) and in accordance with a determination that the first biometric data does not match an enrolled (e.g., authorized) biometric feature that is a type (e.g., a face, a hand, a thumb, and/or a finger) of biometric feature that has a first portion (e.g., 1260*a*) and a second portion (e.g., 1260*b*) (e.g., does not match at least a portion of the enrolled biometric feature), forgoes performance (1806) of the secure operation (e.g., as described in relation to FIGS. 17F-17G) (and, optionally increasing a count of a number of failed biometric authentication attempts) (e.g., as described above in relation to methods 1300 and/or 1400). In some embodiments, in accordance with a determination that the first biometric data matches the enrolled biometric feature, the computer system performs the secure operation.

The computer system, in response to (1804) receiving the request (e.g., 1750*a*, 1750*d*, 1750*f*, 1750*h*, 1750*j*, 1750*n*, 1750*p*, or 1750*q*) to perform the secure operation and after capturing, via the one or more biometric sensors (e.g., 704), first biometric data (e.g., 1260*a* and 1260*b*) and in accordance with a determination that the first biometric data includes a second portion (e.g., 1260*a*) of a respective type of biometric feature without including a first portion (e.g., 1260*b*) of the respective type of biometric feature (e.g., as described above in relation to methods 1300 and/or 1400), fewer than a first threshold number of failed biometric authentication attempts including the second portion of the respective type of biometric feature without including the first portion of the respective type of biometric feature have occurred (e.g., row 2, column 1 of Table 1780) since the last successful user authentication (e.g., a successful non-biometric user authentication (e.g., passcode entry and/or authentication based on an external accessory device (e.g., as described above in relation to method 1000)) and/or a successful biometric user authentication (e.g., authenticating with biometric data (e.g., as described above in relation to methods 1300 and/or 1400) was detected, and the second portion of the respective type of biometric feature in the first biometric data matches an enrolled biometric feature (an enrolled biometric feature of a set of enrolled biometric features), performs (1808) the secure operation (e.g., as described in relation to FIGS. 17N-170).

The computer system in response to (1804) receiving the request (e.g., 1750*a*, 1750*d*, 1750*f*, 1750*h*, 1750*j*, 1750*n*, 1750*p*, or 1750*q*) to perform the secure operation and after capturing, via the one or more biometric sensors (e.g., 704), first biometric data (e.g., 1260*a* and 1260*b*) and in accordance with a determination that the first biometric data includes the second portion of the respective type of biometric feature without including the first portion of the respective type of biometric feature (e.g., as described above in relation to methods 1300 and/or 1400) and at least the first threshold number of failed biometric authentication attempts including the second portion of the respective type of biometric feature without including the first portion of the respective type of biometric feature have occurred (e.g., row 2, column 1 of Table 1780) since the last successful user authentication was detected, forgoes performance (1810) of the secure operation (e.g., without regard to whether or not the first portion of the respective type of biometric feature in the first biometric data matches an enrolled and/or authorized biometric feature) (e.g., as described above in relation to FIGS. 17A-17I). In some embodiments, in accordance with a determination that the first biometric data includes a second portion of a respective type of biometric feature without including a first portion of the respective type of biometric feature, more than the first threshold number of failed biometric authentication attempts (or at least the first threshold number of failed attempts) including the second portion of the respective type of biometric feature without including the first portion of the respective type of biometric feature have occurred since the last successful user authentication was detected, and the second portion of the respective type of biometric feature in the first biometric data matches an authorized biometric feature, the computer system does not perform the secure operation and/or forgoes performance of the secure operation. In some embodiments, a determination of whether the second portion of the respective type of biometric feature in the first biometric data matches an authorized biometric feature is not made after it is determined that less than the first threshold number of failed biometric authentication attempts have occurred since the last successful user authentication was detected.

In some embodiments, in accordance with a determination that the first biometric data includes the first portion of the respective type of biometric feature and the second portion of the respective type of biometric feature (e.g., as described above in relation to methods 1300 and/or 1400), less than a second threshold number of failed biometric authentication attempts including the respective type of biometric feature have occurred (e.g., row 3, column 1 of Table 1780) since the last successful user authentication was detected, wherein the second threshold number is higher than the first threshold number, and the first biometric data matches the enrolled biometric feature, the computer system performs (1812) the secure operation (e.g., as described above in relation to FIGS. 17Q-17R). In some embodiments, in accordance with a determination that the first biometric data includes the first portion of the respective type of biometric feature and the second portion of the respective type of biometric feature, more than a second threshold number (and/or at least the second threshold number) of failed biometric authentication attempts including the respective type of biometric feature have occurred since the last successful user authentication was detected, and the first biometric data matches an enrolled biometric feature, the computer system does not perform the secure operation. In some embodiments, the determination of whether the first biometric data matches an enrolled biometric feature is not made after it is determined that less than the second threshold number of failed biometric authentication attempts including the respective type of biometric feature have occurred since the last successful user authentication was detected. In some embodiments, the second threshold number is equal to and/or is not higher than the first threshold number. Choosing whether or not to perform the secure operation based on prescribed conditions allows the computer system to automatically determine whether or not to perform the secure operation and to limit the unintended and/or unsecure performance of the secure operation, which performs an operation when a set of conditions has been met without requiring further user input and improves security. Choosing whether or not to perform the secure operation, after capturing biometric data that includes the first biometric data includes the second portion of the respective type of biometric feature without including the first portion of the respective type of biometric feature, based on whether or not a first threshold number of failed biometric authentication attempts including the second portion of the respective type of biometric feature without including the first portion of the respective type of biometric feature have occurred since the last successful user authentication improves security by allowing the computer system to limit a particular type of authentication after a number of failed attempts using the particular type of authentication, which improves security.

In some embodiments, in response to (1804) receiving the request (e.g., 1750*a*, 1750*d*, 1750*f*, 1750*h*, 1750*j*, 1750*n*, 1750*p*, or 1750*q*) to perform the secure operation and after capturing, via the one or more biometric sensors, the first biometric data and in accordance with a determination that the first biometric data includes the first portion (e.g., 1260*b*) of the respective type of biometric feature and the second portion (e.g., 1260*a*) of the respective type of biometric feature and at least the second threshold number of failed biometric authentication attempts including the respective type of biometric feature have occurred (e.g., row 3, column 1 of Table 1780) since the last successful user authentication was detected, wherein the second threshold number is higher than the first threshold number, the computer system forgoes performance (1814) of the secure operation (e.g., as described above in relation to FIGS. 17J-17I) (e.g., without regard to whether or not the respective type of biometric feature in the first biometric data matches an enrolled and/or authorized biometric feature). Choosing whether or not to perform the secure operation, after capturing biometric data that includes the first biometric data includes the first portion of the respective type of biometric feature and the second portion of the respective type of biometric feature, based on whether or not a second threshold number of failed biometric authentication attempts including the second portion of the respective type of biometric feature without including the first portion of the respective type of biometric feature have occurred since the last successful user authentication improves security by allowing the computer system to limit a particular type of authentication after a number of failed attempts using the particular type of authentication, which improves security.

In some embodiments, the determination of whether the second threshold number of failed biometric authentication attempts including the respective type of biometric feature have occurred since the last successful user authentication was detected is made at least based on a total of: a first number (e.g., row 2 column 1 of Table 1780) of (e.g., one or more) failed biometric authentication attempts including the second portion of the respective type of biometric feature without including the first portion of the respective type of biometric feature that have occurred since the last successful user authentication was detected and a second number (e.g., row 1 column 1 of Table 1780) of (e.g., one or more) failed biometric authentication attempts including the first portion of the respective type of biometric feature and the second portion of the respective type of biometric feature. In some embodiments, the first number of failed biometric authentication attempts including the second portion of the respective type of biometric feature without including the first portion of the respective type of biometric feature that have occurred since the last successful user authentication was detected does not include the number of failed biometric authentication attempts including the second portion of the respective type of biometric feature without including the first portion of the respective type of biometric feature that have occurred since the last successful user authentication and after the first threshold number of failed biometric authentication attempts have occurred since the last successful user authentication. Choosing whether or not to perform the secure operation, after capturing biometric data that includes the first biometric data includes the first portion of the respective type of biometric feature and the second portion of the respective type of biometric feature, at least based on whether or not a second threshold number of failed biometric authentication attempts, that is determined based on failed biometric authentication attempts from at least two biometric authentication techniques, have occurred since the last successful user authentication improves security by allowing the computer system to limit a particular type of authentication after a number of failed attempts using the particular type of authentication and another type of authentication, which improves security.

In some embodiments, the first number (e.g., row 3, column 1 of Table 1780) of failed biometric authentication attempts including the second portion of the respective type of biometric feature without including the first portion of the respective type of biometric feature that have occurred since the last successful user authentication was detected, does not include a number of failed biometric authentication attempts including the second portion of the respective type of biometric feature without including the first portion of the respective type of biometric feature that have occurred while (and/or after) at least the first threshold number of failed biometric authentication attempts (including the second portion of the respective type of biometric feature without including the first portion of the respective type of biometric feature) is determined to have occurred since the last successful user authentication was detected (e.g., as described above in relation to detecting gesture 1750*h* and FIGS. 17H-17I). Choosing whether or not to perform the secure operation based on the number of failed authentication attempts for a particular type of authentication is above a threshold number of failed authentication attempts improves security by allowing the computer system to limit a particular type of authentication after a number of failed attempts using the particular type of authentication while allowing the user of a different type of authentication.

In some embodiments, after forgoing performance of the secure operation in accordance with a determination that the first biometric data includes the second portion of the respective type of biometric feature without including the first portion of the respective type of biometric feature and at least the first threshold number of failed biometric authentication attempts including the second portion of the respective type of biometric feature without including the first portion of the respective type of biometric feature have occurred since the last successful user authentication was detected and after capturing, via the one or more biometric sensors, second biometric data; in accordance with a determination that the second biometric data includes the second portion of the respective type of biometric feature without including the first portion of the respective type of biometric feature, the computer system forgoes performance of the secure operation (e.g., irrespective of whether or not the second portion of the respective type of biometric feature in the second biometric data matches an authorized biometric feature): in accordance with a determination that the second biometric data includes the first portion of the respective type of biometric feature and the second portion of the respective type of biometric feature, less than the second threshold number of failed biometric authentication attempts including the respective type of biometric feature have occurred since the last successful user authentication was detected, wherein the second threshold number is higher than the first threshold number, and the second biometric data matches the enrolled biometric feature (and/or another enrolled biometric feature), the computer system performs the secure operation (e.g., as described above in relation to FIGS. 17H-17K); and in accordance with a determination that the second biometric data does not match the enrolled biometric feature (and, in some embodiments, in accordance with a determination that the second biometric data includes the first portion of the respective type of biometric feature and the second portion of the respective type of biometric feature and/or in accordance with a determination that less than the second threshold number of failed biometric authentication attempts including the respective type of biometric feature have occurred since the last successful user authentication was detected, wherein the second threshold number is higher than the first threshold number), the computer system forgoes performance of the secure operation (e.g., as described above in relation to detecting gesture 1750*j* and FIGS. 17H-17K). In some embodiments, in accordance with a determination that the second biometric data includes the first portion of the respective type of biometric feature and the second portion of the respective type of biometric feature, at least the second threshold number of failed biometric authentication attempts including the respective type of biometric feature have occurred since the last successful user authentication was detected, the computer does not perform of the secure operation and/or foregoes performing the secure operation (e.g., irrespective of whether the second biometric data does or does not match an authorized biometric feature). In some embodiments, in accordance with a determination that the second biometric data does not match an enrolled biometric feature (and/or any portion of the enrolled biometric feature), the computer does not perform of the secure operation and/or foregoes performing the secure operation.

In some embodiments, in response to (1804) receiving the request (e.g., 1750*a*, 1750*d*, 1750*f*, 1750*h*, 1750*j*, 1750*n*, 1750*p*, or 1750*q*) to perform the secure operation and after capturing, via the one or more biometric sensors, the first biometric data and in accordance with a determination that the first biometric data includes the second portion of the respective type of biometric feature without including the first portion of the respective type of biometric feature and at least the first threshold number of failed biometric authentication attempts including the second portion of the respective type of biometric feature without including the first portion of the respective type of biometric feature have occurred since the last successful user authentication was detected (and, in some embodiments, in accordance with a determination that the captured first biometric data includes content that satisfies the respective set of criteria that is described above in relation to method 1600), the computer system displays (1816) (e.g., via one or more output devices that are in communication with the computer system) a prompt (e.g., 1714*b*) (e.g., a visual, haptic, and/or audio prompt) indicating that a respective type of object (e.g., as described above in relation to method 1600) must be removed (e.g., from being positioned over the first portion of the respective type of biometric feature) before the secure operation can be performed (e.g., in response to capturing biometric data that corresponds to the respective type of biometric feature). Displaying the prompt indicating that the respective type of object must be removed before the secure operation can be performed provide visual feedback concerning the steps that need to be completed before the secure operation can be performed and improves security by informing the user concerning the steps are needed before the secure operation can be performed, which provides improved visual feedback and improves security.

In some embodiments, in response to receiving the request (e.g., 1750*a*, 1750*d*, 1750*f*, 1750*h*, 1750*j*, 1750*n*, 1750*p*, or 1750*q*) to perform the secure operation and after capturing, via the one or more biometric sensors, first biometric data and in accordance with a determination that the first biometric data includes the second portion of the respective type of biometric feature without including the first portion of the respective type of biometric feature and at least the first threshold number of failed biometric authentication attempts including the second portion of the respective type of biometric feature without including the first portion of the respective type of biometric feature have occurred since the last successful user authentication was detected (and, in some embodiments, in accordance with a determination that the captured first biometric data includes content that satisfies the respective set of criteria that is described above in relation to method 1600), the computer system displays (e.g., via one or more output devices that are in communication with the computer system) (and/or providing and/or outputting) a prompt (e.g., 1714*b*) (e.g., a visual, haptic, and/or audio prompt) indicating that a first respective type of object (e.g., a mask, a face and/or mouth covering, and/or a face and/or mouth shield) must be removed (e.g., from being positioned over the first portion of the respective type of biometric feature) or successful user authentication via a non-biometric authentication technique (e.g., password and/or passcode entry and/or a two factor authentication method that does not include the collection of biometric data) (e.g., and/or a biometric authentication technique that does not include capturing the same type of biometric feature as the respective type of biometric feature) must be provided before the secure operation can be performed (e.g., in response to capturing biometric data that corresponds to the respective type of biometric feature). Displaying the prompt indicating that a first respective type of object must be removed or successful user authentication via a non-biometric authentication technique must be provided before the secure operation can be performed allows the computer system to provide visual feedback concerning the steps that need to be completed before the secure operation can be performed and improves security by informing the user concerning the steps are needed before the secure operation can be performed, which provides improved visual feedback and improves security.

In some embodiments, in response to receiving the request (e.g., 1750*j*) to perform the secure operation and after capturing, via the one or more biometric sensors, first biometric data and in accordance with a determination that at least the first threshold number of failed biometric authentication attempts have occurred since the last successful user authentication was detected (e.g., while at least the second threshold number of failed biometric attempts have not occurred), the computer system forgoes displaying a user interface (e.g., as described above in relation to FIG. 17K) (e.g., a password and/or a passcode entry user interface) that includes one or more selectable user interface objects (e.g., 732) (e.g., one or more numbers and/or letters, a selectable user interface object for deleting a portion of a password and/or passcode that has been entered, and/or a selectable user interface object for confirming that a password and/or passcode has been entered and should be use to perform a non-biometric authentication process) that, when selected, causes the computer system to authenticate non-biometric data (e.g., a password and/or a passcode) in order to perform the secure operation. Choosing to not display a user interface that includes one or more selectable user interface objects that, when selected, causes the computer system to authenticate non-biometric data in order to perform the secure operation when prescribed conditions are met gives the computer system the ability to not display the user interface in situations where display of the user interface is not likely to be relevant, which performs an operation when a set of conditions has been met without requiring further user input.

In some embodiment, in response to receiving the request (e.g., 1750*j*) to perform the secure operation and after capturing, via the one or more biometric sensors, first biometric data and in accordance with a determination that at least the second threshold number of failed biometric attempts have occurred since the last successful user authentication was detected (e.g., and at least the first threshold number of failed biometric authentication attempts have occurred since the last successful user authentication was detected or irrespective of whether the first threshold number of failed biometric authentication attempts have occurred since the last successful user authentication was detected), the computer system displays the user interface (e.g., as described above in relation to FIG. 17K) (e.g., a password and/or a passcode entry user interface) that includes one or more selectable user interface objects (e.g., 732) (e.g., one or more numbers and/or letters, a selectable user interface object for deleting a portion of a password and/or passcode that has been entered, and/or a selectable user interface object for confirming that a password and/or passcode has been entered and should be use to perform a non-biometric authentication process) that, when selected, causes the computer system (e.g., 700) to authenticate non-biometric data (e.g., a password and/or a passcode) in order to perform the secure operation. Displaying a user interface that includes one or more selectable user interface objects that, when selected, causes the computer system to authenticate non-biometric data in order to perform the secure operation when prescribed conditions are met gives the computer system the ability to display the user interface in situations where the non-biometric authentication process is required before the secure operation can be performed, which performs an operation when a set of conditions has been met without requiring further user input.

In some embodiments, after forgoing performance of the secure operation in accordance with a determination that the first biometric data included the second portion of the respective type of biometric feature without including the first portion of the respective type of biometric feature (e.g., as described above in relation to FIGS. 17D-17F) (e.g., irrespective of whether or not at least the first threshold number of failed biometric authentication attempts including the second portion of the respective type of biometric feature without including the first portion of the respective type of biometric feature have occurred since the last successful user authentication was detected) and in accordance with a determination that a first set of criteria has been met, wherein the first set of criteria includes a criterion that is met when a determination is made that a respective successful user authentication (e.g., via a non-biometric authentication process, the biometric authentication process that includes captured the first portion and second portion of the respective type of biometric feature, and/or the biometric process that includes capturing the second portion of the respective type of biometric feature without capturing the first portion of the respective type of biometric feature) was detected since forgoing performing the secure operation (e.g., in accordance with a determination that the first biometric data included the second portion of the respective type of biometric feature without including the first portion of the respective type of biometric feature)) (and, in some embodiments, in accordance with a determination that the captured first biometric data included content that satisfies the respective set of criteria that is described above in relation to method 1600 and/or the second type of respective object (e.g., glasses)), the computer system displays (e.g., via one or more output devices that are in communication with the computer system) a prompt (e.g., 1704) (e.g., a visual, haptic, and/or audio prompt) to enroll the enrolled biometric feature in conjunction with a second respective type of object (e.g., 1726) (e.g., glasses and/or as described above in relation to method 1600; an object was worn when the first biometric data was captured) that can be worn (e.g., by a user) (and/or that can cover and/or be positioned over the second portion of the respective type of biometric feature) when biometric data is captured to perform the secure operation (e.g., in accordance with a determination that fewer than the first threshold number of failed biometric authentication attempts including the second portion of the respective type of biometric feature without including the first portion of the respective type of biometric feature have occurred since the last successful user authentication was detected, and the second portion of the respective type of biometric feature in the first biometric data matches the enrolled biometric feature). In some embodiments, in response to detecting an input that corresponds to selection of the prompt to enroll the enrolled biometric feature in conjunction with the second respective type of object, the computer system displays a settings user interface and/or initiates a biometric enrollment process (e.g., a biometric enrollment process that includes at least a portion of the biometric enrollment process as described above in relation to method 1600). Displaying a prompt to enroll the enrolled biometric feature in conjunction with a second respective type of object when prescribed conditions are met allows the computer system to automatically informed the user that the second type of object can be enrolled without requiring further user input and improves security by informing the user of an option to manage configuration of the computer system, which performs an operation when a set of conditions has been met without requiring further user input.

In some embodiments, the first set of criteria includes a criterion that is met when a determination is made that the second respective type of object was detected, based on the first biometric data, before forgoing performance of the secure operation (e.g., in response to receiving the request to perform the secure operation and after capturing, via the one or more biometric sensors, the first biometric data) (e.g., as described above in relation to FIG. 17L). Displaying a prompt to enroll the enrolled biometric feature in conjunction with the second respective type of object when prescribed conditions are met (e.g., when a determination is made that the second respective type of object was detected, based on the first biometric data, before forgoing performance of the secure operation) allows the computer system to automatically informed the user that the second type of object can be enrolled without requiring further user input and improves security by informing the user of an option to manage configuration of the computer system, which performs an operation when a set of conditions has been met without requiring further user input.

In some embodiments, the first set of criteria includes a criterion that is met when a determination is made that a first object (or any objects) that represents (e.g., is) the second type of respective object (e.g., 1726) is not enrolled in conjunction with the enrolled biometric feature (e.g., as described above in relation to FIG. 17L) (e.g., none objects of the second respective type of objects are enrolled in conjunction with the enrolled biometric feature) (e.g., enrolled such that a respective object that is the second respective type of object can be worn (e.g., by a user) (and/or that can cover and/or be positioned over the second portion of the respective type of biometric feature) when biometric data is captured to perform the secure operation in accordance with a determination that fewer than a first threshold number of failed biometric authentication attempts including the second portion of the respective type of biometric feature without including the first portion of the respective type of biometric feature have occurred since the last successful user authentication was detected, and the second portion of the respective type of biometric feature in the first biometric data matches the enrolled biometric feature).

In some embodiments, the first set of criteria includes a criterion that is met when a determination is made that a second object that represents (e.g., is) the second respective type of object does not match one or more objects that represent the second respective type of object (e.g., 1726) (e.g., when glasses that have not yet been enrolled are detected) and that are enrolled in conjunction with the enrolled biometric feature, and wherein the second object was detected, based on the first biometric data, before forgoing performance of the secure operation (e.g., as described above in relation to FIG. 17L). Displaying a prompt to enroll the enrolled biometric feature in conjunction with the second respective type of object when prescribed conditions are met (e.g., when a determination is made that a second object that represents the second respective type of object does not match one or more objects that represent the second respective type of object) allows the computer system to automatically informed the user that the enrolled biometric feature in conjunction with the second type of object can be enrolled without requiring further user input and improves security by informing the user of an option to manage configuration of the computer system, which performs an operation when a set of conditions has been met without requiring further user input.

In some embodiments, the first set of criteria includes a criterion that is met when a determination is made that at least a third threshold number of failed biometric authentication attempts (e.g., two or more) including the second portion of the respective type of biometric feature without including the first portion of the respective type of biometric feature have occurred since the last successful user authentication before the respective successful user authentication was detected (e.g., as described above in relation to FIG. 17L). Displaying a prompt to enroll the enrolled biometric feature in conjunction with the second respective type of object when prescribed conditions are met allows the computer system to notify the user concerning one or more aspects of the biometric authentication process that will make future authentication attempts more likely to succeed (e.g., reducing power usage), avoiding the need for the user to dig around in settings to find the feature (e.g., reducing the number of inputs needed to perform an operation), and reducing the number of times the user enters their passcode, which could be seen by someone else nearby (e.g., improving security).

In some embodiments, while displaying the prompt to enroll the enrolled biometric feature in conjunction with the second respective type of object, the computer system detects a first input (e.g., **1750*l*) (e.g., a tap input and/or a non-tap input (e.g., a mouse click, a swipe input, and/or a pressing of a hardware button)) that corresponds to selection of the prompt (e.g., 1704) to enroll the enrolled biometric feature in conjunction with the second respective type of object (e.g., as described above in relation to FIG. 17L). In some embodiments, in response to detecting the first input that corresponds to selection of the prompt to enroll the enrolled biometric feature in conjunction with the second respective type of object, the computer system initiates a biometric enrollment process (e.g., a biometric enrollment process that includes at least a portion of the biometric enrollment process as described above in relation to method 1600 and/or that includes a process to enroll the enrolled biometric feature in conjunction with the second respective type of object) (e.g., as described above in relation to FIG. 17**L). Initiating a biometric enrollment process in response to detecting the first input that corresponds to selection of the prompt to enroll the enrolled biometric feature in conjunction with the second respective type of object allows the computer system to initiate the biometric enrollment process without providing additional controls that would clutter the user interface, which provides additional control options without cluttering the user interface.

In some embodiments, while displaying the prompt to enroll the enrolled biometric feature in conjunction with the second respective type of object, the computer system detects a second input (e.g., 1750*l*) (e.g., a tap input and/or a non-tap input (e.g., a mouse click, a swipe input, and/or a pressing of a hardware button)) that corresponds to selection of the prompt (e.g., 1704) to enroll the enrolled biometric feature in conjunction with the second respective type of object (e.g., as described above in relation to FIG. 17L). In some embodiments, in response to detecting the second input that corresponds to selection of the prompt to enroll the enrolled biometric feature in conjunction with the second respective type of object, the computer system displays a settings user interface that includes an option to enroll the enrolled biometric feature in conjunction with the second respective type of object (e.g., as described above in relation to method 1600). In some embodiments, the option to enroll the enrolled biometric feature in conjunction with the second respective type of object, when selected, causes the computer system to initiate a biometric enrollment process (e.g., as described above in relation to FIG. 17L) (e.g., a biometric enrollment process that includes at least a portion of the biometric enrollment process as described above in relation to method 1600 and/or that includes a process to enroll the second respective type of object). Displaying a settings user interface that includes an option to enroll the enrolled biometric feature in conjunction with the second respective type of object in response to detecting the second input that corresponds to selection of the prompt to enroll the enrolled biometric feature in conjunction with the second respective type of object allows the computer system to display the settings user interface and/or a relevant user interface without providing additional controls that would clutter the user interface, which provides additional control options without cluttering the user interface.

In some embodiments, in response to receiving the request (e.g., 1750*a*, 1750*d*, 1750*f*, 1750*h*, 1750*j*, 1750*n*, 1750*p*, or 1750*q*) to perform the secure operation and in accordance with a determination that a second set of criteria is met, wherein the second set of criteria includes a criterion that is met when a determination is made that a unsupported type (e.g., 1536) (e.g., sunglasses and/or as described above in relation to method 1600) of object has been detected based on the first biometric data (and/or based on the capture of the first biometric data and/or the capture of content that includes the first biometric data), and wherein the second set of criteria includes a criterion that is met when a determination is made that the secure operation will not be performed in response to receiving the request to perform the secure operation, the computer system provides (e.g., displays and/or outputs) a prompt (e.g., 1714*a*) (e.g., a visual, haptic, and/or audio prompt) indicating that the unsupported type of object (e.g., a mask, a face and/or mouth covering, and/or a face and/or mouth shield) must be removed (e.g., from being positioned over the first portion of the respective type of biometric feature) before the secure operation can be performed (e.g., in response to capturing biometric data that corresponds to the respective type of biometric feature) (and/or before user authentication can occur). Providing a prompt indicating that the unsupported type of object must be removed before the secure operation can be performed allows the computer system to provide visual feedback concerning the steps that need to be completed before the secure operation can be performed and improves security by informing the user concerning the steps are needed before the secure operation can be performed, which provides improved visual feedback and improves security.

In some embodiments, the second set of criteria includes a criterion that is met when a determination is made that unsupported type of object (e.g., 1536) was detected while the first biometric data included the second portion of a respective type of biometric feature without including the first portion of the respective type of biometric feature (e.g., as described above in relation to FIGS. 17A-17C). Providing a prompt indicating that the unsupported type of object must be removed before the secure operation can be performed based on whether the user is authenticating using a particular type of authentication (e.g., a type of authentication that does not allow the unsupported type of object to be worn while completing the authentication process) allows the computer system to provide visual feedback concerning the steps that need to be completed before the secure operation can be performed using the particular type of authentication and improves security by informing the user concerning the steps are needed before the secure operation can be performed using the particular type of authentication, which provides improved visual feedback and improves security.

In some embodiments, in accordance with a determination that the first biometric data includes the first portion of the respective type of biometric feature and the second portion of the respective type of biometric feature, less than the second threshold number of failed biometric authentication attempts including the respective type of biometric feature have occurred since the last successful user authentication was detected, and the first biometric data matches an authorized biometric feature, the secure operation is performed irrespective of whether or not a determination is made that, based on the first biometric data, the unsupported type of object (e.g., 1536) was detected (e.g., as described above in relation to FIGS. 17Q-17R). Performing the secure operation is performed irrespective of whether or not a determination is made that, based on the first biometric data, the unsupported type of object was detected when a particular authentication attempt is used improves security and usability of the computer system by allowing the user to unlock the computer system while wearing the unsupported type of object when a particular type of authentication is being used (e.g., a type of authentication that allows the user to wear the unsupported type of object while providing authentication).

In some embodiments, in response to receiving the request (e.g., 1750*a*, 1750*d*, 1750*f*, 1750*h*, 1750*j*, 1750*n*, 1750*p*, or 1750*q*) to perform the secure operation and after capturing, via the one or more biometric sensors, the first biometric data and in accordance with a determination that the first biometric data includes the second portion of the respective type of biometric feature without including the first portion of the respective type of biometric feature and at least a threshold period of time (e.g., 4-24 hours) has passed since a successful user authentication that does not include detection of biometric data including the second portion of the respective type of biometric feature without including the first portion of the respective type of biometric feature (e.g., and/or a successful user authentication that includes successfully authentication using the first and second portion of the respective type of biometric feature and/or a non-biometric authentication technique), the computer system forgoes performance of the secure operation (e.g., as described above in relation to FIG. 17N-17P) (e.g., irrespective of whether (or not) at least the first threshold number of failed biometric authentication attempts including the second portion of the respective type of biometric feature without including the first portion of the respective type of biometric feature have occurred since the last successful user authentication was detected). In some embodiments, in accordance with a determination that the first biometric data includes the second portion of the respective type of biometric feature without including the first portion of the respective type of biometric feature, and at least the threshold period of time (e.g., 4-24 hours) has not passed since the successful user authentication that does not include detection of biometric data including the second portion of the respective type of biometric feature without including the first portion of the respective type of biometric feature, the computer system performs the secure operation. In some embodiments, in accordance with a determination that the first biometric data includes the first portion of the respective type of biometric feature and the second portion of the respective type of biometric feature, at least a threshold period of time (e.g., 4-24 hours) has passed since a successful user authentication that does not include detection of biometric data including the second portion of the respective type of biometric feature without including the first portion of the respective type of biometric feature, less than the second threshold number of failed biometric authentication attempts including the respective type of biometric feature have occurred since the last successful user authentication was detected, and/or the first biometric data matches an enrolled biometric feature, the computer system performs the secure operation (e.g., irrespective of whether the threshold period of time has passed). In some embodiments, in accordance with a determination that the first biometric data includes the first portion of the respective type of biometric feature and the second portion of the respective type of biometric feature, at least a threshold period of time (e.g., 4-24 hours) has passed since a successful user authentication that does not include detection of biometric data including the second portion of the respective type of biometric feature without including the first portion of the respective type of biometric feature, at least the second threshold number of failed biometric authentication attempts including the respective type of biometric feature have occurred since the last successful user authentication was detected, and/or the first biometric data matches an enrolled biometric feature, the computer system does not perform the secure operation (e.g., irrespective of whether the threshold period of time has passed). Forgoing performance of the secure operation when in accordance with a determination that the first biometric data includes the second portion of the respective type of biometric feature without including the first portion of the respective type of biometric feature and at least a threshold period of time has passed since a successful user authentication that does not include detection of biometric data including the second portion of the respective type of biometric feature without including the first portion of the respective type of biometric feature improves security by allowing the computer system to require a more secure authorization technique to occur within a certain time period before the computer system can perform the secure operation using a less secure authorization technique, which provides improved security.

Note that details of the processes described above with respect to method 1800 (e.g., FIGS. 18A-18C) are also applicable in an analogous manner to the other methods described herein. For example, methods 800, 900, 1000, 1100, 1300, 1400, and 1600 optionally includes one or more of the characteristics of the various methods described above with reference to method 1800. For example, the methods 800, 900, 1000, and 1100 can be combined with methods 1300, 1400, 1600, and 1800 such that, when a biometric authentication process is unsuccessful using the techniques (e.g., biometric enrollment using a portion of biometric feature) described by methods 1300, 1400, 1600, and 1800, the techniques described by methods 800, 900, 1000, and 1100 can be used to unlock the computer system with the assistance of an external device (or vice-versa). For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

One aspect of the present technology is the gathering and use of data available from various sources to improve the ability of the computer system to biometrically authenticate the user in order to authorize the performance of secure operations that are initiated at the computer system. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the ability of the computer system to biometrically authenticate the user. Accordingly, use of such personal information data enables users to have calculated control over the biometric data that the user has shared with the computer system. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of biometric authentication, the present technology can be configured to allow users to select to "opt in" or "opt out" of participation in the collection of personal information data during registration for services or anytime thereafter. In another example, users can select not to provide biometric data for use in biometric authentication. In yet another example, users can select to limit the type of biometric data that is provided for biometric authentication and/or limit and/or entirely limit the computer system's use of biometric authentication using the biometric data from the user. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, secure operation can be authentication using non-biometric authentication methods (e.g., via passcode input and/or with the assistance of an external accessory device) that are based on non-personal information data or a bare minimum amount of personal information, such as the content being requested by the device associated with a user, other non-personal information available to the computer system, or publicly available information.

What is claimed is:

1. A computer system, comprising:

one or more processors, wherein the computer system is in communication with one or more biometric sensors and an external accessory device; and memory storing one or more programs configured to be executed by the one or more processors, the one or more programs including instructions for:

receiving a request at the computer system to perform a secure operation with the computer system; and in response to the request to perform the secure operation with the computer system:

in accordance with a determination that biometric data captured by the computer system meets a set of biometric authentication criteria, performing the secure operation; and in accordance with a determination that the biometric data does not meet the set of biometric authentication criteria and in accordance with a determination that one or more states of the external accessory device meets a set of accessory-based criteria that includes a criterion that is met when the external accessory device is in an unlocked state and a criterion that is met when the external accessory device is physically associated with a user, performing the secure operation.

2. The computer system of claim 1, wherein the one or more programs further include instructions for:

in response to the request to perform the secure operation with the computer system:

in accordance with a determination that the biometric data does not meet the set of biometric authentication criteria and in accordance with a determination that the one or more states of the external accessory device does not meet the set of accessory-based criteria, forgoing performing the secure operation.

3. The computer system of claim 1, wherein:

the request to perform the secure operation with the computer system is a request to unlock the computer system; and performing the secure operation includes transitioning the computer system from a locked state to an unlocked state.

4. The computer system of claim 1, wherein:

the request to perform the secure operation with the computer system is a request to autofill content into one or more fillable fields; and performing the secure operation includes auto-filling content into the one or more fillable fields.

5. The computer system of claim 1, wherein the one or more programs further include instructions for:

after receiving the request to perform the secure operation with the computer system, capturing, via the one or more biometric sensors, biometric data.

6. The computer system of claim 1, wherein the request to perform the secure operation is a request to perform a secure operation of a first type and performing the secure operation includes performing the secure operation of the first type, and wherein the one or more programs further include instructions for:

receiving a request at the computer system to perform a secure operation of a second type, different from the first type; and in response to the request at the computer system to perform the secure operation of the second type with the computer system:

in accordance with a determination that biometric data captured by the computer system meets a second set of biometric authentication criteria, performing the secure operation of the second type; and in accordance with a determination that the biometric data does not meet the second set of biometric authentication criteria, forgoing performing the secure operation of the second type.

7. The computer system of claim 1, wherein performing the secure operation in accordance with the determination that biometric data captured by the computer system meets the set of biometric authentication criteria occurs without a determination of whether one or more states of the external accessory device meets the set of accessory-based criteria.

8. The computer system of claim 1, wherein performing the secure operation in accordance with a determination that the biometric data does not meet the set of biometric authentication criteria and in accordance with a determination that the one or more states of the external accessory device meets a set of accessory-based criteria is performed when the determination that biometric data captured by the computer system does not meet the set of biometric authentication criteria occurs.

9. The computer system of claim 1, wherein the determination that the one or more states of the external accessory device meets the set of accessory-based criteria is made after a determination that the biometric data does not meet the set of biometric authentication criteria due to, at least in part, a predefined portion of a biometric feature not being available to be captured by the one or more biometric sensors.

10. The computer system of claim 1, wherein the computer system is in communication with one or more output devices, and wherein the one or more programs further include instructions for:

in response to the request to perform the secure operation with the computer system and in accordance with a determination that the external accessory device is in a locked state, outputting, via the one or more output devices, a prompt to transition the external accessory device to an unlocked state.

11. The computer system of claim 1, wherein the computer system is in communication with one or more output devices, and wherein the one or more programs further include instructions for:

in response to the request to perform the secure operation with the computer system and in accordance with a determination that the external accessory device does not meet a set of proximity criteria, outputting, via the one or more output devices, a prompt to move the external accessory device closer to the computer system.

12. The computer system of claim 1, wherein the computer system is in communication with one or more output devices, and wherein the one or more programs further include instructions for:

in response to the request to perform the secure operation with the computer system and in accordance with a determination that the external accessory device is not physically associated with the user, outputting, via the one or more output devices, a prompt to physically associate the external accessory device with the user.

13. The computer system of claim 1, wherein the computer system is in communication with a display generation component, and wherein the one or more programs further include instructions for:

after receiving a request at the computer system to perform the secure operation with the computer system:

in accordance with a determination that a determination of whether the biometric data meets the set of biometric authentication criteria is being made, displaying, via the display generation component, a first indication; and in accordance with a determination that a determination of whether the one or more states of the external accessory device meets the set of accessory-based criteria is being made, displaying, via the display generation component, a second indication, different from the first indication.

14. The computer system of claim 1, wherein the external accessory device includes a display and the external accessory device displays, after the computer system receives the request to perform the secure operation, a first visual indication that the computer system has initiated a process of performing the secure operation.

15. The computer system of claim 14, wherein the first visual indication includes a first user-selectable graphical object that, when selected, causes the process of performing the secure operation to be cancelled by the computer system.

16. The computer system of claim 14, wherein receiving an input at the external accessory device while the first visual indication is being displayed, causes the process of performing the secure operation to be cancelled by the computer system.

17. The computer system of claim 1, wherein the external accessory device includes a display and the external accessory device displays, after the computer system performs the secure operation, a second visual indication that indicates that the computer system has performed the secure operation.

18. The computer system of claim 17, wherein the second visual indication includes a second user-selectable graphical object that, when selected, causes the secure operation to be reversed by the computer system.

19. The computer system of claim 17, wherein receiving an input at the external accessory device while the second visual indication is being displayed, causes the secure operation to be reversed by the computer system.

20. The computer system of claim 1, wherein the set of accessory-based criteria includes a criterion that is met after the computer system has performed the secure operation, in accordance with a determination that a set of authentication criteria, that does not include the set of accessory-based criteria, is satisfied within a period of time after the external accessory device is in the unlocked state and physically associated with the user.

21. The computer system of claim 1, wherein the set of accessory-based criteria includes a criterion that is met when a determination is made that a physical object is covering a portion of a face of a user.

22. The computer system of claim 1, wherein the set of accessory-based criteria includes a criterion that is met when the external accessory device is within a predetermined distance from the computer system.

23. The computer system of claim 1, wherein the set of accessory-based criteria includes a criterion that is met when the external accessory device is not operating in a reduced-power compensation mode.

24. The computer system of claim 1, wherein the set of accessory-based criteria includes a criterion that is met when a determination is made that the external accessory device has moved a first amount within a first predetermined time.

25. The computer system of claim 1, wherein the set of accessory-based criteria includes a criterion that is met when a determination is made that the external accessory device has been unlocked at least a first amount of times within a second predetermined period of time.

26. The computer system of claim 1, wherein the set of accessory-based criteria includes a criterion that is met when a determination is made that the computer system has been unlocked at least a second amount of times over a third predetermined period of time.

27. The computer system of claim 1, wherein the set of accessory-based criteria includes a criterion that is met when the computer system is configured to perform the secure operation based on the set of biometric authentication criteria being met.

28. A non-transitory computer-readable storage medium storing one or more programs configured to be executed by one or more processors of a computer system that is in communication with one or more biometric sensors and an external accessory device, the one or more programs including instructions for:

receiving a request at the computer system to perform a secure operation with the computer system; and in response to the request to perform the secure operation with the computer system:

in accordance with a determination that biometric data captured by the computer system meets a set of biometric authentication criteria, performing the secure operation; and in accordance with a determination that the biometric data does not meet the set of biometric authentication criteria and in accordance with a determination that one or more states of the external accessory device meets a set of accessory-based criteria that includes a criterion that is met when the external accessory device is in an unlocked state and a criterion that is met when the external accessory device is physically associated with a user, performing the secure operation.

29. The non-transitory computer-readable storage medium of claim 28, wherein the one or more programs further include instructions for:

in response to the request to perform the secure operation with the computer system:

in accordance with a determination that the biometric data does not meet the set of biometric authentication criteria and in accordance with a determination that the one or more states of the external accessory device does not meet the set of accessory-based criteria, forgoing performing the secure operation.

30. The non-transitory computer-readable storage medium of claim 28, wherein:

the request to perform the secure operation with the computer system is a request to unlock the computer system; and performing the secure operation includes transitioning the computer system from a locked state to an unlocked state.

31. The non-transitory computer-readable storage medium of claim 28, wherein:

the request to perform the secure operation with the computer system is a request to autofill content into one or more fillable fields; and performing the secure operation includes auto-filling content into the one or more fillable fields.

32. The non-transitory computer-readable storage medium of claim 28, wherein the one or more programs further include instructions for:

after receiving the request to perform the secure operation with the computer system, capturing, via the one or more biometric sensors, biometric data.

33. The non-transitory computer-readable storage medium of claim 28, wherein the request to perform the secure operation is a request to perform a secure operation of a first type and performing the secure operation includes performing the secure operation of the first type, and wherein the one or more programs further include instructions for:

receiving a request at the computer system to perform a secure operation of a second type, different from the first type; and in response to the request at the computer system to perform the secure operation of the second type with the computer system:

in accordance with a determination that biometric data captured by the computer system meets a second set of biometric authentication criteria, performing the secure operation of the second type; and in accordance with a determination that the biometric data does not meet the set of biometric authentication criteria, forgoing performing the secure operation of the second type.

34. The non-transitory computer-readable storage medium of claim 28, wherein performing the secure operation in accordance with the determination that biometric data captured by the computer system meets the set of biometric authentication criteria occurs without a determination of whether one or more states of the external accessory device meets the set of accessory-based criteria.

35. The non-transitory computer-readable storage medium of claim 28, wherein performing the secure operation in accordance with a determination that the biometric data does not meet the set of biometric authentication criteria and in accordance with a determination that the one or more states of the external accessory device meets a set of accessory-based criteria is performed when the determination that biometric data captured by the computer system does not meet the set of biometric authentication criteria occurs.

36. The non-transitory computer-readable storage medium of claim 28, wherein the determination that the one or more states of the external accessory device meets the set of accessory-based criteria is made after a determination that the biometric data does not meet the set of biometric authentication criteria due to, at least in part, a predefined portion of a biometric feature not being available to be captured by the one or more biometric sensors.

37. The non-transitory computer-readable storage medium of claim 28, wherein the computer system is in communication with one or more output devices, and wherein the one or more programs further include instructions for:

in response to the request to perform the secure operation with the computer system and in accordance with a determination that the external accessory device is in a locked state, outputting, via the one or more output devices, a prompt to transition the external accessory device to an unlocked state.

38. The non-transitory computer-readable storage medium of claim 28, wherein the computer system is in communication with one or more output devices, and wherein the one or more programs further include instructions for:

in response to the request to perform the secure operation with the computer system and in accordance with a determination that the external accessory device does not meet a set of proximity criteria, outputting, via the one or more output devices, a prompt to move the external accessory device closer to the computer system.

39. The non-transitory computer-readable storage medium of claim 28, wherein the computer system is in communication with one or more output devices, and wherein the one or more programs further include instructions for:

in response to the request to perform the secure operation with the computer system and in accordance with a determination that the external accessory device is not physically associated with the user, outputting, via the one or more output devices, a prompt to physically associate the external accessory device with the user.

40. The non-transitory computer-readable storage medium of claim 28, wherein the computer system in in communication with a display generation component, and wherein the one or more programs further include instructions for:

after receiving a request at the computer system to perform a secure operation with the computer system:

in accordance with a determination that a determination of whether the biometric data meets the set of biometric authentication criteria is being made, displaying, via the display generation component, a first indication; and in accordance with a determination that a determination of whether the one or more states of the external accessory device meets the set of accessory-based criteria is being made, displaying, via the display generation component, a second indication, different from the first indication.

41. The non-transitory computer-readable storage medium of claim 28, wherein the external accessory device includes a display and the external accessory device displays, after the computer system receives the request to perform the secure operation, a first visual indication that the computer system has initiated a process of performing the secure operation.

42. The non-transitory computer-readable storage medium of claim 41, wherein the first visual indication includes a first user-selectable graphical object that, when selected, causes the process of performing the secure operation to be cancelled by the computer system.

43. The non-transitory computer-readable storage medium of claim 41, wherein receiving an input at the external accessory device while the first visual indication is being displayed, causes the process of performing the secure operation to be cancelled by the computer system.

44. The non-transitory computer-readable storage medium of claim 28, wherein the external accessory device includes a display and the external accessory device displays, after the computer system performs the secure operation, a second visual indication that indicates that the computer system has performed the secure operation.

45. The non-transitory computer-readable storage medium of claim 44, wherein the second visual indication includes a second user-selectable graphical object that, when selected, causes the secure operation to be reversed by the computer system.

46. The non-transitory computer-readable storage medium of claim 44, wherein receiving an input at the external accessory device while the second visual indication is being displayed, causes the secure operation to be reversed by the computer system.

47. The non-transitory computer-readable storage medium of claim 28, wherein the set of accessory-based criteria includes a criterion that is met after the computer system has performed the secure operation, in accordance with a determination that a set of authentication criteria, that does not include the set of accessory-based criteria, is satisfied within a period of time after the external accessory device is in the unlocked state and physically associated with the user.

48. The non-transitory computer-readable storage medium of claim 28, wherein the set of accessory-based criteria includes a criterion that is met when a determination is made that a physical object is covering a portion of a face of a user.

49. The non-transitory computer-readable storage medium of claim 28, wherein the set of accessory-based criteria includes a criterion that is met when the external accessory device is within a predetermined distance from the computer system.

50. The non-transitory computer-readable storage medium of claim 28, wherein the set of accessory-based criteria includes a criterion that is met when the external accessory device is not operating in a reduced-power compensation mode.

51. The non-transitory computer-readable storage medium of claim 28, wherein the set of accessory-based criteria includes a criterion that is met when a determination is made that the external accessory device has moved a first amount within a first predetermined time.

52. The non-transitory computer-readable storage medium of claim 28, wherein the set of accessory-based criteria includes a criterion that is met when a determination is made that the external accessory device has been unlocked at least a first amount of times within a second predetermined period of time.

53. The non-transitory computer-readable storage medium of claim 28, wherein the set of accessory-based criteria includes a criterion that is met when a determination is made that the computer system has been unlocked at least a second amount of times over a third predetermined period of time.

54. The non-transitory computer-readable storage medium of claim 28, wherein the set of accessory-based criteria includes a criterion that is met when the computer system is configured to perform the secure operation based on the set of biometric authentication criteria being met.

55. The method of claim 29, further comprising:

in response to the request to perform the secure operation with the computer system:

in accordance with a determination that the biometric data does not meet the set of biometric authentication criteria and in accordance with a determination that the one or more states of the external accessory device does not meet the set of accessory-based criteria, forgoing performing the secure operation.

56. A method, comprising:

at a computer system that is in communication with one or more biometric sensors and an external accessory device:

receiving a request at the computer system to perform a secure operation with the computer system; and in response to the request to perform the secure operation with the computer system:

in accordance with a determination that biometric data captured by the computer system meets a set of biometric authentication criteria, performing the secure operation; and in accordance with a determination that the biometric data does not meet the set of biometric authentication criteria and in accordance with a determination that one or more states of the external accessory device meets a set of accessory-based criteria that includes a criterion that is met when the external accessory device is in an unlocked state and a criterion that is met when the external accessory device is physically associated with a user, performing the secure operation.

57. The method of claim 56, wherein:

the request to perform the secure operation with the computer system is a request to unlock the computer system; and performing the secure operation includes transitioning the computer system from a locked state to an unlocked state.

58. The method of claim 56, wherein:

the request to perform the secure operation with the computer system is a request to autofill content into one or more fillable fields; and performing the secure operation includes auto-filling content into the one or more fillable fields.

59. The method of claim 56, further comprising:

after receiving the request to perform the secure operation with the computer system, capturing, via the one or more biometric sensors, biometric data.

60. The method of claim 56, wherein the request to perform the secure operation is a request to perform a secure operation of a first type and performing the secure operation includes performing the secure operation of the first type, and wherein the method further comprises:

receiving a request at the computer system to perform a secure operation of a second type, different from the first type; and in response to the request at the computer system to perform the secure operation of the second type with the computer system:

in accordance with a determination that biometric data captured by the computer system meets a second set of biometric authentication criteria, performing the secure operation of the second type; and in accordance with a determination that the biometric data does not meet the set of biometric authentication criteria, forgoing performing the secure operation of the second type.

61. The method of claim 56, wherein performing the secure operation in accordance with the determination that biometric data captured by the computer system meets the set of biometric authentication criteria occurs without a determination of whether one or more states of the external accessory device meets the set of accessory-based criteria.

62. The method of claim 56, wherein performing the secure operation in accordance with a determination that the biometric data does not meet the set of biometric authentication criteria and in accordance with a determination that the one or more states of the external accessory device meets a set of accessory-based criteria is performed when the determination that biometric data captured by the computer system does not meet the set of biometric authentication criteria occurs.

63. The method of claim 56, wherein the determination that the one or more states of the external accessory device meets the set of accessory-based criteria is made after a determination that the biometric data does not meet the set of biometric authentication criteria due to, at least in part, a predefined portion of a biometric feature not being available to be captured by the one or more biometric sensors.

64. The method of claim 56, wherein the computer system is in communication with one or more output devices, the method further comprising:

in response to the request to perform the secure operation with the computer system and in accordance with a determination that the external accessory device is in a locked state, outputting, via the one or more output devices, a prompt to transition the external accessory device to an unlocked state.

65. The method of claim 56, wherein the computer system is in communication with one or more output devices, and wherein the method further comprises:

in response to the request to perform the secure operation with the computer system and in accordance with a determination that the external accessory device does not meet a set of proximity criteria, outputting, via the one or more output devices, a prompt to move the external accessory device closer to the computer system.

66. The method of claim 56, wherein the computer system is in communication with one or more output devices, and wherein the method further comprises:

in response to the request to perform the secure operation with the computer system and in accordance with a determination that the external accessory device is not physically associated with the user, outputting, via the one or more output devices, a prompt to physically associate the external accessory device with the user.

67. The method of claim 56, wherein the computer system in in communication with a display generation component, and wherein the method further comprises:

after receiving a request at the computer system to perform a secure operation with the computer system:

in accordance with a determination that a determination of whether the biometric data meets the set of biometric authentication criteria is being made, displaying, via the display generation component, a first indication; and in accordance with a determination that a determination of whether the one or more states of the external accessory device meets the set of accessory-based criteria is being made, displaying, via the display generation component, a second indication, different from the first indication.

68. The method of claim 56, wherein the external accessory device includes a display and the external accessory device displays, after the computer system receives the request to perform the secure operation, a first visual indication that the computer system has initiated a process of performing the secure operation.

69. The method of claim 68, wherein the first visual indication includes a first user- selectable graphical object that, when selected, causes the process of performing the secure operation to be cancelled by the computer system.

70. The method of claim 68, wherein receiving an input at the external accessory device while the first visual indication is being displayed, causes the process of performing the secure operation to be cancelled by the computer system.

71. The method of claim 56, wherein the external accessory device includes a display and the external accessory device displays, after the computer system performs the secure operation, a second visual indication that indicates that the computer system has performed the secure operation.

72. The method of claim 71, wherein the second visual indication includes a second user- selectable graphical object that, when selected, causes the secure operation to be reversed by the computer system.

73. The method of claim 71, wherein receiving an input at the external accessory device while the second visual indication is being displayed, causes the secure operation to be reversed by the computer system.

74. The method of claim 56, wherein the set of accessory-based criteria includes a criterion that is met after the computer system has performed the secure operation, in accordance with a determination that a set of authentication criteria, that does not include the set of accessory- based criteria, is satisfied within a period of time after the external accessory device is in the unlocked state and physically associated with the user.

75. The method of claim 56, wherein the set of accessory-based criteria includes a criterion that is met when a determination is made that a physical object is covering a portion of a face of a user.

76. The method of claim 56, wherein the set of accessory-based criteria includes a criterion that is met when the external accessory device is within a predetermined distance from the computer system.

77. The method of claim 56, wherein the set of accessory-based criteria includes a criterion that is met when the external accessory device is not operating in a reduced-power compensation mode.

78. The method of claim 56, wherein the set of accessory-based criteria includes a criterion that is met when a determination is made that the external accessory device has moved a first amount within a first predetermined time.

79. The method of claim 56, wherein the set of accessory-based criteria includes a criterion that is met when a determination is made that the external accessory device has been unlocked at least a first amount of times within a second predetermined period of time.

80. The method of claim 56, wherein the set of accessory-based criteria includes a criterion that is met when a determination is made that the computer system has been unlocked at least a second amount of times over a third predetermined period of time.

81. The method of claim 56, wherein the set of accessory-based criteria includes a criterion that is met when the computer system is configured to perform the secure operation based on the set of biometric authentication criteria being met.

* * * * *

UNITED STATES PATENT AND TRADEMARK OFFICE

CERTIFICATE OF CORRECTION

PATENT NO. : 12,099,586 B2
APPLICATION NO. : 17/587558
DATED : September 24, 2024
INVENTOR(S) : Grant R. Paul et al.

It is certified that error appears in the above-identified patent and that said Letters Patent is hereby corrected as shown below:

On the Title Page

Column 1, Line 4, Item (71) Applicant, delete "inc.," and insert -- Inc., --, therefor.

In the Claims

In Column 200, Line 27, Claim 13, delete "the" and insert -- a --, therefor.

In Column 203, Line 44, Claim 40, delete "in in" and insert -- is in --, therefor.

In Column 205, Line 6, Claim 55, delete "29," and insert -- 56, --, therefor.

In Column 206, Line 59, Claim 67, delete "in in" and insert -- is in --, therefor.

Signed and Sealed this
Eighteenth Day of March, 2025

Coke Morgan Stewart
*Acting Director of the United States Patent and Trademark Office*